(12) United States Patent
Tabata et al.

(10) Patent No.: US 7,822,524 B2
(45) Date of Patent: Oct. 26, 2010

(54) VEHICULAR DRIVE SYSTEM

(75) Inventors: Atsushi Tabata, Okazaki (JP); Yutaka Taga, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1419 days.

(21) Appl. No.: 11/019,337

(22) Filed: Dec. 23, 2004

(65) Prior Publication Data

US 2005/0209760 A1    Sep. 22, 2005

(30) Foreign Application Priority Data

| Dec. 26, 2003 | (JP) | ............................. 2003-435967 |
| Feb. 25, 2004 | (JP) | ............................. 2004-050530 |
| Feb. 26, 2004 | (JP) | ............................. 2004-052211 |
| May 26, 2004 | (JP) | ............................. 2004-156884 |
| May 28, 2004 | (JP) | ............................. 2004-159602 |
| Jun. 30, 2004 | (JP) | ............................. 2004-194792 |
| Nov. 17, 2004 | (JP) | ............................. 2004-333627 |
| Dec. 16, 2004 | (JP) | ............................. 2004-365143 |
| Dec. 16, 2004 | (JP) | ............................. 2004-365144 |

(51) Int. Cl.
*G06F 7/00* (2006.01)
*G06F 17/00* (2006.01)
*G06F 19/00* (2006.01)

(52) U.S. Cl. .............................. 701/53; 701/87; 701/95; 701/22; 701/51; 180/65.1; 180/65.3; 475/1; 477/34

(58) Field of Classification Search ...................... 475/5, 475/275, 127, 231, 136, 150, 1; 701/53, 701/22, 55, 51, 87, 95; 180/65.235, 65.25, 180/65, 65.28, 65.1, 65.3; 477/34
See application file for complete search history.

(56) References Cited

U.S. PATENT DOCUMENTS

| 4,388,844 | A | * | 6/1983 | Arai et al. .................... 475/127 |
| 4,416,168 | A | * | 11/1983 | Arai et al. .................... 475/142 |

| 5,103,693 | A | 4/1992 | Hibi |

(Continued)

FOREIGN PATENT DOCUMENTS

DE    196 06 771 A1    8/1997

(Continued)

OTHER PUBLICATIONS

57th AAI 1997 Frankfurt Automobile Show Hybrid Electric Vehicles on Display; Wyczalek, F.A.; Aerospace and Electronic Systems Magazine, IEEE; vol. 13, Issue 2, Feb. 1998 pp. 36-38; Digital Object Identifier ; .1109/MAES.1998.656333.*

(Continued)

*Primary Examiner*—Cuong H Nguyen
(74) *Attorney, Agent, or Firm*—Kenyon & Kenyon LLP

(57) ABSTRACT

Vehicular drive system which is small-sized and/or improved in its fuel economy.

A power distributing mechanism 16, which is provided with a differential-state switching device in the form of a switching clutch C0 and a switching brake B0, is switchable by the switching device between a differential state (continuously-variable shifting state) in which the mechanism is operable as an electrically controlled continuously variable transmission, and a fixed-speed-ratio shifting state in which the mechanism is operable as a transmission having a fixed speed ratio or ratios. The power distributing mechanism 16 is placed in the fixed-speed-ratio shifting state during a high-speed running of the vehicle or a high-speed operation of engine 8, so that the output of the engine 8 is transmitted to drive wheels 38 primarily through a mechanical power transmitting path, whereby fuel economy of the vehicle is improved owing to reduction of a loss of conversion of a mechanical energy into an electric energy. The mechanism 16 is also placed in the fixed-speed-ratio shifting state during a high-output operation of the engine 8, so that the required electric reaction of first electric motor M1 can be reduced, whereby the required size of the first electric motor M1, and the required size of the drive system 10 including the electric motor M1 can be reduced.

86 Claims, 93 Drawing Sheets

U.S. PATENT DOCUMENTS

| | | | |
|---|---|---|---|
| 5,415,603 A * | 5/1995 | Tuzuki et al. | 477/5 |
| 5,486,146 A * | 1/1996 | Asahara et al. | 477/65 |
| 5,492,189 A | 2/1996 | Kriegler et al. | |
| 5,527,233 A * | 6/1996 | Tabata et al. | 477/62 |
| 5,626,535 A * | 5/1997 | Kono et al. | 477/169 |
| 5,683,329 A * | 11/1997 | Kono et al. | 477/176 |
| 5,696,680 A * | 12/1997 | Ichioka et al. | 701/67 |
| 5,775,449 A | 7/1998 | Moroto et al. | |
| 5,779,595 A * | 7/1998 | Kono et al. | 477/174 |
| 5,785,623 A | 7/1998 | Iino et al. | |
| 5,803,868 A * | 9/1998 | Kono et al. | 477/168 |
| 5,842,953 A * | 12/1998 | Yasue et al. | 477/174 |
| 5,856,709 A | 1/1999 | Ibaraki et al. | |
| 5,982,045 A | 11/1999 | Tabata et al. | |
| 5,997,429 A | 12/1999 | Raghavan et al. | |
| 6,081,042 A | 6/2000 | Tabata et al. | |
| 6,146,302 A | 11/2000 | Kashiwase | |
| 6,157,885 A | 12/2000 | Sakaguchi et al. | |
| 6,282,492 B1 | 8/2001 | Gorai et al. | |
| 6,371,878 B1 | 4/2002 | Bowen | |
| 6,383,106 B1 | 5/2002 | Kashiwase | |
| 6,520,879 B2 | 2/2003 | Kawabata et al. | |
| 6,537,169 B1 | 3/2003 | Morii | |
| 6,602,157 B2 | 8/2003 | Kashiwase | |
| 6,629,024 B2 * | 9/2003 | Tabata et al. | 701/22 |
| 6,729,987 B2 * | 5/2004 | Sakamoto et al. | 475/117 |
| 6,732,526 B2 | 5/2004 | Minagawa et al. | |
| 6,887,175 B2 | 5/2005 | Yamauchi et al. | |
| 6,896,090 B2 | 5/2005 | Kanda et al. | |
| 6,994,177 B2 * | 2/2006 | Ito et al. | 180/65.2 |
| 7,108,630 B2 | 9/2006 | Ozeki et al. | |
| 7,165,638 B2 * | 1/2007 | Ito et al. | 180/65.2 |
| 7,168,515 B2 * | 1/2007 | Ito et al. | 180/65.2 |
| 7,207,404 B2 * | 4/2007 | Ito et al. | 180/65.2 |
| 7,222,685 B2 * | 5/2007 | Takenaka et al. | 180/65.1 |
| 7,223,200 B2 | 5/2007 | Kojima et al. | |
| 7,252,619 B2 | 8/2007 | Tabata et al. | |
| 7,255,186 B2 | 8/2007 | Wakuta et al. | |
| 7,291,080 B2 | 11/2007 | Minagawa et al. | |
| 7,426,972 B2 * | 9/2008 | Tabata et al. | 180/65.2 |
| 2001/0020789 A1 | 9/2001 | Nakashima | |
| 2002/0024306 A1 | 2/2002 | Imai et al. | |
| 2002/0062183 A1 | 5/2002 | Yamaguchi et al. | |
| 2002/0116099 A1* | 8/2002 | Tabata et al. | 701/22 |
| 2003/0040388 A1* | 2/2003 | Sakamoto et al. | 475/117 |
| 2003/0075368 A1 | 4/2003 | Takaoka et al. | |
| 2003/0181276 A1 | 9/2003 | Minagawa et al. | |
| 2004/0050597 A1 | 3/2004 | Ai et al. | |
| 2004/0084233 A1 | 5/2004 | Wakuta et al. | |
| 2004/0102286 A1* | 5/2004 | Tabata et al. | 477/3 |
| 2004/0142786 A1* | 7/2004 | Fusegi et al. | 475/231 |
| 2004/0149501 A1 | 8/2004 | Imazu et al. | |
| 2004/0158365 A1* | 8/2004 | Tabata et al. | 701/22 |
| 2005/0101432 A1 | 5/2005 | Pels et al. | |
| 2005/0209760 A1* | 9/2005 | Tabata et al. | 701/53 |
| 2005/0245350 A1* | 11/2005 | Tabata et al. | 477/34 |
| 2006/0063629 A1 | 3/2006 | Minagawa et al. | |
| 2008/0153664 A1* | 6/2008 | Tabata et al. | 477/37 |
| 2008/0173485 A1* | 7/2008 | Kumazaki et al. | 180/65.2 |
| 2008/0188346 A1* | 8/2008 | Sugai et al. | 477/15 |
| 2008/0190676 A1* | 8/2008 | Imamura et al. | 180/65.2 |
| 2008/0195286 A1* | 8/2008 | Tabata et al. | 701/51 |
| 2008/0312022 A1 | 12/2008 | Martin et al. | |
| 2009/0069965 A1* | 3/2009 | Tabata et al. | 701/22 |
| 2009/0069966 A1 | 3/2009 | Tabata et al. | |
| 2009/0075774 A1* | 3/2009 | Tabata et al. | 475/150 |

FOREIGN PATENT DOCUMENTS

| | | |
|---|---|---|
| DE | 199 16 489 A1 | 10/2000 |
| EP | 0 925 981 A2 | 12/1998 |
| EP | 1 090 794 A2 | 4/2001 |
| EP | 1 297 981 A2 | 9/2002 |
| EP | 1 304 248 A1 | 10/2002 |
| EP | 1 304 248 A1 | 4/2003 |
| FR | 677386 | 12/1929 |
| JP | 50-30223 A | 3/1975 |
| JP | 61-124747 | 6/1986 |
| JP | 62-009049 | 1/1987 |
| JP | 63-243551 | 10/1988 |
| JP | 64-03950 | 2/1989 |
| JP | 64-040740 | 2/1989 |
| JP | 01-105042 | 4/1989 |
| JP | 2-236049 A | 9/1990 |
| JP | 03-149439 | 6/1991 |
| JP | 5-164205 A | 6/1993 |
| JP | 05-312255 A | 11/1993 |
| JP | 06-272757 A | 9/1994 |
| JP | 07-081443 A | 3/1995 |
| JP | 08-135762 A | 5/1996 |
| JP | 08-178054 A | 7/1996 |
| JP | 08-183356 A | 7/1996 |
| JP | 09-37410 A | 2/1997 |
| JP | 09-037411 | 2/1997 |
| JP | 09-98516 A | 4/1997 |
| JP | 9-158997 A | 6/1997 |
| JP | 9-193676 A | 7/1997 |
| JP | 10-002241 A | 1/1998 |
| JP | 10-220536 | 8/1998 |
| JP | 11-198668 A | 7/1999 |
| JP | 11-198670 A | 7/1999 |
| JP | 11-217025 A | 8/1999 |
| JP | 2000-2327 A | 1/2000 |
| JP | 2000-142146 | 5/2000 |
| JP | 7-336810 A | 12/2000 |
| JP | 2000-341804 A | 12/2000 |
| JP | 2000-346187 A | 12/2000 |
| JP | 2001-032889 | 2/2001 |
| JP | 2001-221301 | 8/2001 |
| JP | 2001-339805 A | 12/2001 |
| JP | 2002-281607 A | 9/2002 |
| JP | 2002-340138 A | 11/2002 |
| JP | 2002-364742 A | 12/2002 |
| JP | 2003-127679 A | 5/2003 |
| JP | 2003-127681 A | 5/2003 |
| JP | 2003-130202 A | 5/2003 |
| JP | 2003-130203 A | 5/2003 |
| JP | 2003-306059 A | 10/2003 |
| JP | 2004-019641 | 1/2004 |
| JP | 2005-273900 A | 10/2005 |
| JP | 2006-194326 A | 7/2006 |
| JP | 2006-213149 A | 8/2006 |
| JP | 2006-220235 A | 8/2006 |
| JP | 01-105042 | 4/2008 |
| JP | 64-040741 | 4/2008 |
| KR | 2003-0006052 A | 1/2003 |
| KR | 2003-26561 | 4/2003 |
| WO | WO 99/06738 | 2/1999 |
| WO | WO 03/016749 A1 | 2/2003 |

OTHER PUBLICATIONS

Market mature 1998 hybrid electric vehicles; Wyczalek, F.A.; Aerospace and Electronic Systems Magazine, IEEE; vol. 14, Issue 3, Mar. 1999 pp. 41-44; Digital Object Identifier 10.1109/62.750428.*

Derivation and Experimental Validation of a Power-Split Hybrid Electric Vehicle Model; Syed, F. U. et al.; Vehicular Technology, IEEE Transactions on; vol. 55, Issue 6, Nov. 2006 pp. 1731-1747; Digital Object Identifier 10.1109/TVT.2006.878563.*

Design of an Electric Differential System for Three-Wheeled Electric Welfare Vehicles With Driver-in-the-Loop Verification Bo-Chiuan Chen et al.; Vehicular Technology, IEEE Transactions on; vol. 56, Issue 4, Part 1, Jul. 2007 pp. 1498-1505; Digital Object Identifier 10.1109/TVT.2007.896975.*

Analysis of different control strategies and operating modes of compact high planetary transmission drive; Szumanowski, A. et al.; Vehicle Power and Propulsion, 2005 IEEE Conference Sep. 7-9, 2005 pp. 7 pp.; Digital Object Identifier 10.1109/VPPC.2005.1554631.*

A novel cobot and control; Yuhong Dong et al.; Intelligent Control and Automation, 2004. WCICA 2004. Fifth World Congress on vol. 5, Jun. 15-19, 2004 pp. 4635-4639 vol. 5.*

English Translation of Supplemental European Search Report, Appln. 04808093.1-2421, issued Sep. 10, 2007.

Supplementary Partial European Search Report, Appln. No. EP 04 80 8093 dated Jul. 19, 2007.

International Search Report, Appln. No. PCT/JP2004/019743, issued Jan. 27, 2006.

*Maintenance of Automatic Transmission of Benz 722.6*, Jul. 31, 2002, Mercedes Benz, DE.

Claudio Rossi, et al.: *Power Split e-CVT Ship Propulsion System*; Electric Ship Technologies Symposium, 2009, ESTS 2009, IEEE; Apr. 20-22, 2009, pp. 505-514; Digital Object Identifier 10.1109/ESTS.2009.4906559.

Manuele Bertoluzzo, et al.: *Role and Technology of the Power Split Apparatus in Hybrid Electric Vehicles*; Industrial Electronics Society, 2007, IECON 2007, $33^{rd}$ Annual Conference of the IEEE, Nov. 5-8, 2007, pp. 256-261, Digital Object Identifier 10.1109/IECON.2007.4460138.

Rui Xiaoming, et al.: *Fundamentals of a Power Splitting Driving Chain for Large Wind Turbines*; Intelligent Control and Automation, 2008. WCICA 2008. $7^{TH}$ World Congress on; Jun. 25-27, 2008, pp. 9347-9350, Digital Object Identifier 10.1109/WCICA.2008.4593909.

* cited by examiner

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | |
| 2nd | ◎ | ○ | | | | ○ | | 2.180 | 1.54 |
| 3rd | ◎ | ○ | | | ○ | | | 1.424 | 1.53 |
| 4th | ◎ | ○ | ○ | | | | | 1.000 | 1.42 |
| 5th | | ○ | ○ | ◎ | | | | 0.705 | 1.42 |
| R | | | ○ | | | | ○ | 3.209 | SPREAD 4.76 |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  | ○ |  | 2.804 | 1.54 |
| 2nd | ◎ | ○ |  |  | ○ |  |  | 1.531 | 1.53 |
| 3rd | ◎ | ○ | ○ |  |  |  |  | 1.000 | 1.42 |
| 4th |  | ○ | ○ | ◎ |  |  |  | 0.705 | SPREAD 3.977 |
| R |  |  | ○ |  |  | ○ |  | 2.393 | |
| N | ○ |  |  |  |  |  |  | | |

○ ENGAGED
◎ ENGAGED FOR STEP-VARIABLE SHIFTING, AND RELEASED FOR CONTINUOUSLY-VARIABLE SHIFTING

|  | C0 | C1 | C2 | C2 | B0 | B1 | B2 | SPEED RATIO | STEPPING RATIO |
|---|---|---|---|---|---|---|---|---|---|
| 1st |  | O |  |  |  |  | O | 3.763 | 1.531 |
| 2nd |  | O |  |  |  | O |  | 2.457 | 1.413 |
| 3rd |  | O |  | O |  |  |  | 1.739 | 1.398 |
| 4th |  | O | O |  |  |  |  | 1.244 | 1.244 |
| 5th | O |  | O |  |  |  |  | 1.000 | 1.234 |
| 6th |  |  | O | O |  |  |  | 0.811 | 1.256 |
| 7th |  |  | O |  |  | O |  | 0.645 | SPREAD |
| R |  |  |  | O |  |  | O | 3.162 | 5.832 |

O ENGAGED

| | C0 | C1 | C2 | C3 | B0 | B1 | B2 | SPEED RATIO |
|---|---|---|---|---|---|---|---|---|
| 1st | | ○ | | | | | ○ | |
| 2nd | | ○ | | | | ○ | | |
| 3rd | | ○ | | ○ | | | | |
| R | | | | ○ | | | ○ | 3.162 |

○ ENGAGED

|  | C1 | C2 | C3 | C4 | B0 | B1 | B2 | SPEED RATIO | STEPPING RATIO |
|---|---|---|---|---|---|---|---|---|---|
| 1st |  |  |  | O | (O) | O |  | 3.538 | 1.59 |
| 2nd |  | O |  |  | O | O |  | 2.226 | 1.26 |
| 3rd |  |  | O |  | (O) | O |  | 1.769 | 1.32 |
| 4th |  | O | O |  | O |  |  | 1.345 | 1.35 |
| 5th |  |  | O | O | (O) |  |  | 1.000 | 1.26 |
| 6th | O |  | O |  | O |  |  | 0.796 | 1.13 |
| 7th | O |  |  | O | O |  |  | 0.703 | 1.12 |
| 8th | O | O |  |  | O |  |  | 0.629 | SPREAD 5.624 |
| R |  |  |  | O |  |  | O | 2.300 | |
| N |  |  |  |  | O |  |  |  | |

O ENGAGED

|  | C1 | C2 | C3 | C4 | B0 | B1 | B2 |
|---|---|---|---|---|---|---|---|
| 1st |  | ◯ |  |  |  | ◯ |  |
| 2nd | ◯ | ◯ |  |  |  |  |  |
| R |  |  |  | ◯ |  |  | ◯ |
| N |  |  |  |  |  |  |  |

◯ ENGAGED

|  | C0 | C2 | B0 | B1 | B2 | B3 | SPEED RATIO | STEPPING RATIO |
|---|---|---|---|---|---|---|---|---|
| 1st | ◎ |  |  |  |  | ○ | 3.357 | 1.54 |
| 2nd | ◎ |  |  |  | ○ |  | 2.180 | 1.53 |
| 3rd | ◎ |  |  | ○ |  |  | 1.424 | 1.42 |
| 4th | ◎ | ○ |  |  |  |  | 1.000 | 1.42 |
| 5th |  | ○ | ◎ |  |  |  | 0.705 | SPREAD 4.76 |
| R1 |  |  |  |  |  | ○ | AS DESIRED | |
| R2 |  | ○ |  |  |  |  | AS DESIRED | |
| N |  |  |  |  |  |  |  | |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | |
| 2nd | ◎ | ○ | | | | ○ | | 2.180 | 1.54 |
| 3rd | ◎ | ○ | | | ○ | | | 1.424 | 1.53 |
| 4th | ◎ | ○ | ○ | | | | | 1.000 | 1.42 |
| 5th | | ○ | ○ | ◎ | | | | 0.705 | 1.42 |
| R | | | ○ | | | | ○ | 3.209 | SPREAD 4.76 |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

| | C0 | C2 | B0 | B1 | B2 | B3 | SPEED RATIO | STEPPING RATIO |
|---|---|---|---|---|---|---|---|---|
| 1st | ◎ | | | | | ○ | 3.357 | 1.54 |
| 2nd | ◎ | | | | ○ | | 2.180 | 1.53 |
| 3rd | ◎ | | | ○ | | | 1.424 | 1.42 |
| 4th | ◎ | ○ | | | | | 1.000 | 1.42 |
| 5th | | ○ | ◎ | | | | 0.705 | SPREAD 4.76 |
| R1 | | | | | | ○ | AS DESIRED | |
| R2 | | ○ | | | | | AS DESIRED | |
| N | | | | | | | | |

○ ENGAGED
◎ ENGAGED FOR STEP-VARIABLE SHIFTING, AND RELEASED FOR CONTINUOUSLY-VARIABLE SHIFTING

|  | C0 | C2 | B0 | B1 | B2 | SPEED RATIO | STEPPING RATIO |
|---|---|---|---|---|---|---|---|
| 1st | ◎ | | | | ○ | 2.804 | 1.54 |
| 2nd | ◎ | | | ○ | | 1.531 | 1.53 |
| 3rd | ◎ | ○ | | | | 1.000 | 1.42 |
| 4th | | ○ | ◎ | | | 0.705 | SPREAD 3.977 |
| R1 | | | | | ○ | AS DESIRED | |
| R2 | | ○ | | | | AS DESIRED | |
| N | | | | | | | |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

| | C0 | C2 | B0 | B1 | B2 | SPEED RATIO | STEPPING RATIO |
|---|---|---|---|---|---|---|---|
| 1st | ◎ | | | | ○ | 2.804 | 1.54 |
| 2nd | ◎ | | | ○ | | 1.531 | 1.53 |
| 3rd | ◎ | ○ | | | | 1.000 | 1.42 |
| 4th | | ○ | ◎ | | | 0.705 | SPREAD 3.977 |
| R1 | | | | | ○ | AS DESIRED | |
| R2 | | ○ | | | | AS DESIRED | |
| N | | | | | | | |

○ ENGAGED
◎ ENGAGED FOR STEP-VARIABLE SHIFTING, AND RELEASED FOR CONTINUOUSLY-VARIABLE SHIFTING

|  | C0 | C1 | C2 | C3 | B0 | B1 | B2 | SPEED RATIO | STEPPING RATIO |
|---|---|---|---|---|---|---|---|---|---|
| 1st | ◎ | ○ |  |  |  |  | ○ | 3.174 | 2.00 |
| 2nd | ◎ | ○ |  |  |  | ○ |  | 1.585 | 1.59 |
| 3rd | ◎ | ○ |  | ○ |  |  |  | 1.000 | 1.37 |
| 4th | ◎ |  |  | ○ | ○ |  |  | 0.731 | 1.30 |
| 5th |  |  |  | ○ | ◎ | ○ |  | 0.562 | SPREAD 5.64 |
| R |  |  | ○ |  |  |  | ○ | 2.717 |  |
| N |  |  |  |  |  |  | ○ |  |  |

○ ENGAGED
◎ ENGAGED FOR STEP-VARIABLE SHIFTING, AND RELEASED FOR CONTINUOUSLY-VARIABLE SHIFTING

FIG.90

|   | C0 | C1 | C3 | B0 | B1 | B2 | SPEED RATIO | STEPPING RATIO |
|---|---|---|---|---|---|---|---|---|
| 1st | ◎ | ○ |   |   |   | ○ | 3.174 | 2.00 |
| 2nd | ◎ | ○ |   |   | ○ |   | 1.585 | 1.59 |
| 3rd | ◎ | ○ | ○ |   |   |   | 1.000 | 1.37 |
| 4th | ◎ |   | ○ |   | ○ |   | 0.731 | 1.30 |
| 5th |   |   | ○ | ◎ | ○ |   | 0.562 | SPREAD 5.64 |
| R |   | ○ | ○ |   |   |   | CONTINUOUSLY VARIABLE | |
| N |   | ○ |   |   |   |   |   | |

○ ENGAGED
◎ ENGAGED FOR STEP-VARIABLE SHIFTING, AND RELEASED FOR CONTINUOUSLY-VARIABLE SHIFTING

|      | C0 | C1 | C2 | B0 | B1 | B2 | B3 | SPEED RATIO | STEPPING RATIO |
|------|----|----|----|----|----|----|----|-------------|----------------|
| 1st  | ◎  | ○  |    |    | ○  |    |    | 3.500       | 2.19           |
| 2nd  | ◎  |    | ○  |    | ○  |    |    | 1.600       | 1.60           |
| 3rd  | ◎  | ○  | ○  |    |    |    |    | 1.000       | 1.32           |
| 4th  | ◎  |    | ○  |    |    | ○  |    | 0.760       | 1.30           |
| 5th  |    |    | ○  | ◎  |    | ○  |    | 0.585       | SPREAD 5.987   |
| R    |    | ○  |    |    |    |    | ○  | 3.167       |                |
| N    |    | ○  |    |    |    |    |    |             |                |

○ ENGAGED
◎ ENGAGED FOR STEP-VARIABLE SHIFTING, AND RELEASED FOR CONTINUOUSLY-VARIABLE SHIFTING

VEHICULAR DRIVE SYSTEM

TECHNICAL FIELD

The present invention relates to a vehicular drive system arranged to transmit an output of an engine to drive wheels of a vehicle and including a control device, and more particularly to techniques for reducing a size of an electric motor or electric motors, techniques for switching of the drive system between an electrically established continuously-variable shifting state and a step-variable shifting state, and shifting control techniques for suitable controlling the speed ratio of a continuously-variable shifting portion and the speed ratio of a step-variable shifting portion.

BACKGROUND ART

As one example of a vehicular drive system arranged to transmit an output of an engine to drive wheels of a vehicle, there is known a drive system including a power distributing mechanism arranged to distribute the output of the engine to a first electric motor and an output shaft, and a second electric motor disposed between the output shaft of the power distributing mechanism and the drive wheels. Examples of this type of drive system include hybrid vehicle drive systems disclosed in Patent Documents 1, 6 and 8. In these hybrid vehicle drive systems, the power distributing mechanism is constituted, for example, by a planetary gear set which functions as a differential mechanism a differential action of which permits a major portion of a drive force of the engine to be mechanically transmitted to the drive wheels, and the rest of the drive force to be electrically transmitted from the first electric motor to the second electric motor, through an electric path therebetween, thereby making it possible to drive the vehicle with the engine kept in an optimum operating state with an improved fuel economy. Where a step-variable transmission is provided between a power transmitting member and the output shaft, a torque to be transmitted to the power transmitting member is boosted, making it possible to reduce the size of a drive power source including the electric motors.

[Patent Document 1] JP-2003-127681A
[Patent Document 2] JP-11-198670A
[Patent Document 3] JP-11-198668A
[Patent Document 4] JP-11-217025A
[Patent Document 5] JP-WO 03/016749A1
[Patent Document 6] JP-2003-130202A
[Patent Document 7] JP-2003-130203A
[Patent Document 8] JP-2000-2327A

DISCLOSURE OF INVENTION

Problems Solved by the Invention

Generally, a continuously variable transmission is known as a device for improving the fuel economy of a vehicle, while on the other hand a planetary gear type power transmitting device such as a step-variable transmission is known as a device having a high power transmission efficiency. In a conventional vehicular drive system including a transmission mechanism operable as an electrically controlled continuously variable transmission as described above, there is provided an electric path through which an electric energy is transmitted from the first electric motor to the second electric motor, that is, through which a portion of the vehicle drive force is transmitted as an electric energy. Where this vehicular drive system uses an engine an output of which is relatively high, the drive system requires the first electric motor to be large-sized, and further requires the second electric motor to be large-size since the second electric motor is driven by an electric energy supplied from the large-sized first electric motor, whereby the vehicular drive system as a whole is unfavorably large-sized. Alternatively, the conventional vehicular drive system, wherein a portion of the output of the engine is once converted into an electric energy and then transmitted to the drive wheels, has a risk of deterioration of the fuel economy in some running condition of the vehicle, for instance, during running of the vehicle at a relatively high speed. Similar problems are encountered in a transmission such as a continuously variable transmission so-called "electric CVT" wherein the speed ratio of the power distributing mechanism described above is electrically changed.

In the above-described vehicular drive system having the electric path for transmission of the electric energy from the first electric motor to the second electric motor, a portion of the vehicle drive force is once converted into the electric energy, that is, a portion of the output of the engine is once converted into the electric energy and then transmitted to the drive wheels, so that the power transmission efficiency of the present vehicular drive system is lower than that of a gear type power transmission such as a step-variable transmission. On the other hand, the gear type power transmission not having an electric path as described above is known as a device having a relatively high power transmission efficiency, but the drive system including the gear type power transmission cannot always be controlled to maximize the fuel economy of the engine, since the engine speed is kept at a value determined by the running speed of the vehicle. Thus, there is not available a power transmitting mechanism which permits a high fuel economy of the engine. For improving the fuel economy, it is considered to modify the conventional vehicular drive system such that the drive system is selectively operable in an electrically established continuously-variable shifting state, and in a step-variable shifting state in which the output of the engine is primarily transmitted to the drive wheels through a mechanical path, in the absence of the electric path, so as to minimize a loss of conversion of the engine output into an electric energy. In this case, the drive system is switchable between the continuously-variable and step-variable shifting states. However, it is not easy to assure adequate switching between the continuously-variable and step-variable shifting states, so as to enable the vehicle to run with a high fuel economy. In other words, inadequate switching may cause deterioration of the fuel economy.

Also known is a vehicular drive system including an electrically controlled continuously variable transmission and a step-variable transmission. This drive system has a large number of combinations of the speed ratio of the electrically controlled continuously variable transmission and the speed ratio of the step-variable transmission. In this respect, the drive system of this type has a room for improvement in connection with the control of the speed ratio of the electrically controlled continuously variable transmission. For example, the continuously variable transmission has a relatively high power transmission efficiency during acceleration of the vehicle with an output of the first electric motor driven in the forward direction and an output of the engine, but may suffer from a relatively low power transmission efficiency during steady running of the vehicle at a comparatively high speed, which requires the output shaft of the continuously variable transmission to be rotated at a comparatively high speed and therefore requires the first electric motor to be driven in the reverse direction.

The present invention was made in view of the background art described above. It is accordingly an object of the present invention to provide a vehicular drive system with a control device, which is small-sized or improved in its fuel economy. It is another object of the invention to provide a vehicular drive system selectively operable in an electrically established continuously-variable shifting state and a step-variable shifting state, together with a control device which permits adequate switching between the continuously-variable and step-variable shifting states, and a significant improvement in the fuel economy of the drive system. It is a further object of the present invention to provide a control device for a vehicular drive system, which permits adequate control of the speed ratios of the continuously variable transmission and the step-variable transmission of the drive system, so as to improve the fuel economy.

As a result of extensive studies in an effort to solve the problems indicated above, the inventors of the present invention obtained a finding that the first and second electric motors are not required to be large-sized when operated in a normal output state while the engine output is comparatively small, but are required to be large-sized so as to have a large capacity or output when operated in a relatively large output state such as a maximum output state while the engine output is relatively large as in a high-output running of the vehicle, and a finding that the vehicular drive system can be made compact with the small-sized first and second electric motors, by controlling the drive system such that the output of the engine is primarily transmitted to the drive wheels through a mechanical power transmitting path, when the output of the engine is relatively large. The inventors further obtained a finding that by controlling the drive system such that the output of the engine is primarily transmitted to the drive wheels through the mechanical power transmitting path, the fuel economy of the drive system can be further improved with a reduced amount of loss of conversion of the output of the engine into an electric energy, in the absence of an electric path through which a portion of the engine output during a high-speed running of the vehicle is once converted by the first electric motor into the electric energy and then transmitted from the second electric motor to the drive wheels. The present invention was made based on these findings.

Means for Solving the Problem

The object indicated above may be achieved according to a $1^{st}$ form of the invention, which provide a vehicular drive system including a power distributing mechanism operable to distribute an output of an engine to a first electric motor and a power transmitting member, and a second electric motor disposed between the power transmitting member and a drive wheel of a vehicle, characterized by comprising a differential-state switching device operable to place the power distributing mechanism selectively in (a) a differential state in which the power distributing mechanism is operable as an electrically controlled continuously variable transmission, and (b) a locked state in which the power distributing mechanism is not operable as the electrically controlled continuously variable transmission.

Advantages of the Invention

In the present drive system described above, the power distributing mechanism is controlled by the differential-state switching device, to be placed selectively in the differential state in which the power distributing mechanism is operable as an electrically controlled continuously variable transmission, and the locked state in which the power distributing mechanism is not operable as the electrically controlled continuously variable transmission. Therefore, the present drive system has not only an advantage of an improvement in the fuel economy owing to a function of a transmission whose speed ratio is electrically variable, but also an advantage of high power transmitting efficiency owing to a function of a gear type transmission capable of mechanically transmitting a vehicle drive force. Accordingly, when the engine is in a normal output state with a relatively low or medium output while the vehicle is running at a relatively low or medium running speed, the power distributing mechanism is placed in the differential state, assuring a high degree of fuel economy of the vehicle. When the vehicle is running at a relatively high speed, on the other hand, the power distributing mechanism is placed in the locked state in which the output of the engine is transmitted to the drive wheel primarily through a mechanical power transmitting path, so that the fuel economy is improved owing to reduction of a loss of conversion of a mechanical energy into an electric energy, which loss would take place when the drive system is operated as the transmission whose speed ratio is electrically variable. When the engine is in a high-output state, the power distributing mechanism is also placed in the locked state. Therefore, the power distributing mechanism is operated as the transmission whose speed ratio is electrically variable, only when the vehicle speed is relatively low or medium or when the engine output is relatively low or medium, so that the required amount of electric energy generated by the electric motor that is, the maximum amount of electric energy that must be transmitted from the electric motor can be reduced, making it possible to minimize the required sizes of the electric motor, and the required size of the drive system including the electric motor.

Other Forms of the Invention

The object indicated above may be achieved according to a $2^{nd}$ form of this invention according to the $1^{st}$ form, wherein the power distributing mechanism include a first element fixed to the engine, a second element fixed to the first electric motor, and a third element fixed to the power transmitting member, and the differential-state switching device is operable to permit the first, second and third elements to be rotated relative to each other, for thereby placing the power distributing mechanism in the differential state, and to connect at least two of the first, second and third elements to each other or to hold the second element stationary, for thereby placing the power distributing mechanism in the locked state. The present form of the invention assures a simple arrangement of the power distributing mechanism that can be selectively switched by the differential-state switching device between the differential state and the locked state.

The object indicated above may also be achieved according to a $3^{rd}$ form of this invention, which provides a vehicular drive system including a power distributing mechanism operable to distribute an output of an engine to a first electric motor and a power transmitting member, and a second electric motor disposed between the power transmitting member and a drive wheel of a vehicle, characterized by comprising a differential-state switching device operable to place the power distributing mechanism selectively in a differential state in which the power distributing mechanism is operable as an electrically controlled continuously variable transmission, and a fixed-speed-ratio shifting state in which the power distributing mechanism is operable as a transmission having a single speed ratio or a plurality of speed ratios.

In the present drive system described above, the power distributing mechanism is controlled by the differential-state switching device, to be placed selectively in the differential state in which the power distributing mechanism is operable as an electrically controlled continuously variable transmission, and the fixed-speed-ratio shifting state in which the power distributing mechanism is operable as a transmission having a single speed ratio or a plurality of speed ratios. Therefore, the present drive system has not only an advantage of an improvement in the fuel economy owing to a function of a transmission whose speed ratio is electrically variable, but also an advantage of high power transmitting efficiency owing to a function of a gear type transmission capable of mechanically transmitting a vehicle drive force. Accordingly, when the engine is in a normal output state with a relatively low or medium output while the vehicle is running at a relatively low or medium running speed, the power distributing mechanism is placed in the differential state, assuring a high degree of fuel economy of the vehicle. When the vehicle is running at a relatively high speed, on the other hand, the power distributing mechanism is placed in the fixed-speed-ratio shifting state in which the output of the engine is transmitted to the drive wheel primarily through a mechanical power transmitting path, so that the fuel economy is improved owing to reduction of a loss of conversion of a mechanical energy into an electric energy, which loss would take place when the drive system is operated as the transmission whose speed ratio is electrically variable. When the engine is in a high-output state, the power distributing mechanism is also placed in the fixed-speed-ratio shifting state. Therefore, the power distributing mechanism is operated as the transmission whose speed ratio is electrically variable, only when the vehicle speed is relatively low or medium or when the engine output is relatively low or medium, so that the required amount of electric energy generated by the electric motor that is, the maximum amount of electric energy that must be transmitted from the electric motor can be reduced, making it possible to minimize the required sizes of the electric motor, and the required size of the drive system including the electric motor.

In a $4^{th}$ form of the present invention according to the $3^{rd}$ form, wherein the power distributing mechanism include a first element fixed to the engine, a second element fixed to the first electric motor, and a third element fixed to the power transmitting member, and the differential-state switching device is operable to permit the first, second and third elements to be rotated relative to each other, for thereby placing the power distributing mechanism in the differential state, and to connect at least two of the first, second and third elements to each other or to hold the second element stationary, for thereby placing the power distributing mechanism in the fixed-speed-ratio shifting state. The present form of the invention assures a simple arrangement of the power distributing mechanism that can be selectively switched by the differential-state switching device between the differential state and the fixed-speed-ratio shifting state.

In a $5^{th}$ form of this invention according to the $2^{nd}$ form, the power distributing mechanism is a planetary gear set, and the first element is a carrier of the planetary gear set, and the second element is a sun gear of the planetary gear set, while the third element is a ring gear of the planetary gear set, the differential-state switching device including a clutch operable to connect selected two of the carrier, sun gear and ring gear to each other, and/or a brake operable to fix the sun gear to a stationary member. In the present form of the invention, the dimension of the power distributing mechanism in its axial direction can be reduced, and the power distributing mechanism is simply constituted by one planetary gear set, for example.

In a $6^{th}$ form of this invention according to the $5^{th}$ form, the planetary gear set is a planetary gear set of single-pinion type. In this form of the invention, the dimension of the power distributing mechanism in its axial direction can be reduced, and the power distributing mechanism is simply constituted by one planetary gear set of single-pinion type.

According to a $7^{th}$ form of this invention according to the $6^{th}$ form, the differential-state switching device is operable to connect the carrier and sun gear of the planetary gear set of single-pinion type, for enabling the planetary gear set to operate as a transmission having a speed ratio of 1, or to hold the sun gear stationary, for enabling the planetary gear set as a speed-increasing transmission having a speed ratio lower than 1. In this form of the invention, the power distributing mechanism is simply constituted by a planetary gear set of single-pinion type, as a transmission having a single fixed speed ratio or a plurality of fixed speed ratios.

In an $8^{th}$ form of this invention according to the $5^{th}$ form, the planetary gear set is a planetary gear set of double-pinion type. In this form of the invention, the dimension of the power distributing mechanism in its axial direction can be reduced, and the power distributing mechanism is simply constituted by one planetary gear set of double-pinion type.

In a $9^{th}$ form of this invention according to the $8^{th}$ form, the differential-state switching device is operable to connect the carrier and sun gear of the planetary gear set of double-pinion type, for enabling the planetary gear set to operate as a transmission having a speed ratio of 1, or to hold the sun gear stationary, for enabling the planetary gear set to operate as a speed-reducing transmission having a speed ratio higher than 1. In this form of the invention, the power distributing mechanism is simply constituted by a planetary gear set of double-pinion type, as a transmission having a single fixed speed ratio or a plurality of fixed speed ratios.

In a $10^{th}$ form of this invention according to the $1^{st}$ form, the drive system further comprises an automatic transmission disposed between the power transmitting member and the drive wheel, and a speed ratio of the drive system is determined by a speed ratio of the automatic transmission. In this form of the invention, the drive force is available over a wide range of speed ratio, by utilizing the speed ratio of the automatic transmission.

In an $11^{th}$ form of this invention according to the $1^{st}$ form, the drive system further comprises an automatic transmission disposed between the power transmitting member and the drive wheel, and an overall speed ratio of the drive system is determined by a speed ratio of the power distributing mechanism and a speed the of the automatic transmission. In this form of the invention, the drive force is available over a wide range of speed ratio, by utilizing the speed ratio of the automatic transmission, so that the efficiency of operation of the power distributing mechanism in its continuously-variable shifting state can be improved.

In a $12^{th}$ form of this invention according to the $10^{th}$ form, the automatic transmission is a step-variable automatic transmission. In this form of the invention, a continuously variable transmission the speed ratio of which is electrically variable is constituted by the step-variable automatic transmission and the power distributing mechanism placed in its differential state, while a step-variable transmission is constituted by the step-variable automatic transmission and the power distributing mechanism placed in its locked state or fixed-speed-ratio shifting state.

The drive system described above is preferably arranged such that the second electric motor is fixed to the power transmitting member. In this case, the required input torque of the automatic transmission can be made lower than the torque of its output shaft, making it possible to further reduce the required size of the second electric motor.

The drive system described above is preferably arranged such that the automatic transmission is a speed-reducing transmission having a speed ration higher than 1. In this case, the required input torque of the automatic transmission can be made lower than the torque of its output shaft, when the second electric motor is fixed to the power transmitting member, for example, making it possible to further reduce the required size of the second electric motor.

According to a $13^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set having three elements consisting of a sun gear, a carrier and a ring gear rotating speeds of which are indicated along respective straight lines in a collinear chart in which the three elements are arranged as a second element, a first element and a third element, respectively, in the order of description, in a direction from one of opposite ends of the collinear chart toward the other end, the first element being fixed to the engine, the second element being fixed to the first electric motor, while the third element being fixed to the power transmitting member, the power distributing mechanism further including a switching clutch operable to connect the second element to the first element, and/or a switching brake operable to fix the second element to a stationary member, the power distributing mechanism being placed in a differential state by releasing the switching clutch and/or the switching brake, and in a fixed-speed-ratio shifting state in which the power distributing mechanism has a fixed speed ratio, by engaging the switching clutch and/or the switching brake; and (b) the step-variable automatic transmission includes a second planetary gear set, a third planetary gear set and a fourth planetary gear set, and has five rotary elements each of which is constituted by at least one of sun gears, carriers and ring gears of the second, third and fourth planetary gear sets, rotating speeds of the five rotary elements being indicated along respective straight lines in a collinear chart in which the five rotary elements are arranged as a fourth element, a fifth element, a sixth element, a seventh element and an eighth element, respectively, in the order of description, in a direction from one of opposite ends of the collinear chart toward the other end, the fourth element being selectively connected through a second clutch to the power transmitting member and selectively fixed through a first brake to the stationary member, and the fifth element being selectively fixed through a second brake to the stationary member, while the sixth element being selectively fixed through a third brake to the stationary member, the seventh element being fixed to an output rotary member of the step-variable automatic transmission, the eighth element being selectively connected through a first clutch to the power transmitting member, the step-variable automatic transmission having a plurality of operating positions that are established by engaging actions of respective combinations of the first clutch, second clutch, first brake, second brake and third brake.

According to a $14^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set of single-pinion type having a first sun gear, a first carrier and a first ring gear, the first carrier being fixed to the engine, and the first sun gear being fixed to the first electric motor, while the first ring gear being fixed to the power transmitting member, the power distributing mechanism further including a switching clutch operable to connect the first carrier and the first sun gear to each other, and/or a switching brake operable to fix the first sun gear to a stationary member; and (b) the step-variable automatic transmission includes a second planetary gear set of single-pinion type, a third planetary gear set of single-pinion type and a fourth planetary gear set of single-pinion type, the second planetary gear set having a second sun gear, a second carrier and a second ring gear, and the third planetary gear set having a third sun gear, a third carrier and a third ring gear, while the fourth planetary gear set having a fourth sun gear, a fourth carrier and a fourth ring gear, the second sun gear and the third sun gear being selectively connected through a second clutch to the power transmitting member and selectively fixed through a first brake to the stationary member, and the second carrier being selectively fixed through a second brake to the stationary member, while the fourth ring gear being selectively fixed through a third brake to the stationary member, and wherein the second ring gear, the third carrier and the fourth carrier are fixed to an output rotary member of the step-variable automatic transmission, and the third ring gear and the fourth sun gear are selectively connected through a first clutch to the power transmitting member.

According to a $15^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set having three elements consisting of a sun gear, a carrier and a ring gear rotating speeds of which are indicated along respective straight lines in a collinear chart in which the three elements are arranged as a second element, a first element and a third element, respectively, in the order of description, in a direction from one of opposite ends of the collinear chart toward the other end, the first element being fixed to the engine, the second element being fixed to the first electric motor, while the third element being fixed to the power transmitting member, the power distributing mechanism further including a switching clutch operable to connect the second element to the first element, and/or a switching brake operable to fix the second element to a stationary member, the power distributing mechanism being placed in a differential state by releasing the switching clutch and/or the switching brake, and in a fixed-speed-ratio shifting state in which the power distributing mechanism has a fixed speed ratio, by engaging the switching clutch and/or the switching brake; and (b) the step-variable automatic transmission includes a second planetary gear set and a third planetary gear set, and has four rotary elements each of which is constituted by at least one of sun gears, carriers and ring gears of the second and third planetary gear sets, rotating speeds of the fourth rotary elements being indicated along respective straight lines in a collinear chart in which the four rotary elements are arranged as a fourth element, a fifth element, a sixth element and a seventh element, respectively, in the order of description, in a direction from one of opposite ends of the collinear chart toward the other end, the fourth element being selectively connected through a second clutch to the power transmitting member and selectively fixed through a first brake to the stationary member, and the fifth element being selectively fixed through a second brake to the stationary member, while the sixth element being fixed to an output rotary member of the step-variable automatic transmission, the seventh element being selectively connected through a first clutch to the power transmitting member, the step-variable automatic transmission having a plurality of operating positions that are established by engaging actions of respective combinations of the first clutch, second clutch, first brake and second brake.

According to a $16^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (b) the power distributing mechanism includes a first planetary gear set of single-pinion type having a first sun gear, a first carrier and a first ring gear, the first carrier being fixed to the engine, and the first sun gear being fixed to the first electric motor, while the first ring gear being fixed to the power transmitting member, the power distributing mechanism further including a switching clutch operable to connect the first carrier and the first sun gear to each other, and/or a switching brake operable to fix the first sun gear to a stationary member; and (b) the step-variable automatic transmission includes a second planetary gear set of single-pinion type and a third planetary gear set of single-pinion type, the second planetary gear set having a second sun gear, a second carrier and a second ring gear, and the third planetary gear set having a third sun gear, a third carrier and a third ring gear, the second sun gear and the third sun gear being selectively connected through a second clutch to the power transmitting member and selectively fixed through a first brake to the stationary member, and the third carrier being selectively fixed through a second brake to the stationary member, while the second carrier and the third ring gear being fixed to an output rotary element of the step-variable automatic transmission, the second ring gear being selectively connected through a first clutch to the power transmitting member.

According to a $17^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set having three elements consisting of a sun gear, a carrier and a ring gear rotating speeds of which are indicated along respective straight lines in a collinear chart in which the three elements are arranged as a second element, a first element and a third element, respectively, in the order of description, in a direction from one of opposite ends of the collinear chart toward the other end, the first element being fixed to the engine, the second element being fixed to the first electric motor, while the third element being fixed to the power transmitting member, the power distributing mechanism further including a switching clutch operable to connect the second element to the first element, and/or a switching brake operable to fix the second element to a stationary member, the power distributing mechanism being placed in a differential state by releasing the switching clutch and/or the switching brake, and in a fixed-speed-ratio shifting state in which the power distributing mechanism has a fixed speed ratio, by engaging the switching clutch and/or the switching brake; and (b) the step-variable automatic transmission includes a second planetary gear set and a third planetary gear set, and has four rotary elements each of which is constituted by at least one of sun gears, carriers and ring gears of the second and third planetary gear sets, rotating speeds of the fourth rotary elements being indicated along respective straight lines in a collinear chart in which the four rotary elements are arranged as a fourth element, a fifth element, a sixth element and a seventh element, respectively, in the order of description, in a direction from one of opposite ends of the collinear chart toward the other end, the fourth element being selectively connected through a second clutch to the power transmitting member and selectively connected through a fourth brake to the engine, and the fifth element being selectively connected through a third clutch to the engine and selectively fixed through a second brake to the stationary member, while the sixth element being fixed to an output rotary member of the step-variable automatic transmission, the seventh element being selectively connected through a first clutch to the power transmitting member and selectively fixed through a first brake to the stationary member, the step-variable automatic transmission having a plurality of operating positions that are established by engaging actions of respective combinations of the first clutch, second clutch, third clutch and fourth clutch, first brake and second brake.

According to an $18^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set of single-pinion type having a first sun gear, a first carrier and a first ring gear, the first carrier being fixed to the engine, and the first sun gear being fixed to the first electric motor, while the first ring gear being fixed to the power transmitting member, the power distributing mechanism further including a switching clutch operable to connect the first carrier and the first sun gear to each other, and/or a switching brake operable to fix the first sun gear to a stationary member; and (b) the step-variable automatic transmission includes a second planetary gear set of double-pinion type and a third planetary gear set of single-pinion type, the second planetary gear set having a second sun gear, a second carrier and a second ring gear, and the third planetary gear set having a third sun gear, a third carrier and a third ring gear, the third sun gear being selectively connected through a second clutch to the power transmitting member and selectively connected through a fourth clutch to the engine, the second carrier and the third carrier being selectively connected through a third clutch to the engine and selectively fixed through a second brake to the stationary member, while the second ring gear and the third ring gear being fixed to an output rotary element of the step-variable automatic transmission, the second sun gear being selectively connected through a first clutch to the power transmitting member and selectively fixed through a first brake to the stationary member.

According to a $19^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set having three elements consisting of a sun gear, a carrier and a ring gear rotating speeds of which are indicated along respective straight lines in a collinear chart in which the three elements are arranged as a second element, a third element and a first element, respectively, in the order of description, in a direction from one of opposite ends of the collinear chart toward the other end, the first element being fixed to the engine, the second element being fixed to the first electric motor, while the third element being fixed to the power transmitting member, the power distributing mechanism further including a switching clutch operable to connect the second element to the first element, and/or a switching brake operable to fix the second element to a stationary member, the power distributing mechanism being placed in a differential state by releasing the switching clutch and/or the switching brake, and in a fixed-speed-ratio shifting state in which the power distributing mechanism has a fixed speed ratio, by engaging the switching clutch and/or the switching brake; and (b) the step-variable automatic transmission includes a second planetary gear set and a third planetary gear set, and has four rotary elements each of which is constituted by at least one of sun gears, carriers and ring gears of the second and third planetary gear sets, rotating speeds of the fourth rotary elements being indicated along respective straight lines in a collinear chart in which the four rotary elements are arranged as a fourth element, a fifth element, a sixth element and a seventh element, respectively, in the order of description, in a direction from one of opposite ends of the collinear chart toward the other end, the fourth element being selectively connected through a third clutch to the power transmitting member and selectively fixed through a first brake to the stationary member, and the fifth element being selectively connected through a second clutch to the engine and selectively fixed through a second brake to the stationary member, while the sixth element being fixed to an output rotary member of the step-variable automatic transmission, the seventh element being selectively connected through a first clutch to the power transmitting member, the step-variable automatic transmission having a plurality of operating positions that are established by engaging actions of respective combinations of the first clutch, second clutch, third clutch, first brake and second brake.

According to a $20^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set of double-pinion type having a first sun gear, a first carrier and a first ring gear, the first carrier being fixed to the engine, and the first sun gear being fixed to the first electric motor, while the first ring gear being fixed to the power transmitting member, the power distributing mechanism further including a switching clutch operable to connect the first carrier and the first sun gear to each other, and/or a switching brake operable to fix the first sun gear to a stationary member; and (b) the step-variable automatic transmission includes a second planetary gear set of single-pinion type and a third planetary gear set of double-pinion type, the second planetary gear set having a second sun gear, a second carrier and a second ring gear, and the third planetary gear set having a third sun gear, a third carrier and a third ring gear, the second sun gear being selectively connected through a third clutch to the power transmitting member and selectively fixed through a first brake to the stationary member, the second carrier and the third carrier being selectively connected through a second clutch to the engine and selectively fixed through a second brake to the stationary member, while the second ring gear and the third ring gear being fixed to an output rotary element of the step-variable automatic transmission, the third sun gear being selectively connected through a first clutch to the power transmitting member.

According to a $21^{st}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set having three elements consisting of a sun gear, a carrier and a ring gear rotating speeds of which are indicated along respective straight lines in a collinear chart in which the three elements are arranged as a second element, a first element and a third element, respectively, in the order of description, in a direction from one of opposite ends of the collinear chart toward the other end, the first element being fixed to the engine, the second element being fixed to the first electric motor, while the third element being fixed to the power transmitting member, the power distributing mechanism further including a switching clutch operable to connect the second element to the first element, and/or a switching brake operable to fix the second element to a stationary member, the power distributing mechanism being placed in a differential state by releasing the switching clutch and/or the switching brake, and in a fixed-speed-ratio shifting state in which the power distributing mechanism has a fixed speed ratio, by engaging the switching clutch and/or the switching brake; and (b) the step-variable automatic transmission includes a second planetary gear set, a third planetary gear set and a fourth planetary gear set, and has five rotary elements each of which is constituted by at least one of sun gears, carriers and ring gears of the second, third and fourth planetary gear sets, rotating speeds of the five rotary elements being indicated along respective straight lines in a collinear chart in which the five rotary elements are arranged as a fourth element, a fifth element, a sixth element, a seventh element and an eighth element, respectively, in the order of description, in a direction from one of opposite ends of the collinear chart toward the other end, the fourth element being selectively connected through a second clutch to the power transmitting member and selectively fixed through a first brake to the stationary member, and the fifth element being selectively fixed through a second brake to the stationary member, while the sixth element being selectively fixed through a third brake to the stationary member, the seventh element being fixed to an output rotary member of the step-variable automatic transmission, the eighth element being fixed to the power transmitting member, the step-variable automatic transmission having a plurality of operating positions that are established by engaging actions of respective combinations of the second clutch, first brake, second brake and third brake.

According to a $22^{nd}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set of single-pinion type having a first sun gear, a first carrier and a first ring gear, the first carrier being fixed to the engine, and the first sun gear being fixed to the first electric motor, while the first ring gear being fixed to the power transmitting member, the power distributing mechanism further including a switching clutch operable to connect the first carrier and the first sun gear to each other, and/or a switching brake operable to fix the first sun gear to a stationary member; and (b) the step-variable automatic transmission includes a second planetary gear set of single-pinion type, a third planetary gear set of single-pinion type and a fourth planetary gear set of single-pinion type, the second planetary gear set having a second sun gear, a second carrier and a second ring gear, and the third planetary gear set having a third sun gear, a third carrier and a third ring gear, while the fourth planetary gear set having a fourth sun gear, a fourth carrier and a fourth ring gear, the second sun gear and the third sun gear being selectively connected through a second clutch to the power transmitting member and selectively fixed through a first brake to the stationary member, and the second carrier being selectively fixed through a second brake to the stationary member, while the fourth ring gear being selectively fixed through a third brake to the stationary member, and wherein the second ring gear, the third carrier and the fourth carrier are fixed to an output rotary member of the step-variable automatic transmission, and the third ring gear and the fourth sun gear are fixed to the power transmitting member.

According to a 23$^{rd}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set having three elements consisting of a sun gear, a carrier and a ring gear rotating speeds of which are indicated along respective straight lines in a collinear chart in which the three elements are arranged as a second element, a first element and a third element, respectively, in the order of description, in a direction from one of opposite ends of the collinear chart toward the other end, the first element being fixed to the engine, the second element being fixed to the first electric motor, while the third element being fixed to the power transmitting member, the power distributing mechanism further including a switching clutch operable to connect the second element to the first element, and/or a switching brake operable to fix the second element to a stationary member, the power distributing mechanism being placed in a differential state by releasing the switching clutch and/or the switching brake, and in a fixed-speed-ratio shifting state in which the power distributing mechanism has a fixed speed ratio, by engaging the switching clutch and/or the switching brake; and (b) the step-variable automatic transmission includes a second planetary gear set and a third planetary gear set, and has four rotary elements each of which is constituted by at least one of sun gears, carriers and ring gears of the second and third planetary gear sets, rotating speeds of the four rotary elements being indicated along respective straight lines in a collinear chart in which the four rotary elements are arranged as a fourth element, a fifth element, a sixth element and a seventh element, respectively, in the order of description, in a direction from one of opposite ends of the collinear chart toward the other end, the fourth element being selectively connected through a second clutch to the power transmitting member and selectively fixed through a first brake to the stationary member, and the fifth element being selectively fixed through a second brake to the stationary member, while the sixth element being fixed to an output rotary member of the step-variable automatic transmission, the seventh element being fixed to the power transmitting member, the step-variable automatic transmission having a plurality of operating positions that are established by engaging actions of respective combinations of the second clutch, first brake and second brake.

According to a 24$^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set of single-pinion type having a first sun gear, a first carrier and a first ring gear, the first carrier being fixed to the engine, and the first sun gear being fixed to the first electric motor, while the first ring gear being fixed to the power transmitting member, the power distributing mechanism further including a switching clutch operable to connect the first carrier and the first sun gear to each other, and/or a switching brake operable to fix the first sun gear to a stationary member; and (b) the step-variable automatic transmission includes a second planetary gear set of single-pinion type and a third planetary gear set of single-pinion type, and the second planetary gear set having a second sun gear, a second carrier and a second ring gear, the third planetary gear set having a third sun gear, a third carrier and a third ring gear, the second sun gear and the third sun gear being selectively connected through a second clutch to the power transmitting member and selectively fixed through a first brake to the stationary member, the third carrier being selectively fixed through a second brake to the stationary member, while the second carrier and the third ring gear being fixed to an output rotary element of the step-variable automatic transmission, the second ring gear being fixed to the power transmitting member.

In a 25$^{th}$ form of this invention according to the 10$^{th}$ form, the power distributing mechanism is disposed on a first axis, and the automatic transmission is disposed on a second axis parallel to the first axis, the power transmitting member being constituted by a pair of members which are disposed on the first and second axes, respectively, the power distributing mechanism and the automatic transmission being connected to each other through the power transmitting member, so as to transit a drive force therebetween. In this form of the invention, the dimension of the drive system in the axial direction can be made smaller than that of the drive system wherein the power distributing mechanism and the automatic transmission are coaxially disposed on the same axis. Accordingly, the present drive system can be suitably used on a transversal FF or RR vehicle such that the first and second axes are parallel to the transverse or width direction of the vehicle. In this respect, it is noted that the maximum axial dimension of a drive system for such a transverse FF or RR vehicle is generally limited by the width dimension of the vehicle.

In a 26$^{th}$ form of this invention according to the 25$^{th}$ form, the second electric motor is disposed on the first axis. In this case, the dimension of the second axis of the drive system in the axial direction can be reduced.

In a 27th form of this invention according to the 25th form, the second electric motor is disposed on the second axis. In this case, the dimension of the first axis of the drive system in the axial direction can be reduced.

In a 28th form of this invention according to the 25th form, the power transmitting member is located on one side of the power distributing mechanism which is remote from the engine. In other words, the power distributing member is located between the engine and the power transmitting member. In this case, the dimension of the first axis of the drive system in the axial direction can be reduced.

In a 29th form of this invention according to the 25th form, the automatic transmission includes a differential drive gear as an output rotary member thereof, and this differential drive gear is located at one end of the automatic transmission which is remote from the power transmitting member. In other words, the automatic transmission is located between the power transmitting member and the differential drive gear. In this case, the dimension of the second axis of the drive system in the axial direction can be reduced.

In a 30th form of this invention according to the 21st form, a direction of an output rotary motion of the power distributing mechanism to be transmitted to the automatic transmission is reversed with respect to that of an input rotary motion of the power distributing mechanism, and the drive system has a rear-drive position established by engaging the third brake. In this form of the invention, the direction of the rotary motion of the power transmitting member to be transmitted to the automatic transmission in the rear-drive position of the drive system is reversed with respect to that in the forward-drive positions of the drive system. Accordingly, the automatic transmission is not required to be provided with coupling devices or gear devices for reversing the direction of rotation of the output rotary member with respect to that of the input rotary motion as received by the automatic transmission, for establishing the rear-drive position for the rotary motion of the output rotary member in the direction opposite to that in the forward-drive positions. Thus, the rear-drive position can be established in the absence of the first clutch in the automatic transmission, for example. Further, in the rear-drive position, the speed of the output rotary motion of the automatic transmission is made lower than that of the input rotary motion received from the power distributing mechanism the speed ratio of which is continuously variable in the engaged state of the third brake. Accordingly, the rear-drive position has a desired speed ratio, which may be higher than that of the first-gear position, for example.

In a 31st form of this invention according to the 23rd form, a direction of an output rotary motion of the power distributing mechanism to be transmitted to the automatic transmission is reversed with respect to that of an input rotary motion of the power distributing mechanism, and the drive system has a rear-drive position established by engaging the second brake. In this form of the invention, the direction of the rotary motion of the power transmitting member to be transmitted to the automatic transmission in the rear-drive position is reversed with respect to that in the forward-drive positions. Accordingly, the automatic transmission is not required to be provided with coupling devices or gear devices for reversing the direction of rotation of the output rotary member with respect to that of the input rotary motion as received by the automatic transmission, for establishing the rear-drive position for the rotary motion of the output rotary member in the direction opposite to that in the forward-drive positions. Thus, the rear-drive position can be established in the absence of the first clutch in the automatic transmission, for example. Further, in the rear-drive position, the speed of the output rotary motion of the automatic transmission is made lower than that of the input rotary motion received from the power distributing mechanism the speed ratio of which is continuously variable in the engaged state of the second brake. Accordingly, the rear-drive position has a desired speed ratio, which may be higher than that of the first-gear position, for example.

In a 32nd form of this invention according to the 21st form, a direction of an output rotary motion of the power distributing mechanism to be transmitted to the automatic transmission is reversed with respect to that of an input rotary motion of the power distributing mechanism, and the drive system has a rear-drive position established by engaging the second clutch. In this form of the invention, the direction of the rotary motion of the power transmitting member to be transmitted to the automatic transmission in the rear-drive position is reversed with respect to that in the forward-drive positions. Accordingly, the automatic transmission is not required to be provided with coupling devices or gear devices for reversing the direction of rotation of the output rotary member with respect to that of the input rotary motion as received by the automatic transmission, for establishing the rear-drive position for the rotary motion of the output rotary member in the direction opposite to that in the forward-drive positions. Thus, the rear-drive position can be established in the absence of the first clutch in the automatic transmission, for example. Further, in the rear-drive position, the speed of the output rotary motion of the automatic transmission is made equal to that of the input rotary motion received from the power distributing mechanism the speed ratio of which is continuously variable in the engaged state of the second clutch. Accordingly, the rear-drive position has a desired speed ratio, which may be higher than that of the first-gear position, for example.

According to a 33rd form of this invention, there is provided a method of controlling a vehicular drive system including a power distributing mechanism operable to distribute an output of an engine to a first electric motor and a power transmitting member, and a second electric motor disposed between the power transmitting member and a drive wheel of a vehicle, characterized by comprising (a) placing the power distributing mechanism selectively, on the basis of a condition of the vehicle, in a differential state in which the power distributing mechanism is operable as an electrically controlled continuously variable transmission, and a locked state in which the power distributing mechanism is not operable as the electrically controlled continuously variable transmission.

In the present method described above, the power distributing mechanism is controlled to be placed selectively, on the basis of the condition of the vehicle, in the differential state in which the power distributing mechanism is operable as an electrically controlled continuously variable transmission, and the locked state in which the power distributing mechanism is not operable. as the electrically controlled continuously variable transmission. Therefore, the drive system has not only an advantage of an improvement in the fuel economy owing to a function of a transmission whose speed ratio is electrically variable, but also an advantage of high power transmitting efficiency owing to a function of a gear type transmission capable of mechanically transmitting a vehicle drive force. Accordingly, when the vehicle condition as represented by a running speed and an engine torque is normal, for example, when the engine is in a normal output state with a relatively low or medium engine output while the vehicle is running at a relatively low or medium running speed, the power distributing mechanism is placed in the differential state, assuring a high degree of fuel economy of the vehicle.

When the vehicle is running at a relatively high speed, on the other hand, the power distributing mechanism is placed in the locked state in which the output of the engine is transmitted to the drive wheel primarily through a mechanical power transmitting path, so that the fuel economy is improved owing to reduction of a loss of conversion of a mechanical energy into an electric energy, which loss would take place when the drive system is operated as the transmission whose speed ratio is electrically variable. When the engine is in a high-output state, the power distributing mechanism is also placed in the locked state. Therefore, the power distributing mechanism is operated as the transmission whose speed ratio is electrically variable, only when the vehicle speed is relatively low or medium or when the engine output is relatively low or medium, so that the required amount of electric energy generated by the electric motor that is, the maximum amount of electric energy that must be transmitted from the electric motor can be reduced, making it possible to minimize the required sizes of the electric motor, and the required size of the drive system including the electric motor.

According to a $34^{th}$ form of this invention, there is provided a method controlling a vehicular drive system including a power distributing mechanism operable to distribute an output of an engine to a first electric motor and a power transmitting member, and a second electric motor disposed between the power transmitting member and a drive wheel of a vehicle, characterized by comprising (a) placing the power distributing mechanism selectively, on the basis of a condition of the vehicle, in a differential state in which the power distributing mechanism is operable as an electrically controlled continuously variable transmission, and a fixed-speed-ratio shifting state in which the power distributing mechanism is operable as a transmission having a single speed ratio or a plurality of speed ratios.

In the present method described above, the power distributing mechanism is controlled to be placed selectively, on the basis of the condition of the vehicle, in the differential state in which the power distributing mechanism is operable as an electrically controlled continuously variable transmission, and the fixed-speed-ratio shifting state in which the power distributing mechanism is operable as a transmission having a single speed ratio or a plurality of speed ratios. Therefore, the drive system has not only an advantage of an improvement in the fuel economy owing to a function of a transmission whose speed ratio is electrically variable, but also an advantage of high power transmitting efficiency owing to a function of a gear type transmission capable of mechanically transmitting a vehicle drive force. Accordingly, when the vehicle condition as represented by a running speed and an engine torque is normal, for example, when the engine is in a normal output state with a relatively low or medium engine output while the vehicle is running at a relatively low or medium running speed, the power distributing mechanism is placed in the differential state, assuring a high degree of fuel economy of the vehicle. When the vehicle is running at a relatively high speed, on the other hand, the power distributing mechanism is placed in the locked state in which the output of the engine is transmitted to the drive wheel primarily through a mechanical power transmitting path, so that the fuel economy is improved owing to reduction of a loss of conversion of a mechanical energy into an electric energy, which loss would take place when the drive system is operated as the transmission whose speed ratio is electrically variable. When the engine is in a high-output state, the power distributing mechanism is also placed in the locked state. Therefore, the power distributing mechanism is operated as the transmission whose speed ratio is electrically variable, only when the vehicle speed is relatively low or medium or when the engine output is relatively low or medium, so that the required amount of electric energy generated by the electric motor that is, the maximum amount of electric energy that must be transmitted from the electric motor can be reduced, making it possible to minimize the required sizes of the electric motor, and the required size of the drive system including the electric motor.

In a $35^{th}$ form of this invention according to the $33^{rd}$ or $34^{th}$ form, the drive system further includes an automatic transmission disposed between the power transmitting member and the drive wheel, and an overall speed ratio of the drive system is determined by a speed ratio of the power distributing mechanism and a speed ratio of the automatic transmission, and wherein the overall speed ratio is controlled by controlling the speed ratio of the power distributing mechanism and the speed ratio of the automatic transmission, on the basis of the condition of the vehicle. In this form of the invention, the vehicle drive force can be obtained over a wide rage of the speed ratio, by utilizing the speed ratio of the automatic transmission, so that the efficiency of the continuously variable shifting control of the power distributing mechanism can be further improved. In addition, the vehicle drive force can be adjusted so as to meet the vehicle condition.

In a $36^{th}$ form of this invention according to the $33^{rd}$ form, the condition of the vehicle is represented by a value relating to a drive force of the vehicle. In this case, the overall speed ratio of the drive system is controlled by taking account of the fuel economy, and the vehicle drive force can be suitably adjusted.

In a $37^{th}$ form of this invention according to the $33^{rd}$ form, the condition of the vehicle is represented by a running speed of the vehicle. In this case, the overall speed ratio of the drive system is controlled by taking account of the fuel economy, and the vehicle drive force can be suitably adjusted.

According to a $38^{th}$ form of this invention, there is provided a vehicular drive system including a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that: (a) the power distributing mechanism includes a first planetary gear set having three elements consisting of a sun gear, a carrier and a ring gear rotating speeds of which are indicated along respective straight lines in a collinear chart in which the three elements are arranged as a second element, a first element and a third element, respectively, in the order of description, in a direction from one of opposite ends of the collinear chart toward the other end, the first element being fixed to the engine, the second element being fixed to the first electric motor, while the third element being fixed to the power transmitting member, the power distributing mechanism further including a switching clutch operable to connect the second element to the first element, and/or a switching brake operable to fix the second element to a stationary member, the power distributing mechanism being placed in a differential state by releasing the switching clutch and/or the switching brake, and in a fixed-speed-ratio shifting state in which the power distributing mechanism has a fixed speed ratio, by engaging the switching clutch and/or the switching brake; and (b) a direction of a rotary motion of the power transmitting member to be transmitted to the automatic transmission in a rear-drive position of the drive system is reversed by the power distributing mechanism, with respect to that in forward-drive positions of the drive system.

In this form of the invention, the direction of the rotary motion of the power transmitting member to be transmitted to the automatic transmission in the rear-drive position of the drive system is reversed with respect to that in the forward-drive positions of the drive system. Accordingly, the automatic transmission is not required to be provided with coupling devices or gear devices for reversing the direction of rotation of the output rotary member with respect to that of the input rotary motion as received by the automatic transmission, for establishing the rear-drive position for the rotary motion of the output rotary member in the direction opposite to that in the forward-drive positions.

In a $39^{th}$ form of this invention according to the $38^{th}$ form, the step-variable automatic transmission includes a planetary gear set having a sun gear, a carrier and a ring gear which mesh with each other and constitute at least three rotary elements rotating speeds of which are indicated along respective straight lines in a collinear chart in which the five rotary elements are arranged as a fourth element, a fifth element and a sixth element, respectively, in the order of description, in a direction from one of opposite ends of the collinear chart toward the other end, the fourth element being fixed to the power transmitting member such that a drive force can be transmitted to the power transmitting member, and the fifth element being fixed to an output rotary element of the automatic transmission such that the drive force can be transmitted to the output rotary element, while the sixth element is selectively fixed through a brake to a stationary member, and wherein a rear-drive position of the drive system is established by engaging the brake. In this form of the invention, the rotary motion of the fourth element, which is one of the mutually meshing fourth, fifth and sixth elements, is transmitted as an output of the power distributing mechanism operating in the continuously-variable shifting state, to the automatic transmission, namely, as the input rotary motion of the automatic transmission, and the sixth element is held stationary, so that the rotating speed of the fifth element is reduced with respect to the rotating speed of the fourth element, that is, with respect to the speed of the input rotary motion of the automatic transmission. Thus, the speed of the output rotary motion of the automatic transmission is reduced with respect to the speed of the input rotary motion of the automatic transmission, so that the speed ratio of the rear-drive position can be set as desired. For instance, the speed ratio of the rear-drive position may be higher than that of a first-gear position.

In a $40^{th}$ form of this invention according to the $38^{th}$ form, the step-variable automatic transmission includes a planetary gear set having a sun gear, a carrier and a ring gear which mesh with each other and constitute at least three rotary elements, the fourth element being fixed to the power transmitting member such that a drive force can be transmitted to the power transmitting member, and the fifth element being fixed to an output rotary element of the automatic transmission such that the drive force can be transmitted to the output rotary element, and wherein the automatic transmission further includes a clutch operable to rotate the rotary elements as a unit, and a rear-drive position of the drive system is established by engaging the clutch. In this form of the invention, the rotary elements of the automatic transmission are rotated as a unit by engagement of the clutch, so that the output of the power distributing mechanism is transmitted to the automatic transmission, namely, as an input rotary motion of the automatic transmission, such that the speed of the output rotary motion of the automatic transmission is equal to that of the input rotary motion. Accordingly, the speed ratio of the rear-drive position can be set as desired. For instance, the speed ratio of the rear-drive position may be higher than that of a first-gear position.

The object indicated above may also be achieved according to a $41^{st}$ form of this invention, which provides a control device for a vehicular drive system arranged to transmit an output of an engine to a drive wheel of a vehicle, characterized by comprising: (a) a transmission mechanism of switchable type switchable between a continuously-variable shifting state in which the transmission mechanism is operable as an electrically controlled continuously variable transmission, and a step-variable shifting state in which the transmission mechanism is operable as a step-variable transmission; and (b) switching control means for placing the transmission mechanism of switchable type selectively in one of the continuously-variable shifting state and the step-variable shifting state, on the basis of a predetermined condition of the vehicle.

According to the present control device described above, the transmission mechanism of switchable type, which is switchable between the continuously-variable shifting state in which the transmission mechanism is operable as the electrically controlled continuously variable transmission and the step-variable shifting state in which the transmission mechanism is operable as the step-variable transmission, is switched by the switching control means, so as to be selectively placed in the continuously-variable shifting state and the step-variable shifting state, on the basis of the predetermined condition of the vehicle. Therefore, the present control device permits the drive system to have not only an advantage of an improvement in the fuel economy owing to a function of a transmission whose speed ratio is electrically variable, but also an advantage of high power transmitting efficiency owing to a function of a gear type transmission capable of mechanically transmitting a vehicle drive force. Accordingly, when the vehicle is in a low- or medium-speed running state, or in a low- or medium-output running state, for example, the transmission mechanism of switchable type is placed in the continuously-variable shifting state, assuring a high degree of fuel economy of the vehicle. When the vehicle is in a high-speed running state, on the other hand, the transmission mechanism is placed in the step-variable shifting state in which the transmission mechanism is operable as the step-variable transmission and the output of the engine is transmitted to the drive wheel primarily through a mechanical power transmitting path, so that the fuel economy is improved owing to reduction of a loss of conversion of a mechanical energy into an electric energy, which loss would take place when the transmission mechanism is operated as the electrically controlled continuously variable transmission. When the vehicle is in a high-output running state, the transmission mechanism is also placed in the step-variable shifting state. Therefore, the transmission mechanism is operated as the electrically controlled continuously variable transmission, only when the vehicle is in the low- or medium-speed running state or low- or medium-output running state, so that the required amount of electric energy generated by the electric motor that is, the maximum amount of electric energy that must be transmitted from the electric motor can be reduced, making it possible to minimize the required sizes of the electric motor, and the required size of the drive system including the electric motor.

In a $42^{nd}$ form of this invention according to the $41^{st}$ form, the transmission mechanism of switchable type includes a power distributing mechanism having a first element fixed to the engine, a second element fixed to a first electric motor, and a third element fixed to a power transmitting member, and the power distributing mechanism includes a differential-state switching device operable to place the transmission mechanism of switchable type selectively in the continuously-variable shifting state and the step-variable shifting state, the switching control means being operable to control the differential-state switching device, so as to place the transmission mechanism selectively in the continuously-variable shifting state and the step-variable shifting state. In this case, the differential-state switching device is controlled by the switching control means, for easy switching of the transmission mechanism of switchable type of the vehicular drive system between the continuously-variable shifting state in which the transmission mechanism is operable as the continuously variable transmission, and the step-variable shifting state in which the transmission mechanism is operable as the step-variable transmission.

In a $43^{rd}$ form of this invention according to the $41^{st}$ form, the differential-state switching device is operable not only to place the transmission mechanism of switchable type selectively in the continuously-variable shifting state and the step-variable shifting state, and but also to place the transmission mechanism placed in the step-variable shifting state, in one of a plurality of operating positions thereof, the switching control means being operable to control the differential-state switching device on the basis of the predetermined condition of the vehicle, to place the transmission mechanism in one of the plurality of operating positions after the transmission mechanism is switched from the continuously-variable shifting state to the step-variable shifting state. In this form of the invention, the differential-state switching device is controlled by the switching control means, to switch the transmission mechanism of switchable type of the vehicular drive system from the continuously-variable shifting state in which the transmission mechanism is operable as the continuously variable transmission, to the step-variable shifting state in which the transmission mechanism is operable as the step-variable transmission. While the transmission mechanism is placed in its step-variable shifting state, the differential-state switching device is further controlled by the switching control means, to place the transmission mechanism in one of its plurality of operating positions, on the basis of the predetermined condition of the vehicle. When the vehicle is in a low- or medium-speed running state or in a low- or medium-output running state, for example, the transmission mechanism of switchable type is placed in the continuously-variable shifting state, assuring a high degree of fuel economy of the vehicle. When the vehicle is in a high-speed running state, on the other hand, the transmission mechanism is placed in the step-variable shifting state in which the transmission mechanism is operable as the step-variable transmission suitable for the high-speed running of the vehicle, so that the output of the engine is transmitted to the drive wheel primarily through a mechanical power transmitting path, whereby the fuel economy is improved owing to reduction of a loss of conversion of a mechanical energy into an electric energy, which loss would take place when the transmission mechanism is operated as the electrically controlled continuously variable transmission. When the vehicle is in a high-output running state, the transmission mechanism is also placed in the step-variable shifting state. Therefore, the transmission mechanism is operated as the electrically controlled continuously variable transmission, only when the vehicle is in the low- or medium-speed running state or low- or medium-output running state, so that the required amount of electric energy generated by the electric motor that is, the maximum amount of electric energy that must be transmitted from the electric motor can be reduced, making it possible to minimize the required sizes of the electric motor, and the required size of the drive system including the electric motor. Thus, the switching control means permits a change from the continuously-variable shifting state to the step-variable shifting state, and controls the differential-state switching device such that the transmission mechanism placed in the step-variable shifting state is place in one of the plurality of operating positions, on the predetermined condition of the vehicle, assuring an adequate control of the step-variable shifting of the transmission mechanism depending upon the specific running condition of the vehicle, such as the high-speed and high-output running states of the vehicle.

In a $44^{th}$ form of this invention according to the $41^{st}$ form, the predetermined condition of the vehicle includes a predetermined upper limit of a running speed of the vehicle, and the switching control means is operable to place the transmission mechanism of switchable type in the step-variable shifting state, when an actual value of the running speed of the vehicle has exceeded the predetermined upper limit. In this form of the invention, when the actual running speed of the vehicle has exceeded the predetermined upper limit, the output of the engine is transmitted to the drive wheel primarily through a mechanical power transmitting path, so that the fuel economy is improved owing to reduction of a loss of conversion of a mechanical energy into an electric energy, which loss would take place when the transmission mechanism is operated as the electrically controlled continuously variable transmission. The predetermined upper limit of the running speed is determined for determining whether the vehicle is in a high-speed running state.

In a $45^{th}$ form of this invention according to the $41^{st}$ form, the predetermined condition of the vehicle includes a predetermined upper limit of a running speed of the vehicle, and the switching control means is operable to inhibit the transmission mechanism of switchable type from being placed in the continuously-variable shifting state, when an actual value of the running speed of the vehicle has exceeded the predetermined upper limit. In this form of the invention, when a drive-force-related value of the vehicle has exceeded the upper limit, the transmission mechanism is inhibited from being placed in the continuously-variable shifting state, and the output of the engine is transmitted to the drive wheel primarily through a mechanical power transmitting path, so that the fuel economy is improved owing to reduction of a loss of conversion of a mechanical energy into an electric energy, which loss would take place when the transmission mechanism is operated as the electrically controlled continuously variable transmission.

In a $46^{th}$ form of this invention according to the $41^{st}$ form, the predetermined condition of the vehicle includes a predetermined upper limit of an output of the vehicle, and the switching control means is operable to place the transmission mechanism of switchable type in the step-variable shifting state when a drive-force-related value of the vehicle has exceeded the upper limit. In this form of the invention, when the drive-force-related value such as a required vehicle drive force or an actual value of the vehicle drive force has exceeded the predetermined upper limit, which is comparatively high, the output of the engine is transmitted to the drive wheel primarily through a mechanical power transmitting path, so that the maximum amount of an electric energy that must be generated when the transmission mechanism is operated as the electrically controlled continuously variable transmission can be reduced, making it possible to reduce the required size of the electric motor, and the overall size of the vehicular drive system including the electric motor. The drive-force-related value indicated above may be any parameter directly or indirectly relating to a drive force of the vehicle, such as an output torque of the engine, an output torque of a transmission, a drive torque of the drive wheel, or a torque in any other portion of the power transmitting path, or an angle of opening of a throttle valve which represents a required value of the torque in such portion of the power transmitting path. The predetermined upper limit of the vehicle output is determined for determining whether the vehicle is in a high-output running state.

In a $47^{th}$ form of this invention according to the $41^{st}$ form, the predetermined condition of the vehicle includes a predetermined upper limit of an output of the vehicle, and the switching control means is operable to inhibit the transmission mechanism of switchable type from being placed in the continuously-variable shifting state, when a drive-force-related value of the vehicle has exceeded the upper limit. In this form of the invention, when the drive-force-related value such as a required vehicle drive force or an actual value of the vehicle drive force has exceeded the predetermined upper limit, which is comparatively high, the transmission mechanism of switchable type is inhibited from being placed in the continuously-variable shifting state, and the output of the engine is transmitted to the drive wheel primarily through a mechanical power transmitting path, so that the maximum amount of an electric energy that must be generated when the transmission mechanism is operated as the electrically controlled continuously variable transmission can be reduced, making it possible to reduce the required size of the electric motor, and the overall size of the vehicular drive system including the electric motor.

In a $48^{th}$ form of this invention according to the $44^{th}$ form, the predetermined condition of the vehicle is represented by a stored switching boundary line map including an upper vehicle-speed limit line and an upper output limit line that respectively represent the upper limit of the running speed and an upper limit of a drive-force-related value of the vehicle, with which actual values of the running speed and the drive-force-related value are compared. The stored switching boundary line map permits easy determination as to whether the vehicle is in the high-speed running state or in the high-torque running state.

In a $49^{th}$ form of this invention according to the $41^{st}$ form, the predetermined condition of the vehicle includes a predetermined diagnosing condition for determining whether control components operable to place the transmission mechanism of switchable type in the continuously-variable shifting state have a deteriorated function, and the switching control means is operable to place the transmission mechanism in the step-variable shifting state, when the predetermined diagnosing condition is satisfied. In this form of the invention, the transmission mechanism of switchable type is necessarily placed in the step-variable shifting state if the diagnosing condition is satisfied, even where the transmission mechanism should be otherwise placed in the continuously-variable shifting state. Thus, the vehicle can be run with the transmission mechanism placed in the step-variable shifting state, even in the event of the functional deterioration.

In a $50^{th}$ form of this invention according to the $41^{st}$ form, the predetermined condition of the vehicle includes the predetermined diagnosing condition, and the switching control means is operable to inhibit the transmission mechanism of switchable type from being placed in the continuously-variable shifting state, when the predetermined diagnosing condition is satisfied. In this form of the invention, when the control components operable to place the transmission mechanism in the continuously-variable shifting state have a deteriorated function, the transmission mechanism is inhibited from being placed in the continuously-variable shifting state, and is necessarily placed in the step-variable shifting state, so that the vehicle can be run in the step-variable shifting state, even in the event of the functional deterioration.

In a $51^{st}$ form of this invention according to the $42^{nd}$ form wherein the power distributing mechanism includes the first element fixed to the engine, the second element fixed to the first electric motor and the third element fixed to the power distributing member, the differential-state switching device includes a coupling device such as a frictional coupling device, which is operable to connect selected two of the first through third elements to each other, and/or fix the second element to a stationary member, and the switching control means places the transmission mechanism in the continuously-variable shifting state by releasing the engaging device to permit the first, second and third elements to be rotatable relative to each other, and places the transmission mechanism in the step-variable shifting state by engaging the coupling device to connect at least two of the first, second and third elements to each other or fix the second element to the stationary member. In this form of the invention, the power distributing mechanism can be made simple in construction, and the transmission mechanism can be easily controlled by the switching control means, so as to be selectively placed in the continuously-variable shifting state and the step-variable shifting state.

In a $52^{d}$ form of this invention according to the $51^{st}$ form, the predetermined condition of the vehicle includes a predetermined upper limit of a running speed of the vehicle, and the switching control means is operable to control the coupling device, so as to fix the second element to the stationary member when an actual value of the running speed of the vehicle has exceeded the predetermined upper limit. In this form of the invention, when the actual running speed of the vehicle has exceeded the predetermined upper limit, the output of the engine is transmitted to the drive wheel primarily through a mechanical power transmitting path, so that the fuel economy is improved owing to reduction of a loss of conversion of a mechanical energy into an electric energy, which loss would take place when the transmission mechanism is operated as the electrically controlled continuously variable transmission.

In a $53^{rd}$ form of this invention according to the $51^{st}$ form, the predetermined condition of the vehicle includes a predetermined upper limit of an output of the vehicle, and the switching control means is operable to control the coupling device, so as to connect at least two of the first, second and third elements to each other, when the drive-force-related value of the vehicle has exceeded the upper limit. In this form of the invention, when the drive-force-related value such as a required vehicle drive force or an actual value of the vehicle drive force has exceeded the predetermined upper limit, which is comparatively high, the at least two of the three elements of the power distributing mechanism are connected to each other, and the output of the engine is transmitted to the drive wheel primarily through a mechanical power transmitting path, so that the maximum amount of an electric energy that must be generated when the transmission mechanism is operated as the electrically controlled continuously variable transmission can be reduced, making it possible to reduce the required size of the electric motor, and the overall size of the vehicular drive system including the electric motor.

In a $54^{th}$ form of this invention according to the $51^{st}$ form, the power distributing mechanism is a planetary gear set, and the first element is a carrier of the planetary gear set, and the second element is a sun gear of the planetary gear set, while the third element is a ring gear of the planetary gear set, the differential-state switching device including a clutch operable to connect selected two of the carrier, sun gear and ring gear to each other, and/or a brake operable to fix the sun gear to the stationary member. In this form of the invention, the dimension of the power distributing mechanism in its axial direction can be reduced, and the power distributing mechanism is simply constituted by one planetary gear set.

In a $55^{th}$ form of this invention according to the $54^{th}$ form, the planetary gear set is a planetary gear set of single-pinion type. In this form of the invention, the dimension of the power distributing mechanism in its axial direction can be reduced, and the power distributing mechanism is simply constituted by one planetary gear set of single-pinion type.

In a $56^{th}$ form of this invention according to the $55^{th}$ form, the switching control means is operable to control the coupling device, so as to connect the carrier and sun gear of the planetary gear set of single-pinion type, for enabling the planetary gear set to operate as a transmission having a speed ratio of 1, or to hold the sun gear stationary, for enabling the planetary gear set as a speed-increasing transmission having a speed ratio lower than 1. In this form of the invention, the power distributing mechanism can be easily controlled, as a transmission which is constituted by a planetary gear set of single-pinion type and which has a single fixed speed ratio or a plurality of fixed speed ratios.

In a $57^{th}$ form of this invention according to the $54^{th}$ form, the planetary gear set is a planetary gear set of double-pinion type. In this form of the invention, the dimension of the power distributing mechanism in its axial direction can be reduced, and the power distributing mechanism is simply constituted by one planetary gear set of double-pinion type.

In a $58^{th}$ form of this invention according to the 57 form, the differential-state switching device is operable to control the coupling device, so as to connect the carrier and sun gear of the planetary gear set of double-pinion type, for enabling the planetary gear set to operate as a transmission having a speed ratio of 1, or to hold the sun gear stationary, for enabling the planetary gear set to operate as a speed-reducing transmission having a speed ratio higher than 1. In this form of the invention, the power distributing mechanism is simply controlled, as a transmission which is constituted by a planetary gear set of double-pinion type and which has a single fixed speed ratio or a plurality of fixed speed ratios.

In a $59^{th}$ form of this invention according to the $42^{nd}$ form, the transmission mechanism of switchable type further comprises an automatic transmission disposed between the power transmitting member and the drive wheel and connected in series to the power distributing mechanism, and a speed ratio of the transmission mechanism of switchable type is determined by a speed ratio of the automatic transmission. In this form of the invention, the drive force is available over a wide range of speed ratio, by utilizing the speed ratio of the automatic transmission.

In a $60^{th}$ form of this invention according to the $59^{th}$ form, an overall speed ratio of the transmission mechanism of switchable type is determined by a speed ratio of the power distributing mechanism and a speed ratio of the automatic transmission. In this form of the invention, the drive force is available over a wide range of speed ratio, by utilizing the speed ratio of the automatic transmission, so that the efficiency of operation of the power distributing mechanism in its continuously-variable shifting state can be improved. Preferably, the automatic transmission is a step-variable automatic transmission. In this preferred form of the transmission mechanism, a continuously variable transmission is constituted by the step-variable automatic transmission and the power distributing mechanism placed in its continuously-variable shifting state, while a step-variable transmission is constituted by the step-variable automatic transmission and the power distributing mechanism placed in its step-variable shifting state.

In a $61^{st}$ form of this invention according to the $59^{th}$ form, the automatic transmission is a step-variable transmission, and the step-variable transmission is shifted according to a stored shifting boundary line map. In this case, the shifting operation of the step-variable transmission can be easily performed.

In a $62^{nd}$ form of this invention according to the $41^{st}$ form, the switching control means places the transmission mechanism in the continuously-variable shifting state when the vehicle is in a predetermined running state, and does not place the transmission mechanism in the continuously-variable shifting state when the vehicle is in the other running state. In this form of the invention, the transmission mechanism is placed in the electrically established continuously-variable shifting state, when the vehicle is in the predetermined running state suitable for running of the vehicle with the transmission mechanism operating in the continuously-variable shifting state, so that the fuel economy of the vehicle is improved.

Preferably, the transmission mechanism of switchable type is arranged such that a second electric motor is connected in series to the power transmitting member. In this case, the required input torque of the automatic transmission can be made lower than the torque of its output shaft, making it possible to reduce the required size of the second electric motor.

The object indicated above may be achieved according to a $63^{rd}$ form of the present invention, which provides a control device for a vehicular drive system arranged to transmit outputs of a plurality of drive power sources to a drive wheel of a vehicle, characterized by comprising: (a) a differential gear device of switchable type disposed in a power transmitting path between the plurality of drive power sources and the drive wheel and switchable between a locked state and a non-locked state; and (b) switching control means for placing the differential gear device of switchable type selectively in one of the locked state and the non-locked state, on the basis of a predetermined condition of the vehicle. In this form of the invention, the differential gear device of switchable type is switched by the switching control means, so as to be selectively placed in the locked state and the non-locked state, on the basis of the predetermined condition of the vehicle. Therefore, the present control device permits the drive system to have not only an advantage of high power transmitting efficiency owing to running of the vehicle with one of the drive power sources in the locked state of the differential gear device, but also an advantage of an improvement in the fuel economy owing to running of the vehicle with another drive power source in the non-locked state of the differential gear device. Thus, the present control device assures a high degree of fuel economy of the vehicle. When the vehicle is in a high-output running state, the differential gear device of switchable type is placed in the locked state. Namely, the differential gear device is placed in the non-locked state only when the vehicle is in the low- or medium-speed running state or low- or medium-output running state. Where an electric motor is used as the drive power source in the non-locked state, the maximum amount of electric energy that must be transmitted from the electric motor can be reduced, making it possible to minimize the required sizes of the electric motor, and the required size of the drive system including the electric motor.

Preferably, the differential gear device of switchable type includes a first electric motor, a power distributing mechanism operable to distribute an output of the engine to the first electric motor and a power transmitting member, and a second electric motor disposed between the power transmitting member and the drive wheel. Preferably, the power distributing mechanism includes a first element fixed to the engine, a second element fixed to the first electric motor, and a third element fixed to the second electric motor and the power distributing mechanism. The power distributing mechanism includes a differential-state switching device operable to place the differential gear device of switchable type selectively in the non-locked state in which the differential gear device is operable as an electrically controlled differential device and in the locked state in which the differential gear device is not operable as the electrically controlled differential device. The switching control means indicated above is operable to control the differential-state switching device, so as to place the differential gear device selectively in the non-locked and locked state. In this case, the differential-state switching device is controlled by the switching control means, to permit easy switching of the differential gear device between the non-locked state in which the differential gear device is operable as the electrically controlled differential device, and the locked state in which the differential gear device is operable as the electrically controlled differential device.

Preferably, the differential-state switching device is operable not only to place the differential gear device of switchable type selectively in the non-locked state and the locked state, and but also to place the differential gear device placed in the locked state, in one of a plurality of operating positions thereof, the switching control means being operable to control the differential-state switching device on the basis of the predetermined condition of the vehicle, to place the differential gear device in one of the plurality of operating positions after the differential gear device is switched from the non-locked state to the locked state. In this form of the invention, the differential-state switching device is controlled by the switching control means, to switch the differential gear device of switchable type of the vehicular drive system from the non-locked state in which the differential gear device is operable as the electrically controlled differential device, to the locked state. While the differential gear device is placed in the locked state, the differential-state switching device is further controlled by the switching control means, to place the differential gear device in one of its plurality of operating positions, on the basis of the predetermined condition of the vehicle. When the vehicle is in a low- or medium-speed running state or in a low- or medium-output running state, for example, the differential gear device of switchable type is placed in the non-locked state; assuring a high degree of fuel economy of the vehicle. When the vehicle is in a high-speed running state, on the other hand, the differential gear device is placed in the locked state, so that the output of the engine is transmitted to the drive wheel primarily through a mechanical power transmitting path, whereby the fuel economy is improved owing to reduction of a loss of conversion of a mechanical energy into an electric energy, which loss would take place when the differential gear device is operated as the electrically controlled differential device. When the vehicle is in a high-output running state, the differential gear device is also placed in the locked state. Therefore, the differential gear device is operated as the electrically controlled differential device, only when the vehicle is in the low- or medium-speed running state or low- or medium-output running state, so that the maximum amount of electric energy that must be transmitted from the electric motor can be reduced, making it possible to minimize the required sizes of the electric motor, and the required size of the drive system including the electric motor. Thus, the switching control means permits a change from the non-locked state to the locked state, and controls the differential-state switching device such that the differential gear device placed in the locked state is placed in one of the plurality of operating positions, on the predetermined condition of the vehicle, assuring an adequate control of the step-variable shifting of the differential gear device depending upon the specific running condition of the vehicle, such as the high-speed and high-output running states of the vehicle.

Preferably, the predetermined condition of the vehicle includes a predetermined upper limit of a running speed of the vehicle, and the switching control means is operable to place the differential gear device of switchable type in the locked state, when an actual value of the running speed of the vehicle has exceeded the predetermined upper limit. In this case, when the actual running speed of the vehicle has exceeded the predetermined upper limit, the output of the engine is transmitted to the drive wheel primarily through a mechanical power transmitting path, so that the fuel economy is improved owing to reduction of a loss of conversion of a mechanical energy into an electric energy, which loss would take place when the differential gear device is operated as the electrically controlled differential device. The predetermined upper limit of the running speed is determined for determining whether the vehicle is in a high-speed running state.

Preferably, the predetermined condition of the vehicle includes a predetermined upper limit of a running speed of the vehicle, and the switching control means is operable to inhibit the differential gear device of switchable type from being placed in the non-locked state, when an actual value of the running speed of the vehicle has exceeded the predetermined upper limit. In this case, when a drive-force-related value of the vehicle has exceeded the upper limit, the differential gear device is inhibited from being placed in the non-locked state, and the output of the engine is transmitted to the drive wheel primarily through a mechanical power transmitting path, so that the fuel economy is improved owing to reduction of a loss of conversion of a mechanical energy into an electric energy, which loss would take place when the differential gear device is operated as the electrically controlled differential device.

Preferably, the predetermined condition of the vehicle includes a predetermined upper limit of an output of the vehicle, and the switching control means is operable to place the differential gear device of switchable type in the locked state when a drive-force-related value of the vehicle has exceeded the upper limit. In this case, when the drive-force-related value such as a required vehicle drive force or an actual value of the vehicle drive force has exceeded the predetermined upper limit, which is comparatively high, the output of the engine is transmitted to the drive wheel primarily through a mechanical power transmitting path, so that the maximum amount of an electric energy that must be generated when the differential gear device is operated as the electrically controlled differential device can be reduced, making it possible to reduce the required size of the electric motor, and the overall size of the vehicular drive system including the electric motor. The drive-force-related value indicated above may be any parameter directly or indirectly relating to a drive force of the vehicle, such as an output torque of the engine, an output torque of a transmission, a drive torque of the drive wheel, or a torque in any other portion of the power transmitting path, or an angle of opening of a throttle valve which represents a required value of the torque in such portion of the power transmitting path. The predetermined upper limit of the vehicle output is determined for determining whether the vehicle is in a high-output running state.

Preferably, the predetermined condition of the vehicle includes a predetermined upper limit of an output of the vehicle, and the switching control means is operable to inhibit the differential gear device of switchable type from being placed in the non-locked state, when a drive-force-related value of the vehicle has exceeded the upper limit. In this case, when the drive-force-related value such as a required vehicle drive force or an actual value of the vehicle drive force has exceeded the predetermined upper limit, which is comparatively high, the differential gear device of switchable type is inhibited from being placed in the non-locked state, and the output of the engine is transmitted to the drive wheel primarily through a mechanical power transmitting path, so that the maximum amount of an electric energy that must be generated when the differential gear device is operated as the electrically controlled differential device can be reduced, making it possible to reduce the required size of the electric motor, and the overall size of the vehicular drive system including the electric motor.

Preferably, the predetermined condition of the vehicle is represented by a stored switching boundary line map including an upper vehicle-speed limit line and an upper output limit line that respectively represent the upper limit of the running speed and an upper limit of a drive-force-related value of the vehicle, with which actual values of the running speed and the drive-force-related value are compared. The stored switching boundary line map permits easy determination as to whether the vehicle is in the high-speed running state or in the high-torque running state.

Preferably, the predetermined condition of the vehicle includes a predetermined diagnosing condition for determining whether control components operable to place the differential gear device of switchable type in the non-locked state have a deteriorated function, and the switching control means is operable to place the differential gear device in the locked state, when the predetermined diagnosing condition is satisfied. In this case, the differential gear device of switchable type is necessarily placed in the locked state if the diagnosing condition is satisfied, even where the differential gear device should be otherwise placed in the non-locked state. Thus, the vehicle can be run with the differential gear device placed in the locked state, even in the event of the functional deterioration.

Preferably, the predetermined condition of the vehicle includes the predetermined diagnosing condition, and the switching control means is operable to inhibit the differential gear device of switchable type from being placed in the non-locked state, when the predetermined diagnosing condition is satisfied. In this form of the invention, when the control components operable to place the differential gear device in the non-locked state have a deteriorated function, the differential gear device is inhibited from being placed in the non-locked state, and is necessarily placed in the locked state, so that the vehicle can be run in the step-variable shifting state, even in the event of the functional deterioration.

Where the power distributing mechanism includes the first element fixed to the engine, the second element fixed to the first electric motor and the third element fixed to the power distributing member, it is preferable that the differential-state switching device includes a coupling device such as a frictional coupling device, which is operable to connect selected two of the first through third elements to each other, and/or fix the second element to a stationary member, and that the switching control means places the differential gear device in the non-locked state by releasing the engaging device to permit the first, second and third elements to be rotatable relative to each other, and places the differential gear device in the locked state by engaging the coupling device to connect at least two of the first, second and third elements to each other or fix the second element to the stationary member. In this case, the power distributing mechanism can be made simple in construction, and the differential gear device can be easily controlled by the switching control means, so as to be selectively placed in the non-locked state and the locked state.

Preferably, the predetermined condition of the vehicle includes a predetermined upper limit of a running speed of the vehicle, and the switching control means is operable to control the coupling device, so as to fix the second element to the stationary member when an actual value of the running speed of the vehicle has exceeded the predetermined upper limit. In this case, when the actual running speed of the vehicle has exceeded the predetermined upper limit, the output of the engine is transmitted to the drive wheel primarily through a mechanical power transmitting path, so that the fuel economy is improved owing to reduction of a loss of conversion of a mechanical energy into an electric energy, which loss would take place when the differential gear device is operated as the electrically controlled differential device.

Preferably, the predetermined condition of the vehicle includes a predetermined upper limit of an output of the vehicle, and the switching control means is operable to control the coupling device, so as to connect at least two of the first, second and third elements to each other, when the drive-force-related value of the vehicle has exceeded the upper limit. In this case, when the drive-force-related value such as a required vehicle drive force or an actual value of the vehicle drive force has exceeded the predetermined upper limit, which is comparatively high, the at least two of the three elements of the power distributing mechanism are connected to each other, and the output of the engine is transmitted to the drive wheel primarily through a mechanical power transmitting path, so that the maximum amount of an electric energy that must be generated when the differential gear device is operated as the electrically controlled differential device can be reduced, making it possible to reduce the required size of the electric motor, and the overall size of the vehicular drive system including the electric motor.

Preferably, the power distributing mechanism is a planetary gear set, and the first element is a carrier of the planetary gear set, and the second element is a sun gear of the planetary gear set, while the third element is a ring gear of the planetary gear set, and the differential-state switching device includes a clutch operable to connect selected two of the carrier, sun gear and ring gear to each other, and/or a brake operable to fix the sun gear to the stationary member. In this case, the dimension of the power distributing mechanism in its axial direction can be reduced, and the power distributing mechanism is simply constituted by one planetary gear set.

Preferably, the planetary gear set is a planetary gear set of single-pinion type. In this case, the dimension of the power distributing mechanism in its axial direction can be reduced, and the power distributing mechanism is simply constituted by one planetary gear set of single-pinion type.

Preferably, the switching control means is operable to control the coupling device, so as to connect the carrier and sun gear of the planetary gear set of single-pinion type, for enabling the planetary gear set to operate as a transmission having a speed ratio of 1, or to hold the sun gear stationary, for enabling the planetary gear set as a speed-increasing transmission having a speed ratio lower than 1. In this case, the power distributing mechanism can be easily controlled, as a transmission which is constituted by a planetary gear set of single-pinion type and which has a single fixed speed ratio or a plurality of fixed speed ratios.

Preferably, the planetary gear set is a planetary gear set of double-pinion type. In this case, the dimension of the power distributing mechanism in its axial direction can be reduced, and the power distributing mechanism is simply constituted by one planetary gear set of double-pinion type.

Preferably, the differential-state switching device is operable to control the coupling device, so as to connect the carrier and sun gear of the planetary gear set of double-pinion type, for enabling the planetary gear set to operate as a transmission having a speed ratio of 1, or to hold the sun gear stationary, for enabling the planetary gear set to operate as a speed-reducing transmission having a speed ratio higher than 1. In this case, the power distributing mechanism is simply controlled, as a transmission which is constituted by a planetary gear set of double-pinion type and which has a single fixed speed ratio or a plurality of fixed speed ratios.

Preferably, the differential gear device of switchable type further comprises an automatic transmission disposed between the power transmitting member and the drive wheel and connected in series to the power distributing mechanism, and a speed ratio of the differential gear device of switchable type is determined by a speed ratio of the automatic transmission. In this case, the drive force is available over a wide range of speed ratio, by utilizing the speed ratio of the automatic transmission.

Preferably, an overall speed ratio of the differential gear device of switchable type is determined by a speed ratio of the power distributing mechanism and a speed ratio of the automatic transmission. In this case, the drive force is available over a wide range of speed ratio, by utilizing the speed ratio of the automatic transmission, so that the efficiency of operation of the power distributing mechanism in its non-locked state can be improved. Preferably, the automatic transmission is a step-variable automatic transmission. In this case, a continuously variable transmission is constituted by the step-variable automatic transmission and the power distributing mechanism placed in its non-locked state, while a step-variable transmission is constituted by the step-variable automatic transmission and the power distributing mechanism placed in its locked state.

Preferably, the automatic transmission is a step-variable transmission, and the step-variable transmission is shifted according to a stored shifting boundary line map. In this case, the shifting operation of the step-variable transmission can be easily performed.

In a $64^{th}$ form of this invention according to the $63^{rd}$ form, the switching control means places the differential gear device in the non-locked state when the vehicle is in a predetermined running state, and does not place the differential gear device in the non-locked state when the vehicle is in the other running state.

Preferably, the differential device of switchable type includes a second electric connected in series to the power transmitting member. In this case, the required input torque of the automatic transmission can be made lower than the torque of its output shaft, making it possible to reduce the required size of the second electric motor.

The object indicated above may be achieved according to a $64^{th}$ form of this invention, which provides a control device for a vehicular drive system arranged to transmit an output of an engine to a drive wheel of a vehicle, characterized by comprising: (a) a transmission mechanism of switchable type switchable between a continuously-variable shifting state in which the transmission mechanism is operable as an electrically controlled continuously variable transmission, and a fixed-speed-ratio shifting state; and (b) switching control means for placing the transmission mechanism of switchable type selectively in one of the continuously-variable shifting state and the fixed-speed-ratio shifting state, on the basis of a running speed of the vehicle, and a load of the vehicle or an output torque of the vehicular drive system, and according to a predetermined relationship.

The control device described above, which includes the above-described transmission mechanism of switchable type and the above-described switching control means, is suitable to effect a shifting control of the transmission mechanism operable as the electrically controlled continuously variable transmission.

The object indicated above may be achieved according to a $66^{th}$ form of this invention, which provides a control device for a vehicular drive system arranged to transmit an output of an engine to a drive wheel of a vehicle, characterized by comprising: (a) a transmission mechanism of switchable type switchable between a continuously-variable shifting state in which the transmission mechanism is operable as an electrically controlled continuously variable transmission, and a step-variable shifting state in which the transmission mechanism is operable as a step-variable transmission; and (b) switching control means for placing the transmission mechanism of switchable type selectively in one of the continuously-variable shifting state and the step-variable shifting state, on the basis of a running speed of the vehicle, and a load of the vehicle or an output torque of the vehicular drive system, and according to a predetermined relationship.

The control device described above, which includes the above-described transmission mechanism of switchable type and the above-described switching control means, is suitable to effect a shifting control of the transmission mechanism operable as the electrically controlled continuously variable transmission.

The object indicated above may be achieved according to a $67^{th}$ form of this invention, which provides a control device for a vehicular drive system arranged to transmit an output of an engine to a drive wheel of a vehicle, characterized by comprising: (a) a transmission mechanism of switchable type switchable between a continuously-variable shifting state in which the transmission mechanism is operable as an electrically controlled continuously variable transmission, and a fixed-speed-ratio shifting state; (b) a control map which defines, with control parameters consisting of a running speed of the vehicle and a load of the vehicle or an output torque of the vehicular drive system, a first region in which the transmission mechanism of switchable type is placed in the continuously-variable shifting state, and a second region in which the transmission mechanism is placed in the fixed-speed-ratio shifting state; and (c) switching control means for placing the transmission mechanism of switchable type selectively in one of the continuously-variable shifting state and the fixed-speed-ratio shifting state, according to the control map.

The control device described above, which includes the above-described transmission mechanism of switchable type, the above-described map for defining the first region and second region, and the above-described switching control means, is operable with a simple program for suitably effecting a shifting control of the transmission mechanism operable as the electrically controlled continuously variable transmission.

The object indicated above may be achieved according to a $68^{th}$ form of this invention, which provides a vehicular drive system arranged to transmit an output of an engine to a drive wheel of a vehicle, characterized by comprising: (a) a transmission mechanism of switchable type switchable between a continuously-variable shifting state in which the transmission mechanism is operable as an electrically controlled continuously variable transmission, and a step-variable shifting state; (b) a control map which defines, with control parameters consisting of a running speed of the vehicle and a load of the vehicle or an output torque of the vehicular drive system, a first region in which the transmission mechanism of switchable type is placed in the continuously-variable shifting state, and a second region in which the transmission mechanism is placed in the step-variable shifting state; and (c) switching control means for placing the transmission mechanism of switchable type selectively in one of the continuously-variable shifting state and the step-variable shifting state, according to the control map.

The control device described above, which includes the above-described transmission mechanism of switchable type, the above-described control map for defining the first region and second region, and the above-described switching control means, is operable with a simple map for suitably effecting a shifting control of the transmission mechanism selectively operable as the electrically controlled continuously variable transmission and the step-variable transmission.

The object indicated above may be achieved according to a $69^{th}$ form of this invention, which provides a control device for a vehicular drive system including a continuously-variable shifting portion which functions as a continuously variable transmission and which has a differential mechanism operable to distribute an output of an engine to a first electric motor and a power transmitting member, and a second electric motor disposed in a power transmitting path between the power transmitting member and a drive wheel of a vehicle, the vehicular drive system further including a step-variable shifting portion which constitutes a part of the power transmitting path and which functions as a step-variable automatic transmission, characterized by comprising: (a) a differential-state switching device provided in the differential mechanism and operable to place the continuously-variable shifting portion selectively in a differential state in which the differential mechanism is operable as an electrically controlled continuously variable transmission, and a locked state in which the differential mechanism is in a non-differential state; (b) a first control map which defines, with predetermined control parameters, shifting lines for effecting a shifting control of the step-variable automatic transmission; and (c) a second control map which defines, with the same control parameters as used for the first control map, a differential region in which the differential mechanism is placed in the differential state by the differential-state switching device, and a non-differential state in which the differential mechanism is placed in the non-differential state by the differential-state switching device.

The control device described above, which includes the above-described differential-state switching device, the above-described first control map and the above-described second control map, is operable with a simple program for suitably effecting a shifting control of the transmission mechanism operable selectively as the electrically controlled continuously variable transmission and the step-variable transmission.

The object indicated above may be achieved according to a $70^{th}$ form of this invention, which provides a control device for a vehicular drive system including a differential mechanism operable to distribute an output of an engine to a first electric motor and a power transmitting member, and a second electric motor disposed in a power transmitting path between the power transmitting member and a drive wheel of a vehicle, characterized by comprising: (b) a differential-state switching device operable to place the differential mechanism selectively in a differential state in which the differential mechanism is operable as an electrically controlled continuously variable transmission, and a locked state in which the differential mechanism is in a non-differential state; (b) a first control map which defines, with predetermined control parameters, a plurality of regions for effecting a drive-power-source selection control to select at least one drive power source to be operated to generate a drive force, from among the engine, the first electric motor and the second electric motor; and (c) a second control map which defines, with the same control parameters used for the first control map, a differential region in which the differential mechanism is placed in the differential state by the differential-state switching device, and a non-differential region in which the differential mechanism is placed in the non-differential state by the differential-state switching device.

The control device described above, which includes the above-described differential-state switching device, the above-described first control map and the above-described second control map, is operable with a simple program for suitably effecting a shifting control of the transmission mechanism operable as the electrically controlled continuously variable transmission, and the drive-power-source selection control.

The object indicated above may be achieved according to a $71^{st}$ form of this invention, which provides a control device for a vehicular drive system including a differential mechanism operable to distribute an output of an engine to a first electric motor and a power transmitting member, and a second electric motor disposed in a power transmitting path between the power transmitting member and a drive wheel of a vehicle, characterized by comprising: (a) a differential-state switching device operable to place the differential mechanism selectively in a differential state in which the differential mechanism is operable as an electrically controlled continuously variable transmission, and a step-variable shifting state in which the differential mechanism is operable as a step-variable transmission; (b) a first control map which defines, with predetermined control parameters, a plurality of regions for effecting a drive-power-source selection control to select at least one drive power source to be operated to generate a drive force, from among the engine, the first electric motor and the second electric motor; and (c) a second control map which defines, with the same control parameters used for the first control map, a differential region in which the differential mechanism is placed in the differential state by the differential-state switching device, and a non-differential region in which the differential mechanism is placed in the non-differential state by the differential-state switching device.

The control device described above, which includes the above-described transmission mechanism of switchable type, the above-described first control map and the above-described second control map, is operable with a simple program for suitably effecting a shifting control of the transmission mechanism operable as the electrically controlled continuously variable transmission, and the drive-power-source selection control.

In a $72^{nd}$ form of this invention according to any one of the $69^{th}$ through $71^{st}$ form, the predetermined control parameters consist of a running speed of the vehicle, and a load of the vehicle or an output torque of the vehicular drive system. In this case, the shifting control of the transmission mechanism operable as the electrically controlled continuously variable transmission can be effected with a simple program.

The object indicated above may be achieved according to a $73^{rd}$ form of this invention, which provides a control device for a vehicular drive system arranged to transmit an output of an engine to a drive wheel of a vehicle, characterized by comprising: (a) a transmission mechanism of switchable type switchable between a continuously-variable shifting state in which the transmission mechanism is operable as an electrically controlled continuously variable transmission, and a step-variable shifting state in which the transmission mechanism is operable as a step-variable transmission; and (b) switching control means operable to place the transmission mechanism of switchable type selectively in one of the continuously-variable shifting state and the step-variable shifting state in which a fuel consumption ratio of the vehicle is lower.

In the control device described above, the transmission mechanism of switchable type switchable between the electrically established continuously-variable shifting state in which the transmission mechanism is operable as the electrically controlled continuously variable transmission and the step-variable shifting state in which the transmission mechanism is operable as the step-variable transmission is controlled by the switching control means, so as to be placed selectively in one of the continuously-variable shifting state and the step-variable shifting states, in which the fuel consumption ratio is lower. Accordingly, the vehicle can be run with improved fuel economy.

In a $74^{th}$ form of this invention according to the $73^{rd}$ form, the fuel consumption ratio is calculated from time to time, on the basis of a condition of the vehicle. In this case, values of the fuel consumption ratio in the continuously-variable shifting state and the step-variable shifting state are calculated from time to time, and the transmission mechanism of switchable type is placed in one of those shifting states in which the fuel economy is higher. Preferably, fuel-consumption-ratio calculating means is provided to calculate from time to time the fuel consumption ratio values on the basis of the vehicle condition. In this case, the fuel consumption ratio values in the continuously-variable shifting state and in the step-variable shifting state are calculated from time to time, by the fuel-consumption-ratio calculating means, so that the transmission mechanism of switchable type can be placed in one of the continuously-variable and step-variable shifting states in which the fuel economy is higher.

In a $75^{th}$ form of this invention according to the $74^{th}$ form, the fuel consumption ratio which is calculated from time to time on the basis of the condition of the vehicle is calculated on the basis of a fuel consumption ratio of the engine obtained according to a stored relationship. In this case, the fuel consumption ratio of the vehicle can be adequately calculated.

In a $76^{th}$ form of this invention according to the $74^{th}$ or $75^{th}$ form, the fuel consumption ratio which is calculated from time to time on the basis of the condition of the vehicle is obtained by taking account of an efficiency of power transmission from the engine to the drive wheel. In this case, the fuel consumption ratio can be adequately calculated. Preferably, power-transmitting-efficiency calculating means is provided to calculate the efficiency of power transmission from the engine to the drive wheel. In this case, the fuel consumption ratio of the vehicle can be adequately calculated by the power-transmitting-efficiency calculating means, with the efficiency of power transmission being taken into account.

In a $77^{th}$ form of this invention according to the $76^{th}$ form, the efficiency of power transmission changes with a running resistance of the vehicle. In this case, the fuel consumption ratio can be adequately calculated.

In a $78^{th}$ form of this invention according to the $76^{th}$ or $77^{th}$ form, the efficiency of power transmission changes with a running speed of the vehicle. In this case, the fuel consumption ratio can be adequately calculated.

In a $79^{th}$ form of this invention according to any one of the $76^{th}$ through $78^{th}$ forms, the efficiency of power transmission changes with a drive-force-related value of the vehicle. In this case the fuel consumption ratio can be adequately calculated. The drive-force-related value indicated above is a parameter directly or indirectly relating to the drive force of the vehicle, which may be a torque or rotary force at a suitable portion of a power transmitting path, such as an output torque of the engine, an output torque of the transmission and a drive torque of the drive wheel, or may be an angle of opening of a throttle valve or an amount of operation of an accelerator pedal, which represents a required value of such a torque or rotary force.

In an $80^{th}$ form of this invention according to the $73^{rd}$ form, the transmission mechanism of switchable type is placed selectively in one of the continuously-variable shifting state and the step-variable shifting state, on the basis of a condition of the vehicle, and according to a stored relationship which defines shifting regions corresponding to the continuously-variable and step-variable shifting states such that the transmission mechanism is placed in one of the continuously-variable and step-variable shifting states in which the fuel consumption ratio is lower. In this case, the shifting state of the transmission mechanism of switchable type is easily selected so as to improve the fuel economy.

In an $81^{st}$ form of this invention according to any one of the $73^{rd}$ through $80^{th}$ forms, the switching control means is operable to place the transmission mechanism of switchable type in the step-variable shifting state when an actual speed of the vehicle has exceeded a predetermined upper limit. In this form of the invention, while the actual vehicle speed is higher than the upper limit above which the vehicle is in the high-speed running state, the output of the engine is transmitted to the drive wheel primarily through the mechanical power transmitting path, so that the fuel economy of the vehicle is improved owing to reduction of a loss of conversion of the mechanical energy into the electric energy, which would take place when the transmission mechanism is operated as the electrically controlled continuously variable transmission. The upper limit of the vehicle speed indicated above is obtained by experimentation, to detect the high-speed running state of the vehicle in which the transmission mechanism is switched to the step-variable shifting state, since the fuel economy in the high-speed running state is higher in the step-variable shifting state than in the continuously-variable shifting state. Thus, the transmission mechanism is placed in the step-variable shifting state, not on the basis of the fuel consumption ratio value, but on the basis of the actual vehicle speed as compared with the predetermined upper limit.

Preferably, the switching control means inhibits the transmission mechanism of switchable time from being placed in the continuously-variable shifting state when the actual vehicle speed has exceeded the predetermined upper limit. In this case, when the actual vehicle speed has exceeded the upper limit, the transmission mechanism is inhibited from being placed in the continuously-variable shifting state, so that the output of the engine is transmitted to the drive wheel primarily through the mechanical power transmitting path, whereby the fuel economy of the vehicle is improved owing to reduction of a loss of conversion of the mechanical energy into the electric energy, which would take place when the transmission mechanism is operated as the electrically controlled continuously variable transmission.

In an $82^{nd}$ form of the invention according to any one of the $73^{rd}$ through $81^{st}$ forms, the switching control means is operable to place the transmission mechanism of switchable type in the step-variable shifting state when a drive-force-related value of the vehicle has exceeded a predetermined upper limit. In this form of the invention, while the drive-force-related value such as the required or actual drive force of the vehicle is larger than the predetermined upper limit, the output of the engine is transmitted to the drive wheel primarily through the mechanical power transmitting path, so that the maximum amount of electric energy that must be generated by he electric motor can be reduced, making it possible to reduce the required sizes of the electric motor and the drive system including the electric motor. The upper limit of the drive-force-related value indicated above is determined to detect the high-output running state of the vehicle in which the transmission mechanism of switchable time should be switched to the step-variable shifting state, that is, to detect the high-output running state of the vehicle in which the transmission mechanism should not be operated as an electrically controlled continuously variable transmission and in which the engine output is higher than a predetermined upper limit determined based on the nominal output of the electric motor. Thus, the transmission mechanism is placed in the step-variable shifting state, not on the basis of the fuel consumption ratio, but on the basis of the actual drive-force-related value as compared with the predetermined upper limit.

Preferably, the switching control means inhibits the transmission mechanism of switchable time from being placed in the continuously-variable shifting state when the actual drive-force-related value of the vehicle has exceeded the predetermined upper limit. In this case, when the actual drive-force-related value such as the required or actual drive force of the vehicle has exceeded the upper limit, the transmission mechanism is inhibited from being placed in the continuously-variable shifting state, so that the output of the engine is transmitted to the drive wheel primarily through the mechanical power transmitting path, whereby the maximum amount of electric energy that must be generated by he electric motor can be reduced, making it possible to reduce the required sizes of the electric motor and the drive system including the electric motor.

In an 83ard form of this invention according to any one of the $73^{rd}$ through $82^{nd}$ form, the switching control means is operable to place the transmission mechanism of switchable type in the step-variable shifting state when it is determined that a predetermined diagnosing condition indicative of functional deterioration of control components that are operable to place the transmission mechanism in the above-indicated electrically established continuously-variable shifting state is satisfied. In this case, the vehicle can be run with the transmission mechanism of switchable type operating in the step-variable shifting state, even when the transmission mechanism cannot be normally operated in the continuously-variable shifting state.

Preferably, the switching control means inhibits the transmission mechanism of switchable time from being placed in the continuously-variable shifting state when the predetermined diagnosing condition indicative of the functional deterioration of the control components operable to place the transmission mechanism in the electrically established continuously-variable shifting state is satisfied. In this case, the vehicle can be run with the transmission mechanism of switchable type operating in the step-variable shifting state, even when the transmission mechanism cannot be normally operated in the continuously-variable shifting state.

In an $84^{th}$ form of this invention according to any one of the $73^{rd}$ through $83^{rd}$ forms, 84. the transmission mechanism of switchable type includes a first electric motor, a power distributing mechanism operable to distribute the output of the engine to the first electric motor and a power transmitting member, and a second electric motor disposed between the power transmitting member and the drive wheel. Preferably, the power distributing mechanism has a first element fixed to the engine, a second element fixed to the first electric motor, and a third element fixed to the second electric motor and the power transmitting member. This power distributing mechanism includes a differential-state switching device operable to place the transmission mechanism selectively in one of the continuously-variable shifting state and the step-variable shifting states, and the switching control means controls the differential-state switching device to place the transmission mechanism selectively in one of the continuously-variable shifting state and the step-variable shifting state. In this form of the invention, the differential-state switching device is controlled by the switching control means, so that the transmission mechanism of switchable type of the drive system can be easily switched between the continuously-variable shifting state in which the transmission mechanism is operable as the continuously variable transmission and the step-variable shifting state in which the transmission mechanism is operable as the step-variable transmission.

In a $85^{th}$ form of this invention according to the $84^{th}$ form, the power distributing mechanism has the first element fixed to the engine, the second element fixed to the first electric motor and the third element fixed to the power transmitting member, and the differential-state switching device includes a frictional coupling device operable to connect selected two of the first, second and third elements to each other, and/or fix the second element to a stationary member. In this case, the switching control means is operable to release the coupling device to permit the first, second and third elements to be rotated relative to each other, for thereby placing the transmission mechanism in the continuously-variable shifting state, and to engage the coupling device to connect at least two of the first, second and third elements to each other or fix the second element to the stationary member, for thereby placing the transmission mechanism in the step-variable shifting state. In this form of the invention, the power distributing mechanism is simple in construction, and the transmission mechanism can be easily switched by the switching control means, between the continuously-variable shifting state and the step-variable shifting state.

In an $86^{th}$ form of this invention according to the $85^{th}$ form, the power distributing mechanism is a planetary gear set, and the first element is a carrier of the planetary gear set, and the second element is a sun gear of the planetary gear set, while the third element is a ring gear of the planetary gear set. In this case, the differential-state switching device includes a clutch operable to connect selected two of the carrier, sun gear and ring gear to each other, and/or a brake operable to fix the sun gear to the stationary member. In this form of the invention, the required dimension of the power distributing mechanism in its axial direction can be reduced, and the power distributing mechanism is simply constituted by one planetary gear set.

In an $87^{th}$ form of this invention according to the $86^{th}$ form the planetary gear set is a planetary gear set of single-pinion type. In this case, the required dimension of the power distributing mechanism in its axial direction can be reduced, and the power distributing mechanism is simply constituted by one planetary gear set of single pinion type.

In an $88^{th}$ form of this invention according to the $87^{th}$ form, the switching control device is operable to control the coupling device, so as to connect the carrier and the sun gear of the planetary gear set of single-pinion type, for enabling the planetary gear set to operate as a transmission having a speed ratio of 1, or to hold the sun ear stationary, for enabling the planetary gear set as a speed-increasing transmission having a speed ratio lower than 1. In this form of the invention, the power distributing mechanism can be easily controlled by the switching control means, as a transmission which is constituted by one planetary gear set of single-pinion type and which has a single fixed speed ratio or a plurality of fixed speed ratios.

In an $89^{th}$ form of this invention according to the $84^{th}$ form, the transmission mechanism of switchable type further includes an automatic transmission disposed in series between the power transmitting member and the drive wheel, and a speed ration of the transmission mechanism of switchable type is determined by a speed ratio of the automatic transmission. In this form of the invention, the drive force is available over a wide range of speed ratio, by utilizing the speed ratio of the automatic transmission.

In a $90^{th}$ form of this invention according to the $89^{th}$ form, an overall speed ratio of the transmission mechanism of switchable type is determined by a speed ratio of the power distributing mechanism and the speed ratio of the automatic transmission. In this form of the invention, the drive force is available over a wide range of speed ratio, by utilizing the speed ratio of the automatic transmission, so that the efficiency of operation of the power distributing mechanism in its continuously-variable shifting state can be improved. Preferably, the automatic transmission is a step-variable automatic transmission. In this case, a continuously variable transmission is constituted by the step-variable automatic transmission and the power distributing mechanism placed in the continuously-variable shifting state, while a step-variable transmission is constituted by the step-variable automatic transmission and the power distributing mechanism placed in the step-variable shifting state and the step-variable automatic transmission.

In a $91^{st}$ form of this invention according to the $89^{th}$ form, the automatic transmission is a step-variable automatic transmission, which is shifted according to a stored shifting control map. In this form of the invention, a shifting action of the step-variable automatic transmission can be easily controlled.

Preferably, the transmission mechanism of switchable type is arranged such that the second electric motor is directly connected to the power transmitting member. In this case, the required input torque of the automatic transmission can be made lower than the torque of its output shaft, making it possible to reduce the required size of the second electric motor.

According to a $92^{nd}$ form of this invention, there is provided a control device for a vehicular drive system including (a) a continuously-variable shifting portion operable in an electrically established continuously-variable shifting state, and (b) a step-variable shifting portion operable as a step-variable shifting state, the continuously-variable shifting portion including a differential gear device having three elements consisting of a first element fixed to a first electric motor, a second element fixed to an engine and a third element fixed to an output shaft, the continuously-variable shifting portion further including a second electric motor operatively connected to a power transmitting path between the output shaft and a drive wheel of a vehicle, the step-variable shifting portion being disposed in the power transmitting path, characterized by comprising (c) speed-ratio control means operable in the continuously-variable shifting state of the continuously-variable shifting portion, for controlling a speed ratio of the step-variable shifting portion and a speed ratio of the continuously-variable shifting portion, so as to maximize a fuel economy of the vehicle.

In the control device according to the $92^{nd}$ form of this invention, the speed ratio of the step-variable shifting portion and the speed ratio of the continuously-variable shifting portion are controlled by the speed-ratio control means, so as to maximize the fuel economy of the vehicle, in the continuously-variable shifting state of the continuously-variable shifting portion, so that the fuel economy is improved in the present form of the invention, as compared with that in the case where those speed ratios are controlled independently of each other. For instance, the speed-ratio control means controls the speed ratio of the step-variable shifting portion so as to prevent reverse rotation of the first electric motor of the continuously-variable shifting portion, even in a steady-state running state of the vehicle at a comparatively high speed. Accordingly, the fuel economy of the vehicle as a whole can be maximized.

According to a $93^{rd}$ form of this invention, there is provided a control device for a vehicular drive system including (a) a continuously-variable shifting portion operable in an electrically established continuously-variable shifting state, and (b) a step-variable shifting portion operable in a step-variable shifting state, the continuously-variable shifting portion including a differential gear device having three elements consisting of a first element fixed to a first electric motor, a second element fixed to an engine and a third element fixed to an output shaft, the continuously-variable shifting portion further including a second electric motor operatively connected to a power transmitting path between the output shaft and a drive wheel of a vehicle, the step-variable shifting portion being disposed in the power transmitting path, characterized by comprising (c) speed-ratio control means operable in the continuously-variable shifting state of the continuously-variable shifting portion, for controlling a speed ratio of the continuously-variable shifting portion, depending upon a speed ratio of the step-variable shifting portion.

In the control device according to the $93^{rd}$ form of this invention, the speed ratio of the continuously-variable shifting portion is controlled by the speed-ratio control means, depending upon the speed ratio of the step-variable shifting portion, in the continuously-variable shifting state of the continuously-variable shifting portion. Accordingly, the speed ratios of the step-variable shifting portion and the continuously-variable shifting portion are controlled to improve the power transmitting efficiency of the vehicle as a whole.

In a $94^{th}$ form of this invention according to the $92^{nd}$ or $93^{rd}$ form, the speed-ratio control means is operable to control the speed ratio of the step-variable shifting portion and the speed ratio of the continuously-variable shifting portion, on the basis of an efficiency of the first electric motor of the continuously-variable shifting portion and an efficiency of the second electric motor of the continuously-variable shifting portion.

In the control device according to the $94^{th}$ form of the invention according to the $92^{nd}$ or $93^{rd}$ form, the speed-ratio control means controls the speed ratio of the step-variable shifting portion and the speed ratio of the continuously-variable shifting portion, on the basis of the efficiency of the first electric motor of the continuously-variable shifting portion and the efficiency of the second electric motor of the continuously-variable shifting portion. Accordingly, the speed ratio of the step-variable shifting portion and the speed ratio of the continuously-variable shifting portion are controlled by taking account of the efficiency values of the first and second electric motors, so that the power transmitting efficiency is further improved.

In a 95th form of this invention according to the 92nd or 93rd form, the speed-ratio control means is operable to change a rotating speed of the output shaft of the continuously-variable shifting portion, by adjusting the speed ratio of the step-variable shifting portion.

In the control device according to the 95th form, the speed-ratio control means changes the rotating speed of the output shaft of the continuously-variable shifting portion by adjusting the speed ratio of the step-variable shifting portion. Accordingly, the power transmitting efficiency and fuel economy of the vehicle as a whole can be improved.

In a 96th form of this invention, the control device further comprises a switching device operable to switch the continuously-variable shifting portion between the continuously-variable shifting portion in which the speed ratio is continuously variable, and the step-variable shifting portion in which the speed ratio is held constant, and continuously-variable-shifting-run determining means operable for determining that the continuously-variable shifting portion has been switched by the switching device to the continuously-variable shifting state. In this form of the invention, the speed-ratio control means is operable, upon determination by the continuously-variable-shifting run determining means that the continuously-variable shifting portion has been switched by the switching device to the continuously-variable shifting state, to control the speed ratio of the step-variable shifting portion and the speed ratio of the continuously-variable shifting portion, so as to maximize the fuel economy of the vehicle.

In the control device of the 96th form of the invention according to the 92nd or 93rd form, the control device comprises the switching device to switch the continuously-variable shifting portion between the continuously-variable shifting portion in which the speed ratio is continuously variable, and the step-variable shifting portion in which the speed ratio is held constant, and the continuously-variable-shifting-run determining means for determining that the continuously-variable shifting portion has been switched by the switching device to the continuously-variable shifting state. Upon determination by the continuously-variable-shifting-run determining means that the continuously-variable shifting portion has been switched to the continuously-variable shifting state, the speed ratio of the step-variable shifting portion and the speed ratio of the continuously-variable shifting portion are controlled so as to maximize the fuel economy of the vehicle. Accordingly, the power transmitting efficiency and fuel economy of the vehicle as a whole can be improved.

Preferably, the control device according to any one of the 92nd through 96th forms of this invention comprises engine-fuel-economy map memory means for storing an engine-fuel-economy map, and the speed-ratio control means includes target-engine-speed calculating means for determining a target speed of the engine on the basis of an actual value of an operating angle of an accelerator pedal and according to the engine-fuel-economy map, and two-speed-ratios determining means for determining the speed ratio of the step-variable shifting portion and the speed ratio of the continuously-variable shifting portion which give the determined target speed of the engine, on the basis of an actual value of a running speed of the vehicle.

Preferably, the target-engine-speed calculating means is arranged to select one of iso-horsepower curves which corresponds to an output of the engine satisfying a vehicle drive force required by an operator of the vehicle, on the basis of the actual value of the operating angle Acc of the accelerator pedal and according to the engine-fuel-economy map, and determine, as the target speed of the engine, a speed of the engine corresponding to a point of intersection between the selected iso-horsepower curve and a highest-fuel-economy curve.

Preferably, the two-speed-ratios determining means is arranged to an overall speed ratio of a transmission mechanism which gives the target speed of the engine, on the basis of the target speed of the engine and the actual value of the running speed of the vehicle, and determine the speed ratio of the step-variable shifting portion and the speed ratio of the continuously-variable shifting portion which give the determined overall speed ratio of the transmission mechanism, such that a power transmitting efficiency of the transmission mechanism as a whole is maximized.

Preferably, the two-speed-ratios determining means is arranged to calculate a fuel consumption amount of the vehicle for each of a plurality of candidate values of the speed ratio of the step-variable shifting portion which give a speed of the engine higher than the target speed of the engine. The candidate values are set on the basis of the actual value of the running speed V of the vehicle and according to a relationship between the engine speed and the vehicle running speed. The two-speed-ratios determining means calculates the fuel consumption amount on the basis of the overall speed ratio which gives the target speed $N_{EM}$ of the engine, and the candidate values of the speed ratio of the step-variable shifting portion, and according to a stored equation for calculating the fuel consumption amount. The two-speed-ratios determining means determines, as the speed ratio of the step-variable shifting portion, one of the candidate values which corresponds to a smallest one of the calculated fuel consumption amounts, and determine the speed ratio of the continuously-variable shifting portion on the basis of the determined speed ratio of the step-variable shifting portion, and the overall speed ratio which gives the target speed of the engine.

Preferably, the equation for calculating the fuel consumption amount is formulated to calculate the fuel consumption amount of the vehicle on the basis of the efficiency of the first electric motor and the efficiency of the second electric motor.

Preferably, a planetary gear type step-variable transmission or a permanent meshing type parallel-two-axes step-variable transmission is disposed between the output shaft and the drive wheel. For example, the planetary gear type step-variable transmission is constituted by a plurality of planetary gear sets, and the parallel-two-axes step-variable transmission includes a plurality of gear pairs which have respective different gear ratios and which are mounted on parallel two shafts such that each of the gear pairs is selectively placed by a synchronous coupling device in a power transmitting state.

Preferably, the differential gear device is operable as an electrically controlled continuously variable transmission the speed ratio of which is a ratio of the rotating speed of an input shaft and the rotating speed of an output shaft and which is continuously variable by electrically controlling the speed of the first electric motor fixed to the first element.

Preferably, a switching device is provided for switching the step-variable shifting portion having the differential gear device, between a differential state and a locked state. This switching device includes a clutch which is disposed between the first and second elements of the differential gear device and which is engaged to rotate the third element of the differential gear device.

Preferably, the differential gear device is constituted by a planetary gear set including a sun gear, a ring gear, and a carrier which rotatably supports a planetary gear or gears meshing with the sun gear and the ring gear. However, the differential gear device may be constituted by a pair of bevel gears connected to the input and output shafts, and a rotary element which rotatably supports a pinion or pinions meshing with the pair of bevel gears.

Preferably, the step-variable shifting portion is a planetary gear type step-variable transmission, or a continuously variable transmission the speed ratio of which is variable in steps.

Preferably, the switching device arranged to switch the differential gear device between the differential and locked states is a hydraulically operated frictional coupling device, or a coupling device of a magnetic-powder type, an electromagnetic type or a mechanical type, such as a powder (magnetic powder) clutch, an electromagnetic clutch and a meshing type dog clutch, which is arranged to connect selected ones of the elements of the differential gear device to each other or a selected one of the elements to a stationary element.

Preferably, the second electric motor is operatively connected to a portion of the power transmitting path between the output shaft of the differential gear device and the drive wheel. For example, the second electric motor is connected to a rotary member such as the output shaft of the differential gear device, a rotary member of an automatic transmission provided in the power transmitting path, or an output shaft of this automatic transmission.

According to a $97^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a first planetary gear device having as three elements a sun gear, a carrier and a ring gear, the three elements consisting of a first element, a second element and a third element which are arranged in the order of the second element, the first element and the third elements in a direction from one of opposite ends of a collinear chart toward the other end, the collinear chart having straight lines indicating rotating speeds of the three elements, the first element being fixed to the engine, the second element being fixed to the first electric motor, and the third element being fixed to the power transmitting member, the power distributing mechanism further including a differential-state switching device operable to place the power distributing mechanism selectively in a differential state in which the power distributing mechanism is operable as an electrically controlled continuously variable transmission, and a non-differential state in which the power distributing mechanism is not operable as the electrically controlled continuously variable transmission, and (c) the automatic transmission includes a second planetary gear set and a third planetary gear set, the second and third planetary gear sets having sun gears, carriers and ring gears selected ones of which are fixed to each other to constitute four elements consisting of a fourth element, a fifth element, a sixth element and a seventh elements rotating speeds of which are indicated by straight lines of a collinear chart in which the four elements are arranged in the order of the fourth element, the fifth element, the sixth element and the seventh element in a direction from one of opposite ends of the collinear chart toward the other end, the fourth element being selectively connected to the power transmitting member through a second clutch and selectively fixed to a stationary member through a first brake, the fifth element being selectively connected to the power transmitting member through a third clutch and selectively fixed to the stationary member through a second brake, the sixth element being fixed to an output rotary member of the automatic transmission, and the seventh element being selectively connected to the power transmitting member through a first clutch, the automatic transmission having a plurality of gear positions which are established by engaging respective combinations of the first, second and third clutches and the first and second brakes.

In a $98^{th}$ form of this invention according to the $97^{th}$ form, the differential-state switching device includes a switching clutch operable to connect the second element to the first element, and/or a switching brake operable to fix the second element to the stationary member, the first planetary gear set being placed in the differential state by releasing the switching clutch and/or the switching brake, and in the locked state by engaging the switching clutch and/or the switching brake.

In a $99^{th}$ form of this invention according to the $98^{th}$ form, the plurality of gear positions includes: a first-gear position which has a highest speed ratio and which is established by engaging the switching clutch, the first clutch and the second brake; a second-gear position which has a speed ratio lower than that of the first-gear position and which is established by engaging the switching clutch, the first clutch and the first brake; a third-gear position which has a speed ratio lower than that of the second-gear position and which is established by engaging the switching clutch, the first clutch and the third clutch; a fourth-gear position which has a speed ratio lower than that of the third-gear position and which is established by engaging the switching clutch, the third clutch and the first brake; and a fifth gear position which has a speed ratio lower than that of the fourth-gear position and which is established by engaging the third clutch, the switching brake and the first brake.

In a $100^{th}$ form of this invention according to any one of the $97^{th}$ through $99^{th}$ forms, the automatic transmission includes a single-pinion type second planetary gear set having a second sun gear, a second carrier and a second ring gear, and a double-pinion type third planetary gear set having a third sun gear, a third carrier and a third ring gear, the second sun gear functioning as the fourth element, the second carrier and the third carrier functioning as the fifth element, the second ring gear and the third ring gear functioning as the sixth element, and the third sun gear functioning as the seventh element.

In a $101^{st}$ form of this invention according to any one of the $97^{th}$ through $99^{th}$ forms, the automatic transmission includes a double-pinion type second planetary gear set having a second sun gear, a second carrier and a second ring gear, and a single-pinion type third planetary gear set having a third sun gear, a third carrier and a third ring gear, the second carrier and the third sun gear functioning as the fourth element, the second ring gear and the third carrier functioning as the fifth element, the third ring gear functioning as the sixth element, and the third ring gear functioning as the seventh element.

In a $102^{nd}$ form of this invention according to any one of the $97^{th}$ through $99^{th}$ forms, the automatic transmission includes a double-pinion type second planetary gear set having a second sun gear, a second carrier and a second ring gear, and a single-pinion type third planetary gear set having a third sun gear, a third carrier and a third ring gear, the second sun gear and the third sun gear functioning as the fourth element, the second ring gear functioning as the fifth element, the third carrier functioning as the sixth element, and the second carrier and the third ring gear functioning as the seventh element.

In a $103^{rd}$ form of this invention according to any one of the $97^{th}$ through $99^{th}$ forms, the automatic transmission includes a double-pinion type second planetary gear set having a second sun gear, a second carrier and a second ring gear, and a single-pinion type third planetary gear set having a third sun gear, a third carrier and a third ring gear, the second sun gear functioning as the fourth element, the second ring gear and the third ring gear functioning as the fifth element, the third carrier functioning as the sixth element, and the second carrier and the third sun gear functioning as the seventh element.

In a $104^{th}$ form of this invention according to any one of the $97^{th}$ through $99^{th}$ forms, the automatic transmission includes a single-pinion type second planetary gear set having a second sun gear, a second carrier and a second ring gear, and a double-pinion type third planetary gear set having a third sun gear, a third carrier and a third ring gear, the third sun gear functioning as the fourth element, the second ring gear functioning as the fifth element, the second carrier and third ring gear functioning as the sixth element, and the second sun gear and the third carrier functioning as the seventh element.

In a $105^{th}$ form of this invention according to any one of the $97^{th}$ through $99^{th}$ forms, the automatic transmission includes a single-pinion type second planetary gear set having a second sun gear, a second carrier and a second ring gear, and a single-pinion type third planetary gear set having a third sun gear, a third carrier and a third ring gear, the second sun gear functioning as the fourth element, the second carrier and third ring gear functioning as the fifth element, the second ring gear and the third carrier functioning as the sixth element, and the third sun gear functioning as the seventh element.

In a $106^{th}$ form of this invention according to any one of the $97^{th}$ through $99^{th}$ forms, the automatic transmission includes a single-pinion type second planetary gear set having a second sun gear, a second carrier and a second ring gear, and a single-pinion type third planetary gear set having a third sun gear, a third carrier and a third ring gear, the third sun gear functioning as the fourth element, the second ring gear functioning as the fifth element, the second carrier and the third carrier functioning as the sixth element, and the second sun gear and the third ring gear functioning as the seventh element.

In a $107^{th}$ form of this invention according to any one of the $97^{th}$ through $99^{th}$ forms, the automatic transmission includes a single-pinion type second planetary gear set having a second sun gear, a second carrier and a second ring gear, and a single-pinion type third planetary gear set having a third sun gear, a third carrier and a third ring gear, the second sun gear and the third sun gear functioning as the fourth element, the third carrier functioning as the fifth element, the second carrier and the third ring gear functioning as the sixth element, and the second ring gear functioning as the seventh element.

According to a $108^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a double-pinion type third planetary gear set having a third sun gear, a third carrier and a third ring gear, the second sun gear being selectively connected to the power transmitting member through a second clutch and selectively fixed to a stationary member through a first brake, the second carrier and the third carrier being selectively connected to the power transmitting member through a third clutch and selectively fixed to the stationary member through a second brake, the second ring gear and the third ring gear being fixed to an output rotary member of the automatic transmission, and the third sun gear being selectively connected to the power transmitting member through a first clutch.

According to a $109^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device. operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear being selectively connected to the power transmitting member through a first clutch, the second carrier and the third sun gear being selectively connected to the power transmitting member through a second clutch and selectively fixed to a stationary member through a first brake, the second ring gear and the third carrier being selectively connected to the power transmitting member through a third clutch and selectively fixed to the stationary member through a second brake, and the third ring gear being fixed an output rotary member of the automatic transmission.

According to a $110^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel,. characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear and the third sun gear being selectively connected to the power transmitting member through a second clutch and selectively fixed to a stationary member through a first brake, the second carrier and the third ring gear being selectively connected to the power transmitting member through a first clutch, the second ring gear being selectively connected to the power transmitting member through a third clutch and selectively fixed to the stationary member through a second brake, and the third carrier being fixed to an output rotary member of the automatic transmission.

According to a $111^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear being selectively connected to the power transmitting member through a second clutch and selectively fixed to a stationary member through a first brake, the second carrier and the third sun gear being selectively connected to the power transmitting member through a first clutch, the second ring gear and the third ring gear being selectively connected to the power transmitting member through a third clutch and selectively fixed to the stationary member through a second brake, and the third carrier being fixed to an output rotary member of the automatic transmission.

According to a $112^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a double-pinion type third planetary gear set having a third sun gear, a third carrier and a third ring gear, the second sun gear and the third carrier being selectively connected to the power transmitting member through a second clutch, the second carrier and the third ring gear being integrally fixed to each other for rotation as a unit and fixed to an output rotary member of the automatic transmission, the second ring gear being selectively connected to the power transmitting member through a third clutch and selectively fixed to a stationary member through a second brake, and the third sun gear being selectively connected to the power transmitting member through a second clutch and selectively fixed to the stationary member through a first brake.

According to a $113^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a single-pinion type third planetary gear set having a third sun gear, a third carrier and a third ring gear, the second sun gear being selectively connected to the power transmitting member through a second clutch and selectively fixed to a stationary member through a first brake, the second carrier and the third ring gear being selectively connected to the power transmitting member through a third clutch and selectively fixed to a stationary member through a second brake, the second ring gear and the third carrier being fixed to an output rotary member of the automatic transmission, and the third sun gear being selectively connected to the power transmitting member through a first clutch.

According to a $114^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a single-pinion type third planetary gear set having a third sun gear, a third carrier and a third ring gear, the second sun gear and the third ring gear being selectively connected to the power transmitting member through a second clutch, the second carrier and the third carrier being fixed to an output rotary member of the automatic transmission, the second ring gear being selectively connected to the power transmitting member through a third clutch and selectively fixed to a stationary member through a second brake, and the third sun gear being selectively connected to the power transmitting member through a second clutch and selectively fixed to the stationary member through a first brake.

According to a $115^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a single-pinion type third planetary gear set having a third sun gear, a third carrier and a third ring gear, the second sun gear and the third sun gear being selectively fixed to a stationary member through a first brake, the second carrier and the third ring gear being fixed to an output rotary member of the automatic transmission, the second ring gear being selectively connected to the power transmitting member through a first clutch, and the third carrier being selectively connected to the power transmitting member through a third clutch and selectively fixed to the stationary member through a second brake.

In a $116^{th}$ form of this invention according to any one of the $108^{th}$ through $115^{th}$ forms, the shifting-state switching device includes a switching clutch operable to connect the first carrier and the first sun gear to each other, and/or a switching brake operable fix the first sun gear to the stationary member.

According to a $117^{th}$ form of this invention, there is provided a vehicular drive system including (a) a power distributing mechanism operable to distribute an output of an engine to a first electric motor and a power transmitting member, an automatic transmission disposed between the power transmitting member and a drive wheel of a vehicle, and a second electric motor disposed between the power transmitting member and the drive wheel, characterized in that the automatic transmission includes a plurality of input clutches selectively connected to an output shaft of the power distributing mechanism, and the automatic transmission has a plurality of gear positions which are established by selectively engaging and releasing the plurality of input clutches.

In a $118^{th}$ form of this invention according to the $117^{th}$ form, the power distributing mechanism includes a first planetary gear set having as three elements a sun gear, a carrier and a ring gear, the three elements consisting of a first element, a second element and a third element which are arranged in the order of the second element, the first element and the third elements in a direction from one of opposite ends of a collinear chart toward the other end, the collinear chart having straight lines indicating rotating speeds of the three elements, the first element being fixed to the engine, the second element being fixed to the first electric motor, and the third element being fixed to the power transmitting member.

In a $119^{th}$ form of this invention according to the $118^{th}$ form, the power distributing mechanism further includes a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission In a $120^{th}$ form of this invention according to any one of the $117^{th}$ through $119^{th}$ forms, the automatic transmission is a step-variable automatic transmission.

In the drive system according to any one of the $97^{th}$ through $116^{th}$ forms and the $117^{th}$ through $120^{th}$ forms of this invention, the power distributing mechanism is controlled by the differential-state switching device, to be placed selectively in the differential state in which the power distributing mechanism is operable as an electrically controlled continuously variable transmission, and the locked state in which the power distributing mechanism is not operable as the electrically controlled continuously variable transmission. Therefore, the present drive system has not only an advantage of an improvement in the fuel economy owing to a function of a transmission whose speed ratio is electrically variable, but also an advantage of high power transmitting efficiency owing to a function of a gear type transmission capable of mechanically transmitting a vehicle drive force. Accordingly, when the engine is in a normal output state with a relatively low or medium output while the vehicle is running at a relatively low or medium running speed, the power distributing mechanism is placed in the differential state, assuring a high degree of fuel economy of the vehicle. When the vehicle is running at a relatively high speed, on the other hand, the power distributing mechanism is placed in the locked state in which the output of the engine is transmitted to the drive wheel primarily through a mechanical power transmitting path, so that the fuel economy is improved owing to reduction of a loss of conversion of a mechanical energy into an electric energy, which loss would take place when the drive system is operated as the transmission whose speed ratio is electrically variable. When the engine is in a high-output state, the power distributing mechanism is also placed in the locked state. Therefore, the power distributing mechanism is operated as the transmission whose speed ratio is electrically variable, only when the vehicle speed is relatively low or medium or when the engine output is relatively low or medium, so that the required amount of electric energy generated by the electric motor that is, the maximum amount of electric energy that must be transmitted from the electric motor can be reduced, making it possible to minimize the required sizes of the electric motor, and the required size of the drive system including the electric motor.

In the 99$^{th}$ form of this invention, the drive system having five forward drive positions when the power distributing mechanism is placed in the locked state is available with a small size, particularly, in the dimension in its axial direction.

In the 117$^{th}$ form of the invention, a vehicle drive force is transmitted from the power transmitting member to the automatic transmission through the plurality of input clutches, so that the automatic transmission is small-sized, whereby the overall size of the drive system including the automatic transmission is reduced.

According to a 121$^{st}$ form of the invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a first planetary gear device having as three elements a sun gear, a carrier and a ring gear, the three elements consisting of a first element, a second element and a third element which are arranged in the order of the second element, the first element and the third elements in a direction from one of opposite ends of a collinear chart toward the other end, the collinear chart having straight lines indicating rotating speeds of the three elements, the first element being fixed to the engine, the second element being fixed to the first electric motor, and the third element being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a second planetary gear set and a third planetary gear set, the second and third planetary gear sets having sun gears, carriers and ring gears selected ones of which are fixed to each other to constitute four elements consisting of a fourth element, a fifth element, a sixth element and a seventh elements rotating speeds of which are indicated by straight lines of a collinear chart in which the four elements are arranged in the order of the fourth element, the fifth element, the sixth element and the seventh element in a direction from one of opposite ends of the collinear chart toward the other end, the fourth element being selectively connected to the power transmitting member through a first clutch and selectively fixed to a stationary member through a second brake, the fifth element being selectively connected to the power transmitting member through a second clutch and selectively fixed to the stationary member through a third brake, the sixth element being fixed to an output rotary member of the automatic transmission, and the seventh element being selectively fixed to the stationary member through a first brake, the automatic transmission having a plurality of gear positions which are established by engaging respective combinations of the first and second clutches and the first, second and third brakes.

In a 122$^{nd}$ form of this invention according to the 121$^{st}$ form, the differential-state switching device includes a switching clutch operable to connect the second element to the first element, and/or a switching brake operable to fix the second element to the stationary member, the first planetary gear set being placed in the differential state by releasing the switching clutch and/or the switching brake, and in the locked state by engaging the switching clutch and/or.the switching brake.

In a 123$^{rd}$ form of this invention according to the 122$^{nd}$ form, the plurality of gear positions includes: a first-gear position which has a highest speed ratio and which is established by engaging the switching clutch, the first clutch and the first brake; a second-gear position which has a speed ratio lower than that of the first-gear position and which is established by engaging the switching clutch, the second clutch and the first brake; a third-gear position which has a speed ratio lower than that of the second-gear position and which is established by engaging the switching clutch, the first clutch and the second clutch; a fourth-gear position which has a speed ratio lower than that of the third-gear position and which is established by engaging the switching clutch, the second clutch and the second brake; and a fifth-gear position which has a speed ratio lower than that of the fourth-gear position and which is established by engaging the second clutch, the switching brake and the second brake.

In a 124$^{th}$ form of this invention according to any one of the 121$^{st}$ through 123$^{rd}$ forms, the automatic transmission includes a single-pinion type second planetary gear set having a second sun gear, a second carrier and a second ring gear, and a double-pinion type third planetary gear set having a third sun gear, a third carrier and a third ring gear, the second carrier and the third sun gear functioning as the fourth element, the second ring gear functioning as the fifth element,. the third carrier functioning as the sixth element, and the second sun gear and the third ring gear functioning as the seventh element.

In a 125$^{th}$ form of this invention according to any one of the 121$^{st}$ through 123$^{rd}$ forms, the automatic transmission includes a double-pinion type second planetary gear set having a second sun gear, a second carrier and a second ring gear, and a single-pinion type third planetary gear set having a third sun gear, a third carrier and a third ring gear, the second carrier and the third sun gear functioning as the fourth element, the second ring gear and the third carrier functioning as the fifth element, the third ring gear functioning as the sixth element, and the second sun gear functioning as the seventh element.

In a 126$^{th}$ form of this invention according to any one of the 121$^{st}$ through 123$^{rd}$ forms, the automatic transmission includes a double-pinion type second planetary gear set having a second sun gear, a second carrier and a second ring gear, and a single-pinion type third planetary gear set having a third sun gear, a third carrier and a third ring gear, the second sun gear and the third sun gear functioning as the fourth element, the second ring gear and the third carrier functioning as the fifth element, the third ring gear functioning as the sixth element, and the second carrier functioning as the seventh element.

In a 127$^{th}$ form of this invention according to any one of the 121$^{st}$ through 123$^{rd}$ forms, the automatic transmission includes a double-pinion type second planetary gear set having a second sun gear, a second carrier and a second ring gear, and a single-pinion type third planetary gear set having a third sun gear, a third carrier and a third ring gear, the second sun gear and the third sun gear functioning as the fourth element, the second ring gear functioning as the fifth element, the third carrier functioning as the sixth element, and the second carrier and the third ring gear functioning as the seventh element.

In a 128$^{th}$ form of this invention according to any one of the 121$^{st}$ through 123$^{rd}$ forms, the automatic transmission includes a single-pinion type second planetary gear set having a second sun gear, a second carrier and a second ring gear, and a double-pinion type third planetary gear set having a third sun gear, a third carrier and a third ring gear, the third sun gear functioning as the fourth element, the second carrier functioning as the fifth element, the second ring gear and the third carrier functioning as the sixth element, and the second sun gear and the third ring gear functioning as the seventh element.

In a 129$^{th}$ form of this invention according to any one of the 121$^{st}$ through 123$^{rd}$ forms, the automatic transmission includes a single-pinion type second planetary gear set having a second sun gear, a second carrier and a second ring gear, and a double-pinion type third planetary gear set having a third sun gear, a third carrier and a third ring gear, the second sun gear and the third sun gear functioning as the fourth element, the second carrier functioning as the fifth element, the second ring gear and the third ring gear functioning as the sixth element, and the third carrier functioning as the seventh element.

In a 130$^{th}$ form of this invention according to any one of the 121$^{st}$ through 123$^{rd}$ forms, the automatic transmission includes a single-pinion type second planetary gear set having a second sun gear, a second carrier and a second ring gear, and a double-pinion type third planetary gear set having a third sun gear, a third carrier and a third ring gear, the second sun gear functioning as the fourth element, the second carrier and the third carrier functioning as the fifth element, the second ring gear and the third ring gear functioning as the sixth element, and the third sun gear functioning as the seventh element.

In a 131$^{st}$ form of this invention according to any one of the 121$^{st}$ through 123$^{rd}$ forms, wherein the automatic transmission includes a double-pinion type second planetary gear set having a second sun gear, a second carrier and a second ring gear, and a single-pinion type third planetary gear set having a third sun gear, a third carrier and a third ring gear, the second sun gear functioning as the fourth element, the second ring gear and the third ring gear functioning as the fifth element, the third carrier, and the second carrier and the third sun gear functioning as the seventh element.

In a 132$^{nd}$ form of this invention according to any one of the 121$^{st}$ through 123$^{rd}$ forms, the automatic transmission includes a double-pinion type second planetary gear set having a second sun gear, a second carrier and a second ring gear, and a single-pinion type third planetary gear set having a third sun gear, a third carrier and a third ring gear, the second carrier functioning as the fourth element, the second ring gear and the third ring gear functioning as the fifth element, the third carrier functioning as the sixth element, and the second sun gear and the third sun gear functioning as the seventh element.

In a 133$^{rd}$ form of this invention according to any one of the 121$^{st}$ through 123$^{rd}$ forms, the automatic transmission includes a double-pinion type second planetary gear set having a second sun gear, a second carrier and a second ring gear, and a single-pinion type third planetary gear set having a third sun gear, a third carrier and a third ring gear, the second sun gear functioning as the fourth element, the third ring gear and the third ring gear functioning as the fifth element, the second ring gear and the third carrier functioning as the sixth element, and the second carrier and the third sun gear functioning as the seventh element.

In a 134$^{th}$ form of this invention according to any one of the 121$^{st}$ through 123$^{rd}$ forms, the automatic transmission includes a single-pinion type second planetary gear set having a second sun gear, a second carrier and a second ring gear, and a single-pinion type third planetary gear set having a third sun gear, a third carrier and a third ring gear, the second sun gear and the third sun gear functioning as the fourth element, the second carrier functioning as the fifth element, the second ring gear and the third carrier functioning as the sixth element, and the third ring gear functioning as the seventh element.

In a 135$^{th}$ form of this invention according to any one of the 121$^{st}$ through 123$^{rd}$ forms, the automatic transmission includes a single-pinion type second planetary gear set having a second sun gear, a second carrier and a second ring gear, and a single-pinion type third planetary gear set having a third sun gear, a third carrier and a third ring gear, the second sun gear functioning as the fourth element, the second carrier and the third ring gear functioning as the fifth element, the second ring gear and the third carrier functioning as the sixth element, and the third sun gear functioning as the seventh element.

In a 136$^{th}$ form of this invention according to any one of the 121$^{st}$ through 123$^{rd}$ form, the automatic transmission includes a single-pinion type second planetary gear set having a second sun gear, a second carrier and a second ring gear, and a single-pinion type third planetary gear set having a third sun gear, a third carrier and a third ring gear, the third sun gear functioning as the fourth element, the second ring gear functioning as the fifth element, the second carrier and the third carrier functioning as the sixth element, and the second sun gear and the third ring gear functioning as the seventh element.

According to a 137$^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear and the third ring gear being selectively fixed to a stationary member through a first brake, the second carrier and the third sun gear being selectively connected to the power transmitting member through a first clutch and selectively fixed to the stationary member through a second brake, the second ring gear being selectively connected to the power transmitting member through a second clutch and selectively fixed to the stationary member through a third brake, the third carrier being fixed to an output rotary member of the automatic transmission.

According to a 138$^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear being selectively connected to the power transmitting member through a first clutch, the second carrier and the third sun gear being selectively connected to the power transmitting member through a second clutch and selectively fixed to a stationary member through a first brake, the second sun gear being selectively fixed to a stationary member through a first brake, the second carrier and the third sun gear being selectively connected to the power transmitting member through a first clutch and selectively fixed to the stationary member through a second brake, the second ring gear and the third carrier being selectively connected to the power transmitting member through a second clutch and selectively fixed to the stationary member through a third brake, and the third ring gear being fixed an output rotary member of the automatic transmission.

According to a 139$^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear and the third sun gear being selectively connected to the power transmitting member through a second clutch and selectively fixed to a stationary member through a first brake, the second sun gear and the third sun gear being selectively connected to the power transmitting member through a first clutch and selectively fixed to a stationary member through a second brake, the second carrier being selectively fixed to the stationary member through a first brake, the second ring gear and the third carrier being selectively connected to the power transmitting member through a second clutch and selectively fixed to the stationary member through a third brake, and the third ring gear being fixed to an output rotary member of the automatic transmission.

According to a 140$^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear and the third sun gear being selectively connected to the power transmitting member through a first clutch and selectively fixed to a stationary member through a second brake, the second carrier being selectively connected to the power transmitting member through a second clutch and selectively fixed to the stationary member through a third brake, the second ring gear and the third ring gear being fixed to an output rotary member of the automatic transmission, and the third carrier being selectively fixed to the stationary member through a first brake.

According to a 141$^{st}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (b) the automatic transmission includes a double-pinion type second planetary gear set having a second sun gear, a second carrier and a second ring gear, and a single-pinion type third planetary gear set having a third sun gear, a third carrier and a third ring gear, the second sun gear and the third ring gear being selectively fixed to a stationary member through a first brake, the second carrier being selectively connected to the power transmitting member through a second clutch and selectively fixed to the stationary member through a third brake, the second ring gear and the third carrier being fixed to an output rotary member of the automatic transmission, the third sun gear being selectively connected to the power transmitting member through a first clutch and selectively fixed to the stationary member through a second brake.

According to a $142^{nd}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a double-pinion type third planetary gear set having a third sun gear, a third carrier and a third ring gear, the second sun gear and the third sun gear being selectively connected to the power transmitting member through a first clutch and selectively fixed to a stationary member through a second brake, the second carrier being selectively connected to the power transmitting member through a second clutch and selectively fixed to the stationary member through a third brake, the second ring gear and the third ring gear being fixed to an output rotary member of the automatic transmission, and the third carrier selectively fixed to the stationary member through a first brake.

According to a $143^{rd}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a double-pinion type third planetary gear set having a third sun gear, a third carrier and a third ring gear, the second sun gear being selectively connected to the power transmitting member through a first clutch and selectively fixed to a stationary member through a second brake, the second carrier and the third carrier being selectively connected to the power transmitting member through a second clutch and selectively fixed to the stationary member through a third brake, the second ring gear and the third ring gear being fixed to an output rotary member of the automatic transmission, the third sun gear being selectively fixed to the stationary member through a first brake.

According to a $144^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear being selectively connected to the power transmitting member through a first clutch and selectively fixed to a stationary member through a second brake, the second carrier and the third sun gear being selectively fixed to the stationary member through a first brake, the second ring gear and the third ring gear being selectively connected to the power transmitting member through a second clutch and selectively fixed to the stationary member through a third brake, the third carrier being fixed an output rotary member of the automatic transmission.

According to a $145^{th}$ form of this invention, there is provided a vehicular drive system including (a) a power distributing mechanism operable to distribute an output of an engine to a first electric motor and a power transmitting member, a step-variable automatic transmission disposed between the power transmitting member and a.drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear and the third sun gear being selectively fixed to a stationary member through a first brake, the second carrier being selectively connected to the power transmitting member through a first clutch and selectively fixed to the stationary member through a second brake, the second ring gear and the third ring being selectively connected to the power transmitting member through a second clutch and selectively fixed to the stationary member through a third brake, the third carrier being fixed an output rotary member of the automatic transmission.

According to a 146$^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a double-pinion type second planetary gear set having a second sun gear, a second carrier and a second ring gear, and a single-pinion type third planetary gear set having a third sun gear, a third carrier and a third ring gear, the second sun gear being selectively connected to the power transmitting member through a first clutch and selectively fixed to a stationary member through a second brake, the second carrier and the third sun gear being selectively fixed to the stationary member through a first brake, the second ring gear and the third carrier being fixed to an output rotary member of the automatic transmission, and the third ring gear being selectively connected to the power transmitting member through a second clutch and selectively fixed to the stationary member through a third brake.

According to a 147$^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a single-pinion type third planetary gear set having a third sun gear, a third carrier and a third ring gear, the second sun gear and the third sun gear being selectively connected to the power transmitting member through a first clutch and selectively fixed to a stationary member through a second brake, the second carrier being selectively connected to the power transmitting member through a second clutch and selectively fixed to the stationary member through a third brake, the second ring gear and the third carrier being fixed to an output rotary member of the automatic transmission, and the third ring gear being selectively fixed to the stationary member through a first brake.

According to a 148$^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a single-pinion type third planetary gear set having a third sun gear, a third carrier and a third ring gear, the second sun gear being selectively connected to the power transmitting member through a first clutch and selectively fixed to a stationary member through a second brake, the second carrier and the third ring gear being selectively connected to the power transmitting member through a second clutch and selectively fixed to the stationary member through a third brake, the second ring gear and the third carrier being fixed to an output rotary member of the automatic transmission, and the third sun gear being selectively fixed to the stationary member through a first brake.

According to a 149$^{th}$ form of this invention, there is provided a vehicular drive system including (a) a power distributing mechanism operable to distribute an output of an engine to a first electric motor and a power transmitting member, a step-variable automatic transmission disposed between the power transmitting member and a drive wheel of a vehicle, and a second electric motor disposed between the power transmitting member and the drive wheel, characterized in that (b) the power distributing mechanism includes a single-pinion type first planetary gear device having a first sun gear, a first carrier and a first ring gear, the first carrier being fixed to the engine, the first sun being fixed to the first electric motor, and the first ring gear being fixed to the power transmitting member, the power distributing mechanism further including a differential-state switching device operable to place the power distributing mechanism selectively in a differential state in which the power distributing mechanism is operable as an electrically controlled continuously variable transmission, and a locked state in which the power distributing mechanism is not operable as the electrically controlled continuously variable transmission, and (c) the automatic transmission includes a single-pinion type second planetary gear set having a second sun gear, a second carrier and a second ring gear, and a single-pinion type third planetary gear set having a third sun gear, a third carrier and a third ring gear, the second sun gear and the third ring gear being selectively fixed to a stationary member through a first brake, the second carrier and the third carrier being fixed to an output rotary member of the automatic transmission, and the second ring gear being selectively connected to the power transmitting member through a second clutch and selectively fixed to the stationary member through a third brake, and the third sun gear being selectively connected to the power transmitting member through a first clutch and selectively fixed to the stationary member through a second brake.

In a $150^{th}$ form of this invention according to any one of the $137^{th}$ through $149^{th}$ forms, the shifting-state switching device includes a switching clutch operable to connect the first carrier and the first sun gear to each other, and/or a switching brake operable fix the first sun gear to the stationary member.

According to a $151^{st}$ form of this invention, there is provided a vehicular drive system including (a) a power distributing mechanism operable to distribute an output of an engine to a first electric motor and a power transmitting member, an automatic transmission disposed between the power transmitting member and a drive wheel of a vehicle, and a second electric motor disposed between the power transmitting member and the drive wheel, characterized in that (b) the power distributing mechanism includes a planetary gear device having as three elements a sun gear, a carrier and a ring gear, the three elements consisting of a first element, a second element and a third element which are arranged in the order of the second element, the first element and the third elements in a direction from one of opposite ends of a collinear chart toward the other end, the collinear chart having straight lines indicating rotating speeds of the three elements, the first element being fixed to the engine, the second element being fixed to the first electric motor, and the third element being fixed to the power transmitting member, and (b) the automatic transmission is arranged to increase a rotating speed of the power transmitting member.

In a $152^{nd}$ form of this invention according to the $151^{st}$ form, the power distributing mechanism further includes a differential-state switching device. operable to place the power distributing mechanism selectively in a differential state in which the power distributing mechanism is operable as an electrically controlled continuously variable transmission, and a locked state in which the power distributing mechanism is not operable as the electrically controlled continuously variable transmission In the drive system according to any one of the $121^{st}$ through $150^{th}$ forms of this invention, the power distributing mechanism is controlled by the differential-state switching device, to be placed selectively in the differential state in which the power distributing mechanism is operable as an electrically controlled continuously variable transmission, and the locked state in which the power distributing mechanism is not operable as the electrically controlled continuously variable transmission. Therefore, the present drive system has not only an advantage of an improvement in the fuel economy owing to a function of a transmission whose speed ratio is electrically variable, but also an advantage of high power transmitting efficiency owing to a function of a gear type transmission capable of mechanically transmitting a vehicle drive force. Accordingly, when the engine is in a normal output state with a relatively low or medium output while the vehicle is running at a relatively low or medium running speed, the power distributing mechanism is placed in the differential state, assuring a high degree of fuel economy of the vehicle. When the vehicle is running at a relatively high speed, on the other hand, the power distributing mechanism is placed in the locked state in which the output of the engine is transmitted to the drive wheel primarily through a mechanical power transmitting path, so that the fuel economy is improved owing to reduction of a loss of conversion of a mechanical energy into an electric energy, which loss would take place when the drive system is operated as the transmission whose speed ratio is electrically variable. When the engine is in a high-output state, the power distributing mechanism is also placed in the locked state. Therefore, the power distributing mechanism is operated as the transmission whose speed ratio is electrically variable, only when the vehicle speed is relatively low or medium or when the engine output is relatively low or medium, so that the required amount of electric energy generated by the electric motor that is, the maximum amount of electric energy that must be transmitted from the electric motor can be reduced, making it possible to minimize the required sizes of the electric motor, and the required size of the drive system including the electric motor.

In the $123^{rd}$ form of this invention, the drive system having five forward drive positions when the power distributing mechanism is placed in the locked state is available with a small size, particularly, in the dimension in its axial direction.

In the $151^{st}$ form of the invention, the rotating speed of the power transmitting member is increased by the automatic transmission, so that the power transmitting member, and the third element of the planetary gear set which is rotated with the power transmitting member, can be rotated at a comparatively low speed, whereby there is not a high degree of opportunity wherein the first electric motor M1 fixed to the first element must be rotated in the negative direction, that is must be operated by application of an electric energy thereto. Accordingly, the fuel economy can be improved.

BRIEF DESCRIPTION OF DRAWINGS

[FIG. 90] This figure is a table indicating gear positions of the drive system and combinations of hydraulically operated frictional coupling devices to be engaged to establish the respective gear positions.

NOMENCLATURE OF ELEMENTS [0215]

Figures 1, 2:
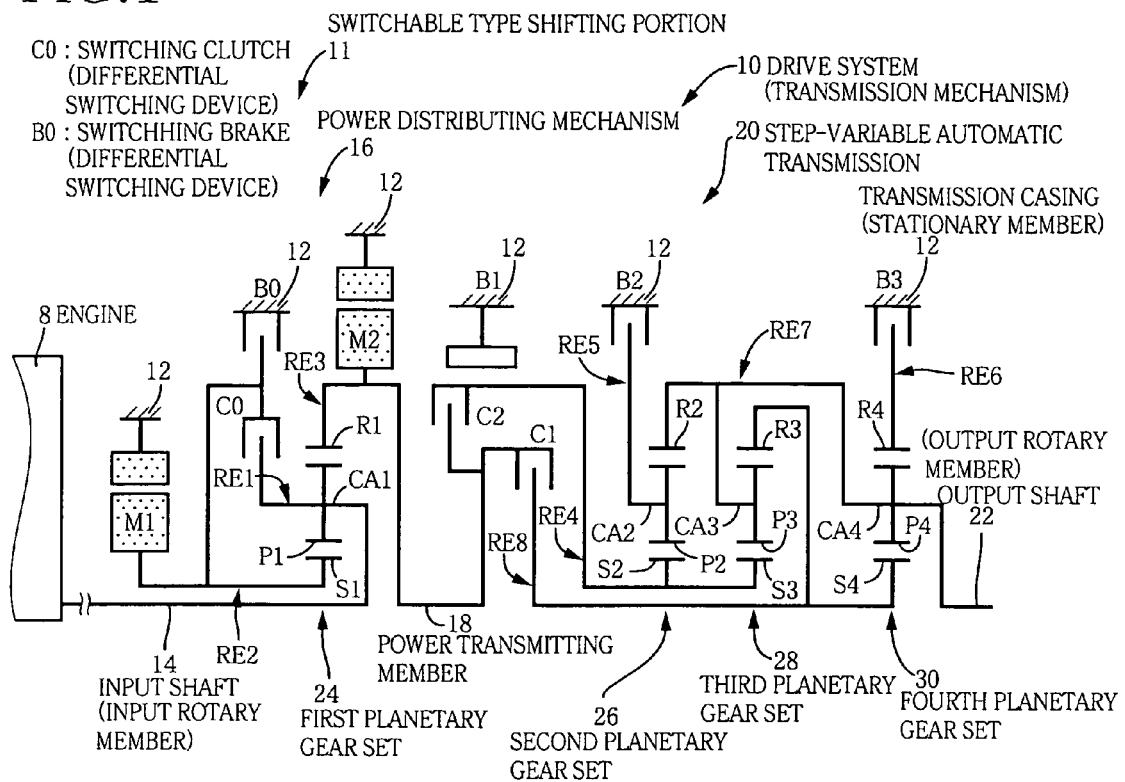
[FIG. 1] This figure is a schematic view for explaining an arrangement of a drive system of a hybrid vehicle according to one embodiment of the present invention.
[FIG. 2] This figure is a table indicating shifting actions of the drive system of the hybrid vehicle of the embodiment of FIG. 1 operable in a continuously variable shifting state or a step-variable shifting state, in relation to different combinations of operating states of hydraulically operated frictional coupling devices to effect the respective shifting actions.

8: Engine
10, 70, 80, 92, 110, 120, 130, 140, 150, 160, 170, 180, 190, 200, 210, 220: Drive system (Switchable type transmission mechanism)
11, 81, 93: Differential portion (Switchable type shifting portion)
12: Transmission casing (Stationary member)
14: Input shaft
16, 84, 94: Power distributing mechanism (Differential gear device)
18: Power transmitting member (Output shaft)
20, 72, 86, 96, 112, 172: Step-variable automatic transmission (Step-variable automatic transmission portion; Step-variable shifting portion; Automatic transmission portion)
22: Output shaft (Output rotary member)
24: First planetary gear set (Single-pinion type planetary gear set)
26: Second planetary gear set
28: Third planetary gear set
30: Fourth planetary gear set
32: Differential drive gear (Output rotary member)
34: Differential ring gear
36: Differential gear device
37: Drive axle
38: Drive wheels
40: Electronic control device
42: Hydraulic control unit
44: Seesaw switch
46: Manually operable shifting device
48: Shift lever
50: Switching control means
52: HB control means
54: Step-variable shifting control means
56: Shifting-map memory means
58: Inverter
60: Electric-energy storage device
62: High-speed-running determining means
64: High-output-running determining means
66: Electric-path-function diagnosing means
67: Shift-position determining means
68: High-speed-gear determining means
82: First planetary gear set (Double-pinion type planetary gear set)
84: Second planetary gear set
90: Third planetary gear set
98: Second planetary gear set
100: Third planetary gear set
M1: First electric motor
M2: Second electric motor
C0: Switching clutch (Differential-state switching device)
B0: Switching brake (Differential-state switching device)
CG: Counter gear pair (Power transmitting member)
152: Step-variable shifting control means
156: Hybrid control means (Drive-power-source selection control means)
159: Switching control means
162, 171: Step-variable-shifting control map
164, 172: Drive-power-source selection control map
166, 176: Switching control map
280: Fuel-economy curve selecting means
282: Fuel-economy curve memory means
284: Power-transmitting-efficiency calculating means
286: Fuel-consumption-ratio calculating means
288: Shifting-state fuel-economy calculating means
290: Fuel consumption sensor
380: Continuously-variable-shifting-run determining means
386: Continuously-variable-shifting-run speed-ratio control means
388: Target-engine-speed calculating means
390: Two-speed-ratios determining means
410, 480, 490, 500, 510, 520, 530, 540, 550, 560, 570: Drive system
420, 492, 512, 422, 532, 542, 552, 562: Step-variable automatic transmission
426, 494, 514, 524, 534, 544, 554, 564: Second planetary gear set
428, 496, 516, 526, 536, 546, 556, 566: Third planetary gear set
610, 680, 690, 700, 710, 720, 730, 740, 750, 760, 770, 780, 790, 800, 810, 820: Drive system 620, 692, 712, 732, 742, 752, 762, 772, 782, 792, 802, 812, 822: Step-variable automatic transmission
626, 694, 714, 734, 744, 754, 764, 774, 784, 794, 804, 814, 824: Second planetary gear set
628, 696, 716, 736, 746, 756, 766, 776, 786, 796, 806, 816, 826: Third planetary gear set

BEST MODE FOR CARRYING OUT THE INVENTION

Referring to the drawings, there will be described in detail the embodiments of the present invention.

Embodiment 1

Figure 7:
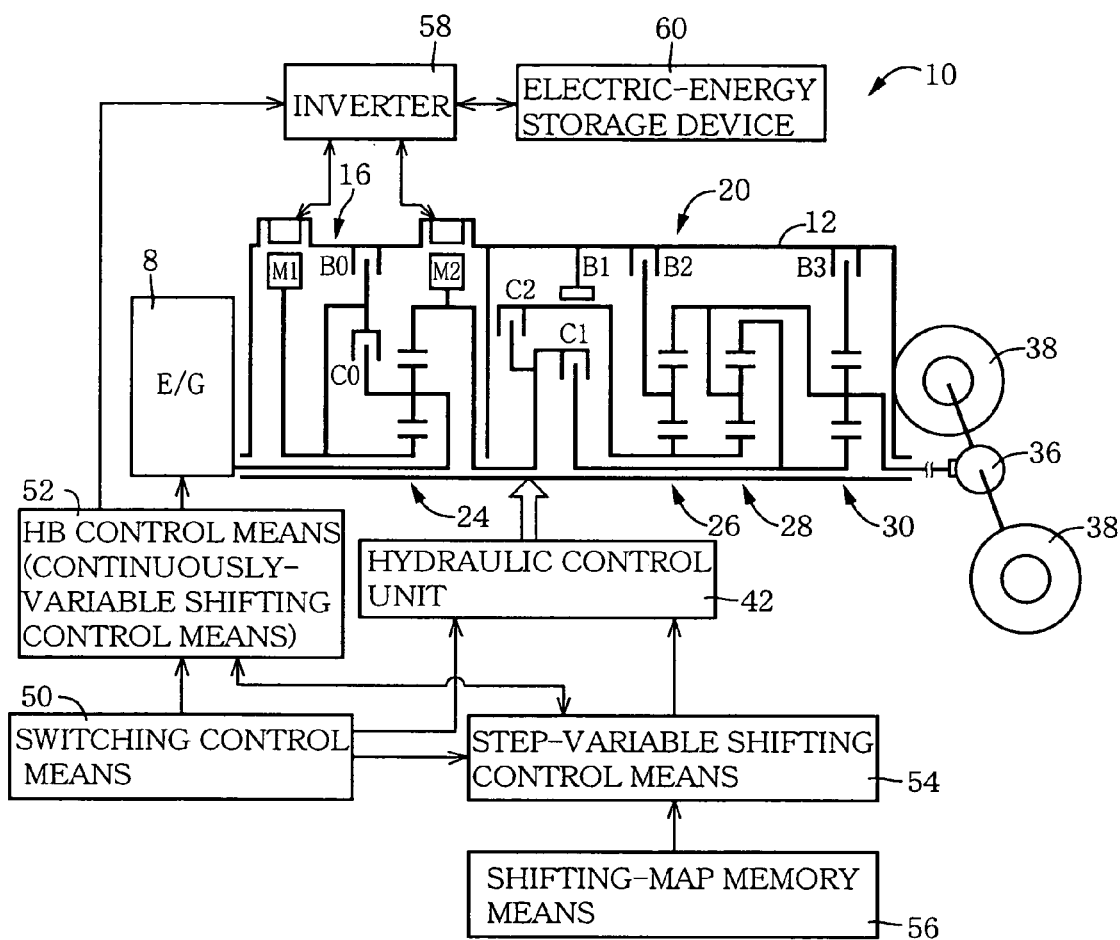
[FIG. 7] This figure is a functional block diagram for explaining major control functions performed by the electronic control device of FIG. 6.

FIG. 1 is a schematic view explaining a drive system 10 for a hybrid vehicle, which includes a control device according to one embodiment of this invention. The drive system 10 shown in FIG. 1 includes: an input rotary member in the form of an input shaft 14 disposed on a common axis in a transmission casing 12 (hereinafter abbreviated as "casing 12") functioning as a stationary member attached to a body of the vehicle; a differential mechanism in the form of a power distributing mechanism 16 connected to the input shaft 14 either directly, or indirectly via a pulsation absorbing damper (vibration damping device) not shown; a step-variable or multiple-step automatic transmission 20 interposed between and connected in series via a power transmitting member 18 (power transmitting shaft) to the power distributing mechanism 16 and an output shaft 22; and an output rotary member in the form of the above-indicated output shaft 22 connected to the automatic transmission 20. The input shaft 12, power distributing mechanism 16, automatic transmission 20 and output shaft 22 are connected in series with each other. This drive system 10 is suitably used for a transverse FR vehicle (front-engine, rear-drive vehicle), and is disposed between a drive power source in the form of an engine 8 and a pair of drive wheels 38, to transmit a vehicle drive force to the pair of drive wheels 38 through a differential gear device 36 (final speed reduction gear) and a pair of drive axles, as shown in FIG. 7. It is noted that a lower half of the drive system 10, which is constructed symmetrically with respect to its axis, is omitted in FIG. 1. This is also true in each of the other embodiments described below.

The drive system 10 has a differential portion 11 also functioning as a switchable type shifting portion, which is operable in a two-step-variable shifting state and an electrically established continuously-variable shifting state. This differential portion 11 includes: a first electric motor M1; the above-described power distributing mechanism 16 functioning as the differential mechanism operable to mechanically distribute the output of the engine 8 transmitted to the input shaft 14, to the first electric motor M1 and the power transmitting member 18; and a second electric motor M2 rotatable with the power transmitting member 18.

The power distributing mechanism 16 is a mechanical device arranged to mechanically synthesize or distribute the output of the engine 8 received by the input shaft 14, that is, to distribute the output of the engine 8 to the first electric motor M1 and the power transmitting member 18, or to synthesize the output of the engine 8 and the output of the first electric motor M1 and transmit a sum of these outputs to the power transmitting member 18. While the second electric motor M2 is arranged to be rotated with the power transmitting member 18 in the present embodiment, the second electric motor M2 may be disposed at any desired position between the power transmitting member 18 and the output shaft 22. In the present embodiment, each of the first electric motor M1 and the second electric motor M2 is a so-called motor/generator also functioning as an electric generator. The first electric motor M1 should function at least as an electric generator operable to generate an electric energy while generating a reaction force, and the second electric motor M2 should function at least as an electric motor operable to generate a vehicle drive force. Both of the first and second electric motors M1, M2 cooperate with the engine 8 to function as a drive power source for driving the vehicle.

The power distributing mechanism 16 includes, as major components, a first planetary gear set 24 of single pinion type having a gear ratio $\rho 1$ of about 0.418, for example, a switching clutch C0 and a switching brake B1. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are released, the power distributing mechanism 16 is placed in a differential state in which the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, in the differential state in which a speed ratio γ0 (rotating speed of the input shaft 14/rotating speed of the power transmitting member 18) of the power distributing mechanism 16 is electrically changed from a minimum value γ0min to a maximum value γ0max, for instance, in the continuously-variable shifting state in which the power distributing mechanism 16 functions as an electrically controlled continuously variable transmission the speed ratio γ0 of which is continuously variable from the minimum value γ0min to the maximum value γ0max.

When the switching clutch C0 or brake B0 is engaged during running of the vehicle with the output of the engine 8 while the power distributing mechanism 16 is placed in the continuously-variable shifting state, the mechanism 16 is brought into a non-differential state or locked state in which the differential function is not available. Described in detail, when the switching clutch C0 is engaged, the first sun gear S1 and the first carrier CA1 are connected together, so that the power distributing mechanism 16 is placed in the locked state or non-differential state in which the three rotary elements of the first planetary gear set 24 consisting of the first sun gear S1, first carrier CA1 and first ring gear R1 are rotatable as a unit, and so that the switchable type shifting portion 11 is also placed in a non-differential state. In this non-differential state, the rotating speed of the engine 8 and the rotating speed of the power transmitting member 18 are made equal to each other, so that the power distributing mechanism 16 is placed in a fixed-speed-ratio shifting state or step-variable shifting state in which the mechanism 16 functions as a transmission having a fixed speed ratio γ0 equal to 1. When the switching brake B0 is engaged in place of the switching clutch C0, the first sun gear Si is fixed to the transmission casing 12, so that the power distributing mechanism 16 is placed in the locked or non-differential state in which the first sun gear S1 is not rotatable, while the switchable type shifting portion 11 is also placed in the non-differential state. Since the rotating speed of the first ring gear R1 is made higher than that of the first carrier CA1, the power distributing mechanism 16 is placed in the step-variable shifting state in which the mechanism 16 functions as a speed-increasing transmission having a fixed speed ratio γ0 smaller than 1, for example, about 0.7.

In the present embodiment described above, the switching clutch C0 and brake B0 function as a differential-state switching device operable to selectively place the power distributing mechanism 16 in the differential state (continuously-variable shifting state or non-locked state) in which the mechanism 16 functions as an electrically controlled continuously variable transmission the speed ratio of which is continuously variable, and in the non-differential or locked state in which the mechanism 16 does not function as the electrically controlled continuously variable transmission. Namely, the switching clutch C0 and brake B0 function as the differential-state switching device operable to switch the power distributing mechanism 16 between a differential state, and a fixed-speed-ratio shifting state in which the mechanism 16 functions as a transmission having a single gear position with one speed ratio or a plurality of gear positions with respective speed ratios. It is also noted that the differential portion 11 consisting of the first electric motor M1, the second electric motor M2 and the power distributing mechanism 16 cooperate to function as a shifting-state switchable type shifting portion (mechanism) which is switchable between a continuously-variable shifting state or state in which the shifting portion 11 is operated as an electrically controlled continuously variable transmission the speed ratio of which is continuously variable, and a locked state in which the shifting portion 11 does not function as the electrically controlled continuously variable transmission but functions as a transmission having a single gear position with one speed ratio or a plurality of gear positions with respective speed ratios. The power distributing mechanism 16 described above functions as a switchable type differential (planetary) gear device switchable between a locked state and a non-locked state.

In other words, the above-described switching clutch C0 and switching brake B0 used in the present embodiment function as a differential-state switching device operable to selectively place the power distributing mechanism 16 in the differential or non-locked state and in the non-differential or locked state. Namely, the switching clutch C0 and brake B0 function as a differential-state switching device operable to switch the switchable type shifting portion 11 between a non-locked state (differential state) or an electrically established continuously-variable shifting state, and a locked state (non-differential state) or a fixed-speed-ratio shifting state. In the non-locked state, the shifting portion 11 functions as an electrically controlled differential device. In the electrically established continuously-variable shifting state, the shifting portion 11 functions as an electrically controlled continuously variable transmission. In the locked state, the shifting portion 11 does not function as the electrically controlled differential device. In the fixed-speed-ratio shifting state, the shifting portion 11 does not function as an electrically controlled continuously variable transmission, but functions as a transmission having a single gear position with one speed ratio or a plurality of gear positions with respective speed ratios. The switchable type shifting portion 11, which includes the power distributing mechanism 16 provided with the switching clutch C0 and brake B0, functions as a switchable type differential gear device switchable between a locked state and a non-locked state.

The automatic transmission 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission 20, the second sun gear S2 and the third sun gear S3 are integrally fixed to each other as a unit, selectively connected to the power transmitting member 18 through a second clutch C2, and selectively fixed to the transmission casing 12 through a first brake B1. The fourth ring gear R4 is selectively fixed to the transmission casing 12 through a third brake B3, and the second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are superposed on each other and which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the drive system 10 constructed as described above, one of a first-gear position (first-speed position) through a fifth-gear position (fifth-speed position), a reverse-gear position (rear-drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having a single gear position with one speed ratio or a plurality of gear positions with respective speed ratios, as well as in the continuously-variable shifting state in which the mechanism 16 is operable as a continuously variable transmission, as described above. In the present drive system 10, therefore, a step-variable transmission is constituted by the automatic transmission 20, and the power distributing mechanism 16 which is placed in the fixed-speed-ratio shifting state by engagement of the switching clutch C0 or switching brake B0. Further, a continuously variable transmission is constituted by the automatic transmission 20, and the power distributing mechanism 16 which is placed in the continuously-variable shifting state, with none of the switching clutch C0 and brake B0 being engaged. In other words, the transmission system (drive system) 10 is switched to the step-variable shifting state by engaging one of the switching clutch C0 and switching brake B0, and switched to the continuously-variable shifting state by releasing both of the switching clutch C0 and brake B0. Namely, the drive system 10 functions as a transmission mechanism of switchable type switchable between the continuously-variable shifting state in which the drive system 10 is operable as an electrically controlled continuously variable transmission, and the step-variable shifting state in which the drive system 10 operable as the step-variable transmission. The differential portion (switchable type shifting portion) 11 is also considered to be a transmission switchable between the step-variable shifting state and the continuously-variable shifting state.

Where the drive system 10 functions as the step-variable transmission, for example, the first-gear position having the highest speed ratio γ1 of about 3.357, for example, is established by engaging actions of the switching clutch C0, first clutch C1 and third brake B3, and the second-gear position having the speed ratio γ2 of about 2.180, for example, which is lower than the speed ratio γ1, is established by engaging actions of the switching clutch C0, first clutch C1 and second brake B2, as indicated in FIG. 2. Further, the third-gear position having the speed ratio γ3 of about 1.427, for example, which is lower than the speed ratio γ2, is established by engaging actions of the switching clutch C0, first clutch C1 and first brake B1, and the fourth-gear position having the speed ratio γ4 of about 1.000, for example, which is lower than the speed ratio γ3, is established by engaging actions of the switching clutch C0, first clutch C1 and second clutch C2. The fifth-gear position having the speed ratio γ5 of about 0.705, for example, which is smaller than the speed ratio γ4, is established by engaging actions of the first clutch C1, second clutch C2 and switching brake B0. Further, the reverse-gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the drive system 10 functions as the continuously-variable transmission, on the other hand, the switching clutch C0 and the switching brake B0 are both released, as indicated in FIG. 2, so that the power distributing mechanism 16 functions as the continuously variable transmission, while the automatic transmission 10 connected in series to the power distributing mechanism 16 functions as the step-variable transmission, whereby the speed of the rotary motion transmitted to the automatic transmission 20 placed in one of the first-gear, second-gear, third-gear and fourth-gear positions, namely, the rotating speed of the power transmitting member 18 is continuously changed, so that the speed ratio of the drive system when the automatic transmission 20 is placed in one of those gear positions is continuously variable over a predetermined range. Accordingly, the speed ratio of the automatic transmission 20 is continuously variable across the adjacent gear positions, whereby the overall speed ratio γT of the drive system 10 is continuously variable.

Figure 3:
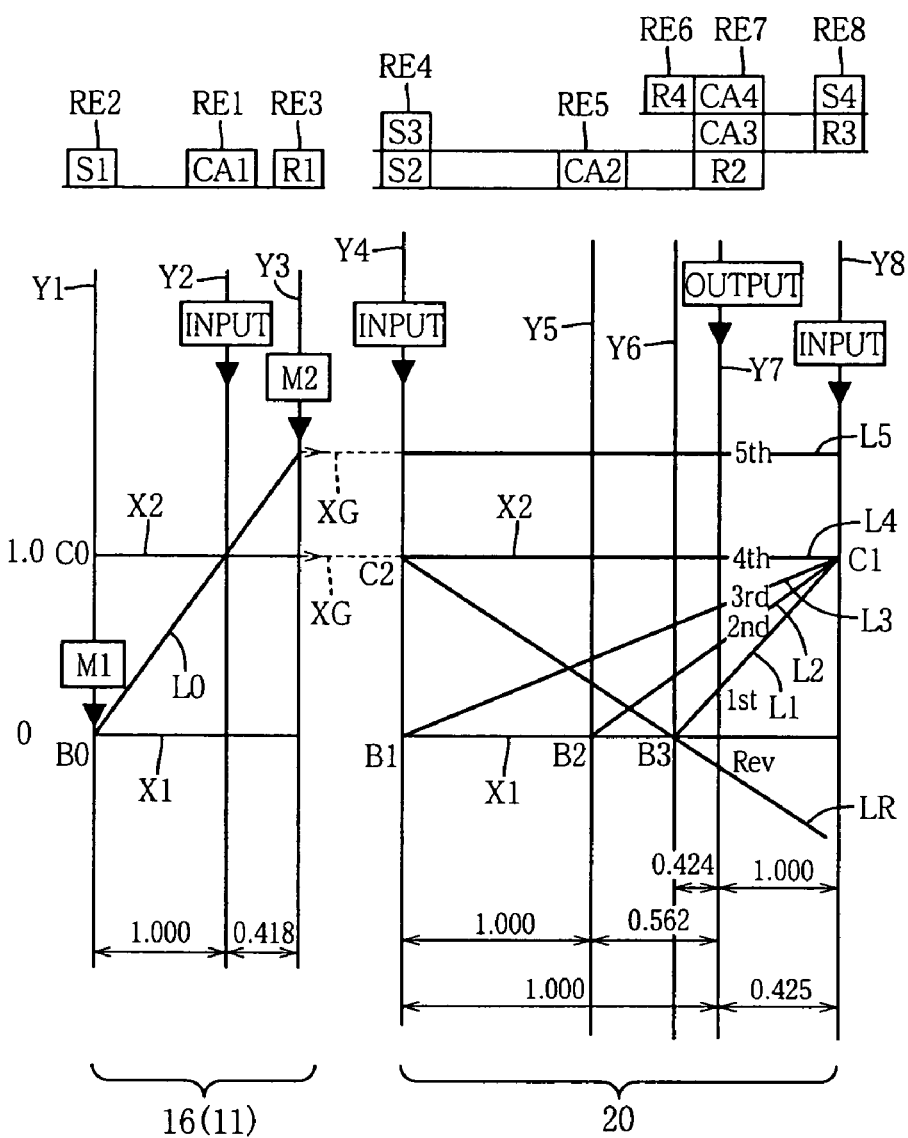
[FIG. 3] This figure is a collinear chart showing relative rotating speeds of rotary elements of the drive system of the hybrid vehicle of the embodiment of FIG. 1 operated in the step-variable shifting state, in different gear positions of the drive system.

The collinear chart of FIG. 3 indicates, by straight lines, a relationship among the rotating speeds of the rotary elements in each of the gear positions of the drive system 10, which is constituted by the differential portion 11 or power distributing mechanism 16 functioning as the continuously-variable shifting portion or first shifting portion, and the automatic transmission 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 which principally constitutes the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. That is, the distances between the sun gear and carrier of each of the second, third and fourth planetary gear sets 26, 28, 30 corresponds to "1", while the distances between the carrier and ring gear of each of those planetary gear sets 26 28, 30 corresponds to the gear ratio ρ.

Referring to the collinear chart of FIG. 3, the power distributing mechanism (continuously variable shifting portion) 16 or differential portion 11 of the drive system (transmission mechanism) 10 is arranged such that the first rotary element RE1 (first carrier CA1), which is one of the three rotary elements of the first planetary gear set 24, is integrally fixed to the input shaft 14 and selectively connected to another rotary element in the form of the first sun gear S1 through the switching clutch C0, and this rotary element RE2 (first sun gear S1) is fixed to the first electric motor M1 and selectively fixed to the transmission casing 12 through the switching brake B0, while the third rotary element RE3 (first ring gear R1) is fixed to the power transmitting member 18 and the second electric motor M2, so that a rotary motion of the input shaft 14 is transmitted to the automatic transmission (step-variable transmission) 20 through the power transmitting member 18. A relationship between the rotating speeds of the first sun gear S1 and the first ring gear R1 is represented by an inclined straight line L0 which passes a point of intersection between the lines Y2 and X2. When the power distributing mechanism 16 is brought into the continuously-variable shifting state by releasing actions of the switching clutch C0 and brake B0, for instance, the rotating speed of the first sun gear Si represented by a point of intersection between the line L0 and the vertical line Y1 is raised or lowered by controlling the reaction force generated by an operation of the first electric motor M1 to generate an electric energy, so that the rotating speed of the first ring gear R1 represented by a point of intersection between the line L0 and the vertical line Y3 is lowered or raised. When the switching clutch C0 is engaged, the first sun gear S1 and the first carrier CA1 are connected to each other, and the above-indicated three rotary elements are rotated as a unit, so that the line L0 is aligned with the horizontal line X2, so that the power transmitting member 18 is rotated at a speed equal to the engine speed NE. When the switching brake B0 is engaged, on the other hand, the rotation of the first sun gear S1 is stopped, the line L0 is inclined in the state indicated in FIG. 3, so that the rotating speed of the first ring gear R1, that is, the rotation of the power transmitting member 18 represented by a point of intersection between the lines L0 and Y3 is made higher than the engine speed NE and transmitted to the automatic transmission 20.

Figure 4:
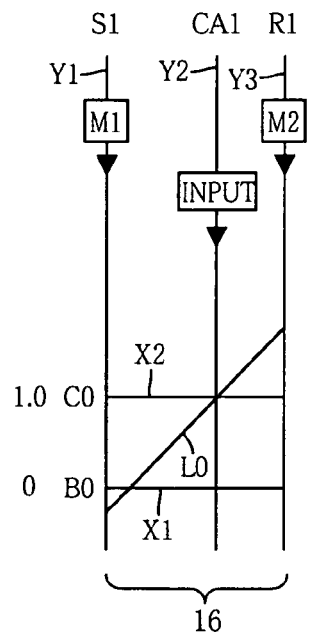
[FIG. 4] This figure is a view showing an example of an operating state of a power distributing mechanism of the drive system when switched to the continuously-variable shifting state, the view corresponding to a part of the collinear chart of FIG. 3 which shows the power distributing mechanism.
Figure 5:
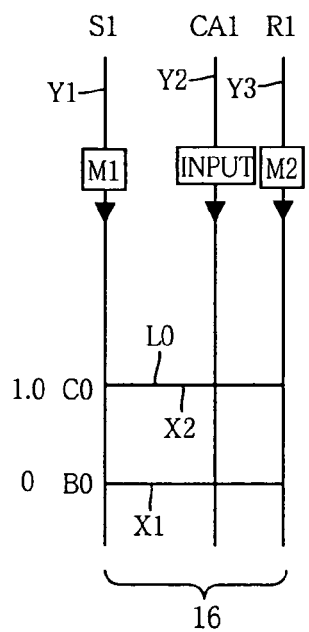
[FIG. 5] This figure is a view showing the operating state of the power distributing mechanism 16 of the drive system when switched to the step-variable shifting state by engagement of a switching clutch C0, the view corresponding to the part of the collinear chart of FIG. 3 which shows the power distributing mechanism.

FIGS. 4 and 5 correspond to a part of the collinear chart of FIG. 3 which shows the power distributing mechanism 16. FIG. 4 shows an example of an operating state of the power distributing mechanism 16 placed in the continuously-variable shifting state with the switching clutch C0 and the switching brake B0 held in the released state. The rotating speed of the first sun gear S1 represented by the point of intersection between the straight line L0 and vertical line Y1 is raised or lowered by controlling the reaction force generated by an operation of the first electric motor M1 to generate an electric energy, so that the rotating speed of the first ring gear R1 represented by the point of intersection between the lines L0 and Y3 is lowered or raised.

FIG. 5 shows an example of an operating state of the power distributing mechanism 16 placed in the fixed-speed-ratio shifting state (step-variable shifting state) with the switching clutch C0 held in the engaged state. When the first sun gear S1 and the first carrier CA1 are connected to each other in this fixed-speed-ratio shifting state, the three rotary elements indicated above are rotated as a unit, so that the line L0 is aligned with the horizontal line X2, whereby the power transmitting member 18 is rotated at a speed equal to the engine speed NE. When the switching brake B0 is engaged, on the other hand, the rotation of the power transmitting member 18 is stopped, and the power distributing mechanism 16 is placed in the non-differential state in which the mechanism 16 functions as a speed-increasing device, so that the straight line L0 is inclined in the state indicated in FIG. 3, whereby the rotating speed of the first ring gear R1, that is, the rotation of the power transmitting member 18 represented by a point of intersection between the straight line L0 and vertical line Y3 is made higher than the engine speed $N_E$ and transmitted to the automatic transmission 20.

In the automatic transmission 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission 20 is placed in the first-speed position. The rotating speed of the output shaft 22 in the first-speed position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1. Similarly, the rotating speed of the output shaft 22 in the second-speed position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third-speed position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth-speed position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first-speed through fourth-speed positions in which the switching clutch C0 is placed in the engaged state, the eighth rotary element RE8 is rotated at the same speed as the engine speed $N_E$, with the drive force received from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth-speed position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22. The rotating speed of the output shaft 22 in the reverse-gear position R established by the second clutch C2 and third brake B3 is represented by a point of intersection between an inclined straight line LR determined by those engaging actions and the vertical line Y7 indicative of the rotating speed of the seventh rotary element RE7 fixed to the output shaft 22.

Figure 6:
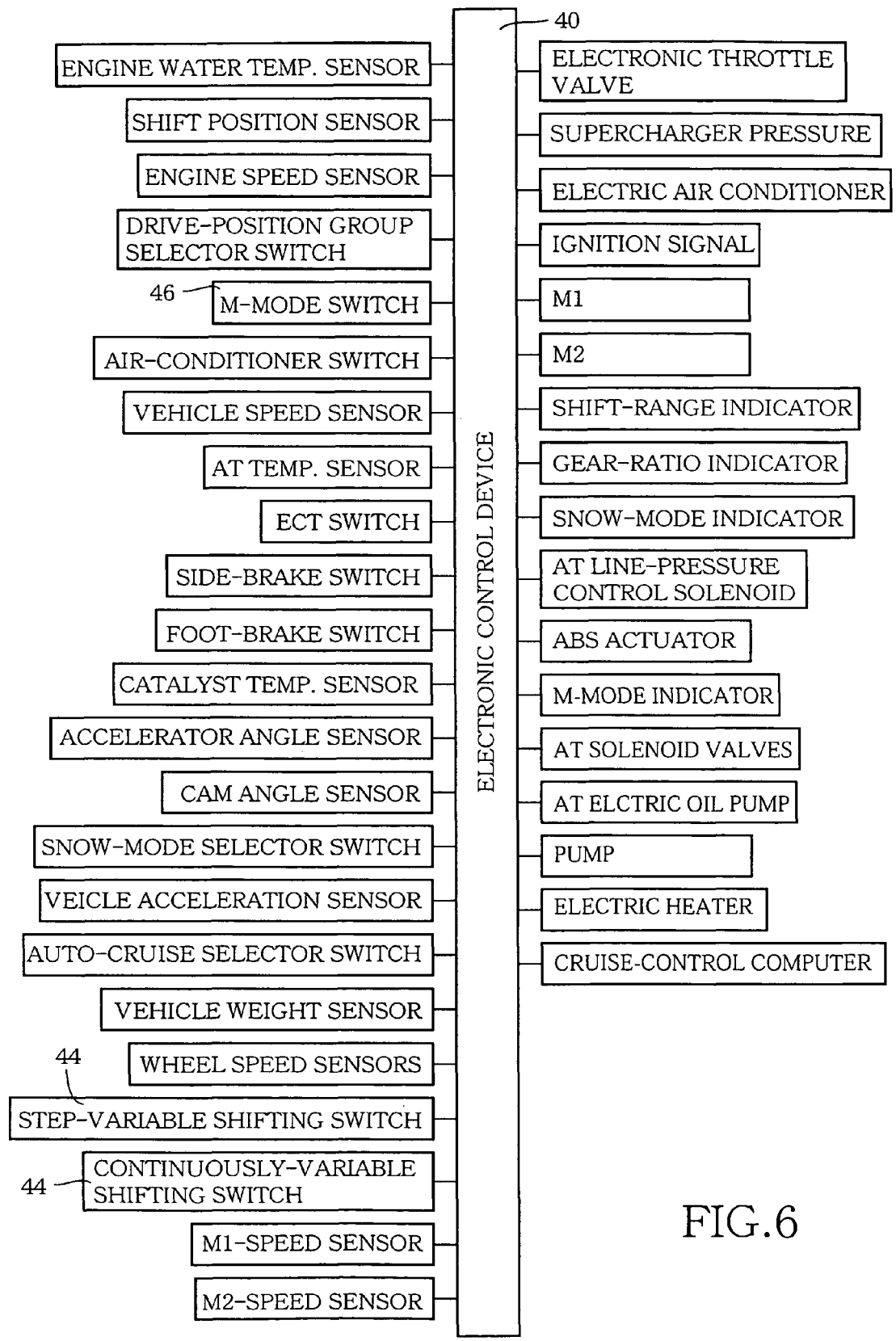
[FIG. 6] This figure is a view for explaining input and output signals of an electronic control device provided in the drive system of the embodiment of FIG. 1.

FIG. 6 illustrates signals received by an electronic control device 40 provided to control the drive system 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission 20.

The electronic control device 40 is arranged to receive, from various sensors and switches shown in FIG. 6, various signals such as: a signal indicative of a temperature of cooling water of the engine; a signal indicative of a selected operating position of a shift lever; a signal indicative of the operating speed $N_E$ of the engine 8; a signal indicative of a value indicating a selected group of forward-drive positions of the drive system; a signal indicative of an M mode (motor drive mode); a signal indicative of an operated state of an air conditioner; a signal indicative of a vehicle speed corresponding to the rotating speed of the output shaft 22; a signal indicative of a temperature of a working oil of the automatic transmission 20; a signal indicative of an operated state of a side brake; a signal indicative of an operated state of a foot brake; a signal indicative of a temperature of a catalyst; a signal indicative of an angle of operation of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the power distributing mechanism 16 in the fixed-speed-ratio shifting state in which the drive system 10 functions as a step-variable transmission; a signal indicative of a continuously-variable shifting switch provided to place the power distributing mechanism 16 in the continuously variable-shifting state in which the drive system 10 functions as the continuously variable transmission; a signal indicative of a rotating speed $N_{M1}$ of the first electric motor M1; and a signal indicative of a rotating speed $N_{M2}$ of the second electric motor M2. The electronic control device 40 is further arranged to generate various signals such as: a signal to drive a throttle actuator for controlling an angle of opening of a throttle valve; a signal to adjust a pressure of a supercharger; a signal to operate the electric air conditioner; a signal for controlling an ignition timing of the engine 8; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the power distributing mechanism 16 and the automatic transmission 20; a signal to operate an electric oil pump used as a hydraulic pressure source for the hydraulic control unit 42; a signal to drive an electric heater; and a signal to be applied to a cruise-control computer.

FIG. 7 is a functional block diagram for explaining a method of controlling the drive system 10, that is, major control functions performed by the electronic control device 40. Switching control means 50 is arranged to detect a condition of the hybrid vehicle on the basis of the actual operating speed $N_E$ of the engine 8, and a drive-force-related value relating to the drive force of the hybrid vehicle, such as an output torque $T_E$ of the engine, and determine, according to a stored relationship (switching map) shown in FIG. 8 by way of example, whether the detected vehicle condition is in a continuously variable shifting region for placing the drive system 10 in the continuously-variable shifting state, or in a step-variable shifting region for placing the drive system 10 in the step-variable shifting state. When the switching control means 50 determines that the vehicle condition is in the step-variable shifting region, the switching control means 50 disables hybrid control means 52 to effect a hybrid control or continuously-variable shifting control, and enables step-variable shifting control means 54 to effect a predetermined step-variable shifting control. In this case, the step-variable shifting control means 54 effects an automatic shifting control according to a shifting boundary line map (not shown) stored in shifting-map memory means 56. FIG. 2 indicates the combinations of the operating states of the hydraulically operated frictional coupling devices C0, C1, C2, B0, B1, B2 and B3, which are selectively engaged for effecting the step-variable shifting control. In this step-variable automatic shifting control mode, the power distributing mechanism 16 functions as an auxiliary transmission having a fixed speed ratio γ0 of 1, with the switching clutch C0 placed in the engaged state, when the drive system is placed in any one of the first-speed position through the fourth-speed position. When the drive system is placed in the fifth-speed position, the switching brake B0 is engaged in place of the switching clutch C0, so that the power distributing mechanism 16 functions as an auxiliary transmission having a fixed speed ratio γ0 of about 0.7. In the step-variable automatic shifting control mode, therefore, the drive system 10 which includes the power distributing mechanism 16 functioning as the auxiliary transmission, and the automatic transmission 20, functions as a so-called automatic transmission.

The drive-force-related value indicated above is a parameter corresponding to the drive force of the vehicle, which may be an output torque $T_{OUT}$ of the automatic transmission 20, an engine output torque $T_E$ or an acceleration value of the vehicle, as well as a drive torque or drive force of drive wheels 38. The engine output torque $T_E$ may be an actual value calculated on the basis of the operating angle of the accelerator pedal or the opening angle of the throttle valve (or intake air quantity, air/fuel ratio or amount of fuel injection) and the engine speed $N_E$, or an estimated value of the engine output torque $T_E$ or required vehicle drive force which is calculated on the basis of the amount of operation of the accelerator pedal by the vehicle operator or the operating angle of the throttle valve. The vehicle drive torque may be calculated on the basis of not only the output torque $T_{OUT}$, etc., but also the ratio of a differential gear device of and the radius of the drive wheels 38, or may be directly detected by a torque sensor or the like.

When the switching control means 50 determines that the vehicle condition represented by the engine speed $N_E$ and the engine output torque $T_E$ is in the continuously-variable shifting region, on the other hand, the switching control means 50 commands the hydraulic control unit 42 to release the switching clutch C0 and the switching brake B0 for placing the power distributing mechanism 16 in the electrically established continuously-variable shifting state. At the same time, the switching control means 50 enables the hybrid control means 52 to effect the hybrid control, and commands the step-variable shifting control means 54 to select and hold a predetermined one of the gear positions, or to permit an automatic shifting control according to the shifting boundary line map stored in the shifting-map memory means 56. In the latter case, the variable-step shifting control means 54 effects the automatic shifting control by suitably selecting the combinations of the operating states of the frictional coupling devices indicated in the table of FIG. 2, except the combinations including the engagement of the switching clutch C0 and brake B0. Thus, the power distributing mechanism 16 functions as the continuously variable transmission while the automatic transmission connected in series to the power distributing mechanism 16 functions as the step-variable transmission, so that the drive system provides a sufficient vehicle drive force, such that the speed of the rotary motion transmitted to the automatic transmission 20 placed in one of the first-speed, second-speed, third-speed and fourth-gear positions, namely, the rotating speed of the power transmitting member 18 is continuously changed, so that the speed ratio of the drive system when the automatic transmission 20 is placed in one of those gear positions is continuously variable over a predetermined range. Accordingly, the speed ratio of the automatic transmission 20 is continuously variable through the adjacent gear positions, whereby the overall speed ratio $\gamma T$ of the drive system 10 is continuously variable.

The hybrid control means 52 controls the engine 8 to be operated with high efficiency, and controls the first electric motor M1 and the second electric motor M2, so as to establish an optimum proportion of the drive forces which are produced by the engine 8, and the first electric motor M1 and/or the second electric motor M2. For instance, the hybrid control means 52 calculates the output as required by the vehicle operator at the present running speed of the vehicle, on the basis of the operating amount of the accelerator pedal and the vehicle running speed, and calculate a required vehicle drive force on the basis of the calculated required output and a required amount of generation of an electric energy by the first electric motor M1. On the basis of the calculated required vehicle drive force, the hybrid control means 52 calculates desired speed $N_E$ and total output of the engine 8, and controls the actual output of the engine 8 and the amount of generation of the electric energy by the first electric motor M1, according to the calculated desired speed and total output of the engine. The hybrid control means 52 is arranged to effect the above-described hybrid control while taking account of the presently selected gear position of the automatic transmission 20, or controls the shifting operation of the automatic transmission 20 so as to improve the fuel economy of the engine. In the hybrid control, the power distributing mechanism 16 is controlled to function as the electrically controlled continuously-variable transmission, for optimum coordination of the engine speed $N_E$ and vehicle speed for efficient operation of the engine 8, and the rotating speed of the power transmitting member 18 determined by the selected gear position of the automatic transmission 20. That is, the hybrid control means 52 determines a target value of the overall speed ratio $\gamma T$ of the drive system 10, so that the engine 8 is operated according a stored highest-fuel-economy curve that satisfies both of the desired operating efficiency and the highest fuel economy of the engine 8. The hybrid control means 52 controls the speed ratio $\gamma 0$ of the power distributing mechanism 16, so as to obtain the target value of the overall speed ratio $\gamma T$, so that the overall speed ratio $\gamma T$ can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, or subsequently consumed by the first electric motor M1. A drive force produced by an operation of the second electric motor M1 or first electric motor M1 with the electric energy is transmitted to the power transmitting member 18. Thus, the drive system is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2.

It is also noted that the hybrid control means 52 is further arranged to establish a so-called "motor starting and drive" mode in which the vehicle is started and driven with only the electric motor (e.g., second electric motor M2) used as the drive power source, by utilizing the electric CVT function (differential function) of the switchable type shifting portion 11, irrespective of whether the engine 8 is in the non-operated state or in the idling state. Generally, this motor starting and drive mode is established when the vehicle condition is in a region of a comparatively low value of the output torque $T_{OUT}$ or the engine torque $T_E$, in which the engine efficiency is comparatively low, or in a region of a comparatively low value of the vehicle speed V or a region of a comparatively low value of the vehicle load (e.g., a region defined by solid line A in FIG. 12). In principle, therefore, the vehicle is started by the electric motor rather than the engine.

Figure 8:
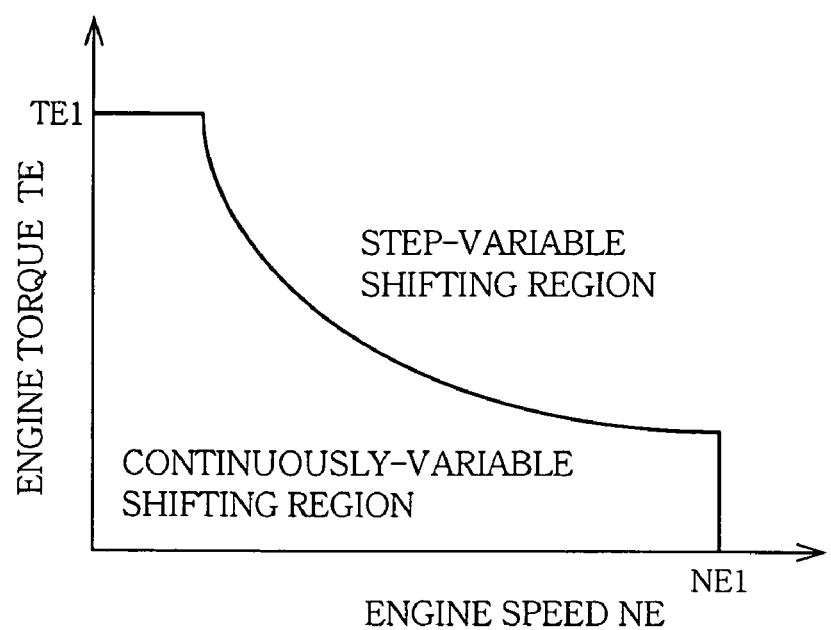
[FIG. 8] This figure is a view indicating a stored map used by switching control means of FIG. 7 to selectively place the drive system in the continuously-variable shifting state and the step-variable shifting state.

An example of the step-variable shifting region is indicated in FIG. 8. This step-variable shifting region is defined as a high-torque region (high output drive region) in which the output torque $T_E$ of the engine 8 is not smaller than a predetermined value $T_{E1}$, a high-speed region in which the engine speed $N_E$ is not lower than a predetermined value $N_{E1}$ (a high-vehicle-speed region in which the vehicle speed as one running condition of the vehicle determined by the engine speed $N_E$ and the overall speed ratio $\gamma T$ is not lower than a predetermined value), or a high-output region in which the engine output determined by the output torque $T_E$ and speed $N_E$ of the engine 8 is not smaller than a predetermined value. Accordingly, the step-variable shifting control is effected when the torque, speed or output of the engine 8 is comparatively high, while the continuously-variable shifting control is effected when the torque, speed or output of the engine is comparatively low, that is, when the engine is in a normal output state. A switching boundary line map in FIG. 8, which defines the step-variable shifting region and the continuously-variable shifting region, functions as an upper vehicle-speed limit line consisting of a series of upper speed limits, and an upper output limit line consisting of a series of upper output limits.

Figure 9:
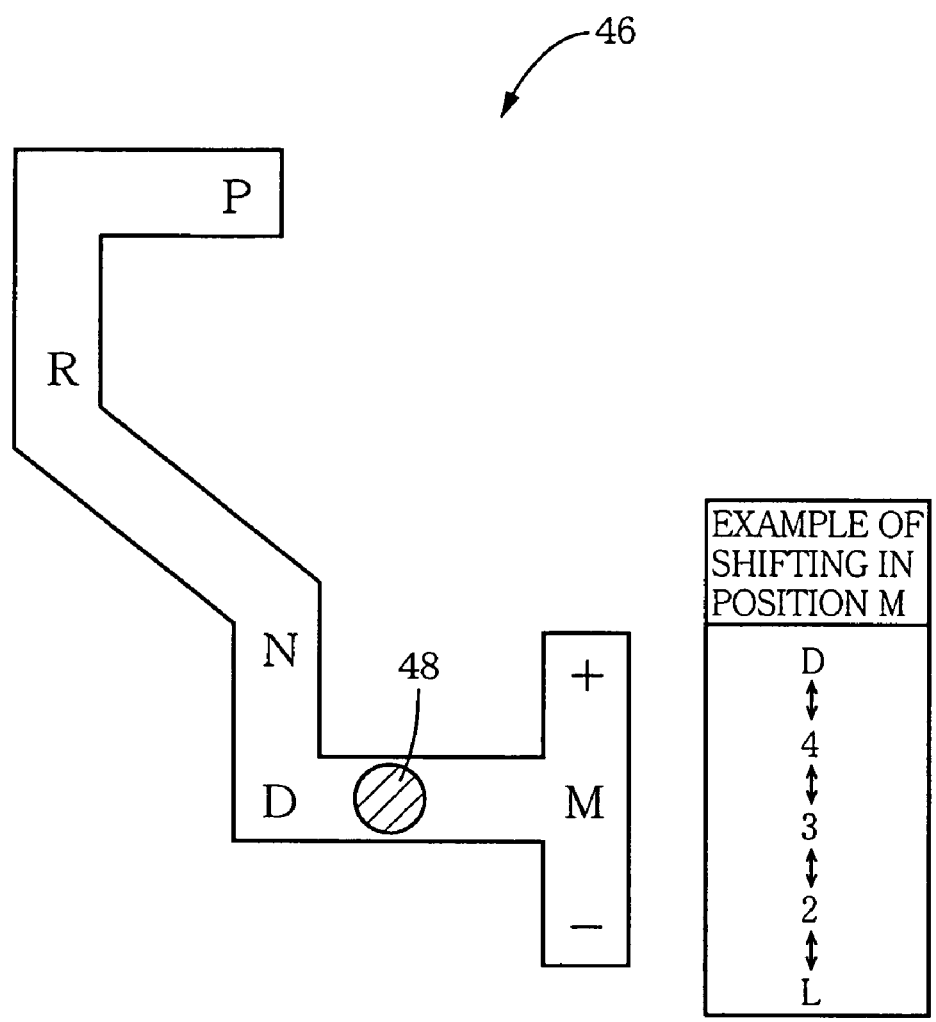
[FIG. 9] This figure is a view showing an example of a manually operable shifting device which includes a shift lever and which is used to select a plurality of operating positions.

FIG. 9 shows an example of a manually operable shifting device in the form of a shifting device 46 including a shift lever 48, which is disposed laterally adjacent to an operator's seat, for example, and which is manually operated to select one of a plurality of gear positions consisting of a parking position P for placing the drive system 10 (namely, automatic transmission 20) in a neutral state in which a power transmitting path is disconnected with both of the switching clutch C0 and brake B0 placed in the released state, while at the same time the output shaft 22 of the automatic transmission 20 is in the locked state; a reverse-drive position R for driving the vehicle in the rearward direction; a neutral position N for placing the drive system 10 in the neutral state; an automatic forward-drive shifting position D; and a manual forward-drive shifting position M. The parking position P and the neutral position N are non-driving positions selected when the vehicle is not driven, while the reverse-drive position R, and the automatic and manual forward-drive shifting positions D, M are driving positions selected when the vehicle is driven. The automatic forward-drive shifting position D provides a highest-speed position, and positions "4" through "L" selectable in the manual forward-drive shifting position M are engine-braking positions in which an engine brake is applied to the vehicle.

The manual forward-drive shifting position M is located at the same position as the automatic forward-drive shifting position D in the longitudinal direction of the vehicle, and is spaced from or adjacent to the automatic forward-drive shifting position D in the lateral direction of the vehicle. The shift lever 48 is operated to the manual forward-drive shifting position M, for manually selecting one of the positions "D" through "L". Described in detail, the shift lever 48 is movable from the manual forward-drive shifting position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio γT of the drive system 10 is aut6omatically variable, that is, respective different lowest values of the overall speed ratio γT which corresponds to the highest output speed of the drive system 10. Namely, the five positions "D" through "L" select respective different numbers of the speed positions or gear positions of the automatic transmission 20 which are automatically selectable, so that the lowest overall speed ratio γT available is determined by the selected number of the gear positions. The shift lever 48 is biased by biasing means such as a spring so that the shift lever 48 is automatically returned from the shift-up position "+" and shift-down position "−" back to the manual forward-drive shifting position M. The shifting device 46 is provided with shift-position sensors operable to detect the presently selected position of the shift lever 48, so that signals indicative of the presently selected operating position of the shift lever 48 and the number of shifting operations of the shift lever 48 in the manual forward-shifting position M.

When the shift lever 48 is operated to the automatic forward-drive shifting position D, the switching control means 50 effects an automatic switching control of the drive system 10 according to a stored switching map indicated in FIG. 8, and the hybrid control means 52 effects the continuously-variable shifting control of the power distributing mechanism 16, while the step-variable shifting control means 54 effects an automatic shifting control of the automatic transmission 20. When the drive system 10 is placed in the step-variable shifting state, for example, the shifting action of the drive system 10 is automatically controlled to select an appropriate one of the first-gear position through the fifth-gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first-gear through fourth-gear positions, so that the overall speed ratio γT of the drive system 10 is controlled so as to be continuously variable within the predetermined range. The automatic forward-drive position D is a position selected to establish an automatic shifting mode (automatic mode) in which the drive system 10 is automatically shifted.

When the shift lever 48 is operated to the manual forward-drive shifting position M, on the other hand, the shifting action of the drive system 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the positions "D" through "L". When the drive system 10 is placed in the step-variable shifting state, for example, the shifting action of the drive system 10 is automatically controlled within the above-indicated predetermined range of the overall speed ratio γT. When the drive system 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the positions "D" through "L", so that the overall speed ratio γT of the drive system 10 is controlled so as to be continuously variable within the predetermined range. The manual forward-drive position M is a position selected to establish a manual shifting mode (manual mode) in which the selectable gear positions of the drive system 10 are manually selected.

Figure 10:
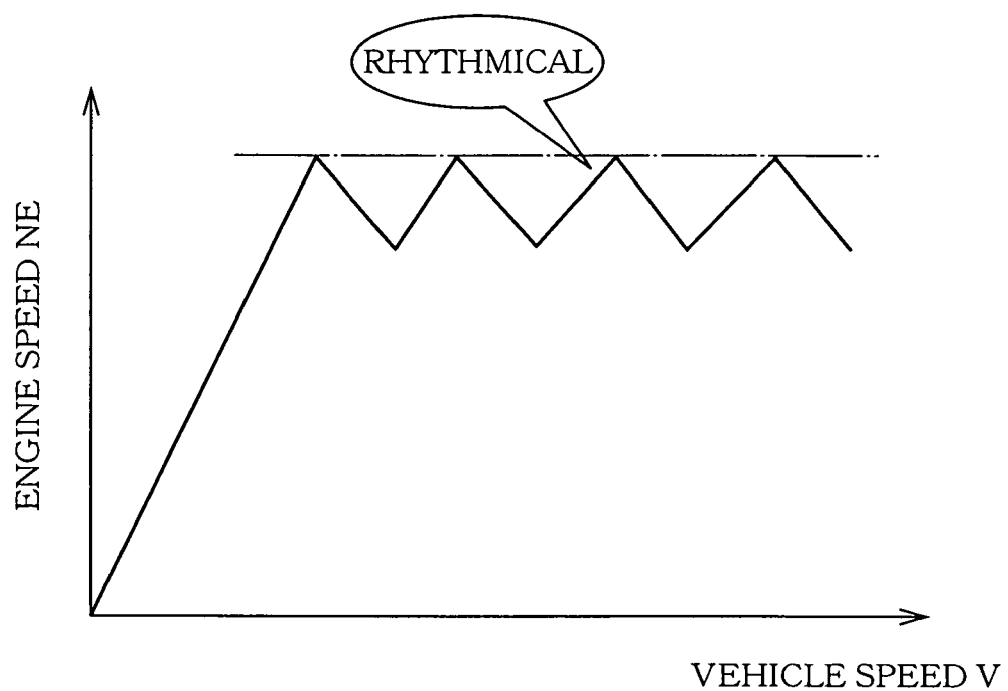
[FIG. 10] This figure is a view illustrating an example of a change of the operating speed of an engine during a ship-up action of a step-variable transmission.

In the present embodiment described above, the power distributing mechanism 16 includes the switching clutch C0 and the switching brake B0, which constitute the differential-state switching device operable to selectively place the power distributing mechanism 16 in the differential state in which the mechanism 16 is capable of performing a differential function, for example, the continuously-variable shifting state in which the mechanism 16 functions as an electrically controlled continuously variable transmission the speed ratio of which is continuously variable, and in the non-differential state in which the mechanism 16 is not capable of performing a differential function, for example, the fixed-speed-ratio shifting state in which the mechanism 16 is operable as a transmission having fixed speed ratios. Accordingly, when the engine is in a normal output state with a relatively low or medium output while the vehicle is running at a relatively low or medium running speed, the power distributing mechanism 16 is placed in the continuously-variable shifting state, assuring a high degree of fuel economy of the hybrid vehicle. When the vehicle is running at a relatively high speed or when the engine is operating at a relatively high speed, on the other hand, the power distributing mechanism 16 is placed in the fixed-ratio shifting state in which the output of the engine 8 is transmitted to the drive wheels 38 primarily through the mechanical power transmitting path, so that the fuel economy is improved owing to reduction of a loss of conversion of the mechanical energy into the electric energy. When the engine 8 is in a high-output state, the power distributing mechanism 16 is also placed in the fixed-speed-ratio shifting state. Therefore, the mechanism 16 is placed in the continuously-variable shifting state only when the vehicle speed is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. Alternatively, when the engine 8 is in a high-output (high-torque)state, the power distributing mechanism 16 is placed in the fixed-speed-ratio shifting state while at the same time the automatic transmission 20 is automatically shifted, so that the engine speed $N_E$ changes with a shift-up action of the automatic transmission 20, assuring a comfortable rhythmic change of the engine speed $N_E$ as the automatic transmission is shifted up, as indicated in FIG. 10. Stated in the other way, when the engine is in a high-output state, it is more important to satisfy a vehicle operator's desire to improve the drivability of the vehicle, than a vehicle operator's desire to improve the fuel economy. In this respect, the power distributing mechanism 16 is switched from the continuously-variable shifting state to the step-variable shifting state (fixed-speed-ratio shifting state) when the engine output becomes relatively high. Accordingly, the vehicle operator is satisfied with a comfortable rhythmic change of the engine speed $N_E$ during the high-output operation of the engine, as indicated in FIG. 10.

The present embodiment has a further advantage that the power distributing mechanism 16 is simple in construction, by using the first planetary gear set 24 of single-pinion type including the three rotary elements in the form of the first carrier CA1, first sun gear S1 and first ring gear R1.

In the present embodiment, the automatic transmission 20 is connected in series to and interposed between the power distributing mechanism 16 and the drive wheels 38, so that the overall speed ratio of the drive system is determined by the speed ratio of the power distributing mechanism 16 and the speed ratio of the automatic transmission 20. The width or range of the overall speed ratio can be broadened by the width of the speed ratio of the automatic transmission 20, making it possible to improve the efficiency of operation of the power distributing mechanism 16 in its continuously-variable shifting state, that is, the efficiency of hybrid control of the vehicle.

The present embodiment has another advantage that when the power distributing mechanism 16 is placed in the fixed-speed-ratio shifting state, this mechanism 16 functions as if the mechanism 16 was a part of the automatic transmission 20, so that the drive system provides an overdrive position in the form of the fifth-gear position the speed ratio of which is lower than 1.

The present embodiment is further arranged such that the second electric motor M2 is connected to the power transmitting member 18 which is provided as an input rotary member of the automatic transmission 20, so that the required input torque of the automatic transmission 20 can be made lower than the torque of the output shaft 22, making it possible to further reduce the required size of the second electric motor M2.

Then, the other embodiments of the present invention will be described. In the following embodiments, the same reference signs as used in the preceding embodiment will be used to identify elements similar to those in the preceding embodiment, which will not be described.

Embodiment 2

Figure 11:
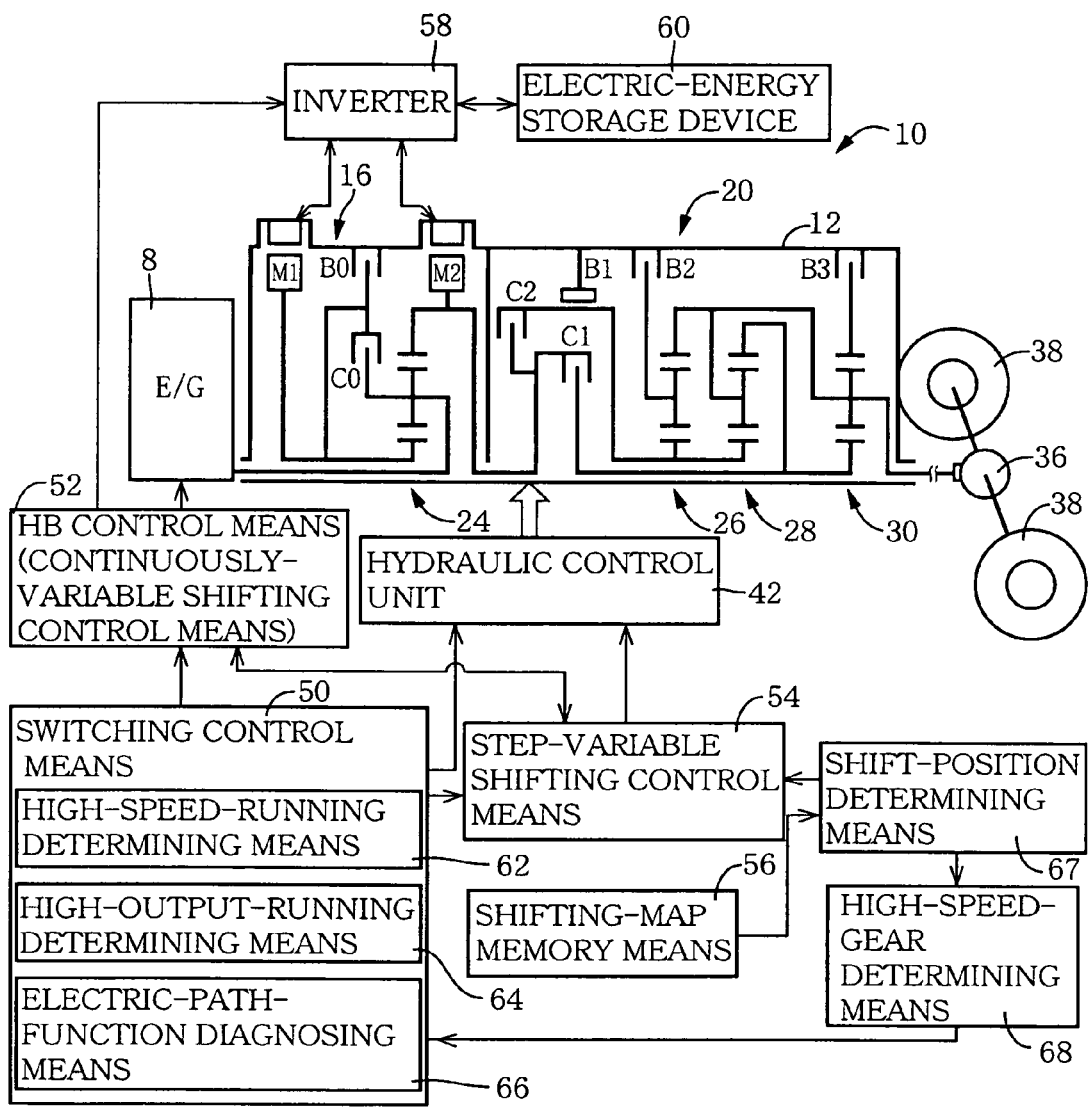
[FIG. 11] This figure is a functional block diagram corresponding to that of FIG. 7, for explaining major control functions performed by an electronic control device of a drive system according to another embodiment of the present invention.
Figure 12:
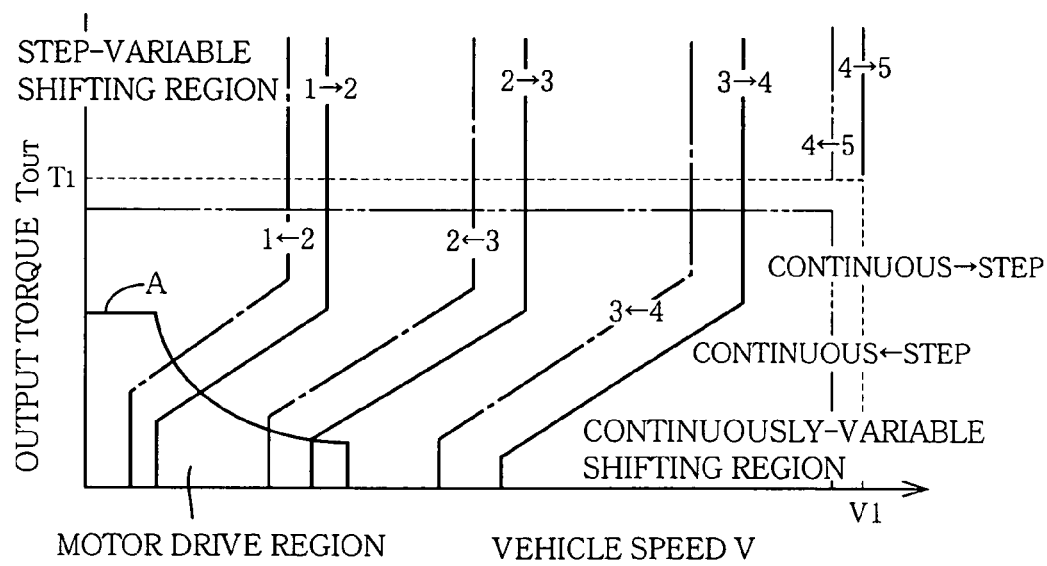
[FIG. 12] This figure is a view for explaining an operation of switching control means in the electronic control device in the embodiment of FIG. 11.

FIG. 11 is a functional block diagram illustrating the electronic control device 40 according to another embodiment of this invention, wherein the switching control means 50 is different from that of the embodiment of FIG. 7 in that the switching control means 50 of FIG. 11 includes high-speed-running determining means 62, high-output-running determining means 64, and electric-path-function diagnosing means 66, and is arranged to effect a switching control on the basis of a relationship shown in FIG. 12.

In the embodiment of FIG. 11, the high-speed-running determining means 62 is arranged to determine whether a vehicle speed V which is one of operating states of the hybrid vehicle has reached a predetermined speed value V1, which is an upper limit value above which it is determined that the vehicle is in a high-speed running state. The high-output-running determining means 64 is arranged to determine whether a drive-force-related value such as the output torque $T_{OUT}$ of the automatic transmission 20, relating to the vehicle drive force which is another operating state of the hybrid vehicle, has reached a predetermined torque or drive-force value T1, which is an upper limit value above which it is determined that the vehicle is in a high-output running state. Namely, the high-output-running determining means 64 determines whether the vehicle is running with a high output, on the basis of a drive-force-related parameter which directly or indirectly represents the drive force with which the vehicle is driven. The electric-path-function diagnosing means 66 is arranged to determine whether the components of the drive system 10 that are operable to establish the continuously-variable shifting state have a deteriorated function. This determination by the diagnosing means 66 is based on the functional deterioration of the components associated with the electric path through which an electric energy generated by the first electric motor M1 is converted into a mechanical energy. For example, the determination is made on the basis of a failure, or a functional deterioration or defect due to a failure or low temperature, of any one of the first electric motor M1, second electric motor M2, inverter 58, electric-energy storage device 60 and electric conductors connecting those components.

Shift-position determining means 67 is provided to select or determine the gear position to which the drive system 10 should be shifted while the drive system 10 consisting of the power distributing mechanism 16 and the automatic transmission 10 is placed in the step-variable shifting state in which the drive system 10 as a whole functions as the step-variable automatic transmission. For example, this determination by the shift-position determining means 67 is based on the vehicle condition represented by the vehicle speed V and the output torque $T_{OUT}$, and according to the shifting boundary line map of FIG. 12 stored in the shifting-map memory means 56. The step-variable shifting control means 54 controls the shifting action of the automatic transmission 20 on the basis of the gear position selected by the shift-position determining means 67, irrespective of whether the drive system 10 is in the step-variable shifting state or the continuously-variable shifting state. The gear position selected by the shift-position determining means 67 is checked by high-speed-gear determining means 68, as to whether this gear position is a high-speed-gear position or not.

The high-speed-gear determining means 68 is arranged to determine whether the gear position which is selected by the shift-position determining means 67 and to which the drive system 10 should be shifted is the high-speed-gear position, for example, the fifth-gear position. This determination by the high-speed-gear determining means 68 is made to determine which one of the switching clutch C0 and brake B0 should be engaged to place the drive system 10 in the step-variable shifting state. While the drive system 10 as a whole is placed in the step-variable shifting state, the switching clutch C0 is engaged to place the drive system 10 in any of the first-gear position through the fourth-gear position, while the switching brake B0 is engaged to place the drive system 10 in the fifth-gear position.

The switching control means 50 determines that the vehicle state is in the step-variable shifting region, in any one of the following conditions or cases: where the high-speed-running determining means 62 has determined that the vehicle is in the high-speed running state; where the high-output-running determining means 64 has determined that the vehicle is in the high-output running state; and where the electric-path-function diagnosing means 66 has determined that the electric path function is deteriorated. In this case, the switching control means 50 disables the hybrid control means 52 to operate, that is, inhibits the hybrid control means 52 from effecting the hybrid control or continuously-variable shifting control, and commands the step-variable shifting control means 54 to perform predetermined step-variable shifting control operations, for example, an operation to command the automatic transmission 20 to be automatically shifted to the gear position selected by the shift-position determining means 67, and an operation to command the hydraulic control unit 42 to engage an appropriate one of the switching clutch C0 and brake B0, depending upon a result of the determination by the high-speed-gear determining means 68 as to whether the gear position selected by the shift-position determining means 67 is the fifth-gear position. In this case, therefore, the drive system 10 as a whole consisting of the power distributing mechanism 16 and the automatic transmission 20 functions as the so-called step-variable automatic transmission, and performs the automatic shifting actions as indicated in the table of FIG. 2.

Where the high-speed-gear determining means 68 determines that the selected speed is the fifth-gear position, while the high-speed-running determining means 62 determines that the vehicle is in the high-speed running state, or while the high-output-running determining means 64 determines that the vehicle is in the high-output running state, the switching control means 50 commands the hydraulic control unit 42 to release the switching clutch C0 and engage the switching brake B0 to enable the power distributing mechanism 16 to function as an auxiliary transmission having a fixed speed ratio γ0 of 0.7, for example, so that the drive system 10 as a whole is placed in the high-speed gear position, so-called "overdrive gear position" having a speed ratio lower than 1.0. Where the high-output-running determining means 64 determines that the vehicle is in the high-output running state, and where the high-speed-gear determining means 68 does not determine that the selected gear position is the fifth-gear position, the switching control means 50 commands the hydraulic control unit 42 to engage the switching clutch C0 and release the switching brake B0 to enable the power distributing mechanism 16 to function as an auxiliary transmission having a fixed speed ratio γ0 of 1, for example, so that the drive system 10 as a whole is placed in a low-gear position having a speed ratio not lower than 1.0. Thus, the switching control means 50 places the drive system 10 in the step-variable shifting state in any one of the predetermined conditions described above, and selectively places the power distributing mechanism 16 functioning as the auxiliary transmission in the high-gear or low-gear position, while the automatic transmission 20 connected in series to the power distributing mechanism 16 is enabled to function as the step-variable transmission, so that the drive system 10 as a whole functions as the so-called step-variable automatic transmission.

For instance, the upper vehicle-speed limit V1 of the vehicle speed is determined so that the drive system 10 is placed in the step-variable shifting state while the vehicle speed V is higher than the limit V1. This determination is effective to minimize a possibility of deterioration of the fuel economy of the vehicle if the drive system 10 were placed in the continuously-variable shifting state at a relatively high running speed of the vehicle. The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

However, the switching control means 50 commands the hydraulic control unit 42 to release both of the switching clutch C0 and brake B0 to place the power distributing mechanism 16 in the continuously-variable shifting state, while the drive system 10 as a whole is normally operable in its continuously-variable shifting state, that is, when the high-speed-running determining means 62 does not determine that the vehicle is in the high-speed running state, when the high-output-running determining means 64 does not determine that the vehicle is in the high-output running state, and when the electric-path-function diagnosing means 66 does not determine that the electric path function is deteriorated. In this case, the switching control means 50 enables the hybrid control means 52 to effect the hybrid control, and commands the step-variable shifting control means 54 to hold the automatic transmission 20 in the predetermined gear position selected for the continuously-variable shifting control, or to permit the automatic transmission 20 to be automatically shifted to the gear position selected by the shift-position determining means 67. Thus, in the predetermined condition of the vehicle, the switching control means 50 enables the power distributing mechanism 16 to operate in the continuously-variable shifting state, functioning as the continuously variable transmission, while the automatic transmission 20 connected in series to the power distributing mechanism 16 functions as the step-variable transmission, so that the drive system provides a sufficient vehicle drive force, such that the speed of the rotary motion transmitted to the automatic transmission 20 placed in one of the first-speed, second-speed, third-speed and fourth-gear positions, namely, the rotating speed of the power transmitting member 18 is continuously changed, so that the speed ratio of the drive system when the automatic transmission 20 is placed in one of those gear positions is continuously variable over a predetermined range. Accordingly, the speed ratio of the automatic transmission 20 is continuously variable across the adjacent gear positions, whereby the overall speed ratio γT of the drive system 10 is continuously variable.

FIG. 12 shows an example of the shifting boundary line map (shifting map or relationship) which is stored in the shifting-map memory means 56 and which is used for determining whether the automatic transmission 20 should be shifted. The shifting boundary line map consists of shift boundary lines in a rectangular two-dimensional coordinate system having an axis along which the vehicle speed V is taken, and an axis along which the drive-force-related value in the form of the output torque $T_{OUT}$ is taken. In FIG. 12, solid lines are shift-up boundary lines, and one-dot chain lines are shift-down boundary lines. Broken lines in FIG. 12 are boundary lines defining a step-variable shifting region and a continuously-variable shifting region which are used by the switching control means 50. These boundary lines represent the upper vehicle-speed limit V1 and the upper output-torque limit T1 above which it is determined that the vehicle is in the high-speed or high-output running state. FIG. 12 also shows two-dot chain lines which are boundary line offset with respect to the broken lines, by a suitable amount of control hysteresis, so that the broken lines and the two-dot chain lines are selectively used as the boundary lines. Thus, FIG. 12 also shows a stored switching boundary line map used by the switching control means 50 to determine whether the vehicle is in the step-variable shifting state or the continuously-variable shifting state, depending upon whether the vehicle speed V and the output torque $T_{OUT}$ are higher than the predetermined upper limit values V, T1. Therefore, the above-described determining means 62, 64 may be arranged to determine the vehicle condition according to this switching boundary line map and on the basis of the actual values of the vehicle speed V and output torque $T_{OUT}$. This switching boundary line map as well as the shifting boundary line map may be stored in the shifting-map memory means 56. The switching boundary line map may include at least one of the boundary lines representative of the upper vehicle-speed limit V1 and the upper output-torque limit T1, and may use only one of the two parameters V and $T_{OUT}$. The shifting boundary line map and the switching boundary line may be replaced by stored equations for comparison of the actual vehicle speed V with the limit value V1 and comparison of the actual output torque $T_{OUT}$ with the limit value T1.

It is noted that the step-variable shifting region and continuously-variable shifting region of FIG. 12 are considered to be a modification of the step-variable shifting region and continuously-variable shifting region of FIG. 8 which are defined by the output torque $T_E$ and speed $N_E$ of the engine 8. According to the sifting regions of FIG. 12, the step-variable shifting region consists of a high-torque region in which the output torque $T_{OUT}$ is not lower than the upper limit value T1, and a high-speed region in which the vehicle speed V is not lower than the upper limit value V1, so that the step-variable shifting state is established when the vehicle is in a high-output running state with the engine 8 having a comparatively high output, or in a high-speed running state with the engine 8 operating at a comparatively high speed, and the continuously-variable shifting state is established when the vehicle is in a low-output running state with the engine 8 having a comparatively low output, or in a low-speed running state with the engine 8 operating at a comparatively low speed, that is, when the engine 8 is in a normal output state.

Figure 13:
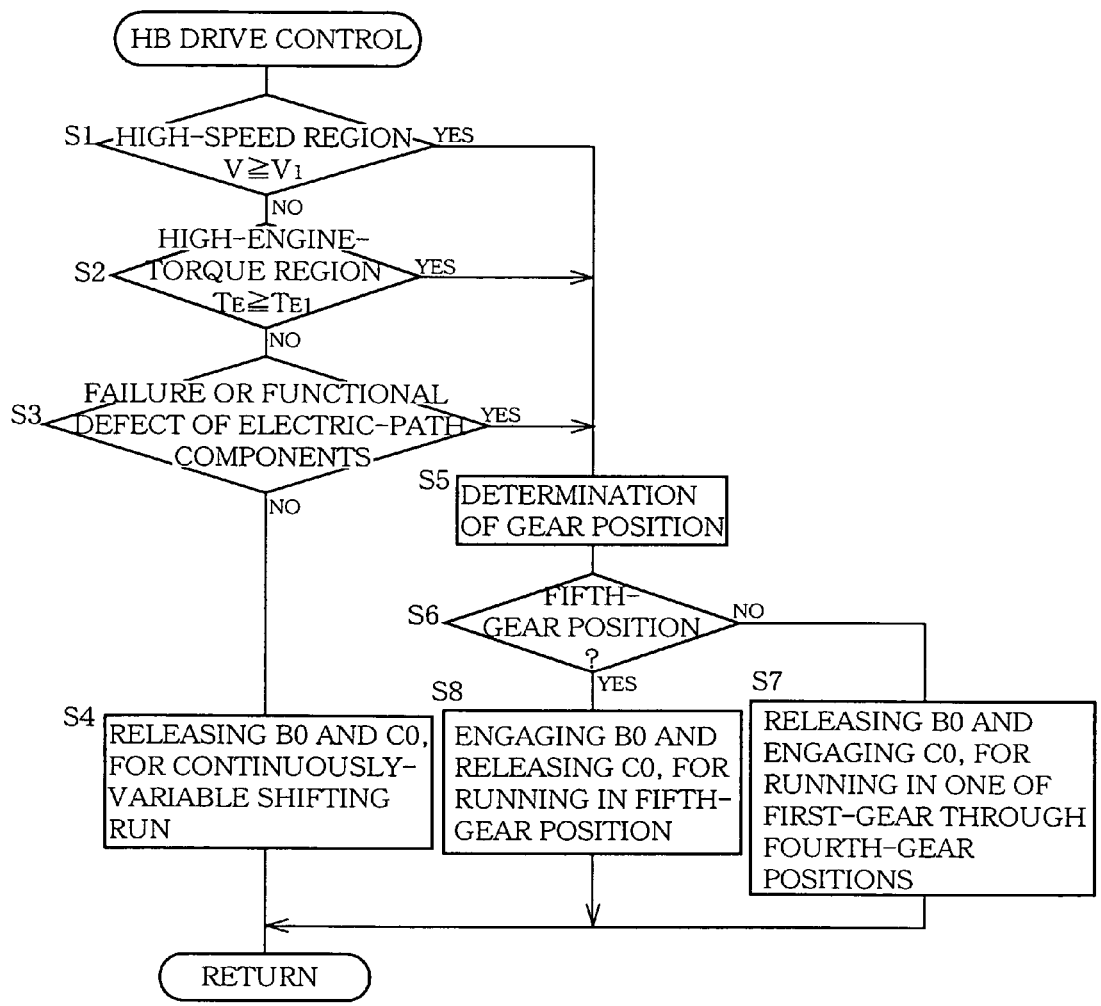
[FIG. 13] This figure is a flow chart illustrating major control operations performed by the electronic control device in the embodiment of FIG. 11.

FIG. 13 is a flow chart illustrating one of major control operations of the electronic control device 40, that is, a switching control of the drive system 10 in the embodiment of FIG. 11. This switching control is repeatedly executed with an extremely short cycle time of about several milliseconds to several tens of milliseconds, for example.

Initially, step S1 (hereinafter "step" being omitted) corresponding to the high-speed-running determining means 62 is implemented to determine whether the actual speed V of the hybrid vehicle is equal to or higher than the predetermined upper limit V1. If a negative decision is obtained in S1, the control flow goes to S2 corresponding to the high-output-running determining means 64, to determine whether the actual drive torque of the hybrid vehicle or the actual output toque $T_{OUT}$ of the automatic transmission 20 is equal to or higher than the predetermined upper limit T1. If a negative decision is obtained in S2, the control flow goes to S3 corresponding to the electric-path-function diagnosing means 66, to diagnose the components associated with the electric path (electric energy transmitting path) through which an electric energy generated by the first electric motor M1 is converted into a mechanical energy, for example, to determine whether any one of the first electric motor M1, second electric motor M2, inverter 58, electric-energy storage device 60, and electric conductors connecting those components has a deteriorated function, such as a failure or a functional defect due to a low temperature.

If a negative decision is obtained in S3, the control flow goes to S4 corresponding to the switching control means 50, in which the switching control means 50 commands the hydraulic control unit 42 to release the switching clutch C0 and the switching brake B0, for placing the power distributing mechanism 16 in the continuously-variable shifting state, and at the same time enables the hybrid control means 52 to effect the hybrid control and commands the step-variable control means 54 to permit the automatic transmission 20 to be automatically shifted to the gear position selected by the shift-position determining means 67. Accordingly, the power distributing mechanism 16 is enabled to function as the continuously variable transmission, while the automatic transmission 20 connected in series to the power distributing mechanism 16 is enabled to function as the step-variable transmission, so that the drive system provides a sufficient vehicle drive force, such that the speed of the rotary motion transmitted to the automatic transmission 20 placed in one of the first-speed, second-speed, third-speed and fourth-gear positions, namely, the rotating speed of the power transmitting member 18 is continuously changed, so that the speed ratio of the drive system when the automatic transmission 20 is placed in one of those gear positions is continuously variable over a predetermined range. Accordingly, the speed ratio of the automatic transmission 20 is continuously variable across the adjacent gear positions, whereby the overall speed ratio γT of the drive system 10 is continuously variable.

If an affirmative decision is obtained in any one of S1, S2 and S3, the control flow goes to S5 corresponding to the shift-position determining means 67, to determine or select the gear position to which the drive system 10 should be shifted. This determination is effected, for example, on the basis of the vehicle condition and according to the shifting boundary line map stored in the shifting-map memory means 56 and shown in FIG. 12. Then, S6 corresponding to the high-speed-gear determining means 68 is implemented to determine whether the gear position of the drive system 10 which is selected in S5 is the high-gear position, for example, the fifth-gear position.

If an affirmative decision is obtained in S6, the control flow goes to S8 corresponding to the switching control means 50, in which the switching control means 50 commands the hydraulic control unit 42 to release the switching clutch C0 and engage the switching brake B0 to enable the power distributing mechanism 16 to function as the auxiliary transmission having the fixed speed ratio γ0 of 0.7, for example. At the same time, the switching control means 50 disables the hybrid control means 52 to effect the hybrid control, that is, inhibits the hybrid control means 52 from effecting the hybrid control or continuously-variable shifting control, and commands the step-variable shifting control means 54 to command the automatic transmission 20 to be automatically shifted to the fourth-gear position, so that the drive system 10 as a whole is placed in the fifth-gear position selected in S6. If a negative decision is obtained in S6, the control flow goes to S7 corresponding to the switching control means 50, in which the switching control means 50 commands the hydraulic control unit 42 to engage the switching clutch C0 and release the switching brake B0 to enable the power distributing mechanism 16 to function as the auxiliary transmission having the fixed speed ratio γ0 of 1, for example. At the same time, the switching control means 50 inhibits the hybrid control means 52 from effecting the hybrid control or continuously-variable shifting control, and commands the step-variable shifting control means 54 to command the automatic transmission 20 to be automatically shifted to one of the first-gear position through the fourth-gear position, which was selected in S5. Thus, S7 and S8 are arranged such that the power distributing mechanism 16 is enabled to function as the auxiliary transmission while the automatic transmission 20 connected in series to the power distributing mechanism 16 is enabled to function as the step-variable transmission, so that the drive system 10 as a whole placed in the step-variable transmission is enabled to function as the so-called step-variable automatic transmission.

Like the preceding embodiment, the present embodiment is arranged such that the power distributing mechanism 16 includes the switching clutch C0 and the switching brake B0, which constitute the differential-state switching device operable to selectively place the drive system 10 in the continuously-variable shifting state in which the drive system functions as an electrically controlled continuously variable transmission the speed ratio of which is continuously variable, and in the step-variable shifting state in which the drive system is operable as a step-variable transmission. The drive system 10 is automatically placed in the continuously-variable shifting state or the step-variable shifting state, under the control of the switching control means 50, on the basis of the running condition of the vehicle, so that the drive system 10 has not only an advantage of improved fuel economy owing to the electrically controlled continuously variable transmission, but also an advantage of high power transmitting efficiency owing to the step-variable transmission capable of mechanical transmission of a vehicle drive force. When the engine is in a normal output state, for example, when the vehicle condition is in the continuously-variable shifting region of FIG. 12 in which the vehicle speed V is not higher than the upper limit V1 while the output torque $T_{OUT}$ is not higher than the upper limit value T1, the drive system 10 is placed in the continuously-variable shifting state. This arrangement assures a high degree of fuel economy of the hybrid vehicle during its normal city running, that is, at a relatively low or medium speed with a relatively low or medium output. When the vehicle is in the high-speed running state, for example, when the vehicle condition is in the step-variable shifting region of FIG. 12 in which the vehicle speed V is higher than the upper limit V1, the drive system 10 is placed in the step-variable shifting state, in which the output of the engine 8 is transmitted to the drive wheels 38 primarily through the mechanical power transmitting path, so that the fuel economy is improved owing to reduction of a loss of conversion of the mechanical energy into the electric energy. When the vehicle is in the high-output running state, for example, when the vehicle condition is in the step-variable shifting region in which the output torque $T_{OUT}$ is higher than the upper limit T1, the drive system is placed in the step-variable shifting state, in which the output of the engine 8 is transmitted to the drive wheels 38 primarily through the mechanical power transmitting path. Thus, the drive system 10 is placed in the continuously-variable shifting state only when the vehicle is in the low- or medium-speed running state or low- or medium-output running state, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

The present embodiment is further advantageous in that when the drive system 10 is switched from the continuously-variable shifting state to the step-variable-shifting state depending upon a change of the vehicle condition, one of the switching clutch C0 and the switching brake B0 which constitute the differential-state switching device is engaged depending upon the vehicle condition, to select the gear position to which the automatic transmission is shifted in the step-variable shifting state. Thus, the shifting action of the automatic transmission can be suitably controlled in the step-variable shifting mode, depending upon whether the vehicle is in the high-speed or high-output running state or not.

In the present embodiment, the determination as to whether the vehicle is in the high-speed running state is made by determining whether the vehicle speed is higher than the upper limit V1. The switching control means 50 places the transmission mechanism 10 in the step-variable shifting state when the actual vehicle speed V has exceeded the upper limit V1. Accordingly, while the actual vehicle speed V is higher than the upper limit V1, the output of the engine 8 is transmitted to the drive wheels 38 primarily through the mechanical power transmitting path, so that the fuel economy of the vehicle is improved owing to reduction of a loss of conversion of the mechanical energy into the electric energy, which would take place when the transmission mechanism 10 is operated as the electrically controlled continuously variable transmission.

In the present embodiment, the determination as to whether the vehicle is in the high-output running state is made by determining whether the output torque is higher than the upper limit T1. The switching control means 50 places the transmission mechanism 10 in the step-variable shifting state when the actual output torque $T_{OUT}$ has exceeded the upper limit T1. Accordingly, while the actual output torque $T_{OUT}$ is higher than the upper limit T1, the output of the engine 8 is transmitted to the drive wheels 38 primarily through the mechanical power transmitting path. Thus, the transmission mechanism 10 is operated as the electrically controlled continuously variable transmission only when the vehicle is in the low- or medium-output running state, so that the maximum amount of electric energy that must be generated by the first electric motor M1 can be reduced, whereby the required output capacity of the first electric motor M1 can be reduced, making it possible to minimize the required sizes of the first electric motor M1 and the second electric motor M2, and the required size of the drive system including those electric motors.

Further, the present embodiment uses the switching boundary line map representative of the upper vehicle-speed limit V1 and the upper output-torque limit T1, with which the actual vehicle speed V and output torque $T_{OUT}$ are compared by the switching control means 50, for simple determination of the vehicle condition, more specifically, for simple determination as to whether the vehicle is in the high-speed-running state or in the high-output-running state.

The present embodiment is further arranged such that the switching control means 50 places the drive system 10 in the step-variable shifting state, when it is determined that a predetermined diagnosing condition indicative of functional deterioration of the control components that are operable to place the drive system 10 in the continuously-variable shifting state is satisfied. Thus, the vehicle can be run with the drive system 10 operating in the step-variable shifting state, even when the drive system cannot be normally operated in the continuously-variable shifting state.

The present embodiment is further arranged such that the switching control means 50 engages the hydraulically operated frictional coupling device in the form of the switching brake B0 serving as the differential-state switching device, to hold the second rotary element (first sun gear S1) stationary, when the actual vehicle speed V has exceeded the upper limit V1. Accordingly, while the actual vehicle speed V is higher than the upper limit V1, the output of the engine 8 is transmitted to the drive wheels 38 primarily through the mechanical power transmitting path, so that the fuel economy of the vehicle is improved owing to reduction of a loss of conversion of the mechanical energy into the electric energy, which would take place when the transmission mechanism 10 is operated as the electrically controlled continuously variable transmission.

The present embodiment is further arranged such that the switching control means 50 engages the hydraulically operated frictional coupling device in the form of the switching clutch C0 serving as the differential-state switching device, to connect the first sun gear S1 and the first carrier CA1 to each other, when the actual output toque $T_{OUT}$ has exceeded the upper limit T1. Accordingly, while the actual output torque $T_{OUT}$ is higher than the upper limit T1, the output of the engine 8 is transmitted to the drive wheels 38 primarily through the mechanical power transmitting path, so that the maximum amount of electric energy that must be transmitted from the first electric motor M1 when the transmission mechanism 10 is operated as the electrically controlled continuously variable transmission can be reduced, making it possible to minimize the required sizes of the first electric motor M1 and the second electric motor M2, and the required size of the drive system including those electric motors.

The present embodiment has a further advantage that the power distributing mechanism 16 is simple in construction and has a reduced axial dimension, by using the first planetary gear set 24 of single-pinion type including the three rotary elements in the form of the first carrier CA1, first sun gear S1 and first ring gear R1. The power distributing mechanism 16 incorporates the hydraulically operated frictional coupling devices in the form of the switching clutch C0 operable to connect the first sun gear S1 and the first carrier CA1 to each other, and the switching brake B0 operable to fix the first sun gear S1 to the transmission casing 12. Accordingly, the switching control means 50 permits simple switching of the drive system 10 between the continuously-variable shifting state and the step-variable shifting state.

In the present embodiment, the automatic transmission 20 is connected in series to and interposed between the power distributing mechanism 16 and the drive wheels 38, so that the overall speed ratio of the drive system is determined by the speed ratio of the power distributing mechanism 16 and the speed ratio of the automatic transmission 20. The width or range of the overall speed ratio can be broadened by the width of the speed ratio of the automatic transmission 20, making it possible to improve the efficiency of the continuously-variable shifting control of the power distributing mechanism 16, that is, the efficiency of hybrid control of the vehicle.

The present embodiment has another advantage that when the power distributing mechanism 16 is placed in the step-variable shifting state, the switchable type shifting portion 11 functions as if the shifting portion 11 was a part of the automatic transmission 20, so that the drive system provides an overdrive position in the form of the fifth-gear position the speed ratio of which is lower than 1.

The present embodiment is further arranged such that the second electric motor M2 is connected to the power transmitting member 18 which is provided as an input rotary member of the automatic transmission 20, so that the required input torque of the automatic transmission 20 can be made lower than the torque of the output shaft 22, making it possible to further reduce the required size of the second electric motor M2.

Embodiment 3

Figures 14, 15:
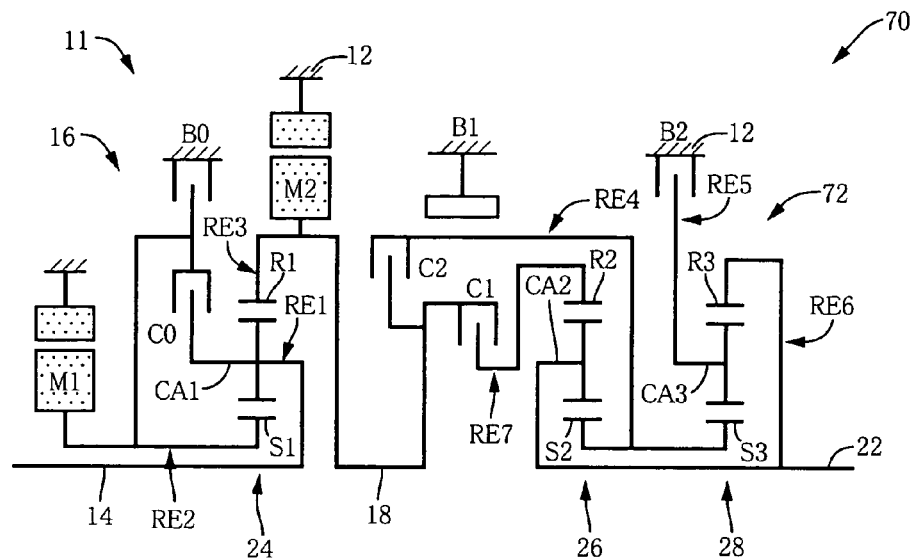
[FIG. 14] This figure is a schematic view corresponding to that of FIG. 1, for explaining an arrangement of a drive system of a hybrid vehicle according to another embodiment of the invention.
[FIG. 15] This figure is a table corresponding to that of FIG. 2, indicating shifting actions of the drive system of the hybrid vehicle of the embodiment of FIG. 14 operable in a continuously variable shifting state or a step-variable shifting state, in relation to different combinations of operating states of hydraulically operated frictional coupling devices to effect the respective shifting actions.
Figure 16:
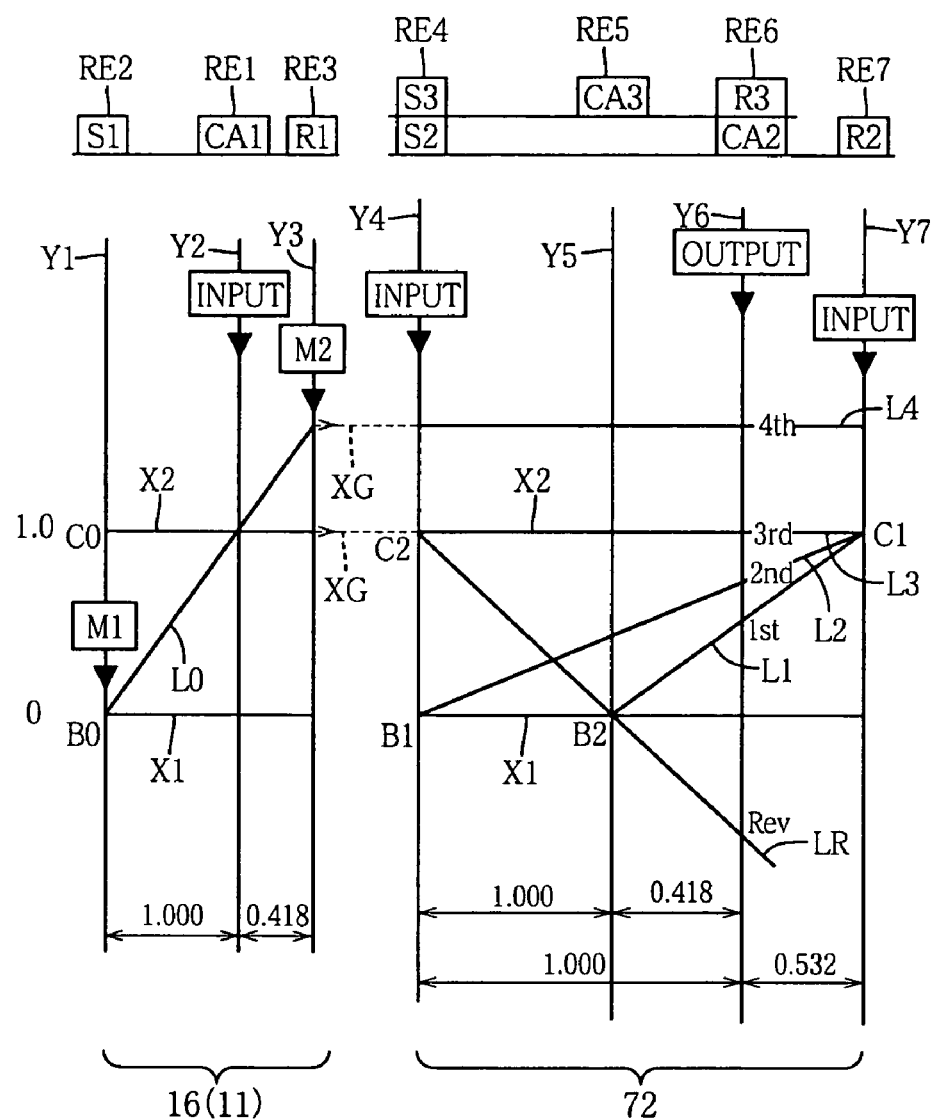
[FIG. 16] This figure is a collinear chart corresponding to that of FIG. 3, showing relative rotating speeds of rotary elements of the drive system of the hybrid vehicle of the embodiment of FIG. 14 operated in the step-variable shifting state, in different gear positions of the drive system.

FIG. 14 is a schematic view for explaining an arrangement of a drive system 70 according to another embodiment of this invention, and FIG. 15 is a table indicating gear positions of the drive system 70, and different combinations of engaged states of the hydraulically operated frictional coupling devices for respectively establishing those gear positions, while FIG. 16 is a collinear chart for explaining shifting operation of the drive system 70.

The drive system 70 includes the power distributing mechanism 16, which has the first planetary gear set 24 of single-pinion type having a gear ratio ρ1 of about 0.418, for example, and the switching clutch C0 and the switching brake B0, as in the preceding embodiment. The drive system 70 further includes an automatic transmission 72 which has three forward-drive positions and which is interposed between and connected in series to the power distributing mechanism 16 and the output shaft 22 through the power transmitting member 18. The automatic transmission 72 includes a single-pinion type second planetary gear set 26 having a gear ratio ρ2 of about 0.532, for example, and a single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the transmission casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the drive system 70 constructed as described above, one of a first-gear position (first-speed position) through a fourth-gear position (fourth-speed position), a reverse-gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 15. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having a single gear position with one speed ratio or a plurality of gear positions with respective speed ratios, as well as in the continuously-variable shifting state in which the mechanism 16 is operable as a continuously variable transmission, as described above. In the present drive system 70, therefore, a step-variable transmission is constituted by the automatic transmission 20, and the power distributing mechanism 16 which is placed in the fixed-speed-ratio shifting state by engagement of the switching clutch C0 or switching brake B0. Further, a continuously variable transmission is constituted by the automatic transmission 20, and the power distributing mechanism 16 which is placed in the continuously-variable shifting state, with none of the switching clutch C0 and brake B0 being engaged.

Where the drive system 70 functions as the step-variable transmission, for example, the first-gear position having the highest speed ratio γ1 of about 2.804, for example, is established by engaging actions of the switching clutch C0, first clutch C1 and second brake B2, and the second-gear position having the speed ratio γ2 of about 1.531, for example, which is lower than the speed ratio γ1, is established by engaging actions of the switching clutch C0, first clutch C1 and first brake B1, as indicated in FIG. 15. Further, the third-gear position having the speed ratio γ3 of about 1.000, for example, which is lower than the speed ratio γ2, is established by engaging actions of the switching clutch C0, first clutch C1 and second clutch C2, and the fourth-gear position having the speed ratio γ4 of about 0.705, for example, which is lower than the speed ratio γ3, is established by engaging actions of the first clutch C1, second clutch C2, and switching brake B0. Further, the reverse-gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

Where the drive system 70 functions as the continuously-variable transmission, on the other hand, the switching clutch C0 and the switching brake B0 are both released, as indicated in FIG. 15, so that the power distributing mechanism 16 functions as the continuously variable transmission, while the automatic transmission 72 connected in series to the power distributing mechanism 16 functions as the step-variable transmission, whereby the speed of the rotary motion transmitted to the automatic transmission 72 placed in one of the first-gear, second-gear and third-gear positions, namely, the rotating speed of the power transmitting member 18 is continuously changed, so that the speed ratio of the drive system when the automatic transmission 72 is placed in one of those gear positions is continuously variable over a predetermined range. Accordingly, the speed ratio of the automatic transmission 72 is continuously variable across the adjacent gear positions, whereby the overall speed ratio γT of the drive system 70 is continuously variable.

The collinear chart of FIG. 16 indicates, by straight lines, a relationship among the rotating speeds of the rotary elements in each of the gear positions of the drive system 70, which is constituted by the power distributing mechanism 16 functioning as the continuously-variable shifting portion or first shifting portion, and the automatic transmission 72 functioning as the step-variable shifting portion or second shifting portion. The collinear chart of FIG. 16 indicates the rotating speeds of the individual elements of the power distributing mechanism 16 when the switching clutch C0 and brake B0 are released, and the rotating speeds of those elements when the switching clutch C0 or brake B0 is engaged, as in the preceding embodiments In FIG. 16, four vertical lines Y4, Y5, Y6 and Y7 corresponding to the automatic transmission 72 respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission 72, and the seventh rotary element RE7 is selectively connected to the power transmitting member 18 through the first clutch C1.

When the first clutch C1 and the second brake B2 are engaged, the automatic transmission 72 is placed in the first-speed position. The rotating speed of the output shaft 22 in the first-speed position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 and the horizontal line X2, and a point of intersection between the vertical line Y5 indicative of the rotating speed of the fifth rotary element RE5 and the horizontal line X1. Similarly, the rotating speed of the output shaft 22 in the second-speed position established by the engaging actions of the first clutch C1 and first brake B1 is represented by a point of intersection between an inclined straight line L2 determined by those engaging actions and the vertical line Y6 indicative of the rotating speed of the sixth rotary element RE6 fixed to the output shaft 22. The rotating speed of the output shaft 22 in the third-speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first-speed through third-speed positions in which the switching clutch C0 is placed in the engaged state, the seventh rotary element RE7 is rotated at the same speed as the engine speed $N_E$, with the drive force received from the power distributing mechanism 16. When the switching clutch B0 is engaged in place of the switching clutch C0, the sixth rotary element RE6 is rotated at a speed higher than the engine speed $N_E$, with the drive force received from the power distributing mechanism 16. The rotating speed of the output shaft 22 in the fourth-speed position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22. The rotating speed of the output shaft 22 in the reverse drive position R established by the engaging actions of the second clutch C2 and second brake B2 is represented by a point of intersection between an inclined straight line LR determined by those engaging actions and the vertical line Y6 indicative of the rotating speed of the sixth rotary element RE6 fixed to the output shaft 22.

The drive system 70 of the present embodiment is also constituted by the power distributing mechanism 16 functioning as the continuously-variable shifting portion or first shifting portion, and the automatic transmission 72 functioning as the step-variable shifting portion or second shifting portion, so that the present drive system 70 has advantages similar to those of the preceding embodiments.

Embodiment 4

Figures 17, 18:
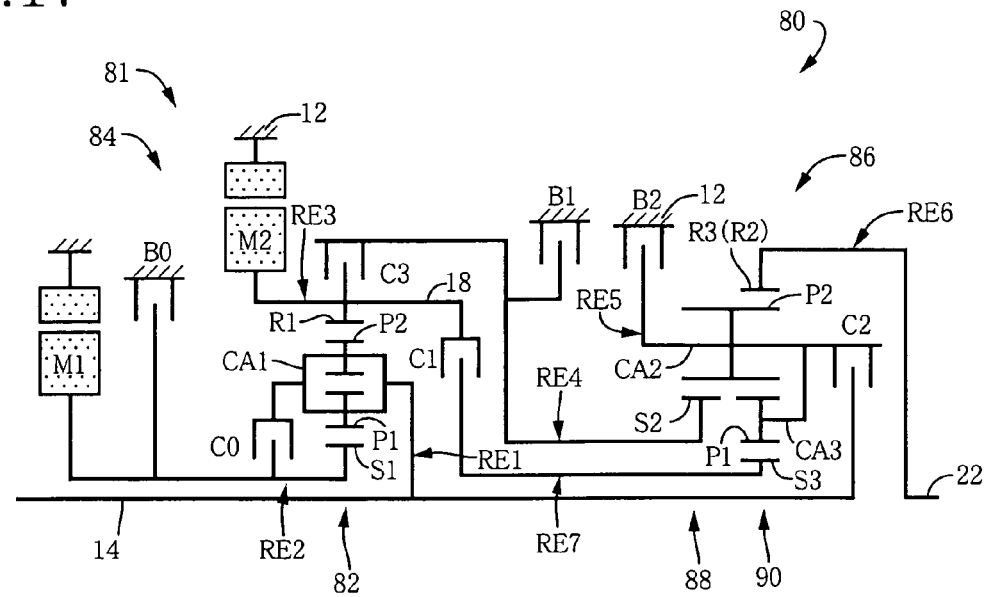
[FIG. 17] This figure is a schematic view corresponding to that of FIG. 1, for explaining an arrangement of a drive system of a hybrid vehicle according to another embodiment of the invention.
[FIG. 18] This figure is a table corresponding to that of FIG. 2, indicating shifting actions of the drive system of the hybrid vehicle of the embodiment of FIG. 17 operable in a step-variable shifting state, in relation to different combinations of operating states of hydraulically operated frictional coupling devices to effect the respective shifting actions.
Figure 19:
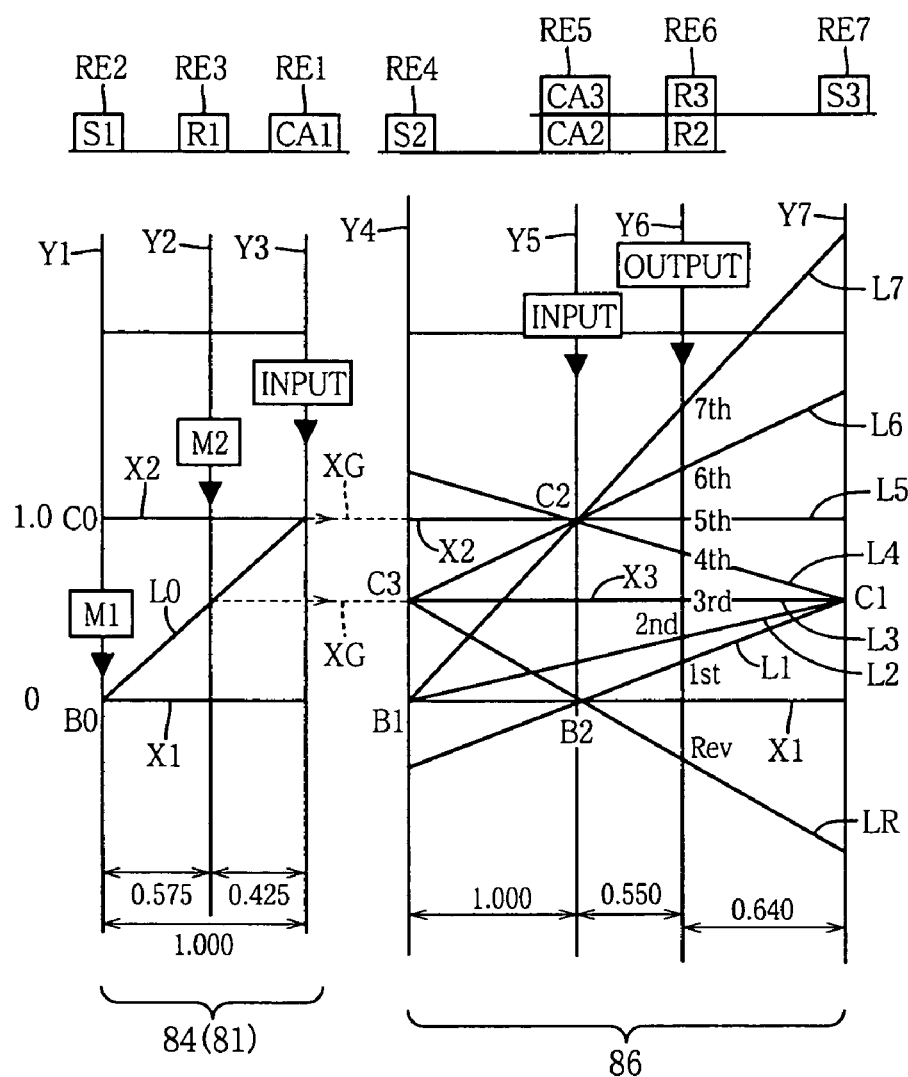
[FIG. 19] This figure is a collinear chart corresponding to that of FIG. 3, showing relative rotating speeds of rotary elements of the drive system of the hybrid vehicle of the embodiment of FIG. 17 operated in the step-variable shifting state, in different gear positions of the drive system.
Figures 20, 21:
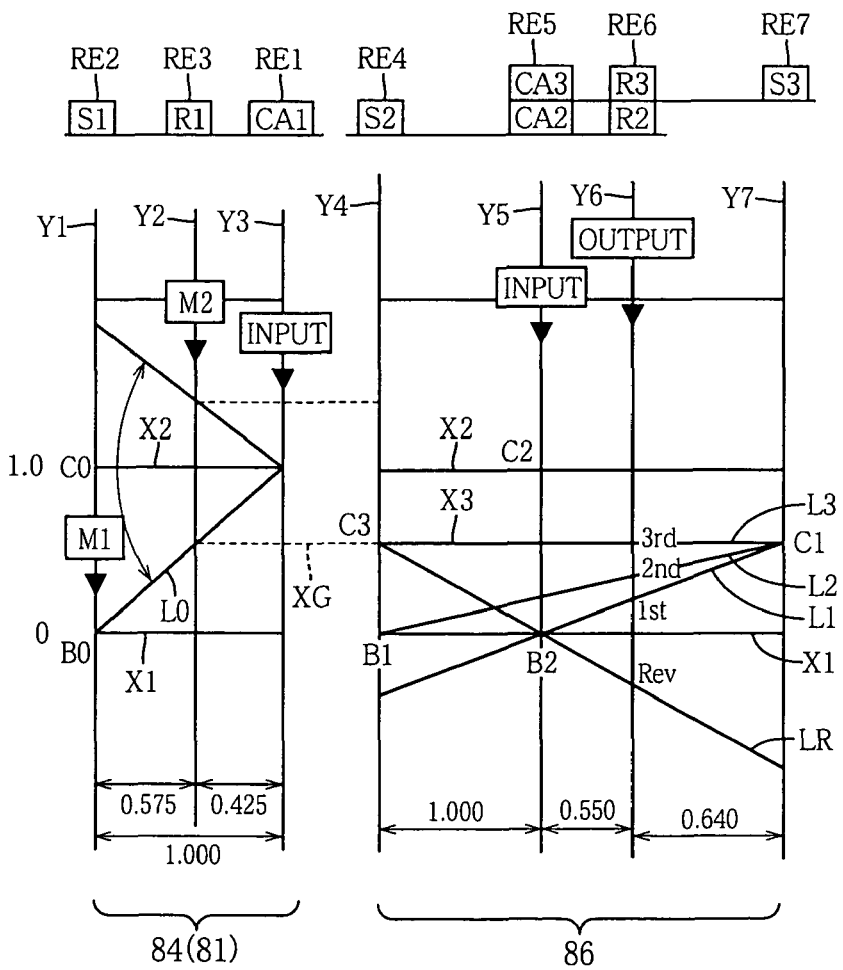
[FIG. 20] This figure is a table indicating shifting actions of the drive system of the hybrid vehicle of the embodiment of FIG. 17 operable in a continuously-variable shifting state, in relation to different combinations of operating states of the hydraulically operated frictional coupling devices to effect the respective shifting actions.
[FIG. 21] This figure is a collinear chart showing relative rotating speeds of the rotary elements of the drive system of the hybrid vehicle of the embodiment of FIG. 17 operated in the continuously-variable shifting state, in the different gear positions of the drive system.

FIG. 17 is a schematic view for explaining an arrangement of a drive system 80 according to another embodiment of this invention, and FIG. 18 is a table indicating gear positions of the drive system 80 placed in the step-variable shifting state, and different combinations of engaged states of the hydraulically operated frictional coupling devices for respectively establishing those gear positions, while FIG. 19 is a collinear chart for explaining step-variable shifting operations of the drive system 70. FIG. 20 is a table indicating the gear positions of the drive system 80 placed in the continuously-variable shifting state and different combinations of engaged states of the hydraulically operated frictional coupling devices for respectively establishing those gear positions, and FIG. 21 is a collinear chart for explaining continuously-variable shifting operations of the drive system 90.

The drive system 80 includes a power distributing mechanism 84, which has a first planetary gear set 82 of double-pinion type, and the switching clutch C0 and the switching brake B0. The drive system 80 further includes an automatic transmission 86 which has seven forward-drive positions and which is interposed between and connected in series to the power distributing mechanism 16 and the output shaft 22 through the power transmitting member 18. The double-pinion type first planetary gear set 82 of the power distributing mechanism 84 in the present embodiment includes rotary elements consisting of: a first sun gear S1; a first planetary gear P1 and a second planetary gear P2 which mesh with each other; a first carrier CA1 supporting the first and second planetary gears P1, P2 such that each of the first and second planetary gears P1, P2 is rotatable about its axis and about the axis of the first sun gear S1; and a first ring gear R1 meshing with the first sun gear S1 through the first and second planetary gears P1, P2. The first planetary gear set 82 has a gear ratio ρ1 of about 0.425, for example. In the power distributing mechanism 84, which is similar to the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are released, the power distributing mechanism 84 is placed in a continuously-variable shifting state in which the mechanism 84 functions as a continuously variable transmission the speed ratio γ0 of which is continuously variable. When the switching clutch C0 is engaged, the power distributing mechanism 84 is placed in a fixed-speed-ratio shifting state in which the mechanism 84 functions as a transmission having a fixed speed ratio γ0 of 1. When the switching brake B0 rather than the switching clutch C0 is engaged, the power distributing mechanism 84 is placed in a fixed-speed-ratio shifting state in which the mechanism 84 functions as a speed-reducing transmission having a fixed speed ratio γ0 of about 1.7, for example, which is larger than 1. In this embodiment, too, the switching clutch C0 and brake B0 function as a differential-state switching device operable to selectively place the power distributing mechanism 84 in the continuously-variable shifting state in which the mechanism 84 functions as a continuously variable transmission the speed ratio of which is continuously variable, and in the fixed-speed-ratio shifting state in which the mechanism 84 functions as a transmission having a single gear position with one speed ratio or a plurality of gear positions with respective speed ratios.

The automatic transmission 86 includes a single-pinion type second planetary gear set 88 having a gear ratio ρ2 of about 0.550, for example, and double-pinion type third planetary gear set 90 having a gear ratio ρ3 of about 0.462, for example. The double-pinion third planetary gear set 90 has a pair of pinions P1, P2 which are rotatably supported by a third carrier CA3 and which mesh with each other. The outer pinion P2 is formed integrally with a pinion of the second planetary gear set 88. A third ring gear R3 and the third carrier CA3 which mesh with the pinion P2 are formed integrally with a second ring gear R2 and a second carrier CA2 of the second planetary gear set 88. A third sun gear S3 of the third planetary gear set 90 is selectively connected to the power transmitting member 18 through a first clutch C1, and a second sun gear S2 of the second planetary gear set 88 is selectively fixed to the transmission casing 12 through a first brake B1, and selectively connected to the power transmitting member 18 through a third clutch C3. The second carrier CA2 and the third carrier CA3 are selectively fixed to the transmission casing 12 through a second brake B2, and selectively connected to the input shaft 14 through a second clutch C2. The second ring gear R2 and the third ring gear R3 are integrally fixed to the output shaft 22.

In the drive system 80 constructed as described above, one of a first-gear position (first-speed position) through a seventh-gear position (seventh-speed position), a reverse-gear position (rear-drive position) and a neural position is selectively established by engaging actions of a corresponding combination of the frictional coupling devices selected from the above-described switching clutch C0, first clutch C1, second clutch C2, third clutch C3, switching brake B0, first brake B1 and second brake B2, as indicated in the table of FIG. 18. Those gear positions have respective speed ratios γ (input shaft speed $N_{IN}$/output shaft speed $N_{OUT}$) which change as geometric series. In particular, it is noted that the power distributing mechanism 84 provided with the switching clutch C0 and brake B0 can be selectively placed by engagement of the switching clutch C0 or switching brake B0, in the fixed-speed-ratio shifting state in which the mechanism 84 is operable as a transmission having a single speed ratio or a plurality of speed ratios, as well as in the continuously-variable shifting state in which the mechanism 84 is operable as a continuously variable transmission, as described above. In the present drive system 80, therefore, a step-variable transmission is constituted by the automatic transmission 86, and the power distributing mechanism 84 which is placed in the fixed-speed-ratio shifting state by engagement of the switching clutch C0 or switching brake B0. Further, a continuously variable transmission is constituted by the automatic transmission 86, and the power distributing mechanism 84 which is placed in the continuously-variable shifting state, with none of the switching clutch C0 and brake B0 being engaged.

Where the drive system 80 functions as the step-variable transmission, for example, the first-gear position having the highest speed ratio γ1 of about 3.763, for example, is established by engaging actions of the first clutch C1, second brake B2 and switching brake B0, and the second-gear position having the speed ratio γ2 of about 2.457, for example, which is lower than the speed ratio γ1, is established by engaging actions of the first clutch C1, switching brake B0 and first brake B1, as indicated in FIG. 18. Further, the third-gear position having the speed ratio γ3 of about 1.739, for example, which is lower than the speed ratio γ2, is established by engaging actions of the first clutch C1, third clutch C3 and switching brake B0, and the fourth-gear position having the speed ratio γ4 of about 1.244, for example, which is lower than the speed ratio γ3, is established by engaging actions of the first clutch C1, second clutch C2, and switching brake B0. The fifth-gear position having the speed ratio γ5 of 1.000 is established by engaging actions of the switching clutch C0 and the second clutch C2. The sixth-gear position having the speed ratio γ6 of about 0.811, for example, which is lower than the speed ratio γ5, is established by engaging actions of the second clutch C2, third clutch C3 and switching brake B0. The seventh-gear position having the speed ratio γ7 of about 0.645, for example, which is lower than the speed ratio γ6, is established by engaging actions of the second clutch C2, switching brake B0 and first brake B1. Further, the reverse-gear position having the speed ratio γR of about 3.162, for example, which is intermediate between the speed ratios γ1 and γ2, is established by engaging actions of the third clutch C3, switching brake B0 and second brake B2.

Where the drive system 80 functions as the step-variable transmission, on the other hand, the switching clutch C0 and the switching brake B0 are both released, as indicated in FIG. 20, so that the power distributing mechanism 84 functions as the continuously variable transmission, while the automatic transmission 86 connected in series to the power distributing mechanism 84 functions as the step-variable transmission having three forward-drive positions, whereby the speed of the rotary motion transmitted to the automatic transmission 86 placed in one of the first-gear, second-gear and third-gear positions, namely, the rotating speed of the power transmitting member 18 is continuously changed, so that the speed ratio of the drive system when the automatic transmission 86 is placed in one of those gear positions is continuously variable over a predetermined range. Accordingly, the speed ratio of the automatic transmission 86 is continuously variable across the adjacent gear positions, whereby the overall speed ratio γT of the drive system 80 is continuously variable.

The collinear chart of FIG. 19 indicates, by straight lines, a relationship among the rotating speeds of the rotary elements in each of the gear positions of the drive system 80 including the power distributing mechanism 84 and the automatic transmission 86, when the power distributing mechanism 84 is placed in the step-variable shifting state established by the engaging action of one of the switching clutch C0 and brake B0.

In FIG. 19, vertical lines Y1, Y2 and Y3 respectively indicate the rotating speeds of the first sun gear S1 (second rotary element RE2), the first ring gear R1 (third rotary element RE3) and the first carrier CA1 (first rotary element RE1) of the first planetary gear set 82 of the power distributing mechanism 84. When the switching brake B0 is engaged to establish the first-speed position through the fourth-speed position, the sixth-speed position and the seventh-speed position, the rotating speed of the first sun gear S1 is zeroed, while the rotating speed of the first carrier CA1 is made equal to the engine speed $N_E$, so that the relative rotating speed of the first ring gear R1, that is, the relative rotating speed of the power transmitting member 18 is represented by a point of intersection between the vertical line Y2 and a straight line L0 which connects a point of intersection between the horizontal line X1 and the vertical line Y1, and a point of intersection between the vertical line Y3 and the horizontal line X2 indicative of the engine speed $N_E$. In this case, the relative rotating speed of the power transmitting member 18 is lower than the engine speed $N_E$ represented by the horizontal line X2, so that the power distributing mechanism 84 functions as a speed reducing device. For vertical lines Y4-Y7, the horizontal line X3 indicates the reduced rotating speed. When the switching clutch C0 is engaged in place of the switching brake B0, to establish the fifth-speed position, the first sun gear S1, first ring gear R1 and first carrier CA1 of the first planetary gear set 82 are rotated as a unit at the engine speed $N_E$, and the relative rotating speed of the first ring gear R1, that is, the relative rotating speed of the power transmitting member 18 is represented by a point of intersection between the horizontal line X2 and the vertical line Y2. In this case, the relative rotating speed of the power transmitting member 18 is equal to the engine speed $N_E$, so that the power distributing mechanism 84 functions as a fixed-speed-ratio transmission having a speed ratio of 1. For the vertical lines Y4-Y7, the horizontal line X2 indicates the rotating speed.

As shown in the collinear chart of FIG. 19, the automatic transmission 86 is placed in the first-speed position when the first clutch C1, switching brake B0 and second brake B2 are engaged. The rotating speed of the output shaft 22 in the first-speed position is represented by a point of intersection between the vertical line Y6 indicative of the rotating speed of the sixth rotary element RE6 (R2, R3) fixed to the output shaft 22 and an inclined straight line L1 which passes a point of intersection between the vertical line Y7 indicative of the rotating speed of the seventh rotary element RE7 (S3) and the horizontal line X3, and a point of intersection between the vertical line Y5 indicative of the rotating speed of the fifth rotary element RE5 (CA2, CA3) and the horizontal line X1. Similarly, the rotating speed of the output shaft 22 in the second-speed position established by the engaging actions of the first clutch C1, switching brake B0 and first brake B1 is represented by a point of intersection between an inclined straight line L2 determined by those engaging actions and the vertical line Y6 indicative of the rotating speed of the sixth rotary element RE6 fixed to the output shaft 22. The rotating speed of the output shaft 22 in the third-speed position established by the engaging actions of the first clutch C1, third clutch C3 and switching brake B0 is represented by a point of intersection between an inclined straight line L3 and the vertical line Y6 determined by those engaging actions indicative of the rotating speed of the sixth rotary element RE6 fixed to the output shaft 22. The rotating speed of the output shaft 22 in the fourth-speed position established by the engaging actions of the first clutch C1, second clutch C2 and witching brake B0 is represented by a point of intersection between the vertical line Y6 indicative of the rotating speed of the sixth rotary element RE6 fixed to the output shaft 22 and an inclined straight line L4 which passes a point of intersection between the horizontal line X2 indicative of the rotating speed of the input shaft 14 and the vertical line Y5 indicative of the rotating speed of the fifth rotary element RE5, and a point of intersection between the vertical line Y7 indicative of the rotating speed of the seventh rotary element RE7 and the horizontal line X3. The rotating speed of the output shaft 22 in the fifth-speed position established by the engaging actions of the switching clutch C0 and second clutch C2 is represented by a point of intersection between straight line L5 aligned with the horizontal line X2 and the vertical line Y6 indicative of the rotating speed of the sixth rotary element RE6 fixed to the output shaft 22. The rotating speed of the output shaft 22 in the sixth-speed position established by the engaging actions of the second clutch C2, third clutch C3 and switching brake B0 is represented by a point of intersection between an inclined straight line L6 determined by those engaging actions and the vertical line Y6 indicative of the rotating speed of the sixth rotary element RE6 fixed to the output shaft 22. The rotating speed of the output shaft 22 in the seventh-speed position established by the engaging actions of the second clutch C2, switching brake B0 and first brake B1 is represented by a point of intersection between an inclined straight line L7 determined by those engaging actions and the vertical line Y6 indicative of the rotating speed of the sixth rotary element RE6 fixed to the output shaft 22. The rotating speed of the output shaft 22 in the reverse-gear position R established by the engaging actions of the third clutch C3, switching brake B0 and second brake B2 is represented by a point of intersection between an inclined straight line LR determined by those engaging actions and the vertical line Y6 indicative of the rotating speed of the sixth rotary element RE6 connected to the output shaft 22. It is noted that the switching brake B0 need not be engaged to establish the seventh-speed position shown in FIGS. 18 and 19, and that the first clutch C1 or the third clutch C3 need not be engaged to establish the fifth-speed position.

FIG. 20 is a table indicating shifting control operations of the automatic transmission 86 of the drive system 80 when the power distributing mechanism 84 is placed in the continuously-variable shifting state. FIG. 21 is a collinear chart for explaining the shifting control operations. In the continuously-variable shifting state of the power distributing mechanism 84 which is established by releasing actions of the switching clutch C0 and the switching brake B0, the rotating speed of the first electric motor M1 is variable over a wide range by controlling the reaction force of the first electric motor M1. Namely, the rotating speed of the first ring gear R1, that is, the rotating speed of the power transmitting member 18 is changed over a range a midpoint of which is the engine speed $N_E$, as represented by a point of intersection between the vertical line Y2 and a straight line L0 which is pivoted as indicated by arrows about a point of intersection between the horizontal line X2 and the vertical line Y3. As indicated in FIG. 21, the automatic transmission 86 is placed in the first-speed position when the first clutch C1 and second brake B2 are engaged. The rotating speed of the output shaft 22 in the first-speed position is represented by a point of intersection between the vertical line Y6 indicative of the rotating speed of the sixth rotary element RE6 (R2, R3) fixed to the output shaft 22 and an inclined straight line L1 which passes a point of intersection between the vertical line Y7 indicative of the rotating speed of the seventh rotary element RE7 (S3) and the horizontal line X3, and a point of intersection between the vertical line Y5 indicative of the rotating speed of the fifth rotary element RE5 (CA2, CA3) and the horizontal line X1. Similarly, the rotating speed of the output shaft 22 in the second-speed position established by the engaging actions of the first clutch C1 and first brake B1 is represented by a point of intersection between an inclined straight line L2 determined by those engaging actions and the vertical line Y6 indicative of the rotating speed of the sixth rotary element RE6 fixed to the output shaft 22. The rotating speed of the output shaft 22 in the third-speed position established by the engaging actions of the first clutch C1 and third clutch C3 is represented by a point of intersection between an inclined straight line L3 determined by those engaging actions and the vertical line Y6 indicative of the rotating speed of the sixth rotary element RE6 fixed to the output shaft 22. Thus, the power distributing mechanism 84 functions as a continuously-variable transmission while the automatic transmission 86 connected in series to the power distributing mechanism 86 functions as a step-variable transmission, so that the speed of the rotary motion transmitted to the automatic transmission 86 placed in one of the first-gear, second-gear and third-gear positions, namely, the rotating speed of the power transmitting member 18 is continuously changed, whereby the speed ratio of the drive system when the automatic transmission 86 is placed in one of those gear positions is continuously variable over a predetermined range. Accordingly, the speed ratio of the automatic transmission 86 is continuously variable across the adjacent gear positions, whereby the overall speed ratio γT of the drive system 80 is continuously variable.

The drive system 80 of the present embodiment is also constituted by the power distributing mechanism 16 functioning as the continuously-variable shifting portion or first shifting portion, and the automatic transmission 72 functioning as the step-variable shifting portion or second shifting portion, so that the present drive system 80 has advantages similar to those of the preceding embodiments.

Embodiment 5

Figures 22, 23:
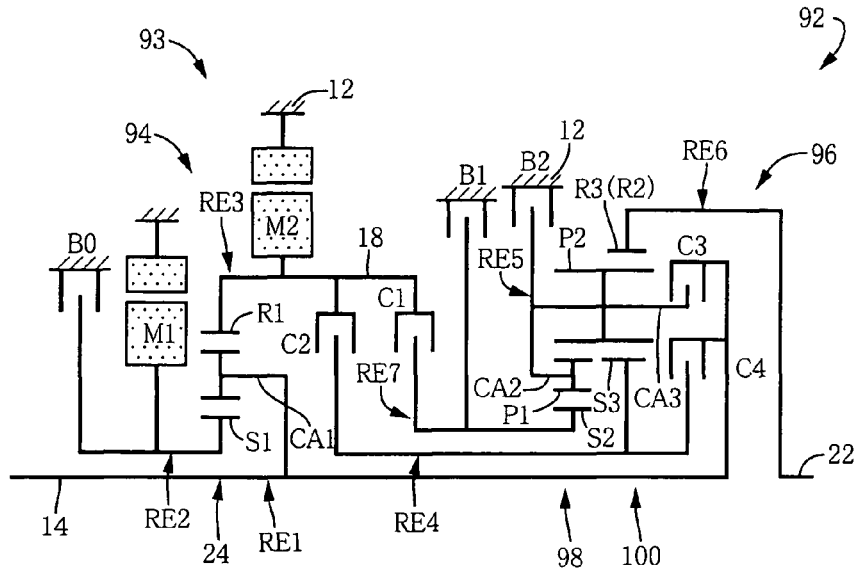
[FIG. 22] This figure is a schematic view corresponding to that of FIG. 1, for explaining an arrangement of a drive system of a hybrid vehicle according to another embodiment of the invention.
[FIG. 23] This figure is a table corresponding to that of FIG. 2, indicating shifting actions of the drive system of the hybrid vehicle of the embodiment of FIG. 22 operable in a step-variable shifting state, in relation to different combinations of operating states of hydraulically operated frictional coupling devices to effect the respective shifting actions.
Figure 24:
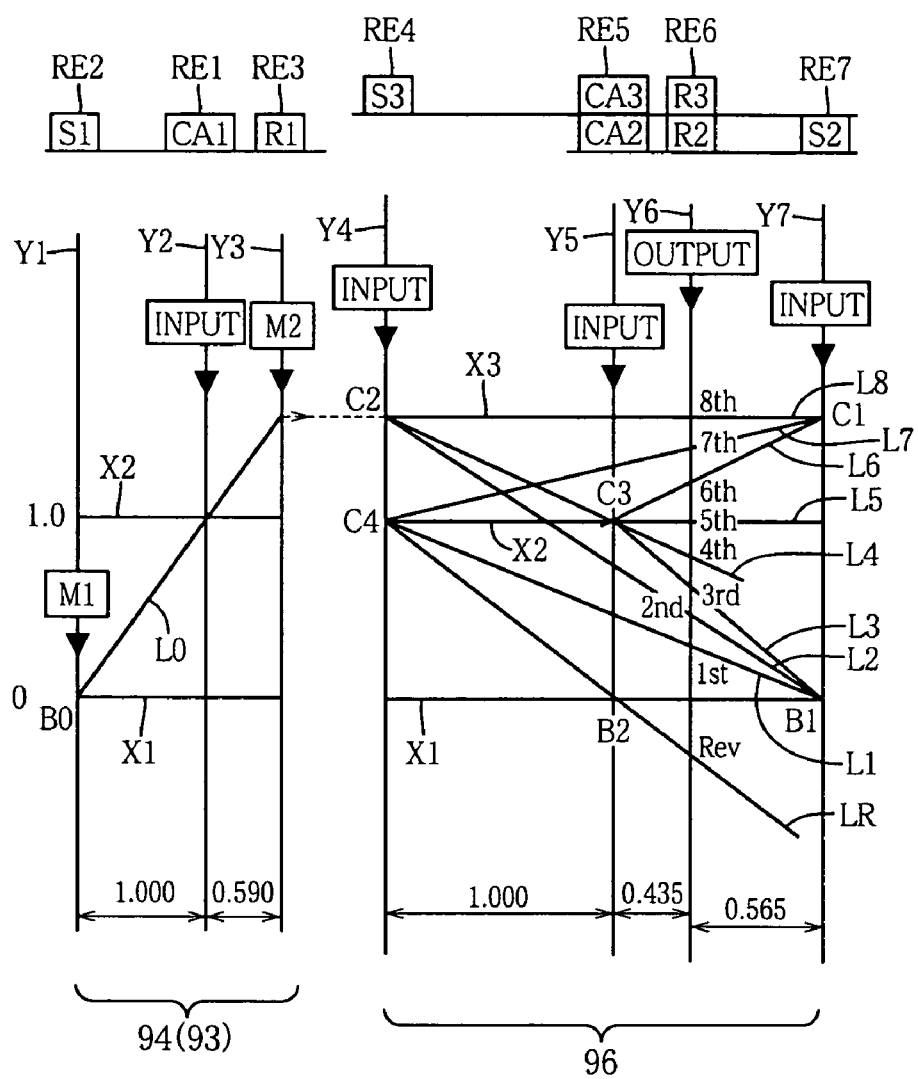
[FIG. 24] This figure is a collinear chart corresponding to that of FIG. 3, showing relative rotating speeds of rotary elements of the drive system of the hybrid vehicle of the embodiment of FIG. 22 operated in the step-variable shifting state, in different gear positions of the drive system.
Figures 25, 26:
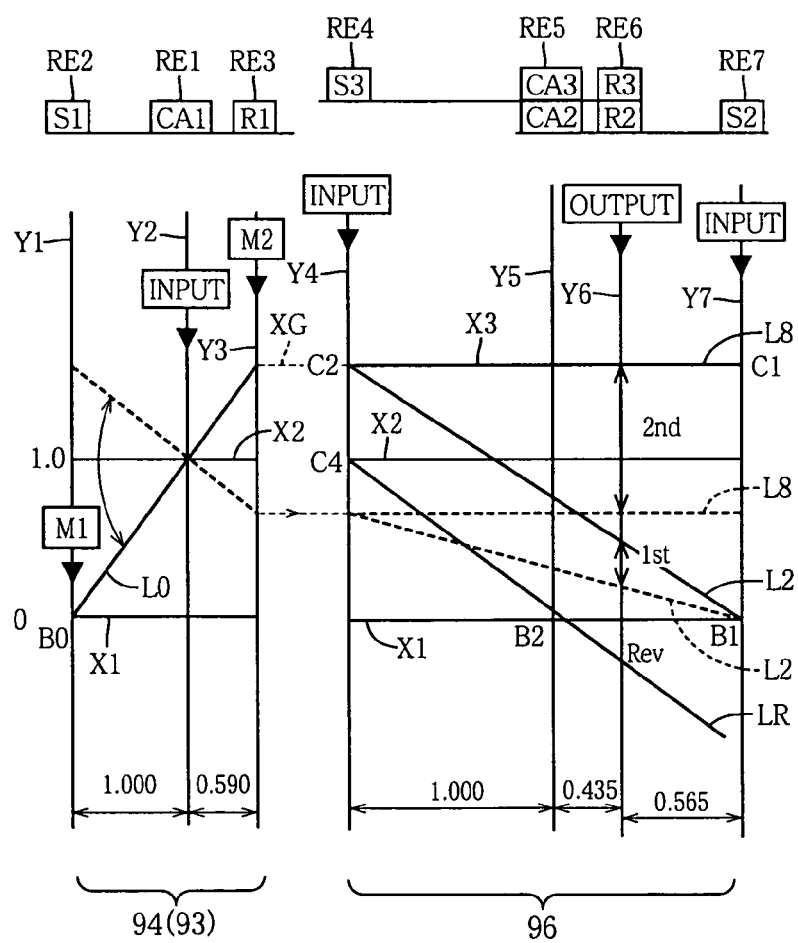
[FIG. 25] This figure is a table indicating shifting actions of the drive system of the hybrid vehicle of the embodiment of FIG. 22 operable in a continuously-variable shifting state, in relation to different combinations of operating states of the hydraulically operated frictional coupling devices to effect the respective shifting actions.
[FIG. 26] This figure is a collinear chart showing relative rotating speeds of the rotary elements of the drive system of the hybrid vehicle of the embodiment of FIG. 22 operated in the continuously-variable shifting state, in the different gear positions of the drive system.

FIG. 22 is a schematic view for explaining an arrangement of a drive system 92 according to another embodiment of this invention, and FIG. 23 is a table indicating gear positions of the drive system 92 placed in the step-variable shifting state, and different combinations of engaged states of the hydraulically operated frictional coupling devices for respectively establishing those gear positions, while FIG. 24 is a collinear chart for explaining step-variable shifting operations of the drive system 92. FIG. 25 is a table indicating the gear positions of the drive system 92 placed in the continuously-variable shifting state and different combinations of engaged states of the hydraulically operated frictional coupling devices for respectively establishing those gear positions, and FIG. 26 is a collinear chart for explaining continuously-variable shifting operations of the drive system 92.

The drive system 92 includes a power distributing mechanism 94, which has a first planetary gear set 24 of single-pinion type similar to that shown in FIG. 14, which has a gear ratio ρ1 of about 0.590, for example. The power distributing mechanism 94 has the switching brake B0. The drive system 92 further includes an automatic transmission 96 which has eight forward-drive positions and which is interposed between and connected in series to the power distributing mechanism 94 and the output shaft 22 through the power transmitting member 18. While the power distributing mechanism 94 in the present embodiment has the switching brake B0 operable to selectively fix the first sun gear S1 of the first planetary gear set 24 to the transmission casing 12, the mechanism 94 does not have the switching clutch C0 operable to selectively connect the first sun gear S1 and the first carrier CA1 to each other. When the switch brake B0 is engaged, the rotating speed of the first ring gear R1 is made higher than that of the first carrier CA1, so that the power distributing mechanism 94 is placed in a fixed-speed-ratio shifting state in which the mechanism 94 functions as a speed-increasing transmission having a fixed speed ratio γ0 of about 0.63, for example, which is lower than 1. In the present embodiment therefore, the switching brake B0 functions as a differential-state switching device operable to selectively place the power distributing mechanism 84 in the continuously-variable shifting state in which the mechanism 84 is operable as a continuously variable transmission the speed ratio γ0 of which is continuously variable, and the fixed-speed-ratio shifting state in which the mechanism 84 is operable as a transmission having a single gear position the speed ratio γ0 of which is lower than 1.

The automatic transmission 96 includes a double-pinion type second planetary gear set 98 having a gear ratio ρ2 of about 0.435, for example, and a single-pinion type third planetary gear set 100 having a gear ratio ρ3 of about 0.435, for example. The double-pinion second planetary gear set 98 has a pair of pinions P1, P2 which are rotatably supported by a second carrier CA2 and which mesh with each other. The outer pinion P2 is formed integrally with a pinion of the third planetary gear set 100. A second ring gear R2 and the second carrier CA2 which mesh with the pinion P2 are formed integrally with a third ring gear R3 and a third carrier CA3 of the third planetary gear set 100. A second sun gear S2 of the second planetary gear set 98 is selectively connected to the power transmitting member 18 through a first clutch C1, and selectively fixed to the transmission casing 12 through a first brake B1. A third sun gear S3 of the third planetary gear set 100 is selectively connected to the power transmitting member 18 through a second clutch C2, and selectively connected to the input shaft 14 through a fourth clutch C4. The second. carrier CA2 and the third carrier CA3 are selectively connected to the input shaft 14 through a third clutch C3, and selectively fixed to the transmission casing 12 through a second brake B2. The second ring gear R2 and the third ring gear R3 are integrally fixed to the output shaft 22.

In the drive system 92 constructed as described above, one of a first-gear position (first-speed position) through an eighth-gear position (eighth-speed position), a reverse-gear position (rear-drive position) and a neural position is selectively established by engaging actions of a corresponding combination of the frictional coupling devices selected from the above-described first clutch C1, second clutch C2, third clutch C3, fourth clutch C4, switching brake B0, first brake B1 and second brake B2, as indicated in the table of FIG. 23. Those gear positions have respective speed ratios γ (input shaft speed $N_{IN}$/output shaft speed $N_{OUT}$) which change as geometric series. In particular, it is noted that the power distributing mechanism 94 provided with the switching brake B0 can be selectively placed by engagement of the switching brake B0, in the fixed-speed-ratio shifting state in which the mechanism 94 is operable as a transmission having a single gear position with a single speed ratio, as well as in the continuously-variable shifting state in which the mechanism 94 is operable as a continuously variable transmission, as described above. In the present drive system 92, therefore, a step-variable transmission is constituted by the automatic transmission 96, and the power distributing mechanism 94 which is placed in the fixed-speed-ratio shifting state by engagement of the switching brake B0. Further, a continuously variable transmission is constituted by the automatic transmission 96, and the power distributing mechanism 94 which is placed in the continuously-variable shifting state established by a releasing action of the switching brake B0.

Where the drive system 92 functions as the step-variable transmission, for example, the first-gear position having the highest speed ratio γ1 of about 3.538, for example, is established by engaging actions of the fourth clutch C1, switching brake B0 and first brake B1, and the second-gear position having the speed ratio γ2 of about 2.226, for example, which is lower than the speed ratio γ1, is established by engaging actions of the second clutch C2, switching brake B0 and first brake B1, as indicated in FIG. 23. Further, the third-gear position having the speed ratio γ3 of about 1.769, for example, which is lower than the speed ratio γ2, is established by engaging actions of the third clutch C3, switching brake B0 and first brake B1, and the fourth-gear position having the speed ratio γ4 of about 1.345, for example, which is lower than the speed ratio γ3, is established by engaging actions of the second clutch C2, third clutch C3 and switching brake B0. The fifth-gear position having the speed ratio γ5 of 1.000, which is lower than the speed ration γ4, is established by engaging actions of the third clutch C3, fourth clutch C4 and switching brake B0. The sixth-gear position having the speed ratio γ6 of about 0.796, for example, which is lower than the speed ratio γ5, is established by engaging actions of the first clutch C1, third clutch C3 and switching brake B0. The seventh-gear position having the speed ratio γ7 of about 0.703, for example, which is lower than the speed ratio γ6, is established by engaging actions of the first clutch C1, fourth clutch C4 and switching brake B0, and the eighth-gear position having the speed ratio γ8 of about 0.629, for example, which is lower than the speed ratio γ7, is established by engaging actions of the first clutch C1, second clutch C2 and switching brake B0. Further, the reverse-gear position having the speed ratio γR of about 2.300, for example, which is intermediate between the speed ratios γ1 and γ2, is established by engaging actions of the fourth clutch C4, switching brake B0 and second brake B2.

Where the drive system 92 functions as the step-variable transmission, on the other hand, the switching brake B0 is held in the released state, as indicated in FIG. 25, so that the power distributing mechanism 94 functions as the continuously variable transmission, while the automatic transmission 96 connected in series to the power distributing mechanism 94 functions as the step-variable transmission having two forward-drive positions, whereby the speed of the rotary motion transmitted to the automatic transmission 96 placed in one of the second-gear and eighth-gear positions, namely, the rotating speed of the power transmitting member 18 is continuously changed, so that the speed ratio of the drive system when the automatic transmission 96 is placed in one of those gear positions is continuously variable over a predetermined range. Accordingly, the speed ratio of the automatic transmission 96 is continuously variable across the adjacent gear positions, whereby the overall speed ratio γT of the drive system 92 is continuously variable.

The collinear chart of FIG. 24 indicates, by straight lines, a relationship among the rotating speeds of the rotary elements in each of the gear positions of the drive system 92 constituted by the power distributing mechanism 94 and the automatic transmission 96, when the power distributing mechanism 94 is placed in the step-variable shifting state established by the engaging action of the switching brake B0.

In FIG. 24 similar to FIGS. 3 and 16, vertical lines Y1, Y2 and Y3 respectively indicate the rotating speeds of the first sun gear S1 (second rotary element RE2), the first carrier CA1 (first rotary element RE1) and the first ring gear R1 (third rotary element RE2) of the first planetary gear set 24 of the power distributing mechanism 94. In the step-variable shifting state, the switching brake B0 is engaged to establish each of the gear positions, and the rotating speed of the first sun gear S1 is zeroed, while the rotating speed of the first carrier CA1 is made equal to the engine speed $N_E$, so that the relative rotating speed of the first ring gear R1, that is, the relative rotating speed of the power transmitting member 18 is represented by a point of intersection between the vertical line Y3 and a straight line L0 which connects a point of intersection between the horizontal line X1 and the vertical line Y1, and a point of intersection between the vertical line Y2 and the horizontal line X2 indicative of the engine speed $N_E$. In this case, the relative rotating speed of the power transmitting member 18 is higher than the engine speed $N_E$ represented by the horizontal line X2, so that the power distributing mechanism 94 functions as a speed increasing device. For vertical lines Y4-Y7, the horizontal line X3 indicates the increased rotating speed.

As shown in the collinear chart of FIG. 24, the automatic transmission 96 is placed in the first-speed position when the fourth clutch C4, switching brake B0 and first brake B1 are engaged. The rotating speed of the output shaft 22 in the first-speed position is represented by a point of intersection between the vertical line Y6 indicative of the rotating speed of the sixth rotary element RE6 (R2, R3) fixed to the output shaft 22 and an inclined straight line L1 which passes a point of intersection between the vertical line Y4 indicative of the rotating speed of the fourth rotary element RE4 (S3) and the horizontal line X2, and a point of intersection between the vertical line Y7 indicative of the rotating speed of the seventh rotary element RF7 (S2) and the horizontal line X1. Similarly, the rotating speed of the output shaft 22 in the second-speed position established by the engaging actions of the second clutch C2, switching brake B0 and first brake B1 is represented by a point of intersection between an inclined straight line L2 determined by those engaging actions and the vertical line Y6 indicative of the rotating speed of the sixth rotary element RE6 fixed to the output shaft 22. The rotating speed of the output shaft 22 in the third-speed position established by the engaging actions of the third clutch C3, switching brake B0 and first brake B1 is represented by a point of intersection between an inclined straight line L3 determined by those engaging actions and the vertical line Y6 indicative of the rotating speed of the sixth rotary element RE6 fixed to the output shaft 22. The rotating speed of the output shaft 22 in the fourth-speed position established by the engaging actions of the second clutch C2, third clutch C3 and switching brake B0 is represented by a point of intersection between an inclined straight line L4 determined by those engaging actions and the vertical line YG indicative of the rotating speed of the sixth rotary element RE6 (R2, R3) fixed to the output shaft 22. The rotating speed of the output shaft 22 in the fifth-speed position established by the engaging actions of the third clutch c2, fourth clutch C4 and switching brake B0 is represented by a point of intersection between straight line L5 determined by those engaging actions and the vertical line Y6 indicative of the rotating speed of the sixth rotary element RE6 (R2, R3) fixed to the output shaft 22. The rotating speed of the output shaft 22 in the sixth-speed position established by the engaging actions of the first clutch C1, third clutch C3 and switching brake B0 is represented by a point of intersection between an inclined straight line L6 determined by those engaging actions and the vertical line Y6 indicative of the rotating speed of the sixth rotary element RE6 (R2, R3) fixed to the output shaft 22. The rotating speed of the output shaft 22 in the seventh-speed position established by the engaging actions of the first clutch C1, fourth clutch C4 and switching brake B0 is represented by a point of intersection between an inclined straight line L7 determined by those engaging actions and the vertical line Y6 indicative of the rotating speed of the sixth rotary element RE6 (R2, R3) fixed to the output shaft 22. The rotating speed of the output shaft 22 in the eighth-speed position established by the engaging actions of the first clutch C1, second clutch C2 and switching brake B0 is represented by a point of intersection between an inclined straight line L8 determined by those engaging actions and the vertical line Y6 indicative of the rotating speed of the sixth rotary element RE6 (R2, R3) fixed to the output shaft 22. The rotating speed of the output shaft 22 in the reverse-gear position R established by the engaging actions of the fourth clutch C4, switching brake B0 and second brake B2 is represented by a point of intersection between an inclined straight line LR determined by those engaging actions and the vertical line Y6 indicative of the rotating speed of the sixth rotary element RE6 connected to the output shaft 22. It is noted that the switching brake B0 need not be engaged to establish the first-speed position, third-speed position, fifth-speed position and reverse-gear position R shown in FIGS. 23 and 24.

FIG. 25 is a table indicating shifting control operations of the automatic transmission 96 of the drive system 92 when the power distributing mechanism 94 is placed in the continuously-variable shifting state. FIG. 26 is a collinear chart for explaining the shifting control operations. In the continuously-variable shifting state of the power distributing mechanism 94 which is established by a releasing action of the switching brake B0, the rotating speed of the first electric motor M1 is variable over a wide range by controlling the reaction force of the first electric motor M1. Namely, the rotating speed of the first ring gear R1, that is, the rotating speed of the power transmitting member 18 is changed over a range a midpoint of which is the engine speed $N_E$, as represented by a point of intersection between the vertical line Y3 and a straight line L0 which is pivoted as indicated by arrows about a point of intersection between the horizontal line X2 and the vertical line Y2. As indicated in FIG. 26, the automatic transmission 96 is placed in a low-gear position when the second clutch C2 and first brake B1 are engaged. The rotating speed of the output shaft 22 in the low-gear position in the form of the second-speed position is represented by a point of intersection between the vertical line Y6 indicative of the rotating speed of the sixth rotary element RE6 (R2, R3) fixed to the output shaft 22 and an inclined straight line L2 which passes a point of intersection between the vertical line Y7 indicative of the rotating speed of the seventh rotary element RE7 (S2) and the horizontal line X1, and a point of intersection between the vertical line Y4 indicative of the rotating speed of the fourth rotary element RE4 (S3) and the horizontal line X3. Similarly, the rotating speed of the output shaft 22 in a high-gear position in the form of the eighth-speed position established by the engaging actions of the first clutch C1 and second clutch C2 is represented by a point of intersection between a horizontal straight line L8 and the vertical line Y6 indicative of the rotating speed of the sixth rotary element RE6 fixed to the output shaft 22. In the low-speed position of the automatic transmission 96, the straight line L2 is pivoted to a position indicated by a broken line when the straight line L0 is pivoted to a position indicated by a broken line, so that the point of intersection of the straight line L2 with the vertical line Y6 is moved, whereby the rotating speed of the output shaft 22 is continuously variable. Thus, the power distributing mechanism 96 functions as a continuously-variable transmission while the automatic transmission 96 connected in series to the power distributing mechanism 94 functions as a step-variable transmission having two gear positions consisting of the low-speed position and the high-speed position, so that the speed of the rotary motion transmitted to the automatic transmission 96 placed in one of the second-speed and eighth-speed positions, namely, the rotating speed of the power transmitting member 18 is continuously changed, whereby the speed ratio of the drive system when the automatic transmission 96 is placed in one of those gear positions is continuously variable over a predetermined range. Accordingly, the speed ratio of the automatic transmission 96 is continuously variable across the adjacent gear positions, whereby the overall speed ratio $\gamma T$ of the drive system 92 is continuously variable.

The drive system 92 of the present embodiment is also constituted by the power distributing mechanism 94 functioning as the continuously-variable shifting portion or first shifting portion, and the automatic transmission 96 functioning as the step-variable shifting portion or second shifting portion, so that the present drive system 92 has advantages similar to those of the preceding embodiments.

Embodiment 6

Figures 27, 28:
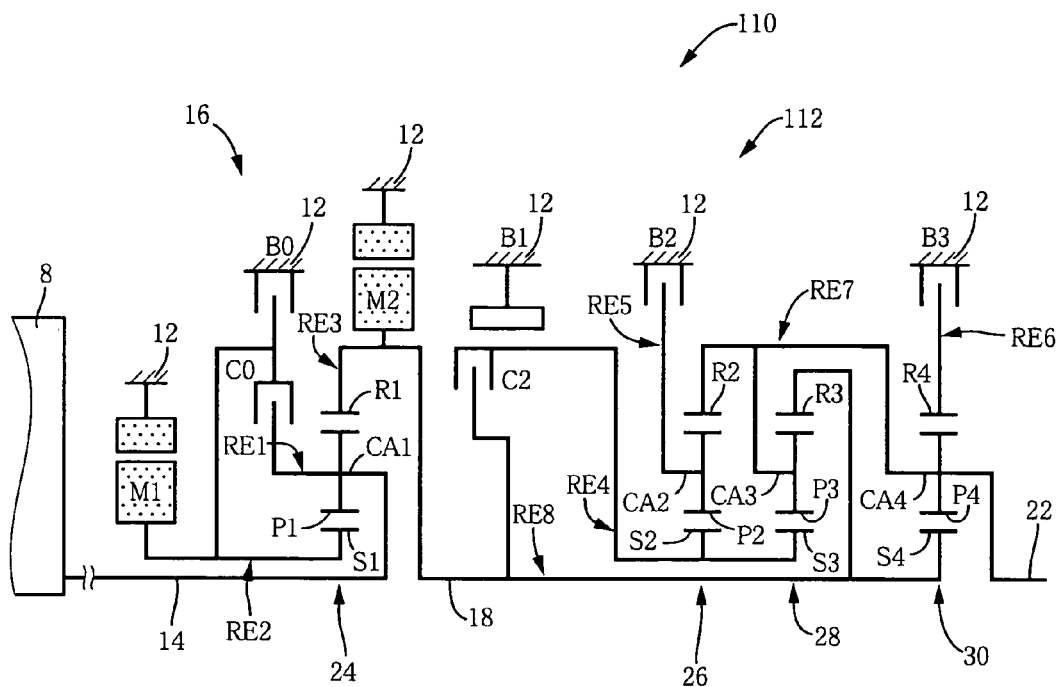
[FIG. 27] This figure is a schematic view corresponding to that of FIG. 1, for explaining an arrangement of a drive system of a hybrid vehicle according to another embodiment of the invention.
[FIG. 28] This figure is a table corresponding to that of FIG. 2, indicating shifting actions of the drive system of the hybrid vehicle of the embodiment of FIG. 27 operable in a continuously-variable shifting state or a step-variable shifting state, in relation to different combinations of operating states of hydraulically operated frictional coupling devices to effect the respective shifting actions.
Figure 29:
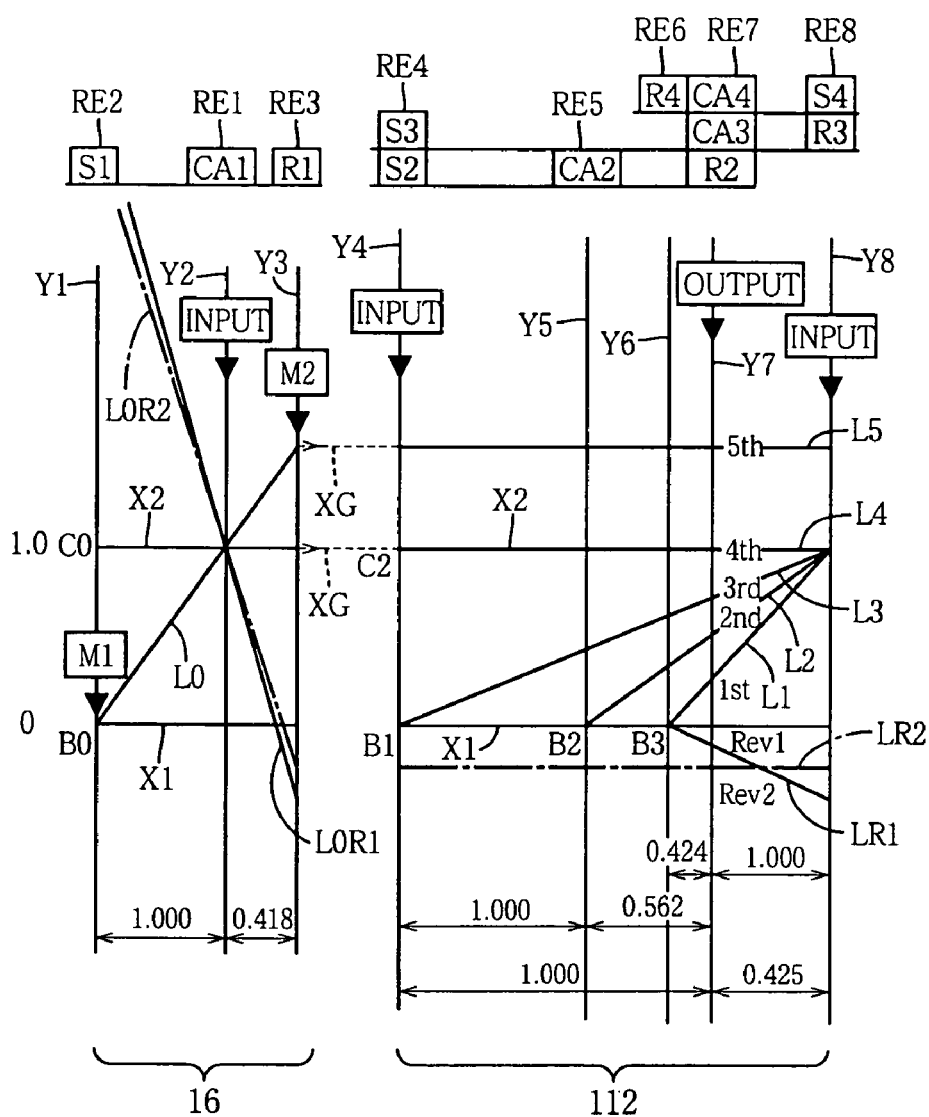
[FIG. 29] This figure is a collinear chart corresponding to that of FIG. 3, showing relative rotating speeds of rotary elements of the drive system of the hybrid vehicle of the embodiment of FIG. 27 operated in the step-variable shifting state, in different gear positions of the drive system.

FIG. 27 is a schematic view for explaining an arrangement of a drive system 110 according to another embodiment of this invention, and FIG. 28 is a table indicating gear positions of the drive system 110, and different combinations of engaged states of the hydraulically operated frictional coupling devices for respectively establishing those gear positions, while FIG. 29 is a collinear chart for explaining shifting operations of the drive system 110. The present embodiment is different from the embodiment shown in FIGS. 1-3 in that the first clutch C1 is not provided the present embodiment, and in the manner of establishing a reverse-gear position in the present embodiment. The following description of the present embodiment primarily relates to a difference between the drive system 110 and the drive system 10.

The drive system 110 includes a power distributing mechanism 16, which has a first planetary gear set 24 of single-pinion type having a gear ratio ρ1 of about 0.418, for example, and the switching clutch C0 and the switching brake B0. The drive system 110 further includes an automatic transmission 112 which has four forward-drive positions and which is interposed between and connected in series to the power distributing mechanism 16 and the output shaft 22 through the power transmitting member 18. The automatic transmission 112 includes a second planetary gear set 26 of single-pinion type having a gear ratio ρ2 of about 0.562, for example, a third planetary gear set 28 of single-pinion type having a gear ratio ρ3 of about 0.425, for example, and a fourth planetary gear set 30 of single-pinion type having a gear ratio ρ4 of about 0.421, for example.

In the automatic transmission 112, the first clutch C1 provided in the drive system 10 is not provided, so that the third ring gear R3 and the fourth sun gear S4. which are selectively connected to the power transmitting member 18 through the first clutch C1 in the drive system 10, are integrally fixed to the power transmitting member 18. Namely, the automatic transmission 112 is arranged such that the second sun gear S2 and the third sun gear S3 are integrally fixed to each other, selectively connected to the power transmitting member 18 through the second clutch C2, and selectively fixed to the transmission casing 12 through the first brake B1, and such that the second carrier CA2 is selectively fixed to the transmission casing 12 through the second brake B2, while the fourth ring gear R4 is selectively fixed to the transmission casing 12 through the third brake B3. Further, the second ring gear R2, third carrier CA3 and fourth carrier CA4 are integrally fixed to the output shaft 22, and the third ring gear R3 and fourth sun gear S4 are integrally fixed to the power transmitting member 18.

In the drive system 110 constructed as described above, one of a first-gear position (first-speed position) through a fifth-gear position (fifth-speed position), a reverse-gear position (rear-drive position) and a neural position is selectively established by engaging actions of a corresponding combination of the frictional coupling devices selected from the above-described switching clutch C0, second clutch C2, switching brake B0, first brake B1, second brake B2 and third brake B3, as indicated in the table of FIG. 28. Those gear positions have respective speed ratios γ (input shaft speed $N_{IN}$/output shaft speed $N_{OUT}$) which change as geometric series. Although the present embodiment does not use the first clutch C1 provided in the drive system 10, the present drive system 110 has the first-speed position through the fifth-speed position as in the drive system 10. In the drive system 10, the first clutch C1 is engaged to establish the first-speed position through the fifth-speed position, as is apparent from the table of FIG. 2. In the present drive system 110, however, the third ring gear R3 and the fourth sun gear S4 are integrally fixed to the power transmitting member 18.

As in the drive system 10, the power distributing mechanism 16 is provided with the switching clutch C0 and brake B0, and can be selectively placed by engagement of the switching clutch C0 or switching brake B0, in the fixed-speed-ratio shifting state in which the mechanism 16 is operable as a transmission having a single gear position with one speed ratio or a plurality of gear positions with respective speed ratios, as well as in the continuously-variable shifting state in which the mechanism 16 is operable as a continuously variable transmission, as described above. In the present drive system 110, therefore, a step-variable transmission is constituted by the automatic transmission 112, and the power distributing mechanism 16 which is placed in the fixed-speed-ratio shifting state by engagement of the switching clutch C0 or switching brake B0. Further, a continuously variable transmission is constituted by the automatic transmission 112, and the power distributing mechanism 16 which is placed in the continuously-variable shifting state, with none of the switching clutch C0 and brake B0 being engaged.

Where the drive system 110 functions as the step-variable transmission, for example, the first-gear position having the highest speed ratio γ1 of about 3.357, for example, is established by engaging actions of the switching clutch C0 and third brake B3, and the second-gear position having the speed ratio γ2 of about 2.180, for example, which is lower than the speed ratio γ1, is established by engaging actions of the switching clutch C0 and second brake B2, as indicated in FIG. 28. Further, the third-gear position having the speed ratio γ3 of about 1.424, for example, which is lower than the speed ratio γ2, is established by engaging actions of the switching clutch C0 and first brake B1, and the fourth-gear position having the speed ratio γ4 of about 1.000, for example, which is lower than the speed ratio γ3, is established by engaging actions of the switching clutch C0 and second clutch C2, while the fifth-gear position having the speed ratio γ5 of about 0.705, for example, which is lower than the speed ratio γ4, is established by engaging actions of the second clutch C2 and switching brake B0. Further, the neutral position N is established by releasing all of the switching clutch C0, second clutch C2, switching brake B0, first brake B1, second brake B2 and third brake B3.

Where the drive system 110 functions as the continuously-variable transmission, on the other hand, the switching clutch C0 and the switching brake B0 are both released, as indicated in FIG. 28, so that the power distributing mechanism 16 functions as the continuously variable transmission, while the automatic transmission 112 connected in series to the power distributing mechanism 16 functions as the step-variable transmission, whereby the speed of the rotary motion transmitted to the automatic transmission 112 placed in one of the first-gear, second-gear, third-gear and fourth-gear positions, namely, the rotating speed of the power transmitting member 18 is continuously changed, so that the speed ratio of the drive system when the automatic transmission 112 is placed in one of those gear positions is continuously variable over a predetermined range. Accordingly, the speed ratio of the automatic transmission 112 is continuously variable across the adjacent gear positions, whereby the overall speed ratio γT of the drive system 110 is continuously variable.

In the embodiment shown in FIGS. 1-3, the reverse-gear position is established by engaging the second clutch C2 and third brake B3, and releasing the first clutch C1 to prevent transmission of the rotary motion of the power transmitting member 18 to the output shaft 22 due to the engagement of the second clutch C2, which causes the rotary elements of the automatic transmission 20 to be rotated as a unit as in the fourth-gear and fifth-gear positions. In the present embodiment, a reverse-gear or rear-drive position is established by reversing the direction of rotation of the power transmitting member 18 as transmitted to the automatic transmission 112, with respect to the direction of rotation in the first-gear through fifth-gear positions, without reversal of the rotating direction of the power transmitting member 18 within the automatic transmission 112. Namely, the present embodiment does not use the first clutch C1 in the automatic transmission 112, to establish the reverse-gear or rear-drive positions.

Described in detail, during an operation of the engine 8, for example, the power distributing mechanism 16 operating as the continuously variable transmission functions to reverse the direction of rotation of the power transmitting member 18 with respect to the operating direction of the engine 8, so that a rotary motion of the power transmitting member 18 in the reverse direction is transmitted to the automatic transmission 112. By engaging the third brake B3, a rear-drive position in the form of a first reverse-gear position having a desired speed ratio λR1 is established. The speed ratio λR1 may usually be set to be about 3.209 as in the drive system 10 shown in FIGS. 1-3, but may be changed by changing the rotating speed of the power transmitting member 18 in the reverse direction, depending upon the vehicle running condition, for instance, whether the roadway is flat, uphill, or deteriorated of its surface condition. The speed ratio λR1 of the reverse-drive position can be made higher than the speed ratio λ1 of the first-gear position, by lowering the absolute value of the negative rotating speed of the power transmitting member 18.

A second reverse-gear position may be provided in place of, or in addition to the first reverse-gear position indicated above. This second reverse-gear position is established by engaging the second clutch C2 while rotary motion of the power transmitting member 18 in the reverse direction is transmitted to the automatic transmission 112. In this second reverse-gear position, the rotary elements of the automatic transmission 112 are rotated as a unit, so that the rotary motion of the power transmitting member 18 in the reverse direction is transmitted to the output shaft 22. The second reverse-gear position has a desired speed ratio λR2.

The collinear chart of FIG. 29 indicates, by straight lines, a relationship among the rotating speeds of the rotary elements in each of the gear positions of the drive system 110, which is constituted by the power distributing mechanism 16 functioning as the continuously-variable shifting portion or first shifting portion, and the automatic transmission 112 functioning as the step-variable shifting portion or second shifting portion. The rotating speeds of the individual rotary elements when the switching clutch C0 and the switching brake B0 are in the released state, and those when the switching clutch C0 or brake B0 is in the engaged state, have been described above. The arrangements of the fourth rotary element RE4 through the eighth rotary elements RE8 of the automatic transmission 112 are the same as those of the automatic transmission 20.

In the automatic transmission 112, the fourth rotary element RE4 is selectively connected to the power transmitting member 18 through the second clutch C2, and selectively fixed to the transmission casing 12 through the first brake B1, and the fifth rotary element RE5 is selectively fixed to the transmission casing 12 through the second brake B2, while the sixth rotary element RE6 is selectively fixed to the transmission casing 12 through the third brake B3. Further, the seventh rotary element RE7 is fixed to the output shaft 22, and the eighth rotary element RE8 is fixed to the power transmitting member 18.

As shown in the collinear chart of FIG. 29, the automatic transmission 112 is placed in the first-speed position when the third clutch C3 is engaged. The rotating speed of the output shaft 22 in the first-speed position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1. Similarly, the rotating speed of the output shaft 22 in the second-speed position established by the engaging actions of the second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third-speed position established by the engaging actions of the first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth-speed position established by the engaging actions of the second brake C2 is represented by a point of intersection between an inclined straight line L4 determined by those engaging actions and the vertical line Y7 indicative of the rotating speed of the seventh rotary element RE7 fixed to the output shaft 22. In the first-speed through fourth-speed positions in which the switching clutch C0 is engaged, the rotary motion of the power distributing mechanism 16 at the same speed as the engine speed $N_E$ is transmitted to the eighth rotary element RE8. When the switching brake B0 is engaged in place of the switching clutch C0, the rotary motion of the power distributing mechanism 16 at a speed higher than the engine speed $N_E$ is transmitted to the eighth rotary element. The rotating speed of the output shaft 22 in the fifth speed position established by the engaging actions of the second clutch C2 and switching brake B0 is represented by a point of intersection between a horizontal straight line L5 determined by those engaging actions and the vertical line Y7 indicative of the rotating speed of the seventh rotary element RE7 fixed to the output shaft 22.

When the switching clutch C0 and the switching brake B0 are both released, the rotary motion of the power distributing mechanism 16 transmitted to the eighth rotary element RE8 is continuously variable with respect to the engine speed $N_E$. When the direction of the rotary motion to be transmitted to the eighth rotary element RE8 is reversed, in this state, by the power distributing mechanism 16 with respect to the operating direction of the engine 8, as indicated by a straight line L0R1, the rotating speed of the output shaft 22 in the first reverse-gear position having a speed ratio Rev1 established by the engaging action of the third brake B3 is represented by a point of intersection between an inclined straight line LR1 determined by that engaging action and the vertical line Y7 indicative of the rotating speed of the seventh rotary element RE7 fixed to the output shaft 22. When the direction of the rotary motion to be transmitted to the eighth rotary element RE8 is reversed with respect to the operating direction of the engine 8, as indicated by a straight line L0R2, while the power distributing mechanism 16 is placed in the continuously-variable shifting state, the rotating speed of the output shaft 22 in the second reverse-gear position having a speed ratio Rev2 established by the engaging action of the second clutch C2 is represented by a point of intersection of a horizontal straight line LR2 determined by that engaging action and the vertical line Y7 indicative of the rotating direction of the seventh rotary element RE7 fixed to the output shaft 22.

In the present embodiment, too, the drive system 110 is constituted by the power distributing mechanism 16 functioning as the continuously-variable shifting portion or first shifting portion, and the automatic transmission 112 functioning as the step-variable shifting portion or second shifting portion, so that the present drive system 110 has advantages similar to those of the preceding embodiments. The present embodiment has a further advantage that the drive system 110 is small-sized and has a reduced axial dimension, owing to the elimination of the first clutch C1 provided in the embodiment shown in FIGS. 1-3.

The drive system 110 of the present embodiment is further arranged such that the direction of the rotary motion of the power transmitting member 18 transmitted to the automatic transmission 112 in the rear-drive position is reversed with respect to that in the first-gear through fifth-gear positions. Accordingly, the automatic transmission 112 is not required to be provided with coupling devices or gear devices for reversing the direction of rotation of the output shaft 22 with respect to that of the input rotary motion, for establishing the reverse-gear position for the rotary motion of the output shaft 22 in the direction opposite to that in the forward-drive positions. Thus, the rear-drive position can be established in the absence of the first clutch C1 in the automatic transmission, so that the drive system can be small-sized. Further, in the rear-drive position, the speed of the output rotary motion of the automatic transmission 112 is made lower than or equal to that of the input rotary motion received from the power distributing mechanism 16 the speed ratio of which is continuously variable in the engaged state of the third brake B3 or second clutch C2. Accordingly, the rear-drive position has a desired speed ratio λR, which may be higher than that of the first-gear position.

Embodiment 7

Figure 30:
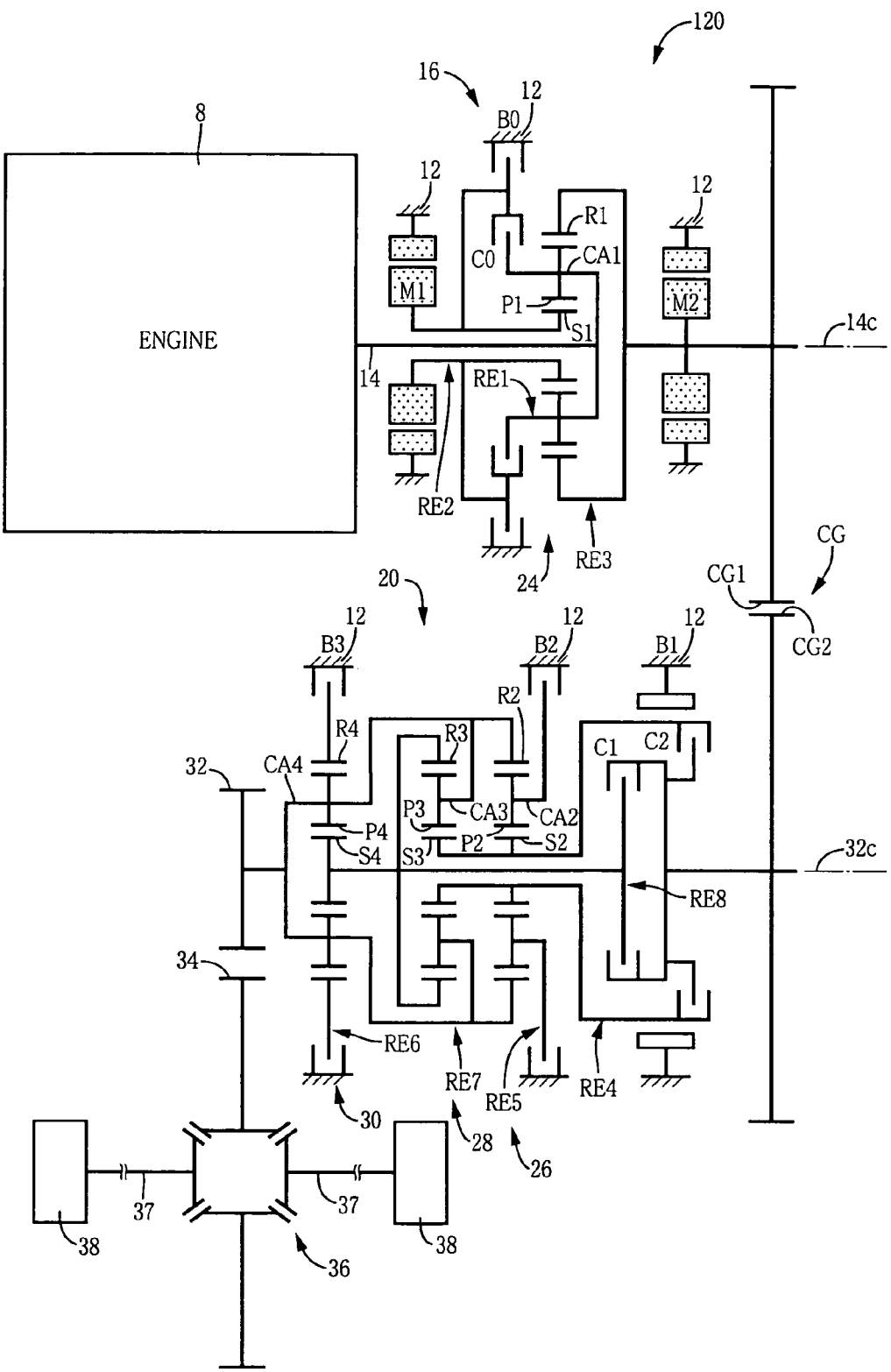
[FIG. 30] This figure is a schematic view corresponding to that of FIG. 1, for explaining an arrangement of a drive system of a hybrid vehicle according to another embodiment of the invention.
Figures 31, 32:
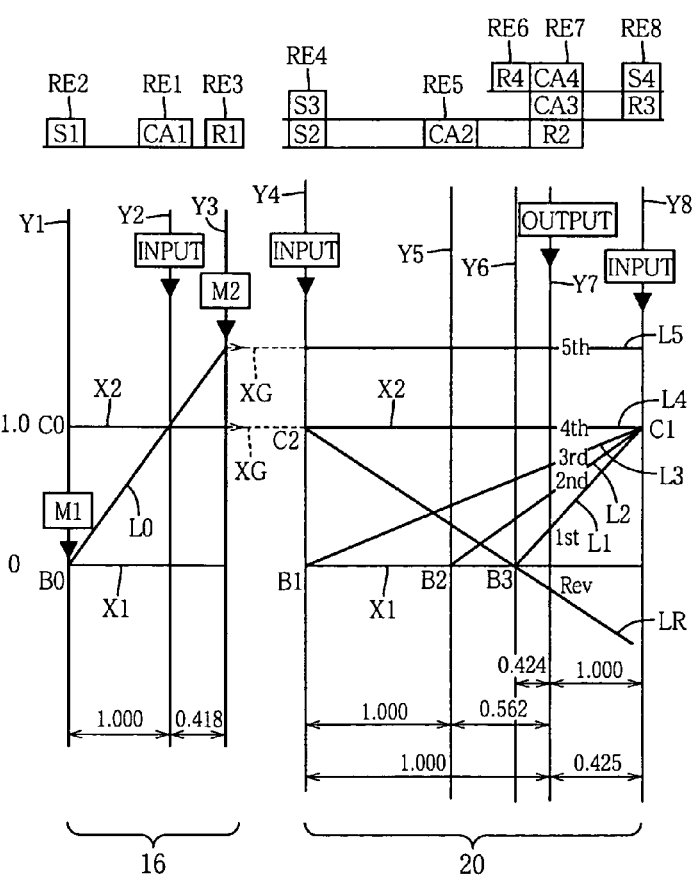
[FIG. 31] This figure is a table corresponding to that of FIG. 2, indicating shifting actions of the drive system of the hybrid vehicle of the embodiment of FIG. 30 operable in a continuously-variable shifting state or a step-variable shifting state, in relation to different combinations of operating states of hydraulically operated frictional coupling devices to effect the respective shifting actions.
[FIG. 32] This figure is a collinear chart corresponding to that of FIG. 3, showing relative rotating speeds of rotary elements of the drive system of the hybrid vehicle of the embodiment of FIG. 30 operated in the step-variable shifting state, in different gear positions of the drive system.

FIG. 30 is a schematic view for explaining an arrangement of a drive system 120 according to another embodiment of this invention, and FIG. 31 is a table indicating gear positions of the drive system 120, and different combinations of engaged states of the hydraulically operated frictional coupling devices for respectively establishing those gear positions, while FIG. 32 is a collinear chart for explaining shifting operations of the drive system 120. The present embodiment is different from the embodiment shown in FIGS. 1-3, primarily in that the power distributing mechanism 16 and the automatic transmission 20 are not disposed coaxially with each other in the present embodiment. The following description of the present embodiment primarily relates to a difference between the drive system 120 and the drive system 10.

The drive system 120 shown in FIG. 30 is provided, within a casing 12 attached to the vehicle body, with: an input shaft 14 disposed rotatably about a first axis 14c; the power distributing mechanism 16 mounted on the input shaft 14 directly, or indirectly through a pulsation absorbing damper (vibration damping device); the automatic transmission 20 disposed rotatably about a second axis 32c parallel to the first axis 14c; an output rotary member in the form of a differential drive gear 32 connected to the automatic transmission 20; and a power transmitting member in the form of a counter gear pair CG which connects the power distributing mechanism 16 and the automatic transmission 20, so as to transmit a drive force therebetween. This drive system 120 is suitably used on a transverse FF (front-engine, front-drive) vehicle or a transverse RR (rear-engine, rear-drive) vehicle, and is disposed between a drive power source in the form of an engine 8 and a pair of drive wheels 38. The drive force is transmitted from the differential drive gear 32 to the pair of drive wheels 38, through a differential gear 34 meshing with the differential drive gear 32, a differential gear device 36, a pair of drive axles 37, etc.

The counter gear pair CG indicated above consists of a counter drive gear CG1 disposed rotatably on the first axis 14c and coaxially with the power distributing mechanism 16 and fixed to a first ring gear R1, and a counter driven gear CG2 disposed rotatably on the second axis 32c and coaxially with the automatic transmission 20 and connected to the automatic transmission 20 through a first clutch C1 and a second clutch C2. The counter drive gear CG1 and the counter driven gear CG2 serve as a pair of members in the form of a pair of gears which are held in meshing engagement with each other. Since the speed reduction ratio of the counter gear pair CG (rotating speed of the counter drive gear CG1/rotating speed of the counter driven gear CG2) is about 1.000, the counter gear pair CG functionally corresponds to the power transmitting member 18 in the embodiment shown in FIGS. 1-3, which connects the power distributing mechanism 16 and the automatic transmission 20. That is, the counter drive gear CG1 corresponds to a power transmitting member which constitutes a part of the power transmitting member 18 on the side of the first axis 14c, while the counter driven gear CG2 corresponds to a power transmitting member which constitutes another part of the power transmitting member 18 on the side of the second axis 32c.

Referring to FIG. 30, the individual elements of the drive system 120 will be described. The counter gear pair CG is disposed adjacent to one end of the power distributing mechanism 16 which remote from the engine 8. In other words, the power distributing mechanism 16 is interposed between the engine 8 and the counter gear pair CG, and located adjacent to the counter gear pair CG. A second electric motor M2 is disposed on the first axis 14c, between a first planetary gear set 24 and the counter gear pair CG, such that the second electric motor M2 is fixed to the counter drive gear CG1. The differential drive gear 32 is disposed adjacent to one end of the automatic transmission 20 which is remote from the counter gear pair CG, that is, on the side of the engine 8. In other words, the automatic transmission 20 is interposed between the counter gear pair CG and the differential drive gear 32 (engine 8), and located adjacent to the counter gear pair CG. Between the counter gear pair CG and the differential drive gear 32, a second planetary gear set 26, a third planetary gear set 28 and a fourth planetary gear set 30 are disposed in the order of description, in the direction from the counter gear pair CG toward the differential drive gear 32. The first clutch C1 and the second clutch C2 are disposed between the counter gear pair CG and the second planetary gear set 26.

The present embodiment is different from the embodiment shown in FIGS. 1-3, only in that the counter gear pair CG replaces the power transmitting member 18 connecting the power distributing mechanism 16 and the automatic transmission 20, and is identical with the embodiment of FIGS. 1-3 in the arrangements of the power distributing mechanism 16 and automatic transmission 20. Accordingly, the table of FIG. 31 and the collinear chart of FIG. 32 are the same as the table of FIG. 2 and the collinear chart of FIG. 3, respectively.

In the present embodiment, too, the drive system 120 is constituted by the power distributing mechanism 16 functioning as the continuously-variable shifting portion or first shifting portion, and the automatic transmission 20 functioning as the step-variable shifting portion or second shifting portion, so that the drive system 120 has advantages similar to those of the preceding embodiments. Unlike the embodiment shown in FIGS. 1-3, the present embodiment is arranged such that the power distributing mechanism 16 and the automatic transmission 20 are not disposed coaxially with each other, so that the required dimension of the drive system 120 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. The present embodiment has an additional advantage that the required axial dimension of the drive system 120 can be further reduced, since the power distributing mechanism 16 and the automatic transmission 20 are located between the engine 8 (differential drive gear 32) and the counter gear pair CG. Further, the required axial dimension of the second axis 32c can be reduced owing to the arrangement in which the second electric motor M2 is disposed on the first axis 13c.

Embodiment 8

Figure 33:
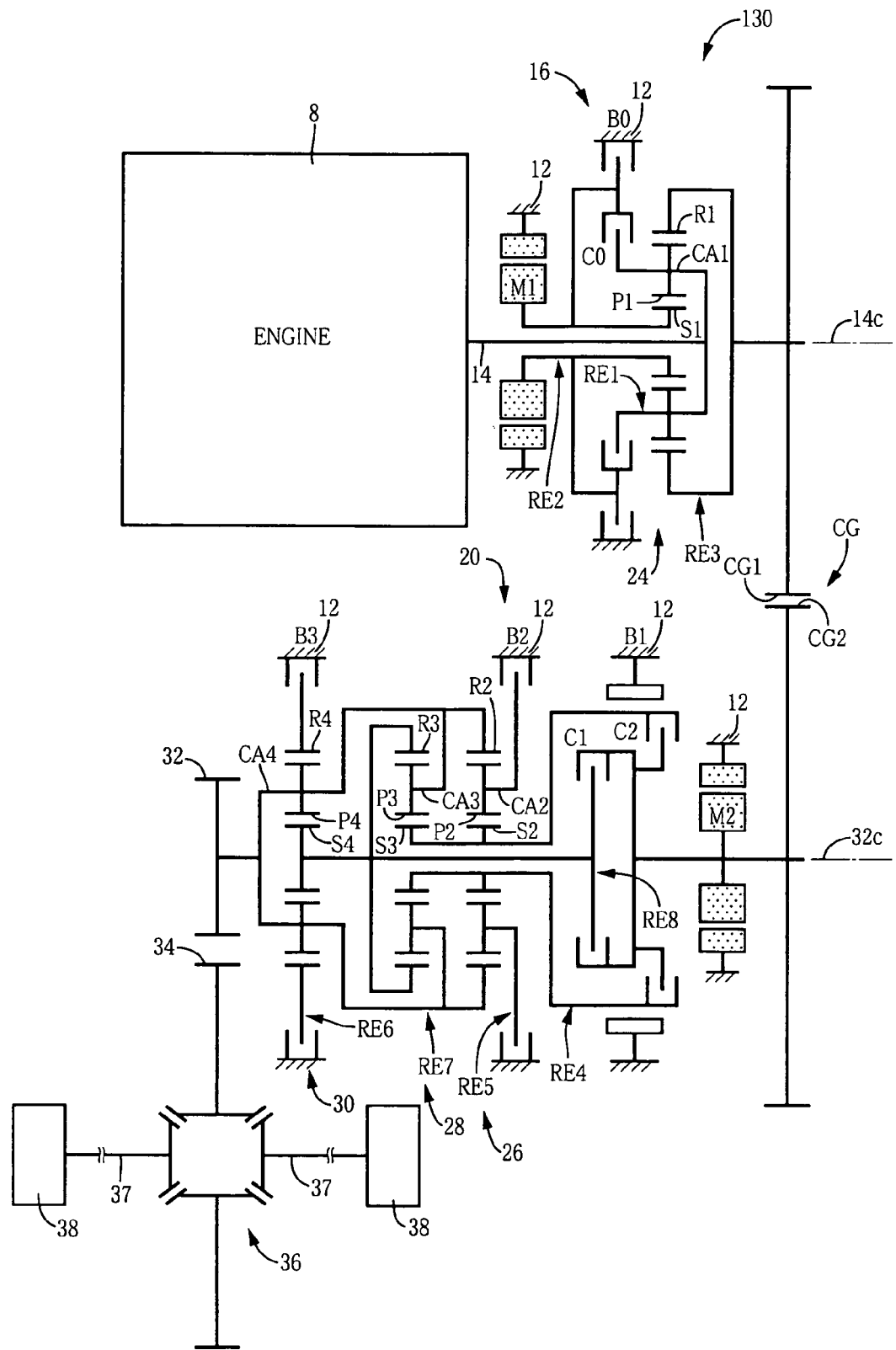
[FIG. 33] This figure is a schematic view corresponding to that of FIG. 30, for explaining an arrangement of a drive system of a hybrid vehicle according to another embodiment of the invention.

FIG. 33 is a schematic view for explaining an arrangement of a drive system 130 according to another embodiment of this invention. This embodiment is different from the embodiment shown in FIGS. 30-32, in the position of the second electric motor M2. Referring to FIG. 33, the positional arrangement of the second electric motor M2 will be described. The second electric motor M2 is located between an assembly of the first and second clutches C1, C2 and the counter gear pair CG, and disposed on the second axis 32c, and adjacent to the counter gear pair CG, such that the second electric motor M2 is fixed to the counter driven gear CG2 serving as the power transmitting member on the side of the second axis 32c. The arrangements of the power distributing mechanism 16 and the automatic transmission 20 are identical with those of the embodiment of FIGS. 30-32. Accordingly, the table of FIG. 31 and the collinear chart of FIG. 32 apply to the present embodiment of FIG. 33.

In the present embodiment, too, the drive system 130 is constituted by the power distributing mechanism 16 functioning as the continuously-variable shifting portion or first shifting portion, and the automatic transmission 20 functioning as the step-variable shifting portion or second shifting portion, so that the drive system 130 has advantages similar to those of the preceding embodiments. Unlike the embodiment shown in FIGS. 1-3, the present embodiment is arranged such that the power distributing mechanism 16 and the automatic transmission 20 are not disposed coaxially with each other, so that the required dimension of the drive system 130 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. The present embodiment has an additional advantage that the required axial dimension of the drive system 130 can be further reduced, since the power distributing mechanism 16 and the automatic transmission 20 are located between the engine 8 (differential drive gear 32) and the counter gear pair CG. Further, the required axial dimension of the second axis 32c can be reduced owing to the arrangement in which the second electric motor M2 is disposed on the first axis 13c.

Embodiment 9

Figure 34:
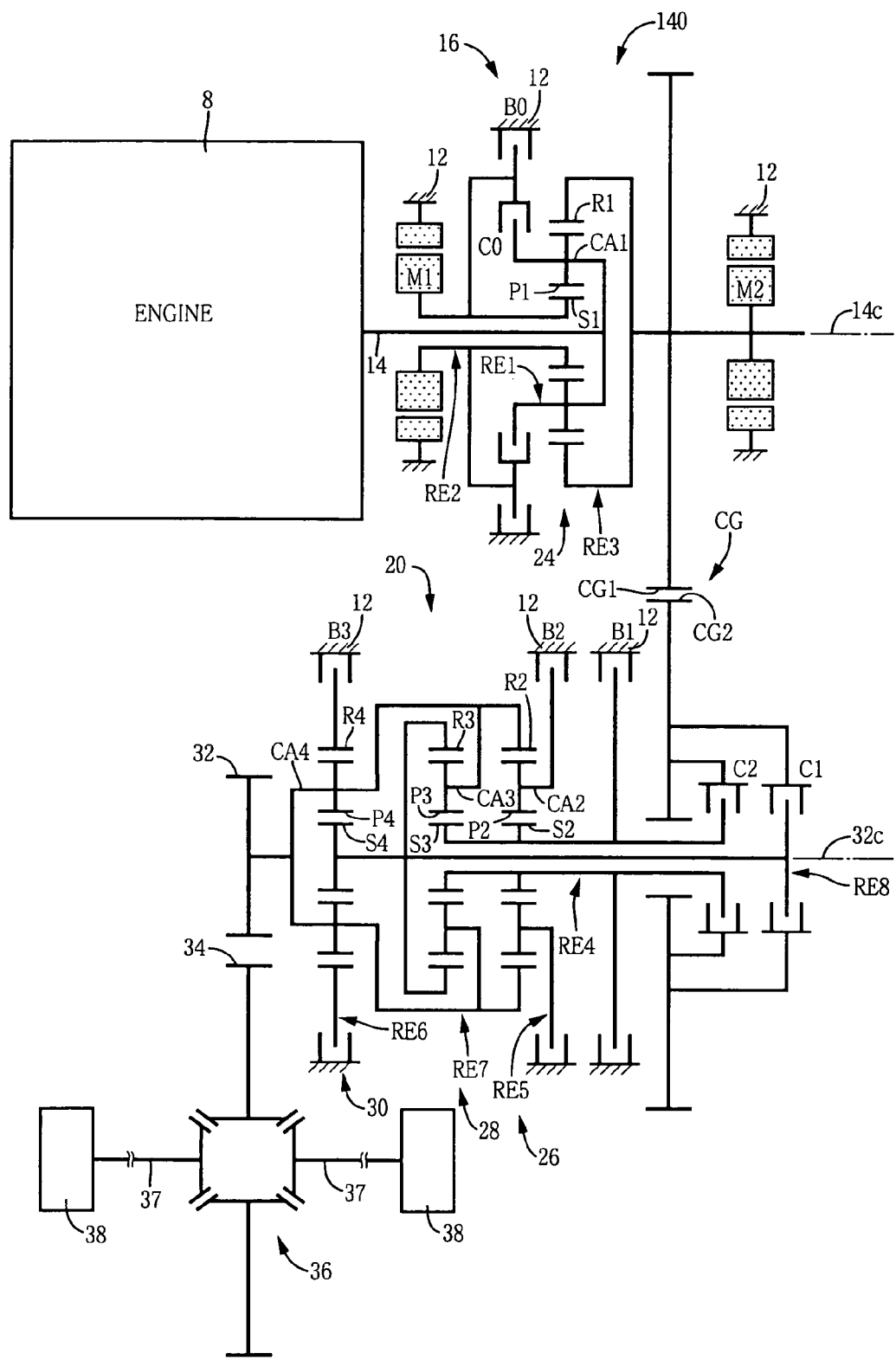
[FIG. 34] This figure is a schematic view corresponding to that of FIG. 30, for explaining an arrangement of a drive system of a hybrid vehicle according to another embodiment of the invention.

FIG. 34 is a schematic view for explaining an arrangement of a drive system 140 according to another embodiment of this invention. This embodiment is different from the embodiment shown in FIGS. 30-32, in the positions of the second electric motor M2 and the first and second clutches C1, C2. Referring to FIG. 34, the positional arrangements of the second electric motor M2 and the clutches C1, C2 will be described. The second electric motor M2 is located on one side of the counter gear pair CG which is remote from the first planetary gear set 24, and disposed on the first axis 14c, and adjacent to the counter gear pair CG, such that the second electric motor M2 is fixed to the counter drive gear CG1 serving as the power transmitting member on the side of the first axis 14c. The first clutch C1 and the second clutch C2 are located on one side of the counter gear pair CG which is remote from the second planetary gear set 26, and disposed on the second axis 32c, and adjacent to the counter gear pair CG. The arrangements of the power distributing mechanism 16 and the automatic transmission 20 are identical with those of the embodiment shown in FIGS. 30-32. Accordingly, the table of FIG. 31 and the collinear chart of FIG. 32 apply to the present embodiment of FIG. 34.

In the present embodiment, too, the drive system 140 is constituted by the power distributing mechanism 16 functioning as the continuously-variable shifting portion or first shifting portion, and the automatic transmission 20 functioning as the step-variable shifting portion or second shifting portion, so that the drive system 140 has advantages similar to those of the preceding embodiments. Unlike the embodiment shown in FIGS. 1-3, the present embodiment is arranged such that the power distributing mechanism 16 and the automatic transmission 20 are not disposed coaxially with each other, so that the required dimension of the drive system 140 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. Further, the required axial dimension of the second axis 32c can be reduced owing to the arrangement in which the second electric motor M2 is disposed on the first axis 13c.

Embodiment 10

Figure 35:
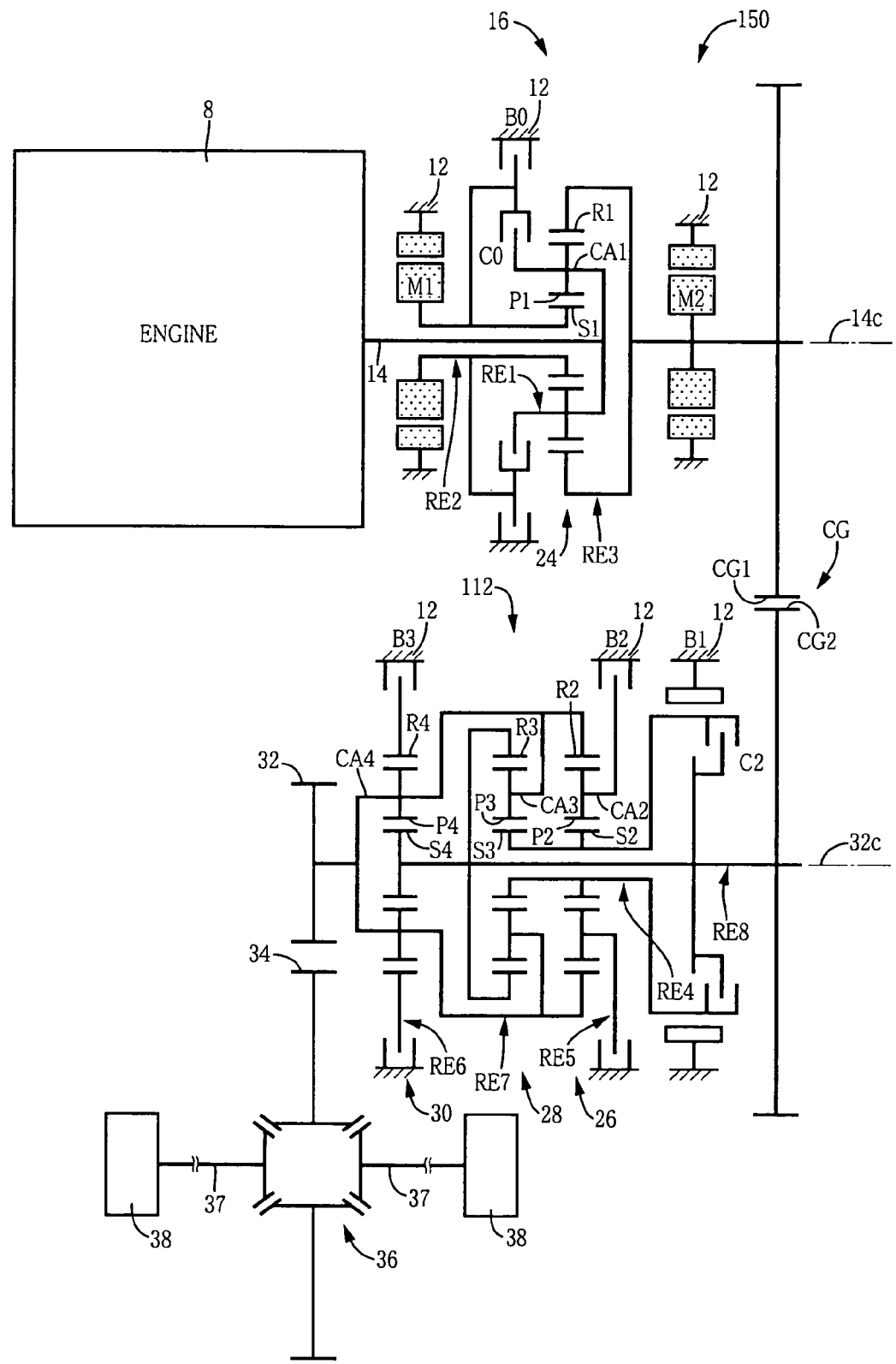
[FIG. 35] This figure is a schematic view corresponding to that of FIG. 27, for explaining an arrangement of a drive system of a hybrid vehicle according to another embodiment of the invention.
Figures 36, 37:
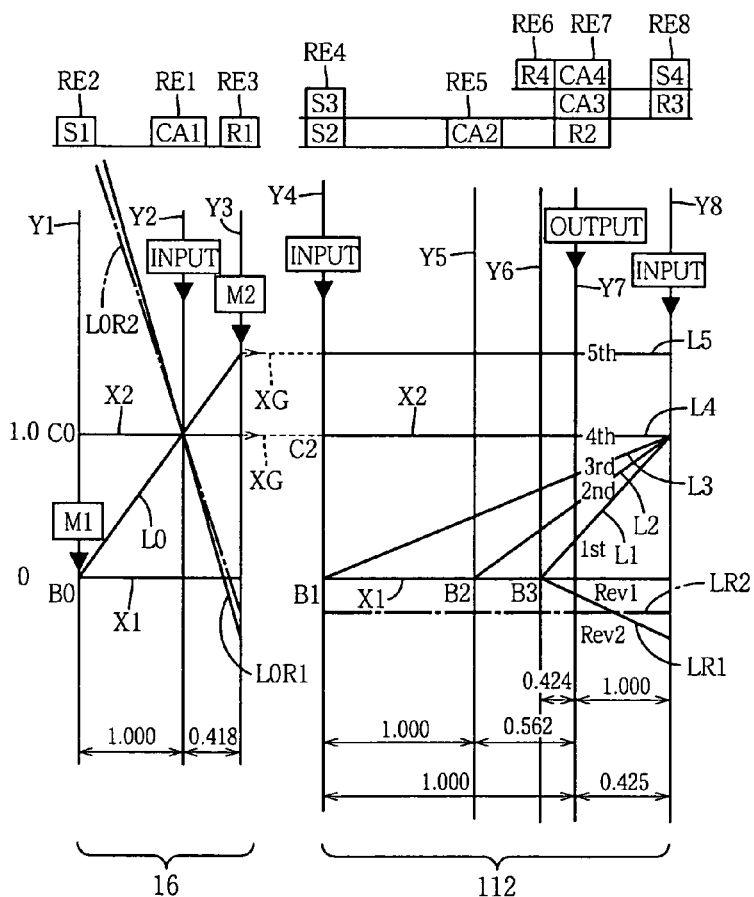
[FIG. 36] This figure is a table corresponding to that of FIG. 28, indicating shifting actions of the drive system of the hybrid vehicle of the embodiment of FIG. 35 operable in a continuously-variable shifting state or a step-variable shifting state, in relation to different combinations of operating states of hydraulically operated frictional coupling devices to effect the respective shifting actions.
[FIG. 37] This figure is a collinear chart corresponding to that of FIG. 29, showing relative rotating speeds of rotary elements of the drive system of the hybrid vehicle of the embodiment of FIG. 35 operated in the step-variable shifting state, in different gear positions of the drive system.

FIG. 35 is a schematic view for explaining an arrangement of a drive system 150 according to another embodiment of this invention, and FIG. 36 is a table indicating gear positions of the drive system 150, and different combinations of engaged states of the hydraulically operated frictional coupling devices for respectively establishing those gear positions, while FIG. 37 is a collinear chart for explaining shifting operations of the drive system 150. The present embodiment is different from the embodiment shown in FIGS. 27-29, primarily in that the power distributing mechanism 16 and the automatic transmission 20 are not disposed coaxially with each other in the present embodiment, and is different from the embodiment shown in FIGS. 30-32, in that the first clutch C1 is not provided in the present embodiment, and in the manner of establishing a reverse-gear position in the present embodiment.

The present embodiment is different from the embodiment shown in FIGS. 27-29, only in that the counter gear pair CG replaces the power transmitting member 18 connecting the power distributing mechanism 16 and the automatic transmission 112, and is identical with the embodiment shown in FIGS. 1-3 in the arrangements of the power distributing mechanism 16 and automatic transmission 20, including the means for establishing the reverse-gear positions. Accordingly, the table of FIG. 36 and the collinear chart of FIG. 37 are the same as the table of FIG. 28 and the collinear chart of FIG. 29, respectively. Further, the arrangement of the drive system 150 shown in FIG. 35 and the arrangement of the counter gear pair CG (corresponding to the power transmitting member 18 of FIG. 27) are identical with those of the embodiment shown FIG. 30, except for the elimination of the first clutch C1.

In the present embodiment, too, the drive system 150 is constituted by the power distributing mechanism 16 functioning as the continuously-variable shifting portion or first shifting portion, and the automatic transmission 112 functioning as the step-variable shifting portion or second shifting portion, so that the drive system 150 has advantages similar to those of the preceding embodiments. Unlike the embodiment shown in FIGS. 27-29, the present embodiment is arranged such that the power distributing mechanism 16 and the automatic transmission 112 are not disposed coaxially with each other, so that the required dimension of the drive system 150 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. The present embodiment has an additional advantage that the required axial dimension of the drive system 150 can be further reduced, since the power distributing mechanism 16 and the automatic transmission 112 are located between the engine 8 (differential drive gear 32) and the counter gear pair CG. Further, the required axial dimension of the second axis 32c can be reduced owing to the arrangement in which the second electric motor M2 is disposed on the first axis 13c.

Embodiment 11

Figure 38:
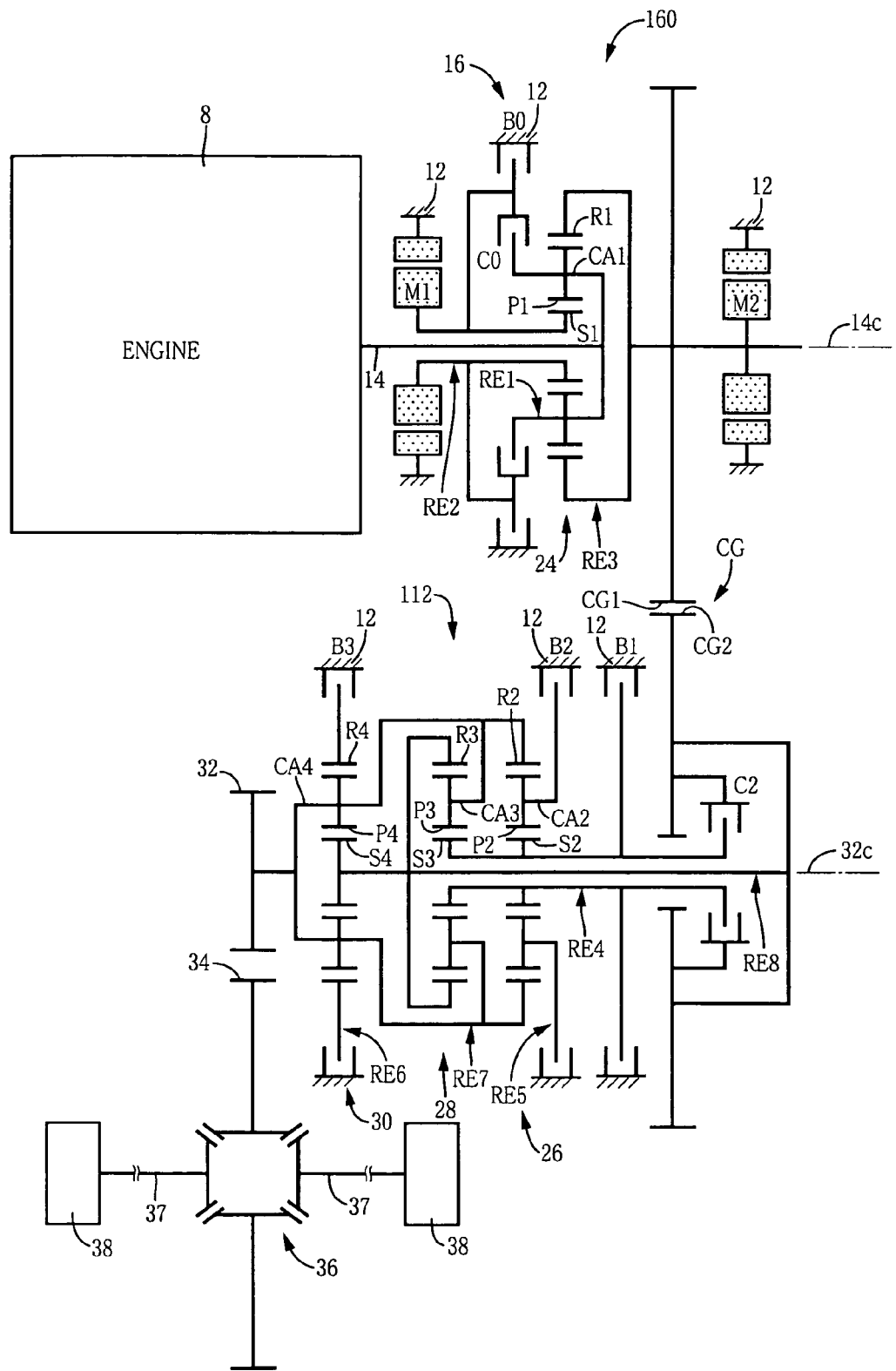
[FIG. 38] This figure is a schematic view corresponding to that of FIG. 35, for explaining an arrangement of a drive system of a hybrid vehicle according to another embodiment of the invention.

FIG. 38 is a schematic view for explaining an arrangement of a drive system 160 according to another embodiment of this invention. This embodiment is different from the embodiment shown in FIGS. 35-37, in the positions of the second electric motor M2 and the second clutch C2. Referring to FIG. 38, the positional arrangements of the second electric motor M2 and the second clutch C2 will be described. The second electric motor M2 is located on one side of the counter gear pair CG which is remote from the first planetary gear set 24, and disposed on the first axis 14c, and adjacent to the counter gear pair CG, such that the second electric motor M2 is fixed to the counter drive gear CG1 serving as the power transmitting member on the side of the first axis 14c. The second clutch C2 is located on one side of the counter gear pair CG which is remote from the second planetary gear set 26, and disposed on the second axis 32c, and adjacent to the counter gear pair CG. The arrangements of the power distributing mechanism 16 and the automatic transmission 112 are identical with those of the embodiment shown in FIGS. 35-37. Accordingly, the table of FIG. 36 and the collinear chart of FIG. 37 apply to the present embodiment of FIG. 38.

In the present embodiment, too, the drive system 160 is constituted by the power distributing mechanism 16 functioning as the continuously-variable shifting portion or first shifting portion, and the automatic transmission 112 functioning as the step-variable shifting portion or second shifting portion, so that the drive system 160 has advantages similar to those of the preceding embodiments. Unlike the embodiment shown in FIGS. 27-29, the present embodiment is arranged such that the power distributing mechanism 16 and the automatic transmission 112 are not disposed coaxially with each other, so that the required dimension of the drive system 160 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. Further, the required axial dimension of the second axis 32c can be reduced owing to the arrangement in which the second electric motor M2 is disposed on the first axis 13c.

Embodiment 12

Figures 39, 40:
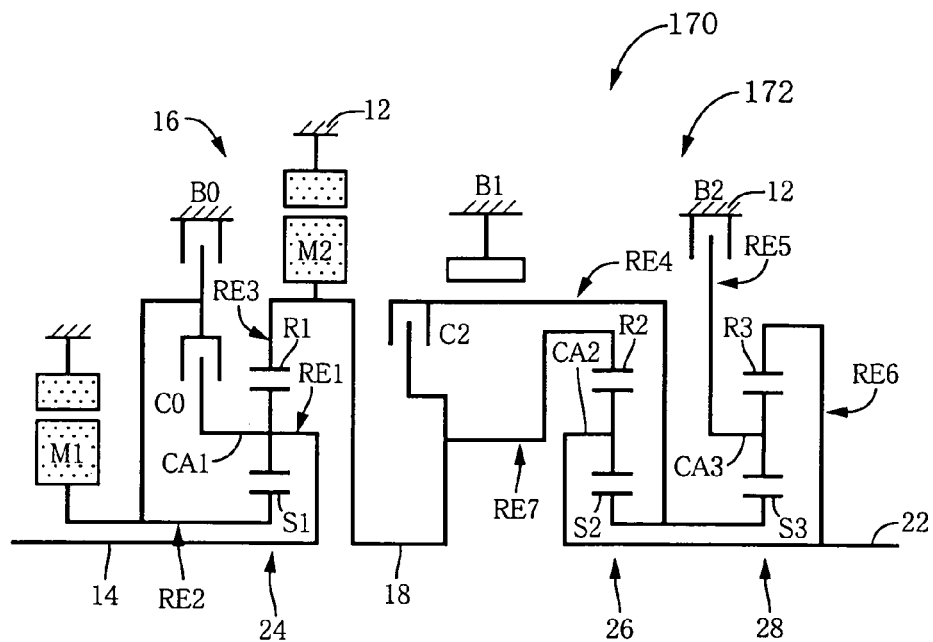
[FIG. 39] This figure is a schematic view corresponding to that of FIG. 14, for explaining an arrangement of a drive system of a hybrid vehicle according to another embodiment of the invention.
[FIG. 40] This figure is a table corresponding to that of FIG. 15, indicating shifting actions of the drive system of the hybrid vehicle of the embodiment of FIG. 39 operable in a continuously-variable shifting state or a step-variable shifting state, in relation to different combinations of operating states of hydraulically operated frictional coupling devices to effect the respective shifting actions.
Figure 41:
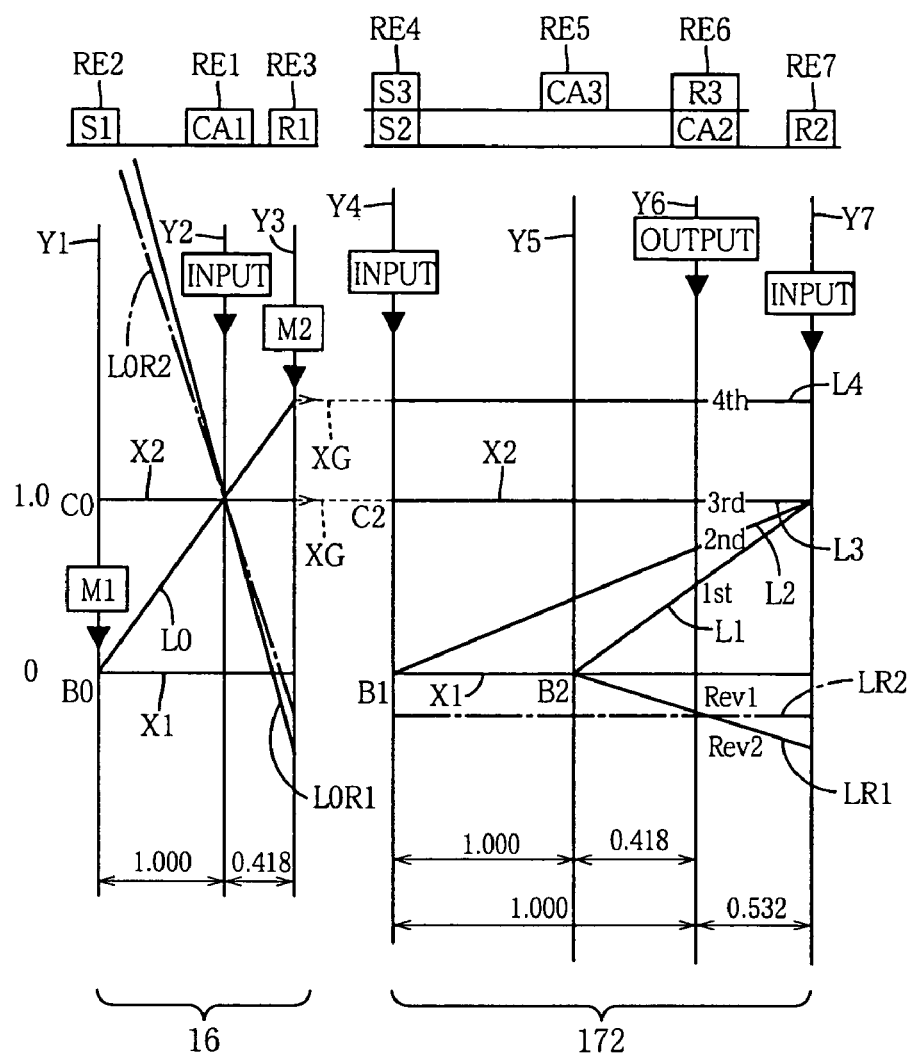
[FIG. 41] This figure is a collinear chart corresponding to that of FIG. 16, showing relative rotating speeds of rotary elements of the drive system of the hybrid vehicle of the embodiment of FIG. 39 operated in the step-variable shifting state, in different gear positions of the drive system.

FIG. 39 is a schematic view for explaining an arrangement of a drive system 170 according to another embodiment of this invention, and FIG. 40 is a table indicating gear positions of the drive system 170, and different combinations of engaged states of the hydraulically operated frictional coupling devices for respectively establishing those gear positions, while FIG. 41 is a collinear chart for explaining shifting operation of the drive system 170. The present embodiment is different from the embodiment shown in FIGS. 14-16 in that the first clutch C1 is not provided the present embodiment, and in the manner of establishing a reverse-gear position in the present embodiment. The following description of the present embodiment primarily relates to a difference between the drive system 170 and the drive system 70.

Like the drive system 70, the drive system 170 includes the power distributing mechanism 16, which has the first planetary gear set 24 of single-pinion type having a gear ratio ρ1 of about 0.418, for example, and the switching clutch C0 and the switching brake B0. The drive system 170 further includes an automatic transmission 172 which has three forward-drive positions and which is interposed between and connected in series to the power distributing mechanism 16 and the output shaft 22 through the power transmitting member 18. The automatic transmission 172 includes a single-pinion type second planetary gear set 26 having a gear ratio ρ2 of about 0.532, for example, and a single-pinion type third planetary gear set 28 having a gear ratio ρ3 of about 0.418, for example.

In the automatic transmission 170, the first clutch C1 provided in the drive system 70 is not provided, so that the second ring gear R2, which is selectively connected to the power transmitting member 18 through the first clutch C1 in the drive system 70, is integrally fixed to the power transmitting member 18. Namely, the automatic transmission 172 is arranged such that the second sun gear S2 of the second planetary gear set 26 and the third sun gear S3 of the third planetary gear set 28 are integrally fixed to each other, selectively connected to the power transmitting member 18 through the second clutch C2, and selectively fixed to the transmission casing 12 through the first brake B1, and such that the second carrier CA2 of the second planetary gear set 24 and the third ring gear R3 of the third planetary gear set 28 are integrally fixed to each other and to the output shaft 22. Further, the second ring gear R2 is fixed to the power transmitting member 18, and the third carrier CA3 is selectively fixed to the transmission casing 12 through the second brake B2.

In the drive system 170 constructed as described above, one of a first-gear position (first-speed position) through a fourth-gear position (fourth-speed position), a reverse-gear position (rear-drive position) and a neural position is selectively established by engaging actions of a corresponding combination of the frictional coupling devices selected from the above-described switching clutch C0, second clutch C2, switching brake B0, first brake B1 and second brake B2, as indicated in the table of FIG. 40. Those gear positions have respective speed ratios γ (input shaft speed $N_{IN}$/output shaft speed $N_{OUT}$) which change as geometric series. Although the present embodiment does not use the first clutch C1 provided in the drive system 70, the present drive system 170 has the first-speed position through the fourth-speed position as in the drive system 70. In the drive system 70, the first clutch C1 is engaged to establish the first-speed position through the fourth-speed position, as is apparent from the table of FIG. 15. In the present drive system 170, however, the second ring gear R2 is integrally fixed to the power transmitting member 18.

As in the drive system 70, the power distributing mechanism 16 is provided with the switching clutch C0 and brake B0, and can be selectively placed by engagement of the switching clutch C0 or switching brake B0, in the fixed-speed-ratio shifting state in which the mechanism 16 is operable as a transmission having a single gear position with one speed ratio or a plurality of gear positions with respective speed ratios, as well as in the continuously-variable shifting state in which the mechanism 16 is operable as a continuously variable transmission, as described above. In the present drive system 170, therefore, a step-variable transmission is constituted by the automatic transmission 112, and the power distributing mechanism 16 which is placed in the fixed-speed-ratio shifting state by engagement of the switching clutch C0 or switching brake B0. Further, a continuously variable transmission is constituted by the automatic transmission 112, and the power distributing mechanism 16 which is placed in the continuously-variable shifting state, with none of the switching clutch C0 and brake B0 being engaged.

Where the drive system 170 functions as the step-variable transmission, for example, the first-gear position having the highest speed ratio γ1 of about 2.804, for example, is established by engaging actions of the switching clutch C0 and second brake B3, and the second-gear position having the speed ratio γ2 of about 1.531, for example, which is lower than the speed ratio γ1, is established by engaging actions of the switching clutch C0 and first brake B1, as indicated in FIG. 39. Further, the third-gear position having the speed ratio γ3 of about 1.000, for example, which is lower than the speed ratio γ2, is established by engaging actions of the switching clutch C0 and second clutch C2, and the fourth-gear position having the speed ratio γ4 of about 0.705, for example, which is lower than the speed ratio γ3, is established by engaging actions of the second clutch C1 and switching brake B0. Further, the neutral position N is established by releasing all of the switching clutch C0, second clutch C2, switching brake B0, first brake B1 and second brake B2.

Where the drive system 170 functions as the continuously-variable transmission, on the other hand, the switching clutch C0 and the switching brake B0 are both released, as indicated in FIG. 40, so that the power distributing mechanism 16 functions as the continuously variable transmission, while the automatic transmission 172 connected in series to the power distributing mechanism 16 functions as the step-variable transmission, whereby the speed of the rotary motion transmitted to the automatic transmission 112 placed in one of the first-gear, second-gear and third-gear positions, namely, the rotating speed of the power transmitting member 18 is continuously changed, so that the speed ratio of the drive system when the automatic transmission 172 is placed in one of those gear positions is continuously variable over a predetermined range. Accordingly, the speed ratio of the automatic transmission 172 is continuously variable across the adjacent gear positions, whereby the overall speed ratio γT of the drive system 170 is continuously variable.

In the embodiment shown FIGS. 14-16, the reverse-gear position is established by engaging the second clutch C2 and second brake B2, and releasing the second clutch C2 to prevent transmission of the rotary motion of the power transmitting member 18 to the output shaft 22 due to the engagement of the second clutch C2, which causes the rotary elements of the automatic transmission 72 to be rotated as a unit as in the third-gear and fourth-gear positions. In the present embodiment, a reverse-gear or rear-drive position is established by reversing the direction of rotation of the power transmitting member 18 as transmitted to the automatic transmission 112, with respect to the direction of rotation in the first-gear through fourth-gear positions, without reversal of the rotating direction of the power transmitting member 18 within the automatic transmission 172. Namely, the present embodiment does not use the first clutch C1 in the automatic transmission 172, to establish the reverse-gear or rear-drive positions.

Described in detail, during an operation of the engine 8, for example, the power distributing mechanism 16 operating as the continuously variable transmission functions to reverse the direction of rotation of the power transmitting member 18 with respect to the operating direction of the engine 8, so that a rotary motion of the power transmitting member 18 in the reverse direction is transmitted to the automatic transmission 172. By engaging the second brake B2, a rear-drive position in the form of a first reverse-gear position having a desired speed ratio λR1 is established. The speed ratio λR1 may usually be set to be about 2.393 as in the drive system 70 shown in FIGS. 14-16, but may be changed by changing the rotating speed of the power transmitting member 18 in the reverse direction, depending upon the vehicle running condition, for instance, whether the roadway is flat, uphill, or deteriorated of its surface condition. The speed ratio λR1 of the reverse-drive position can be made higher than the speed ratio λ1 of the first-gear position, by lowering the absolute value of the negative rotating speed of the power transmitting member 18.

A second reverse-gear position may be provided in place of, or in addition to the first reverse-gear position indicated above. This second reverse-gear position is established by engaging the second clutch C2 while rotary motion of the power transmitting member 18 in the reverse direction is transmitted to the automatic transmission 172. In this second reverse-gear position, the rotary elements of the automatic transmission 172 are rotated as a unit, so that the rotary motion of the power transmitting member 18 in the reverse direction is transmitted to the output shaft 22. The second reverse-gear position has a desired speed ratio λR2.

The collinear chart of FIG. 41 indicates, by straight lines, a relationship among the rotating speeds of the rotary elements in each of the gear positions of the drive system 170, which is constituted by the power distributing mechanism 16 functioning as the continuously-variable shifting portion or first shifting portion, and the automatic transmission 172 functioning as the step-variable shifting portion or second shifting portion. The rotating speeds of the individual rotary elements when the switching clutch C0 and the switching brake B0 are in the released state, and those when the switching clutch C0 or brake B0 is in the engaged state, have been described above. The arrangements of the fourth rotary element RE4 through the seventh rotary elements RE7 of the automatic transmission 172 are the same as those of the automatic transmission 72.

In the automatic transmission 172, the fourth rotary element RE4 is selectively connected to the power transmitting member 18 through the second clutch C2, and selectively fixed to the transmission casing 12 through the first brake B1, and the fifth rotary element RE5 is selectively fixed to the transmission casing 12 through the second brake B2. Further, the sixth rotary element RE6 is fixed to the output shaft 22, and the seventh rotary element RE7 is fixed to the power transmitting member 18.

As shown in the collinear chart of FIG. 41, the automatic transmission 172 is placed in the first-speed position when the second brake B2 is engaged. The rotating speed of the output shaft 22 in the first-speed position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 and the horizontal line X2, and a point of intersection between the vertical line Y5 indicative of the rotating speed of the fifth rotary element RE5 and the horizontal line X1. Similarly, the rotating speed of the output shaft 22 in the second-speed position established by the engaging actions of the first brake B1 is represented by a point of intersection between an inclined straight line L2 determined by those engaging actions and the vertical line Y6 indicative of the rotating speed of the sixth rotary element RE6 fixed to the output shaft 22. The rotating speed of the output shaft 22 in the third-speed position established by the engaging actions of the second clutch C2 is represented by a point of intersection between an inclined straight line L3 determined by those engaging actions and the vertical line Y6 indicative of the rotating speed of the sixth rotary element RE6 fixed to the output shaft 22. In the first-speed through third-speed positions in which the switching clutch C0 is engaged, the rotary motion of the power distributing mechanism 16 at the same speed as the engine speed $N_E$ is transmitted to the seventh rotary element RE7. When the switching brake B0 is engaged in place of the switching clutch C0, the rotary motion of the power distributing mechanism 16 at a speed higher than the engine speed $N_E$ is transmitted to the seventh rotary element. The rotating speed of the output shaft 22 in the fourth-speed position established by the engaging actions of the second clutch C2 and switching brake B0 is represented by a point of intersection between a horizontal straight line L4 determined by those engaging actions and the vertical line Y6 indicative of the rotating speed of the sixth rotary element RE6 fixed to the output shaft 22.

When the switching clutch C0 and the switching brake B0 are both released, the rotary motion of the power distributing mechanism 16 transmitted to the seventh rotary element RE7 is continuously variable with respect to the engine speed $N_E$. When the direction of the rotary motion to be transmitted to the seventh rotary element RE7 is reversed, in this state, by the power distributing mechanism 16 with respect to the operating direction of the engine 8, as indicated by a straight line L0R1, the rotating speed of the output shaft 22 in the first reverse-gear position having a speed ratio Rev1 established by the engaging action of the second brake B2 is represented by a point of intersection between an inclined straight line LR1 determined by that engaging action and the vertical line Y6 indicative of the rotating speed of the sixth rotary element RE6 fixed to the output shaft 22. When the direction of the rotary motion to be transmitted to the seventh rotary element RE7 is reversed with respect to the operating direction of the engine 8, as indicated by a straight line L0R2, while the power distributing mechanism 16 is placed in the continuously-variable shifting state, the rotating speed of the output shaft 22 in the second reverse-gear position having a speed ratio Rev 2 established by the engaging action of the second clutch C2 is represented by a point of intersection of a horizontal straight line LR2 determined by that engaging action and the vertical line Y6 indicative of the rotating direction of the sixth rotary element RE6 fixed to the output shaft 22.

In the present embodiment, too, the drive system 170 is constituted by the power distributing mechanism 16 functioning as the continuously-variable shifting portion or first shifting portion, and the automatic transmission 172 functioning as the step-variable shifting portion or second shifting portion, so that the present drive system 170 has advantages similar to those of the preceding embodiments. The present embodiment has a further advantage that the drive system 170 is small-sized and has a reduced axial dimension, owing to the elimination of the first clutch C1 provided in the embodiment shown in FIGS. 14-16.

The drive system 170 of the present embodiment is further arranged such that the direction of the rotary motion of the power transmitting member 18 transmitted to the automatic transmission 172 in the rear-drive position is reversed with respect to that in the first-gear through fourth-gear positions. Accordingly, the automatic transmission 172 is not required to be provided with coupling devices or gear devices for reversing the direction of rotation of the output shaft 22 with respect to that of the input rotary motion, for establishing the reverse-gear position for the rotary motion of the output shaft 22 in the direction opposite to that in the forward-drive positions. Thus, the rear-drive position can be established in the absence of the first clutch C1 in the automatic transmission, so that the drive system can be small-sized. Further, in the rear-drive position, the speed of the output rotary motion of the automatic transmission 172 is made lower than or equal to that of the input rotary motion received from the power distributing mechanism 16 the speed ratio of which is continuously variable in the engaged state of the second brake B2 or second clutch C2. Accordingly, the rear-drive position has a desired speed ratio λR, which may be higher than that of the first-gear position.

Embodiment 13

Figure 42:
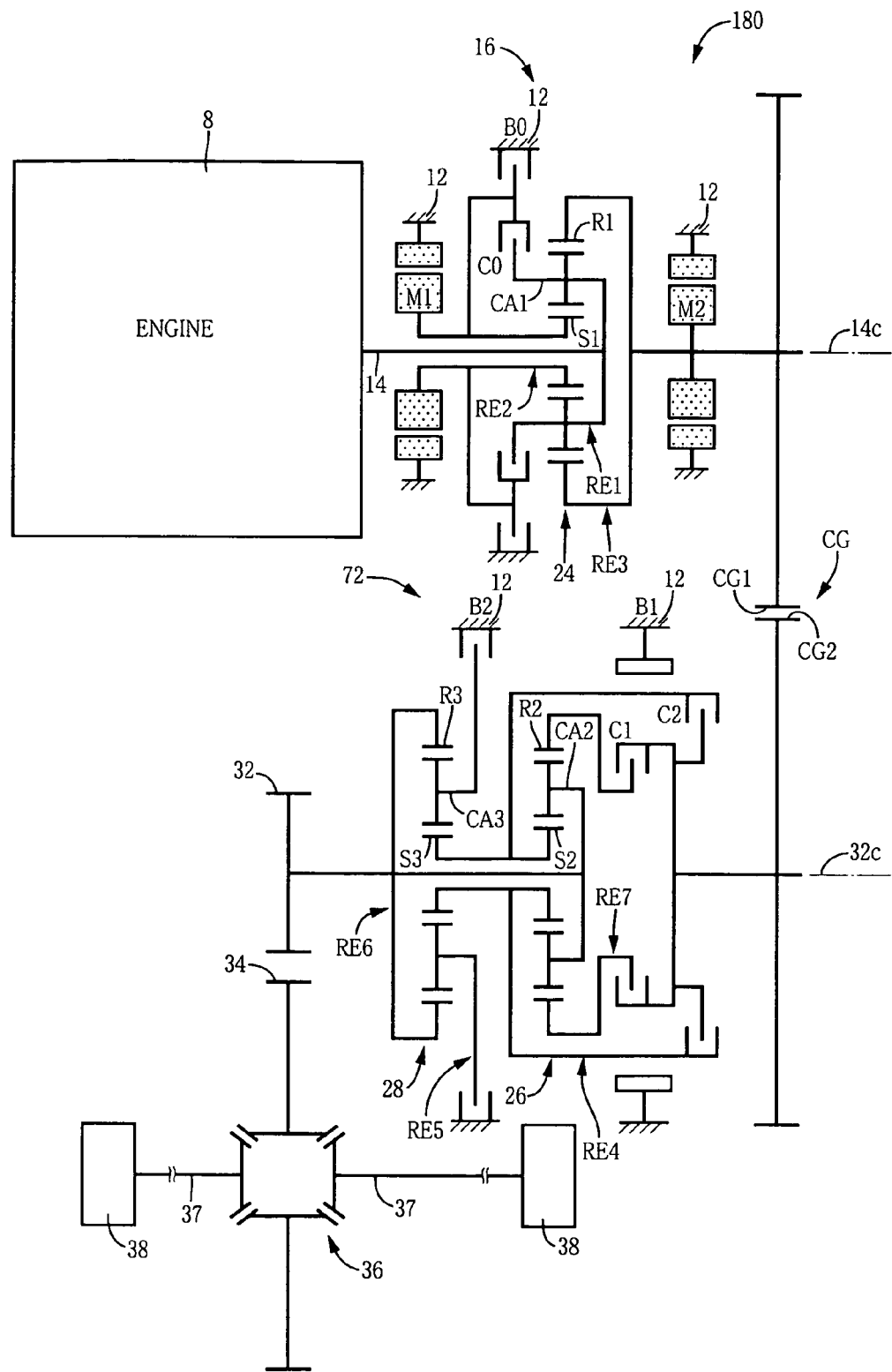
[FIG. 42] This figure is a schematic view corresponding to that of FIG. 14, for explaining an arrangement of a drive system of a hybrid vehicle according to another embodiment of the invention.
Figures 43, 44:
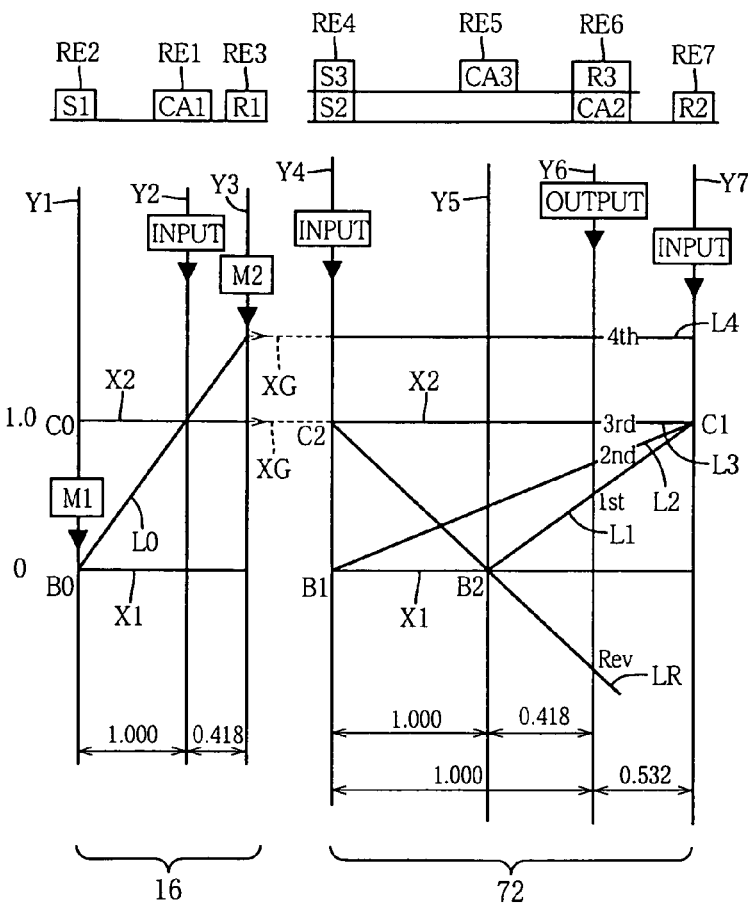
[FIG. 43] This figure is a table corresponding to that of FIG. 15, indicating shifting actions of the drive system of the hybrid vehicle of the embodiment of FIG. 42 operable in a continuously-variable shifting state or a step-variable shifting state, in relation to different combinations of operating states of hydraulically operated frictional coupling devices to effect the respective shifting actions.
[FIG. 44] This figure is a collinear chart corresponding to that of FIG. 16, showing relative rotating speeds of rotary elements of the drive system of the hybrid vehicle of the embodiment of FIG. 42 operated in the step-variable shifting state, in different gear positions of the drive system.

FIG. 42 is a schematic view for explaining an arrangement of a drive system 180 according to another embodiment of this invention, and FIG. 43 is a table indicating gear positions of the drive system 180, and different combinations of engaged states of the hydraulically operated frictional coupling devices for respectively establishing those gear positions, while FIG. 43 is a collinear chart for explaining shifting operations of the drive system 180. The present embodiment is different from the embodiment shown in FIGS. 14-16, primarily in that the power distributing mechanism 16 and the automatic transmission 72 are not disposed coaxially with each other in the present embodiment. The following description of the present embodiment primarily relates to a difference between the drive system 180 and the drive system 70.

The drive system 180 shown in FIG. 42 is provided, within a casing 12 attached to the vehicle body, with: an input shaft 14 disposed rotatably about a first axis 14*c*; the power distributing mechanism 16 mounted on the input shaft 14 directly, or indirectly through a pulsation absorbing damper (vibration damping device); the automatic transmission 72 disposed rotatably about a second axis 32*c* parallel to the first axis 14*c*; an output rotary member in the form of a differential drive gear 32 connected to the automatic transmission 72; and a power transmitting member in the form of a counter gear pair CG which connects the power distributing mechanism 16 and the automatic transmission 72, so as to transmit a drive force therebetween. This drive system 180 is suitably used on a transverse FF (front-engine, front-drive) vehicle or a transverse RR (rear-engine, rear-drive) vehicle, and is disposed between a drive power source in the form of an engine 8 and a pair of drive wheels 38. The drive force is transmitted from the differential drive gear 32 to the pair of drive wheels 38, through a differential gear 34 meshing with the differential drive gear 32, a differential gear device 36, a pair of drive axles 37, etc.

The counter gear pair CG indicated above consists of a counter drive gear CG1 disposed rotatably on the first axis 14*c* and coaxially with the power distributing mechanism 16 and fixed to a first ring gear R1, and a counter driven gear CG2 disposed rotatably on the second axis 32*c* and coaxially with the automatic transmission 20 and connected to the automatic transmission 20 through a first clutch C1 and a second clutch C2. The counter drive gear CG1 and the counter driven gear CG2 serve as a pair of members in the form of a pair of gears which are held in meshing engagement with each other. Since the speed reduction ratio of the counter gear pair CG (rotating speed of the counter drive gear CG1/rotating speed of the counter driven gear CG2) is about 1.000, the counter gear pair CG functionally corresponds to the power transmitting member 18 in the embodiment shown in FIGS. 14-16, which connects the power distributing mechanism 16 and the automatic transmission 72. That is, the counter drive gear CG1 corresponds to a power transmitting member which constitutes a part of the power transmitting member 18 on the side of the first axis 14*c*, while the counter driven gear CG2 corresponds to a power transmitting member which constitutes another part of the power transmitting member 18 on the side of the second axis 32*c*.

Referring to FIG. 42, the individual elements of the drive system 180 will be described. The counter gear pair CG is disposed adjacent to one end of the power distributing mechanism 16 which remote from the engine 8. In other words, the power distributing mechanism 16 is interposed between the engine 8 and the counter gear pair CG, and located adjacent to the counter gear pair CG. A second electric motor M2 is disposed on the first axis 14*c*, between a first planetary gear set 24 and the counter gear pair CG, such that the second electric motor M2 is fixed to the counter drive gear CG1. The differential drive gear 32 is disposed adjacent to one end of the automatic transmission 72 which is remote from the counter gear pair CG, that is, on the side of the engine 8. In other words, the automatic transmission 72 is interposed between the counter gear pair CG and the differential drive gear 32 (engine 8), and located adjacent to the counter gear pair CG. Between the counter gear pair CG and the differential drive gear 32, a second planetary gear set 26 and a third planetary gear set 28 are disposed in the order of description, in the direction from the counter gear pair CG toward the differential drive gear 32. The first clutch C1 and the second clutch C2 are disposed between the counter gear pair CG and the second planetary gear set 26.

The present embodiment is different from the embodiment shown in FIGS. 14-16, only in that the counter gear pair CG replaces the power transmitting member 18 connecting the power distributing mechanism 16 and the automatic transmission 72, and is identical with the embodiment shown in FIGS. 14-16 in the arrangements of the power distributing mechanism 16 and automatic transmission 72. Accordingly, the table of FIG. 43 and the collinear chart of FIG. 44 are the same as the table of FIG. 15 and the collinear chart of FIG. 16, respectively.

In the present embodiment, too, the drive system 180 is constituted by the power distributing mechanism 16 functioning as the continuously-variable shifting portion or first shifting portion, and the automatic transmission 72 functioning as the step-variable shifting portion or second shifting portion, so that the drive system 180 has advantages similar to those of the preceding embodiments. Unlike the embodiment shown in FIGS. 14-16, the present embodiment is arranged such that the power distributing mechanism 16 and the automatic transmission 72 are not disposed coaxially with each other, so that the required dimension of the drive system 180 in the axial direction can be reduced. Accordingly, the present drive system can be suitably used on a transversal FF or RR vehicle such that the first and second axes 14*c*, 32*c* are parallel to the transverse or width direction of the vehicle. In this respect, it is noted that the maximum axial dimension of a drive system for such a transverse FF or RR vehicle is generally limited by the width dimension of the vehicle. The present embodiment has an additional advantage that the required axial dimension of the drive system 180 can be further reduced, since the power distributing mechanism 16 and the automatic transmission 72 are located between the engine 8 (differential drive gear 32) and the counter gear pair CG. Further, the required axial dimension of the second axis 32*c* can be reduced owing to the arrangement in which the second electric motor M2 is disposed on the first axis 13*c*.

Embodiment 14

Figure 45:
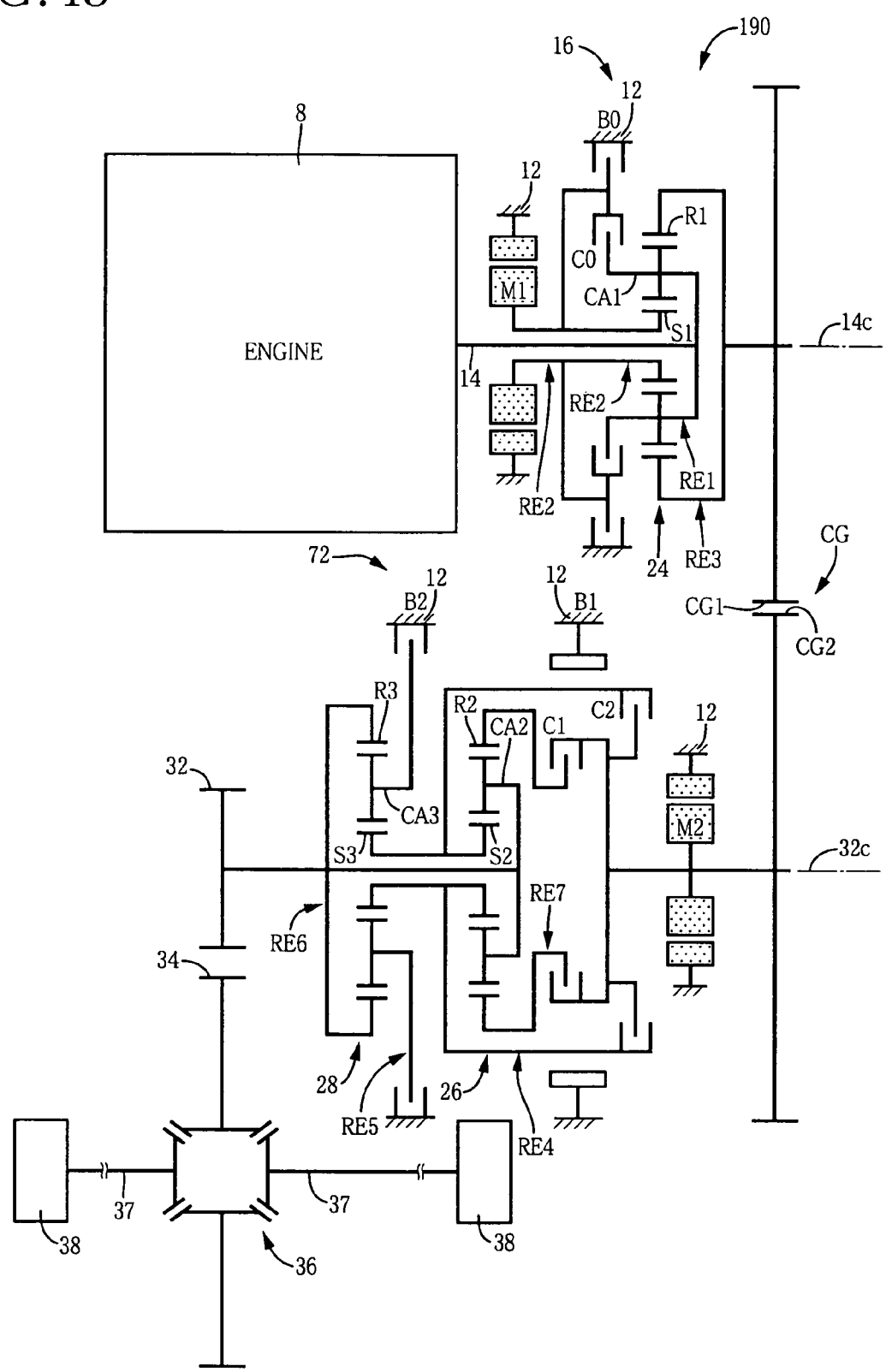
[FIG. 45] This figure is a schematic view corresponding to that of FIG. 42, for explaining an arrangement of a drive system of a hybrid vehicle according to another embodiment of the invention.

FIG. 45 is a schematic view for explaining an arrangement of a drive system 190 according to another embodiment of this invention. This embodiment is different from the embodiment shown in FIGS. 42-44, in the position of the second electric motor M2. Referring to FIG. 45, the positional arrangement of the second electric motor M2 will be described. The second electric motor M2 is located between an assembly of the first and second clutches C1, C2 and the counter gear pair CG, and disposed on the second axis 32*c*, and adjacent to the counter gear pair CG, such that the second electric motor M2 is fixed to the counter driven gear CG2 serving as the power transmitting member on the side of the second axis 32*c*. The arrangements of the power distributing mechanism 16 and the automatic transmission 72 are identical with those of the embodiment of FIGS. 42-44. Accordingly, the table of FIG. 43 and the collinear chart of FIG. 44 apply to the present embodiment shown in FIG. 45.

In the present embodiment, too, the drive system 190 is constituted by the power distributing mechanism 16 functioning as the continuously-variable shifting portion or first shifting portion, and the automatic transmission 72 functioning as the step-variable shifting portion or second shifting portion, so that the drive system 190 has advantages similar to those of the preceding embodiments. Unlike the embodiment shown in FIGS. 14-16, the present embodiment is arranged such that the power distributing mechanism 16 and the automatic transmission 72 are not disposed coaxially with each other, so that the required dimension of the drive system 190 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. The present embodiment has an additional advantage that the required axial dimension of the drive system 190 can be further reduced, since the power distributing mechanism 16 and the automatic transmission 72 are located between the engine 8 (differential drive gear 32) and the counter gear pair CG. Further, the required axial dimension of the second axis 32c can be reduced owing to the arrangement in which the second electric motor M2 is disposed on the first axis 13c.

Embodiment 15

Figure 46:
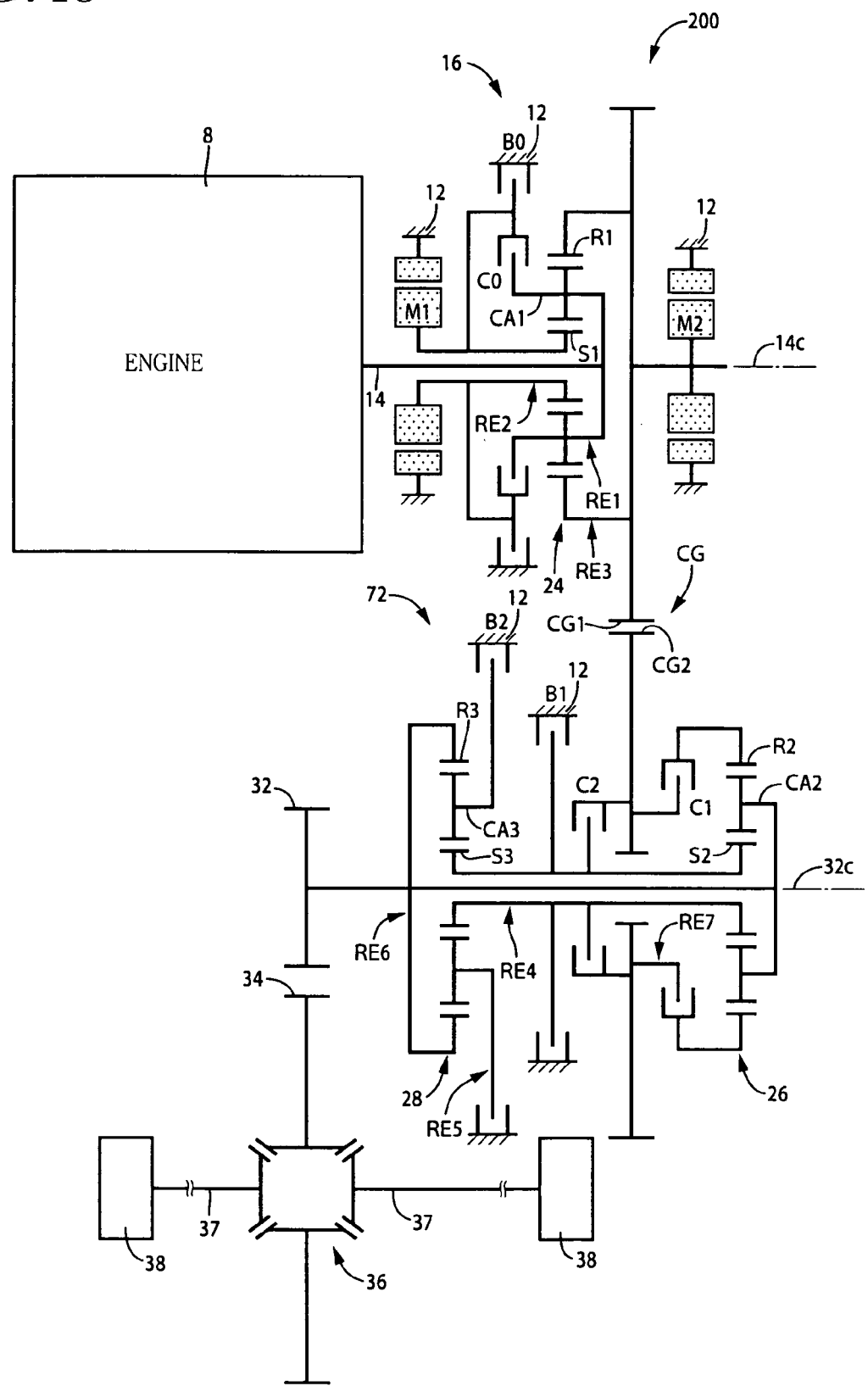
[FIG. 46] This figure is a schematic view corresponding to that of FIG. 42, for explaining an arrangement of a drive system of a hybrid vehicle according to another embodiment of the invention.

FIG. 46 is a schematic view for explaining an arrangement of a drive system 200 according to another embodiment of this invention. This embodiment is different from the embodiment shown in FIGS. 42-44, in the positions of the second electric motor M2, first clutch C1 and second planetary gear set 26. Referring to FIG. 46, the positional arrangements of the second electric motor M2, clutch C1 and second planetary gear set 26 will be described. The second electric motor M2 is located on one side of the counter gear pair CG which is remote from the first planetary gear set 24, and disposed on the first axis 14c, and adjacent to the counter gear pair CG, such that the second electric motor M2 is fixed to the counter drive gear CG1 serving as the power transmitting member on the side of the first axis 14c. The first clutch C1 and the second planetary gear set 26 are located on one side of the counter gear pair CG which is remote from the second clutch C2 and the third planetary gear set 28, and disposed on the second axis 32c, such that the first clutch C1 is located closer to the counter gear pair CG than the second planetary gear set 26. The arrangements of the power distributing mechanism 16 and the automatic transmission 72 are identical with those of the embodiment shown in FIGS. 42-44. Accordingly, the table of FIG. 43 and the collinear chart of FIG. 44 apply to the present embodiment of FIG. 46.

In the present embodiment, too, the drive system 200 is constituted by the power distributing mechanism 16 functioning as the continuously-variable shifting portion or first shifting portion, and the automatic transmission 72 functioning as the step-variable shifting portion or second shifting portion, so that the drive system 200 has advantages similar to those of the preceding embodiments. Unlike the embodiment shown in FIGS. 14-16, the present embodiment is arranged such that the power distributing mechanism 16 and the automatic transmission 72 are not disposed coaxially with each other, so that the required dimension of the drive system 200 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. Further, the required axial dimension of the second axis 32c can be reduced owing to the arrangement in which the second electric motor M2 is disposed on the first axis 13c.

Embodiment o16

Figure 47:
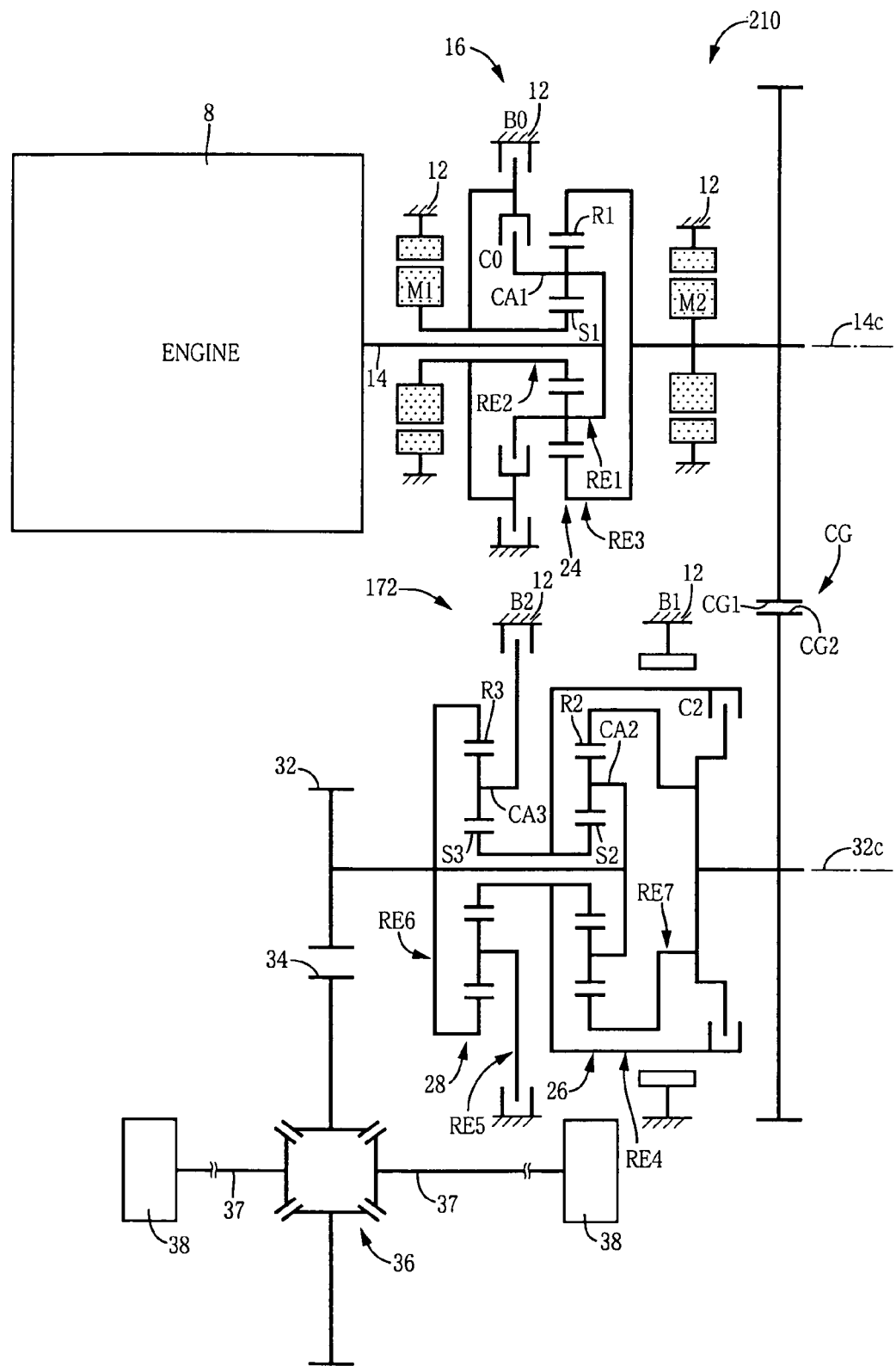
[FIG. 47] This figure is a schematic view corresponding to that of FIG. 39, for explaining an arrangement of a drive system of a hybrid vehicle according to another embodiment of the invention.
Figures 48, 49:
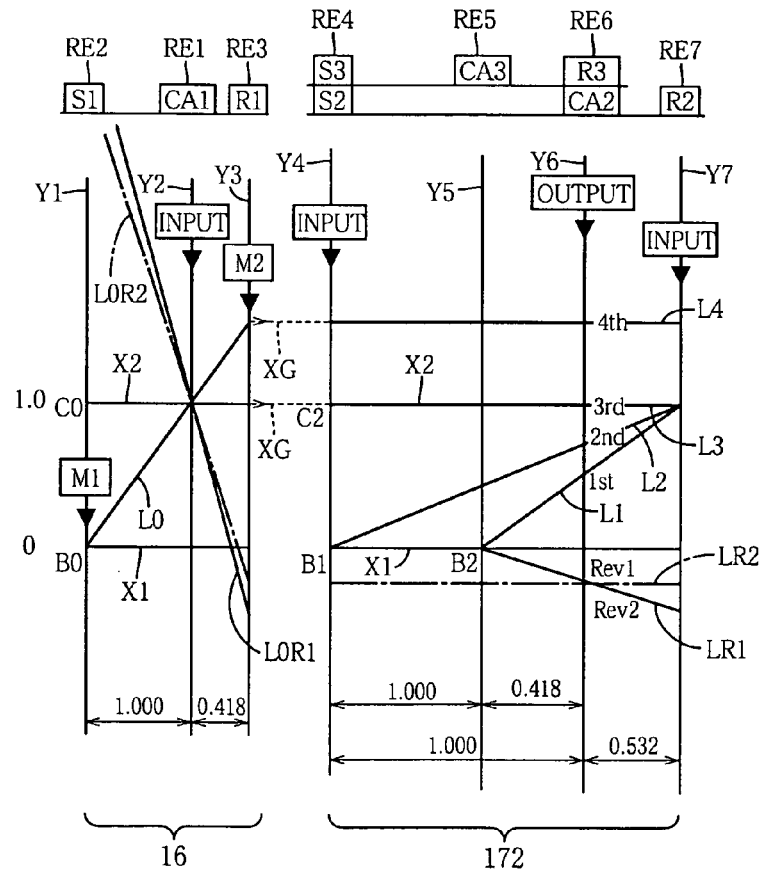
[FIG. 48] This figure is a table corresponding to that of FIG. 40, indicating shifting actions of the drive system of the hybrid vehicle of the embodiment of FIG. 47 operable in a continuously-variable shifting state or a step-variable shifting state, in relation to different combinations of operating states of hydraulically operated frictional coupling devices to effect the respective shifting actions.
[FIG. 49] This figure is a collinear chart corresponding to that of FIG. 41, showing relative rotating speeds of rotary elements of the drive system of the hybrid vehicle of the embodiment of FIG. 47 operated in the step-variable shifting state, in different gear positions of the drive system.

FIG. 47 is a schematic view for explaining an arrangement of a drive system 210 according to another embodiment of this invention, and FIG. 48 is a table indicating gear positions of the drive system 210, and different combinations of engaged states of the hydraulically operated frictional coupling devices for respectively establishing those gear positions, while FIG. 49 is a collinear chart for explaining shifting operations of the drive system 210. The present embodiment is different from the embodiment shown in FIGS. 39-41, primarily in that the power distributing mechanism 16 and the automatic transmission 172 are not disposed coaxially with each other in the present embodiment, and is different from the embodiment shown in FIGS. 42-44, in that the first clutch C1 is not provided in the present embodiment, and in the manner of establishing a reverse-gear position in the present embodiment.

The present embodiment is different from the embodiment shown in FIGS. 39-42, only in that the counter gear pair CG replaces the power transmitting member 18 connecting the power distributing mechanism 16 and the automatic transmission 172, and is identical with the embodiment shown in FIGS. 39-42 in the arrangements of the power distributing mechanism 16 and automatic transmission 172, including the means for establishing the reverse-gear positions. Accordingly, the table of FIG. 48 and the collinear chart of FIG. 49 are the same as the table of FIG. 40 and the collinear chart of FIG. 41, respectively. Further, the arrangement of the drive system 210 shown in FIG. 47 and the arrangement of the counter gear pair CG (corresponding to the power transmitting member 18 of FIG. 39) are identical with those of the embodiment shown FIG. 42, except for the elimination of the first clutch C1.

In the present embodiment, too, the drive system 210 is constituted by the power distributing mechanism 16 functioning as the continuously-variable shifting portion or first shifting portion, and the automatic transmission 172 functioning as the step-variable shifting portion or second shifting portion, so that the drive system 210 has advantages similar to those of the preceding embodiments. Unlike the embodiment shown in FIGS. 39-41, the present embodiment is arranged such that the power distributing mechanism 16 and the automatic transmission 172 are not disposed coaxially with each other, so that the required dimension of the drive system 210 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. The present embodiment has an additional advantage that the required axial dimension of the drive system 210 can be further reduced, since the power distributing mechanism 16 and the automatic transmission 172 are located between the engine 8 (differential drive gear 32) and the counter gear pair CG. Further, the required axial dimension of the second axis 32c can be reduced owing to the arrangement in which the second electric motor M2 is disposed on the first axis 13c.

Embodiment 17

Figure 50:
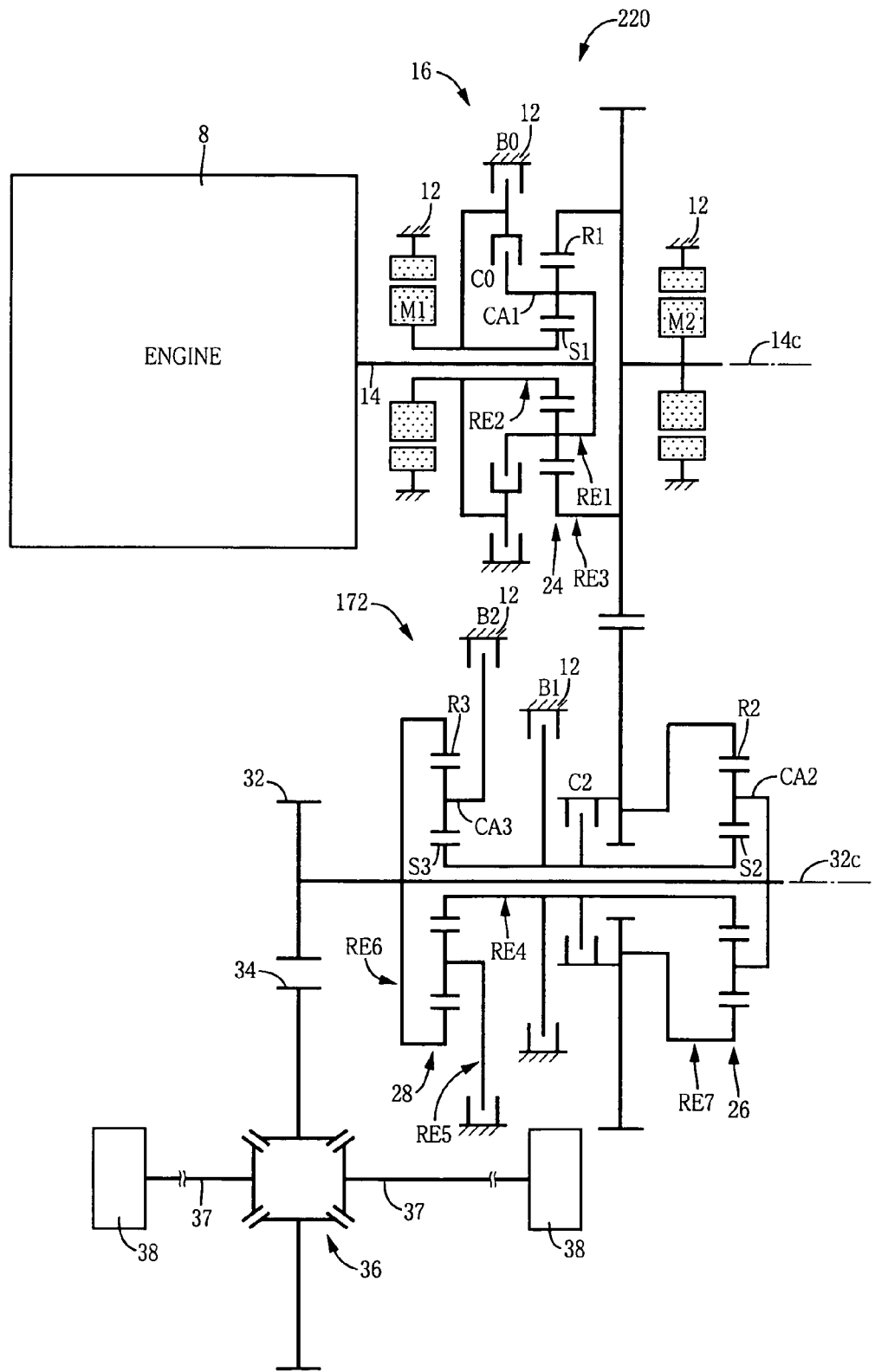
[FIG. 50] This figure is a schematic view corresponding to that of FIG. 47, for explaining an arrangement of a drive system of a hybrid vehicle according to another embodiment of the invention.

FIG. 50 is a schematic view for explaining an arrangement of a drive system 220 according to another embodiment of this invention. This embodiment is different from the embodiment shown in FIGS. 47-49, in the positions of the second electric motor M2 and second planetary gear set 26. Referring to FIG. 50, the positional arrangements of the second electric motor M2 and second planetary gear set 26 will be described. The second electric motor M2 is located on one side of the counter gear pair CG which is remote from the first planetary gear set 24, and disposed on the first axis 14c, and adjacent to the counter gear pair CG, such that the second electric motor M2 is fixed to the counter drive gear CG1 serving as the power transmitting member on the side of the first axis 14c. The second planetary gear set 26 is located on one side of the counter gear pair CG which is remote from the second clutch C2 and the third planetary gear set 28, and disposed adjacent to the counter gear pair CG. The arrangements of the power distributing mechanism 16 and the automatic transmission 172 are identical with those of the embodiment shown in FIGS. 47-49. Accordingly, the table of FIG. 48 and the collinear chart of FIG. 49 apply to the present embodiment of FIG. 50.

In the present embodiment, too, the drive system 220 is constituted by the power distributing mechanism 16 functioning as the continuously-variable shifting portion or first shifting portion, and the automatic transmission 172 functioning as the step-variable shifting portion or second shifting portion, so that the drive system 220 has advantages similar to those of the preceding embodiments. Unlike the embodiment shown in FIGS. 39041, the present embodiment is arranged such that the power distributing mechanism 16 and the automatic transmission 172 are not disposed coaxially with each other, so that the required dimension of the drive system 220 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. Further, the required axial dimension of the second axis 32c can be reduced owing to the arrangement in which the second electric motor M2 is disposed on the first axis 13c.

Figure 51:
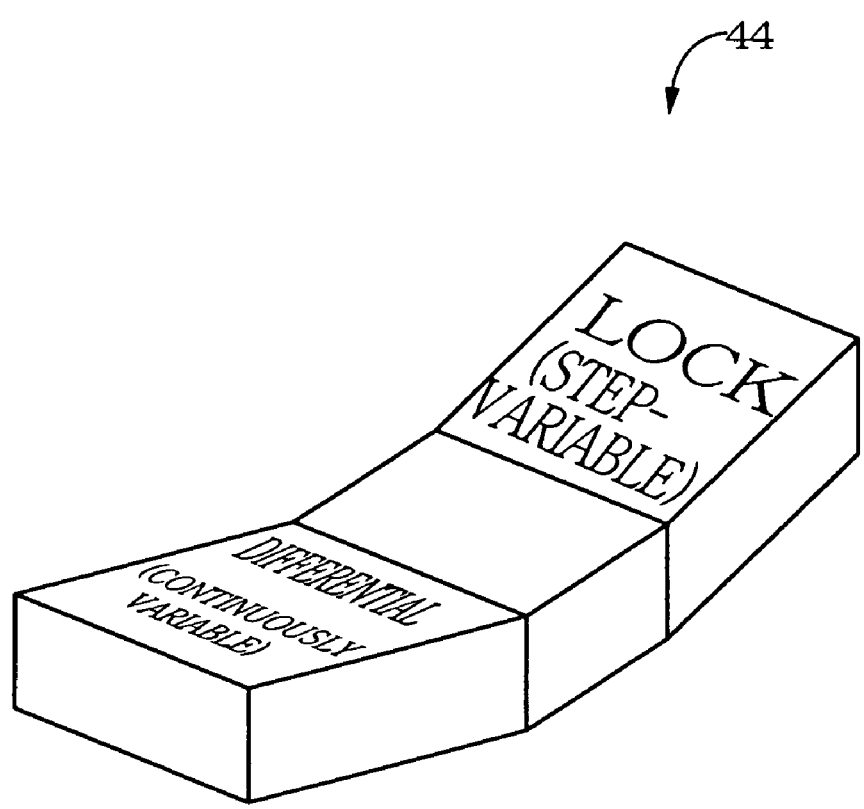
[FIG. 51] This figure is a view showing an example of a shifting-state selecting device manually operable by the user to select the shifting state, in the form of a seesaw switch functioning as a selector switch.

Embodiment of FIG. 51

FIG. 51 shows a seesaw type switch 44 functioning as a manually shifting-state selecting device manually operable to select the shifting state of the drive device 10. In the preceding embodiments, the shifting state of the drive system 10 is automatically switched on the basis of a change of the vehicle condition and according to the relationship shown in FIG. 8 or FIG. 12 by way of example. However, the shifting state of the drive system 10 may be manually switched by a manual operation of the seesaw switch 44. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user of the vehicle manually operates the switch 44 to place the drive system 10 in the continuously-variable shifting state when the user likes the drive system 10 to operate as a continuously variable transmission or wants to improve the fuel economy of the engine, or alternatively in the step-variable shifting state when the user likes a change of the engine speed as a result of a shifting action of the drive system 10 operating as a step-variable transmission. The switch 44 may have a neutral position in addition to the continuously-variable shifting position and the step-variable shifting position. In this case, the switch 44 may be placed in its neutral position when the user has not selected the desired shifting state or likes the drive system to be automatically placed in one of the continuously-variable and step-variable shifting states.

Figure 52:
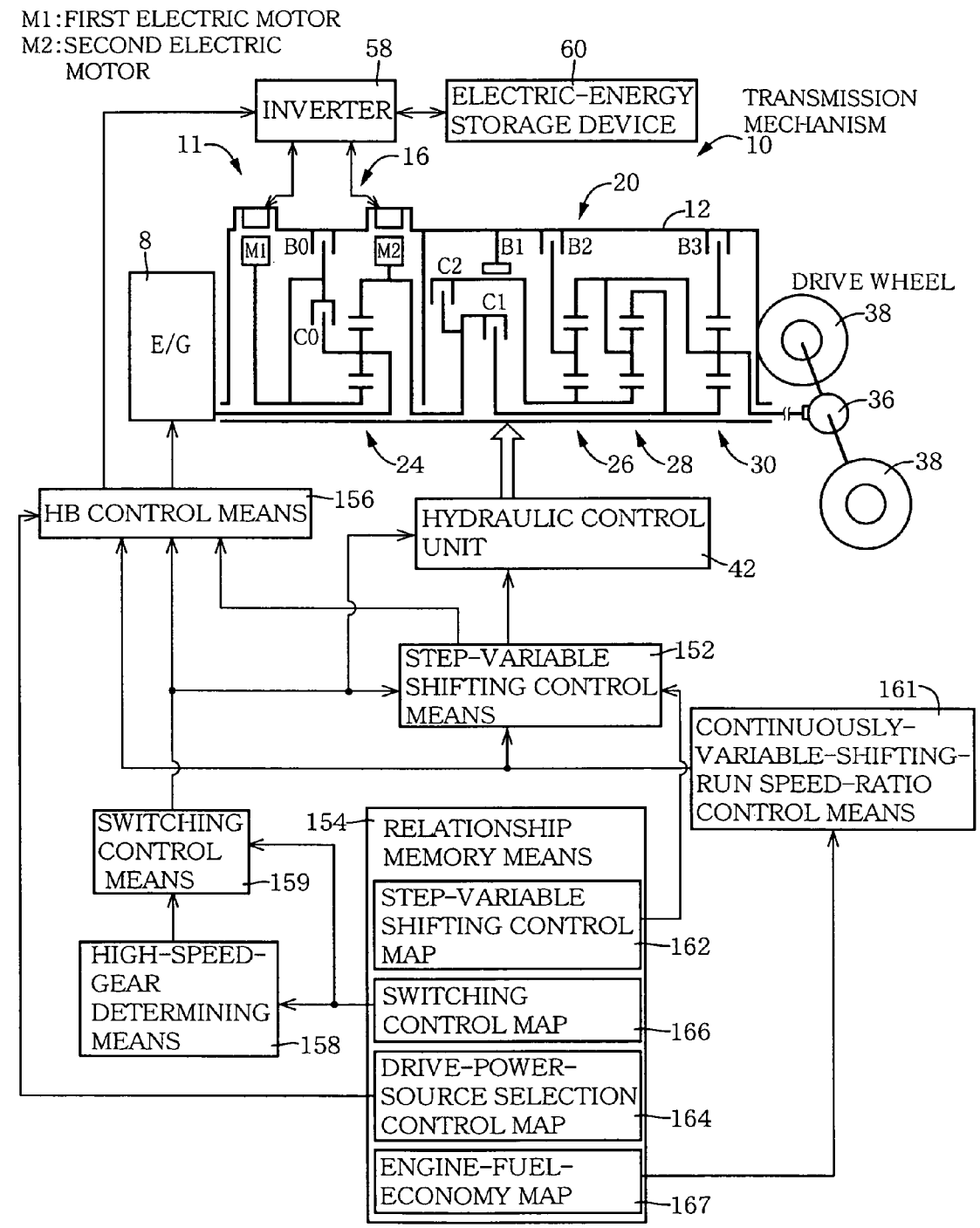
[FIG. 52] This figure is a functional block diagram for explaining major control functions performed by an electronic control device in another embodiment of the invention, which is a modification of the embodiment of FIG. 6.
Figure 53:
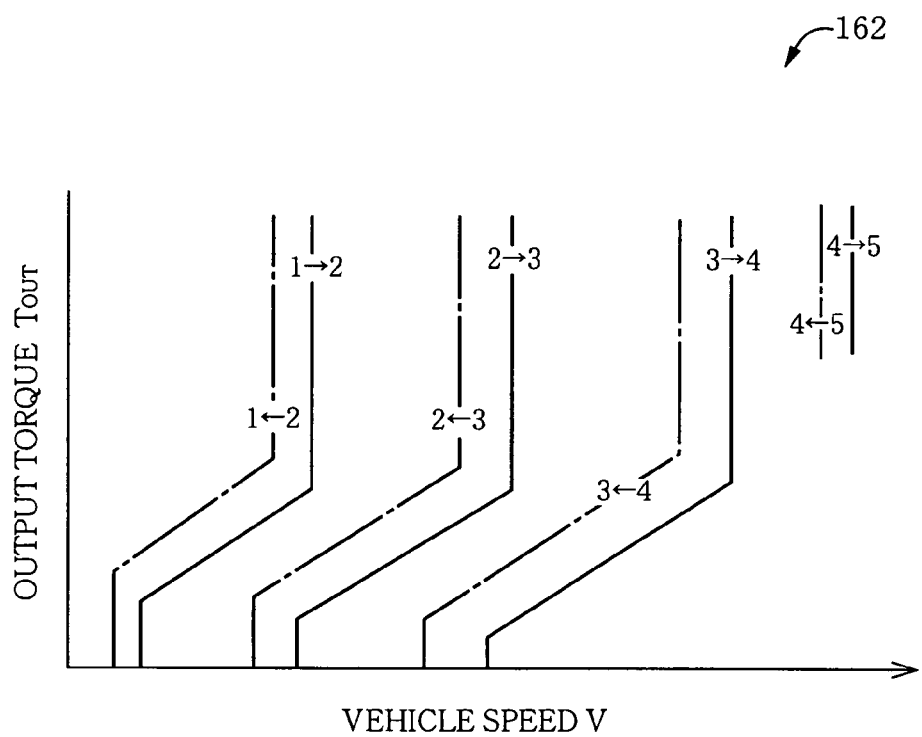
[FIG. 53] This figure is a view illustrating a stored step-variable-shifting control map used for determining a shifting action of an automatic shifting portion, in a two-dimensional coordinate system defined by an axis of a vehicle speed and an axis of an output torque, the shifting map including shift-up boundary lines and shift-down boundary lines.

FIG. 52 is a functional block diagram for explaining major control functions performed by the electronic control device 40 provided in another embodiment of this invention. In FIG. 52, step-variable control means 152 is arranged to control a shifting action of the transmission mechanism 10 on the basis of predetermined control variables and according to a stored relationship. FIG. 53 illustrates one example of the stored relationship in the form of a step-variable-shifting control map (shifting boundary line map) 162. Like the step-variable shifting control means 54 described above, the step-variable shifting control means 152 is arranged to determine whether a shifting action of the automatic transmission portion 20 should be effected, according to the step-variable-shifting control map 162 stored in relationship memory means 154 and indicated by solid and one-dot chain lines in FIG. 53, and on the basis of the vehicle condition represented by a vehicle speed V, and a vehicle load, that is, an output torque $T_{OUT}$ of the automatic transmission portion 20. In other words, the step-variable shifting control means 152 determines the gear position to which the automatic transmission portion 20 should be shifted, and commands a shifting action of the automatic transmission portion 20 to the determined gear position. Thus, the present embodiment is arranged to control the shifting operation of the automatic transmission portion as a function of the vehicle speed V and the vehicle load in the form of the output torque $T_{OUT}$. The map shown in FIG. 53 uses the same control variables as used for defining the continuously-variable shifting region and the step-variable shifting region.

Like the hybrid control means 52, hybrid control means 156 is arranged to control the engine 8 to be operated with high efficiency while the transmission mechanism 10 is placed in the continuously-variable shifting state, that is, while the differential portion 11 is placed in its differential state. The hybrid control means 156 is further arranged to control the speed ratio γ0 of the differential portion 11 operating as an electrically controlled continuously variable transmission, so as to establish an optimum proportion of the drive forces produced by the engine 8 and the second. electric motor M2, and to optimize a reaction force generated during generation of an electric energy by the first electric motor M1 and/or the second electric motor M2. For instance, the hybrid control means 156 calculates the output as required by the vehicle operator at the present running speed of the vehicle, on the basis of an operating amount $A_{CC}$ of the accelerator pedal and the vehicle speed V, and calculate a required vehicle drive force on the basis of the calculated required output and a required amount of generation of the electric energy. On the basis of the calculated required vehicle drive force, the hybrid control means 156 calculates desired speed $N_E$ and total output of the engine 8, and controls the actual output of the engine 8 and the amount of generation of the electric energy by the first electric motor M1 and/or the second electric motor M2, according to the calculated desired speed and total output of the engine.

The hybrid control means 156 is arranged to effect the above-described hybrid control while taking account of the presently selected gear position of the automatic transmission portion 20, so as to improve the fuel economy of the engine. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the automatic transmission portion 20. That is, the hybrid control means 156 determines a target value of the overall speed ratio γT of the transmission mechanism 10, so that the engine 8 is operated according a stored highest-fuel-economy curve that satisfies both of the desired operating efficiency and the highest fuel economy of the engine 8. The hybrid control means 156 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control means 156 supplies the electric energy generated by the first electric motor M1, to the electric-energy storage device 60 and second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, or subsequently consumed by the first electric motor M1. A drive force produced by an operation of the second electric motor M1 or first electric motor M1 with the electric energy is transmitted to the power transmitting member 18. Thus, the drive system is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2. It is also noted that the hybrid control means 156 is further arranged to establish a motor drive mode in which the vehicle is driven with only the electric motor (e.g., second electric motor M2) used as the drive power source, by utilizing the electric CVT function (differential function) of the differential shifting portion 11, irrespective of whether the engine 8 is in the non-operated state or in the idling state. The hybrid control means 156 can establish the motor drive mode by operation of the first electric motor M1 and/or the second electric motor M2, even when the differential portion 11 is placed in the step-variable shifting state (fixed-speed-ratio shifting state) while the engine 8 is in its non-operated state.

Figure 54:
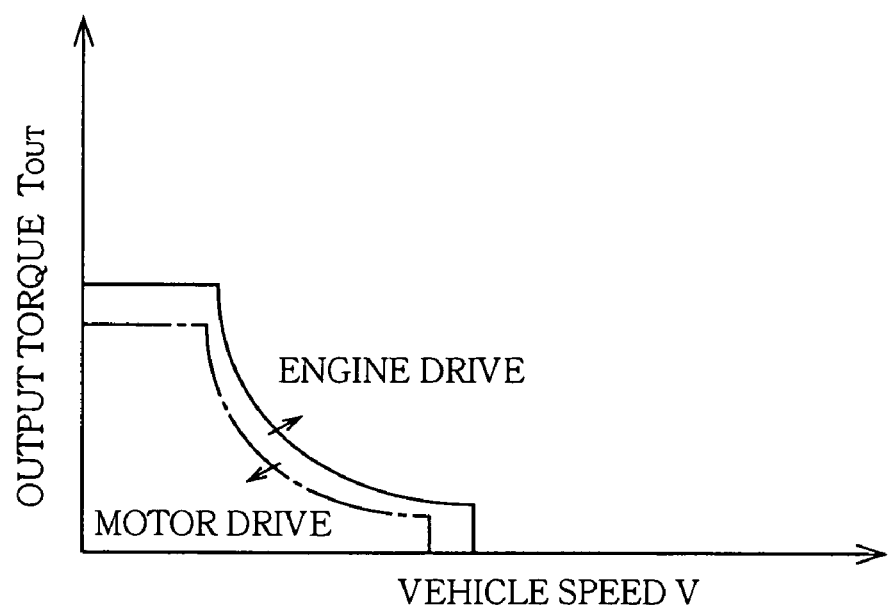
[FIG. 54] This figure is a view illustrating an example of a stored drive-power-source selection control map used to select an engine drive state and a motor drive state, in the same two-dimensional coordinate system described above, the drive-power-source selection control map defining boundary lines defining an engine drive region and a motor drive region.

The hybrid control means 156 also functions as drive-power-source selection control means for selecting one of a plurality of drive power sources, that is, one of the engine 8, first electric motor M1 and second electric motor M2, on the basis of predetermined control parameters and according to a predetermined relationship. FIG. 54 shows an example of a stored relationship, namely, a boundary line which defines an engine drive region and a motor drive region and which is used to select the engine 8 or the electric motors M1, M2, as the drive power source (to select one of the engine drive mode and the motor drive mode). That is, the stored relationship is represented by a drive-power-source selection control map (drive-power-source switching boundary line map) 164 in a rectangular two-dimensional coordinate system having an axis along which the vehicle speed V is taken, and an axis along which the drive-force-related value in the form of the output torque $T_{OUT}$ is taken. FIG. 54 also shows a one-dot chain line which is located inside the solid boundary line, by a suitable amount of control hysteresis. For example, the drive-power-source selection control map 164 shown in FIG. 54 is stored in the relationship memory means 154. The hybrid control means 156 determines whether the vehicle condition represented by the vehicle speed V and the output torque $T_{OUT}$ is in the motor drive region defined by the drive-power-source selection control map 164. As is apparent from FIG. 54, the hybrid control means 156 selects the motor drive mode when the output torque $T_{OUT}$ is comparatively small, or when the vehicle speed is comparatively low, that is, when the vehicle load is in a comparatively low range in which the operating efficiency of the engine is generally lower than in a comparatively high range. Thus, the present embodiment is arranged to select the desired drive power source as a function of the vehicle speed V and the vehicle load in the form of the output torque $T_{OUT}$ of the automatic transmission portion 20. The map shown in FIG. 54 uses the same control variables as used for defining the continuously-variable shifting region and the step-variable shifting region.

Figure 55:
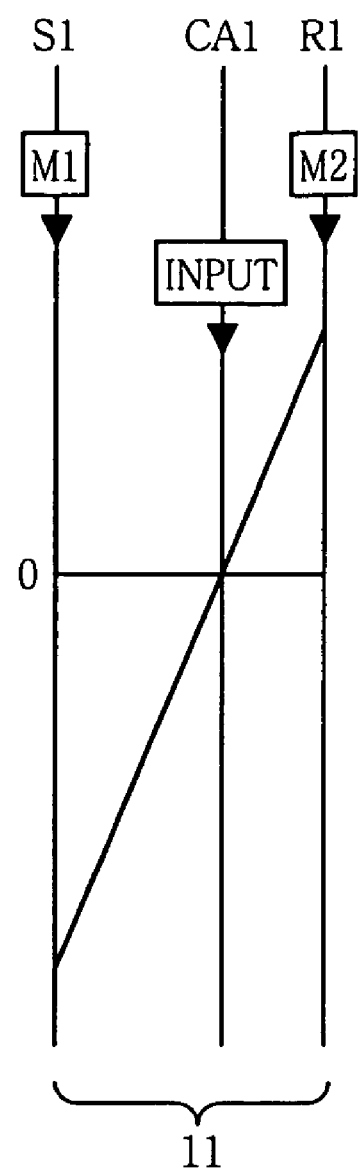
[FIG. 55] This figure is a view corresponding to a part of the collinear chart of FIG. 3 which shows a differential portion, for explaining an operating state of the differential portion in the continuously-variable shifting state, in which the engine speed is substantially zero in the motor drive state.

For reducing a tendency of dragging of the engine 8 held in its non-operated state in the motor drive mode, for thereby improving the fuel economy, the hybrid control means 156 controls the differential portion 11 so that the engine speed $N_E$ is held substantially zero, that is, held zero or close to zero, with the differential function of the differential portion 11. FIG. 55 is a view corresponding to a portion of the collinear chart of FIG. 3 which shows the differential portion 11. The collinear chart of FIG. 55 indicates an example of the operating state of the differential portion 11 placed in its continuously-variable shifting state, in the motor drive mode of the vehicle. Where the vehicle is run with the output torque of the second electric motor M2, the first electric motor M1 is freely rotated in the negative direction so that the engine speed $N_E$ (rotating speed of the first carrier CA1) is held substantially zero while the second electric motor M2 is operated at a speed corresponding to the vehicle speed V.

Referring back to FIG. 52, high-speed-gear determining means 158 is arranged to determine whether the gear position to which the transmission mechanism 10 should be shifted is the high-gear position, for example, the fifth-gear position. This determination is made on the basis of the vehicle condition and according to a shifting boundary line map of FIG. 53 stored in the relationship memory means 154, for example, to determine one of the switching clutch C0 and brake B0 that should be engaged, to place the transmission mechanism 10 in the step-variable shifting state.

Figure 56:
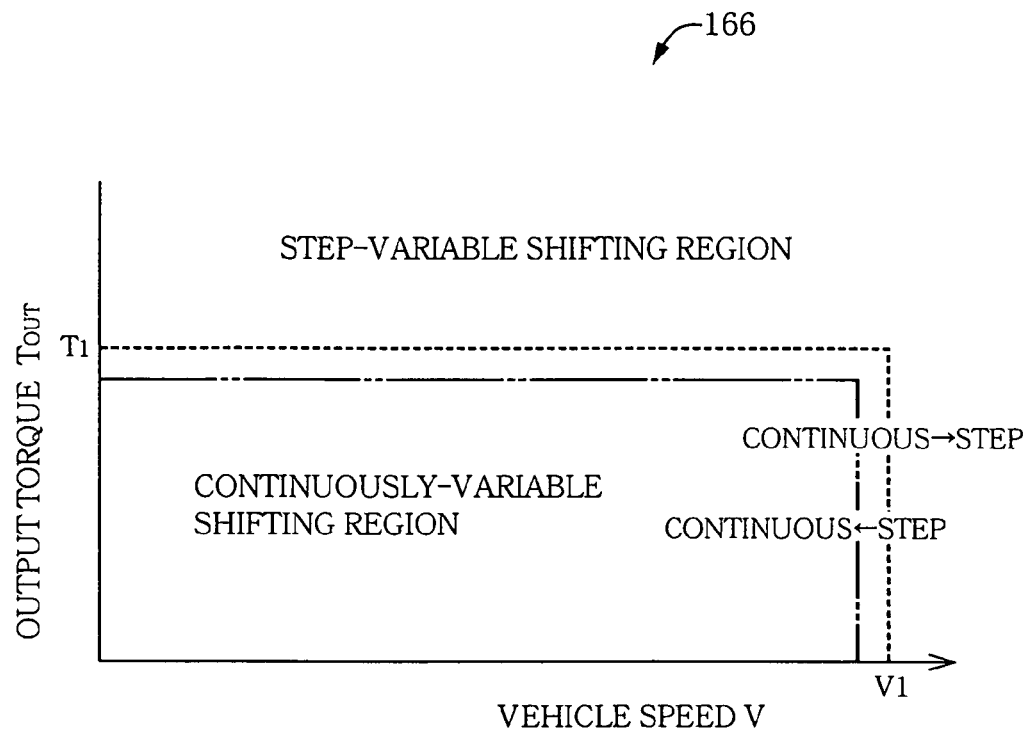
[FIG. 56] This figure is a view illustrating an example of a stored switching control map in a two-dimensional coordinate system defined by an axis of a vehicle speed and an axis of an output torque, the switching control map including boundary lines defining a continuously-variable shifting region and a step-variable shifting region.

Switching control means 159 is arranged to switch the differential portion 11 between the continuously-variable shifting state and the fixed-speed-ratio shifting state, in other words, to place the transmission mechanism 10 selectively in the continuously-variable shifting state and the step-variable shifting state, on the basis of predetermined control variables and according to a predetermined relationship. FIG. 56 shows an example of a stored relationship indicative of boundary lines for switching of the differential portion 11 between the continuously-variable shifting state and the fixed-speed-ratio shifting state (for switching of the transmission mechanism between the step-variable shifting state). The stored relationship is represented by a switching control map (switching boundary line map) 166 in a rectangular two-dimensional coordinate system having an axis along which the vehicle speed V is taken, and an axis along which the drive-force-related value in the form of the output torque $T_{OUT}$ is taken. The switching control map 166 is stored in the relationship memory means 154. The switching control means 159 determines, according to the switching control map 166 of FIG. 53, whether the vehicle condition represented by the vehicle speed V and the output torque $T_{OUT}$ is in a continuously-variable shifting region for placing the differential portion 11 in the continuously-variable shifting state, or in a step-variable shifting region for placing the differential portion 11 in the fixed-speed-ration shifting state. On the basis of a result of the determination, the differential portion 11 is placed in one of the continuously-variable shifting state and the fixed-speed-ratio shifting state. In other words, the switching control means 159 determines whether the vehicle condition is in a continuously-variable shifting region for placing the transmission mechanism 10 in the continuously-variable shifting state, or in a step-variable shifting region for placing the transmission mechanism 10 in the step-variable shifting state, so that the transmission mechanism 10 is placed in one of the continuously-variable shifting state and the step-variable shifting state, on the basis of a result of the determination. Thus, the present embodiment is arranged to select the continuously-variable shifting state or the step-variable shifting state (locking state), as a function of the vehicle speed V and the vehicle load in the form of the output torque $T_{OUT}$ of the automatic transmission portion 20. The map shown in FIG. 56 represents the predetermined relationship between those control variables.

When the switching control means 159 determines that the vehicle condition is in the continuously-variable shifting region, the switching control means 159 disables the hybrid control means 156 effect a hybrid control or continuously-variable shifting control, and enables step-variable shifting control means 152 to effect a predetermined step-variable shifting control. In this case, the step-variable shifting control means 152 effects an automatic shifting control according to the step-variable-shifting control map 162 shown in FIG. 53 and stored in relationship memory means 154. FIG. 2 indicates the combinations of the operating states of the hydraulically operated frictional coupling devices C0, C1, C2, B0, B1, B2 and B3, which are selectively engaged for effecting the step-variable shifting control. In this automatic step-variable shifting control mode, the transmission mechanism 10 as a whole consisting of the differential portion 11 and the automatic transmission portion 20 functions as a so-called "step-variable automatic transmission", the gear positions of which are established according to the table of engagement of the frictional coupling devices shown in FIG. 2.

When the high-speed-gear determining means 158 determines that the fifth-gear position should be established as the high-gear position, the switching control means 159 commands the hydraulic control unit 42 to release the switching clutch C0 and engage the switch brake B0, so that the differential portion 11 functions as an auxiliary transmission having a fixed speed ratio γ0, for example, a speed ratio γ0 of 0.7, whereby the transmission mechanism 10 as a whole is placed in a so-called "overdrive gear position" having a speed ratio lower than 1.0. When the high-speed-gear determining means 158 determines that a gear position other than the fifth-gear position should be established, the switching control means 159 commands the hydraulic control unit 42 to engage the switching clutch C0 and release the switching brake B0, so that the differential portion 11 functions as an auxiliary transmission having a fixed speed ratio γ0, for example, a speed ratio γ0 of 1, whereby the transmission mechanism 10 as a whole is placed in a low-gear position the speed ratio of which is not lower than 1.0. Thus, the transmission mechanism 10 is switched to the step-variable shifting state, by the switching control means 60, and the differential portion 11 placed in the step-variable shifting state is selectively placed in one of the two gear positions, so that the differential portion 11 functions as the auxiliary transmission, while at the same time the automatic transmission portion 20 connected in series to the differential portion 11 functions as the step-variable transmission, whereby the transmission mechanism 10 as the whole functions as a so-called "step-variable automatic transmission".

When the switching control means 159 determines that the vehicle condition is in the continuously-variable shifting region for placing the transmission mechanism 10 in the continuously-variable shifting state, on the other hand, the switching control means 159 commands the hydraulic control unit 42 to release the switching clutch C0 and the switching brake B0 for placing the differential portion 11 in the continuously-variable shifting state, so that the transmission mechanism 10 as a whole is placed in the continuously-variable shifting state. At the same time, the switching control means 159 enables the hybrid control means 156 to effect the hybrid control, and commands the step-variable shifting control means 152 to select and hold a predetermined one of the gear positions, or to permit an automatic shifting control according to the step-variable-shifting control map 162 of FIG. 53 stored in the relationship memory means 154. In the latter case, the variable-step shifting control means 152 effects the automatic shifting control by suitably selecting the combinations of the operating states of the frictional coupling devices indicated in the table of FIG. 2, except the combinations including the engagement of the switching clutch C0 and brake B0. Thus, the differential portion 11 placed in the continuously-variable shifting state under the control of the switching control means 159 functions as the continuously variable transmission while the automatic transmission portion 20 connected in series to the differential portion 11 functions as the step-variable transmission, so that the drive system provides a sufficient vehicle drive force, such that the speed of the rotary motion transmitted to the automatic transmission portion 20 placed in one of the first-speed, second-speed, third-speed and fourth-gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable through the adjacent gear positions, whereby the overall speed ratio γT of the transmission mechanism 10 as a whole is continuously variable. In other words, the switching control means 159 controls the engaging and releasing actions of the differential-state switching device in the form of the switching brake B0 and switching clutch B0, for selectively placing the power distributing mechanism 16 in one of the differential state and the non-differential state.

Figure 57:
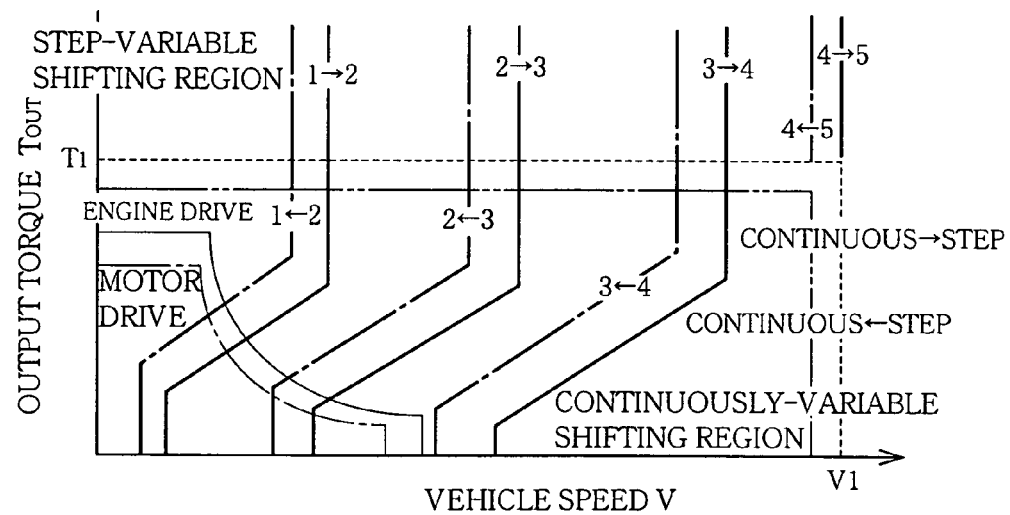
[FIG. 57] This figure is a view illustrating a complex control map which is a combination of the step-variable-shifting control map of FIG. 53, the drive-power-source selection control map of FIG. 54 and the switching control map of FIG. 56.

FIG. 57 illustrates a complex control map 168 which is a combination of the step-variable-shifting control map 162, the drive-power-source selection control map 164 and the switching control map 166. Preferably, the step-variable-shifting control map 162, the drive-power-source selection control map 164 and the switching control map 166 use common control variables in the form of the vehicle speed V and the vehicle load, that is, the output torque $T_{OUT}$ of the automatic transmission portion 20, as shown in FIG. 57. In other words, the step-variable shifting control means 152, the hybrid control means 156, the high-speed-gear determining means 158 and the switching control means 159 cooperate to effect a complex shifting control and a drive-power-source selecting control on the basis of the common control variables consisting of the vehicle speed V and the output torque $T_{OUT}$ of the automatic transmission portion 20, and according to the stored relationships in the form of the complex control map 168 stored in the relationship memory means 154. The use of the common control variables permits an adequate overall shifting control to selectively effect the continuously-variable shifting control and the step-variable shifting control, and an adequate overall drive control including the drive-power-source selection control as well as the continuously-variable shifting control and the step-variable shifting control. Thus, the relationship memory means 154 stores the maps which define the continuously-variable shifting region, step-variable shifting region (locking-state region), etc., in a manner as simple as possible, with the two control variables, that is, the vehicle speed V and the output torque $T_{OUT}$ of the automatic transmission portion 20. Further, various controls of the drive system can be carried out in a simple manner as a function of the power output which determines whether the continuously-variable shifting is advantageous or disadvantageous and the required capacity of the electric motor, and as a function of the vehicle speed V which determines whether the continuously-variable shifting is advantageous or disadvantageous in terms of the power transmitting efficiency. It is noted that although FIG. 57 shows the complex control map 168 as a combination, of the step-variable-shifting control map 162, drive-power-source selection-control map 164 and switching control map 166, for convenience' sake, those maps 162, 164, 166 which are respectively shown in FIGS. 53, 54 and 56 are stored in the relationship memory means 154, independently of each other.

Figure 58:
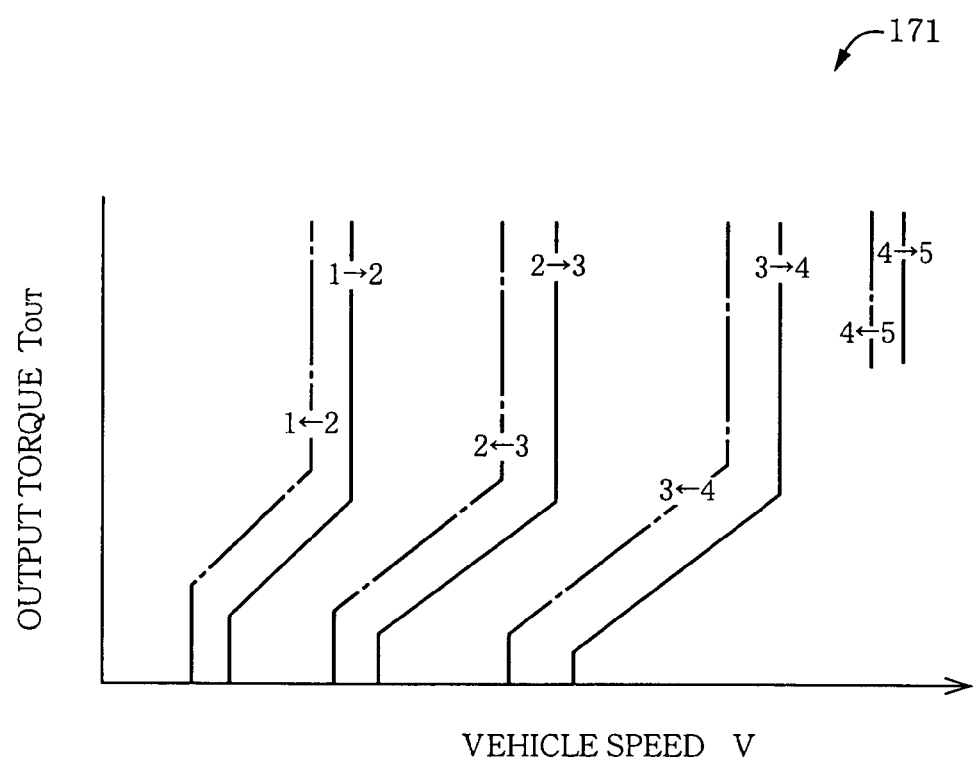
[FIG. 58] This figure is a view corresponding to that of FIG. 53, illustrating a stored power-mode step-variable-shifting control map corresponding to that of FIG. 53, in a two-dimensional coordinate system defined by an axis of a vehicle speed and an axis of an output torque.
Figure 59:
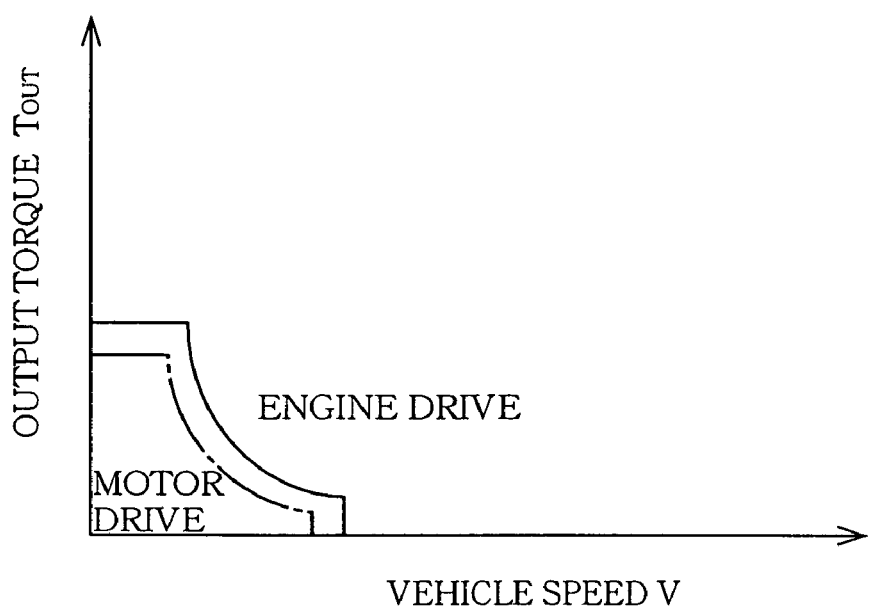
[FIG. 59] This figure is a view corresponding to that of FIG. 54, illustrating a stored power-mode drive-power-source selection control map corresponding to that of FIG. 54, in a two-dimensional coordinate system defined by an axis of a vehicle sped and an axis of an output torque.
Figure 60:
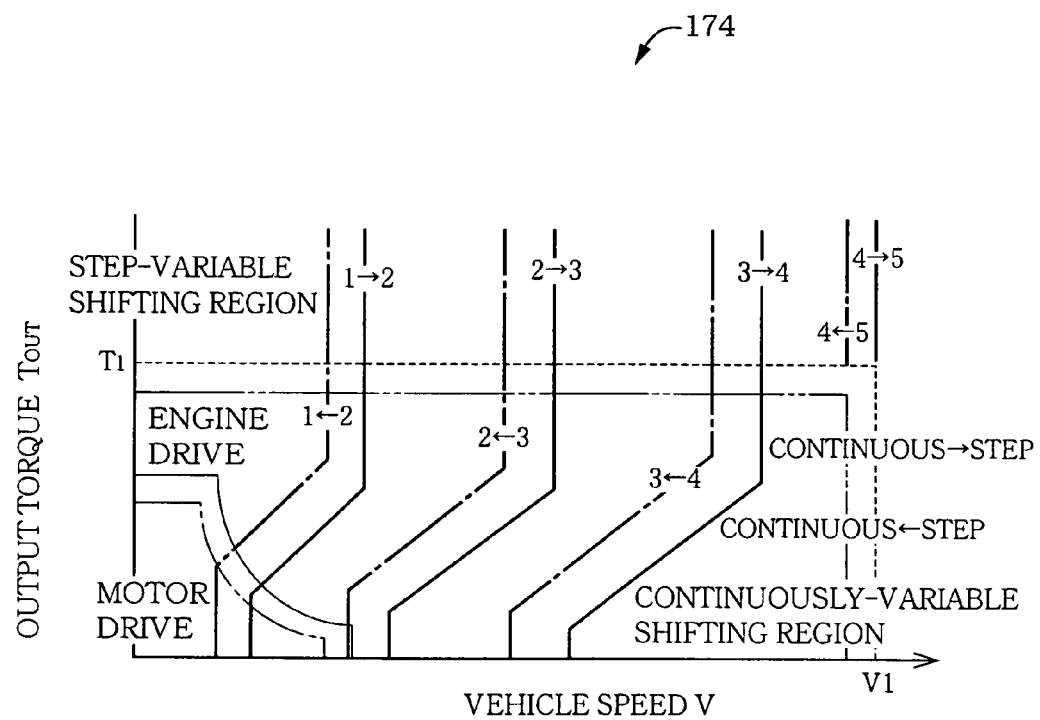
[FIG. 60] This figure is a view corresponding to that of FIG. 57, illustrating a power-mode complex control map which is a combination of the step-variable-shifting control map of FIG. 58, the drive-power-source selection control map of FIG. 59 and the switching control map of FIG. 56.

FIG. 58 is a view illustrating an example of a power-mode step-variable-shifting control map (shifting boundary line map) 171 used by the step-variable shifting control means 152 for the step-variable shifting control. FIG. 59 is a view illustrating an example of a power-mode drive-power-source selection control map (drive-power-source switching boundary line map) 172 used by the hybrid control means 156 for the drive-power-source selection control. FIG. 60 is a view illustrating an example of a power-mode complex control map 174 which is a combination of the step-variable-shifting control map 171, the drive-power-source selection control map 172 and the switching control map 166. When a power-mode selector switch such as an ETC switch is operated to select a power mode running of the vehicle, the step-variable shifting control means 152, hybrid control means 156, high-speed-gear determining means 158 and switching control means 159 perform the respective control functions described above, on the basis of the vehicle speed V and the output torque $T_{OUT}$ of the automatic transmission portion 20, and according to the power-mode control maps stored in the relationship memory means 154. The control maps shown in FIGS. 53, FIG. 54, FIG. 56 and FIG. 57 are used in a normal-mode running of the vehicle. The switching control map 166 shown in FIG. 56 is commonly used in the normal-mode running and the power-mode running. However, one of the normal-mode step-variable-shifting control map and the power-mode step-variable shifting control map, and one of the normal-mode drive-power-source selection control map and the power-mode drive-power-source selection control map are selectively used depending upon the presently selected running mode of the vehicle. Thus, the relationship memory means 154 stores a plurality of relationships in the form of a plurality of control maps for performing the step-variable shifting control, drive-power-source selection control and shifting-state switching control.

The shifting boundary line maps shown in FIGS. 53 and 58 will be described in detail. These shifting boundary line maps (relationships) shown in these figures for illustrative purpose are stored in the relationship memory means 154, and used to determine whether a shifting action of the automatic transmission portion 20 should be effected. These shifting boundary line maps are defined in a rectangular two-dimensional coordinate system having an axis of the vehicle speed V and an axis of the vehicle load in the form of the output torque $T_{OUT}$. Solid lines in FIGS. 53 and 58 are shift-up boundary lines, while one-dot chain lines are shift-down boundary lines. Broken lines in FIGS. 56 and 60 indicate an upper vehicle-speed limit V1 and an upper output-torque limit T1 which are used to determine whether the vehicle condition is in the step-variable shifting region or the continuously-variable shifting region. That is, the broke lines in FIGS. 56 and 60 are a predetermined upper vehicle-speed limit line consisting of a series of upper speed limits V1 for determining whether the hybrid vehicle is in the high-speed running state, and a predetermined upper output limit line consisting of a series of upper output limits in the form of upper limits T1 of the output torque $T_{OUT}$ of the automatic transmission portion 20 as a drive-force-related value for determining whether the hybrid vehicle is in the high-output running state. Two-dot chain lines also shown in FIGS. 56 and 60 are limit lines which are offset with respect the broken lines, by a suitable amount of control hysteresis, so that the broken lines and the two-dot chain lines are selectively used as the boundary lines defining the step-variable shifting region and the continuously-variable shifting region. These boundary lines of FIGS. 56 and 60 are stored switching boundary line maps (switching maps or relationships) each of which includes the upper vehicle-speed limit V1 and the upper output torque limit T1 and is used by the switching control means 60 to determine whether the vehicle condition is in the step-variable shifting region or continuously-variable shifting region, on the basis of the vehicle speed V and the output torque $T_{OUT}$. These switching boundary line maps may be included in the shifting boundary line maps stored in the relationship memory means 154. The switching boundary line maps may include at least one of the upper vehicle-speed limit V1 and the upper output-torque limit T1, and may use only one of the vehicle speed V and the output torque $T_{OUT}$ as a control parameter. The shifting boundary line maps, switching boundary line maps, etc. described above may be replaced by equations for comparison of the actual value of the vehicle speed V with the upper vehicle-speed limit V1, and equations for comparison of the actual value of the output torque $T_{OUT}$ with the upper output-torque limit T1.

The vehicle load indicated above is a parameter directly corresponding to the vehicle drive force, and may be represented by not only a drive torque or force of the drive wheels 38, but also the output torque $T_{OUT}$ of the automatic transmission portion 20, engine torque $T_E$ or vehicle acceleration value, or an actual value of the engine torque $T_E$ which is calculated from the engine speed $N_E$ and an angle of operation of an accelerator pedal or an angle of opening of a throttle valve (intake air quantity, air/fuel ratio or amount of fuel injection), or an estimated value of an operator's required vehicle drive force calculated from an amount of operation of the accelerator pedal or angle of opening of the throttle valve. The drive torque indicated above may be calculated on the basis of the output torque $T_{OUT}$, and by taking account of the gear ratio of the differential gear device, the radius of the drive wheels 38, etc., or directly detected by a torque sensor.

The upper vehicle-speed limit V1 is determined so that the transmission mechanism 10 is placed in the step-variable shifting state while the vehicle speed V is higher than the upper limit V1. This determination is effective to minimize a possibility of deterioration of the fuel economy of the vehicle if the transmission mechanism 10 were placed in the continuously-variable shifting state at a relatively high running speed of the vehicle. The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

As shown in FIGS. 56 and 60, the step-variable shifting region is set to be a high output-torque region in which the output torque $T_{OUT}$ is not lower than the upper output-torque limit T1, and a high vehicle-speed region in which the vehicle speed V is not lower than the upper vehicle-speed limit V1. Accordingly, the step-variable shifting control is effected when the vehicle is in a high-output running state with a comparatively high output of the engine 8 or when the vehicle is in a high-speed running state, while the continuously-variable shifting control is effected when the vehicle is in a low-output running state with a comparatively low output of the engine 8 or when the vehicle is in a low-speed running state, that is, when the engine 8 is in a normal output state. The step-variable shifting region indicated in FIG. 8 is set to be a high-torque region in which the engine output torque $T_E$ is not lower than a predetermined value $T_{E1}$, a high-speed region in which the engine speed $N_E$ is not lower than a predetermined value $N_{E1}$, or a high-output region in which the engine output determined by the output torque $T_E$ and speed $N_E$ of the engine 8 is not lower than a predetermined value. Accordingly, the step-variable shifting control is effected when the torque, speed or output of the engine 8 is comparatively high, while the continuously-variable shifting control is effected when the torque, speed or output of the engine is comparatively low, that is, when the engine is in a normal output state. The switching boundary lines in FIG. 8, which defines the step-variable shifting region and the continuously-variable shifting region, function as an upper vehicle-speed limit line consisting of a series of upper vehicle-speed limits, and an upper output limit line consisting of a series of upper output limits.

Therefore, when the vehicle is in a low- or medium-speed running state or in a low- or medium-output running state, the transmission mechanism 10 is placed in the continuously-variable shifting state, assuring a high degree of fuel economy of the hybrid vehicle. When the vehicle is in a high-speed running state with the vehicle speed V exceeding the upper vehicle-speed limit V1, on the other hand, the transmission mechanism 10 is placed in the step-variable shifting in which the transmission mechanism 10 is operated as a step-variable transmission, and the output of the engine 8 is transmitted to the drive wheels 38 primarily through the mechanical power transmitting path, so that the fuel economy is improved owing to reduction of a loss of conversion of the mechanical energy into the electric energy, which would take place when the transmission mechanism 10 is operated as an electrically controlled continuously variable transmission. When the vehicle is in a high-output running state in which the drive-force-related value in the form of the output torque $T_{OUT}$ exceeds the upper output-torque limit T1, the transmission mechanism 10 is also placed in the step-variable shifting state. Therefore, the transmission mechanism 10 is placed in the continuously-variable shifting state or operated as the electrically controlled continuously variable transmission, only when the vehicle speed is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1, and the required size of the drive system including the electric motor. In other words, the transmission mechanism 10 is switched from the continuously-variable shifting state to the step-variable shifting state (fixed-speed-ratio shifting state) in the high-output running state of the vehicle in which the vehicle operator desires an increase of the vehicle drive force, rather than an improvement in the fuel economy. Accordingly, the vehicle operator is satisfied with a change of the engine speed $N_E$ as a result of a shift-up action of the automatic transmission portion in the step-variable shifting state, that is, a comfortable rhythmic change of the engine speed $N_E$, as indicated in FIG. 10.

In the present embodiment, too, the switching control map 166 shown in FIG. 56 used for switching between the step-variable shifting region and the continuously-variable shifting region may be replaced by the switching control map shown in FIG. 8. In this case, the switching control means 159 uses the switching control map of FIG. 8, in place of the switching control map of FIG. 56, to determine whether the vehicle condition represented by the engine speed $N_E$ and the engine torque $T_E$ is in the continuously-variable shifting region or step-variable shifting region. The broken lines in FIG. 56 can be generated the basis of the switching control map of FIG. 8. In other words, the broken lines of FIG. 56 are switching boundary lines which are defined on the basis of the relationship (map) of FIG. 8, in the rectangular two-dimensional coordinate system having an axis along which the vehicle speed V is taken, and an axis along which the output torque $T_{OUT}$ is taken.

There will be described in detail the operation of the switching control means 159 in the motor drive mode in which only the electric motor, for example, only the second electric motor M2 is operated as the drive power source, owing to the electric CVT function (differential function) of the differential portion 11. When it is determined that the vehicle condition is in the motor drive region, the switching control means 159 places the power distributing mechanism 16 in its differential state, so that the engine speed $N_E$ is held substantially zero, as indicated in FIG. 55, under the control of the hybrid control means 156, for reducing a tendency of dragging of the engine 8 held in its non-operated state in the motor drive mode, for thereby improving the fuel economy.

In the motor drive mode, the switching control means 159 places the power distributing mechanism 16 in its differential state, even when the step-variable shifting state or non-differential state of the power distributing mechanism 16 is selected by the switch 48. As is apparent from the drive-power-source selection control map 164 of FIG. 54, the vehicle running in the motor drive mode is in a low-load state, in which a comfortable change of the engine speed that would be obtained in a high-torque running state cannot be obtained as a result of a shifting action of the automatic transmission, and in which the vehicle operator does not expect such a comfortable change of the engine speed. In the motor drive mode, therefore, the switching control means 159 places the power distributing mechanism 16 in the differential state, for improving the fuel economy, even when the non-differential state is selected by the switch 44.

If there is a high possibility of starting of the engine in the motor drive mode, the switching control means 159 places the power distributing mechanism 16 I the non-differential state even in the motor drive mode, for raising the engine speed $N_E$ to facilitate the ignition of the engine. Since the engine speed $N_E$ is held substantially zero in the motor drive mode, as described above, the switching control means 159 places the power distributing mechanism 16 in the non-differential state, by engaging the switching brake B0 or switching clutch C0, for raising the rotating speed of the first sun gear S1 to raise the engine speed $N_E$ at a higher rate than a rate of increase of the first sun gear S1 by the first electric motor M1 in the differential state of the power distributing mechanism 16.

Referring back to FIG. 52, continuously-variable-shifting speed-ratio control means (hereinafter referred to as "speed-ratio control means") 161 is arranged to control the speed ratio y of the automatic transmission and the speed ratio γ0 of the differential portion 11, so as to maximize the fuel economy, on the basis of the operating efficiency ηM1 of the first electric motor M1 and the operating efficiency ηM2 of the second electric motor M2, when it is determined that the continuously-variable shifting portion in the form of the differential portion 11 is placed in the continuously-variable shifting state. For instance, the speed-ratio control means 161 adjusts the speed ratio γ of the step-variable shifting portion in the form of the automatic transmission portion 20 to thereby change the speed ratio γ0 of the continuously-variable shifting portion in the form of the differential portion 11, so as to reduce the output shaft speed (input shaft speed of the automatic transmission portion 20) $N_{IN}$ of the differential portion 11, for the purpose of preventing reverse rotation of the first electric motor M1 even in a steady-state running state of the vehicle at a comparatively high speed.

Figure 61:
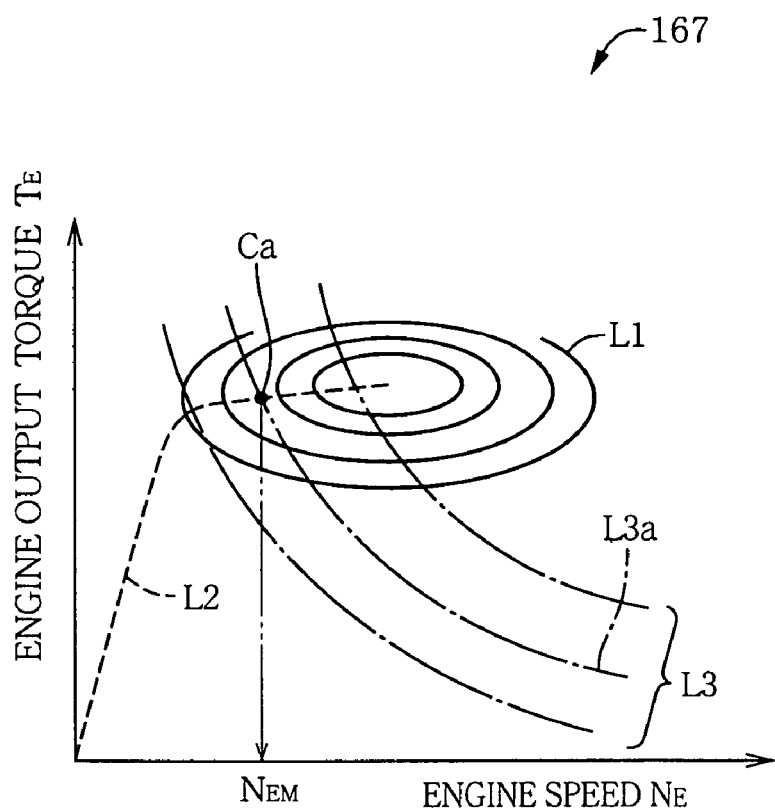
[FIG. 61] This figure is a view illustrating an example of a stored engine-fuel-economy map, together with iso-torque curves (one-dot chain lines) and an iso-fuel-economy curve (solid line), in a two-dimensional coordinate system defined by an axis of an engine speed and an axis of an engine torque, the engine-fuel-economy map being used to determine a speed ratio of the automatic shifting portion and a speed ratio of the differential portion, which speed ratios give a target speed of the engine.

The speed-ratio control means 161 determines a target speed $N_{EM}$ of the engine 8 on the basis of the actual operating angle $A_{CC}$ of the accelerator pedal and according to an engine-fuel-economy map 167 shown in FIG. 61, which is stored in the relationship memory means 154. On the basis of the actual vehicle speed V, the speed-ratio control means 161 determines the speed ratio γ of the automatic transmission portion 20 and the speed ratio γ0 of the differential portion 11, which speed ratios give the target engine speed $N_{EM}$. Namely, the speed-ratio control means 161 selects, according to a well-known relationship, one of iso-horsepower curves L3a (shown in FIG. 61) which corresponds to the output of the engine 8, on the basis of the actual operating angle $A_{CC}$ of the accelerator pedal representative of the vehicle drive force as required by the vehicle operator. The speed-ratio control means 161 determines, as the target engine speed $N_{EM}$, the engine speed corresponding to a point Ca of intersection between the selected iso-horsepower curve L3a and a highest-fuel-economy curve L2, as indicated in FIG.61. Further, the speed-ratio control means 161 determines the overall speed ratio γT of the transmission mechanism 10 that gives the target engine speed $N_{EM}$, on the basis of the target engine speed $N_{EM}$ and the actual vehicle speed V, and according to the following equation (1). A relationship between the rotating speed $N_{OUT}$ (rpm) of the output shaft 22 of the automatic transmission portion 20 and the vehicle speed V (km/h) is represented by the following equation (2), wherein a speed ratio of the final speed reducer is represented by γf, and the radius of the drive wheels 38 is represented by r. Then, the speed-ratio control means 161 determines, according to the equations (1), (2), (3) and (4), the speed ratio γ of the automatic transmission portion 20 and the speed ratio γ0 of the differential portion 11, which give the overall speed ratio γT (=γ×γ0) of the transmission mechanism 10 and which maximize the overall power transmitting efficiency of the transmission mechanism 10.

The speed ratio γ0 of the differential portion 11 varies from zero to 1. Initially, therefore, a plurality of candidate speed ratio values γa, γb, etc. of the automatic transmission portion 20 that give the engine speed $N_E$ higher than the target engine speed $N_{EM}$ when the speed ratio γ0 is assumed to be 1 are obtained on the basis of the actual vehicle speed V and according to the relationships between the engine speed $N_E$ and the vehicle speed V as represented by the following equations (1) and (2). Then, fuel consumption amounts Mfce corresponding to the candidate speed ratio values γa, γb, etc. are calculated on the basis of the overall speed ratio γT that give the target engine speed $N_{EM}$, and the candidate speed ratio values γa, γb, etc., and according to the following equation (3), for example. One of the candidate speed ratio values which corresponds to the smallest one of the calculated fuel consumption values Mfce is determined as the speed ratio γ of the automatic transmission portion 20. The speed ratio γ0 of the differential portion 11 is determined on the basis of the determined speed ratio γ and the overall speed ratio γT that gives the target engine speed $N_{EM}$.

In the following equation (3), Fce, PL, ηele, ηCVT, k1, k2 and ηgi represent the following: Fce=fuel consumption ratio; PL=instantaneous required drive force; ηele=efficiency of the electric system; ηCVT=power transmitting efficiency of the differential portion 11; k1=power transmitting ratio of the electric path of the differential portion 11; k2 =power transmitting ratio of the mechanical path of the differential portion 11; and ηgi=power transmitting efficiency of the automatic transmission portion. Efficiency ηM1 of the first electric motor ηM1 and efficiency M2 of the second electric motor M2 in the equation (3) are obtained on the basis of the rotating speeds which give the overall speed ratio γT of the differential portion 11 to obtain the target engine speed $N_{EM}$ for each of the candidate speed ratio values γa, γb, etc. and which correspond to candidate speed ratio values γ0a, γ0b etc. of the differential portion 11, and on the basis of the output torque values of the electric motors required to generate the required vehicle drive force. The ratio k1 is usually about 0.1, while the ratio k2 is usually about 0.9. However, the ratios k1 and k2 vary as a function of the required vehicle output. The power transmitting efficiency ηgi of the automatic transmission portion 20 is determined as a function of a transmitted torque Ti (which varies with the selected gear position i), a rotating speed Ni of the rotating member, and an oil temperature H. For convenience' sake, the fuel consumption ratio Fce, instantaneous required drive force PL, efficiency ηele of the electric system and power transmitting efficiency ηCVT of the differential portion 11 are held constant. Further, The power transmitting efficiency ηgi of the automatic transmission portion 20 may be held constant, as long as the use of a constant value as the efficiency ηgi does not cause an adverse influence.

$$N_{EM} = \gamma T \times N_{OUT} \tag{1}$$

$$N_{OUT} = (V \times \gamma f)/2\pi r \cdot 60 \tag{2}$$

$$Nfce = Fce \times PL/(\eta M1 \times \eta M2 \times \eta ele \times k1 + \eta CVT \times k2) \times \eta gi) \tag{3}$$

$$\eta gi = f(Ti, Ni, H) \tag{4}$$

The speed-ratio control means 161 commands the step-variable shifting control means 152 and the hybrid control means 156 to perform the respective step-variable shifting and hybrid control functions, so as to establish the determined speed ratio γ of the automatic transmission portion 20 and the determined speed ratio γ0 of the differential portion 11.

Figure 62:
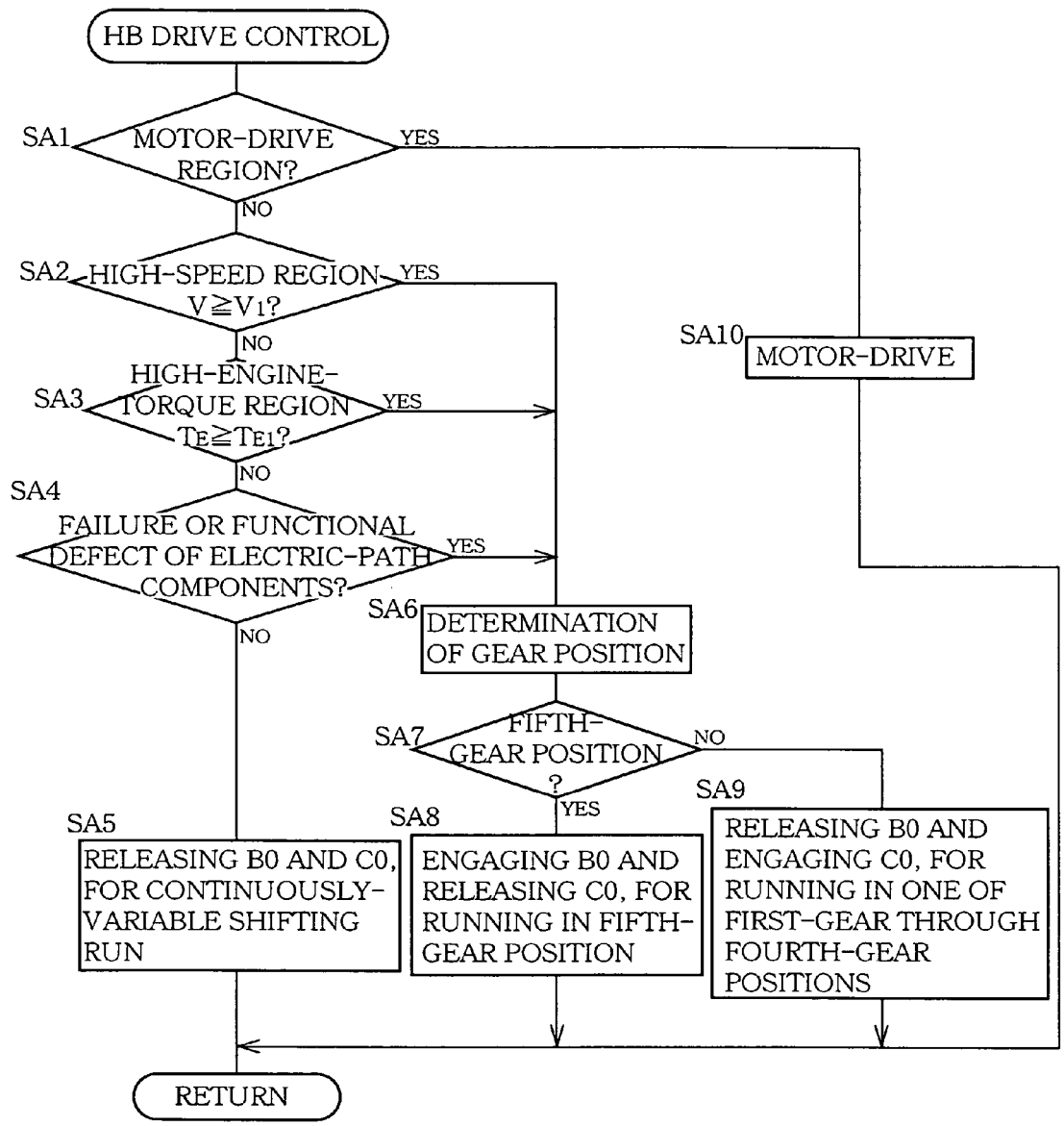
[FIG. 62] This figure is a flow chart illustrating a control operation of the electronic control device to control the hybrid drive system in the embodiment of FIG. 52.

FIG. 62 is a flow chart illustrating one of major control operations of the electronic control device 40, that is, a switching control of the transmission mechanism 10 in the embodiment of FIG. 52. This switching control is repeatedly executed with an extremely short cycle time of about several milliseconds to several tens of milliseconds, for example.

Initially, step SA1 (hereinafter "step" being omitted) is implemented to determine whether the vehicle condition represented by the vehicle speed V and the output torque $T_{OUT}$ is in a motor-drive region. This determination is made according to the drive-power-source selection control map 164 illustrated in FIG. 54. If an affirmative decision is obtained in SA1, the control flow goes to SA10 in which the vehicle is run in the motor-drive mode with the first electric motor M1 and/or second electric motor M2 used as the drive. power source. Then, the present control routine is terminated. If a negative decision is obtained in SA1, SA2 is implemented to determine whether the actual speed V of the hybrid vehicle is equal to or higher than the predetermined upper limit V1. If an affirmative decision is obtained in SA2, step SA6 and the following steps are implemented. If a negative decision is obtained in SA2, however, the control flow goes to SA3 to determine whether the actual drive torque of the hybrid vehicle or the actual output toque $T_{OUT}$ of the automatic transmission portion 20 is equal to or higher than the predetermined upper limit T1. If an affirmative decision is obtained in SA3, step SA6 and the following steps are implemented. If a negative decision is obtained in SS3, the control flow goes to SA4 to diagnose the components associated with the electric path (electric energy transmitting path) through which an electric energy generated by the first electric motor M1 is converted into a mechanical energy, for example, to determine whether any one of the first electric motor M1, second electric motor M2, inverter 58, electric-energy storage device 60, and electric conductors connecting those components has a deteriorated function, such as a failure or a functional defect due to a low temperature.

If an affirmative decision is obtained in SA4, step SA6 and the following steps are implemented. If a negative decision is obtained in SA4, the control flow goes to SA5 corresponding to the speed-ratio control means 161, in which the speed-ratio control means 161 commands the hydraulic control unit 42 to release the switching clutch C0 and the switching brake B0, for placing the differential portion 11 in the continuously-variable shifting state, and at the same time enables the hybrid control means 156 to effect the hybrid control and commands the step-variable control means 152 to permit the automatic transmission portion 20 to be automatically shifted. Accordingly, the differential portion 11 is enabled to function as the continuously variable transmission, while the automatic transmission portion 20 connected in series to the differential portion 11 is enabled to function as the step-variable transmission, so that the drive system provides a sufficient vehicle drive force, such that the speed of the rotary motion transmitted to the automatic transmission portion 20 placed in one of the first-speed, second-speed, third-speed and fourth-gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio γT of the transmission mechanism 10 is continuously variable.

If an affirmative decision is obtained in any one of SA2, SA3 and SA4, the control flow goes to SA6 to determine or select the gear position to which the transmission mechanism 10 should be shifted. This determination is effected according to the step-variable-shifting control map 162 stored in the relationship memory means 154 and shown in FIG. 53. Then, SA7 corresponding to the high-speed-gear determining means 158 is implemented to determine whether the gear position of the transmission mechanism 10 which is selected in SA6 is the high-gear position, for example, the fifth-gear position.

If an affirmative decision is obtained in SA7, the control flow goes to SA8 to command the hydraulic control unit 42 to release the switching clutch C0 and engage the switching brake B0 to enable the differential portion 11 to function as the auxiliary transmission having the fixed speed ratio γ0 of 0.7, for example. At the same time, the hybrid control means 156 is disabled to effect the hybrid control, that is, inhibited from effecting the hybrid control or continuously-variable shifting control, and the step-variable shifting control means 152 is commanded to automatically shift the automatic transmission portion 20 to the fourth-gear position, so that the transmission mechanism 10 as a whole is placed in the fifth-gear position selected in SA6. If a negative decision is obtained in SA76, the control flow goes to SA9 to command the hydraulic control unit 42 to engage the switching clutch C0 and release the switching brake B0 to enable the differential portion 11 to function as the auxiliary transmission having the fixed speed ratio γ0 of 1, for example. At the same time, the hybrid control means 156 is disabled to effect, that is, inhibited from effecting the hybrid control or continuously-variable shifting control, and the step-variable shifting control means 152 is commanded to automatically shift the automatic transmission portion 20 to one of the first-gear position through the fourth-gear position, which was selected in S5. Thus, SA8 and SA9 are arranged such that the differential portion 11 is enabled to function as the auxiliary transmission while the automatic transmission portion 20 connected in series to the differential portion 11 is enabled to function as the step-variable transmission, so that the transmission mechanism 10 as a whole placed in the step-variable transmission is enabled to function as the so-called step-variable automatic transmission portion. In the above-described controls, SA6, SA8 and SA9 correspond to steps performed by the step-variable shifting control means 152, and SA1, SA5, SA8 and SA9 correspond to steps performed by the hybrid control means 156, while SA5, SA8 and SA9 correspond to steps performed by the switching control means 159.

It will be understood from the foregoing description, the present embodiment includes the differential portion 11 switchable between a continuously-variable shifting state in which the differential portion 11 is operable as an electrically controlled continuously variable transmission, and a fixed-speed-ratio shifting state, and further includes the switching control means 159 (SA5, SA8 and SA9) operable to place the differential portion 11 selectively in one of the continuously-variable shifting portion and the fixed-speed-ratio shifting portion, on the basis of the vehicle speed and the vehicle load in the form of the output torque of the vehicle drive system, and according to a predetermined relationship. Thus, the present embodiment provides a control device suitable for effecting a shifting control of the transmission mechanism 10 which is operable as the electrically controlled continuously variable transmission.

It is also noted that the present embodiment includes the transmission mechanism 10 switchable between a continuously-variable shifting state in which the transmission mechanism 10 is operable as an electrically controlled continuously variable transmission, and a step-variable shifting state in which the transmission mechanism 10 is operable as a step-variable transmission, and further includes the switching control means 159 operable to place the transmission mechanism 10 selectively in one of the continuously-variable shifting state and the step-variable shifting state, on the basis of the vehicle speed and the vehicle load in the form of the output torque of the vehicle drive system, and according to a predetermined relationship. Thus, the present embodiment provides a control device suitable for effecting a shifting control of the transmission mechanism 10 operable as the electrically controlled continuously variable transmission.

It is further noted that the present embodiment includes: the transmission mechanism 10 switchable between a continuously-variable shifting state in which the transmission mechanism 10 is operable as an electrically controlled continuously variable transmission, and a fixed-speed-ratio shifting state; the switching control map 166 which defines, with control parameters consisting of the vehicle speed and the vehicle load or the output torque of the vehicle drive system, a first region in which the transmission mechanism 10 is placed in the continuously-variable shifting state, and a second region in which the transmission mechanism 10 is placed in the step-variable shifting state; and the switching control means 159 operable to place the transmission mechanism 10 selectively in one of the continuously-variable shifting state and the fixed-speed-ratio shifting state, according to the switching control map 166. Thus, the present embodiment provides a control device operable with a simple program for suitably effecting a shifting control of the transmission mechanism 10 operable as the electrically controlled continuously variable transmission.

It is further noted that the present embodiment includes: the transmission mechanism 10 switchable between a continuously-variable shifting state in which the transmission mechanism 10 is operable in an electrically controlled continuously variable transmission, and the step-variable shifting state in which the transmission mechanism 10 is operable as a step-variable transmission; the switching control map 166 which defines, with control parameters consisting of the vehicle speed and the vehicle load or the output torque of the vehicle drive system used as the control parameters, a first region in which the transmission mechanism 10 is placed in the continuously-variable shifting state, and a second region in which the transmission mechanism 10 is placed in the step-variable shifting state; and the switching control means 159 operable to place the transmission mechanism 10 selectively in one of the continuously-variable shifting state and the fixed-speed-ratio shifting state, according to the switching control map 166. Thus, the present embodiment provides a control device operable with a simple program for suitably effecting a shifting control of the transmission mechanism 10 operable selectively as the electrically controlled continuously variable transmission and the step-variable transmission.

It is also noted that the present embodiment includes: a differential-state switching device in the form of the switching brake B0 and the switching clutch C0 device operable to place the differential mechanism 16 in a differential state in which the mechanism 16 is operable as an electrically controlled continuously variable transmission, and a locked state in which the differential mechanism 16 is in a non-differential state; the step-variable-shifting control map 162 which defines, with suitable control parameters, shifting lines for effecting a shifting control of the step-variable automatic transmission portion 20; and the switching control map 166 which defines, with the same control parameters used for the step-variable-shifting control map 162, a differential region in which the differential mechanism 16 is placed in the differential state by the differential-state switching device, and a non-differential region in which the differential mechanism 16 is placed in the non-differential state by the differential-state switching device. Thus, the present embodiment provides a control device operable with a simple program for suitably effecting a shifting control of the step-variable automatic transmission portion 20 and a shifting control of the transmission mechanism 10 operable selectively as the electrically controlled continuously variable transmission and the step-variable transmission.

It is further noted that the present embodiment includes: a differential-state switching device in the form of the switching brake B0 and the switching clutch C0 device operable to place the differential mechanism 16 in a differential state in which the mechanism 16 is operable as an electrically controlled continuously variable transmission, and a locked state in which the differential mechanism 16 is in a non-differential state; the drive-power-source selection control map 164 which defines, with suitable control parameters, a plurality of regions for effecting a drive-power-source selection control to select at least one drive power source to be operated to generate a drive force, from among the engine 8, first electric motor M1 and second electric motor M2; and the switching control map 166, which defines, with the same control parameters used for the drive-power-source selection control map 164, a differential region in which the differential mechanism 16 is placed in the differential state by the differential-state switching device, and a non-differential region in which the differential mechanism 16 is placed in the non-differential state by the differential-state switching device. Thus, the present embodiment provides a control device operable with a simple program for suitably effecting a shifting control of the step-variable automatic transmission portion 20 and a shifting control of the transmission mechanism 10 operable selectively as the electrically controlled continuously variable transmission and the drive-power-source selection control.

It is further noted that the present embodiment includes: the transmission mechanism 10 switchable between a continuously-variable shifting state in which the transmission mechanism 10 is operable as a continuously variable transmission, and a step-variable shifting state in which the transmission mechanism 10 is operable as a step-variable transmission; the drive-power-source selection control map 164 which defines, with suitable control parameters, a plurality of regions for effecting a drive-power-source selection control to select at least one drive power source to be operated to generate a drive force, from among the engine 8, first electric motor M1 and second electric motor M2; and the switching control map 166, which defines, with the same control parameters used for the drive-power-source selection control map 164, a continuously-variable shifting region in which the transmission mechanism 10 is placed in the continuously-variable shifting state, and a step-variable shifting region in which the transmission mechanism 10 is placed in the step-variable shifting state. Thus, the present embodiment provides a control device operable with a simple program for suitably effecting a shifting control of the transmission mechanism 10 operable selectively as the electrically controlled continuously variable transmission and the step-variable transmission.

The control parameters used in the present embodiment are the vehicle speed, and the vehicle load in the form of the output torque $T_{OUT}$ of the automatic transmission portion 20, so that the shifting control of the transmission mechanism 10 operable as the electrically controlled continuously variable transmission can be effected with a simple program.

Embodiment 20

Figure 63:
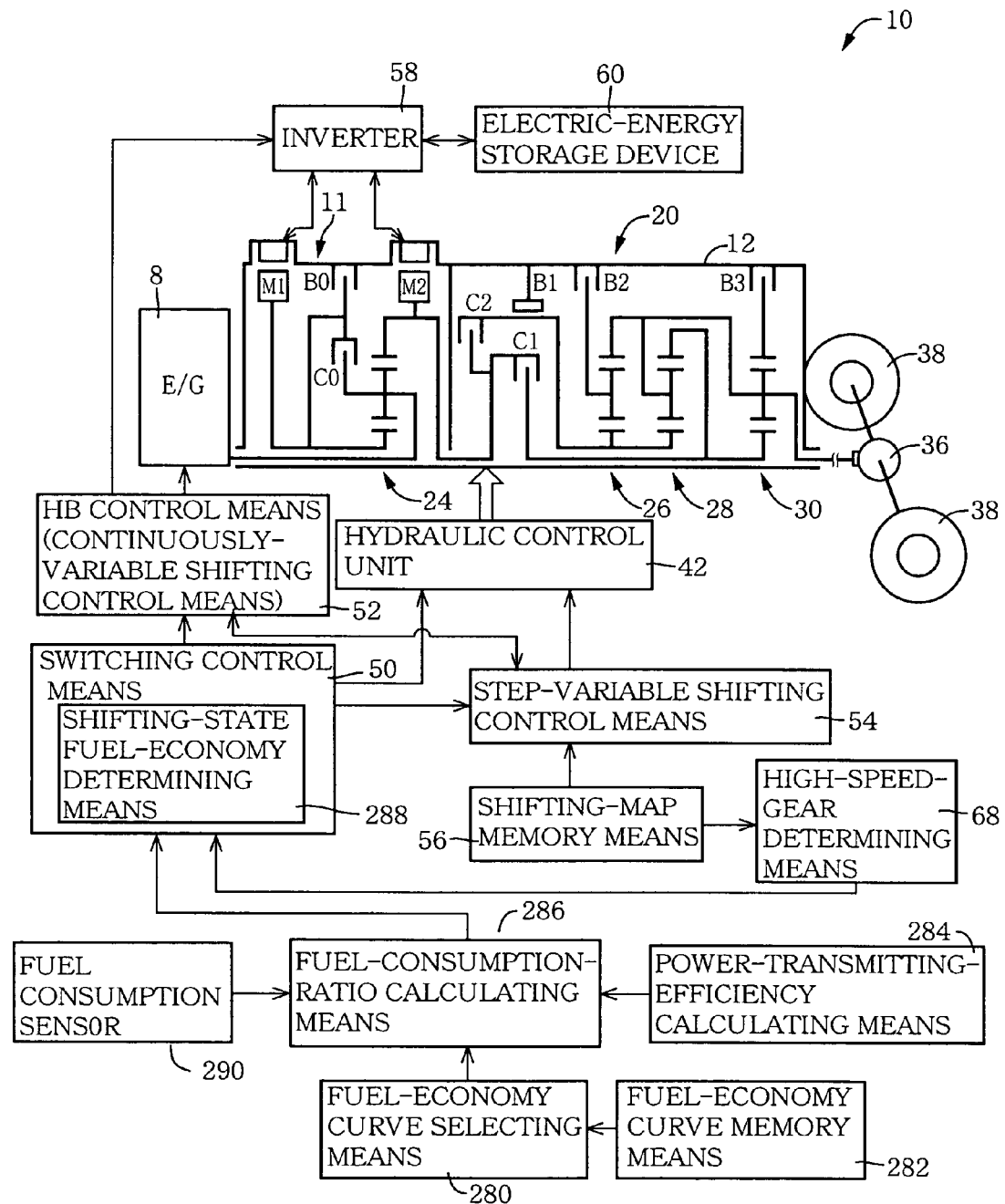
[FIG. 63] This figure is a functional block diagram for explaining major control functions performed by an electronic control device in another embodiment of the invention, which is another modification of the embodiment of FIG. 6.

FIG. 63 is a functional block diagram for explaining major control functions of the electronic control device 40 in another embodiment of this invention.

Figure 64:
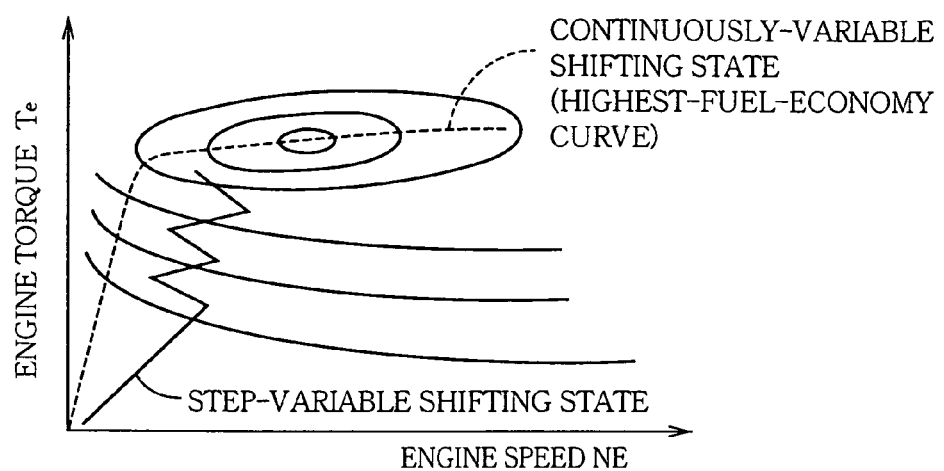
[FIG. 64] This figure is a view illustrating an example of a fuel-economy map used to calculate fuel economy.

Fuel-economy curve selecting means 280 is arranged to select a fuel consumption map (hereinafter referred to as "fuel-economy map) or select one of fuel-economy curves of the engine 8 stored in fuel-economy curve memory means 282, which permits an optimum operating state of the engine 10 for the vehicle. The fuel-economy map is selected by taking account of the fuel economy or energy efficiency and the vehicle drivability. The fuel-economy map may be changed in a real-time fashion, or may be obtained by experimentation and stored in the memory means 282. An example of a highest-fuel-economy curve is indicated by broken line in FIG. 64. For instance, the fuel-economy map is defined in a rectangular two-dimensional coordinate system having an axis along which the engine speed NE is taken, and an axis along which the engine torque Te is taken. The highest-fuel-economy curve is a curve which connects highest fuel economy points obtained by experimentation and which extends through a lowest-fuel-consumption region represented by one of iso-fuel-economy curves indicated by solid lines, as the engine speed NE rises. The highest-fuel-economy curve may be defined by a group of lowest-fuel-consumption points. In FIG. 64, each of the iso-fuel-economy curves is defined by a series of points having an equal engine fuel consumption ratio fe. One of the adjacent regions represented by the adjacent iso-fuel-economy curves, which one region is located inside the other, indicates a lower engine fuel consumption ratio fe, that is, a higher fuel economy. Namely, the highest fuel economy region corresponds to a medium-speed high-load operating state of the engine 8.

The fuel-economy map indicated above is basically determined by the specifications of the engine 8, and are influenced by a condition of the vehicle such as internal factors and external factors of the engine 8. Accordingly, the fuel-economy map changes with the internal and external factors of the engine such as a cooling water temperature, a catalyst temperature, a working oil temperature, and a burning state (that is, an air/fuel ratio indicative of a lean-burn state, a stoichiometric state, etc.). Therefore, the fuel-economy curve memory means 282 stores a plurality of fuel-economy maps on the basis of the above-indicated internal and external factors, or the stored single fuel-economy map is changed in the real-time fashion on the basis of the internal and external factors. In this respect, the fuel-economy curve selecting means 280 may be considered to select one of the plurality of fuel economy curves on the basis of the internal and external factors.

There will be briefly described a relationship between the fuel consumption ratio fe and efficiency $\eta$ of power transmission from the engine 8 to the drive wheels 38 (hereinafter referred to as "power transmitting efficiency $\eta$").

Generally, the fuel economy of an engine is represented by the fuel consumption ratio fe, that is, an amount of fuel consumption per unit output×time (=unit work), and is usually expressed by grams of fuel consumption per unit output per one hour, that is, g/ps·h or g/kW·h. Conceptually, the engine fuel consumption ratio fe is equal to fuel consumption amount F/engine output Pe. Therefore, the fuel consumption ratio fe decreases or the fuel economy increases with a decrease in the fuel consumption amount F and with an increase in the engine output Pe. In other words, the fuel economy for a given value of the fuel consumption amount F can be represented by the engine output Pe. The engine output Pe is higher when the engine 8 is operated along the highest-fuel-economy curve, than when the engine 8 is not operated along the highest-fuel-economy curve. In FIG. 64, the broken line indicates the highest-fuel-economy curve as the fuel-economy map when the transmission mechanism 10 is operated in the continuously-variable shifting state, while the solid line indicates the fuel-economy map when the transmission mechanism 10 is operated in the step-variable shifting state. In the continuously-variable shifting state, the speed ratio is continuously changed such that the engine speed NE changes with respect to the vehicle speed V, along the highest-fuel-economy curve. In the step-variable shifting state, the speed ratio changes in steps, so that the engine speed NE is held constant with respect to the vehicle speed V. Although the highest-fuel-economy curve indicated by the broken line is used as the fuel-economy map in the continuously-variable shifting state, as distinguished from the fuel-economy map used in the step-variable shifting state, for illustrative purpose, the fuel-economy map in the continuously-variable shifting state need not be consistent with the highest-fuel-economy curve.

According to the fuel-economy maps described above, the engine output Pecvt during running of the vehicle in the continuously-variable shifting state is higher than the engine output Peu during running of the vehicle in the step-variable shifting state, for the same engine speed NE, since the fuel economy during the vehicle running in the continuously-variable shifting state is closer to the highest fuel economy curve. That is, the engine output Pecvt in the continuously-variable shifting state is always higher than the engine output Peu in the step-variable shifting state. Generally, a drive-wheel output Pw obtained by the drive wheels 38 is represented by engine output Pe×power transmitting efficiency $\eta$×system efficiency $\eta$sys of the transmission mechanism 10, and the drive-wheel output Pwcvt during running of the vehicle in the continuously-variable shifting state is always higher than the drive-wheel output Pwu during running of the vehicle in the step-variable shifting state, for the same value of a product of the power transmitting efficiency $\eta$ and the system efficiency $\eta$sys (the product $\eta \times \eta$sys being hereinafter referred to as "vehicle running efficiency $\eta$t"). Accordingly, where the fuel economy is represented by a fuel consumption ratio fs=fuel consumption amount F/drive-wheel output Pw, the fuel economy of the vehicle is always higher in the continuously-variable shifting state than in the step-variable shifting state, for the same vehicle condition, that is, for the same vehicle speed V and for the same fuel consumption amount F.

Actually, however, the power transmitting efficiency $\eta$ is generally higher in the step-variable shifting state in which the drive force is transmitted primarily through a mechanical power transmitting path, than in the electrically established continuously-variable shifting state. In this respect, the drive-wheel output Pwcvt in the continuously-variable shifting state (=engine output Pecvt×power transmitting efficiency $\eta$cvt×system efficiency $\eta$sysc, in the continuously-variable shifting state) is not necessarily higher than the drive-wheel output Pwu in the step-variable shifting state (=engine output Peu×power transmitting efficiency $\eta$u×system efficiency $\eta$sysu, in the step-variable shifting state), depending upon a difference between the engine output Pecvt in the continuously-variable shifting state and the engine output Peu in the step-variable shifting state, the power transmitting efficiency ηcvt and system efficiency ηsysc in the electrically established continuously-variable shifting state, and the power transmitting efficiency ηu and system efficiency ηsysu in the step-variable shifting state. Therefore, the fuel economy of the vehicle is not necessarily higher during the vehicle running in the continuously-variable shifting state than during the vehicle running in the step-variable shifting state. From another point of view, the vehicle running in the step-variable shifting state having a higher power transmitting efficiency η is more advantageous in terms of the fuel economy, but the vehicle running in the continuously-variable shifting state in which the fuel economy is high particularly in a low- and medium-speed running state is more advantageous in terms of the fuel economy for the engine per se. In view of this fact, the present embodiment is arranged to calculate the power transmitting efficiency ηcvt×system efficiency ηsysc in the continuously-variable shifting state, and the power transmitting efficiency ηu×system efficiency ηsysu in the step-variable shifting state, and to calculate the drive-wheel output Pwcvt in the continuously-variable shifting state and the drive-wheel output Pwu in the step-variable shifting state, on the basis of the engine output Pecvt in the continuously-variable shifting state and the engine output Peu in the step-variable shifting state, while taking account of the calculated running efficiency values ηt, in particular, the power transmitting efficiency values η, that is, while taking account of an influence of a difference of the running efficiency values ηt on the fuel economy. Thus, the fuel economy in the continuously-variable shifting state and the fuel economy in the step-variable shifting state are compared with each other.

The system efficiency ηsysc in the continuously-variable shifting state is obtained on the basis of efficiency values of the electric system such as charging and discharging efficiency values of the electric-energy storage device 60, efficiency of the electric wires and amount of electric energy consumption by the inverter 48, when the transmission mechanism 10 is operated as the electrically controlled continuously variable transmission, and on the basis of a power loss of the oil pump and amount of energy consumption by optional devices. The system efficiency ηsysu in the step-variable shifting state is obtained on the basis of the power loss of the oil pump and amount of energy consumption by the optional devices. In the present embodiment, however, those system efficiency values ηsysc and ηsysu are obtained by experimentation and stored in memory.

The fuel-economy curve selecting means 280, which is arranged to select the fuel maps to be used in the continuously-variable and step-variable shifting states, which are selected in the fuel-economy curve memory means 282, is further arranged to read in the engine output Pecvt in the continuously-variable shifting state and the engine output Peu in the step-variable shifting state, in the present vehicle condition, that is, at the present vehicle speed V, on the basis of the selected fuel-economy maps, for example, the fuel-economy maps illustrated in FIG. 64. In other words, the engine output values P are obtained according to the fuel-economy maps, for calculating the fuel consumption ratio values fs of the vehicle on the basis of the fuel consumption ratio values fe of the engine 8.

Power transmitting-efficiency calculating means 284 is arranged to calculate the fuel consumption ratio values fs in the continuously-variable and step-variable shifting states of the transmission mechanism 10, by calculating the running efficiency ηtcvt (power transmitting efficiency ηcvt×system efficiency ηsysc) in the continuously-variable shifting state, and the running efficiency ηtu (power transmitting efficiency ηu×system efficiency ηsysu) in the step-variable shifting state, as the values of efficiency of power transmission from the engine 8 to the drive wheels 38 in the continuously-variable and step-variable shifting states.

Figure 65:
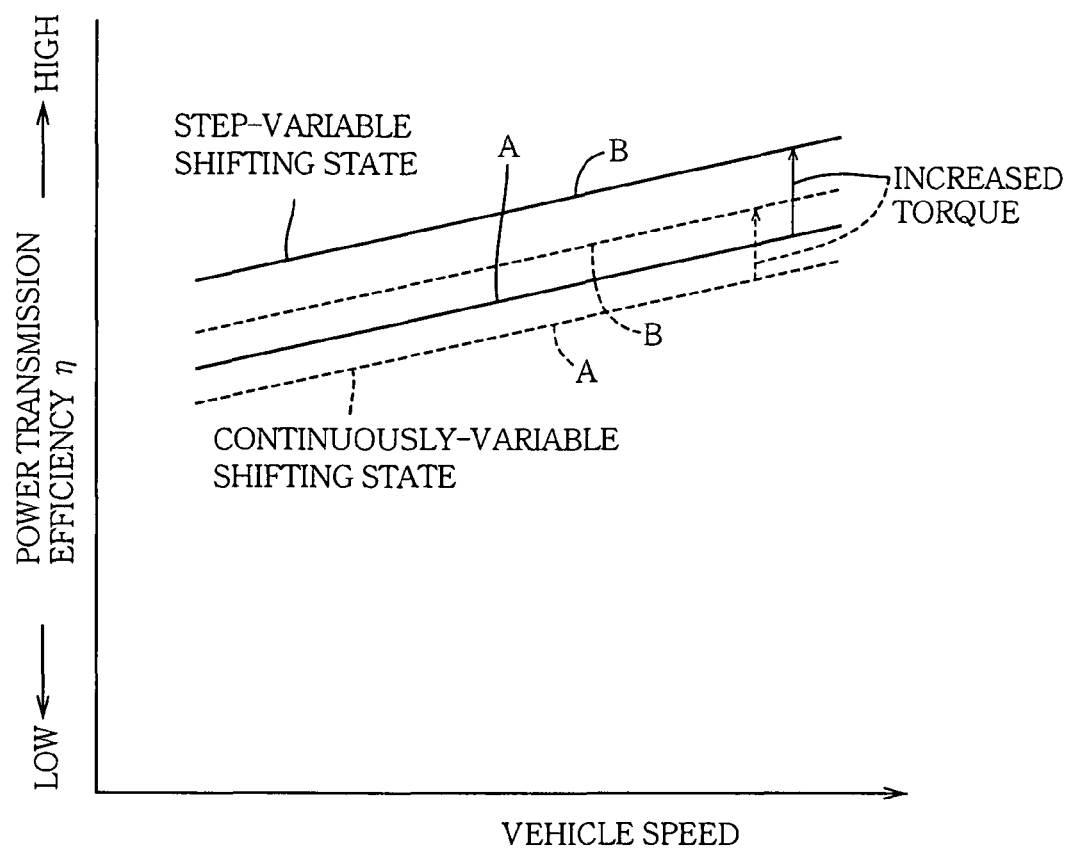
[FIG. 65] This figure is a view illustrating an example of power transmission efficiency values in the continuously-variable and step-variable shifting states, which change with the vehicle speed.

FIG. 65 indicates a stored relationship (map) for obtaining the power transmitting efficiency η on the basis of a drive-force-related value which relates to the vehicle speed V and the vehicle drive force. Broke line A indicates an example of the power transmitting efficiency η in the continuously-variable shifting state, which changes with the vehicle speed V, more precisely, which increases with an increase in the vehicle speed V, while solid line A indicates an example of the power transmitting efficiency η in the step-variable shifting state. Broken line B and solid line B indicate examples of the power transmitting efficiency values η when the drive-force-related value (e.g., output torque Tout) is increased with respect to that of the lines A. It will be understood from FIG. 65 that the power transmitting efficiency η changes with a change of the output torque Tout, that is, increases with an increase in the output torque. The power transmitting efficiency η increases with an increase in the vehicle speed and an increase in the output torque, because the power transmission loss decreases with an increase in the drive-wheel output Pw. Therefore, the power-transmitting-efficiency calculating means 284 calculates the power transmitting efficiency ηcvt in the continuously-variable shifting state and the power transmitting efficiency ηu in the step-variable shifting state, on the basis of the actual vehicle speed, for example, the vehicle speed V and the drive-force-related value, and according to the stored relationship described above. Generally, the power transmitting efficiency ηcvt in the continuously-variable shifting state is about 0.8, which is a power transmitting efficiency of an electrically controlled continuously variable transmission, including power transmitting efficiency values of the first electric motor M1 and the second electric motor M2, and which is determined by taking account of a power loss of an electric power transmitting path. On the other hand, the power transmitting efficiency ηu is about 0.92, which is a power transmitting efficiency of a step-variable transmission having a mechanical power transmitting path. In the present embodiment, those power transmitting efficiency values ηcvt and ηu are changed as a function of the vehicle condition, according to the stored relationship.

As previously described, the drive-force-related value indicated above is a parameter directly corresponding to the drive force of the vehicle, which may be the output torque $T_{OUT}$ of the automatic transmission portion 20, engine output torque Te or acceleration value of the vehicle, as well as the drive torque or drive force of drive wheels 38. The engine output torque Te may be an actual value calculated on the basis of the operating angle of the accelerator pedal or the opening angle of the throttle valve (or intake air quantity, air/fuel ratio or amount of fuel injection) and the engine speed $N_E$, or an estimated value of a required vehicle drive force which is calculated on the basis of the amount of operation of the accelerator pedal by the vehicle operator or the operating angle of the throttle valve. The increased toque indicated in FIG. 65 is obtained not only when the output torque Tout is increased, but also when any other drive-force-related value such as the operating angle of the accelerator pedal or the opening angle of the throttle valve is increased. The fuel injection amount, intake air quantity and intake negative pressure may also be considered as the torque-related parameters. The increased torque is also obtained when a resistance to running of the vehicle is relatively high, for example, when the vehicle is running on an uphill. The running resistance includes a rolling resistance, an air resistance and an acceleration resistance. The rolling resistance and air resistance relate to the vehicle speed, while the acceleration resistance relates to the above-described drive-force-related value. In this respect, the running resistance of the vehicle may be considered as the drive-force-related value.

Fuel-consumption-ratio calculating means 286 is arranged to calculate, from time to time, the fuel consumption ratios fs of the vehicle in the continuously-variable and step-variable shifting states. For instance, the fuel-consumption-ratio calculating means 286 calculates the fuel consumption ratio fscvt of the vehicle in the continuously-variable shifting state (fscvt=fuel consumption amount F/(engine output Pecvt× running efficiency ηtcvt in the continuously-variable shifting state), and the fuel consumption ratio fsu of the vehicle in the step-variable shifting state (fsu=fuel consumption amount F/(engine output Peu×running efficiency ηtu in the step-variable shifting state), on the basis of the engine output Pecvt and engine output Peu read by the highest-fuel-economy curve selecting means 280, the running efficiency ηtcvt and running efficiency ηtu calculated by the power-transmitting-efficiency calculating means 284, and the fuel consumption amount F detected by a fuel consumption sensor 290. Thus, the fuel-consumption-ratio calculating means 286 calculates the fuel consumption ratio fs of the vehicle on the basis of the vehicle condition in the form of the vehicle speed V and the drive-force-related value, for example.

Since the same fuel consumption amount F detected by the fuel consumption sensor 290 is used to calculate the fuel consumption ratio values fs in the continuously-variable and step-variable shifting states, the fuel-consumption-ratio calculating means 286 may calculate those fuel consumption ratio values fs, by using a stored constant value of the fuel consumption amount F. In this case, the calculated fuel consumption ratio values fs are not necessarily highly accurate and may be considered to be "values relating to the fuel consumption ratio", but it is advantageous in that the fuel consumption sensor 290 need not detect the fuel consumption amount F, or the provision of the sensor 290 is not necessary.

In this embodiment, the switching control means 50 places the transmission mechanism 10 selectively in one of the continuously-variable shifting state and the step-variable shifting state, depending upon the shifting state in which the fuel consumption ratio is lower. The switching control means 50 includes shifting-state fuel-economy determining means 288, which is arranged to determine one of the continuously-variable and step-variable shifting states in which the fuel consumption ratio is lower, that is, the fuel economy is higher. On the basis of a result of this determination, the switching control means 50 places the transmission mechanism 10 in one of the continuously-variable and step-variable shifting states. The shifting-state fuel-economy determining means 288 determines whether the fuel consumption ratio is lower (the fuel economy is higher) in the continuously-variable shifting state or in the step-variable shifting state, by comparing the fuel consumption ratio fscvt in the continuously-variable shifting state and the fuel consumption ration fsu in the step-variable shifting states, which have been calculated by the fuel-consumption-ratio calculating means 286.

Where the fuel-consumption-ratio calculating means 286 calculates the fuel consumption ratio values fs in the continuously-variable and step-variable shifting states, by using the constant value of the fuel consumption amount F of the vehicle, the shifting-state fuel-economy determining means 288 may compare the drive-wheel output Pwcvt in the continuously-variable shifting state and the drive-wheel output value Pwu in the step-variable shifting state, with each other, to determine the shifting state in which the fuel economy is higher. In this case, the fuel-consumption-ratio calculating means 286 is required to calculate only the drive-wheel output values Pwcvt and Pwu in the respective continuously-variable and step-variable shifting states, as the values relating to the fuel consumption ratio fs.

Figure 66:
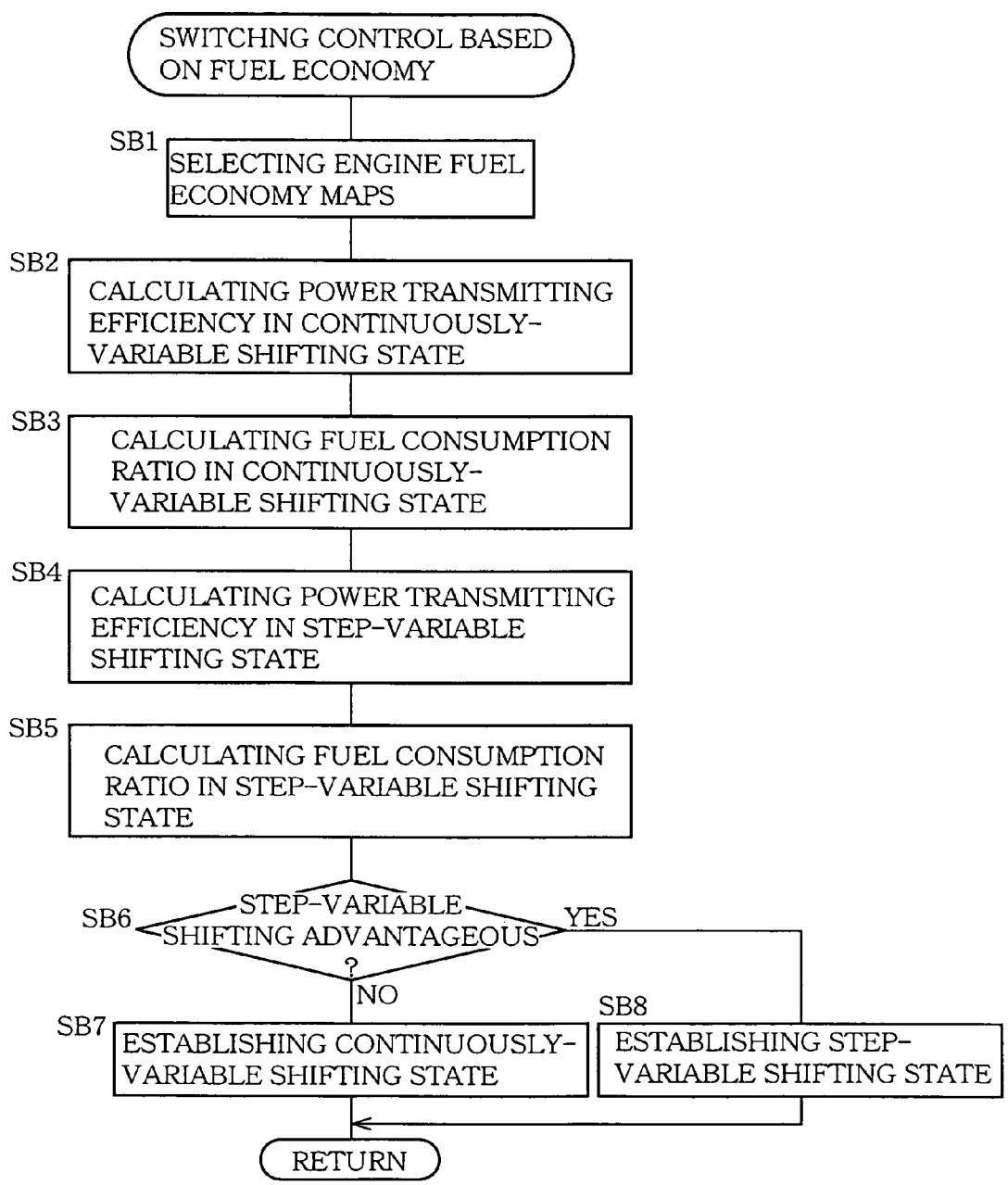
[FIG. 66] This figure is a flow chart illustrating a major control operation of the electronic control device in the embodiment of FIG. 63.

FIG. 66 is a flow chart illustrating one of major control operations of the electronic control device 40 in the present embodiment, that is, a switching control of the transmission mechanism 10 on the basis of the fuel economy of the vehicle. This switching control is repeatedly executed with an extremely short cycle time of about several milliseconds to several tens of milliseconds, for example.

Initially, step SB1 (hereinafter "step" being omitted) corresponding to the highest-fuel-economy curve selecting means 280 is implemented to select the fuel-economy maps of the engine 8 stored in the fuel-economy curve memory means 282, and read in the engine output Pecvt in the continuously-variable shifting state and the engine output Peu in the step-variable shifting state, on the basis of the vehicle condition in the form of the vehicle speed V, and according to the selected fuel-economy maps. The fuel-economy maps change with the internal and external factors of the engine 8, such as changes of the cooling water temperature and operating temperature of the engine, and the burning condition of the engine (air/fuel ratio indicative of a lean burn state, a stoichiometric state, etc.).

Then, SB2 corresponding to the power-transmitting-efficiency calculating means 284 is implemented to calculate the power transmitting efficiency ηcvt in the continuously-variable shifting state of the transmission mechanism 10, on the basis of the vehicle condition in the form of the actual vehicle speed V and drive-force-related value, and according to the stored relationship illustrated in FIG. 65 by way of example. Preferably, the running efficiency ηtcvt=power transmitting efficiency ηcvt×system efficiency ηsysc in the continuously-variable shifting state is calculated on the basis of the power transmitting efficiency ηcvt and the stored constant value of the system efficiency ηsysc. SB3 corresponding to the fuel-consumption-ratio calculating means 286 is then implemented to calculate the fuel consumption ratio fscvt=fuel consumption amount F/(engine output Pecvt×running efficiency ηtcvt) in the continuously-variable shifting state, on the basis of the engine output Pecvt read in SB1 and the running efficiency ηtcvt calculated in SB2.

Then, SB4 corresponding to the power-transmitting-efficiency calculating means 284 is implemented to calculate the power transmitting efficiency ηu in the step-variable shifting state of the transmission mechanism 10, on the basis of the vehicle condition in the form of the actual vehicle speed V and drive-force-related value, and according to the stored relationship illustrated in FIG. 65 by way of example. Preferably, the running efficiency ηtu=power transmitting efficiency ηu×system efficiency ηsysu in the step-variable shifting state is calculated on the basis of the power transmitting efficiency ηu and the stored constant value of the system efficiency ηsysu. SB5 corresponding to the fuel-consumption-ratio calculating means 286 is then implemented to calculate the fuel consumption ratio fsu=fuel consumption amount F/(engine output Peu×running efficiency ηtu) in the step-variable shifting state, on the basis of the engine output Peu read in SB1 and the running efficiency ηtu calculated in SB4.

SB6 corresponding to the shifting-state fuel-economy determining means 288 is then implemented to determine one of the continuously-variable and step-variable shifting states in which the fuel consumption ratio fs is lower (the fuel economy is higher). This determination is made by comparing the fuel consumption ratio fscvt in the continuously-variable shifting state calculated in SB3 and the fuel consumption ratio fsu in the step-variable shifting state calculated in SB5, with each other. Preferably, SB6 is formulated to determine whether the fuel economy is higher in the step-variable shifting state, that is, whether the operation to switch the transmission mechanism 10 to the step-variable shifting state is advantageous in terms of the fuel economy.

If a negative decision is obtained in SB6, that is, if it is determined in SB6 that the fuel economy is higher in the continuously-variable shifting state is higher, SB7 corresponding to the switching control means 50 is implemented to command the hydraulic control unit 42 to release the switching clutch C0 and switching brake B0, for thereby placing the transmission mechanism 10 in the continuously-variable shifting state. At the same time, the hybrid control means 52 is enabled to effect the hybrid control, while the step-variable shifting control means 54 is commanded to select and hold a predetermined one of the gear positions, or to permit an automatic shifting control according to the shifting boundary line map (shown in FIG. 12, for example) stored in the shifting-map memory means 56. In the continuously-variable shifting state, therefore, the shifting portion 11 of switchable type functions as the continuously variable transmission, and the automatic transmission portion 20 connected in series to the shifting portion 11 functions as the step-variable transmission, so that the drive system provides a sufficient vehicle drive force, such that the speed of the rotary motion transmitted to the automatic transmission portion 20 placed in one of the first-speed, second-speed, third-speed and fourth-gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable through the adjacent gear positions, whereby the overall speed ratio $\gamma T$ of the transmission mechanism 10 is continuously variable.

If an affirmative decision is obtained in SB6, that is, if it is determined in SB6 that the fuel economy is higher in the step-variable shifting state, SB8 corresponding to the switching control means 50 is implemented to disable the hybrid control means 52 to effect the hybrid control or continuously-variable shifting control, and enable the step-variable shifting control means 54 to effect the predetermined step-variable shifting control. In this case, the step-variable shifting control means 54 effects an automatic shifting control according to the shifting boundary line map (shown in FIG. 12, for example) stored the shifting-map memory means 56. FIG. 2 indicates the combinations of the operating states of the hydraulically operated frictional coupling devices C0, C1, C2, B0, B1, B2 and B3, which are selectively engaged for effecting the step-variable shifting control. In this step-variable automatic shifting control mode, the shifting portion 11 of switchable type functions as the auxiliary transmission having a fixed speed ratio $\gamma 0$ of 1, with the switching clutch C0 placed in the engaged state, when the drive system is placed in any one of the first-speed position through the fourth-speed position. When the drive system is placed in the fifth-speed position, the switching brake B0 is engaged in place of the switching clutch C0, so that the shifting portion 11 of switchable type functions as the auxiliary transmission having a fixed speed ratio $\gamma 0$ of about 0.7. In the step-variable automatic shifting control mode, therefore, the transmission mechanism 10 which includes the shifting portion 11 functioning as the auxiliary transmission, and the automatic transmission portion 20, functions as a so-called step-variable automatic transmission.

Thus, the transmission mechanism 10, which may function as an electrically controlled continuously variable transmission that is generally considered to have a high degree of fuel economy, is selectively placed in the continuously-variable or step-variable shifting state in which the fuel economy of the vehicle is higher. Accordingly, the fuel economy is further improved.

In the present embodiment described above, the transmission mechanism 10 of switchable type which is switchable between the continuously-variable shifting state in which the mechanism 10 is operable as an electrically controlled continuously-variable transmission and the step-variable shifting state in which the mechanism 10 is operable as a step-variable transmission, is controlled by the switching control means 50 (SB6, SB7, SB8), so as to be placed selectively in one of the continuously-variable shifting state and the step-variable shifting state, in which the fuel consumption ratio f is lower. Accordingly, the vehicle can be run with improved fuel economy.

The present embodiment is further arranged such that the fuel-consumption-ratio calculating means 286 (SB3, SB5) calculates, from time to time, the fuel consumption ratio values f on the basis of the vehicle condition such as the vehicle speed V and the drive-force-related value. That is, the fuel consumption ratio values f in the continuously-variable shifting state and the step-variable shifting state are calculated in a real-time fashion, to place the transmission mechanism 10 in one of the continuously-variable and step-variable shifting states in which the fuel economy is higher.

In the present embodiment, the fuel consumption ratio values f are calculated on the basis of the fuel consumption ratio fe of the engine 8 which is obtained according to the stored relationship illustrated in FIG. 64 by way of example. Accordingly, the fuel consumption ratio values fs of the vehicle are adequately calculated by the fuel-consumption-ratio calculating means 286.

The present embodiment is further arranged such that the fuel consumption ratio values f calculated on the basis of the vehicle condition are obtained by taking account of the efficiency $\eta$ of power transmission from the engine 8 to the drive wheels 38, which is calculated by the power-transmitting-efficiency calculating means 284 (SB2, SB4). Accordingly, the fuel consumption ratio values f are adequately calculated by the fuel-consumption-ratio calculating means 286.

The present embodiment is further arranged such that the fuel consumption ratio values f are adequately calculated by the fuel-consumption-ratio calculating means 286, on the basis of the power transmitting efficiency $\eta$ which changes with the running resistance of the vehicle, for example, with an increase in the vehicle load as in the vehicle running on an uphill.

The present embodiment is further arranged such that the fuel consumption ratio values f are adequately calculated by the fuel-consumption-ratio calculating means 286, on the basis of the power transmitting efficiency $\eta$ which changes with the vehicle speed V.

The present embodiment is further arranged such that the fuel consumption ratio values f are adequately calculated by the fuel-consumption-ratio calculating means 286, on the basis of the power transmitting efficiency $\eta$ which changes with the drive-force-related value of the vehicle.

Further, the present embodiment has an advantage that the power distributing mechanism 16 is simply constituted with a reduced dimension in its axial direction, by the first planetary gear set 24 of single-pinion type having three elements consisting of the first carrier CA1, first sun gear S1 and first ring gear R1. In addition, the power distributing mechanism 16 is provided with the hydraulically operated frictional coupling devices in the form of the switching clutch C0 operable to connect the first sun gear S1 and the first carrier CA1 to each other, and the switching brake B0 operable to fix the first sun gear S1 to the transmission casing 12. Accordingly, the transmission mechanism 10 is easily controlled by the switching control means 50, so as to be placed selectively in the continuously-variable shifting state and the step-variable shifting state.

The present embodiment is further arranged such that the automatic transmission portion 20 is disposed in series between the power distributing mechanism 16 and the drive wheels 38, and that the overall speed ratio of the transmission mechanism 10 is determined by a speed ratio of the power distributing mechanism 16, that is, a speed ratio of the shifting portion 11 of switchable type, and a speed ratio of the automatic transmission portion 20. Accordingly, the drive force is available over a wide range of speed ratio, by utilizing the speed ratio of the automatic transmission portion 20, so that the efficiency of operation of the shifting portion 11 of switchable type in its continuously-variable shifting state, that is, the efficiency of the hybrid control can be improved.

The present embodiment has a further advantage that the transmission mechanism 10 provides an overdrive gear position or the fifth-gear position having a speed ratio lower than 1, when the transmission mechanism 10 is placed in the step-variable shifting state in which the shifting portion 11 of switchable type functions as if it were a part of the automatic transmission portion 20.

The present embodiment has another advantage that the second electric motor M2 is connected to the power transmitting member, which is an input rotary member of the automatic transmission portion 20, so that the required input torque of the automatic transmission portion 20 can be made lower than the torque of its output shaft 22, making it possible to reduce the required size of the second electric motor M2.

Embodiment 21

Figure 67:
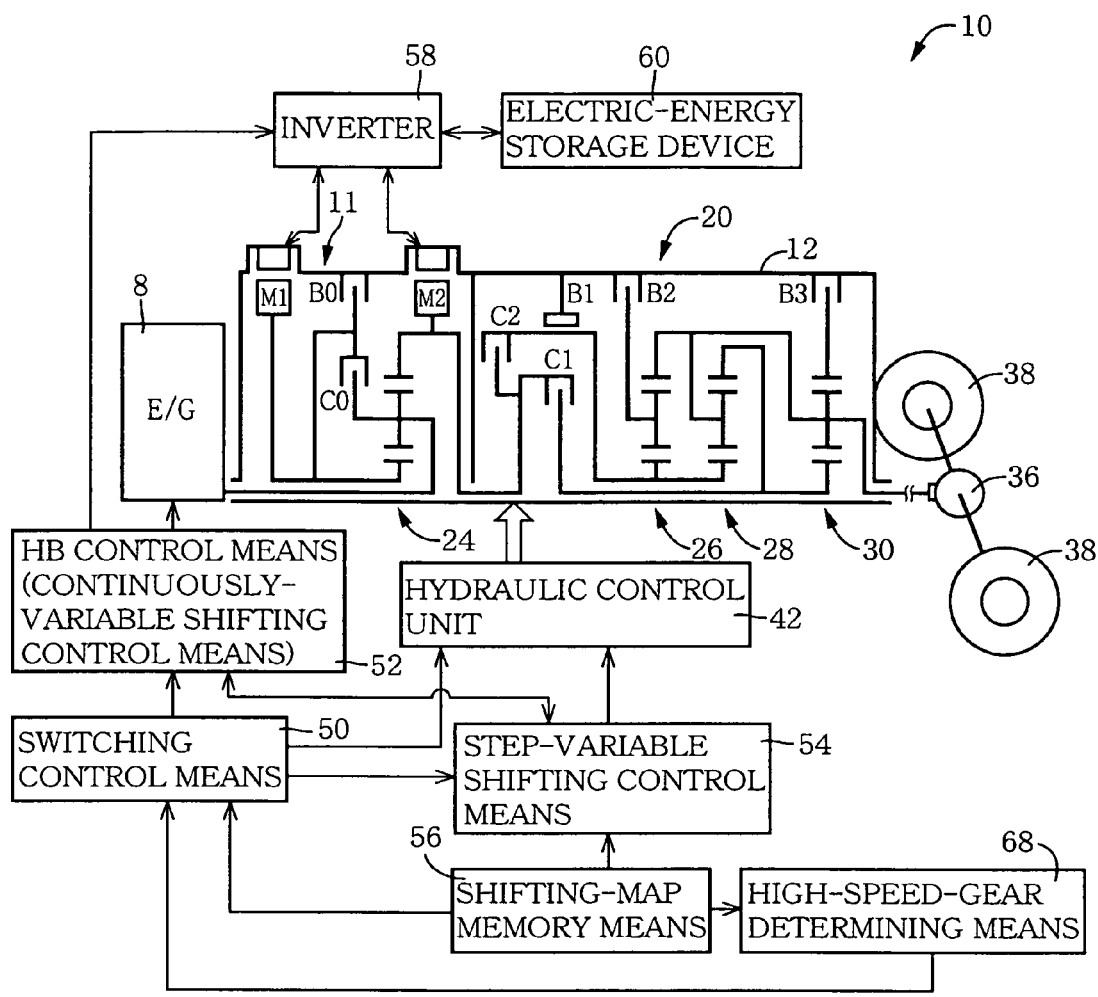
[FIG. 67] This figure is a functional block diagram for explaining major control functions performed by an electronic control device in another embodiment of the invention, which is a modification of the embodiment of FIG. 63.

FIG. 67 is a functional block diagram illustrating major control functions performed by the electronic control device 40 according to another embodiment of this invention, which is a modification of the embodiment of FIG. 63.

Figure 68:
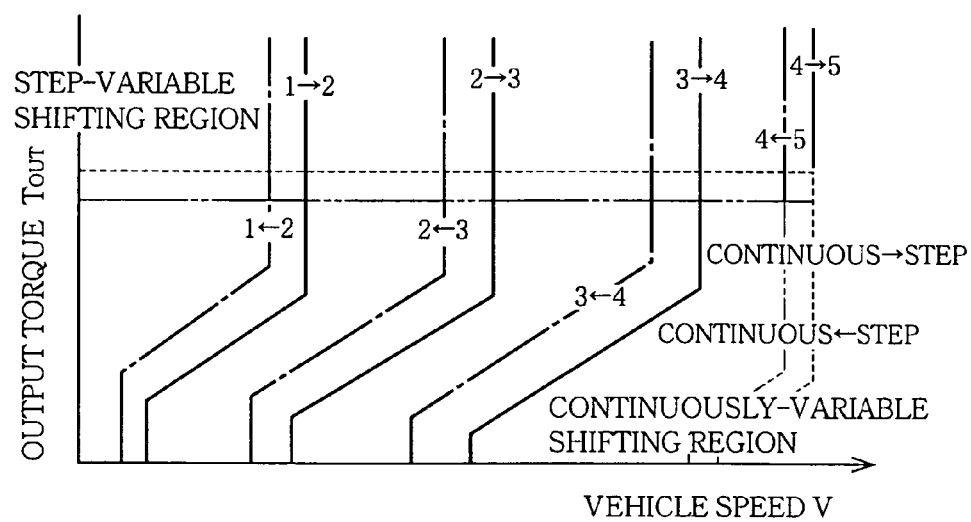
[FIG. 68] This figure is a view indicating a relationship used by switching control means in the embodiment of FIG. 67.

FIG. 68 shows an example of a shifting boundary line map (shifting map or relationship) which is stored in the shifting-map memory means 56 and which is used for determining whether the automatic transmission portion 20 should be shifted. The shifting boundary line map consists of shift boundary lines in a rectangular two-dimensional coordinate system using the vehicle speed V and the drive-force-related value in the form of the output torque Tout as control parameters. In FIG. 68, solid lines are shift-up boundary lines, and one-dot chain lines are shift-down boundary lines. The shifting boundary line map shown in FIG. 68 is similar to that shown in FIG. 12, but is different from that of FIG. 12 in that the continuously-variable shifting region in which the transmission mechanism 10 is placed in the continuously-variable shifting state and the step-variable shifting region in which the transmission mechanism 10 is placed in the step-variable shifting state are determined by considering which one of the fuel consumption ratio values fs in the continuously-variable and step-variable shifting states is lower.

Namely, FIG. 68 also shows an example of a stored switching boundary line map (switching map or relationship) which uses the vehicle speed V and the drive-force-related value in the form of the output torque Tout as the control parameters, and which is formulated to place the transmission mechanism 10 in one of the continuously-variable shifting state and the step-variable shifting state in which the fuel consumption ratio fs is lower. In FIG. 68, broken lines and one-dot chain lines that are offset with respect to the broken lines by a suitable amount of control hysteresis indicate boundary lines which define the continuously-variable and step-variable shifting regions and which are obtained by experimentation conducted to determine which one of the fuel consumption ratio values fs in the continuously-variable and step-variable shifting states of the transmission mechanism 10 is lower. Thus, FIG. 68 shows both the shifting map and the switching map in the same two-dimensional coordinate system, which are stored together in the shifting-map memory means 56. The shifting map and the switching map may be defined in respective different two-dimensional coordinate systems, and the switching map may be stored in memory means other than the shifting-map memory means 56, for example, in switching-map memory means not shown.

The switching control means 50 in the present embodiment is not arranged to determine the shifting state of the transmission mechanism on the basis of the fuel consumption ratio values f in the manner described above with respect to the preceding embodiment, but is arranged to place the transmission mechanism 10 selectively in one of the continuously-variable shifting state and the step-variable shifting state, on the basis of the present vehicle condition in the form of the actual vehicle speed V and output torque Tout, and according to the switching map shown in FIG. 68 by way of example, which is stored in the shifting-map memory means 56.

Thus, the transmission mechanism 10, which may function as an electrically controlled continuously variable transmission that is generally considered to have a high degree of fuel economy, is selectively placed in the continuously-variable or step-variable shifting state in which the fuel economy of the vehicle is higher. Accordingly, the fuel economy is further improved. Unlike the preceding embodiment arranged to calculate the fuel consumption ratio values f from time to time, the present embodiment permits an easy control of the transmission mechanism, resulting in a reduced control load of the electronic control device 40.

In the present embodiment described above, the transmission mechanism 10 is placed selectively in one of the continuously-variable and step-variable shifting states, on the basis of the vehicle condition in the form of the vehicle speed V and the output torque Tout, and according to the stored relationship shown in FIG. 68 which defines the shifting regions corresponding to the respective continuously-variable and step-variable shifting states such that the transmission mechanism 10 is placed in one of the continuously-variable and step-variable shifting states in which the fuel consumption ratio f is lower. Accordingly, the shifting state of the transmission mechanism 10 is easily selected so as to improve the fuel economy.

Embodiment 22

Figure 69:
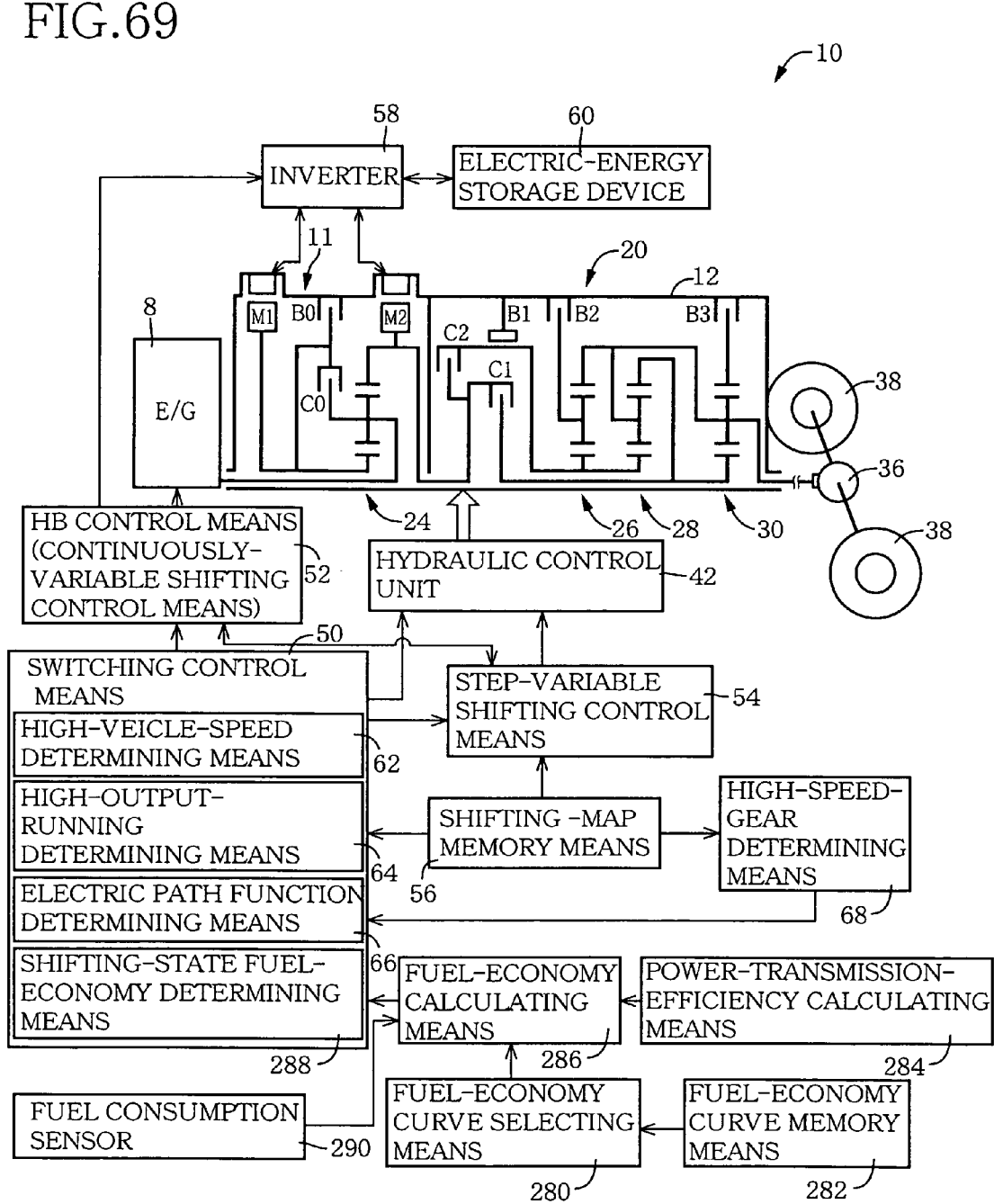
[FIG. 69] This figure is a functional block diagram for explaining major control functions performed by an electronic control device in another embodiment of the invention, which is another modification of the embodiment of FIG. 63.

FIG. 69 is a functional block diagram illustrating major control functions of the electronic control device 40 in another embodiment of this invention, which is another modification of the embodiment of FIG. 63.

As shown in FIG. 69, the switching control means 50 further includes high-speed-running determining means 62, high-output-running determining means 64 and electric-path-function diagnosing means 66. The switching control means 50 is arranged to place the transmission mechanism 10 in the step-variable shifting state, on the basis of the predetermined vehicle condition, but not on the basis of the fuel consumption ratio f used in the preceding embodiments.

The high-speed-running determining means 62 is arranged to determine whether the actual running speed V of the hybrid vehicle has reached a predetermined speed value V1, which is an upper limit value above which it is determined that the vehicle is in a high-speed running state. The high-output-running determining means 64 is arranged to determine whether a drive-force-related value such as the output torque Tout of the automatic transmission portion 20 relating to the vehicle drive force has reached a predetermined torque or drive-force value T1, which is an upper limit value above which it is determined that the vehicle is in a high-output running state. Namely, the high-output-running determining means 64 determines whether the vehicle is running with a high output, on the basis of a drive-force-related parameter which directly or indirectly represents the drive force with which the vehicle is driven. The electric-path-function diagnosing means 66 is arranged to determine whether the control components of the transmission mechanism 10 that are operable to establish the continuously-variable shifting state have a deteriorated function. This determination by the diagnosing means 66 is based on the functional deterioration of the components associated with the electric path through which an electric energy generated by the first electric motor M1 is converted into a mechanical energy. For example, the determination is made on the basis of a failure, or a functional deterioration or defect due to a failure or low temperature, of any one of the first electric motor M1, second electric motor M2, inverter 58, electric-energy storage device 60 and electric conductors connecting those components.

The upper vehicle-speed limit V1 is obtained by experimentation and stored in memory, to detect the high-speed running state of the vehicle in which the transmission mechanism 10 is switched to the step-variable shifting state, since the fuel economy in the high-speed running state is higher in the step-variable shifting state than in the continuously-variable shifting state, that is, to prevent a possibility of deterioration of the fuel economy if the transmission mechanism 10 were placed in the continuously-variable shifting state in the high-speed running of the vehicle. Thus, the transmission mechanism 10 is placed in the step-variable shifting state, not on the basis of the fuel consumption ratio value f used in the preceding embodiments, but on the basis of the actual vehicle speed as compared with the predetermined upper limit V1.

The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle. Namely, the upper output-torque limit T1 is determined to detect the high-output running state of the vehicle in which the transmission mechanism 10 should be switched to the step-variable shifting state, that is, to detect the high-output running state of the vehicle in which the transmission mechanism 10 should not be operated as an electrically controlled continuously variable transmission and in which the engine output is higher than a predetermined upper limit determined based on the nominal output of the electric motor. Thus, the transmission mechanism 10 is placed in the step-variable shifting state, not on the basis of the fuel consumption ratio value f used in the preceding embodiments, but on the basis of the actual output torque as compared with the predetermined upper limit T1.

The switching control means 50 determines that the vehicle state is in the step-variable shifting region, in any one of the following conditions or cases: where the high-speed-running determining means 62 has determined that the vehicle is in the high-speed running state; where the high-output-running determining means 64 has determined that the vehicle is in the high-output running state, that is, in the high-torque running state; and where the electric-path-function diagnosing means 66 has determined that the electric path function is deteriorated. In this case, the switching control means 50 determines that the vehicle is in the step-variable shifting region in which the transmission mechanism 10 should be switched to the step-variable shifting state, disables the hybrid control means 52 to operate, that is, inhibits the hybrid control means 52 from effecting the hybrid control or continuously-variable shifting control, and commands the step-variable shifting control means 54 to perform predetermined step-variable shifting control operations. Thus, the switching control means 50 places the transmission mechanism 10 in the step-variable shifting state, on the basis of the predetermined condition, and places the shifting portion 11 of switchable type in one of the two gear positions, so that the shifting portion 11 functions as an auxiliary transmission, while the automatic transmission portion 20 connected in series to the shifting portion 11 functions as a step-variable transmission, whereby the transmission mechanism 10 as a whole functions as a so-called step-variable automatic transmission.

The switching control means 50 may be arranged to select one of the switching clutch C0 and switching brake B0 which is to be engaged, such that the switching clutch C0 is engaged when the high-output-running determining means 64 has determined that the vehicle is in the high-output running state, while the switching brake B0 is engaged when the high-speed-running determining means 62 has determined that the vehicle is in the high-speed running state. However, the fifth-gear position is selected, the switching control means 50 determines that the switching brake B0 should be engaged, even when the vehicle is in the high-output running state.

Figure 70:
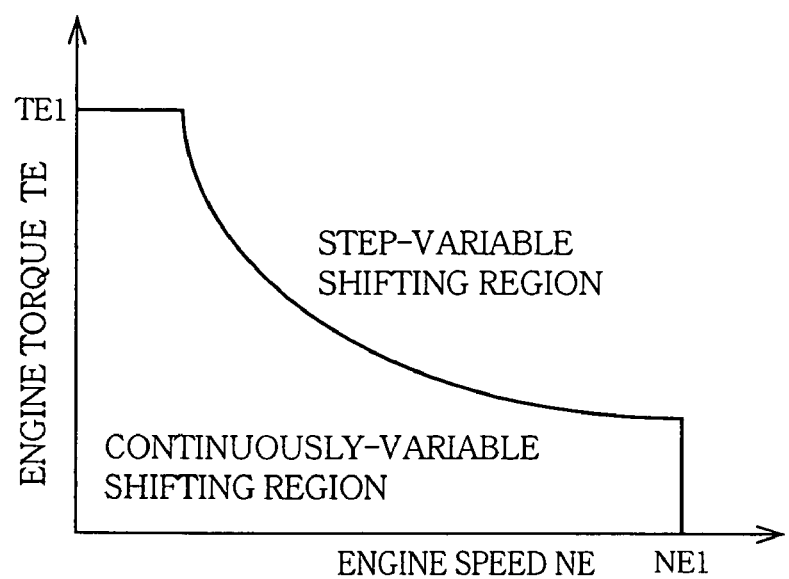
[FIG. 70] This figure is a view indicating a relationship used by switching control means in the embodiment of FIG. 69.

FIG. 70 shows a switching map stored in the shifting-map memory means 56, which is used to determine one of the continuously-variable shifting state and the step-variable shifting state, in which the fuel economy is higher than in the other shifting state. This switching map consists of boundary lines between the continuously-variable shifting region and the step-variable shifting region, which are defined in a rectangular two-dimensional coordinate system having an axis along which the engine speed NE is taken and an axis along which the engine torque TE is taken. The switching control means 50 may use this switching map of FIG. 70, in place of the predetermined conditions described above, to determine whether the transmission mechanism 10 should be switched to the step-variable shifting state, on the basis of the engine speed NE and engine torque TE. That is, the switching control means 50 may be arranged to determine whether the vehicle condition represented by the actual engine speed NE and engine torque TE is in the sep-variable shifting region, and to place the transmission mechanism 10 in the step-variable shifting region when the vehicle condition is in the step-variable shifting region, irrespective of the calculated fuel consumption ratio values.

That is, the relationship of FIG. 70 indicates a region corresponding to the regions in which the vehicle speed and output torque are not lower than the upper limit V1 and upper output torque limit T1, namely, a high-torque region in which the engine torque TE is not lower than a predetermined upper limit TE1, a high-speed region in which the engine speed NE is not lower than an upper limit NE1, or a high-output region in which the engine output represented by the engine torque TE and engine speed NE is not lower than a predetermined upper limit. This relationship is obtained by experimentation and stored in memory, to determine whether the transmission mechanism 10 should be switched to the step-variable shifting state, without relying on the fuel consumption ratio values f used in the preceding embodiments.

In the present embodiment described above, the switching control means 50 places the transmission mechanism 10 in the step-variable shifting state when the actual vehicle speed has exceeded the predetermined upper limit V1. Accordingly, while the actual vehicle speed V is higher than the upper limit V1 above which the vehicle is in the high-speed running state in which the fuel economy is higher in the step-variable shifting state of the transmission mechanism 10, the output of the engine is transmitted to the drive wheels primarily through the mechanical power transmitting path, so that the fuel economy of the vehicle is improved owing to reduction of a loss of conversion of the mechanical energy into the electric energy, which would take place when the transmission mechanism 10 is operated as the electrically controlled continuously variable transmission.

The present embodiment is further arranged such that the switching control means 50 places the transmission mechanism 10 in the step-variable shifting state when the actual output torque Tout has exceeded the upper limit T1. Accordingly, while the actual output torque Tout is higher than the upper limit T1 above which the vehicle is in the high-output running state in which engine output is higher than a predetermined upper limit determined based on the nominal rating of the first electric motor M1 and in which the transmission mechanism 10 should not be operated as an electrically controlled continuously variable transmission, the output of the engine 8 is transmitted to the drive wheels 38 primarily through the mechanical power transmitting path. Thus, the transmission mechanism 10 is operated as the electrically controlled continuously variable transmission only when the vehicle is in the low- or medium-output running state, so that the maximum amount of electric energy that must be generated by the first electric motor M1 can be reduced, whereby the required output capacity of the first electric motor M1 can be reduced, making it possible to minimize the required sizes of the first electric motor M1 and the second electric motor M2, and the required size of the drive system including those electric motors.

The present embodiment is further arranged such that the switching control means 50 places the transmission mechanism 10 in the step-variable shifting state, when it is determined that a predetermined diagnosing condition indicative of functional deterioration of the control components that are operable to place the transmission mechanism 10 in the electrically controlled continuously-variable shifting state is satisfied. Thus, the vehicle can be run with the transmission mechanism 10 operating in the step-variable shifting state, even when the transmission mechanism cannot be normally operated in the continuously-variable shifting state.

Embodiment 23

Figure 71:
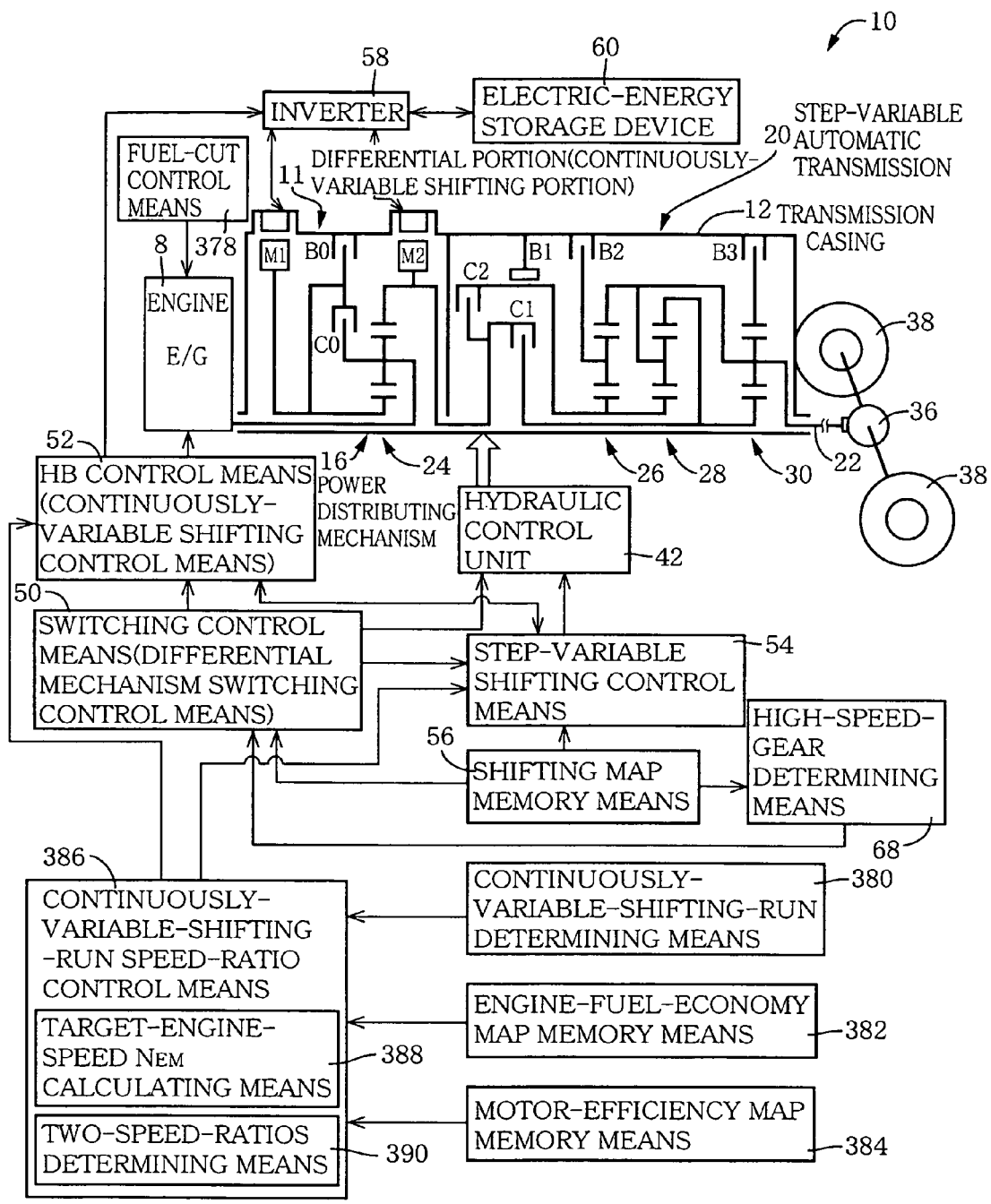
[FIG. 71] This figure is a functional block diagram for explaining major control functions performed by an electronic control device in another embodiment of the invention, which is another modification of the embodiment of FIG. 6.

FIG. 71 is a functional block diagram illustrating major control functions performed by the electronic control device 40 in another embodiment of this invention. In FIG. 71, the step-variable control means 54 is arranged to determine whether a shifting action of the step-variable shifting portion 20 should take place, that is, determine the gear position to which the step-variable shifting portion 20 should be shifted. This determination is made on the basis of the vehicle condition represented by the vehicle speed V and the output torque $T_{OUT}$ of the step-variable shifting portion 20, and according to a shifting boundary line map (shifting map) which is indicated by solid and one-dot chain lines in FIG. 12 and stored in the shifting-map memory means 56.

In the present embodiment, the hybrid control means 52 is arranged to control the engine 8 to be operated with high efficiency while the transmission mechanism 10 is placed in the continuously-variable shifting state, that is, while the differential portion 11 is placed in its differential state. The hybrid control means 52 is further arranged to control the speed ratio γ0 of the differential portion 11 operating as an electrically controlled continuously variable transmission, so as to establish an optimum proportion of the drive forces produced by the engine 8 and the second electric motor M2, and to optimize a reaction force generated during generation of an electric energy by the first electric motor M1. For instance, the hybrid control means 52 calculates the output as required by the vehicle operator at the present running speed of the vehicle, on the basis of an operating amount $A_{cc}$ of the accelerator pedal and the vehicle speed V, and calculate a required vehicle drive force on the basis of the calculated required output and a required amount of generation of the electric energy. On the basis of the calculated required vehicle drive force, the hybrid control means 52 calculates desired speed $N_E$ and total output of the engine 8, and controls the actual output of the engine 8 and the amount of generation of the electric energy by the first electric motor M1, according to the calculated desired speed and total output of the engine.

The hybrid control means 52 is arranged to effect the above-described hybrid control while taking account of the presently selected gear position of the step-variable shifting portion 20, so as to improve the fuel economy of the engine. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the step-variable shifting portion 20. That is, the hybrid control means 52 determines a target value of the overall speed ratio γT of the transmission mechanism 10, so that the engine 8 is operated according a stored highest-fuel-economy curve that satisfies both of the desired operating efficiency and the highest fuel economy of the engine 8. The hybrid control means 52 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control means 52 supplies the electric energy generated by the first electric motor M1, to the electric-energy storage device 60 and second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, or subsequently consumed by the first electric motor M1. A drive force produced by an operation of the second electric motor M1 or first electric motor M1 with the electric energy is transmitted to the power transmitting member 18. Thus, the drive system is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2. It is also noted that the hybrid control means 52 is further arranged to establish a motor drive mode in which the vehicle is driven with only the electric motor (e.g., second electric motor M2) used as the drive power source, by utilizing the electric CVT function (differential function) of the differential shifting portion 11, irrespective of whether the engine 8 is in the non-operated state or in the idling state. The hybrid control means 52 can establish the motor drive mode by operation of the first electric motor M1 and/or the second electric motor M2, even when the differential portion 11 is placed in the step-variable shifting state (fixed-speed-ratio shifting state) while the engine 8 is in its non-operated state.

The hybrid control means 52 is also arranged to effect a regenerative braking control to adjust an amount of generation of an electric energy by the electric motor M1 and/or electric motor M2, on the basis of the vehicle speed and/or an amount of operation of a braking device, during deceleration or braking of the vehicle. In this regenerative braking control, the electric energy generated by the electric motor M1 and/or electric motor M2 is stored in the electric energy-storage device 50 through the inverter 58.

FIG. 54 shows an example of a stored relationship, namely, a boundary line p) which defines an engine drive region and a motor drive region and which is used to select one of the engine 8 and the electric motors M1, M2, as the drive power source (one of the engine drive mode and the motor drive mode). That is, the stored relationship is represented by a drive-power-source switching boundary line map (drive-power-source map) in a rectangular two-dimensional coordinate system using the vehicle speed V and the drive-force-related value in the form of the output torque $T_{OUT}$ as control parameters. FIG. 54 also shows a one-dot chain line which is located inside the solid boundary line, by a suitable amount of control hysteresis. For example, the drive-power-source switching boundary line map shown in FIG. 54 is stored in the shifting-map memory means 56. As is apparent from FIG. 54, the hybrid control means 52 selects the motor drive mode when the output torque $T_{OUT}$ is comparatively small, or when the vehicle speed is comparatively low, that is, when the vehicle load is in a comparatively low range in which the operating efficiency of the engine is generally lower than in a comparatively high range.

For reducing a tendency of dragging of the engine 8 held in its non-operated state with a fuel-cut control in the motor drive mode, for thereby improving the fuel economy, the hybrid control means 52 controls the differential portion 11 so that the engine speed $N_E$ is held substantially zero, that is, held zero or close to zero, owing to the differential function of the differential portion 11. Where the vehicle is run with the output torque of the second electric motor M2, for example, the first electric motor M1 is freely rotated in the negative direction so that the engine speed $N_E$ (rotating speed of the first carrier CA1) is held substantially zero while the second electric motor M2 is operated at a speed corresponding to the vehicle speed V.

The high-speed-gear determining means 68 is arranged to determine whether the gear position which is selected on the basis of the vehicle condition and according to the shifting boundary line map shown in FIG. 12 and stored in the shifting-map memory means 56 and to which the drive transmission mechanism 10 should be shifted is the high-speed-gear position, for example, the fifth-gear position. This determination by the high-speed-gear determining means 68 is made to determine which one of the switching clutch C0 and brake B0 should be engaged to place the transmission mechanism 10 in the step-variable shifting state.

The switching control means 50 is arranged to place the transmission mechanism 10 selectively one of the continuously-variable shifting state and the step-variable shifting state, by determining whether the vehicle condition represented by the vehicle speed V and the output torque $T_{OUT}$ is in the continuously-variable shifting region in which the transmission mechanism 10 should be placed in the continuously-variable shifting state, or in the step-variable shifting state in which the transmission mechanism 10 should be placed in the step-variable shifting state. This determination is made according to the switching boundary line map (switching map or relationship indicated by broken and two-dot chain lines in FIG. 12, which map is stored in the shifting-map memory means 56.

When the switching control means 50 determines that the vehicle condition is in the continuously-variable shifting region, the switching control means 50 disables the hybrid control means 52 effect a hybrid control or continuously-variable shifting control, and enables step-variable shifting control means 54 to effect a predetermined step-variable shifting control. In this case, the step-variable shifting control means 54 effects an automatic shifting control according to the shifting boundary line map shown in FIG. 12 and stored in shifting-map memory means 56. FIG. 2 indicates the combinations of the operating states of the hydraulically operated frictional coupling devices C0, C1, C2, B0, B1, B2 and B3, which are selectively engaged for effecting the step-variable shifting control. In this automatic step-variable shifting control mode, the transmission mechanism 10 as a whole consisting of the differential portion 11 and the step-variable shifting portion 20 functions as a so-called "step-variable automatic transmission", the gear positions of which are established according to the table of engagement of the frictional coupling devices shown in FIG. 2.

When the high-speed-gear determining means 68 determines that the fifth-gear position should be established as the high-gear position, the switching control means 50 commands the hydraulic control unit 42 to release the switching clutch C0 and engage the switch brake B0, so that the differential portion 11 functions as an auxiliary transmission having a fixed speed ratio γ0, for example, a speed ratio γ0 of 0.7, whereby the transmission mechanism 10 as a whole is placed in a so-called "overdrive gear position" having a speed ratio lower than 1.0. When the high-speed-gear determining means 68 determines that a gear position other than the fifth-gear position should be established, the switching control means 50 commands the hydraulic control unit 42 to engage the switching clutch C0 and release the switching brake B0, so that the differential portion 11 functions as an auxiliary transmission having a fixed speed ratio γ0, for example, a speed ratio γ0 of 1, whereby the transmission mechanism 10 as a whole is placed in a low-gear position the speed ratio of which is not lower than 1.0. Thus, the transmission mechanism 10 is switched to the step-variable shifting state, by the switching control means 50, and the differential portion 11 placed in the step-variable shifting state is selectively placed in one of the two gear positions, so that the differential portion 11 functions as the auxiliary transmission, while at the same time the step-variable shifting portion 20 connected in series to the differential portion 11 functions as the step-variable transmission, whereby the transmission mechanism 10 as a whole functions as a so-called "step-variable automatic transmission portion".

When the switching control means 50 determines that the vehicle condition is in the continuously-variable shifting region for placing the transmission mechanism 10 in the continuously-variable shifting state, on the other hand, the switching control means 50 commands the hydraulic control unit 42 to release the switching clutch C0 and the switching brake B0 for placing the differential portion 11 in the continuously-variable shifting state, so that the transmission mechanism 10 as a whole is placed in the continuously-variable shifting state. At the same time, the switching control means 50 enables the hybrid control means 52 to effect the hybrid control, and commands the step-variable shifting control means 54 to select and hold a predetermined one of the gear positions, or to permit an automatic shifting control according to the step-variable-shifting control map of FIG. 12 stored in the shifting-map memory means 56. In the latter case, the variable-step shifting control means 54 effects the automatic shifting control by suitably selecting the combinations of the operating states of the frictional coupling devices indicated in the table of FIG. 2, except the combinations including the engagement of the switching clutch C0 and brake B0. Thus, the differential portion 11 placed in the continuously-variable shifting state under the control of the switching control means 50 functions as the continuously variable transmission while the step-variable shifting portion 20 connected in series to the differential portion 11 functions as the step-variable transmission, so that the drive system provides a sufficient vehicle drive force, such that the speed of the rotary motion transmitted to the step-variable shifting portion 20 placed in one of the first-speed, second-speed, third-speed and fourth-gear positions, namely, the rotating speed of the power transmitting member 18 is continuously changed, so that the speed ratio of the drive system when the step-variable shifting portion 20 is placed in one of those gear positions is continuously variable over a predetermined range. Accordingly, the speed ratio of the step-variable shifting portion 20 is continuously variable through the adjacent gear positions, whereby the overall speed ratio γT of the transmission mechanism 10 as a whole is continuously variable.

The control maps shown in FIG. 12 will be described in detail. Solid lines in FIG. 12 are shift-up boundary lines, while one-dot chain lines are shift-down boundary lines. Broken lines in FIG. 12 indicate an upper vehicle-speed limit V1 and an upper output-torque limit T1 which are used to determine whether the vehicle condition is in the step-variable shifting region or the continuously-variable shifting region. That is, the broke lines in FIG. 12 are a predetermined upper vehicle-speed limit line consisting of a series of upper speed limits V1 for determining whether the hybrid vehicle is in the high-speed running state, and a predetermined upper output limit line consisting of a series of upper output limits in the form of upper limits T1 of the output torque $T_{OUT}$ of the step-variable shifting portion 20 as a drive-force-related value for determining whether the hybrid vehicle is in the high-output running state. Two-dot chain lines also shown in FIG. 12 are limit lines which are offset with respect the broken lines, by a suitable amount of control hysteresis, so that the broken lines and the two-dot chain lines are selectively used as the boundary lines defining the step-variable shifting region and the continuously-variable shifting region. These boundary lines of FIG. 12 are stored switching boundary line maps (switching maps or relationships) each of which includes the upper vehicle-speed limit V1 and the upper output torque limit T1 and is used by the switching control means 50 to determine whether the vehicle condition is in the step-variable shifting region or continuously-variable shifting region, on the basis of the vehicle speed V and the output torque $T_{OUT}$. These switching boundary line maps may be included in the shifting maps stored in the shifting-map memory means 56. The switching boundary line maps may include at least one of the upper vehicle-speed limit V1 and the upper output-torque limit T1, and may use only one of the vehicle speed V and the output torque $T_{OUT}$ as a control parameter. The shifting boundary line maps, switching boundary line maps, etc. described above may be replaced by equations for comparison of the actual value of the vehicle speed V with the upper vehicle-speed limit V1, and equations for comparison of the actual value of the output torque $T_{OUT}$ with the upper output-torque limit T1.

The upper vehicle-speed limit V1 is determined so that the transmission mechanism 10 is placed in the step-variable shifting state while the vehicle speed V is higher than the upper limit V1. This determination is effective to minimize a possibility of deterioration of the fuel economy of the vehicle if the transmission mechanism 10 were placed in the continuously-variable shifting state at a relatively high running speed of the vehicle. The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

FIG. 8 shows a switching boundary line map (switching map or relationship) which is stored in the shifting-map memory means 56 and which has switching boundary lines in the form of engine output lines defining a step-variable shifting region and a continuously-variable shifting region one of which is selected by the switching control means 50 on the basis of parameters consisting of the engine speed $N_E$ and engine torque $T_E$. The switching control means 50 may use the switching boundary line map of FIG. 8 in place of the switching boundary line map of FIG. 12, to determine whether the vehicle condition represented by the engine speed $N_E$ and engine torque $T_E$ is in the continuously-variable shifting region or in the step-variable shifting region. The broken lines in FIG. 12 can be generated on the basis of the switching boundary line map of FIG. 8. In other words, the broken lines of FIG. 12 are switching boundary lines which are defined on the basis of the relationship (map) of FIG. 8, in the rectangular two-dimensional coordinate system having parameters consisting of the vehicle speed V and the output torque $T_{OUT}$.

As shown in FIG. 12, the step-variable shifting region is set to be a high output-torque region in which the output torque $T_{OUT}$ is not lower than the upper output-torque limit T1, and a high vehicle-speed region in which the vehicle speed V is not lower than the upper vehicle-speed limit V1. Accordingly, the step-variable shifting control is effected when the vehicle is in a high-output running state with a comparatively high output of the engine 8 or when the vehicle is in a high-speed running state, while the continuously-variable shifting control is effected when the vehicle is in a low-output running state with a comparatively low output of the engine 8 or when the vehicle is in a low-speed running state, that is, when the engine 8 is in a normal output state. Similarly, the step-variable shifting region indicated in FIG. 8 is set to be a high-torque region in which the engine output torque $T_E$ is not lower than a predetermined value $T_{E1}$, a high-speed region in which the engine speed $N_E$ is not lower than a predetermined value $N_{E1}$, or a high-output region in which the engine output determined by the output torque $T_E$ and speed $N_E$ of the engine 8 is not lower than a predetermined value. Accordingly, the step-variable shifting control is effected when the torque, speed or output of the engine 8 is comparatively high, while the continuously-variable shifting control is effected when the torque, speed or output of the engine is comparatively low, that is, when the engine is in a normal output state. The switching boundary lines in FIG. 8, which defines the step-variable shifting region and the continuously-variable shifting region, function as an upper vehicle-speed limit line consisting of a series of upper vehicle-speed limits, and an upper output limit line consisting of a series of upper output limits.

Therefore, when the vehicle is in a low- or medium-speed running state or in a low- or medium-output running state, the transmission mechanism 10 is placed in the continuously-variable shifting state, assuring a high degree of fuel economy of the vehicle. When the vehicle is in a high-speed running state with the vehicle speed V exceeding the upper vehicle-speed limit V1, on the other hand, the transmission mechanism 10 is placed in the step-variable shifting in which the transmission mechanism 10 is operated as a step-variable transmission, and the output of the engine 8 is transmitted to the drive wheels 38 primarily through the mechanical power transmitting path, so that the fuel economy is improved owing to reduction of a loss of conversion of the mechanical energy into the electric energy, which would take place when the transmission mechanism 10 is operated as an electrically controlled continuously variable transmission. When the vehicle is in a high-output running state in which the drive-force-related value in the form of the output torque $T_{OUT}$ exceeds the upper output-torque limit T1, the transmission mechanism 10 is also placed in the step-variable shifting state. Therefore, the transmission mechanism 10 is placed in the continuously-variable shifting state or operated as the electrically controlled continuously variable transmission, only when the vehicle speed is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1, and the required size of the drive system including the electric motor. In other words, the transmission mechanism 10 is switched from the continuously-variable shifting state to the step-variable shifting state (fixed-speed-ratio shifting state) in the high-output running state of the vehicle in which the vehicle operator desires an increase of the vehicle drive force, rather than an improvement in the fuel economy. Accordingly, the vehicle operator is satisfied with a change of the engine speed $N_E$ as a result of a shift-up action of the automatic transmission portion in the step-variable shifting state, that is, a comfortable rhythmic change of the engine speed $N_E$, as indicated in FIG. 10.

Referring back to FIG. 71, fuel-cut control means 378 is arranged to cut a fuel supply to the engine8 when a predetermined fuel-cut condition is satisfied, for example, when a decelerating run of the vehicle is continued for more than a predetermined time with a required drive-force-related value being zero. The required drive-force-related value may be the operating angle Acc of the accelerator pedal, the opening angle $\theta_{th}$ of the throttle valve or the amount of fuel injection during running of the vehicle.

Figure 72:
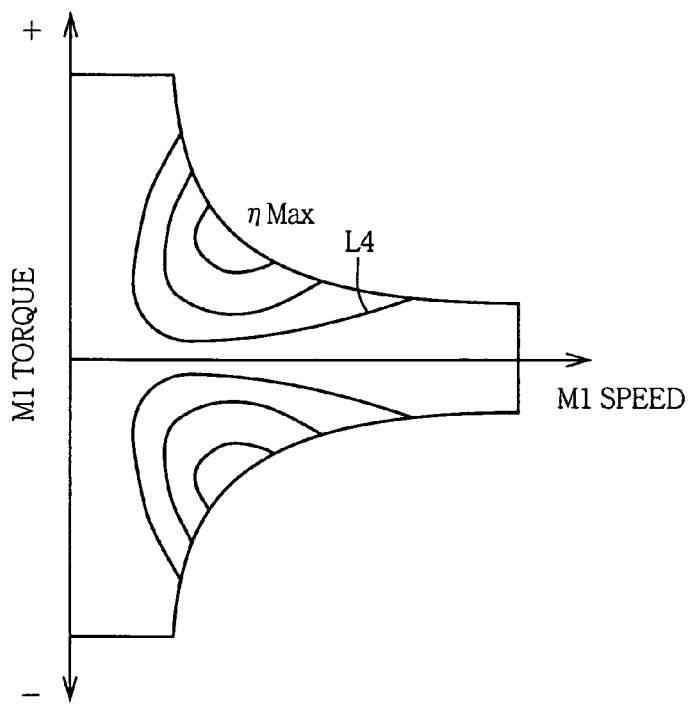
[FIG. 72] This figure is a view illustrating one example of a stored optimum-fuel-economy map used to calculate efficiency ηM1 of a first electric motor M1, which is used to calculate an amount of fuel consumption of the vehicle.
Figure 73:
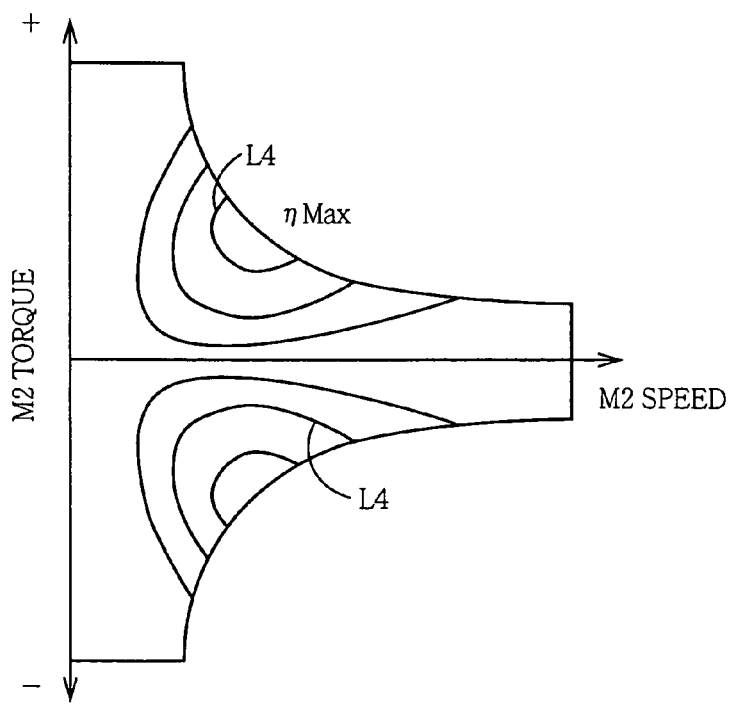
[FIG. 73] This figure is a view illustrating one example of a stored optimum-fuel-economy map used to calculate efficiency ηM2 of a second electric motor M2, which is used to calculate the amount of fuel consumption of the vehicle.

Step-variable-shifting-run determining means 380 is arranged to determine whether the vehicle is in a step-variable-shifting run. This determination may be made on the basis of an output of the switching control means 50. or an output of the switch 44 provided to select the step-variable shifting state. Engine-fuel-economy map memory means 382 stores the engine fuel-economy map shown in FIG. 61 by way of example. This engine-fuel-economy map is a relationship which is obtained by experimentation and which is defined in a two-dimensional coordinate system having an engine-speed axis AX1 and an engine-output-torque axis AX2. The engine-fuel-economy map includes iso-fuel-economy curves L1 like contour lines indicated by solid lines, a highest fuel-economy curve L2 indicated by broke line, and iso-horsepower lines L3 indicated by one-dot chain lines. One of the adjacent highest-fuel-economy curves L2 which is located inside the other indicates a higher fuel economy, and each of the iso-horsepower curves L3 indicates an increase of the horsepower with an increase of the engine speed. Motor-efficiency map memory means 384 stores an efficiency map of the first electric motor M1 shown in FIG. 72 by way of example, and an efficiency map of the second electric motor shown in FIG. 73 by way of example. These efficiency maps of the first and second electric motors M1, M2 are defined a two-dimensional coordinate system having an axis of the speed and an axis of the output torque, and have efficiency curves L4 in the form of contour lines indicated by solid lines. One of the adjacent efficiency curves L4 which is located inside the other indicates a higher efficiency.

Continuously-variable-shifting-run speed-ratio control means (hereinafter referred to as "speed-ratio control means") 386 is arranged to control the speed ratio γ of the step-variable shifting portion 20 and the speed ratio γ0 of the differential portion (continuously variable transmission portion) 11, so as to maximize the fuel economy, on the basis of the operating efficiency ηM1 of the first electric motor M1 and the operating efficiency ηM2 of the second electric motor M2, when it is determined that the continuously-variable shifting portion in the form of the differential portion (continuously-variable shifting portion) 11 is in the continuously-variable shifting state. For instance, the speed-ratio control means 161 adjusts the speed ratio γ of the step-variable shifting portion 20 to thereby change the speed ratio γ0 of the differential portion (continuously-variable shifting portion) 11, so as to reduce the output shaft speed (input shaft speed of the step-variable shifting portion 20) $N_{IN}$ of the differential portion 11, for the purpose of preventing reverse rotation of the first electric motor M1 even in a steady-state running state of the vehicle at a comparatively high speed.

The speed-ratio control means 386 includes target-engine-speed calculating means 388 for determining a target speed $N_{EM}$ of the engine 8 on the basis of the actual operating angle $A_{CC}$ of the accelerator pedal and according to the engine-fuel-economy map shown in FIG. 61, which is stored in the engine-fuel-economy memory means 382. The speed-ratio control means 386 further includes two-speed-rations determining means 390 for determining, on the basis of the actual vehicle speed V, the speed ratio γ of the step-variable shifting portion 20 and the speed ratio γ0 of the differential portion (continuously-variable shifting portion) 11, which speed ratios give the target engine speed $N_{EM}$.

The target-engine-speed calculating means 388 is arranged to select, according to a well-known relationship, one of iso-horsepower curves L3a (shown in FIG. 61) which corresponds to the output of the engine 8, on the basis of the actual operating angle $A_{CC}$ of the accelerator pedal representative of the vehicle drive force as required by the vehicle operator. The target-engine-speed calculating means 388 determines, as the target engine speed $N_{EM}$, the engine speed corresponding to a point Ca of intersection between the selected iso-horsepower curve L3a and the highest-fuel-economy curve L2, as indicated in FIG. 61.

The two-speed-ratios determining means 390 is arranged to determine the overall speed ratio γT of the transmission mechanism 10 that gives the target engine speed $N_{EM}$, on the basis of the target engine speed $N_{EM}$ and the actual vehicle speed V, and according to the equation (1), for example. A relationship between the rotating speed $N_{OUT}$ (rpm) of the output shaft 22 of the step-variable shifting portion 20 and the vehicle speed V (km/h) is represented by the equation (2), wherein the speed ratio of the final speed reducer 36 is represented by γf, and the radius of the drive wheels 38 is represented by r. Then, the speed-ratio control means two-speed-ratios determining means 390 determines, according to the equations (1), (2), (3) and (4), the speed ratio γ of the step-variable shifting portion 20 and the speed ratio γ0 of the differential portion (continuously-variable shifting portion) 11, which give the overall speed ratio γT (=γ×γ0) of the transmission mechanism 10 and which maximize the overall power transmitting efficiency of the transmission mechanism 10.

The speed ratio γ0 of the differential portion (continuously-variable shifting portion) 11 varies from zero to 1. Initially, therefore, a plurality of candidate speed ratio values γa, γb, etc. of the step-variable shifting portion 20 that give the engine speed $N_E$ higher than the target engine speed $N_{EM}$ when the speed ratio γ0 is assumed to be 1 are obtained on the basis of the actual vehicle speed V and according to the relationships between the engine speed $N_E$ and the vehicle speed V as represented by the equations (1) and (2). Then, fuel consumption amounts Mfce corresponding to the candidate speed ratio values γa, γb, etc. are calculated on the basis of the overall speed ratio γT that give the target engine speed $N_{EM}$, and the candidate speed ratio values γa, γb, etc., and according to the equation (3), for example. One of the candidate speed ratio values which corresponds to the smallest one of the calculated fuel consumption values Mfce is determined as the speed ratio γ of the step-variable shifting portion 20. The speed ratio γ0 of the differential portion (continuously-variable shifting portion) 11 is determined on the basis of the determined speed ratio γ and the overall speed ratio γT that gives the target engine speed $N_{EM}$.

In the equation (3), Fce, PL, ηele, ηCVT, k1, k2 and ηgi represent the following: Fce=fuel consumption ratio; PL=instantaneous required drive force; ηele=efficiency of the electric system; ηCVT=power transmitting efficiency of the differential portion 11; ki=power transmitting ratio of the electric path of the differential portion 11; k2=power transmitting ratio of the mechanical path of the differential portion 11; and ηgi=power transmitting efficiency of the step-variable shifting transmission portion. Efficiency ηM1 of the first electric motor ηM1 and efficiency M2 of the second electric motor M2 in the equation (3) are obtained according to the relationships of FIGS. 72 and 73, on the basis of the rotating speeds which give the overall speed ratio γT of the differential portion 11 to obtain the target engine speed $N_{EM}$ for each of the candidate speed ratio values γa, γb, etc. and which correspond to candidate speed ratio values γ0a, γ0b, etc. of the differential portion 11, and on the basis of the output torque values of the electric motors required to generate the required vehicle drive force. The ratio k1 is usually about 0.1, while the ratio k2 is usually about 0.9. However, the ratios k1 and k2 vary as a function of the required vehicle output. The power transmitting efficiency ηgi of the step-variable shifting portion 20 is determined as a function of a transmitted torque Ti (which varies with the selected gear position i), a rotating speed Ni of the rotating member, and an oil temperature H. For convenience' sake, the fuel consumption ratio Fce, instantaneous required drive force PL, efficiency ηele of the electric system and power transmitting efficiency ηCVT of the differential portion 11 are held constant. Further, The power transmitting efficiency ηgi of the step-variable shifting portion 20 may be held constant, as long as the use of a constant value as the efficiency ηgi does not cause an adverse influence.

The speed-ratio control means 386 commands the step-variable shifting control means 54 and the hybrid control means 52 to perform the respective step-variable shifting and hybrid control functions, so as to establish the determined speed ratio γ of the step-variable shifting portion 20 and the determined speed ratio γ0 of the differential portion 11.

Figure 74:
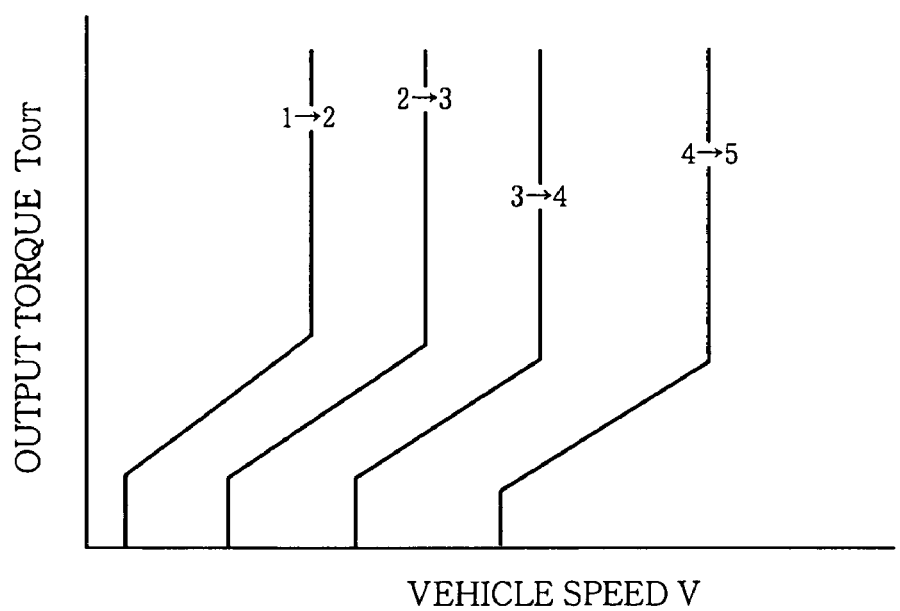
[FIG. 74] This figure is a view indicating a shifting map used in the step-variable shifting state when the differential portion (continuously-variable shifting portion) is not placed in the continuously-variable shifting state.

When the continuously-variable-shifting-run determining means 380 has determined that the differential portion is not in the continuously-variable shifting state, that is, is in the step-variable shifting state, however, the speed-ratio control means 386 commands the step-variable shifting control means 54 to effect the step-variable shifting control, according to the shifting boundary line map which is stored in the shifting-map memory means 56 and which is shown in FIG. 74 by way of example. According to this shifting boundary line map shown in FIG. 74, the shifting boundary lines are determined such that the operating point of the engine is close to a highest fuel-economy point, namely, such that the engine speed $N_E$ is close to the above-described target engine speed $N_{EM}$. Accordingly, the shifting boundary lines of FIG. 74 are determined such that the step-variable shifting portion 20 is shifted up at lower vehicle speeds, than according to the shifting boundary lines of FIG. 12. However, the step-variable shifting portion 20 may be shifted to its gear position or to select its speed ratio γ, which gear position or speed ratio makes it possible to control the engine speed $N_E$ to a value which is as close as possible to the target engine speed $N_{EM}$ obtained according to the engine-fuel-economy map of FIG. 61.

Figure 75:
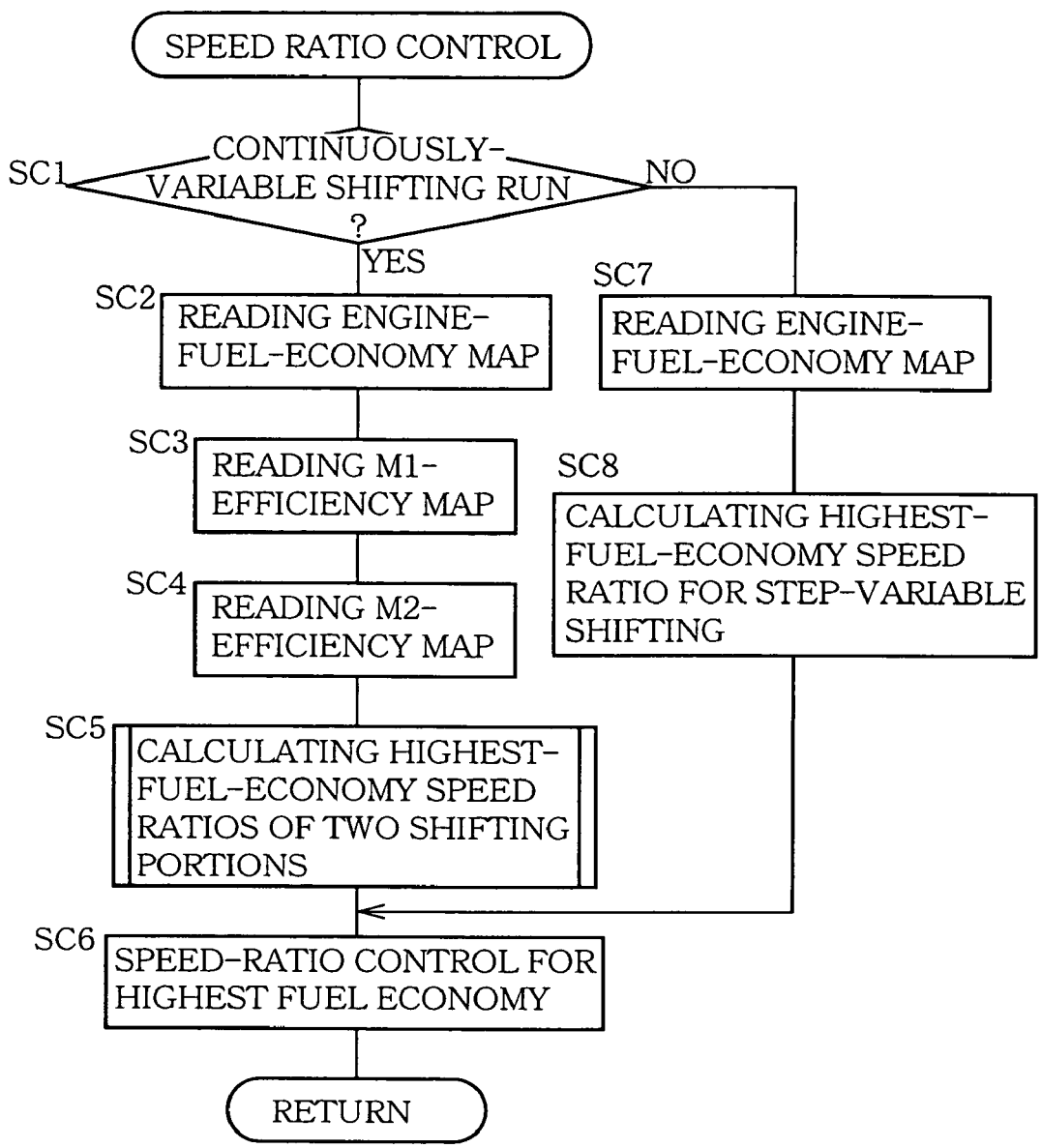
[FIG. 75] This figure is a flow chart illustrating a major control operation performed by the electronic control device in the embodiment of FIG. 71, that is, an operation to control the speed ratio of the step-variable shifting portion during deceleration of the vehicle.
Figure 76:
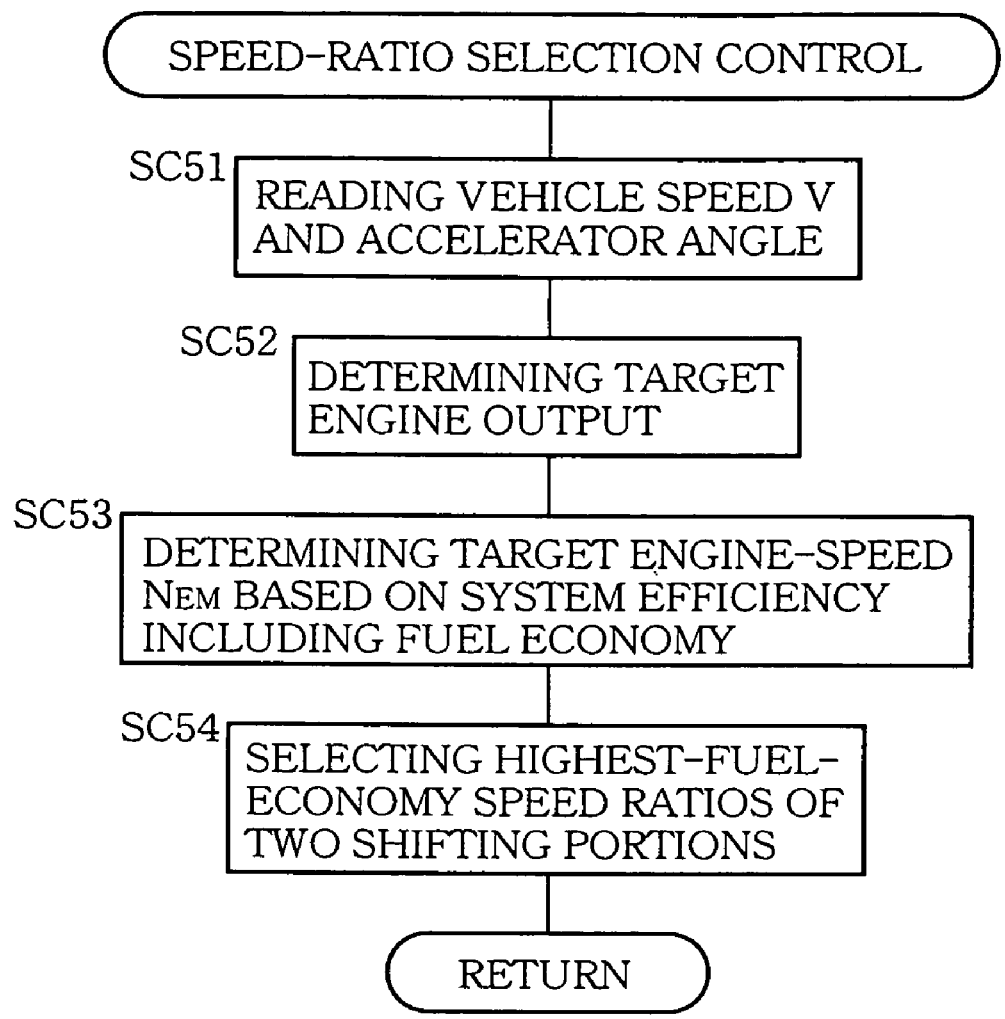
[FIG. 76] This figure is a flow chart for explaining in detail a speed-ratio calculating routine in the control operation of FIG. 75.

FIG. 75 is a flow chart illustrating one of major control operations of the electronic control device 40, that is, a speed-ratio control operation in the continuously-variable shifting state, in the present embodiment. This speed-ratio control is repeatedly executed with an extremely short cycle time of about several milliseconds to several tens of milliseconds, for example. FIG. 76 is a flow chart illustrating a speed-ratio calculating routine shown in FIG. 75.

Initially, step SC1 (hereinafter "step" being omitted) corresponding to the above-described step-variable-shifting-run determining means 380 is implemented to determine whether the vehicle is in the continuously-variable shifting run. This determination is made on the basis of the output of the switching control means 50 or the output of the switch 44. If an affirmative decision is obtained in SA1, the control flow goes to SC2 to read in the engine-fuel-economy map stored in the engine-fuel-economy map memory means 82, and then goes to SC3 to read in the efficiency map of FIG. 72 the first electric motor M1 stored in the motor-efficiency-map memory means 384, and to SC4 to read in the efficiency map of FIG. 73 of the second electric motor M2 stored in the stored in the motor-efficiency-map memory means 384. Then, SC5 corresponding to the above-described continuously-variable-shifting-run speed-ratio control means 386 is implemented to execute the speed-ratio calculating routine, and SC6 is implemented to effect the speed-ratio control.

Referring to FIG. 76 illustrating the speed-ratio calculating routine in SC5, SC51 is implemented to read in the actual vehicle speed V and operating angle $A_{CC}$ of the throttle valve. Then, SC52 and SC53 corresponding to the above-described target-engine-speed calculating means 388 are implemented. SC52 is provided to select one curve L3a of the iso-horse-power curves shown in FIG. 61, which one curve L3a corresponds to an output of the engine 8 satisfying the operator's required vehicle drive force. This selection is made on the basis of the iso-horsepower curves L3 shown in FIG. 61 and the actual operating angle $A_{CC}$ of the accelerator pedal. The selected iso-horsepower curve L3a indicates the target engine output satisfying the operator's required vehicle drive force. Then, SC53 is implemented to determine, as the target engine speed $N_{EM}$, the engine speed corresponding to the intersection point Ca between the determined iso-horsepower curve L3a and the highest fuel-economy curve L2. SC54 corresponding to the above-described two-speed-ratios determining means 390 is implemented to determine, according to the equation (1), for example, the overall speed ratio γT of the transmission mechanism 10 for obtaining the target engine speed $N_{EM}$, on the basis of the target engine speed $N_{EM}$ and the actual vehicle speed V The speed ratio γ of the step-variable shifting portion 20 and the speed ratio γ0 of the differential portion (continuously-variable shifting portion) 11, which give the determined overall speed ratio γT of the transmission mechanism 10 and which permit the maximum overall power transmitting efficiency of the transmission mechanism 10, are determined according to the equations (1), (2), (3) and (4).

Referring back to FIG. 75, SC6 is implemented to command the step-variable shifting control means 54 and the hybrid control means 52, so as to establish the determined speed ratio γ of the step-variable shifting portion 20 and the determined speed ratio γ0 of the differential portion (continuously-variable shifting portion) 11.

If a negative decision is obtained in SC1, the control flow goes to SC7 identical to step SC2, to read in the engine-fuel map of FIG. 61 stored in the engine-fuel-map memory means 382. Then, SC8 is implemented to calculate, as a highest-fuel-economy step-variable gear position, or a highest-fuel-economy speed ratio, the gear position or speed ratio γ of the step-variable shifting portion 20, which permits the engine speed NE to be as close as possible to the target engine speed $N_{EM}$ obtained according to the engine-fuel-economy map. Then, SC6 is implemented to command the step-variable shifting control means 54 to effect the shifting control, so as to obtain the speed ratio γ of the step-variable shifting portion 20, which has been determined as the highest-fuel-economy speed ratio.

In the present embodiment described above, the speed-ratio control means 386 is arranged to control the speed ratio γ of the step-variable shifting portion 20 and the speed ratio γ0 of the differential portion (continuously-variable shifting portion) 11, so as to maximize the fuel economy, in the continuously-variable shifting state of the differential portion (continuously-variable shifting portion) 11, so that the fuel economy is improved in the present embodiment, as compared with that in the case where those speed ratios are controlled independently of each other. For instance, the speed-ratio control means 386 controls the speed ratio γ of the step-variable shifting portion 20 so as to prevent reverse rotation of the first electric motor M1 in the differential portion (continuously-variable shifting portion) 11 as indicated in FIG. 4, even in a steady-state running state of the vehicle at a comparatively high speed. Accordingly, the fuel economy of the vehicle as a whole can be maximized.

The present embodiment is further arranged such that the speed-ratio control means 386 controls the speed ratio γ0 of the differential portion (continuously-variable shifting portion) 11, depending upon the speed ratio γ of the step-variable shifting portion 20, in the continuously-variable shifting state of the differential portion (continuously-variable shifting portion) 11. Thus, the speed ratios of the step-variable shifting portion 20 and the differential portion (continuously-variable shifting portion) 11 are controlled to improve the power transmitting efficiency of the vehicle as a whole. For instance, the speed-ratio control means 386 controls the speed ratio γ of the step-variable shifting portion 20 so as to prevent reverse rotation of the first electric motor M1 in the differential portion (continuously-variable shifting portion) 11 as indicated in FIG. 4, even in a steady-state running state of the vehicle at a comparatively high speed. Accordingly, the fuel economy of the vehicle as a whole can be maximized.

The present embodiment is further arranged such that the speed-ratio control means 386 controls the speed ratio γ of the step-variable shifting portion 20 and the speed ratio γ0 of the differential portion (continuously-variable shifting portion) 11, on the basis of the efficiency values ηM1 and ηM2 of the respective first and second electric motors M1, M2 of the differential portion (continuously-variable shifting portion) 11. Thus, the speed ratio γ of the step-variable shifting portion 20 and the speed ratio γ0 of the differential portion (continuously-variable shifting portion) 11 are controlled by taking account of the efficiency values ηM1 and ηM2 of the respective first and second electric motors M1, M2. Accordingly, the power transmitting efficiency is further improved.

The present embodiment is also arranged such that the speed-ratio control means 386 changes the output shaft speed $N_{IN}$ of the differential portion (continuously-variable shifting portion) 11, by adjusting the speed ratio γ of the step-variable shifting portion 20. Thus, the speed ratio γ of the step-variable shifting portion 20 can be controlled so as to prevent reverse rotation of the first electric motor M1 in the differential portion (continuously-variable shifting portion) 11 as indicated in FIG. 4, even in a steady-state running state of the vehicle at a comparatively high speed. Accordingly, the fuel economy of the vehicle as a whole can be maximized.

Embodiment 24

Figures 77, 78:
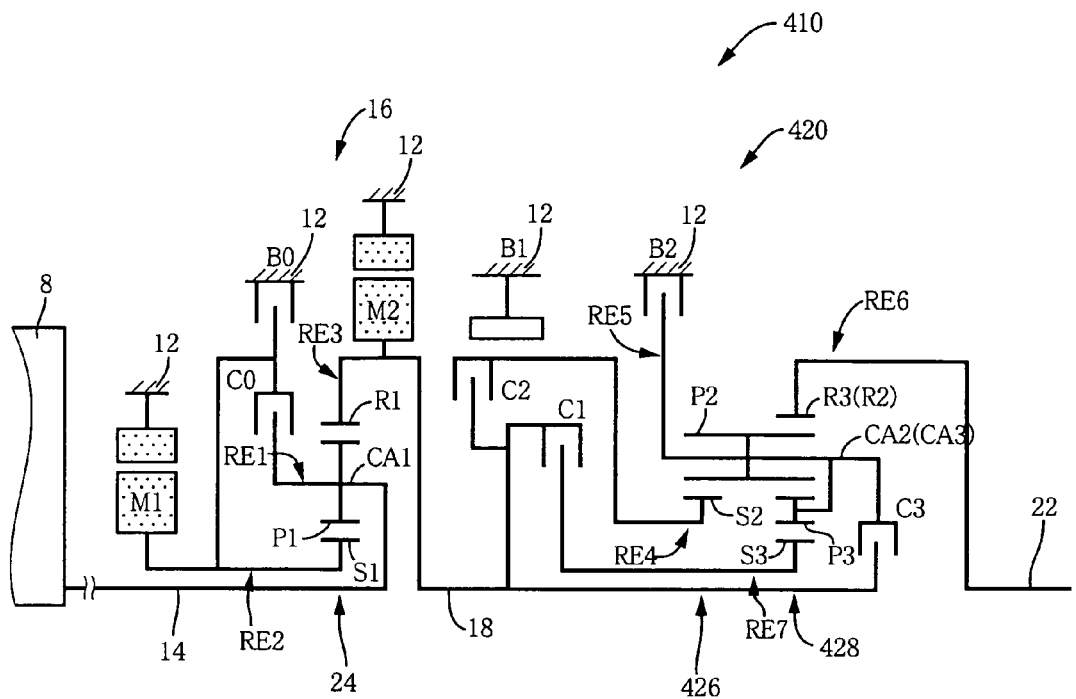
[FIG. 77] This figure is a schematic view for explaining an arrangement of a drive system of a hybrid vehicle according to one embodiment of the present invention.
[FIG. 78] This figure is a table indicating shifting actions of the drive system of the hybrid vehicle of the embodiment of FIG. 77 operable in a continuously variable shifting state or a step-variable shifting state, in relation to different combinations of operating states of hydraulically operated frictional coupling devices to effect the respective shifting actions.

FIG. 77 is a schematic view explaining a drive system 410 for a hybrid vehicle, according to another embodiment of this invention. The drive system 410 shown in FIG. 1 includes: an input rotary member in the form of an input shaft 14 disposed on a common axis in a transmission casing 12 (hereinafter abbreviated as "casing 12") functioning as a stationary member attached to a body of the vehicle; a differential mechanism in the form of a power distributing mechanism 16 connected to the input shaft 14 either directly, or indirectly via a pulsation absorbing damper (vibration damping device) not shown; a step-variable or multiple-step automatic transmission 20 interposed between and connected in series via a power transmitting member 18 (power transmitting shaft) to the power distributing mechanism 16 and an output shaft 22; and an output rotary member in the form of the above-indicated output shaft 22 connected to the automatic transmission 20. The input shaft 12, power distributing mechanism 16, automatic transmission 20 and output shaft 22 are connected in series with each other. This drive system 410 is suitably used for a transverse FR vehicle (front-engine, rear-drive vehicle), and is disposed between a drive power source in the form of an engine 8 and a pair of drive wheels 38, to transmit a vehicle drive force to the pair of drive wheels 38 through a differential gear device 36 (final speed reduction gear) and a pair of drive axles, as shown in FIG. 7. It is noted that a lower half of the drive system 10, which is constructed symmetrically with respect to its axis, is omitted in FIG. 77. This is also true in each of the other embodiments described below.

The power distributing mechanism 16 is a mechanical device arranged to mechanically synthesize or distribute the output of the engine 8 received by the input shaft 14, that is, to distribute the output of the engine 8 to the first electric motor M1, and to the power transmitting member 18 provided to transmit a drive force to the automatic transmission 20, or to synthesize the output of the engine 8 and the output of the first electric motor M1 and transmit a sum of these outputs to the power transmitting member 18. While the second electric motor M2 is arranged to be rotated with the power transmitting member 18 in the present embodiment, the second electric motor M2 may be disposed at any desired position between the power transmitting member 18 and the output shaft 22. In the present embodiment, each of the first electric motor M1 and the second electric motor M2 is a so-called motor/generator also functioning as an electric generator. The first electric motor M1 should function at least as an electric generator operable to generate an electric energy while generating a reaction force, and the second electric motor M2 should function at least as an electric motor operable to generate a vehicle drive force.

The power distributing mechanism 16 includes, as major components, a first planetary gear set 24 of single pinion type having a gear ratio ρ1 of about 0.300, for example, a switching clutch C0 and a switching brake B1. The first planetary gear set 24 has rotary elements consisting of a first sun gear Si, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are released, the power distributing mechanism 16 is placed in a differential state in which the first sun gear S1, first carrier CA1 and first ring gear RI are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state, in which the rotating speed of the power transmitting member 18 is continuously variable, irrespective of the rotating speed of the engine 8, namely, in the differential state in which a speed ratio γ0 (rotating speed of the input shaft 14/rotating speed of the power transmitting member 18) of the power distributing mechanism 16 is electrically changed from a minimum value γ0min to a maximum value γ0max, for instance, in the continuously-variable shifting state in which the power distributing mechanism 16 functions as an electrically controlled continuously variable transmission the speed ratio γ0 of which is continuously variable from the minimum value γ0min to the maximum value γ0max.

When the switching clutch C0 is engaged during running of the vehicle with the output of the engine 8 while the power distributing mechanism 16 is placed in the continuously-variable shifting state, the first sun gear S1 and the first carrier CA1 are connected together, so that the power distributing mechanism 16 is placed in the locked state or non-differential state in which the three rotary elements S1, CA1, R1 of the first planetary gear set 24 are rotatable as a unit. In other words, the power distributing mechanism 16 is placed in a fixed-speed-ratio shifting state in which the mechanism 16 functions as a transmission having a fixed speed ratio γ0 equal to 1. When the switching brake B0 is engaged in place of the switching clutch C0, to place the power distributing mechanism in the locked or non-differential state in which the first sun gear S1 is held stationary, the rotating speed of the first ring gear R1 is made higher than that of the first carrier CA1, so that the power distributing mechanism 16 is placed in the fixed-speed-ration shifting state in which the mechanism 16 functions as a speed-increasing transmission having a fixed speed ratio γ0 smaller than 1, for example, about 0.77. In the present embodiment described above, the switching clutch C0 and brake B0 function as a differential-state switching device operable to selectively place the power distributing mechanism 16 in the differential state (continuously-variable shifting state) in which the mechanism 16 functions as an electrically controlled continuously variable transmission the speed ratio of which is continuously variable, and in the non-differential or locked state in which the mechanism 16 does not function as the electrically controlled continuously variable transmission, namely, in the fixed-speed-ration shifting state in which the mechanism 16 functions as a transmission having a single gear position with one speed ratio or a plurality of gear positions with respective speed ratios.

The automatic transmission 420 includes a single-pinion type second planetary gear set 426, and a double-pinion type third planetary gear set 428. The third planetary gear set 428 has: a third sun gear S3; a plurality of pairs of mutually meshing third planetary gears P3; a third carrier CA3 supporting the third planetary gears P3 such that each third planetary gear P3 is rotatable about its axis and about the axis of the third sun gear S3; and a third ring gear R3 meshing with the third sun gear S3 through the third planetary gears P3. For example, the third planetary gear set 428 has a gear ratio ρ3 of about 0.315. The second planetary gear set 426 has: a second sun gear S2, a second planetary gear P2 formed integrally with one of the third planetary gears P3; a second carrier CA2 formed integrally with the third carrier CA3; and a second ring gear R2 which is formed integrally with the third ring gear R3 and which meshes with the second sun gear S2 through the second planetary gear P2. For example, the second planetary gear set 426 has a gear ratio ρ2 of about 0.368. The second planetary gear set 426 and the third planetary gear set 428 is of a so-called Ravigneaux type wherein the second and third carriers are formed integrally with each other and the second and third ring gears are formed integrally with each other. The second planetary gear P2 formed integrally with one of the third planetary gears P3 may have different diameters or numbers of teeth on the respective sides corresponding to the second and third planetary gears P2, P3. The third planetary gears P3 and the second planetary gear P2 may be formed separately from each other, and the third carrier CA3 and the second carrier CA2 may be formed separately from each other. The third ring gear R3 and the second ring gear R2 may be formed separately from each other. Where the numbers of teeth of the second sun gear S2, second ring gear R2, third sun gear S3, third ring gear R3, are represented by ZS2, ZR2, ZS3 and ZR3, respectively, the above-indicated gear ratios ρ2 and ρ3 are represented by ZS2/ZR2 and ZS3/ZR3, respectively.

In the automatic transmission 420, the second sun gear S2 is selectively connected to the power transmitting member 18 through a second clutch C2, and selectively fixed to the casing 12 through a first brake B1. The second carrier CA2 and the third carrier CA3 are selectively connected to the power transmitting member 18 through a third clutch C3, ad selectively fixed to the casing 12 through a second brake B2. The second ring gear R2 and the third ring gear R3 are fixed to the output shaft 22, and the third sun gear S3 is selectively connected to the power transmitting member 18 through a first clutch C1.

The above-described switching clutch C0, first clutch C1 second clutch C2, third clutch C3, switching brake B0, first brake B1 and second brake B2 are hydraulically operated frictional coupling devices used in a conventional vehicular automatic transmission. Each of these frictional coupling devices is constituted by a wet-type multiple-disc clutch including a plurality of friction plates which are superposed on each other and which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the drive system 410 constructed as described above, one of a first-gear position (first-speed position) through a fifth-gear position (fifth-speed position), a reverse-gear position (rear-drive position) and a neural position is selectively established by engaging actions of a corresponding combination of the frictional coupling devices selected from the above-described switching clutch C0, first clutch C1, second clutch C2, third clutch C3, switching brake B0, first brake B1 and second brake B2, as indicated in the table of FIG. 78. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having a single gear position with one speed ratio or a plurality of gear positions with respective speed ratios, as well as in the continuously-variable shifting state in which the mechanism 16 is operable as a continuously variable transmission, as described above. In the present drive system 410, therefore, a step-variable transmission is constituted by the automatic transmission 420, and the power distributing mechanism 16 which is placed in the fixed-speed-ratio shifting state by engagement of the switching clutch C0 or switching brake B0. Further, a continuously variable transmission is constituted by the automatic transmission 420, and the power distributing mechanism 16 which is placed in the continuously-variable shifting state, with none of the switching clutch C0 and brake B0 being engaged.

Where the drive system 410 functions as the step-variable transmission, for example, the first-gear position having the highest speed ratio γ1 of about 3.174, for example, is established by engaging actions of the switching clutch C0, first clutch C1 and second brake B2, and the second-gear position having the speed ratio γ2 of about 1.585, for example, which is lower than the speed ratio γ1, is established by engaging actions of the switching clutch C0, first clutch C1 and first brake B1, as indicated in FIG. 78. The speed ratio is equal to the input shaft speed $N_{IN}$/output shaft speed $N_{OUT}$. Further, the third-gear position having the speed ratio γ3 of about 1.000, for example, which is lower than the speed ratio γ2, is established by engaging actions of the switching clutch C0, first clutch C1 and third clutch C1, and the fourth-gear position having the speed ratio γ4 of about 0.731, for example, which is lower than the speed ratio γ3, is established by engaging actions of the switching clutch C0, third clutch C3 and first brake B1. The fifth-gear position having the speed ratio γ5 of about 0.562, for example, which is smaller than the speed ratio γ4, is established by engaging actions of the third clutch C3, switching brake B0 and first brake B1. Further, the reverse-gear position having the speed ratio γR of about 2.717, for example, which is intermediate between the speed ratios γ1 and γ2, is established by engaging actions of the second clutch C2 and the second brake B2. The neutral position N is established by engaging only the second brake B2.

Where the drive system 410 functions as the continuously-variable transmission, on the other hand, the switching clutch C0 and the switching brake B0 are both released, as indicated in FIG. 78, so that the power distributing mechanism 16 functions as the continuously variable transmission, while the automatic transmission 420 connected in series to the power distributing mechanism 16 functions as the step-variable transmission, whereby the speed of the rotary motion transmitted to the automatic transmission 420 placed in one of the first-gear, second-gear, third-gear and fourth-gear positions, namely, the rotating speed of the power transmitting member 18 is continuously changed, so that the speed ratio of the drive system when the automatic transmission 420 is placed in one of those gear positions is continuously variable over a predetermined range. Accordingly, the speed ratio of the automatic transmission 420 is continuously variable across the adjacent gear positions, whereby the overall speed ratio γT of the drive system 410 is continuously variable.

Figure 79:
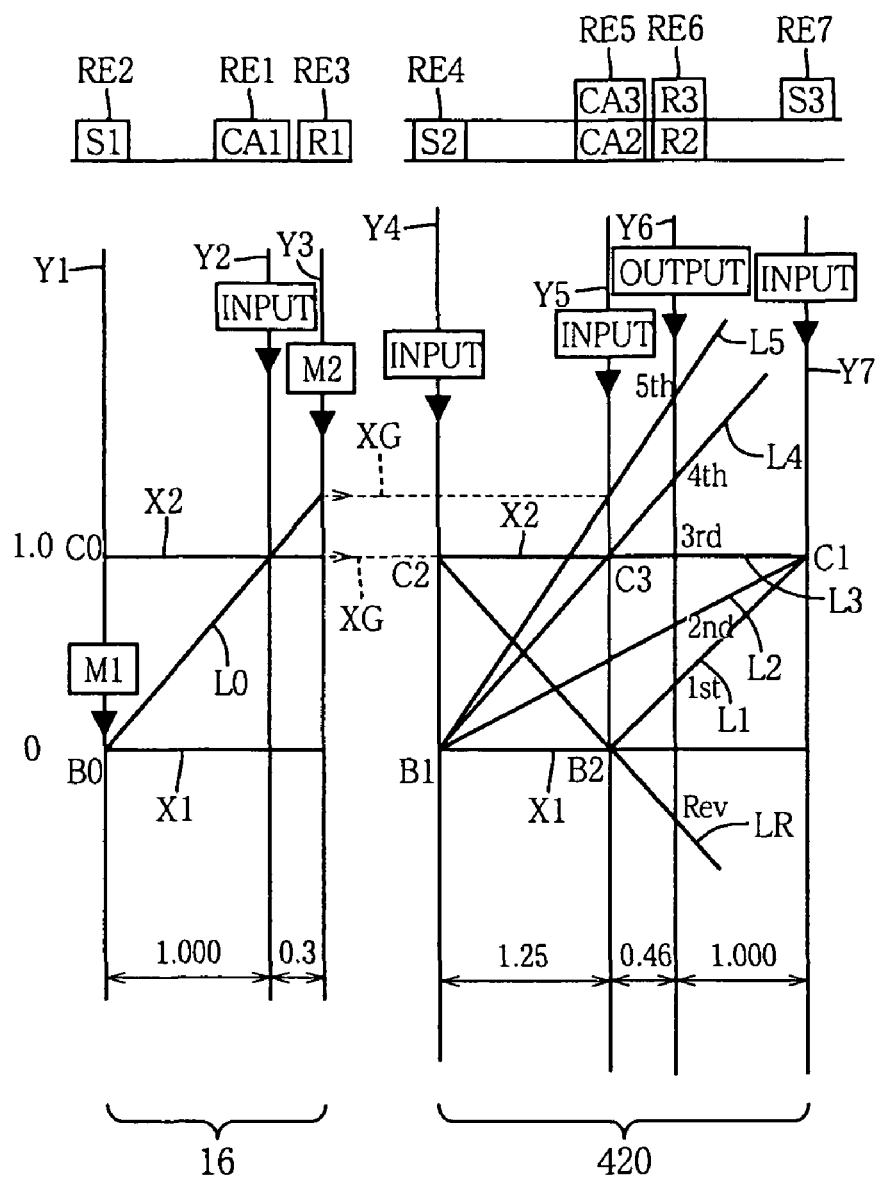
[FIG. 79] This figure is a collinear chart showing relative rotating speeds of rotary elements of the drive system of the hybrid vehicle of the embodiment of FIG. 77 operated in the step-variable shifting state, in different gear positions of the drive system.

The collinear chart of FIG. 79 indicates, by straight lines, a relationship among the rotating speeds of the rotary elements in each of the gear positions of the drive system 410, which is constituted by the power distributing mechanism 16 functioning as the continuously-variable shifting portion or first shifting portion, and the automatic transmission 420 functioning as the step-variable shifting portion or second shifting portion. The collinear chart of FIG. 79 is a rectangular two-dimensional coordinate system in which the gear ratios ρ of the planetary gear sets 424, 426, 428 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18. Three vertical lines Y1, Y2 and Y3 corresponding to the power distributing mechanism 16 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 424. That is, the distance between the vertical lines Y1 and Y2 corresponds to "1", while the distance between the vertical lines Y2 and Y3 corresponds to the gear ratio ρ1. Further, five vertical lines Y4, Y5, Y6 and Y7 corresponding to the automatic transmission 20 respectively represent the relative rotating speeds of a fourth rotary element (fourth element) RE4 in the form of the second and third sun gears S2, S3, a fifth rotary element (fifth element) RE5 in the form of the second carrier CA2 and the third carrier CA3 that are integrally fixed to each other, a sixth rotary element (sixth element) RE6 in the form of the second ring gear R2 and the third ring gear R3 that are integrally fixed to each other, and a seventh rotary element (seventh element) RE7 in the form of the third sun gear S3. The distances between the adjacent ones of the vertical lines Y4-Y7 are determined by the gear ratios ρ2 and ρ3 of the second and third planetary gear sets 426, 428.

Referring to the collinear chart of FIG. 79, the power distributing mechanism (continuously variable shifting portion) 16 of the drive system 410 is arranged such that the first rotary element RE1 (first carrier CA1), which is one of the three rotary elements of the first planetary gear set 424, is integrally fixed to the input shaft 14 and selectively connected to the second rotary element RE2 in the form of the first sun gear S1 through the switching clutch C0, and this second rotary element RE2 (first sun gear S1) is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted to the automatic transmission (step-variable transmission) 420 through the power transmitting member 18. A relationship between the rotating speeds of the first sun gear S1 and the first ring gear R1 is represented by an inclined straight line L0 which passes a point of intersection between the lines Y2 and X2.

FIGS. 4 and 5 correspond to a part of the collinear chart of FIG. 79 which shows the power distributing mechanism 16. FIG. 4 shows an example of an operating state of the power distributing mechanism 16 placed in the continuously-variable shifting state with the switching clutch C0 and the switching brake B0 held in the released state. The rotating speed of the first sun gear S1 represented by the point of intersection between the straight line L0 and vertical line Y1 is raised or lowered by controlling the reaction force generated by an operation of the first electric motor M1 to generate an electric energy, so that the rotating speed of the first ring gear R1 represented by the point of intersection between the lines L0 and Y3 is lowered or raised. In the operating state of FIG. 4, the first sun gear S1 is rotated in the negative direction, with the first electric motor M1 being operated by application of an electric energy thereto. While the first sun gear S1 is rotated in the negative direction as indicated in FIG. 4, the angle of inclination of the straight line L0 is relatively large, indicating an accordingly high speed of rotation of the first ring gear R1 and the power transmitting member 18, making it possible to drive the vehicle at a relatively high speed. On the other hand, the application of the electric energy to the first electric motor M1 results in deterioration of the fuel economy. In the drive system 10 according to the present embodiment, however, the automatic transmission 420 is arranged to increase the speed of a rotary motion transmitted through the power transmitting member 18, as described below, so that there is not a high degree of opportunity wherein the first sun gear S1 must be rotated in the negative direction. Accordingly, the fuel economy is higher in the present drive system than in the case where the automatic transmission 420 were not able to increase the speed of the rotary motion transmitted through the power transmitting member 18.

FIG. 5 shows an example of an operating state of the power distributing mechanism 16 placed in the step-variable shifting state with the switching clutch C0 held in the engaged state. When the first sun gear S1 and the first carrier CA1 are connected to each other in this step-variable shifting state, the three rotary elements indicated above are rotated as a unit, so that the line L0 is aligned with the horizontal line X2, whereby the power transmitting member 18 is rotated at a speed equal to the engine speed $N_E$. When the switching brake B0 is engaged, on the other hand, the rotation of the power transmitting member 18 is stopped, so that the straight line L0 is inclined in the state indicated in FIG. 79, whereby the rotating speed of the first ring gear R1, that is, the rotation of the power transmitting member 18 represented by a point of intersection between the straight line L0 and vertical line Y3 is made higher than the engine speed $N_E$ and transmitted to the automatic transmission 420.

In the automatic transmission 420, the fourth rotary element RE4 is selectively connected to the power transmitting member 18 through the second clutch C2, and selectively fixed to the transmission casing 12 through the first brake B1, and the fifth rotary element RE5 is selectively connected to the power transmitting member 18 through the third clutch C3 and selectively fixed to the casing 12 through the second brake B2. The sixth rotary element RE6 is fixed to the output shaft 22, while the seventh rotary element RE7 is selectively connected to the power transmitting member 18 through the first clutch C1.

When the first clutch C1 and the second brake B2 are engaged, the automatic transmission 420 is placed in the first-speed position. The rotating speed of the output shaft 22 in the first-speed position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 and the horizontal line X1, and a point of intersection between the vertical line Y5 indicative of the rotating speed of the fifth rotary element RE5 and the horizontal line X1. Similarly, the rotating speed of the output shaft 22 in the second-speed position established by the engaging actions of the first clutch C1 and first brake B1 is represented by a point of intersection between an inclined straight line L2 determined by those engaging actions and the vertical line Y6 indicative of the rotating speed of the sixth rotary element RE6 fixed to the output shaft 22. The rotating speed of the output shaft 22 in the third-speed position established by the engaging actions of the first clutch C1 and third clutch C3 is represented by a point of intersection between an inclined straight line L3 determined by those engaging actions and the vertical line Y6 indicative of the rotating speed of the sixth rotary element RE6 fixed to the output shaft 22. The rotating speed of the output shaft 22 in the fourth-speed position established by the engaging actions of the first brake B1 and third clutch C3 is represented by a point of intersection between a horizontal line L4 determined by those engaging actions and the vertical line Y6 indicative of the rotating speed of the sixth rotary element RE6 fixed to the output shaft 22. In the first-speed through fourth-speed positions in which the switching clutch C0 is placed in the engaged state, the fifth rotary element RE5 is rotated at the same speed as the engine speed $N_E$, with the drive force received from the power distributing mechanism 16. When the switching clutch B0 is engaged in place of the switching clutch C0, the sixth rotary element RE6 is rotated at a speed higher than the engine speed $N_E$, with the drive force received from the power distributing mechanism 16. The rotating speed of the output shaft 22 in the fifth-speed position established by the engaging actions of the first brake B1, third clutch C3 and switching brake B0 is represented by a point of intersection between a horizontal line L5 determined by those engaging actions and the vertical line Y6 indicative of the rotating speed of the sixth rotary element RE6 fixed to the output shaft 22. The rotating speed of the output shaft 22 in the reverse-gear position R established by the second clutch C2 and second brake B2 is represented by a point of intersection between an inclined straight line LR determined by those engaging actions and the vertical line Y6 indicative of the rotating speed of the sixth rotary element RE6 fixed to the output shaft 22.

In the drive system 410 constructed as described above, the electronic control unit 40 shown in FIG. 66 having the control functions shown in FIG. 7 or FIG. 11 and FIG. 13 by way of example performs the hybrid controls of the engine 8 and the first and second electric motors M1, M2, the shifting control of the automatic transmission 20, and other vehicle drive controls.

In the present embodiment described above, the power distributing mechanism 16 is selectively switched by the engaging and releasing actions of the switching clutch C0 and the switching brake B0, between the continuously-variable shifting state in which the mechanism 16 is operable as an electrically controlled continuously variable transmission, and the fixed-speed-ratio shifting state in which the mechanism 16 is operable as a transmission having fixed speed ratios. Accordingly, when the engine is in a normal output state with a relatively low or medium output while the vehicle is running at a relatively low or medium running speed, the power distributing mechanism 16 is placed in the continuously-variable shifting state, assuring a high degree of fuel economy of the hybrid vehicle. When the vehicle is running at a relatively high speed or when the engine is operating at a relatively high speed, on the other hand, the power distributing mechanism 16 is placed in the fixed-ratio shifting state in which the output of the engine 8 is transmitted to the drive wheels 38 primarily through the mechanical power transmitting path, so that the fuel economy is improved owing to reduction of a loss of conversion of the mechanical energy into the electric energy. When the engine 8 is in a high-output state, the power distributing mechanism 16 is also placed in the fixed-speed-ratio shifting state. Therefore, the mechanism 16 is placed in the continuously-variable shifting state only when the vehicle speed is relatively low or medium or when the engine output is relatively low or medium, so that the maximum amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. Alternatively, when the engine 8 is in a high-output (high-torque) state, the power distributing mechanism 16 is placed in the fixed-speed-ratio shifting state while at the same time the automatic transmission 20 is automatically shifted, so that the engine speed $N_E$ changes with a shift-up action of the automatic transmission 20, assuring a comfortable rhythmic change of the engine speed $N_E$ as the automatic transmission is shifted up, as indicated in FIG. 10. Stated in the other way, when the engine is in a high-output state, it is more important to satisfy a vehicle operator's desire to improve the drivability of the vehicle, than a vehicle operator's desire to improve the fuel economy. In this respect, the power distributing mechanism 16 is switched from the continuously-variable shifting state to the step-variable shifting state (fixed-speed-ratio shifting state) when the engine output becomes relatively high. Accordingly, the vehicle operator is satisfied with a comfortable rhythmic change of the engine speed $N_E$ during the high-output operation of the engine, as indicated in FIG. 10. Further, the automatic transmission 20 principally constituted by the two planetary gear sets 26, 28 has a comparatively small dimension in its axial direction, making it possible to further reduce the required axial dimension of the drive system 10 including those planetary gear sets.

Embodiment 25

Figure 80:
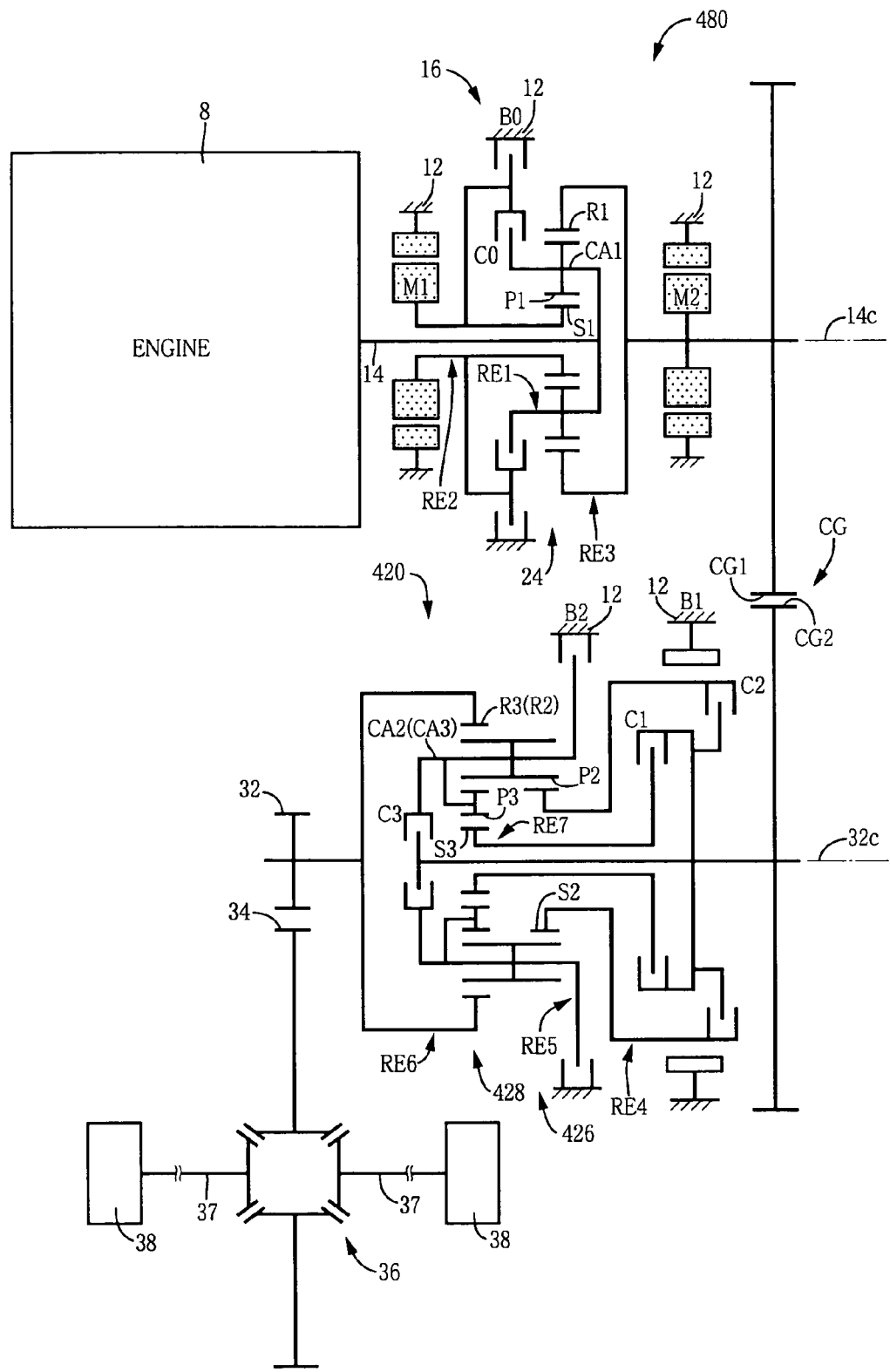
[FIG. 80] This figure is a schematic view for explaining an arrangement of a hybrid vehicle drive system according to another embodiment of this invention.

FIG. 80 is a schematic view for explaining an arrangement of a drive system 480 according to another embodiment of this invention. The present embodiment is different from the embodiment shown in FIGS. 77-79, primarily in that the power distributing mechanism 16 and an automatic transmission 420 are not disposed coaxially with each other in the present embodiment. The following description of the present embodiment primarily relates to a difference between the drive system 480 and the drive system 410.

The drive system 480 shown in FIG. 80 is provided, within a casing 12 attached to the vehicle body, with: an input shaft 14 disposed rotatably about a first axis 14c; the power distributing mechanism 16 mounted on the input shaft 14 directly, or indirectly through a pulsation absorbing damper (vibration damping device); the automatic transmission 420 disposed rotatably about a second axis 32c parallel to the first axis 14c; an output rotary member in the form of a differential drive gear 32 connected to the automatic transmission 420; and a power transmitting member in the form of a counter gear pair CG which connects the power distributing mechanism 16 and the automatic transmission 420, so as to transmit a drive force therebetween. This drive system 480 is suitably used on a transverse FF (front-engine, front-drive) vehicle or a transverse RR (rear-engine, rear-drive) vehicle, and is disposed between a drive power source in the form of an engine 8 and a pair of drive wheels 38. The drive force is transmitted from the differential drive gear 32 to the pair of drive wheels 38, through a differential gear 34 meshing with the differential drive gear 32, a differential gear device 36, a pair of drive axles 37, etc.

The counter gear pair CG indicated above consists of a counter drive gear CG1 disposed rotatably on the first axis 14c and coaxially with the power distributing mechanism 16 and fixed to a first ring gear R1, and a counter driven gear CG2 disposed rotatably on the second axis 32c and coaxially with the automatic transmission 20 and connected to the automatic transmission 20 through a first clutch C1 and a second clutch C2. The counter drive gear CG1 and the counter driven gear CG2 serve as a pair of members in the form of a pair of gears which are held in meshing engagement with each other. Since the speed reduction ratio of the counter gear pair CG (rotating speed of the counter drive gear CG1/rotating speed of the counter driven gear CG2) is about 1.000, the counter gear pair CG functionally corresponds to the power transmitting member 18 in the embodiment shown in FIGS. 77-79, which connects the power distributing mechanism 16 and the automatic transmission 420. That is, the counter drive gear CG1 corresponds to a power transmitting member which constitutes a part of the power transmitting member 18 on the side of the first axis 14c, while the counter driven gear CG2 corresponds to a power transmitting member which constitutes another part of the power transmitting member 18 on the side of the second axis 32c.

Referring to FIG. 80, the individual elements of the drive system 480 will be described. The counter gear pair CG is disposed adjacent to one end of the power distributing mechanism 16 which remote from the engine 8. In other words, the power distributing mechanism 16 is interposed between the engine 8 and the counter gear pair CG, and located adjacent to the counter gear pair CG. A second electric motor M2 is disposed on the first axis 14c, between a first planetary gear set 24 and the counter gear pair CG, such that the second electric motor M2 is fixed to the counter drive gear CG1. The differential drive gear 32 is disposed adjacent to one end of the automatic transmission 420 which is remote from the counter gear pair CG, that is, on the side of the engine 8. In other words, the automatic transmission 20 is interposed between the counter gear pair CG and the differential drive gear 32 (engine 8), and located adjacent to the counter gear pair CG. Between the counter gear pair CG and the differential drive gear 32, a second planetary gear set 426 and a third planetary gear set 428 are disposed in the order of description, in the direction from the counter gear pair CG toward the differential drive gear 32. The first clutch C1 and the second clutch C2 are disposed between the counter gear pair CG and the second planetary gear set 426, and the third clutch C3 is disposed between the third planetary gear set 428 and the differential drive gear 32.

The present embodiment is different from the embodiment shown in FIGS. 77-79, only in that the counter gear pair CG replaces the power transmitting member 18 connecting the power distributing mechanism 16 and the automatic transmission 420, and is identical with the embodiment of FIGS. 77-79 in the arrangements of the power distributing mechanism 16 and automatic transmission 420. Accordingly, the table of FIG. 78 and the collinear chart of FIG. 79 apply to the present embodiment.

In the present embodiment, too, the drive system 480 is constituted by the power distributing mechanism 16 functioning as the continuously-variable shifting portion or first shifting portion, and the automatic transmission 420 functioning as the step-variable shifting portion or second shifting portion, so that the drive system 480 has advantages similar to those of the preceding embodiments. Unlike the embodiment shown in FIGS. 77-79, the present embodiment is arranged such that the power distributing mechanism 16 and the automatic transmission 420 are not disposed coaxially with each other, so that the required dimension of the drive system 480 in the axial direction can be reduced. Accordingly, the present drive system can be suitably used on a transversal FF or RR vehicle such that the first and second axes $14c$, $32c$ are parallel to the transverse or width direction of the vehicle. In this respect, it is noted that the maximum axial dimension of a drive system for such a transverse FF or RR vehicle is generally limited by the width dimension of the vehicle. The present embodiment has an additional advantage that the required axial dimension of the drive system 480 can be further reduced, since the power distributing mechanism 16 and the automatic transmission 420 are located between the engine 8 (differential drive gear 32) and the counter gear pair CG. Further, the required axial dimension of the second axis $32c$ can be reduced owing to the arrangement in which the second electric motor M2 is disposed on the first axis $13c$.

Embodiment 26

Figure 81:
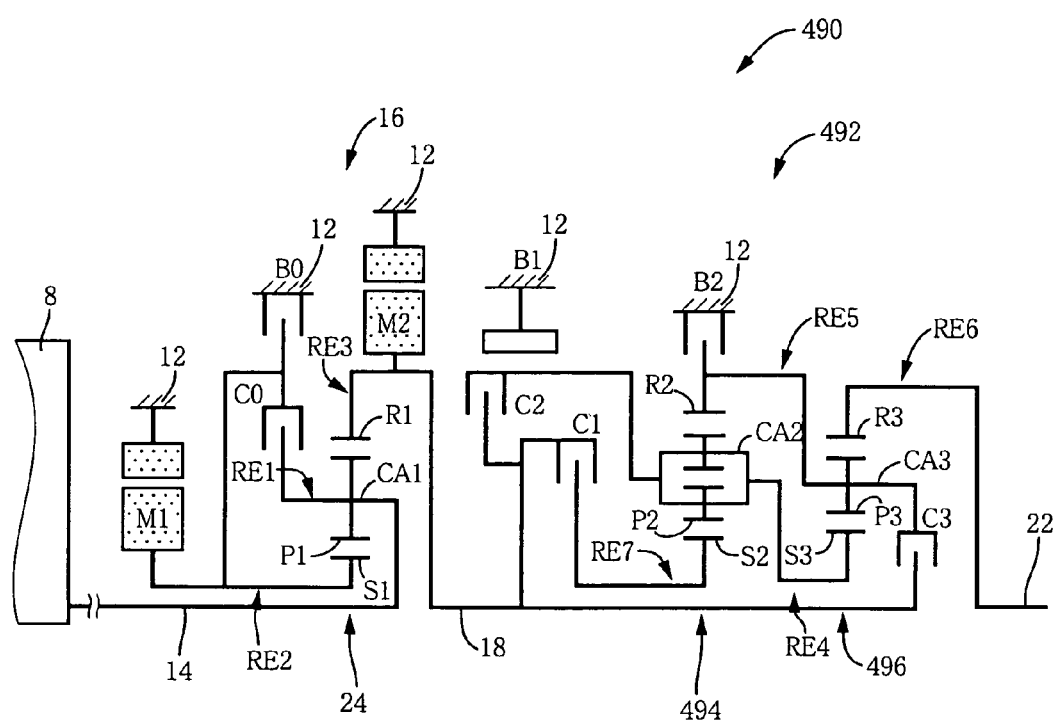
[FIG. 81] This figure is a schematic view for explaining an arrangement of a hybrid vehicle drive system according to another embodiment of this invention.

FIG. 81 is a schematic view for explaining a drive system 490 according to another embodiment of this invention, which includes the power distributing mechanism 16, the first electric motor M1 and the second electric motor M2, as in the embodiment of FIG. 77. The first and second electric motors M1, M2 are connected to the power distributing mechanism 16 in the same manner as in the embodiment of FIG. 77. In the present embodiment, too, the step-variable automatic transmission 492 is disposed between and coaxially with the output shaft 22 and the input shaft 14.

The automatic transmission 492 described above includes a double-pinion type second planetary gear set 494 and a single-pinion type third planetary gear set 496. The second planetary gear set 494 includes: a second sun gear S2; a plurality of pairs of mutually meshing second planetary gears P2; a second carrier CA2 supporting the second planetary gears P2 such that each second planetary gear PA2 is rotatable about its axis and about the axis of the second sun gear S2; and a second ring gear R2 meshing with the second sun gear S2 through the second planetary gears P2. For example, the second planetary gear set 494 has a gear ratio $\rho 2$ of about 0.461. The third planetary gear set 496 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 496 has a gear ratio $\rho 3$ of about 0.368.

Like the automatic transmission 420 of FIG. 77, the automatic transmission 492 includes the first and second brakes B1, B2 and the first through third clutches C1-C3. The second sun gear S2 is selectively connected to the power transmitting member 18 through the first clutch C1. The second ring gear R2 and the third carrier CA3 are integrally fixed to each other and selectively connected to the power transmitting member 18 through the third clutch C3, and selectively fixed to the casing 12 through the second brake B2. The third ring gear R3 is fixed to the output shaft 22.

The above-described second carrier CA2 and third sun gear S3 integrally fixed to each other function as the fourth rotary element RE4, and the second ring gear R2 and the third carrier CA3 integrally fixed to each other function as the fifth rotary element RE5. Further, the third ring gear R3 functions as the sixth rotary element RE6, and the second sun gear S2 functions as the seventh rotary element RE7. The collinear chart of the embodiment of FIG. 77 applies to the drive system 490.

The present drive system 490 also includes the power distributing mechanism 16 functioning as a continuously-variable shifting portion or a first shifting portion, and the automatic transmission 492 functioning as a step-variable shifting portion or a second shifting portion. The automatic transmission 492 is principally constituted by the two planetary gear sets 494, 496, and has the same advantage as that in the embodiment of FIG. 77.

Embodiment 27

Figure 82:
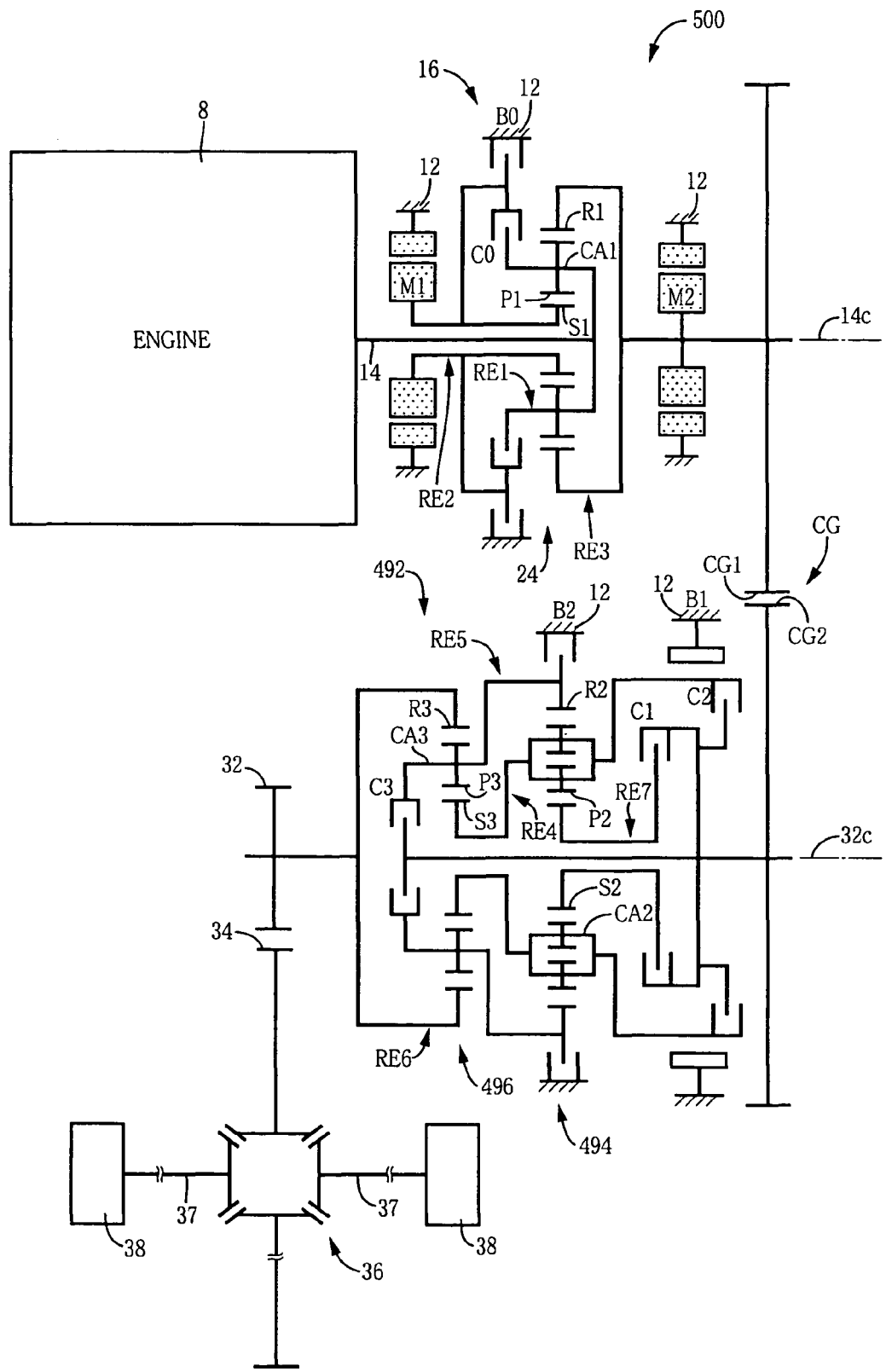
[FIG. 82] This figure is a schematic view for explaining an arrangement of a hybrid vehicle drive system according to another embodiment of this invention.

FIG. 82 is a schematic view for explaining an arrangement of a drive system 500 according to another embodiment of this invention, which is different from the embodiment of FIG. 80 in that the automatic transmission 492 of FIG. 81 is used in place of the automatic transmission 420 in the present embodiment. In other words, the present embodiment is different from the embodiment of FIG. 81, like the embodiment of FIG. 80 is different from the embodiment of FIG. 77, only in that the counter gear pair CG is used in place of the power transmitting member 18, for connection between the power distributing mechanism 16 and the automatic transmission 492. Therefore, the drive system 500 of the present embodiment has the same advantage as the embodiment of FIG. 80.

Embodiment 28

Figure 83:
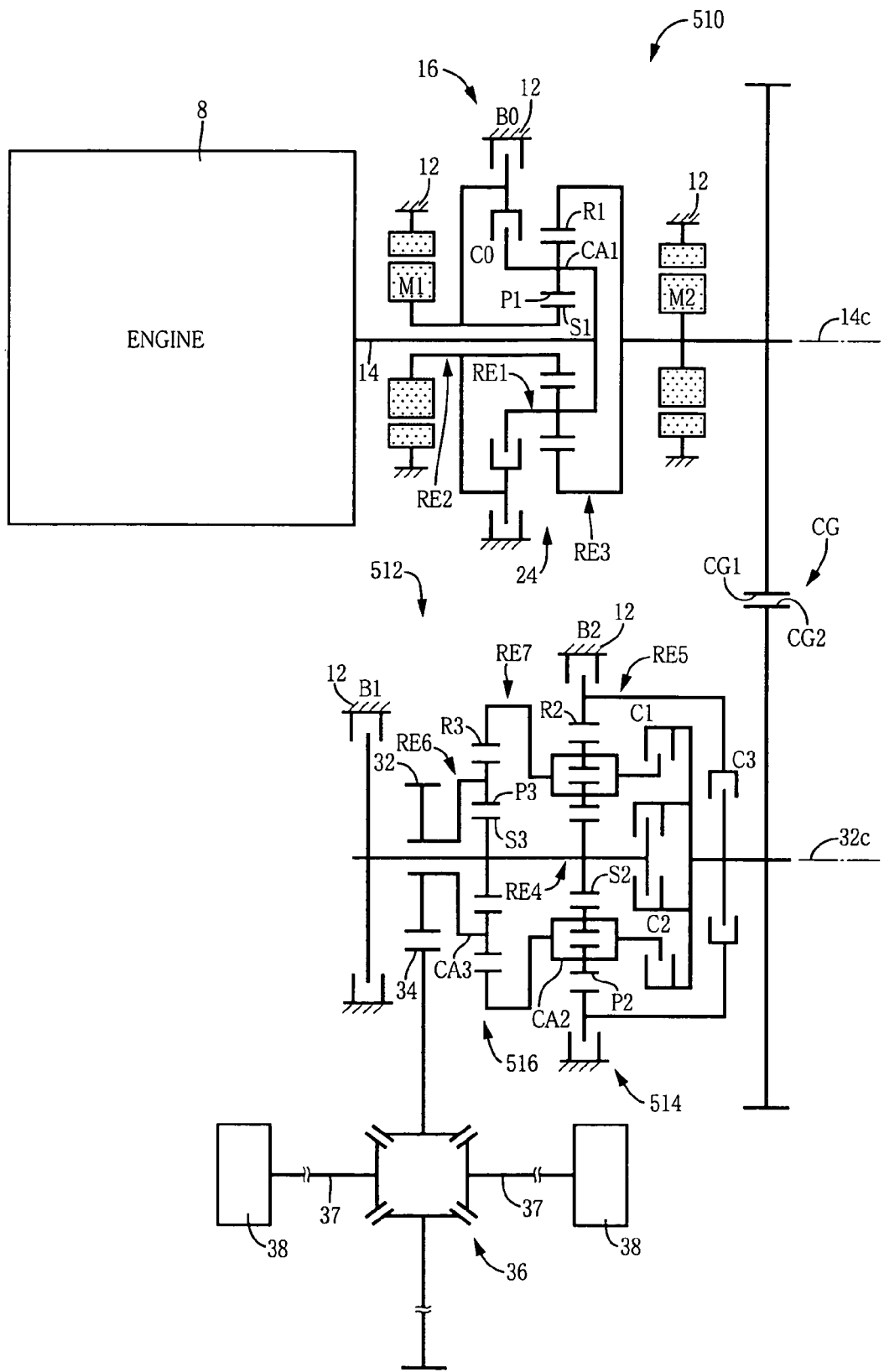
[FIG. 83] This figure is a schematic view for explaining an arrangement of a hybrid vehicle drive system according to another embodiment of this invention.

FIG. 83 is a schematic view for explaining a drive system 510 according to another embodiment of this invention, which includes the power distributing mechanism 16, the first electric motor M1, the second electric motor M2 and the counter gear pair CG, as in the embodiment of FIG. 82. The present embodiment is different from the embodiment of FIG. 80 or 82, only in the construction of a step-variable automatic transmission 512 disposed on the second axis 32c.

The automatic transmission 512 described above includes a double-pinion type second planetary gear set 514 and a single-pinion type third planetary gear set 516. The second planetary gear set 514 includes: a second sun gear S2; a plurality of pairs of mutually meshing second planetary gears P2; a second carrier CA2 supporting the second planetary gears P2 such that each second planetary gear P2 is rotatable about its axis and about the axis of the second sun gear S2; and a second ring gear R2 meshing with the second sun gear S2 through the second planetary gears P2. For example, the second planetary gear set 514 has a gear ratio ρ2 of about 0.539. The third planetary gear set 516 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 516 has a gear ratio ρ3 of about 0.585.

Like the automatic transmission 420 of FIG. 80 and the automatic transmission 492 of FIG. 82, the automatic transmission 512 includes the first and second brakes B1, B2 and the first through third clutches C1-C3. However, the first brake B1 in the present embodiment is of a wet-type multiple-disc type. The second sun gear S2 and the third sun gear S3 that are integrally fixed to each other are selectively connected to a power transmitting member in the form of the counter driven gear CG2 of the counter gear pair CG through the second clutch C2, and selectively fixed to the casing 12 through the first brake B1. The second carrier CA2 and the third ring gear R3 are integrally fixed to each other and selectively connected to the counter driven gear CG2 through the first clutch C1. The second ring gear R2 is selectively connected to the counter driven gear CG2 through the third clutch C3, and selectively fixed to the casing 12 through the second brake B2. The third carrier CA3 is fixed to an output rotary member in the form of the differential drive gear 32.

The components of the automatic transmission 512 of the drive system 510 will be described. The first through third clutches C1-C3 are disposed between the second planetary gear set 514 and the counter driven gear CG2, such that the third clutch C3 is located closer to the counter driven gear CG2 than the first and second clutches C1, C2. The first brake B1 is disposed on one side of the differential drive gear 32 which is remote from the third planetary gear set 516. In other words, the differential drive gear 32 is disposed between the third planetary gear set 516 and the first brake B1.

The above-described second sun gear S2 and third sun gear S3 integrally fixed to each other function as the fourth rotary element RE4, and the second ring gear R2 functions as the fifth rotary element RE5. The third carrier CA3 functions as the sixth rotary element RE6, and the second carrier CA2 and third ring gear R3 integrally fixed to each other function as the seventh rotary element RE7. The collinear chart of the embodiments of FIGS. 77-82 applies to the drive system 510.

The present drive system 510 also includes the power distributing mechanism 16 functioning as a continuously-variable shifting portion or a first shifting portion, and the automatic transmission 512 functioning as a step-variable shifting portion or a second shifting portion. In this respect, the present embodiment has the same advantage as the embodiment of FIG. 77. Further, the power distributing mechanism 16 and. the automatic transmission 512 are not disposed coaxially with each other, and are disposed between the engine 8 and the counter gear pair CG, and the second electric motor M2 is disposed on the first axis 14c, so that the required dimension of the drive system in the axial direction can be favorably reduced.

Embodiment 29

Figure 84:
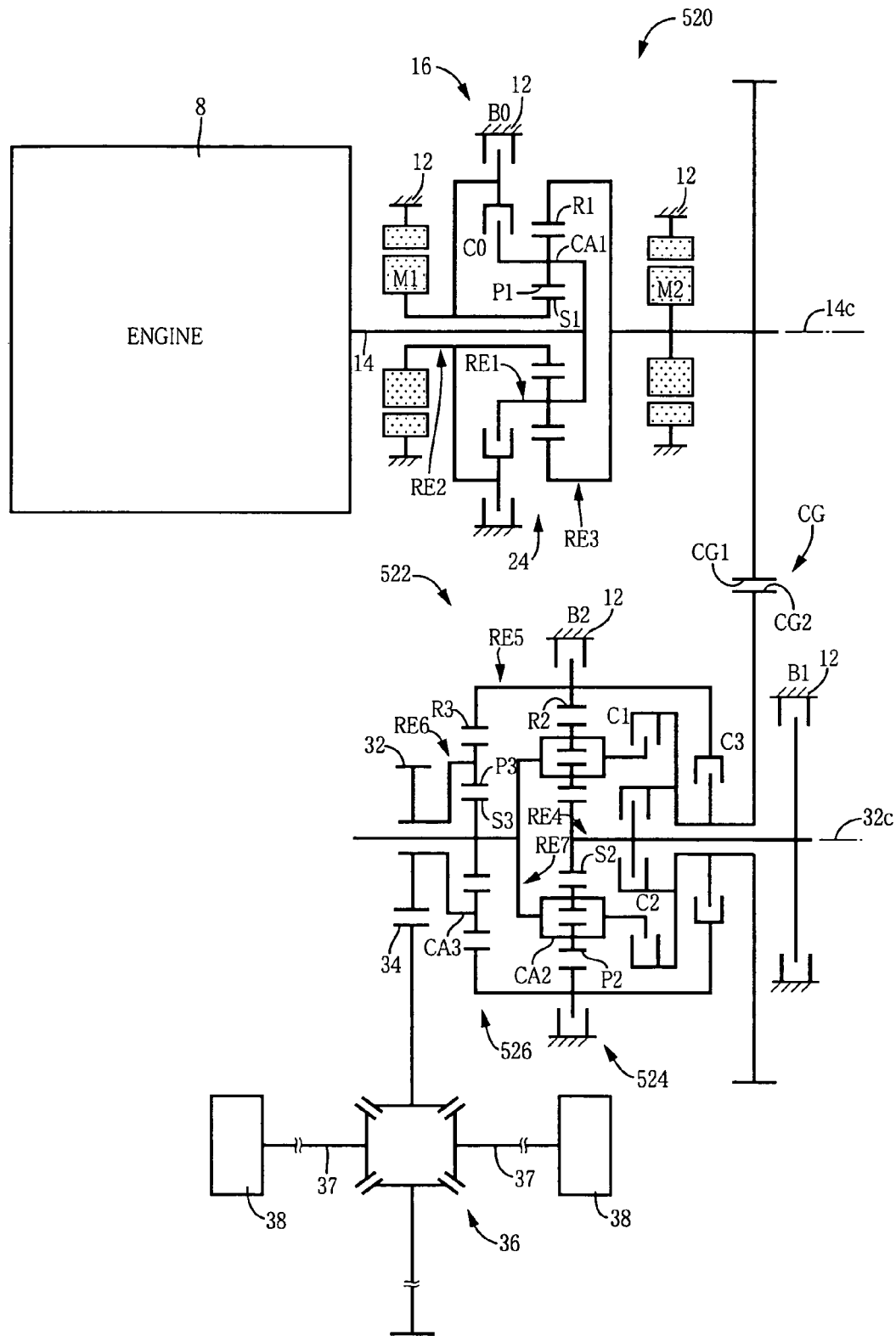
[FIG. 84] This figure is a schematic view for explaining an arrangement of a hybrid vehicle drive system according to another embodiment of this invention.

FIG. 84 is a schematic view for explaining an arrangement of a drive system 520 according to another embodiment of this invention. The present embodiment also includes the power distributing mechanism 16, the first electric motor M1, the second electric motor M2 and the counter gear pair CG, as in the embodiment shown in FIG. 80. The present embodiment is different from the embodiment of FIG. 80, only in the construction of a step-variable automatic transmission 522 disposed on the second axis 32c.

The automatic transmission 522 includes a double-pinion type second planetary gear set 524 and a single-pinion type third planetary gear set 526. The second planetary gear set 524 includes: a second sun gear S2; a plurality of pairs of mutually meshing second planetary gears P2; a second carrier CA2 supporting the second planetary gears P2 such that each second planetary gear P2 is rotatable about its axis and about the axis of the second sun gear S2; and a second ring gear R2 meshing with the second sun gear S2 through the second planetary gears P2. For example, the second planetary gear set 524 has a gear ratio ρ2 of about 0.539. The third planetary gear set 526 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 526 has a gear ratio ρ3 of about 0.460.

Like the automatic transmission 512 of FIG. 83, the automatic transmission 522 includes the first and second brakes B1, B2 and the first through third clutches C1-C3. The second sun gear S2 is selectively connected to a power transmitting member in the form of the counter driven gear CG2 of the counter gear pair CG through the second clutch C2, and selectively fixed to the casing 12 through the first brake B1. The second carrier CA2 and the third sun gear S3 are integrally fixed to each other and selectively connected to the counter driven gear CG2 through the first clutch C1. The second ring gear R2 and the third ring gear R3 are integrally fixed to each other and selectively connected to the counter driven gear CG2 through the third clutch C3, and selectively fixed to the casing 12 through the second brake B2. The third carrier CA3 is fixed to an output rotary member in the form of the differential drive gear 32.

The components of the automatic transmission 520 of the drive system 520 will be described. The first through third clutches C1-C3 are disposed between the second planetary gear set 524 and the counter driven gear CG2, such that the third clutch C3 is located closer to the counter driven gear CG2 than the first and second clutches C1, C2. The first brake B1 is disposed on one side of the counter driven gear CG2 which is remote from the third clutch C3, and the second planetary gear set 524 and the third planetary gear set 526 are disposed between the first and second clutches C, C2 and the differential drive gear 32.

The above-described second sun gear S2 functions as the fourth rotary element RE4, and the second ring gear R2 and third ring gear R3 integrally fixed to each other function as the fifth rotary element RE5. The third carrier CA3 functions as the sixth rotary element RE6, and the second carrier CA2 and third sun gear S3 integrally fixed to each other function as the seventh rotary element RE7. The collinear chart of the embodiments of FIGS. 77-83 applies to the drive system 520.

The present drive system 520 also includes the power distributing mechanism 16 functioning as a continuously-variable shifting portion or a first shifting portion, and the automatic transmission 522 functioning as a step-variable shifting portion or a second shifting portion, and the automatic transmission 522 is principally constituted by the two planetary gear sets 524, 526. In this respect, the present embodiment has the same advantage as the embodiment of FIG. 77. Further, the power distributing mechanism 16 and the automatic transmission 522 are not disposed coaxially with each other, and the second electric motor M2 is disposed on the first axis 14c, so that the required dimension of the drive system in the axial direction can be favorably reduced.

Embodiment 30

Figure 85:
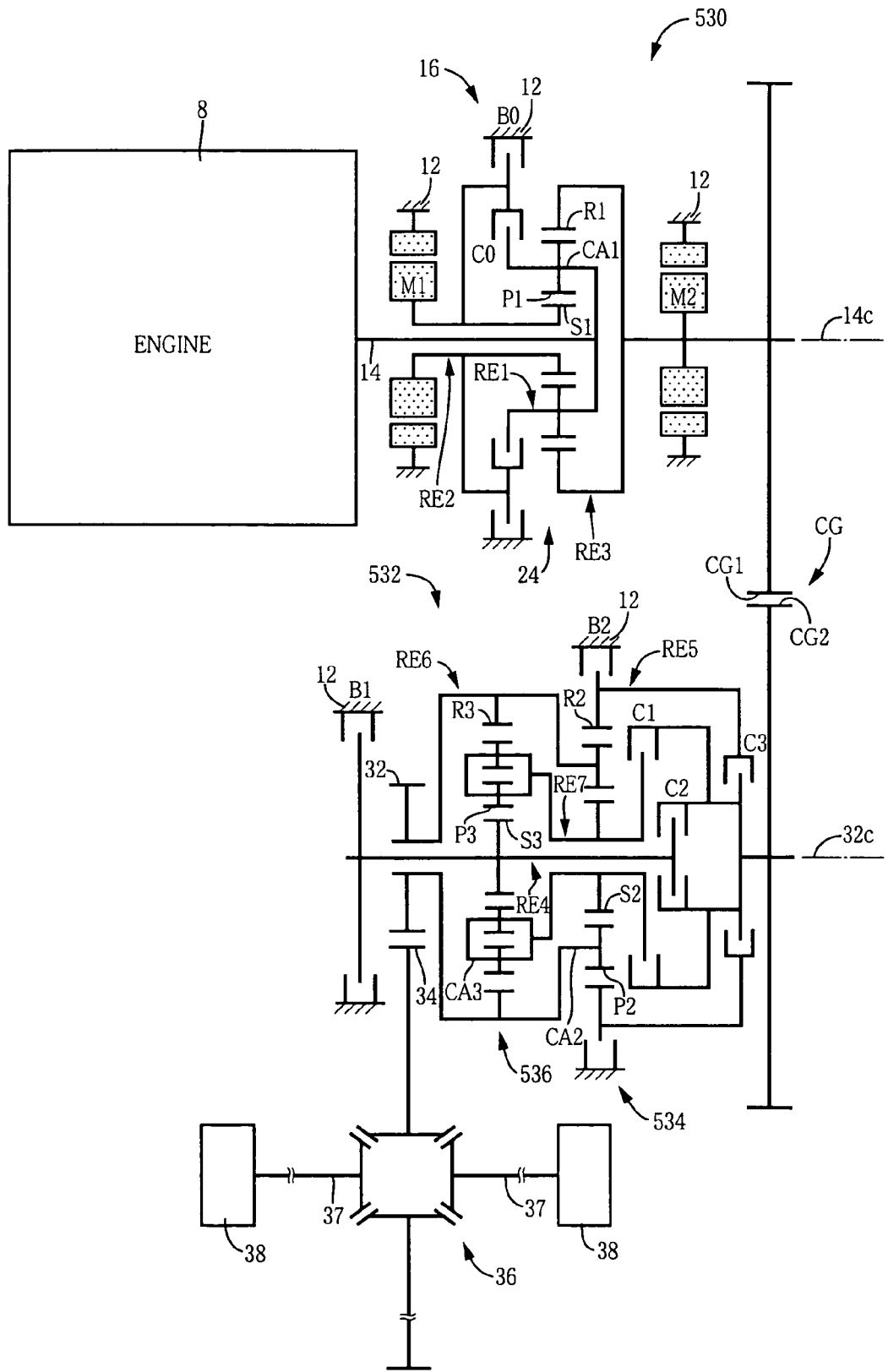
[FIG. 85] This figure is a schematic view for explaining an arrangement of a hybrid vehicle drive system according to another embodiment of this invention.

FIG. 85 is a schematic view for explaining an arrangement of a drive system 530 according to another embodiment of this invention. The drive system 530 of the present embodiment also includes the power distributing mechanism 16, the first electric motor M1, the second electric motor M2 and the counter gear pair CG, as in the embodiment shown in FIG. 80. The present embodiment is different from the embodiment of FIG. 80, only in the construction of a step-variable automatic transmission 532 disposed on the second axis 32c.

The automatic transmission 532 includes a single-pinion type second planetary gear set 534 and a double-pinion type third planetary gear set 536. The second planetary gear set 534 includes: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 534 has a gear ratio ρ2 of about 0.460. The third planetary gear set 536 has: a third sun gear S3, a plurality of pairs of mutually meshing third planetary gears P3; a third carrier CA3 supporting the third planetary gears P3 such that each third planetary gear P3 is rotatable about its axis and about the axis of the third sun gear S3; and a third ring gear R3 meshing with the third sun gear S2 through the third planetary gears P3. For example, the third planetary gear set 536 has a gear ratio ρ3 of about 0.369.

Like the automatic transmission 512 of FIG. 83 and the automatic transmission 522 of FIG. 84, the automatic transmission 530 includes the first and second brakes B1, B2 and the first through third clutches C1-C3. The second sun gear S2 and the third carrier CA3 are integrally fixed to each other and selectively connected to a power transmitting member in the form of the counter driven gear CG2 of the counter gear pair CG through the first clutch C1. The second carrier CA2 and the third ring gear R3 are integrally fixed to each other and fixed to an output rotary member in the form of the differential drive gear 32, and the second ring gear R2 is selectively connected to the counter driven gear CG2 through the third clutch C3 and selectively fixed to the casing 12 through the second brake B2. The second sun gear S2 is selectively connected to the counter driven gear CG2 through the second clutch C2 and selectively fixed to the casing through the first brake B1.

The components of the automatic transmission 532 of the drive system 530 will be described. The first through third clutches C1-C3 are disposed between the second planetary gear set 534 and the counter driven gear CG2, such that the third clutch C3 is located closer to the counter driven gear CG2 than the first and second clutches C1, C2. The first brake B1 is disposed on one side of the differential drive gear 32 which is remote from the third planetary gear set 536. In other words, the differential drive gear 32 is disposed between the first brake B1 and the third planetary gear set 536.

The above-described third sun gear S3 functions as the fourth rotary element RE4, and the second ring gear R2 functions as the fifth rotary element RE5. The second carrier CA2 and third ring gear R3 integrally fixed to each other function as the sixth rotary element RE6, and the second sun gear S3 and third carrier CA3 integrally fixed to each other function as the seventh rotary element RE7. The collinear chart of the embodiments of FIGS. 77-84 applies to the drive system 530.

The present drive system 530 also includes the power distributing mechanism 16 functioning as a continuously-variable shifting portion or a first shifting portion, and the automatic transmission 532 functioning as a step-variable shifting portion or a second shifting portion, and the automatic transmission 532 is principally constituted by the two planetary gear sets 534, 536. In this respect, the present embodiment has the same advantage as the embodiment of FIG. 77. Further, the power distributing mechanism 16 and the automatic transmission 532 are not disposed coaxially with each other, and the power distributing mechanism 16 and the automatic transmission 532 are disposed between the engine 8 and the counter gear pair CG, and the second electric motor M2 is disposed on the first axis 14c, so that the required dimension of the drive system in the axial direction can be favorably reduced, as in the embodiment of FIG. 80.

Embodiment of FIG. 31

Figure 86:
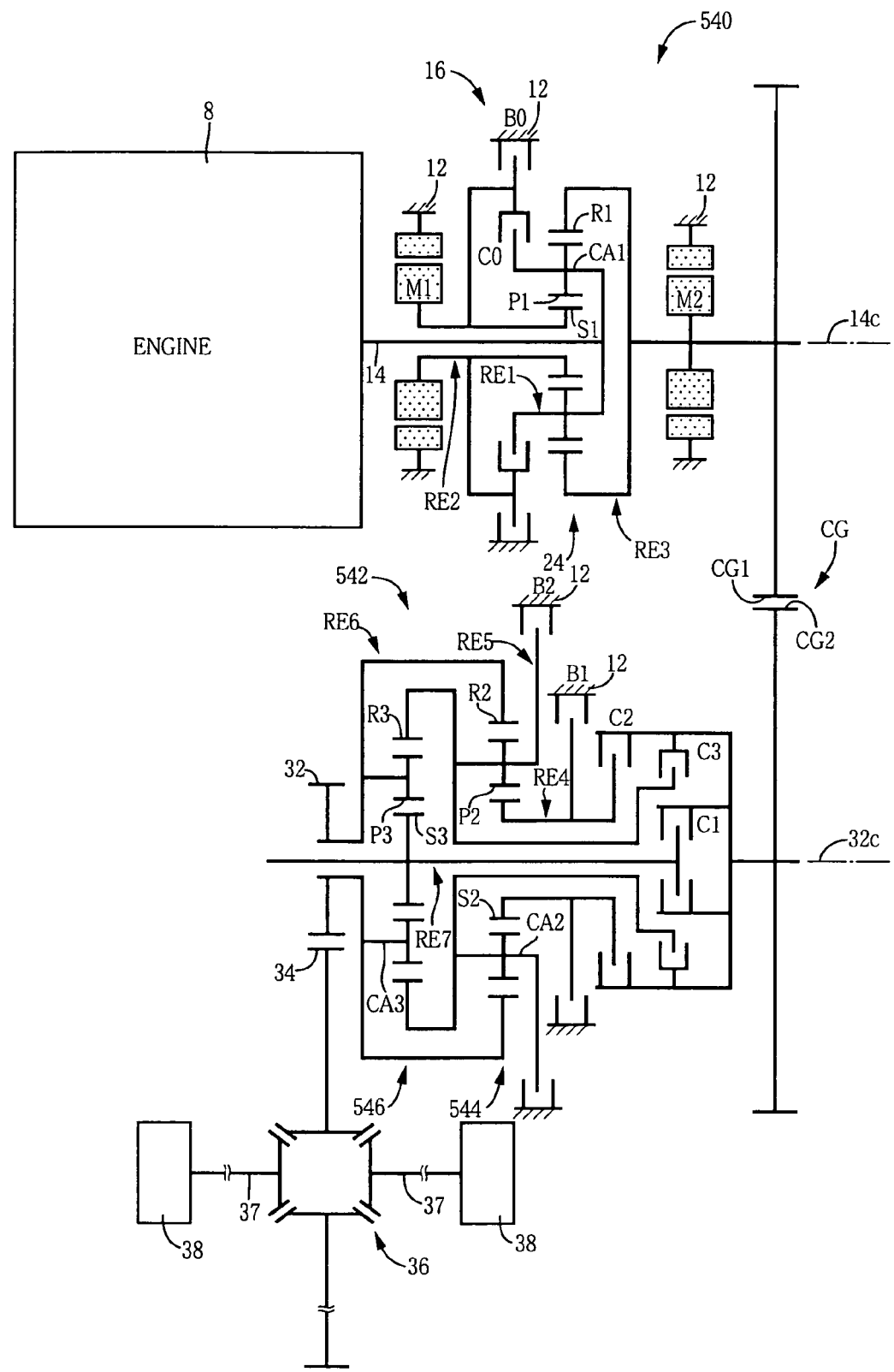
[FIG. 86] This figure is a schematic view for explaining an arrangement of a hybrid vehicle drive system according to another embodiment of this invention.

FIG. 86 is a schematic view for explaining an arrangement of a drive system 540 according to another embodiment of this invention. The drive system 540 of the present embodiment also includes the power distributing mechanism 16, the first electric motor M1, the second electric motor M2 and the counter gear pair CG, as in the embodiment shown in FIG. 80. The present embodiment is different from the embodiment of FIG. 80, only in the construction of a step-variable automatic transmission 542 disposed on the second axis 32c.

The automatic transmission 542 includes a single-pinion type second planetary gear set 544 and a single-pinion type third planetary gear set 546. The second planetary gear set 544 includes: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 544 has a gear ratio ρ2 of about 0.368. The third planetary gear set 546 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 546 has a gear ratio ρ3 of about 0.460. The automatic transmission 542 includes the first and second brakes B1, B2 and the first through third clutches C1-C3, as in the automatic transmission 522 of FIG. 84.

The second sun gear S2 is selectively connected to a power transmitting member in the form of the counter driven gear CG2 of the counter gear pair CG through the second clutch C2, and is selectively fixed to the casing 12 through the first brake B1. The second carrier CA2 and third ring gear R3 that are integrally fixed to each other are selectively connected to the counter driven gear CG2 through the third clutch C3, and are selectively fixed to the casing 12 through the second brake B2. The second ring gear R2 and third carrier CA3 are integrally fixed to each other and to the differential drive gear 32. The third sun gear S3 is selectively connected to the counter driven gear CG2 through the first clutch C1.

The components of the drive system 540 are identical with those of the embodiment shown in FIG. 80. That is, the power distributing mechanism 16 is disposed between the engine 8 and the counter gear pair CG, and adjacent to the counter gear pair CG. The second electric motor M2 is disposed on the first axis 14c, between the first planetary-gear set 544 and the counter gear pair CG, and adjacent to the counter gear pair CG. The automatic transmission 542 is disposed between the counter gear pair CG and the differential drive gear 32 (engine 8), and adjacent to the counter gear pair CG.

The above-described second sun gear S2 functions as the fourth rotary element RE4, and the second carrier CA2 and third ring gear R3 integrally fixed to each other function as the fifth rotary element RE5. The second ring gear R2 and third carrier CA3 integrally fixed to each other function as the sixth rotary element RE6, and the third sun gear S3 functions as the seventh rotary element RE7. The collinear chart of the embodiments of FIGS. 77-85 applies to the drive system 540.

The automatic transmission 540 of the present embodiment also includes the power distributing mechanism 16 functioning as a continuously-variable shifting portion or a first shifting portion, and the automatic transmission 542 functioning as a step-variable shifting portion or a second shifting portion, and the automatic transmission 542 is principally constituted by the two planetary gear sets 544, 546. In this respect, the present embodiment has the same advantage as the embodiment of FIG. 77. Further, the power distributing mechanism 16 and the automatic transmission 542 are not disposed coaxially with each other, and the power distributing mechanism 16 and the automatic transmission 542 are disposed between the engine 8 and the counter gear pair CG, and the second electric motor M2 is disposed on the first axis 14c, so that the required dimension of the drive system in the axial direction can be favorably reduced, as in the embodiment of FIG. 80.

Embodiment 32

Figure 87:
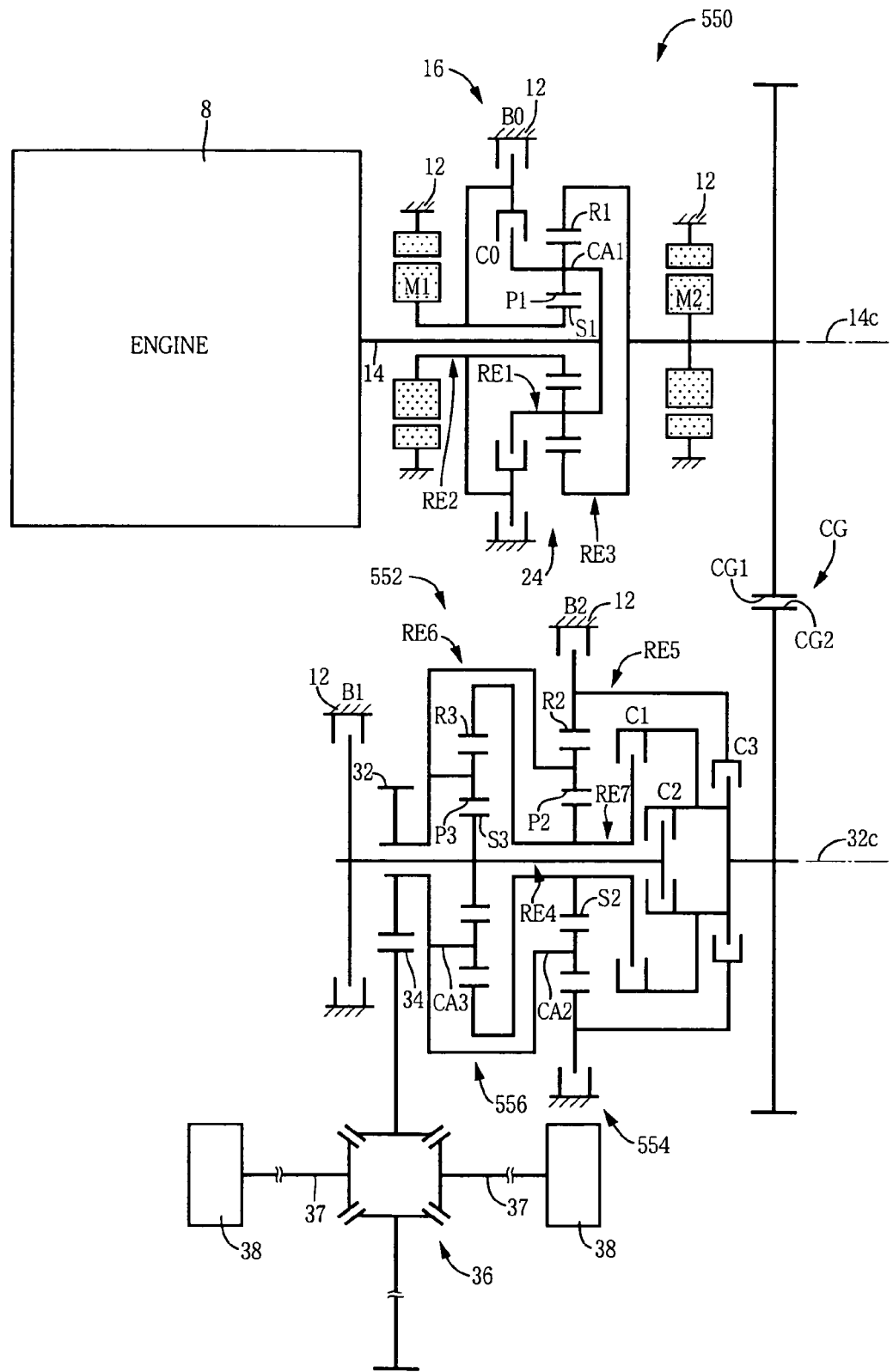
[FIG. 87] This figure is a schematic view for explaining an arrangement of a hybrid vehicle drive system according to another embodiment of this invention.

FIG. 87 is a schematic view for explaining an arrangement of a drive system 550 according to another embodiment of this invention. The drive system 550 of the present embodiment also includes the power distributing mechanism 16, the first electric motor M1, the second electric motor M2 and the counter gear pair CG, as in the embodiment shown in FIG. 80. The present embodiment is different from the embodiment of FIG. 80, only in the construction of a step-variable automatic transmission 552 disposed on the second axis 32c.

The automatic transmission 552 includes a single-pinion type second planetary gear set 554 and a single-pinion type third planetary gear set 556. The second planetary gear set 554 includes: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 544 has a gear ratio ρ2 of about 0.460. The third planetary gear set 556 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 556 has a gear ratio ρ3 of about 0.585. The automatic transmission 552 includes the first and second brakes B1, B2 and the first through third clutches C1-C3, as in the automatic transmission 522 of FIG. 84.

The second sun gear S2 and third ring gear R3 are integrally fixed to each other and selectively connected to a power transmitting member in the form of the counter driven gear CG2 of the counter gear pair CG through the first clutch C1. The second carrier CA2 and third carrier CA3 are integrally fixed to each other and to an output rotary member in the form of the differential drive gear 32. The second ring gear R2 is selectively connected to the counter drive gear CG2 through the third clutch C3 and selectively fixed to the casing 12 through the second brake B2. The third sun gear S3 is selectively connected to the counter driven gear CG2 through the first clutch C1 and selectively fixed to the casing 12 through the first brake B1. The components of the drive system 550 are identical with those of the preceding embodiment of FIG. 87.

The above-described third sun gear S3 functions as the fourth rotary element RE4, and the second ring gear R2 functions as the fifth rotary element RE5. The second carrier CA2 and third carrier CA3 integrally fixed to each other function as the sixth rotary element RE6, and the second sun gear S2 and third ring gear R3 integrally fixed to each other function as the seventh rotary element RE7. The collinear chart of the embodiments of FIGS. 77-86 applies to the drive system 550.

The automatic transmission 550 of the present embodiment also includes the power distributing mechanism 16 functioning as a continuously-variable shifting portion or a first shifting portion, and the automatic transmission 552 functioning as a step-variable shifting portion or a second shifting portion, and the automatic transmission 552 is principally constituted by the two planetary gear sets 554, 556. In this respect, the present embodiment has the same advantage as the embodiment of FIG. 77. Further, the power distributing mechanism 16 and the automatic transmission 552 are not disposed coaxially with each other, and the power distributing mechanism 16 and the automatic transmission 552 are disposed between the engine 8 and the counter gear pair CG, and the second electric motor M2 is disposed on the first axis 14c, so that the required dimension of the drive system in the axial direction can be favorably reduced, as in the embodiment of FIG. 80.

Embodiment 33

Figure 88:
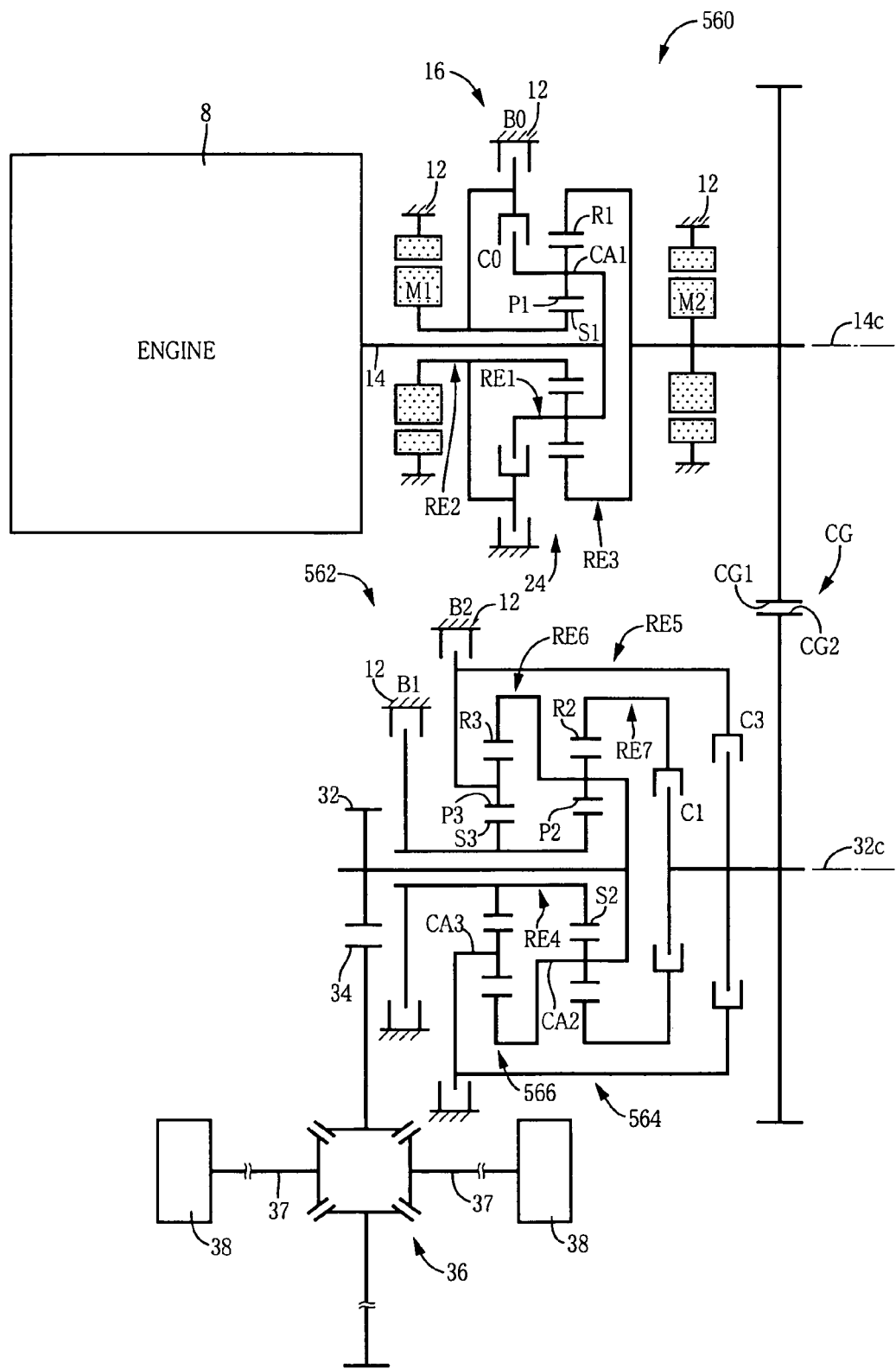
[FIG. 88] This figure is a schematic view for explaining an arrangement of a hybrid vehicle drive system according to another embodiment of this invention.

FIG. 88 is a schematic view for explaining a drive system 560 according to another embodiment of this invention. The drive system 560 of the present embodiment includes the power distributing mechanism 16, the first electric motor M1, the second electric motor M2 and the counter gear pair CG, as in the embodiment shown in. FIG. 80. The first and second electric motors M1, M2 and the counter drive gear CG1 of the counter gear pair CG are connected to the power distributing mechanism 16 in the same manner as in the embodiment of FIG. 80.

The counter driven gear CG2 and the differential drive gear 32 are disposed on the second axis 32c parallel to the first axis 14c. An automatic transmission 562 is disposed on the second axis 32c, between the counter driven gear CG2 and the differential drive gear 32.

The automatic transmission 562 includes a single-pinion type second planetary gear set 564 having a predetermined gear ratio ρ2 of about 0.585, for example, and a single-pinion type third planetary gear set 566 having a predetermined gear ratio ρ3 of about 0.368, for example. The automatic transmission 562 includes the first and second brakes B1, B2 and the first and third clutches C1, C3. Each of the two brakes B1, B2 and the two clutches C1, C3 is of a wet-type multiple-disc type having a plurality of friction plates which are superposed on each other and which are forced against each other by a hydraulic actuator.

In the automatic transmission 562, the second sun gear S2 and third sun gear S3 are integrally fixed to each other and selectively fixed to the casing 12 through the first brake B1, and the second carrier CA2 and third ring gear R3 are integrally fixed to each other and to an output rotary member in the form of the differential drive gear 32. The second ring gear R2 is selectively connected to a power transmitting member in the form of the counter driven gear CG2 of the counter gear pair CG, and the third carrier CA3 is selectively connected to the counter driven gear CG2 through the third clutch C3 and selectively fixed to the casing 12 through the second brake B2.

Figure 89:
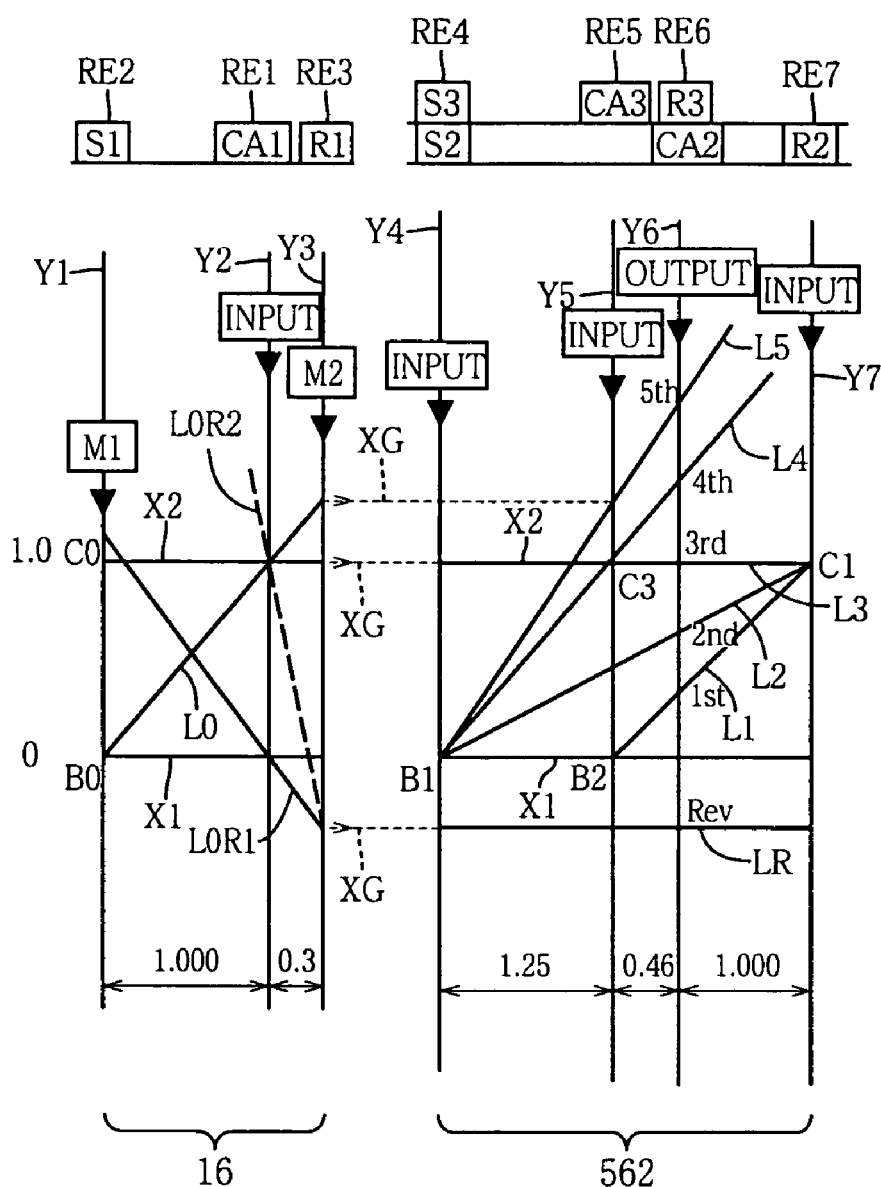
[FIG. 89] This figure is an example of a collinear chart for explaining an shifting operation of the drive system of the embodiment of FIG. 88.

FIG. 89 is a collinear chart showing an example of the shifting operation of the drive system 560. As indicated in this collinear chart, the second sun gear S2 and third sun gear S3 integrally fixed to each other function as the fourth rotary element RE4, and the third carrier CA3 functions as the fifth rotary element RE5. Further, the second carrier CA2 and third ring gear R3 integrally fixed to each other function as the sixth rotary element RE6, and the ring gear R2 functions as the seventh rotary element RE7. In the first planetary gear set 24, the first sun gear S1 functions as the second rotary element RE2, and the first carrier CA1 functions as the first rotary element RE1, while the first ring gear R1 functions as the third rotary element RE3.

The first-gear position is established when the switching clutch C0, first clutch C1 and second brake B2 are engaged, and the second-gear position is established when the switching clutch C0, first clutch C1 and first brake B1 are engaged. The third-gear position is established when the switching clutch C0, first clutch C1 and third clutch C3 are engaged, and the fourth-gear position is established when the switching clutch C3, third clutch C3 and first brake B1 are engaged. The fifth-gear position is established when the switching brake B0, third clutch C3 and first brake B1 are engaged. The first-gear position through the fifth-gear positions have respective gear ratios γ1-γ5 similar to those in the preceding embodiments.

The reverse-gear position is established by reverse rotation of the third rotary element RE3 (first ring gear R1) which is caused by rotation of the second electric motor M2 in the direction opposite to the direction of rotation of the engine 8, and by engaging actions of the first clutch C1 and third clutch C3 to transmit a rotary motion of the third rotary element RE3 to the differential drive gear 32. The gear ratio of this reverse-gear position is continuously variable by controlling the rotating speed of the second electric motor M2. In the reverse-gear position, the rotating speed of the first rotary element RE1 (first carrier CA1) is zero, as indicated by a straight line L0R1, that is, the engine 8 is at rest. Where the amount of electric energy stored for operating the second electric motor M2 is smaller than a lower limit, the engine 8 is operated to operate the first electric motor M1, as indicated by a straight line L0R2, so that the second electric motor M2 can be operated with an electric energy generated by the first electric motor M1.

The table of FIG. 90 indicates a relationship between the gear positions of the above-described drive system 560 and combinations of the hydraulically operated frictional coupling devices that are engaged to establish the respective gear positions. As indicated in this table of FIG. 90 by way of example, the neutral position "N" is established by engaging only the second clutch C2.

The present drive system 560 also includes the power distributing mechanism 16 functioning as a continuously-variable shifting portion or a first shifting portion, and the automatic transmission 562 functioning as a step-variable shifting portion or a second shifting portion. The automatic transmission 562 is principally constituted by the two planetary gear sets 564, 566, and has the same advantage as that in the embodiment of FIG. 77. Further, the power distributing mechanism 16 and the automatic transmission 562 are not disposed coaxially with each other, and are disposed between the engine 8 and the counter gear pair CG, while the second electric motor M2 is disposed on the first axis 14c, so that the required dimension of the drive system in the axial direction can be favorably reduced, as in the embodiment of FIG. 80. In the absence of the second clutch C2 provided in the embodiments of FIGS. 77-87, the size and the axial dimension of the drive system 560 are further reduced.

Embodiment 34

Figure 91:
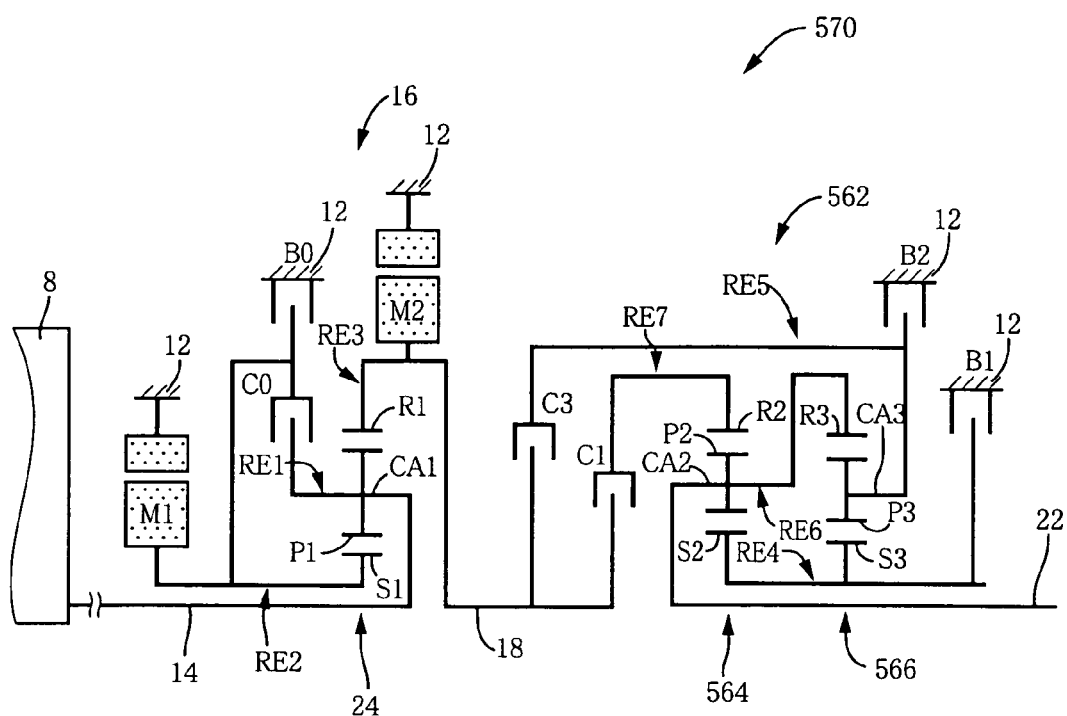
[FIG. 91] This figure is a schematic view for explaining an arrangement of a hybrid vehicle drive system according to another embodiment of this invention.

FIG. 91 is a schematic view for explaining a drive system 570 according to another embodiment of this invention. The present embodiment is different from the preceding embodiment of FIG. 88, primarily in that the power distributing mechanism 16 and the automatic transmission 562 are disposed coaxially with each other. Namely, the drive system 570 of the present embodiment is different from the embodiment of FIG. 88, only in the use of the power transmitting member 18 in place of the counter gear pair CG, and in that the automatic transmission 562 is disposed coaxially with the output shaft 22, between the power transmitting member 18 and the output shaft 22.

The present drive system 570 also includes the power distributing mechanism 16 functioning as a continuously-variable shifting portion or a first shifting portion, and the automatic transmission 562 functioning as a step-variable shifting portion or a second shifting portion. The automatic transmission 562 is principally constituted by the two planetary gear sets 564, 566, and has the same advantage as that in the embodiment of FIG. 77. Further, in the absence of the second clutch C2 provided in the embodiments of FIGS. 77-87, the size and the axial dimension of the drive system 570 are further reduced.

Embodiment 35

Figures 92, 93:
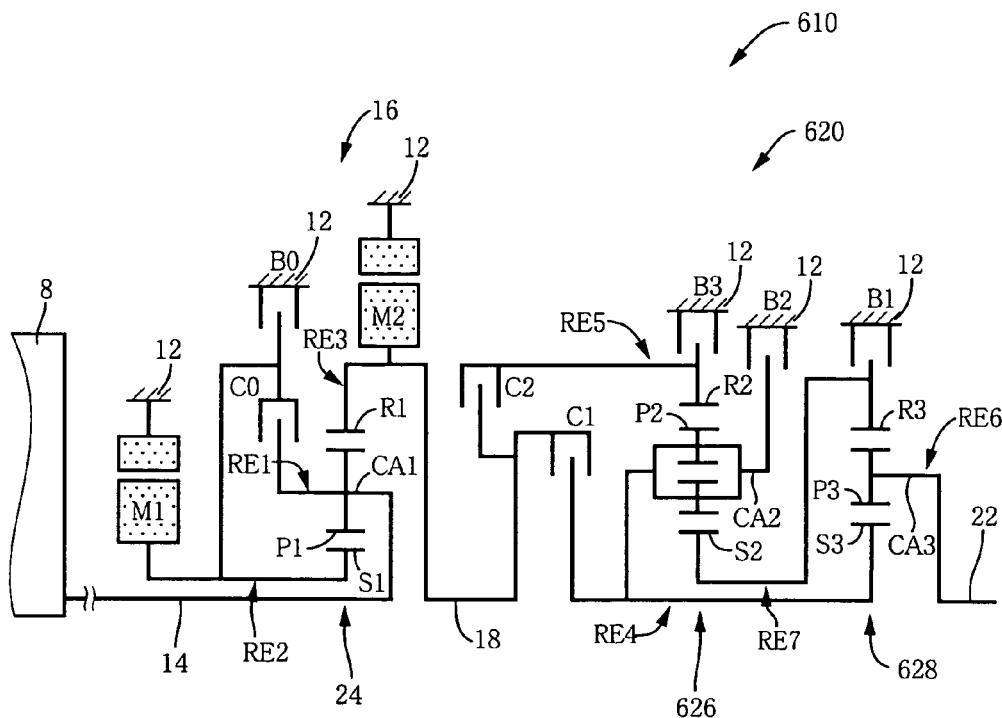
[FIG. 92] This figure is a schematic view for explaining an arrangement of a hybrid vehicle drive system according to another embodiment of this invention.
[FIG. 93] This figure is a table indicating shifting-actions of the drive system of the hybrid vehicle of the embodiment of FIG. 92 operable in a continuously variable shifting state or a step-variable shifting state, in relation to different combinations of operating states of hydraulically operated frictional coupling devices to effect the respective shifting actions.

FIG. 92 is a schematic view explaining a drive system 460 for a hybrid vehicle, according to another embodiment of this invention. The drive system 610 shown in FIG. 92 includes: an input rotary member in the form of an input shaft 14 disposed on a common axis in a transmission casing 12 (hereinafter abbreviated as "casing 12") functioning as a stationary member attached to a body of the vehicle; a differential mechanism in the form of a power distributing mechanism 16 connected to the input shaft 14 either directly, or indirectly via a pulsation absorbing damper (vibration damping device) not shown; a step-variable or multiple-step automatic transmission 620 interposed between and connected in series via a power transmitting member 18 (power transmitting shaft) to the power distributing mechanism 16 and an output shaft 22; and an output rotary member in the form of the above-indicated output shaft 22 connected to the automatic transmission 20. The input shaft 12, power distributing mechanism 16, automatic transmission 620 and output shaft 22 are connected in series with each other. This drive system 610 is suitably used for a transverse FR vehicle (front-engine, rear-drive vehicle), and is disposed between a drive power source in the form of an engine 8 and a pair of drive wheels 38, to transmit a vehicle drive force to the pair of drive wheels 38 through a differential gear device 36 (final speed reduction gear) and a pair of drive axles, as shown in FIG. 7. It is noted that a lower half of the drive system 610, which is constructed symmetrically with respect to its axis, is omitted in FIG. 77.

The automatic transmission 620 includes a double-pinion type second planetary gear set 626, and a single-pinion type third planetary gear set 628. The second planetary gear set 426 has: a second sun gear S2; a plurality of pairs of mutually meshing second planetary gears P2; a second carrier CA2 supporting the second planetary gears P2 such that each second planetary gear P2 is rotatable about its axis and about the axis of the second sun gear S2; and a second ring gear R2 meshing with the second sun gear S2 through the second planetary gears P2. For example, the second planetary gear set 626 has a gear ratio $\rho 2$ of about 0.529. The third planetary gear set 428 has: a third sun gear S3, a third planetary gear P3 P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 628 has a gear ratio $\rho 3$ of about 0.417. Where the numbers of teeth of the second sun gear S2, second ring gear R2, third sun gear S3, third ring gear R3, are represented by ZS2, ZR2, ZS3 and ZR3, respectively, the above-indicated gear ratios $\rho 2$ and $\rho 3$ are represented by ZS2/ZR2 and ZS3/ZR3, respectively.

In the automatic transmission 620, the second sun gear S2 and the third ring gear R3 are selectively fixed to the casing 12 through a first brake B1. The second carrier CA2 and the third sun gear S3 are selectively connected to the power transmitting member 18 through a first clutch C1 and selectively fixed to the casing through a second brake B2. The second ring gear R2 is selectively connected to the power transmitting member 18 through a second clutch C2 and selectively fixed to the casing 12 through a third brake B3. The third carrier CA3 is fixed to the output shaft 22.

The above-described switching clutch C0, first clutch C1, second clutch C2, switching brake B0, first brake B1, second brake B2 and third brake B3 are hydraulically operated frictional coupling devices used in a conventional vehicular automatic transmission. For example, each of these frictional coupling devices is constituted by a wet-type multiple-disc coupling device including a plurality of friction plates which are superposed on each other and which are forced against each other by a hydraulic actuator, to selective connect two members between which the coupling device is interposed.

In the drive system 610 constructed as described above, one of a first-gear position (first-speed position) through a fifth-gear position (fifth-speed position), a reverse-gear position (rear-drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 93. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having a single gear position with one speed ratio or a plurality of gear positions with respective speed ratios, as well as in the continuously-variable shifting state in which the mechanism 16 is operable as a continuously variable transmission, as described above. In the present drive system 610, therefore, a step-variable transmission is constituted by the automatic transmission 620, and the power distributing mechanism 16 which is placed in the fixed-speed-ratio shifting state by engagement of the switching clutch C0 or switching brake B0. Further, a continuously variable transmission is constituted by the automatic transmission 620, and the power distributing mechanism 16 which is placed in the continuously-variable shifting state, with none of the switching clutch C0 and brake B0 being engaged.

Where the drive system 610 functions as the step-variable transmission, for example, the first-gear position having the highest speed ratio $\gamma 1$ of about 3.500, for example, is established by engaging actions of the switching clutch C0, first clutch C1 and first brake B1, and the second-gear position having the speed ratio $\gamma 2$ of about 1.600, for example, which is lower than the speed ratio $\gamma 1$, is established by engaging actions of the switching clutch C0, second clutch C2 and first brake B1, as indicated in FIG. 93. The speed ratio is equal to the input shaft speed $N_{IN}$/output shaft speed $N_{OUT}$. Further, the third-gear position having the speed ratio $\gamma 3$ of about 1.000, for example, which is lower than the speed ratio $\gamma 2$, is established by engaging actions of the switching clutch C0, first clutch C1 and second clutch C2, and the fourth-gear position having the speed ratio $\gamma 4$ of about 0.760, for example, which is lower than the speed ratio $\gamma 3$, is established by engaging actions of the switching clutch C0, second clutch C2 and second brake B2. The fifth-gear position having the speed ratio $\gamma 5$ of about 0.585, for example, which is smaller than the speed ratio $\gamma 4$, is established by engaging actions of the second clutch C2, switching brake B0 and second brake B2. Further, the reverse-gear position having the speed ratio $\gamma R$ of about 2.717, for example, which is intermediate between the speed ratios $\gamma 1$ and $\gamma 2$, is established by engaging actions of the first clutch C1 and the third brake B3. The neutral position N is established by engaging only the first clutch C1.

Where the drive system 610 functions as the continuously-variable transmission, on the other hand, the switching clutch C0 and the switching brake B0 are both released, as indicated in FIG. 93, so that the power distributing mechanism 16 functions as the continuously variable transmission, while the automatic transmission 620 connected in series to the power distributing mechanism 16 functions as the step-variable transmission, whereby the speed of the rotary motion transmitted to the automatic transmission 620 placed in one of the first-gear, second-gear, third-gear and fourth-gear positions, namely, the rotating speed of the power transmitting member 18 is continuously changed, so that the speed ratio of the drive system when the automatic transmission 620 is placed in one of those gear positions is continuously variable over a predetermined range. Accordingly, the speed ratio of the automatic transmission 620 is continuously variable across the adjacent gear positions, whereby the overall speed ratio $\gamma T$ of the drive system 610 is continuously variable.

Figure 94:
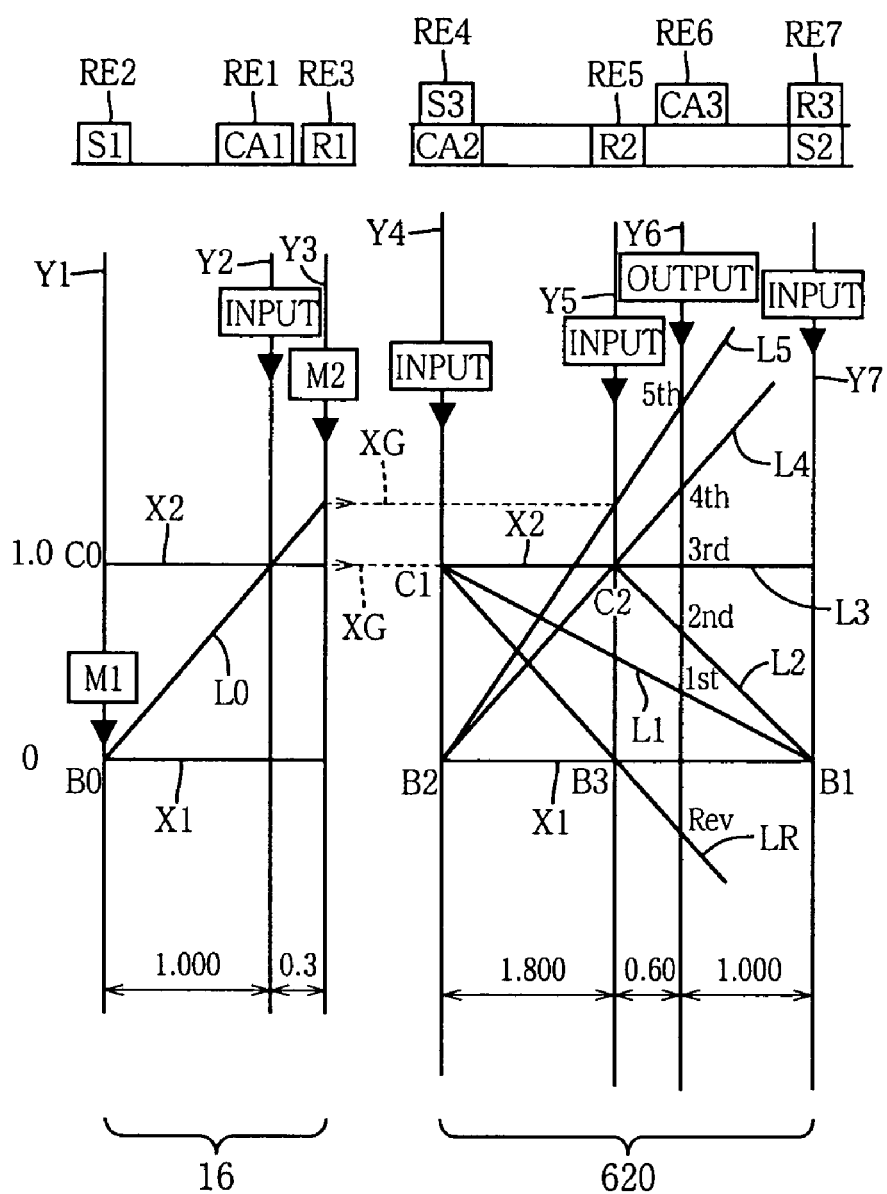
[FIG. 94] This figure is a collinear chart showing relative rotating speeds of rotary elements of the drive system of the hybrid vehicle of the embodiment of FIG. 92 operated in the step-variable shifting state, in different gear positions of the drive system.

The collinear chart of FIG. 94 indicates, by straight lines, a relationship among the rotating speeds of the rotary elements in each of the gear positions of the drive system 610, which is constituted by the power distributing mechanism 16 functioning as the continuously-variable shifting portion or first shifting portion, and the automatic transmission 620 functioning as the step-variable shifting portion or second shifting portion. The collinear chart of FIG. 94 is a rectangular two-dimensional coordinate system in which the gear ratios ρ of the planetary gear sets 624, 626, 628 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18. Three vertical lines Y1, Y2 and Y3 corresponding to the power distributing mechanism 16 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 624. That is, the distance between the vertical lines Y1 and Y2 corresponds to "1", while the distance between the vertical lines Y2 and Y3 corresponds to the gear ratio ρ1. Further, five vertical lines Y4, Y5, Y6 and Y7 corresponding to the automatic transmission 20 respectively represent the relative rotating speeds of a fourth rotary element (fourth element) RE4 in the form of the second carrier S2 and third sun gear S3 that are integrally fixed to each other, a fifth rotary element (fifth element) RE5 in the form of the second ring gear R2, a sixth rotary element (sixth element) RE6 in the form of the third carrier CA3, and a seventh rotary element (seventh element) RE7 in the form of the second sun gear S2 and third ring gear R3 that are integrally fixed to each other. The distances between the adjacent ones of the vertical lines Y4-Y7 are determined by the gear ratios ρ2 and ρ3 of the second and third planetary gear sets 626, 628.

Referring to the collinear chart of FIG. 94, the power distributing mechanism (continuously variable shifting portion) 16 of the drive system 610 is arranged such that the first rotary element RE1 (first carrier CA1), which is one of the three rotary elements of the first planetary gear set 624, is integrally fixed to the input shaft 14 and selectively connected to the second rotary element RE2 in the form of the first sun gear S1 through the switching clutch C0, and this second rotary element RE2 (first sun gear S1) is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted to the automatic transmission (step-variable transmission) 620 through the power transmitting member 18. A relationship between the rotating speeds of the first sun gear S1 and the first ring gear R1 is represented by an inclined straight line L0 which passes a point of intersection between the lines Y2 and X2.

FIGS. 4 and 5 correspond to a part of the collinear chart of FIG. 94 which shows the power distributing mechanism 16. FIG. 4 shows an example of an operating state of the power distributing mechanism 16 placed in the continuously-variable shifting state with the switching clutch C0 and the switching brake B0 held in the released state. The rotating speed of the first sun gear S1 represented by the point of intersection between the straight line L0 and vertical line Y1 is raised or lowered by controlling the reaction force generated by an operation of the first electric motor M1 to generate an electric energy, so that the rotating speed of the first ring gear R1 represented by the point of intersection between the lines L0 and Y3 is lowered or raised. In the operating state of FIG. 4, the first sun gear S1 is rotated in the negative direction, with the first electric motor M1 being operated by application of an electric energy thereto. While the first sun gear S1 is rotated in the negative direction as indicated in FIG. 4, the angle of inclination of the straight line L0 is relatively large, indicating an accordingly high speed of rotation of the first ring gear R1 and the power transmitting member 18, making it possible to drive the vehicle at a relatively high speed. On the other hand, the application of the electric energy to the first electric motor M1 results in deterioration of the fuel economy. In the drive system 610 according to the present embodiment, however, the automatic transmission 620 is arranged to increase the speed of a rotary motion transmitted through the power transmitting member 18, as described below, so that there is not a high degree of opportunity wherein the first sun gear S1 must be rotated in the negative direction. Accordingly, the fuel economy is higher in the present drive system than in the case where the automatic transmission 620 were not able to increase the speed of the rotary motion transmitted through the power transmitting member 18.

FIG. 5 shows an example of an operating state of the power distributing mechanism 16 placed in the step-variable shifting state with the switching clutch C0 held in the engaged state. When the first sun gear S1 and the first carrier CA1 are connected to each other in this step-variable shifting state, the three rotary elements indicated above are rotated as a unit, so that the line L0 is aligned with the horizontal line X2, whereby the power transmitting member 18 is rotated at a speed equal to the engine speed $N_E$. When the switching brake B0 is engaged, on the other hand, the rotation of the power transmitting member 18 is stopped, so that the straight line L0 is inclined in the state indicated in FIG. 94, whereby the rotating speed of the first ring gear R1, that is, the rotation of the power transmitting member 18 represented by a point of intersection between the straight line L0 and vertical line Y3 is made higher than the engine speed $N_E$ and transmitted to the automatic transmission 620.

In the automatic transmission 620, the fourth rotary element RE4 is selectively connected to the power transmitting member 18 through the first clutch C1, and selectively fixed to the transmission casing 12 through the second brake B2, and the fifth rotary element RE5 is selectively connected to the power transmitting member 18 through the second clutch C2 and selectively fixed to the casing 12 through the third brake B3. The sixth rotary element RE6 is fixed to the output shaft 22, while the seventh rotary element RE7 is selectively connected to the casing 12 through the first brake B1.

When the first clutch C1 and the first brake B1 are engaged, the automatic transmission 620 is placed in the first-speed position. The rotating speed of the output shaft 22 in the first-speed position is represented by a point of intersection between the vertical line Y6 indicative of the rotating speed of the sixth rotary element RE6 fixed to the output shaft 22 and an inclined straight line L1 which passes a point of intersection between the vertical line Y4 indicative of the rotating speed of the fourth rotary element RE4 and the horizontal line X2, and a point of intersection between the vertical line Y7 indicative of the rotating speed of the seventh rotary element RE7 and the horizontal line X1. Similarly, the rotating speed of the output shaft 22 in the second-speed position established by the engaging actions of the second clutch C1 and first brake B1 is represented by a point of intersection between an inclined straight line L2 determined by those engaging actions and the vertical line Y6 indicative of the rotating speed of the sixth rotary element RE6 fixed to the output shaft 22. The rotating speed of the output shaft 22 in the third-speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. The rotating speed of the output shaft 22 in the fourth-speed position established by the engaging actions of the second brake B2 and second clutch C2 is represented by a point of intersection between a horizontal line L4 determined by those engaging actions and the vertical line Y6 indicative of the rotating speed of the sixth rotary element RE6 fixed to the output shaft 22. In the fourth-speed position, the output speed of the automatic transmission is higher than the rotating speed of the power transmitting member 18. In the first-speed through fourth-speed positions in which the switching clutch C0 is placed in the engaged state, the fifth rotary element RE5 is rotated at the same speed as the engine speed $N_E$, with the drive force received from the power distributing mechanism 16. When the switching clutch B0 is engaged in place of the switching clutch C0, the sixth rotary element RE6 is rotated at a speed higher than the engine speed $N_E$, with the drive force received from the power distributing mechanism 16. The rotating speed of the output shaft 22 in the fifth-speed position established by the engaging actions of the second brake B2, second clutch C2 and switching brake B0 is represented by a point of intersection between a horizontal line L5 determined by those engaging actions and the vertical line Y6 indicative of the rotating speed of the sixth rotary element RE6 fixed to the output shaft 22. In this fifth-speed position, too, the output speed of the automatic transmission is higher than the rotating speed of the power transmitting member 18. The rotating speed of the output shaft 22 in the reverse-gear position R established by the first clutch C1 and third brake B3 is represented by a point of intersection between an inclined straight line LR determined by those engaging actions and the vertical line Y6 indicative of the rotating speed of the sixth rotary element RE6 fixed to the output shaft 22.

In the drive system 610 constructed as described above, the electronic control unit 40 shown in FIG. 6 having the control functions shown in FIG. 7 or FIG. 11 by way of example performs the hybrid controls of the engine 8 and the first and second electric motors M1, M2, the shifting control of the automatic transmission 20, and other vehicle drive controls.

In the drive system 610 of the present embodiment, the power distributing mechanism 16 is selectively switched by the engaging and releasing actions of the switching clutch C0 and the switching brake B0, between the continuously-variable shifting state in which the mechanism 16 is operable as an electrically controlled continuously variable transmission, and the fixed-speed-ratio shifting state in which the mechanism 16 is operable as a transmission having fixed speed ratios. On the basis of the vehicle condition, the switching control means 50 automatically switches the drive system 610 between the continuously-variable shifting state and the step-variable shifting state. Therefore, the present drive system has not only an advantage of an improvement in the fuel economy owing to a function of a transmission whose speed ratio is electrically variable, but also an advantage of high power transmitting efficiency owing to a function of a gear type transmission capable of mechanically transmitting a vehicle drive force. Accordingly, when the engine is in a normal output state at the vehicle running speed V not higher than the upper limit V1, with the output torque $T_{OUT}$ not lower than the upper limit T1, for example, as indicated in FIG. 12, the drive system 610 is placed in the continuously-variable shifting state, assuring a high degree of fuel economy of the hybrid vehicle during a normal city-running, that is, during a low- or medium-speed and low- or medium-output running. When the vehicle is running at a relatively high speed V not lower than the upper limit V1, for example, as indicated in FIG. 12, on the other hand, the drive system 610 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the drive system were placed in the continuously-variable shifting state. When the vehicle is running at a relatively high output torque $T_{OUT}$ not lower than the upper limit T1, for example, as indicated in FIG. 12, the drive system 610 is also placed in the step-variable shifting state. Therefore, the drive system 610 is placed in the continuously-variable shifting state only when the vehicle speed is relatively low or medium or when the output torque is relatively low or medium, so that the maximum amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. Further, the automatic transmission 620 principally constituted by the two planetary gear sets 626, 628 has a comparatively small dimension in its axial direction, making it possible to further reduce the required axial dimension of the drive system 610 including those planetary gear sets.

The present embodiment is further arranged such that the output speed of the automatic transmission 620 is higher than the rotating speed of the power transmitting member 18, so that the first ring gear R1 of the first planetary gear set 624 which is rotated with the power transmitting member 18 can be made comparatively low, even when the vehicle running speed is comparatively high. Accordingly, there is not a high degree of opportunity wherein the first electric motor M1 fixed to the first sun gear S1 must be rotated in the negative direction. Accordingly, the fuel economy can be improved.

Embodiment 36

Figure 95:
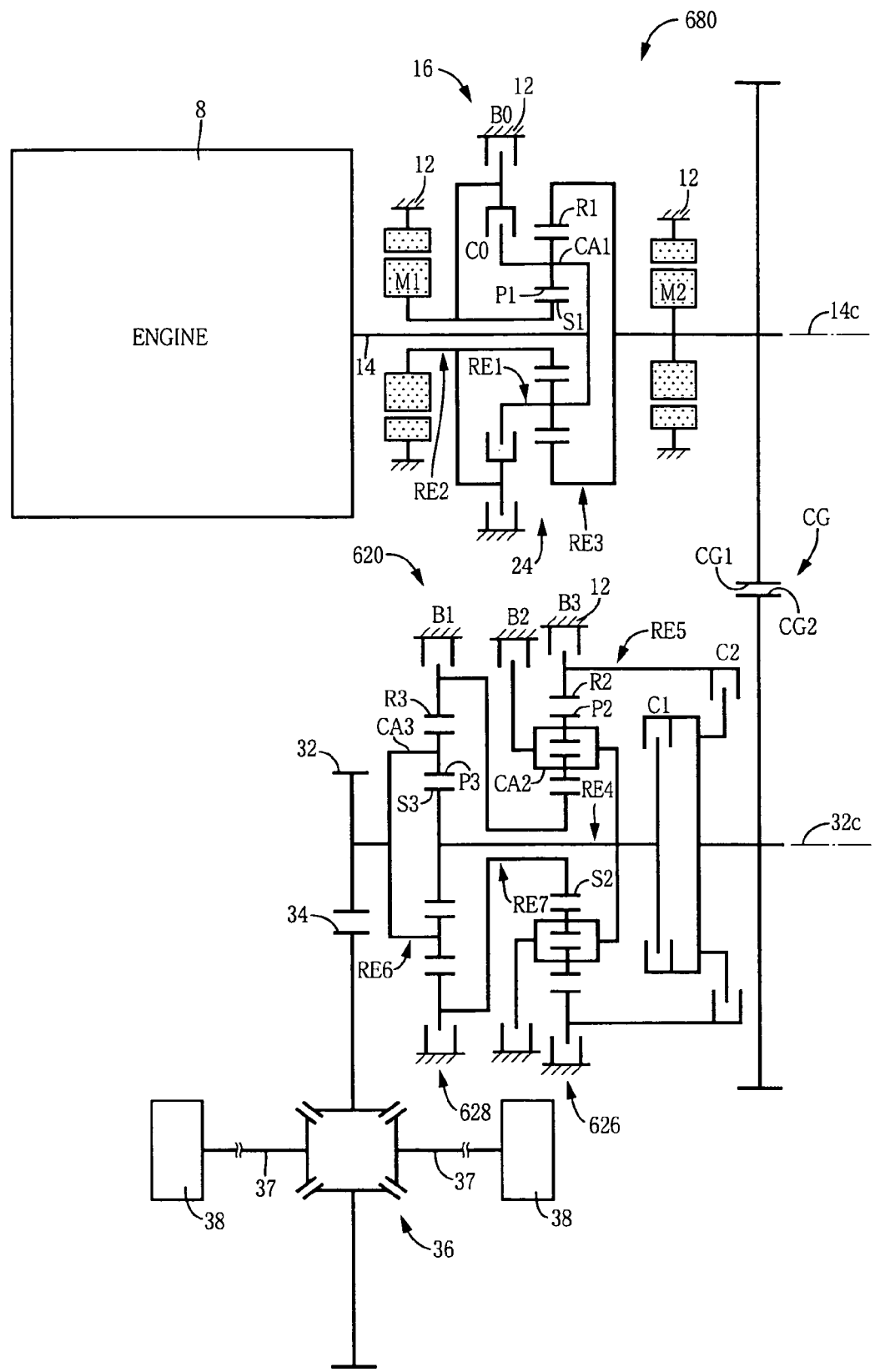
[FIG. 95] This figure is a schematic view for explaining an arrangement of a hybrid vehicle drive system according to another embodiment of this invention.

FIG. 95 is a schematic view for explaining an arrangement of a drive system 680 according to another embodiment of this invention. The present embodiment is different from the embodiment shown in FIGS. 92-94, primarily in that the power distributing mechanism 16 and an automatic transmission 620 are not disposed coaxially with each other in the present embodiment. The following description of the present embodiment primarily relates to a difference between the drive system 680 and the drive system 610.

The drive system 680 shown in FIG. 95 is provided, within a casing 12 attached to the vehicle body, with: an input shaft 14 disposed rotatably about a first axis 14c; the power distributing mechanism 16 mounted on the input shaft 14 directly, or indirectly through a pulsation absorbing damper (vibration damping device); the automatic transmission 620 disposed rotatably about a second axis 32c parallel to the first axis 14c; an output rotary member in the form of a differential drive gear 32 connected to the automatic transmission 420; and a power transmitting member in the form of a counter gear pair CG which connects the power distributing mechanism 16 and the automatic transmission 620, so as to transmit a drive force therebetween. This drive system 480 is suitably used on a transverse FF (front-engine, front-drive) vehicle or a transverse RR (rear-engine, rear-drive) vehicle, and is disposed between a drive power source in the form of an engine 8 and a pair of drive wheels 38. The drive force is transmitted from the differential drive gear 32 to the pair of drive wheels 38, through a differential gear 34 meshing with the differential drive gear 32, a differential gear device 36, a pair of drive axles 37, etc.

The counter gear pair CG indicated above consists of a counter drive gear CG1 disposed rotatably on the first axis 14c and coaxially with the power distributing mechanism 16 and fixed to a first ring gear R1, and a counter driven gear CG2 disposed rotatably on the second axis 32c and coaxially with the automatic transmission 620 and connected to the 6automatic transmission 20 through a first clutch C1 and a second clutch C2. The counter drive gear CG1 and the counter driven gear CG2 serve as a pair of members in the form of a pair of gears which are held in meshing engagement with each other. Since the speed reduction ratio of the counter gear pair CG (rotating speed of the counter drive gear CG1/rotating speed of the counter driven gear CG2) is about 1.000, the counter gear pair CG functionally corresponds to the power transmitting member 18 in the embodiment shown in FIGS. 92-94, which connects the power distributing mechanism 16 and the automatic transmission 620. That is, the counter drive gear CG1 corresponds to a power transmitting member which constitutes a part of the power transmitting member 18 on the side of the first axis 14c, while the counter driven gear CG2 corresponds to a power transmitting member which constitutes another part of the power transmitting member 18 on the side of the second axis 32c.

Referring to FIG. 95, the individual elements of the drive system 680 will be described. The counter gear pair CG is disposed adjacent to one end of the power distributing mechanism 16 which remote from the engine 8. In other words, the power distributing mechanism 16 is interposed between the engine 8 and the counter gear pair CG, and located adjacent to the counter gear pair CG. A second electric motor M2 is disposed on the first axis 14c, between a first planetary gear set 24 and the counter gear pair CG, such that the second electric motor M2 is fixed to the counter drive gear CG1. The differential drive gear 32 is disposed adjacent to one end of the automatic transmission 620 which is remote from the counter gear pair CG, that is, on the side of the engine 8. In other words, the automatic transmission 620 is interposed between the counter gear pair CG and the differential drive gear 32 (engine 8), and located adjacent to the counter gear pair CG. Between the counter gear pair CG and the differential drive gear 32, a second planetary gear set 626 and a third planetary gear set 628 are disposed in the order of description, in the direction from the counter gear pair CG toward the differential drive gear 32. The first clutch C1 and the second clutch C2 are disposed between the counter gear pair CG and the second planetary gear set 426.

The present embodiment is different from the embodiment shown in FIGS. 92-94, only in that the counter gear pair CG replaces the power transmitting member 18 connecting the power distributing mechanism 16 and the automatic transmission 620, and is identical with the embodiment of FIGS. 92-94 in the arrangements of the power distributing mechanism 16 and automatic transmission 620. Accordingly, the table of FIG. 93 and the collinear chart of FIG. 94 apply to the present embodiment.

In the present embodiment, too, the drive system 680 is constituted by the power distributing mechanism 16 functioning as the continuously-variable shifting portion or first shifting portion, and the automatic transmission 620 functioning as the step-variable shifting portion or second shifting portion, so that the drive system 680 has advantages similar to those of the preceding embodiments. Unlike the embodiment shown in FIGS. 92-94, the present embodiment is arranged such that the power distributing mechanism 16 and the automatic transmission 620 are not disposed coaxially with each other, so that the required dimension of the drive system 680 in the axial direction can be reduced. Accordingly, the present drive system can be suitably used on a transversal FF or RR vehicle such that the first and second axes 14c, 32c are parallel to the transverse or width direction of the vehicle. In this respect, it is noted that the maximum axial dimension of a drive system for such a transverse FF or RR vehicle is generally limited by the width dimension of the vehicle. The present embodiment has an additional advantage that the required axial dimension of the drive system 680 can be further reduced, since the power distributing mechanism 16 and the automatic transmission 620 are located between the engine 8 (differential drive gear 32) and the counter gear pair CG. Further, the required axial dimension of the second axis 32c can be reduced owing to the arrangement in which the second electric motor M2 is disposed on the first axis 13c.

Embodiment 37

Figure 96:
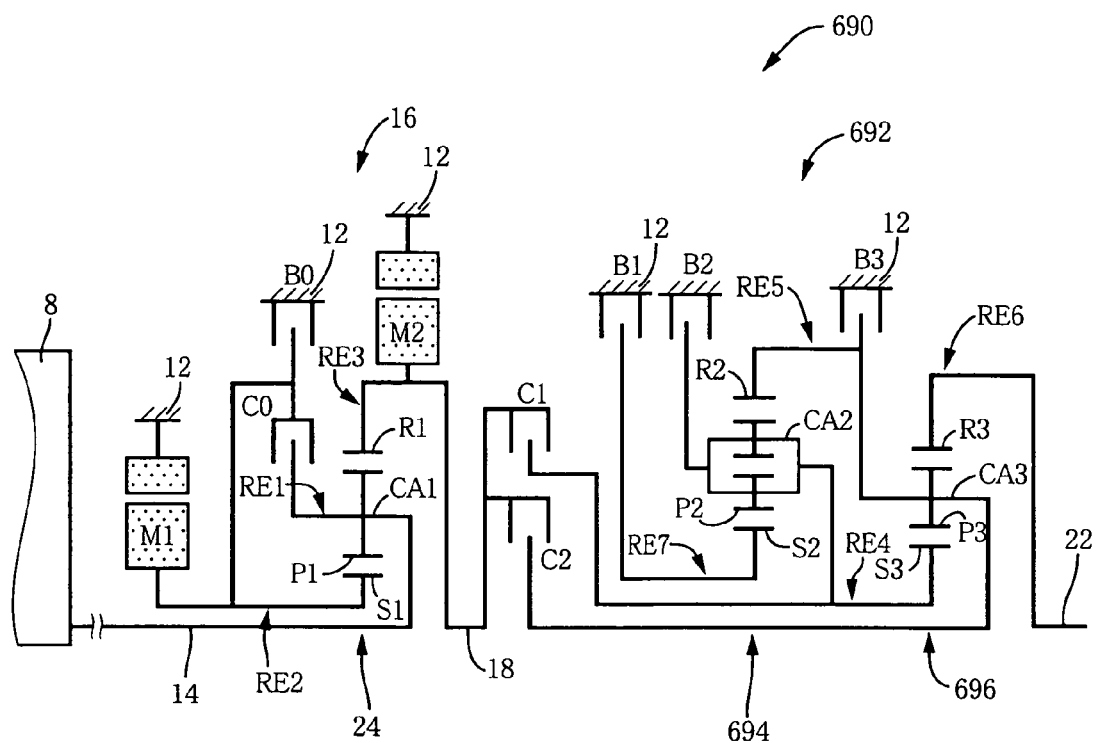
[FIG. 96] This figure is a schematic view for explaining an arrangement of a hybrid vehicle drive system according to another embodiment of this invention.

FIG. 96 is a schematic view for explaining a drive system 690 according to another embodiment of this invention, which includes the power distributing mechanism 16, the first electric motor M1 and the second electric motor M2, as in the embodiment of FIG. 92. The first and second electric motors M1, M2 are connected to the power distributing mechanism 16 in the same manner as in the embodiment of FIG. 92. In the present embodiment, too, the step-variable automatic transmission 692 is disposed between and coaxially with the output shaft 22 and the input shaft 14.

The automatic transmission 692 described above includes a double-pinion type second planetary gear set 694 and a single-pinion type third planetary gear set 696. The second planetary gear set 694 includes: a second sun gear S2; a plurality of pairs of mutually meshing second planetary gears P2; a second carrier CA2 supporting the second planetary gears P2 such that each second planetary gear PA2 is rotatable about its axis and about the axis of the second sun gear S2; and a second ring gear R2 meshing with the second sun gear S2 through the second planetary gears P2. For example, the second planetary gear set 494 has a gear ratio ρ2 of about 0.529. The third planetary gear set 696 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 696 has a gear ratio ρ3 of about 0.333.

Like the automatic transmission 620 of FIG. 92, the automatic transmission 692 includes the first through third brakes B1-B3 and the first and second third clutches C1, C2. The second sun gear S2 is selectively fixed to the casing 12 through the first brake B1. The second carrier CA2 and the third sun gear S3 are integrally fixed to each other and selectively connected to the power transmitting member 18 through the first clutch C1 and selectively fixed to the casing 12 through the second brake B2. The second ring gear R2 and the third carrier CA3 that are integrally fixed to each other are selectively connected to the power transmitting member 18 through the second clutch C2 and selectively fixed to the casing 12 through the third brake B3. The third ring gear R3 is fixed to the output shaft 22.

The above-described second carrier CA2 and third sun gear S3 integrally fixed to each other function as the fourth rotary element RE4, and the second ring gear R2 and the third carrier CA3 integrally fixed to each other function as the fifth rotary element RE5. Further, the third ring gear R3 functions as the sixth rotary element RE6, and the second sun gear S2 functions as the seventh rotary element RE7. The collinear chart of the embodiment of FIG. 92 applies to the drive system 690.

The present drive system 690 also includes the power distributing mechanism 16 functioning as a continuously-variable shifting portion or a first shifting portion, and the automatic transmission 692 functioning as a step-variable shifting portion or a second shifting portion. The automatic transmission 692 is principally constituted by the two planetary gear sets 694, 696, and has the same advantage as that in the embodiment of FIG. 92.

Embodiment 38

Figure 97:
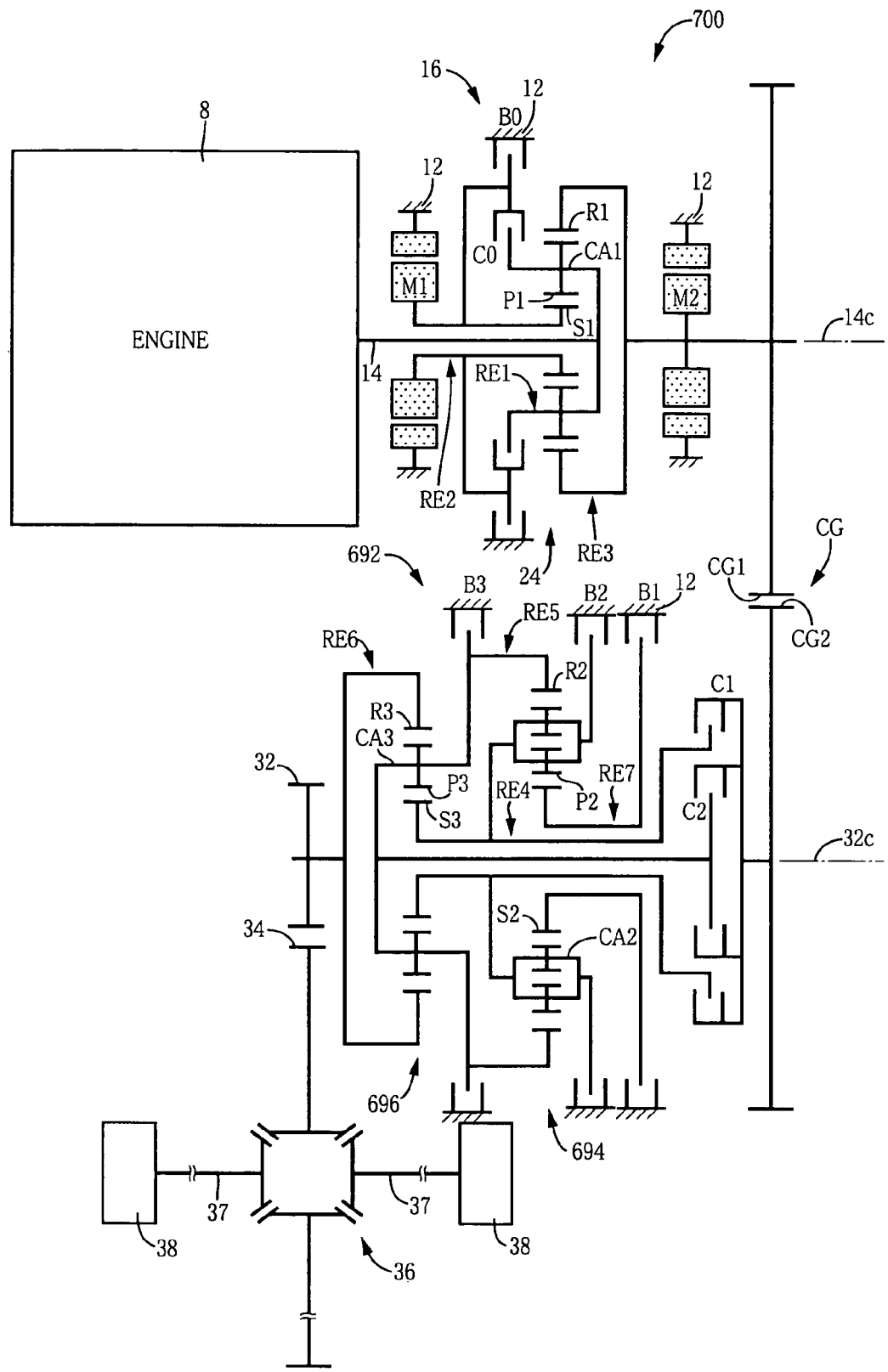
[FIG. 97] This figure is a schematic view for explaining an arrangement of a hybrid vehicle drive system according to another embodiment of this invention.

FIG. 97 is a schematic view for explaining an arrangement of a drive system 700 according to another embodiment of this invention, which is different from the embodiment of FIG. 95 in that the automatic transmission 692 of FIG. 96 is used in the present embodiment, in place of the automatic transmission 680 of the embodiment of FIG. 95. In other words, the present embodiment is different from the embodiment of FIG. 96, like the embodiment of FIG. 92 is different from the embodiment of FIG. 95, only in that the counter gear pair CG is used in place of the power transmitting member 18, for connection between the power distributing mechanism 16 and the automatic transmission 692. Therefore, the drive system 700 of the present embodiment has the same advantage as the embodiment of FIG. 95.

Embodiment 39

Figure 98:
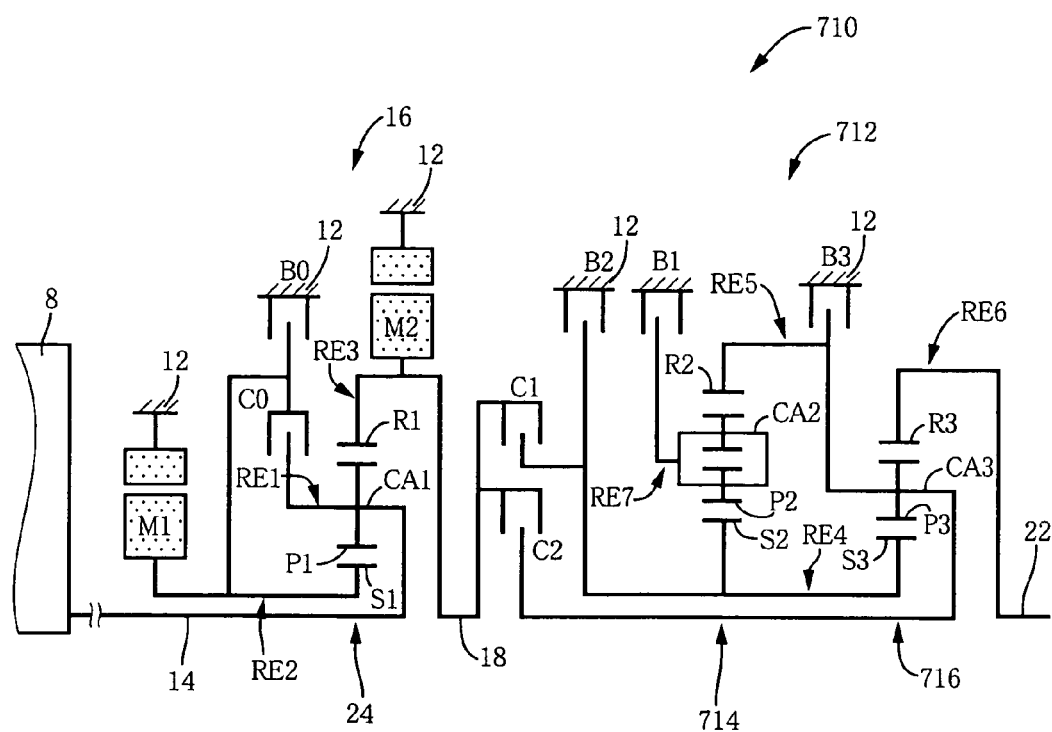
[FIG. 98] This figure is a schematic view for explaining an arrangement of a hybrid vehicle drive system according to another embodiment of this invention.

FIG. 98 is a schematic view for explaining a drive system 710 according to another embodiment of this invention, which includes the power distributing mechanism 16, the first electric motor M1, the second electric motor M2 and the counter gear pair CG, as in the embodiment of FIG. 92 or 96. The connection between the first and second electric motors M, M2 and the power distributing mechanism 16 is the same as in the embodiment of FIG. 92 or 97. In the present embodiment, too, a step-variable automatic transmission 712 is disposed between the power transmitting member 18 and the output shaft 22, such that the step-variable automatic transmission 712 is coaxial with the output shaft 22 and the input shaft 14.

The automatic transmission 712 described above includes a double-pinion type second planetary gear set 714 and a single-pinion type third planetary gear set 716. The second planetary gear set 714 includes: a second sun gear S2; a plurality of pairs of mutually meshing second planetary gears P2; a second carrier CA2 supporting the second planetary gears P2 such that each second planetary gear P2 is rotatable about its axis and about the axis of the second sun gear S2; and a second ring gear R2 meshing with the second sun gear S2 through the second planetary gears P2. For example, the second planetary gear set 714 has a gear ratio ρ2 of about 0.471. The third planetary gear set 716 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 516 has a gear ratio ρ3 of about 0.333.

Like the above-described automatic transmissions 620, etc., the automatic transmission 712 includes the first through third brakes B1-B3 and the first and second clutches C1, C2. The second sun gear S2 and the third sun gear S3 that are integrally fixed to each other are selectively connected to the power transmitting member 18 through the first clutch and selectively fixed to the casing 12 through the second brake B2. The second carrier CA2 is selectively fixed to the casing 12 through the first brake B1. The second ring gear R2 and the third carrier CA3 that are integrally fixed to each other are selectively connected to the power transmitting member 18 through the second clutch C2 and selectively fixed to the casing 12 through the third brake B3. The third ring gear R3 is fixed to the output shaft 22.

The above-described second sun gear S2 and third sun gear S3 integrally fixed to each other function as the fourth rotary element RE4, and the second ring gear R2 and the third carrier CA3 integrally fixed to each other function as the fifth rotary element RE5. Further, the third ring gear R3 functions as the sixth rotary element RE6, and the second carrier CA2 functions as the seventh rotary element RE7. The collinear chart of the embodiment of FIGS. 92-97 applies to the drive system 710.

The present drive system 710 also includes the power distributing mechanism 16 functioning as a continuously-variable shifting portion or a first shifting portion, and the automatic transmission 712 functioning as a step-variable shifting portion or a second shifting portion. The automatic transmission 712 is principally constituted by the two planetary gear sets 714, 716, and has the same advantage as that in the embodiment of FIG. 92.

Embodiment 40

Figure 99:
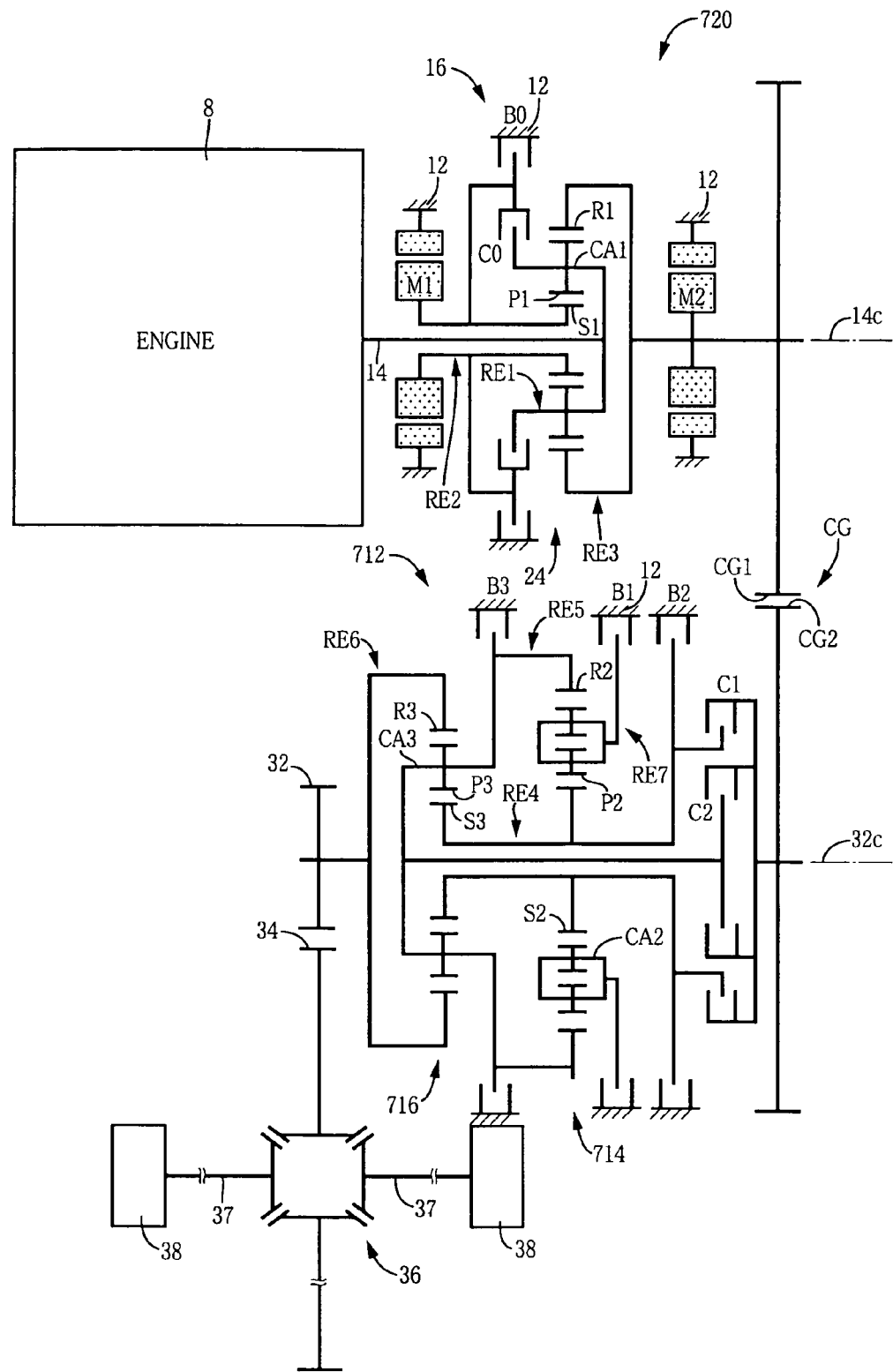
[FIG. 99] This figure is a schematic view for explaining an arrangement of a hybrid vehicle drive system according to another embodiment of this invention.

FIG. 99 is a schematic view for explaining an arrangement of a drive system 720 according to another embodiment of this invention, which is different from the embodiments of FIG. 95 and 97 in that the automatic transmission 712 of FIG. 98 is used in the present embodiment, in place of the automatic transmission 620, 692 of the embodiments of FIGS. 95 and 97. In other words, the present embodiment is different from the embodiment of FIG. 98, like the embodiment of FIG. 92 is different from the embodiment of FIG. 95, only in that the counter gear pair CG is used in place of the power transmitting member 18, for connection between the power distributing mechanism 16 and the automatic transmission 712. Therefore, the drive system 720 of the present embodiment has the same advantage as the embodiments of FIGS. 95 and 97.

Embodiment 41

Figure 100:
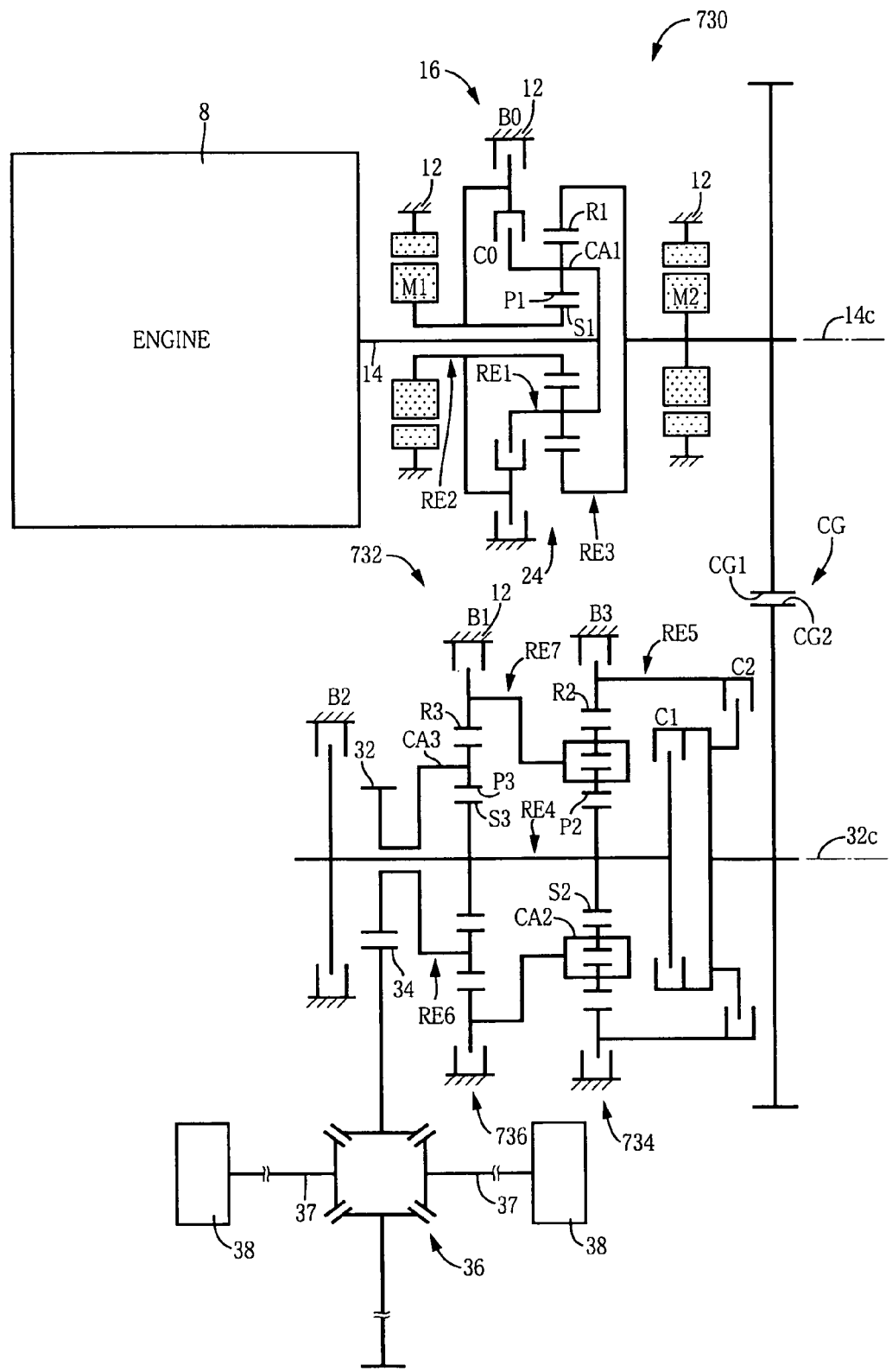
[FIG. 100] This figure is a schematic view for explaining an arrangement of a hybrid vehicle drive system according to another embodiment of this invention.

FIG. 100 is a schematic view for explaining a drive system 730 according to another embodiment of this invention, which includes the power distributing mechanism 16, the first electric motor M1, the second electric motor M2 and the counter gear pair CG, as in the embodiment of FIG. 95. The present embodiment is different from the embodiment of FIG. 95, only in the construction of a step-variable automatic transmission 732 disposed on the second axis 32c.

The automatic transmission 732 described above includes a double-pinion type second planetary gear set 734 and a single-pinion type third planetary gear set 736. The second planetary gear set 7344 includes: a second sun gear S2; a plurality of pairs of mutually meshing second planetary gears P2; a second carrier CA2 supporting the second planetary gears P2 such that each second planetary gear P2 is rotatable about its axis and about the axis of the second sun gear S2; and a second ring gear R2 meshing with the second sun gear S2 through the second planetary gears P2. For example, the second planetary gear set 734 has a gear ratio ρ2 of about 0.471. The third planetary gear set 73 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 736 has a gear ratio ρ3 of about 0.333.

Like the above-described automatic transmission 620, etc., the automatic transmission 732 includes the first through third brakes B1-B3 and the first and second clutches C1, C2. The second sun gear S2 and the third sun gear S3 that are integrally fixed to each other are selectively connected to a power transmitting member in the form of the counter driven gear CG2 of the counter gear pair CG through the first clutch C1 and selectively fixed to the casing 12 through the second brake B2. The second carrier CA2 and the third ring gear R3 are integrally fixed to each other and selectively fixed to the casing 12 through the first brake B1. The second ring gear R2 is selectively connected to the counter driven gear CG2 through the second clutch C2, and selectively fixed to the casing 12 through the third brake B3. The third carrier CA3 is fixed to an output rotary member in the form of the differential drive gear 32. The thus constructed automatic transmission 732 is disposed on one side of the counter gear pair CG on which the power distributing mechanism 16 and the engine 8 are disposed. Namely, the automatic transmission 732 is disposed in parallel with the power distributing mechanism 16 and engine 8 disposed on the first axis 14c.

The above-described second sun gear S2 and third sun gear S3 integrally fixed to each other function as the fourth rotary element RE4, and the second ring gear R2 functions as the fifth rotary element RE6. The third carrier CA3 functions as the sixth rotary element RE6, and the second carrier CA2 and third ring gear R3 integrally fixed to each other function as the seventh rotary element RE7. The collinear chart of the embodiments of FIGS. 92-99 applies to the drive system 730.

The present drive system 730 also includes the power distributing mechanism 16 functioning as a continuously-variable shifting portion or a first shifting portion, and the automatic transmission 732 functioning as a step-variable shifting portion or a second shifting portion, and the automatic transmission 732 is principally constituted by the two planetary gear sets 734, 736. In this respect, the present embodiment has the same advantage as the embodiment of FIG. 92. Further, the power distributing mechanism 16 and the electric motor M2 are disposed on the first axis 14c, and between the engine 8 and the counter gear pair CG, while the automatic transmission 732 is disposed on the second axis 32c separate from the first axis 14c, and in parallel with the engine 8 and power distributing mechanism 16 disposed on the first axis 14c, so that the required dimension of the drive system 730 in its axial direction can be reduced.

Embodiment 42

Figure 101:
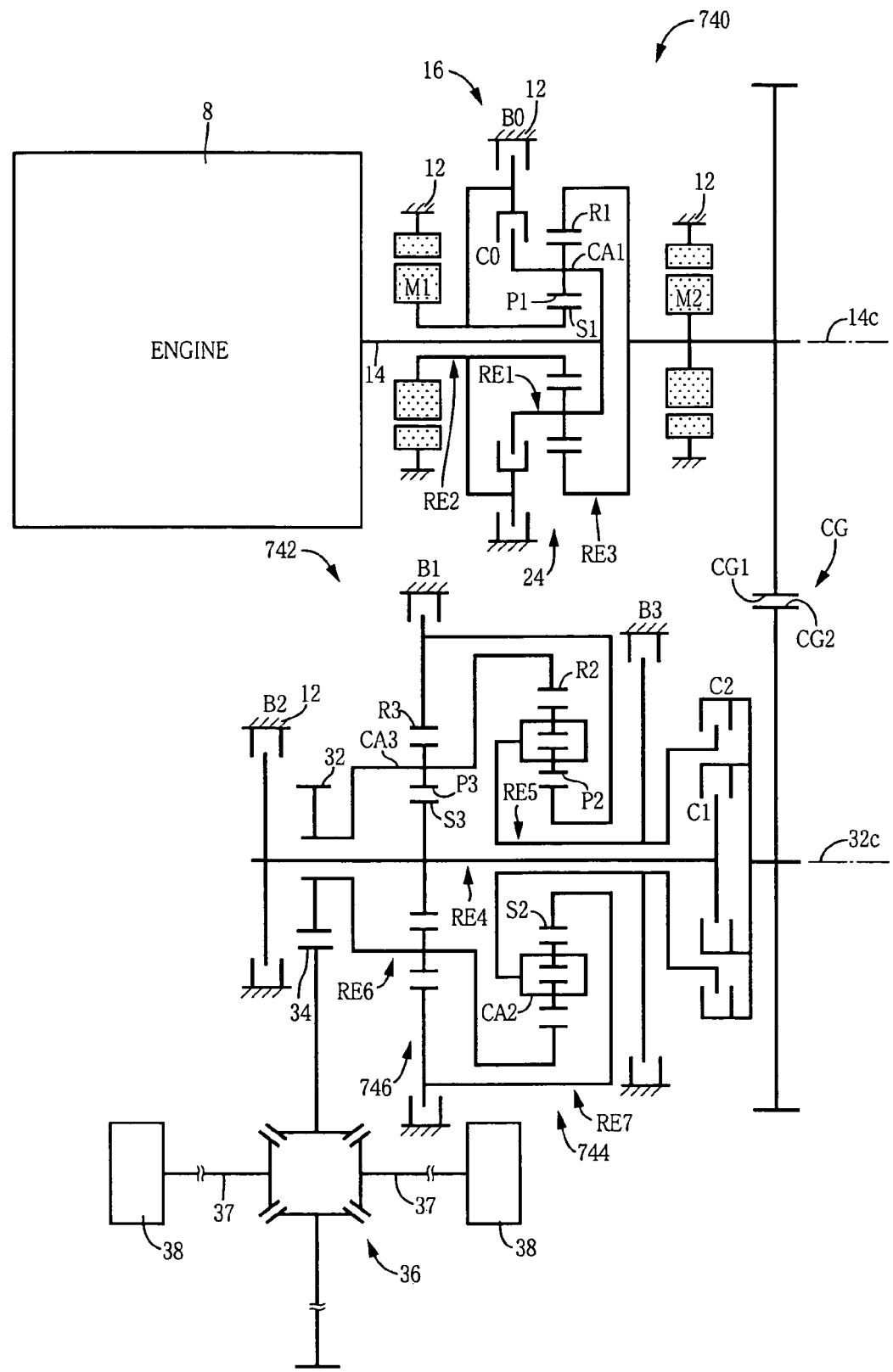
[FIG. 101] This figure is a schematic view for explaining an arrangement of a hybrid vehicle drive system according to another embodiment of this invention.

FIG. 101 is a schematic view for explaining an arrangement of a drive system 740 according to another embodiment of this invention. The present embodiment also includes the power distributing mechanism 16, the first electric motor M1, the second electric motor M2 and the counter gear pair CG, as in the embodiment shown in FIG. 95. The present embodiment is different from the embodiment of FIG. 95, only in the construction of a step-variable automatic transmission 742 disposed on the second axis 32c.

The automatic transmission 742 includes a double-pinion type second planetary gear set 744 and a single-pinion type third planetary gear set 746. The second planetary gear set 744 includes: a second sun gear S2; a plurality of pairs of mutually meshing second planetary gears P2; a second carrier CA2 supporting the second planetary gears P2 such that each second planetary gear P2 is rotatable about its axis and about the axis of the second sun gear S2; and a second ring gear R2 meshing with the second sun gear S2 through the second planetary gears P2. For example, the second planetary gear set 524 has a gear ratio ρ2 of about 0.375. The third planetary gear set 746 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 526 has a gear ratio ρ3 of about 0.417. The automatic transmission 742 includes the first through third brakes B1-B3 and the first and second clutch Cl, C2, as in the above-described automatic transmissions 620, etc.

The second sun gear S2 and third ring gear R3 are integrally fixed to each other and is selectively fixed to the casing 12 through the first brake B1. The second carrier CA2 is selectively connected to a power transmitting member in the form of the counter driven gear CG2 of the counter gear pair CG through the second clutch C2 and selectively fixed to the casing through the third brake B3. The second ring gear R2 and third carrier CA3 are integrally fixed to each other and to an output rotary member in the form of the differential drive gear 32. The third sun gear S3 is selectively connected to the counter driven gear CG2 through the first clutch C1 and selectively fixed to the casing 12 through the second brake B2. The thus constructed automatic transmission 742 is disposed on one side of the counter gear pair CG on which the power distributing mechanism 16 and engine 8 are disposed. Namely, the automatic transmission 742 is disposed in parallel with the power distributing mechanism 16 and engine 8 disposed on the first axis 14c.

The above-described third sun gear S3 functions as the fourth rotary element RE4, and the second carrier CA2 functions as the fifth rotary element RE5. The second ring gear R2 and third carrier CA3 integrally fixed to each other function as the sixth rotary element RE6, and the second sun gear S2 and third ring gear R3 integrally fixed to each other function as the seventh rotary element RE7. The collinear chart of the embodiments of FIGS. 92-100 applies to the drive system 740.

The present drive system 740 also includes the power distributing mechanism 16 functioning as a continuously-variable shifting portion or a first shifting portion, and the automatic transmission 742 functioning as a step-variable shifting portion or a second shifting portion, and the automatic transmission 742 is principally constituted by the two planetary gear sets 744, 74. In this respect, the present embodiment has the same advantage as the embodiment of FIG. 92. Further, the power distributing mechanism 16 and the electric motor M2 are disposed on the first axis 14c, and between the engine 8 and the counter gear pair CG, while the automatic transmission 742 is disposed on the second axis 32c separate from the first axis 14c, and in parallel with the engine 8 and the power distributing mechanism 16 disposed on the first axis 14c, so that the required dimension of the drive system 740 in its axial direction can be reduced.

Embodiment 43

Figure 102:
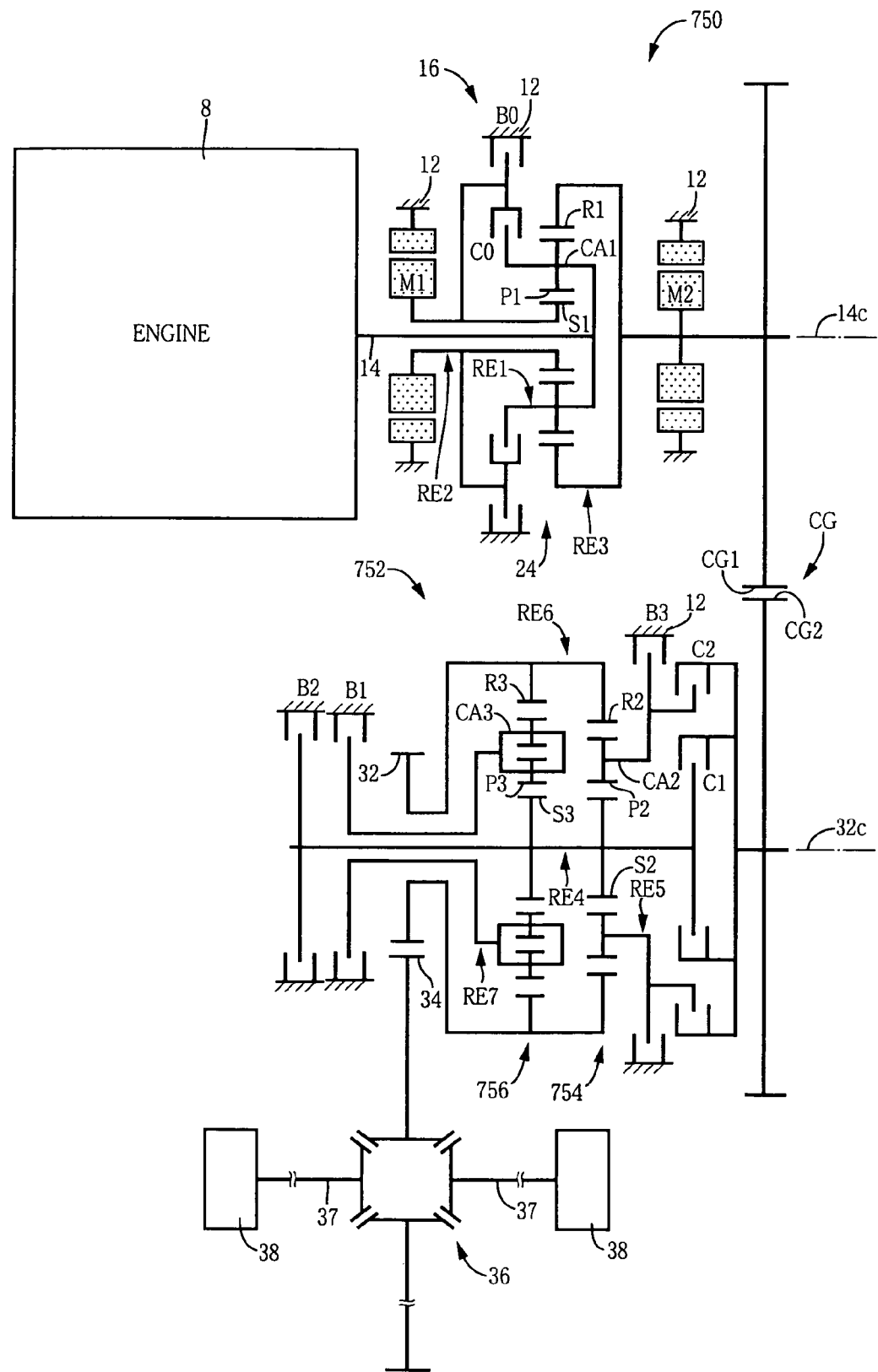
[FIG. 102] This figure is a schematic view for explaining an arrangement of a hybrid vehicle drive system according to another embodiment of this invention.

FIG. 102 is a schematic view for explaining an arrangement of a drive system 750 according to another embodiment of this invention. The drive system 750 of the present embodiment also includes the power distributing mechanism 16, the first electric motor M1, the second electric motor M2 and the counter gear pair CG, as in the embodiment shown in FIG. 95. The present embodiment is different from the embodiment of FIG. 95, only in the construction of a step-variable automatic transmission 752 disposed on the second axis 32c.

The automatic transmission 752 includes a single-pinion type second planetary gear set 754 and a double-pinion type third planetary gear set 756. The second planetary gear set 754 includes: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 754 has a gear ratio ρ2 of about 0.333. The third planetary gear set 756 has: a third sun gear S3, a plurality of pairs of mutually meshing third planetary gears P3; a third carrier CA3 supporting the third planetary gears P3 such that each third planetary gear P3 is rotatable about its axis and about the axis of the third sun gear S3; and a third ring gear R3 meshing with the third sun gear S2 through the third planetary gears P3. For example, the third planetary gear set 756 has a gear ratio ρ3 of about 0.294. The automatic transmission 750 includes the first through third brakes B1-B3 and the first and second clutches C1, C2, as in the above-described automatic transmissions 620, etc.

The second sun gear S2 and third sun gear S3 are integrally fixed to each other and selectively connected to a power transmitting member in the form of the counter driven gear CG2 of the counter gear pair CG through the first clutch C1 and selectively fixed to the casing 12 through the second brake B2. The second carrier CA2 is selectively connected to the counter driven gear CG2 through the second clutch C2 and selectively fixed to the casing 12 through the third brake B3. The second ring gear R2 and third ring gear R3 are integrally fixed to each other and to an output rotary member in the form of the differential drive gear 32, and the third carrier CA3 is selectively fixed to the casing 12 through the first brake B1. The thus constructed automatic transmission 752 is disposed on one side of the counter gear pair CG on which the power distributing mechanism 16 and engine 8 are disposed. Namely, the automatic transmission 752 is disposed in parallel with the power distributing mechanism 16 and engine 8 disposed on the first axis 14c.

The above-described second sun gear S2 and third sun gear S3 integrally fixed to each other function as the fourth rotary element RE4, and the second carrier CA2 functions as the fifth rotary element RE5. The second ring gear R2 and third ring gear R3 integrally fixed to each other function as the sixth rotary element RE6, and the third carrier CA3 functions as the seventh rotary element RE7. The collinear chart of the embodiments of FIGS. 91-101 applies to the drive system 750.

The present drive system 750 also includes the power distributing mechanism 16 functioning as a continuously-variable shifting portion or a first shifting portion, and the automatic transmission 752 functioning as a step-variable shifting portion or a second shifting portion, and the automatic transmission 752 is principally constituted by the two planetary gear sets 754, 756. In this respect, the present embodiment has the same advantage as the embodiment of FIG. 92. Further, the power distributing mechanism 16 and the second electric motor M2 are disposed on one side of the counter gear pair CG on which the engine 8 and counter gear pair CG are disposed, while the automatic transmission 752 is disposed on the second axis 32c separate from the first axis 14c, and in parallel with the engine 8 and power distributing mechanism 16, so that the required dimension of the drive system 750 in its axial direction can be reduced, as in the embodiment of FIG. 80.

Embodiment of FIG. 44

Figure 103:
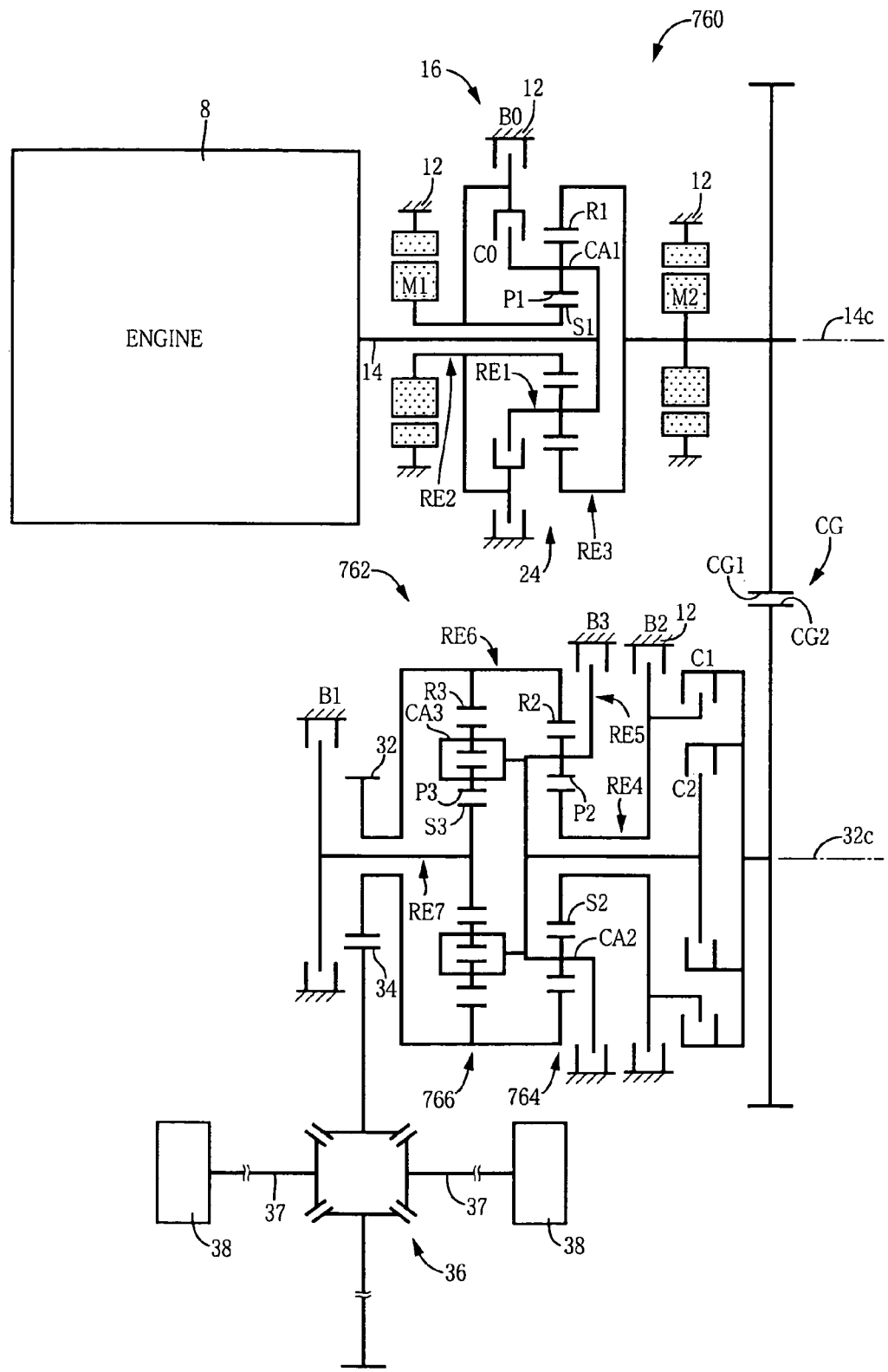
[FIG. 103] This figure is a schematic view for explaining an arrangement of a hybrid vehicle drive system according to another embodiment of this invention.

FIG. 103 is a schematic view for explaining an arrangement of a drive system 760 according to another embodiment of this invention. The drive system 76 of the present embodiment also includes the power distributing mechanism 16, the first electric motor M1, the second electric motor M2 and the counter gear pair CG, as in the embodiment shown in FIG. 95. The present embodiment is different from the embodiment of FIG. 95, only in the construction of a step-variable automatic transmission 762 disposed on the second axis 32c.

The automatic transmission 762 includes a single-pinion type second planetary gear set 764 and a double-pinion type third planetary gear set 766. The second planetary gear set 764 includes: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 544 has a gear ratio ρ2 of about 0.368. The third planetary gear set 766 has: a third sun gear S3, a plurality of pairs of mutually meshing third planetary gears P3; a third carrier CA3 supporting the third planetary gears P3 such that each third planetary gear P3 is rotatable about its axis and about the axis of the third sun gear S3; and a third ring gear R3 meshing with the third sun gear S3 through the third planetary gears P3. For example, the third planetary gear set 766 has a gear ratio ρ3 of about 0.375. The automatic transmission 762 includes the first through third brakes B1-B3 and the first and second clutches C1, C2, as in the above-described automatic transmissions 620, etc.

The second sun gear S2 is selectively connected to a power transmitting member in the form of the counter driven gear CG2 of the counter gear pair CG through the first clutch C1 and is selectively fixed to the casing 12 through the second brake B2. The second carrier CA2 and third carrier CA3 that are integrally fixed to each other are selectively connected to the counter driven gear CG2 through the second clutch C2 and selectively fixed to the casing 12 through the third brake B3. The second ring gear R2 and third ring gear R3 are integrally fixed to each other and to an output rotary member in the form of the differential drive gear 32. The third sun gear S3 is selectively fixed to the casing 12 through the first brake B1. The thus constructed automatic transmission 762 is disposed on one side of the counter gear pair CG on which the power distributing mechanism 16 and engine 8 are disposed. Namely, the automatic transmission 762 is disposed in parallel with the power distributing mechanism 16 and engine 8 disposed on the first axis 14c.

The above-described second sun gear S2 functions as the fourth rotary element RE4, and the second carrier CA2 and third carrier CA3 integrally fixed to each other function as the fifth rotary element RE5. The second ring gear R2 and third ring gear R3 integrally fixed to each other function as the sixth rotary element RE6, and the third sun gear S3 functions as the seventh rotary element RE7. The collinear chart of the embodiments of FIGS. 92-102 applies to the drive system 760.

The drive system 760 of the present embodiment also includes the power distributing mechanism 16 functioning as a continuously-variable shifting portion or a first shifting portion, and the automatic transmission 762 functioning as a step-variable shifting portion or a second shifting portion, and the automatic transmission 762 is principally constituted by the two planetary gear sets 764, 766. In this respect, the present embodiment has the same advantage as the embodiment of FIG. 92. Further, the power distributing mechanism 16 and second electric motor M2 are disposed on the first axis 14c, and between the engine 8 and the counter gear pair CG, while the automatic transmission 762 is disposed on the second axis 32c separate from the first axis 14c, in parallel with the engine 8 and power distributing mechanism 16 disposed on the first axis 14c, so that the required dimension of the drive system 760 in the axial direction can be reduced.

Embodiment 45

Figure 104:
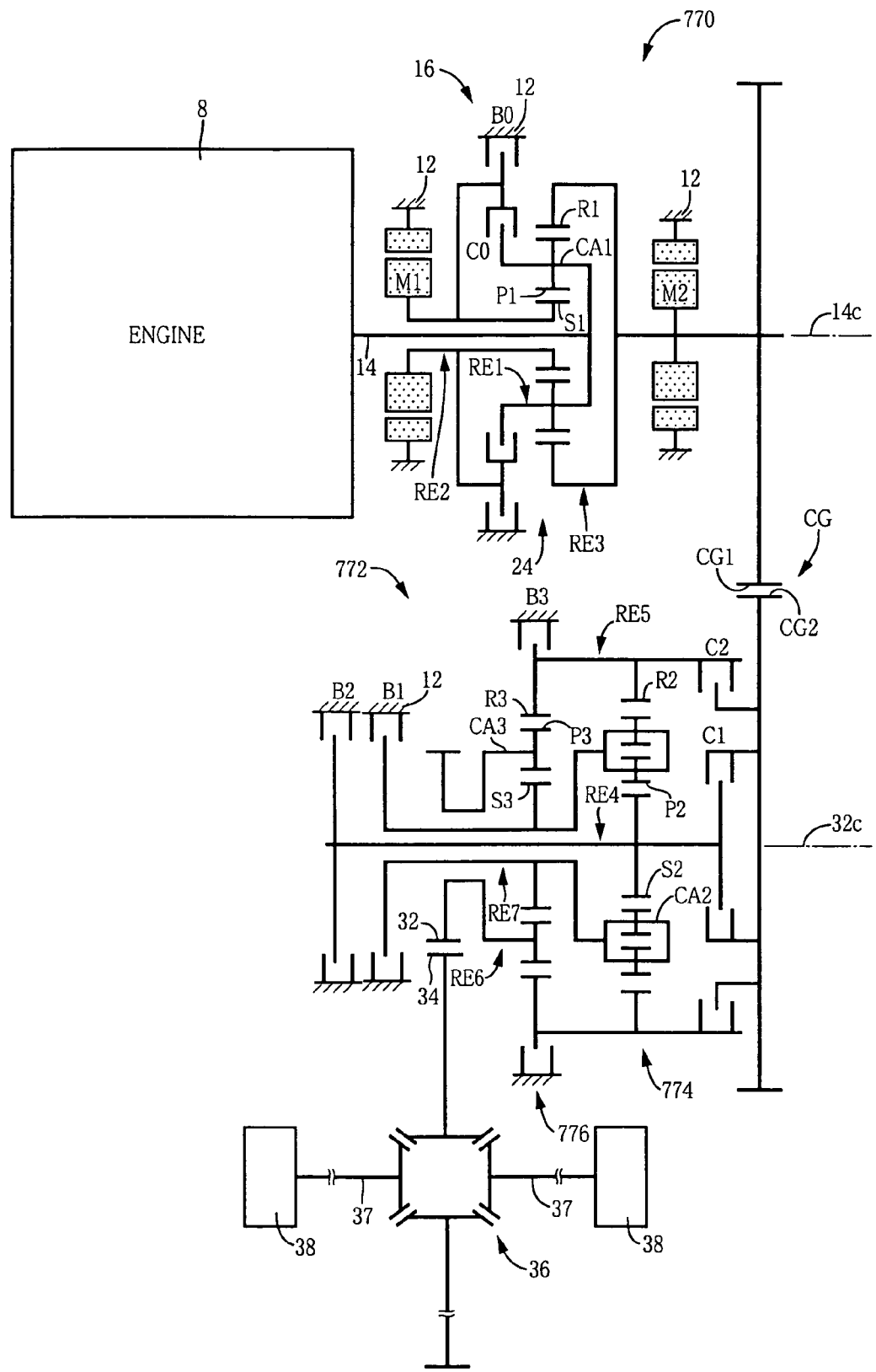
[FIG. 104] This figure is a schematic view for explaining an arrangement of a hybrid vehicle drive system according to another embodiment of this invention.

FIG. 104 is a schematic view for explaining an arrangement of a drive system 770 according to another embodiment of this invention. The drive system 770 of the present embodiment also includes the power distributing mechanism 16, the first electric motor M1, the second electric motor M2 and the counter gear pair CG, as in the embodiments shown in FIG. 95, etc. The present embodiment is different from the embodiment of FIG. 95, only in the construction of a step-variable automatic transmission 772 disposed on the second axis 32c.

The automatic transmission 772 includes a double-pinion type second planetary gear set 774 and a single-pinion type third planetary gear set 776. The second planetary gear set 774 includes: a second sun gear S2, a plurality of pairs of mutually meshing second planetary gears P2; a second carrier CA2 supporting the second planetary gears P2 such that each second planetary gear P2 is rotatable about its axis and about the axis of the second sun gear S2; and a second ring gear R2 meshing with the second sun gear S2 through the second planetary gear P3. For example, the second planetary gear set 774 has a gear ratio ρ2 of about 0.471. The third planetary gear set 776 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 776 has a gear ratio ρ3 of about 0.600. The automatic transmission 772 includes the first through third brakes B1-B3 and the first and second clutches C1, C2, as in the above-described automatic transmissions 620, etc.

The second sun gear S2 is selectively connected to a power transmitting member in the form of the counter driven gear CG2 of the counter gear pair CG through the first clutch C1 and selectively fixed to the casing 12 through the second brake B2. The second carrier CA2 and third sun gear S3 are integrally fixed to each other and selectively fixed to the casing through the first brake B1. The second ring gear R2 and third ring gear R3 that are integrally fixed to each other are selectively connected to the counter driven gear CG2 through the second clutch C2 and selectively fixed to the casing 12 through the third brake B3. The third carrier CA3 is fixed to an output rotary member in the form of the differential drive gear 32. The thus constructed automatic transmission 772 is disposed on one side of the counter gear pair CG on which the power distributing mechanism 16 and engine 8 are disposed. Namely, the automatic transmission 772 is disposed in parallel with the power distributing mechanism 16 and engine 8 disposed on the first axis 14c.

The above-described second sun gear S2 functions as the fourth rotary element RE4, and the second ring gear R2 and third ring gear R3 integrally fixed to each other function as the fifth rotary element RE5. The third carrier CA3 functions as the sixth rotary element RE6, and the second carrier CA2 and third sun gear S3 integrally fixed to each other function as the seventh rotary element RE7. The collinear chart of the embodiments of FIGS. 92-103 applies to the drive system 770.

The drive system 770 of the present embodiment also includes the power distributing mechanism 16 functioning as a continuously-variable shifting portion or a first shifting portion, and the automatic transmission 772 functioning as a step-variable shifting portion or a second shifting portion, and the automatic transmission 772 is principally constituted by the two planetary gear sets 774, 776. In this respect, the present embodiment has the same advantage as the embodiment of FIG. 92. Further, the power distributing mechanism 16 and second electric motor M2 are disposed on the first axis 14c, and between the engine 8 and counter gear pair CG, while the automatic transmission 772 are disposed on the second axis 32c separate from the first axis 14c, in parallel with the engine 8 and power distributing mechanism 16, so that the required dimension of the drive system 770 in its axial direction can be reduced.

Embodiment 46

Figure 105:
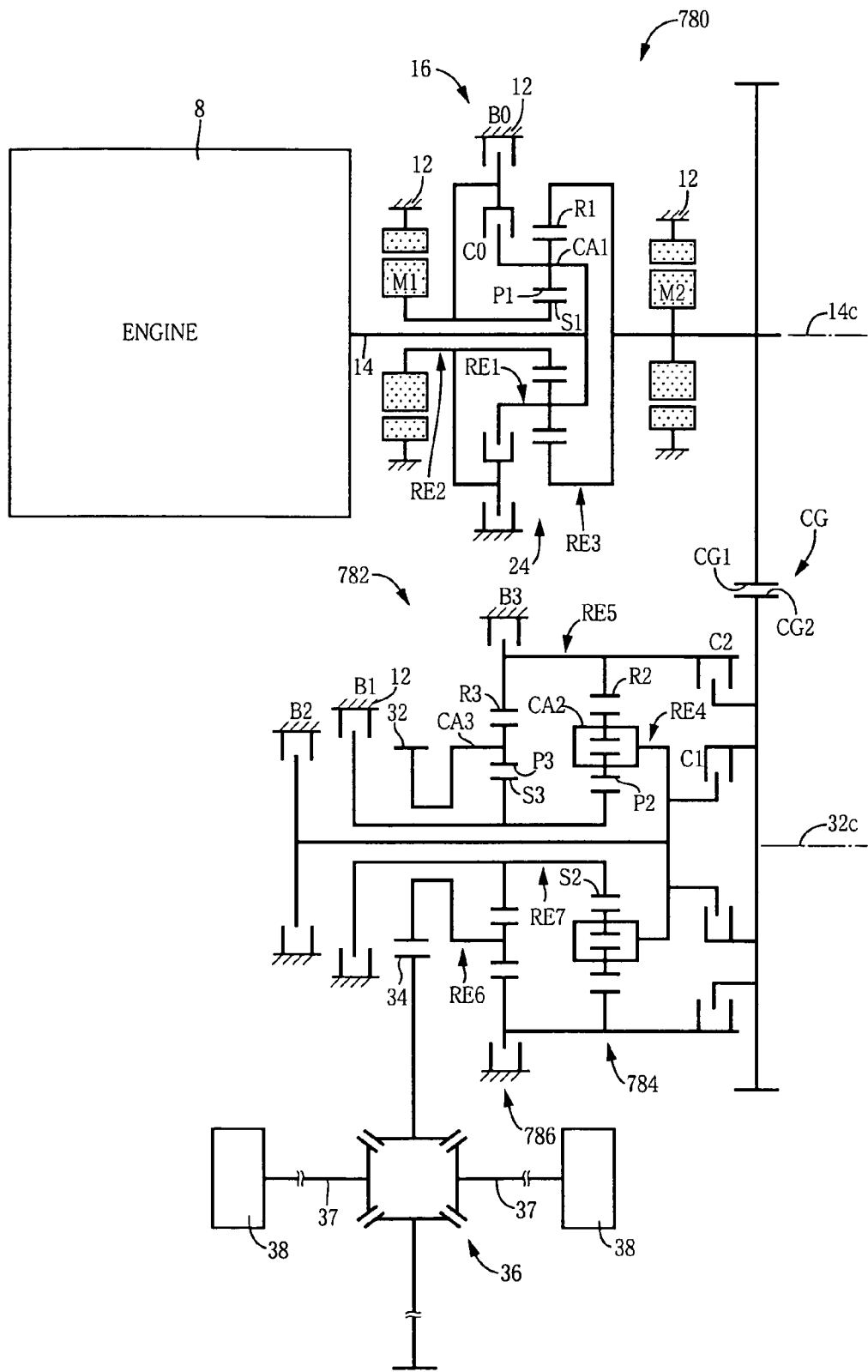
[FIG. 105] This figure is a schematic view for explaining an arrangement of a hybrid vehicle drive system according to another embodiment of this invention.

FIG. 105 is a schematic view for explaining a drive system 780 according to another embodiment of this invention. The drive system 780 of the present embodiment includes the power distributing mechanism 16, the first electric motor M1, the second electric motor M2 and the counter gear pair CG, as in the embodiment shown in FIG. 95, etc. The present embodiment is different from the embodiment of FIG. 95, only in the construction of a step-variable automatic transmission 782 disposed on the second axis 32c.

The automatic transmission 782 includes a double-pinion type second planetary gear set 784 and a single-pinion type third planetary gear set 786. The second planetary gear set 784 includes: a second sun gear S2, a plurality of pairs of mutually meshing second planetary gears P2; a second carrier CA2 supporting the second planetary gears P2 such that each second planetary gear P2 is rotatable about its axis and about the axis of the second sun gear S2; and a second ring gear R2 meshing with the second sun gear S2 through the second planetary gear P3. For example, the second planetary gear set 784 has a gear ratio ρ2 of about 0.529. The third planetary gear set 786 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 786 has a gear ratio ρ3 of about 0.600. The automatic transmission 782 includes the first through third brakes B1-B3 and the first and second clutches C1, C2, as in the above-described automatic transmissions 620, etc.

The second sun gear S2 and third sun gear S3 are integrally fixed to each other and selectively fixed to the casing 12 through the first brake B1, and the second carrier CA2 is selectively connected to a power transmitting member in the form of the counter driven gear CG2 of the counter gear pair CG through the first clutch and selectively fixed to the casing 12 through the second brake B2. The second ring gear R2 and third ring gear R3 that are integrally fixed to each other are selectively connected to the counter driven gear CG2 through the second clutch C2 and selectively fixed to the casing 12 through the third brake B3. The third carrier CA3 is fixed to an output rotary member in the form of the differential drive bear 32. The thus constructed automatic transmission 782 is disposed on one side of the counter gear pair CG on which the power distributing mechanism 16 and engine 8 are disposed. Namely, the automatic transmission 782 is disposed in parallel with the power distributing mechanism 16 and engine 8 disposed on the first axis 14c.

The above-described second carrier CA2 functions as the fourth rotary element RE4, and the second ring gear R2 and third ring gear R3 integrally fixed to each other function as the fifth rotary element RE5. The third carrier CA3 functions as the sixth rotary element RE6, and the second sun gear S2 and third sun gear S3 integrally fixed to each other function as the seventh rotary element RE7. The collinear chart of the embodiments of FIG. 92-104 applies to the drive system 780.

The drive system 780 of the present embodiment also includes the power distributing mechanism 16 functioning as a continuously-variable shifting portion or a first shifting portion, and the automatic transmission 782 functioning as a step-variable shifting portion or a second shifting portion, and the automatic transmission 782 is principally constituted by the two planetary gear sets 784, 786. In this respect, the present embodiment has the same advantage as the embodiment of FIG. 92. Further, the power distributing mechanism 16 and second electric motor M2 are disposed on the first axis 14c, and between the engine 8 and counter gear pair CG, while the automatic transmission 782 are disposed on the second axis 32c separate from the first axis 14c, in parallel with the engine 8 and power distributing mechanism 16, so that the required dimension of the drive system 780 in its axial direction can be reduced.

Embodiment 47

Figure 106:
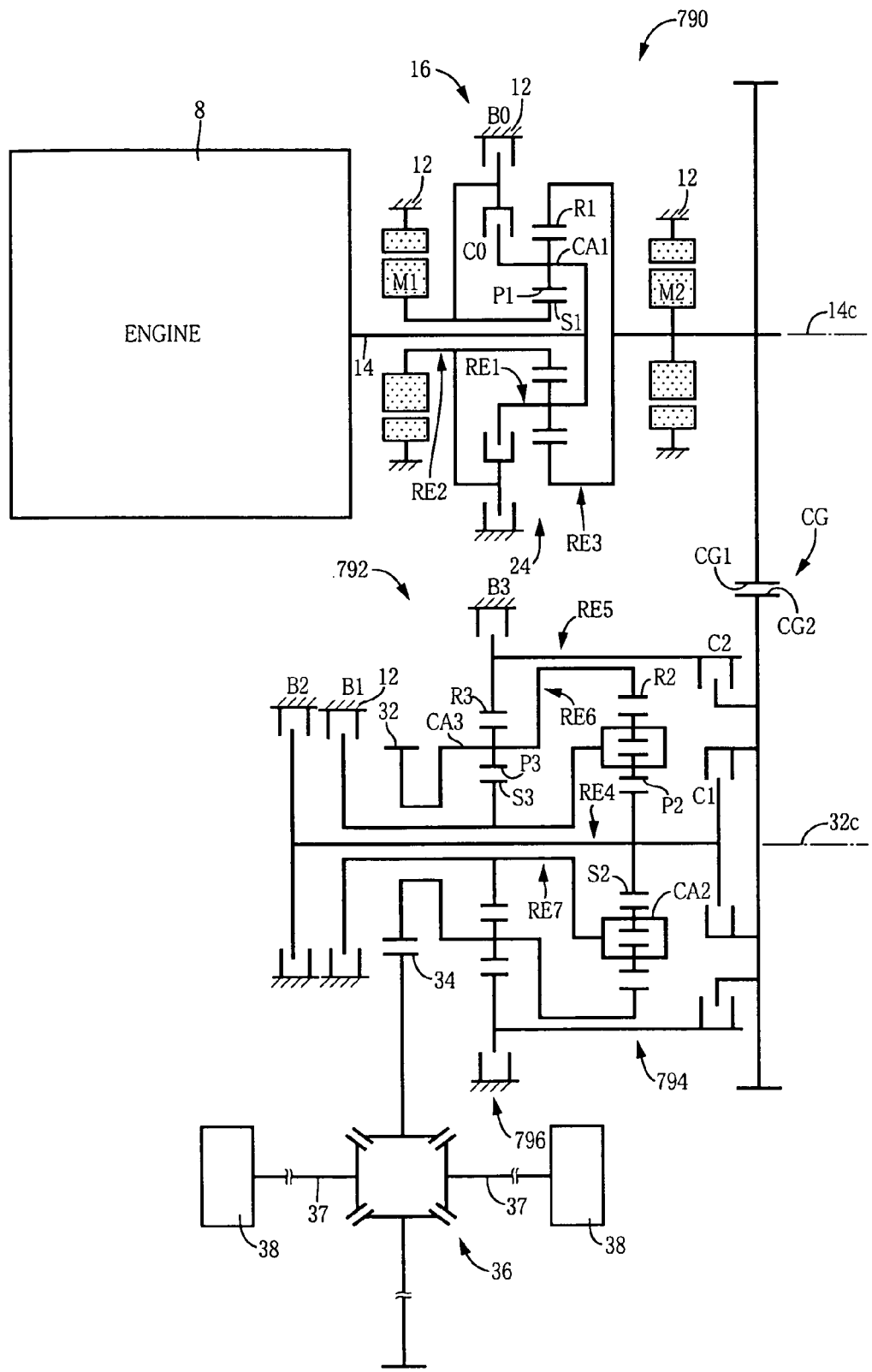
[FIG. 106] This figure is a schematic view for explaining an arrangement of a hybrid vehicle drive system according to another embodiment of this invention.

FIG. 106 is a schematic view for explaining a drive system 790 according to another embodiment of this invention. The drive system 790 of the present embodiment includes the power distributing mechanism 16, the first electric motor M1, the second electric motor M2 and the counter gear pair CG, as in the embodiment shown in FIG. 95, etc. The present embodiment is different from the embodiment of FIG. 95, only in the construction of a step-variable automatic transmission 792 disposed on the second axis 32c.

The automatic transmission 792 includes a double-pinion type second planetary gear set 794 and a single-pinion type third planetary gear set 796. The second planetary gear set 794 includes: a second sun gear S2, a plurality of pairs of mutually meshing second planetary gears P2; a second carrier CA2 supporting the second planetary gears P2 such that each second planetary gear P2 is rotatable about its axis and about the axis of the second sun gear S2; and a second ring gear R2 meshing with the second sun gear S2 through the second planetary gear P3. For example, the second planetary gear set 794 has a gear ratio ρ2 of about 0.294. The third planetary gear set 796 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 796 has a gear ratio ρ3 of about 0.600. The automatic transmission 792 includes the first through third brakes B1-B3 and the first and second clutches C1, C2, as in the above-described automatic transmissions 620, etc.

The second sun gear S2 is selectively connected to a power transmitting member in the form of the counter drive gear CG2 of the counter gear pair CG through the first clutch C1 and selectively fixed to the casing 12 through the second brake B2, and the second carrier CA2 and third sun gear S3 are integrally fixed to each other and selectively fixed to the casing 12 through the first brake B1. The second ring gear R2 and third carrier CA3 are integrally fixed to each other and to an output rotary member in the form of the differential drive gear 32. The third ring gear R3 is selectively connected to the counter driven gear CG2 through the second clutch C2 and selectively fixed to the casing 12 through the third brake B3. The thus constructed automatic transmission 792 is disposed on one side of the counter gear pair CG on which the power distributing mechanism 16 and engine 8 are disposed. Namely, the automatic transmission 792 is disposed in parallel with the power distributing mechanism 16 and engine 8 disposed on the first axis 14c.

The above-described second sun gear S2 functions as the fourth rotary element RE4, and the third ring gear R3 functions as the fifth rotary element RE5. The second ring gear R2 and third carrier CA3 integrally fixed to each other function as the sixth rotary element RE6, and the second carrier CA2 and third sun gear S3 integrally fixed to each other function as the seventh rotary element RE7. The collinear chart of the embodiments of FIG. 92-105 applies to the drive system 790.

The drive system 790 of the present embodiment also includes the power distributing mechanism 16 functioning as a continuously-variable shifting portion or a first shifting portion, and the automatic transmission 792 functioning as a step-variable shifting portion or a second shifting portion, and the automatic transmission 792 is principally constituted by the two planetary gear sets 794, 796. In this respect, the present embodiment has the same advantage as the embodiment of FIG. 92. Further, the power distributing mechanism 16 and second electric motor M2 are disposed on the first axis 14c, and between the engine 8 and counter gear pair CG, while the automatic transmission 792 are disposed on the second axis 32c separate from the first axis 14c, in parallel with the engine 8 and power distributing mechanism 16, so that the required dimension of the drive system 790 in its axial direction can be reduced.

Embodiment 48

Figure 107:
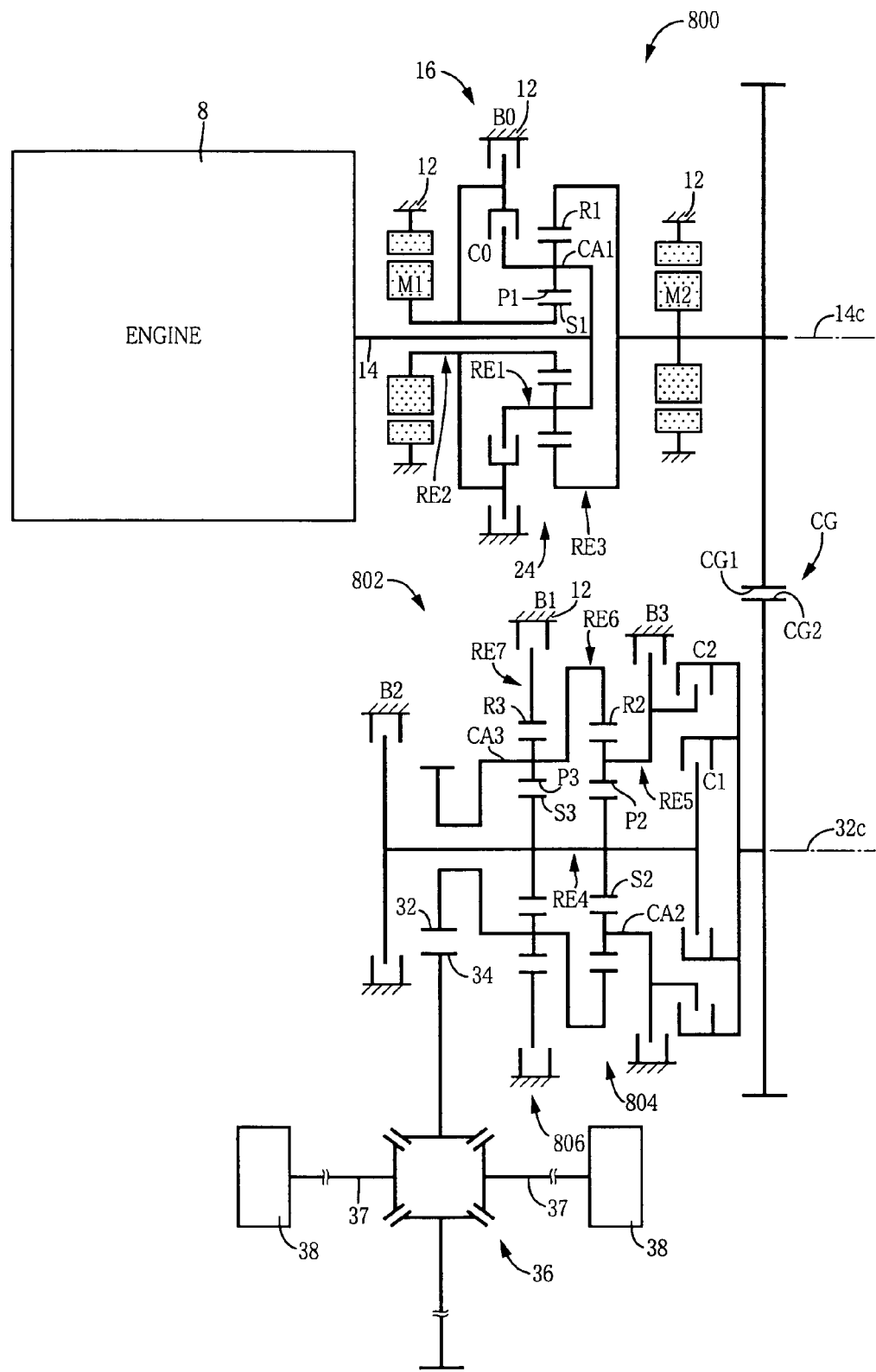
[FIG. 107] This figure is a schematic view for explaining an arrangement of a hybrid vehicle drive system according to another embodiment of this invention.

FIG. 107 is a schematic view for explaining a drive system 800 according to another embodiment of this invention. The drive system 800 of the present embodiment includes the power distributing mechanism 16, the first electric motor M1, the second electric motor M2 and the counter gear pair CG, as in the embodiment shown in FIG. 95, etc. The present embodiment is different from the embodiment of FIG. 95, only in the construction of a step-variable automatic transmission 802 disposed on the second axis 32c.

The automatic transmission 802 includes a single-pinion type second planetary gear set 804 and a single-pinion type third planetary gear set 806. The second planetary gear set 804 includes: a second sun gear S2, a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P3. For example, the second planetary gear set 804 has a gear ratio ρ2 of about 0.333. The third planetary gear set 806 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 806 has a gear ratio ρ3 of about 0.417. The automatic transmission 802 includes the first through third brakes B1-B3 and the first and second clutches C1, C2, as in the above-described automatic transmissions 620, etc.

The second sun gear S2 and third sun gear S3 that are integrally fixed to each other are selectively connected to a power transmitting member in the form of the counter drive gear CG2 of the counter gear pair CG through the first clutch C1 and selectively fixed to the casing 12 through the second brake B2, and the second carrier CA2 is selectively connected to the counter drive gear CG2 through the second clutch C2 and selectively fixed to the casing 12 through the third brake B3. The second ring gear R2 and third carrier CA3 are integrally fixed to each other and to an output rotary member in the form of the differential drive gear 32. The third ring gear R3 is selectively fixed to the casing 12 through the first brake B1.

The above-described second sun gear S2 and third sun gear R3 function as the fourth rotary element RE4, and the second carrier CA2 functions as the fifth rotary element RE5. The second ring gear R2 and third carrier CA3 integrally fixed to each other function as the sixth rotary element RE6, and the third ring gear S3 functions as the seventh rotary element RE7. The collinear chart of the embodiments of FIG. 92-106 applies to the drive system 800.

The drive system 800 of the present embodiment also includes the power distributing mechanism 16 functioning as a continuously-variable shifting portion or a first shifting portion, and the automatic transmission 802 functioning as a step-variable shifting portion or a second shifting portion, and the automatic transmission 802 is principally constituted by the two planetary gear sets 804, 806. In this respect, the present embodiment has the same advantage as the embodiment of FIG. 95. Further, the power distributing mechanism 16 and second electric motor M2 are disposed on the first axis 14c, and between the engine 8 and counter gear pair CG, while the automatic transmission 802 are disposed on the second axis 32c separate from the first axis 14c, in parallel with the engine 8 and power distributing mechanism 16, so that the required dimension of the drive system 800 in its axial direction can be reduced.

Embodiment 49

Figure 108:
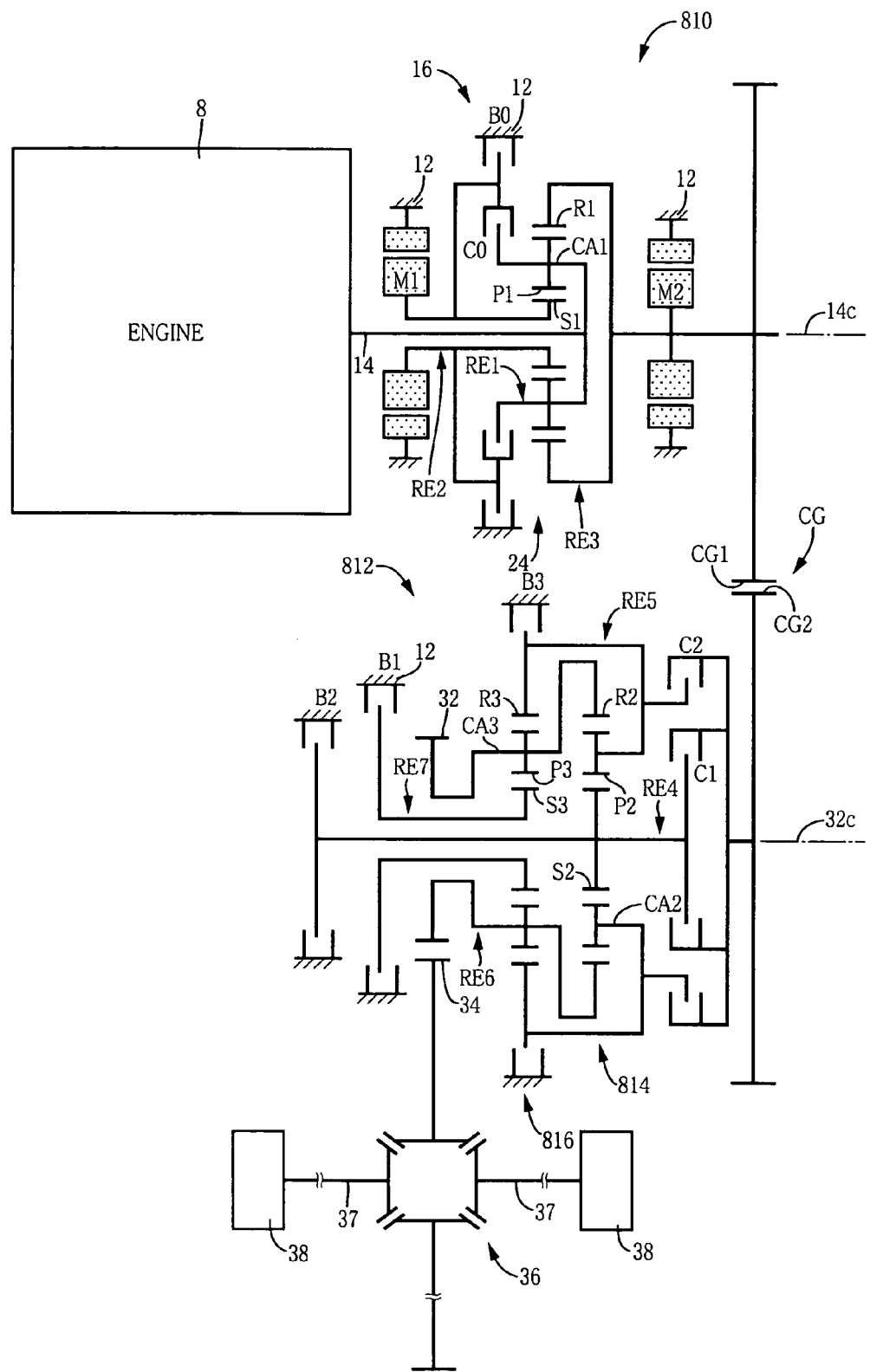
[FIG. 108] This figure is a schematic view for explaining an arrangement of a hybrid vehicle drive system according to another embodiment of this invention.

FIG. 108 is a schematic view for explaining a drive system 810 according to another embodiment of this invention. The drive system 810 of the present embodiment includes the power distributing mechanism 16, the first electric motor M1, the second electric motor M2 and the counter gear pair CG, as in the embodiment shown in FIG. 95, etc. The present embodiment is different from the embodiment of FIG. 95, only in the construction of a step-variable automatic transmission 812 disposed on the second axis 32c.

The automatic transmission 812 includes a single-pinion type second planetary gear set 814 and a single-pinion type third planetary gear set 816. The second planetary gear set 814 includes: a second sun gear S2, a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P3. For example, the second planetary gear set 814 has a gear ratio ρ2 of about 0.333. The third planetary gear set 816 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 816 has a gear ratio ρ3 of about 0.600. The automatic transmission 812 includes the first through third brakes B1-B3 and the first and second clutches C1, C2, as in the above-described automatic transmissions 620, etc.

The second sun gear S2 is selectively connected to a power transmitting member in the form of the counter drive gear CG2 of the counter gear pair CG through the first clutch C1 and selectively fixed to the casing 12 through the second brake B2, and the second carrier CA2 and third ring gear R3 that are integrally fixed toe ach other are selectively connected to the counter drive gear CG2 through the second clutch C2 and selectively fixed to the casing 12 through the third brake B3. The second ring gear R2 and third carrier CA3 are integrally fixed to each other and to an output rotary member in the form of the differential drive gear 32. The third sun gear S3 is selectively fixed to the casing 12 through the first brake B1. The thus constructed automatic transmission 812 is disposed on one side of the counter gear pair CG on which the power distributing mechanism 16 and engine 8 are disposed. Namely, the automatic transmission 812 is disposed in parallel with the power distributing mechanism 16 and engine 8 disposed on the first axis 14c.

The above-described second sun gear S2 functions as the fourth rotary element RE4, and the second carrier CA2 and third ring gear R3 integrally fixed to each other function as the fifth rotary element RE5. The second ring gear R2 and third carrier CA3 integrally fixed to each other function as the sixth rotary element RE6, and the third sun gear R3 functions as the seventh rotary element RE7. The collinear chart of the embodiments of FIG. 92-107 applies to the drive system 810.

The drive system 810 of the present embodiment also includes the power distributing mechanism 16 functioning as a continuously-variable shifting portion or a first shifting portion, and the automatic transmission 812 functioning as a step-variable shifting portion or a second shifting portion, and the automatic transmission 812 is principally constituted by the two planetary gear sets 814, 816. In this respect, the present embodiment has the same advantage as the embodiment of FIG. 92. Further, the power distributing mechanism 16 and second electric motor M2 are disposed on the first axis 14c, and between the engine 8 and counter gear pair CG, while the automatic transmission 812 are disposed on the second axis 32c separate from the first axis 14c, in parallel with the engine 8 and power distributing mechanism 16, so that the required dimension of the drive system 810 in its axial direction can be reduced.

Embodiment 50

Figure 109:
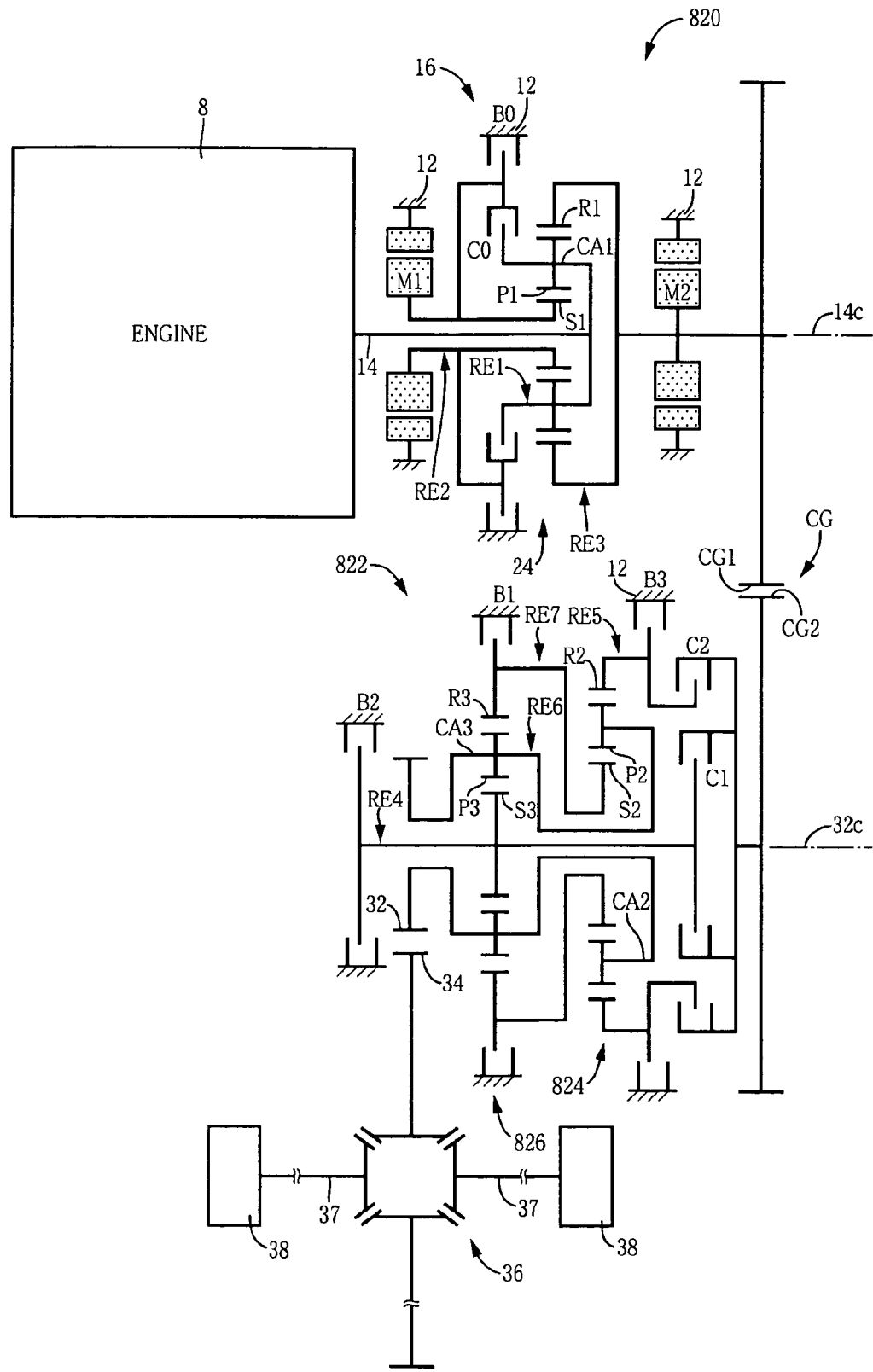
[FIG. 109] This figure is a schematic view for explaining an arrangement of a hybrid vehicle drive system according to another embodiment of this invention.

FIG. 109 is a schematic view for explaining a drive system 820 according to another embodiment of this invention. The drive system 820 of the present embodiment includes the power distributing mechanism 16, the first electric motor M1, the second electric motor M2 and the counter gear pair CG, as in the embodiment shown in FIG. 95, etc. The present embodiment is different from the embodiment of FIG. 95, only in the construction of a step-variable automatic transmission 822 disposed on the second axis 32c.

The automatic transmission 822 includes a single-pinion type second planetary gear set 824 and a single-pinion type third planetary gear set 826. The second planetary gear set 824 includes: a second sun gear S2, a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P3. For example, the second planetary gear set 824 has a gear ratio $\rho 2$ of about 0.600. The third planetary gear set 826 has: a third sun gear S3, a third planetary gear P3; a third carrier CA3 supporting the third planetary gear P3 such that the third planetary gear P3 is rotatable about its axis and about the axis of the third sun gear S3; and a third ring gear R3 meshing with the third sun gear S2 through the third planetary gear P3. For example, the third planetary gear set 826 has a gear ratio $\rho 3$ of about 0.417. The automatic transmission 822 includes the first through third brakes B1-B3 and the first and second clutches C1, C2, as in the above-described automatic transmissions 620, etc.

The second sun gear S2 is selectively fixed to the casing 12 through the first brake B1, and the second carrier CA2 and third carrier CA3 are fixed to an output rotary member in the form of the differential drive gear 32. The second ring gear R2 is selectively connected to the counter drive gear CG2 through the second clutch C2 and selectively fixed to the casing 12 through the third brake B3, and the third sun gear is selectively connected to a power transmitting member in the form of the counter driven gear CG2 of the counter gear pair CG through the first clutch C1 and selectively fixed to the casing 12 through the second brake B2. The thus constructed automatic transmission 822 is disposed on one side of the counter gear pair CG on which the power distributing mechanism 16 and engine 8 are disposed. Namely, the automatic transmission 822 is disposed in parallel with the power distributing mechanism 16 and engine 8 disposed on the first axis 14c.

The above-described third sun gear S3 functions as the fourth rotary element RE4, and the second ring gear R2 functions as the fifth rotary element RE5. The second carrier CA2 and third carrier CA3 integrally fixed to each other function as the sixth rotary element RE6, and the second sun gear S2 and third ring gear R3 integrally fixed to each other function as the seventh rotary element RE7. The collinear chart of the embodiments of FIG. 92-108 applies to the drive system 820.

The drive system 820 of the present embodiment also includes the power distributing mechanism 16 functioning as a continuously-variable shifting portion or a first shifting portion, and the automatic transmission 822 functioning as a step-variable shifting portion or a second shifting portion, and the automatic transmission 822 is principally constituted by the two planetary gear sets 824, 826. In this respect, the present embodiment has the same advantage as the embodiment of FIG. 92. Further, the power distributing mechanism 16 and second electric motor M2 are disposed on the first axis 14c, and between the engine 8 and counter gear pair CG, while the automatic transmission 822 are disposed on the second axis 32c separate from the first axis 14c, in parallel with the engine 8 and power distributing mechanism 16, so that the required dimension of the drive system 820 in its axial direction can be reduced.

While the embodiments of the present invention have described above in detail by reference to the drawings, the present invention may be otherwise embodied.

Each of the drive systems 10, 70, 80, 92-, 110, 120, 130, 140, 150, 160, 170, 180, 190, 200, 210, 220, 410, 480, 490, 500, 510, 520, 530, 540, 550, 560, 570, 610, 680, 690, 700, 710, 720, 730, 740, 750, 760, 770, 780, 790, 800, 810 and 820 according to the embodiments described above is switchable between the continuously-variable shifting state in which the drive system functions as an electrically controlled continuously variable transmission, and the step-variable shifting state in which the drive system functions as a step-variable transmission, by switching the power distributing mechanism 16 between its differential state and non-differential state. This manner of switching between the continuously-variable shifting state and the step-variable shifting state is one mode of switching of the shifting state as a result of the switching of the power distributing mechanism 16 between the differential and non-differential states. For example, the speed ratio of the power distributing mechanism 16 may be variable in steps rather than continuously even in its differential state, so that the drive system functions as a step-variable transmission in the differential state of the power distributing mechanism 16. In other words, the differential state and non-differential state of the drive system 10, 70, 80, 92-, 110, 120, 130, 140, 150, 160, 170, 180, 190, 200, 210, 220, 410, 480, 490, 500, 510, 520, 530, 540, 550, 560, 570, 610, 680, 690, 700, 710, 720, 730, 740, 750, 760, 770, 780, 790, 800, 810 and 820 (power distributing mechanism 16) do not necessarily correspond to the continuously-variable shifting state and the step-variable shifting state, respectively, and the drive system 10, 70, 80, 92-, 110, 120, 130, 140, 150, 160, 170, 180, 190, 200, 210, 220, 410, 480, 490, 500, 510, 520, 530, 540, 550, 560, 570, 610, 680, 690, 700, 710, 720, 730, 740, 750, 760, 770, 780, 790, 800, 810 and 820 is not arranged to be switchable between the continuously-variable and step-variable shifting states. The principle of the present invention merely requires the switching between the differential state and the non-differential state (locked state) of the drive system (transmission mechanism) 10, 70, 80, 92-, 110, 120, 130, 140, 150, 160, 170, 180, 190, 200, 210, 220, 410, 480, 490, 500, 510, 520, 530, 540, 550, 560, 570, 610, 680, 690, 700, 710, 720, 730, 740, 750, 760, 770, 780, 790, 800, 810 and 820, the power distributing mechanism 16, or the differential portion 11 (switchable type shifting portion 11, 81, 93, or power distributing mechanism 16, 84, 94).

The automatic transmission 112 in the illustrated embodiments has the five rotary elements including the eighth rotary element RE8 directly fixed to the power transmitting member 18 for transmission of a drive force to the power transmitting member 18, the seventh rotary element RE7 fixed to the output shaft 22 and the sixth rotary element RE6 fixed to the casing 12 through the third brake B3, and the direction of rotation of the rotary motion input to the automatic transmission 112 is reversed with respect to that of the engine 8, by the power distributing mechanism 16, so that the power transmitting member 18 is rotated in the negative direction, and the drive system 110 is placed in the reverse-gear position by engaging the third brake B3. However, the direction of rotation of the rotary motion input to the automatic transmission can be reversed by the power distributing mechanism, provided the automatic transmission has at least three rotary elements the rotating speeds of which are represented by straight lines in a collinear chart in which the at least three rotary elements are arranged in a direction from one of opposite ends of the collinear chart toward the other end, in a predetermined order, such that one of the at least three rotary elements is connected to the power transmitting member 18 for transmission of the drive force to the power transmitting member 18, that is, connected to the power transmitting member 18 directly or through a clutch, and another of the at least thee rotary elements is connected to the output member for transmission of the drive. force to the output member of the automatic transmission, while a further one of the at least three rotary elements is fixed to a stationary member through a brake. When this brake is engaged, the drive system is placed in the reverse-gear position. Where one of the at least three rotary elements is connected to the power transmitting member 18 through the clutch, this clutch as well as the brake is engaged to establish the reverse-gear position.

For example, the first brake B1 in place of the third brake B3 may be engaged in the automatic transmission 112, to place the drive system 110 in the reverse-gear position. Further, the direction of rotation of the rotary motion input to the automatic transmission 92, for example, can be reversed by the power distributing mechanism 84, and the drive system can be placed in the reverse-gear position by engaging the first clutch C1 and the second brake B2.

The automatic transmission 112 in the illustrated embodiments has the five rotary elements including the eighth rotary element RE8 directly fixed to the power transmitting member 18 for transmission of a drive force to the power transmitting member 18, and the seventh rotary element RE7 fixed to the output shaft 22, and the second clutch C2 for rotation of the rotary elements of the automatic transmission 112 as a unit, and the direction of rotation of the rotary motion input to the automatic transmission 112 is reversed with respect to that of the engine 8, by the power distributing mechanism 16, so that the power transmitting member 18 is rotated in the negative direction, and the drive system 110 is placed in the reverse-gear position by engaging the second clutch C2. However, the direction of rotation of the rotary motion input to the automatic transmission can be reversed by the power distributing mechanism, provided the automatic transmission has at least three rotary elements one of which is connected to the power transmitting member 18 for transmission of the drive force to the power transmitting member 18, that is, connected to the power transmitting member 18 directly or through a power transmitting clutch, and another of which is connected to the output member for transmission of the drive force to the output member of the automatic transmission, and provided that the automatic transmission has a clutch for rotation of the rotary elements of the automatic transmission as a unit. When this clutch is engaged, the drive system is placed in the reverse-gear position. Where one of the at least three rotary elements is connected to the power transmitting member 18 through the power transmitting clutch, this power transmitting clutch as well as the clutch is engaged to establish the reverse-gear position.

In the power distributing mechanisms 16, 84, 94 in the illustrated embodiments, the first carrier CA1 is fixed to the engine 8, and the first sun gear S1 is fixed to the first electric motor M1, while the first ring gear R1 is fixed to the power transmitting member 18 or the counter gear pair CG. This arrangement of connection is not essential, provided the engine 8, first electric motor M1 and power transmitting member 18 or counter gear pair CG are fixed to respective ones of the three elements CA1, S1 and R1 of the first planetary gear set 24.

Although the engine 8 is directly connected to the input shaft 14 in the illustrated embodiments, the engine 8 may be operatively connected to the input shaft 14 through gears, a belt or the like, and need not be disposed coaxially with the input shaft 14.

In the illustrated embodiments, each of the first electric motor M1 and the second electric motor M2 is disposed coaxially with the input shaft 14, the first axis 14c or the second axis 32c, and the first electric motor M1 is fixed to the first sun gear S1 while the second electric motor M2 is fixed to the power transmitting member 18 or the counter gear pair CG. However, this arrangement is not essential. For example, the first electric motor M1 may be fixed to the first sun gear S1 through gears, a belt or the like, and the second electric motor M2 may be fixed to the power transmitting member 18 or the counter gear pair CG through gears, a belt or the like.

Although each power distributing mechanism 16, 84 described above is provided with the switching clutch C0 and the switching brake B0, the power distributing mechanism need not be provided with both of these switching clutch C0 and brake B0, and may be provided with only one of the switching clutch C0 and brake B0. While the power distributing mechanism 94 is provided with the switching brake B0, this power distributing mechanism may be provided with both of the switching clutch C0 and the switching brake B0 or only the switching clutch C0. Although the switching clutch C0 is arranged to selectively connect the sun gear S1 and carrier CA1 to each other, the switching clutch C0 may be arranged to selectively connect the sun gear S1 and ring gear R1 to each other, or the carrier CA1 and ring gear R1. In essence, the switching clutch C0 is required to be a switching device arranged to connect any two of the three elements of the first planetary gear set 24.

The switching clutch C0 is engaged to establish the neutral position "N" in the drive systems 10, 70, 80, 92-, 120, 130, 140, 180, 190, 200, 210, 220, 410, 480, 490, 500, 510, 520, 530, 540, 550, 560, 570, 610, 680, 690, 700, 710, 720, 730, 740, 750, 760, 770, 780, 790, 800, 810 and 820 of the illustrated embodiments. However, the neutral position need not be established by engaging the switching clutch C0. Conversely, the switching clutch C0 may be engaged to establish the neutral position "N" in the drive systems 110, 150, 160, 170, 210 and 220.

Each of the hydraulically operated frictional coupling devices such as the switching clutch C0 and switching brake Bo used in the illustrated embodiments may be a coupling device of a magnetic-powder type, an electromagnetic type or a mechanical type, such as a powder (magnetic powder) clutch, an electromagnetic clutch and a meshing type dog clutch. Each brake may be a band brake including a rotary drum and one band or two bands which is/are wound on the outer circumferential surface of the rotary drum and tightened at one end by a hydraulic actuator.

In the illustrated embodiments, the second electric motor M2 is fixed to the power transmitting member 18 or the counter gear pair CG. However, the second electric motor M2 may be fixed to the output shaft 22 or the differential drive gear 32, or to a rotary member of the automatic transmission 20, 72, 86, 96, 112, 172, 420, 492, 512, 522, 532, 542, 552, 562, 620, 692, 712, 732, 742, 752, 762, 772, 782, 792, 802, 812, 822.

In the illustrated embodiments, the step-variable automatic transmission (automatic transmission portion) 20, 72, 86, 96, 112, 172 is disposed between the drive wheels 38, and the power transmitting member 18 or counter gear pair CG which is the output member of the switchable type shifting portion (differential portion) 11, 81, 93, namely, of the power distributing mechanism 16, 84, 94. However, such step-variable automatic transmission may be replaced by any other type of power transmitting device such as a permanent meshing type parallel-two-axes automatic transmission the gear positions of which are automatically selectable by select cylinders and shift cylinders and which is well known as an automatic transmission such as a continuously variable transmission (CVT), and a manual transmission. Alternatively, any automatic transmission need not be provided. Where a continuously variable transmission (CVT) is provided, the drive system may be placed in the step-variable shifting state when the power distributing mechanism 16, 84, 94 is placed in its fixed-speed-ratio shifting state. The step-variable shifting state is interpreted to mean a state in which a vehicle drive force is transmitted primarily through a mechanical power transmitting path, without using an electric path. The continuously variable transmission may be arranged to establish a plurality of predetermined fixed speed ratios which correspond to those of the gear positions of a step-variable transmission and which are stored in a memory.

In the illustrated embodiments, each of the drive systems 10, 70, 80, 92, 110, 120, 130, 140, 150, 160, 170, 180, 190, 200, 210, 220, 410, 480, 490, 500, 510, 520, 530, 540, 550, 560, 570, 610, 680, 690, 700, 710, 720 730, 740, 750, 760, 770, 780, 790, 800, 810, 820 is used as a drive system for a hybrid vehicle which is arranged to be driven with a torque of the first electric motor M1 or second electric motor M2 as well as a torque of the engine 8. However, the present invention is applicable to a vehicular drive system which has only a function of a continuously variable transmission called "electric CV" and in which a hybrid control is not implemented with respect to the power distributing mechanism 16, 84, 94 of the drive system 10, 70, 80, 92, 110, 120, 130, 140, 150, 160, 170, 180, 190, 200, 210, 220, 410, 480, 490, 500, 510, 520, 530, 540, 550, 560, 570, 610, 680, 690, 700, 710, 720 730, 740, 750, 760, 770, 780, 790, 800, 810, 820.

The power distributing mechanism 16, 84, 94 provided in the illustrated embodiments may be replaced by a differential gear device including a pinion rotated by the engine, and a pair of bevel gears which mesh with the pinion and which are respectively operatively connected to the first and second electric motors M1, M2.

Although the power distributing mechanism 16, 84, 94 is constituted by one planetary gear set in the illustrated embodiments, the power distributing mechanism may be constituted by two or more planetary gear sets and arranged to be operable as a transmission having three or more gear positions when placed in its fixed-speed-ratio shifting state.

The counter gear pair CG used as the power transmitting member in the illustrated embodiments may be replaced by a power transmitting device, which is constituted, for example, by a sprocket wheel disposed on the first axis 14c, another sprocket wheel disposed on the second axis 20c, and a chain which operatively connects those sprocket wheels. This power transmitting device may be replaced by a device using pulleys and a belt in place of the sprocket wheels and chain. In these cases, another counter shaft is provided, since the relationship between the direction of rotation of the engine 8 and the direction of rotation of the drive wheels 38 is reversed with respect to that where the counter gear pair CG is used.

In the illustrated embodiments, the shift lever 48 placed in its manual position M permits the selection of the gear positions. However, the shift lever may be arranged to manually select a desired one of the gear positions, for example, first-gear through fifth-gear positions in the drive system 10, according to a manual operation of the shift lever from the manual position M to the shift-up position "+" or shift-down position "−".

While the switch 44 is of a seesaw type switch in the illustrated embodiments, the switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The switch 44 may-or may not have a neutral position. Where the switch 44 does not have the neutral position, an additional switch may be provided to enable and disable the switch 44. The function of this additional switch corresponds to the neutral position of the switch 44.

In the illustrated embodiments, each of the automatic transmission portions 20, 72, 86, 96, 112, 172 is connected in series to and coaxially with the differential portion 11 through the power transmitting member 18. However, those automatic transmissions may be disposed on a counter shaft disposed in parallel with the input shaft 14. In this case, the differential portion 11 and the automatic transmission 20, 82 are connected to each other for transmission of a drive force therebetween, by a counter gear pair, or a power transmitting device such as a set of sprocket wheels and a chain.

Although the relationship memory means 54 stores one map or two maps for each of the step-variable shifting control, the drive-power-source selection control and the switching control, the memory means 54 may store three or more maps for each of those controls, as needed.

In the illustrated embodiments, the system efficiency ηsysc in the continuously-variable shifting state and the system efficiency ηsysu in the step-variable shifting state are stored constants obtained by experimentation. However, these efficiencies may be changed as a function of the vehicle condition such as the vehicle running speed V and the temperature of the working oil of the automatic transmission 20. Further, the system efficiency ηsysc in the continuously-variable shifting state and the system efficiency ηsysu in the step-variable shifting state need not be used to calculate the fuel consumption ratio fs. In this case, the calculated fuel consumption ratio fs is not necessarily accurate, but approximate values of the fuel economy in the continuously-variable and step-variable shifting states may be compared with each other.

The value ηgi in the right side of the equation (3) used in the illustrated embodiments need not be used.

In the illustrated embodiments, the switching-map changing means 86 of the switching control means 50 is arranged to change the switching boundary line map of FIG. 12 so as to change the entirety of the continuously-variable or step-variable shifting region corresponding to the shifting state not selected by the switch 44, to the other shifting region corresponding to the shifting state selected by the switch 44. However, the switching-map changing means 86 may be arranged to change a portion of the shifting region corresponding to the non-selected shifting state to the other shifting region corresponding to the selected shifting state. For example, the switching boundary lines in FIG. 12 are moved to increase the upper vehicle-speed limit VI or upper output-torque limit T1, so as to enlarge the continuously-variable or step-variable shifting region corresponding to the shifting state selected by the switch 44.

In the illustrated embodiment of FIG. 12, the transmission mechanism 10 is selectively placed in one of the continuously-variable and step-variable shifting states, according to the stored continuously-variable and step-variable shifting regions. However, the stored switching map of FIG. 12 may be formulated such that the continuously-variable shifting region covers the entire area of the vehicle condition, so that the transmission mechanism 10 is normally held in the continuously-variable shifting state, and placed in the step-variable shifting state when the switching map of FIG. 12 is entirely or partially changed as a result of manual selection of the step-variable shifting state by the vehicle operator. In other words, the stored switching map may be formulated to normally select the continuously-variable shifting state, and to permit the switching control means 50 to switch the shifting state to the step-variable shifting state upon selection of the step-variable shifting state by the vehicle operator. In this case, the vehicle operator is required to operate the switch 44 only when the vehicle operator desires the step-variable shifting state, and the switch 44 need not be arranged to select the continuously-variable shifting state.

In the embodiment of FIGS. 88-90, the reverse-gear position is established by engaging the first clutch C1 and the third clutch C3. However, the reverse-gear position may be established by engaging the first clutch C1 and the first brake B1, or the first clutch C1 and the second brake B2.

While the embodiments of the present invention have been described above for illustrative purpose only, it is to be understood that the present invention may be embodied with various changes and improvements, which may occur to those skilled in the art.

The invention claimed is:

1. A vehicular drive system including a power distributing mechanism operable to distribute an output of an engine to a first electric motor and a power transmitting member, and a second electric motor disposed between the power transmitting member and a drive wheel of a vehicle, characterized by comprising:
   a transmission mechanism that comprises a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission,
   wherein said power distributing mechanism includes a first element fixed to said engine, a second element fixed to said first electric motor, and a third element fixed to said power transmitting member, and said differential-state switching device is operable to permit said first, second and third elements to be rotated relative to each other, for thereby placing the power distributing mechanism in said differential state, and to connect at least two of said first, second and third elements to each other or to hold said second element stationary, for thereby placing the power distributing mechanism in said locked state, and
   wherein said power distributing mechanism is a planetary gear set,
   and wherein said first element is a carrier of said planetary gear set, and said second element is a sun gear of said planetary gear set, while said third element is a ring gear of said planetary gear set,
   said differential-state switching device including a clutch operable to connect selected two of said carrier, sun gear and ring gear to each other, and/or a brake operable to fix said sun gear to a stationary member.

2. A vehicular drive system according to claim 1, wherein said planetary gear set is a planetary gear set of single-pinion type.

3. A vehicular drive system according to claim 2, wherein said differential-state switching device is operable to connect said carrier and sun gear of said planetary gear set of single-pinion type, for enabling said planetary gear set to operate as a transmission having a speed ratio of 1, or to hold said sun gear stationary, for enabling the planetary gear set as a speed-increasing transmission having a speed ratio lower than 1.

4. A vehicular drive system according to claim 1, wherein said planetary gear set is a planetary gear set of double-pinion type.

5. A vehicular drive system according to claim 4, wherein said differential-state switching device is operable to connect said carrier and sun gear of said planetary gear set of double-pinion type, for enabling said planetary gear set to operate as a transmission having a speed ratio of 1, or to hold said sun gear stationary, for enabling the planetary gear set to operate as a speed-reducing transmission having a speed ratio higher than 1.

6. A vehicular drive system according to claim 1, further comprising an automatic transmission disposed between said power transmitting member and said drive wheel,
   and wherein a speed ratio of said drive system is determined by a speed ratio of said automatic transmission.

7. A vehicular drive system according to claim 1, further comprising an automatic transmission disposed between said power transmitting member and said drive wheel, and wherein an overall speed ratio of said drive system is determined by a speed ratio of said power distributing mechanism and a speed ratio of said automatic transmission.

8. A vehicular drive system according to claim 6, wherein said automatic transmission is a step-variable automatic transmission.

9. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:
   said power distributing mechanism includes a first planetary gear set having three elements consisting of a sun gear, a carrier and a ring gear in which said three elements are arranged as a second element, a first element and a third element, respectively, in the order of description, said first element being fixed to said engine, said second element being fixed to said first electric motor, while said third element being fixed to said power transmitting member, said power distributing mechanism further including a switching clutch operable to connect said second element to said first element, and/or a switching brake operable to fix said second element to a stationary member, said power distributing mechanism being placed in a differential state by releasing said switching clutch and/or said switching brake, and in a fixed-speed-ratio shifting state in which said power distributing mechanism has a fixed speed ratio, by engaging said switching clutch and/or said switching brake; and
   said step-variable automatic transmission includes a second planetary gear set, a third planetary gear set and a fourth planetary gear set, and has five rotary elements each of which is constituted by at least one of sun gears, carriers and ring gears of said second, third and fourth planetary gear sets, said five rotary elements are arranged as a fourth element, a fifth element, a sixth element, a seventh element and an eighth element, respectively, in the order of description, said fourth element being selectively connected through a second clutch to said power transmitting member and selectively fixed through a first brake to the stationary member, and said fifth element being selectively fixed through a second brake to the stationary member, while said sixth element being selectively fixed through a third brake to the stationary member, said seventh element being fixed to an output rotary member of said step-variable automatic transmission, said eighth element being selectively connected through a first clutch to said power transmitting member, said step-variable automatic transmission having a plurality of operating positions that are established by engaging actions of respective combinations of said first clutch, second clutch, first brake, second brake and third brake.

10. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:
said power distributing mechanism includes a first planetary gear set of single-pinion type having a first sun gear, a first carrier and a first ring gear, said first carrier being fixed to said engine, and said first sun gear being fixed to said first electric motor, while said first ring gear being fixed to said power transmitting member, said power distributing mechanism further including a switching clutch operable to connect said first carrier and said first sun gear to each other, and/or a switching brake operable to fix said first sun gear to a stationary member; and
said step-variable automatic transmission includes a second planetary gear set of single-pinion type, a third planetary gear set of single-pinion type and a fourth planetary gear set of single-pinion type, said second planetary gear set having a second sun gear, a second carrier and a second ring gear, and said third planetary gear set having a third sun gear, a third carrier and a third ring gear, while said fourth planetary gear set having a fourth sun gear, a fourth carrier and a fourth ring gear, said second sun gear and said third sun gear being selectively connected through a second clutch to said power transmitting member and selectively fixed through a first brake to the stationary member, and said second carrier being selectively fixed through a second brake to the stationary member, while said fourth ring gear being selectively fixed through a third brake to the stationary member, and wherein said second ring gear, said third carrier and said fourth carrier are fixed to an output rotary member of said step-variable automatic transmission, and said third ring gear and said fourth sun gear are selectively connected through a first clutch to said power transmitting member.

11. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:
said power distributing mechanism includes a first planetary gear set having three elements consisting of a sun gear, a carrier and a ring gear in which said three elements are arranged as a second element, a first element and a third element, respectively, in the order of description, said first element being fixed to said engine, said second element being fixed to said first electric motor, while said third element being fixed to said power transmitting member, said power distributing mechanism further including a switching clutch operable to connect said second element to said first element, and/or a switching brake operable to fix said second element to a stationary member, said power distributing mechanism being placed in a differential state by releasing said switching clutch and/or said switching brake, and in a fixed-speed-ratio shifting state in which said power distributing mechanism has a fixed speed ratio, by engaging said switching clutch and/or said switching brake; and
said step-variable automatic transmission includes a second planetary gear set and a third planetary gear set, and has four rotary elements each of which is constituted by at least one of sun gears, carriers and ring gears of said second and third planetary gear sets, in which said four rotary elements are arranged as a fourth element, a fifth element, a sixth element and a seventh element, respectively, said fourth element being selectively connected through a second clutch to said power transmitting member and selectively fixed through a first brake to the stationary member; and
said fifth element being selectively fixed through a second brake to the stationary member, while said sixth element being fixed to an output rotary member of said step-variable automatic transmission, said seventh element being selectively connected through a first clutch to said power transmitting member, said step-variable automatic transmission having a plurality of operating positions that are established by engaging actions of respective combinations of said first clutch, second clutch, first brake and second brake.

12. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:
said power distributing mechanism includes a first planetary gear set of single-pinion type having a first sun gear, a first carrier and a first ring gear, said first carrier being fixed to said engine, and said first sun gear being fixed to said first electric motor, while said first ring gear being fixed to said power transmitting member, said power distributing mechanism further including a switching clutch operable to connect said first carrier and said first sun gear to each other, and/or a switching brake operable to fix said first sun gear to a stationary member; and
said step-variable automatic transmission includes a second planetary gear set of single-pinion type and a third planetary gear set of single-pinion type, said second planetary gear set having a second sun gear, a second carrier and a second ring gear, and said third planetary gear set having a third sun gear, a third carrier and a third ring gear, said second sun gear and said third sun gear being selectively connected through a second clutch to said power transmitting member and selectively fixed through a first brake to the stationary member, and said third carrier being selectively fixed through a second brake to the stationary member, while said second carrier and said third ring gear being fixed to an output rotary member of said step-variable automatic transmission, said second ring gear being selectively connected through a first clutch to said power transmitting member.

13. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a first planetary gear set having three elements consisting of a sun gear, a carrier and a ring gear in which said three elements are arranged as a second element, a first element and a third element, respectively, said first element being fixed to said engine, said second element being fixed to said first electric motor, while said third element being fixed to said power transmitting member, said power distributing mechanism further including a switching clutch operable to connect said second element to said first element, and/or a switching brake operable to fix said second element to a stationary member, said power distributing mechanism being placed in a differential state by releasing said switching clutch and/or said switching brake, and in a fixed-speed-ratio shifting state in which said power distributing mechanism has a fixed speed ratio, by engaging said switching clutch and/or said switching brake; and said step-variable automatic transmission includes a second planetary gear set and a third planetary gear set, and has four rotary elements each of which is constituted by at least one of sun gears, carriers and ring gears of said second and third planetary gear sets, rotating speeds of said fourth rotary elements in which said four rotary elements are arranged as a fourth element, a fifth element, a sixth element and a seventh element, respectively, said fourth element being selectively connected through a second clutch to said power transmitting member and selectively connected through a fourth brake to said engine, and said fifth element being selectively connected through a third clutch to said engine and selectively fixed through a second brake to the stationary member, while said sixth element being fixed to an output rotary member of said step-variable automatic transmission, said seventh element being selectively connected through a first clutch to said power transmitting member and selectively fixed through a first brake to the stationary member, said step-variable automatic transmission having a plurality of operating positions that are established by engaging actions of respective combinations of said first clutch, second clutch, third clutch and fourth clutch, first brake and second brake.

14. A vehicular drive system including a power distributing mechanism operable to distribute an output of an engine to a first electric motor and a power transmitting member, a step-variable automatic transmission disposed between power transmitting member and a drive wheel of a vehicle, and a second electric motor disposed between said power transmitting member and said drive wheel, characterized in that:

said power distributing mechanism includes a first planetary gear set of single-pinion type having a first sun gear, a first carrier and a first ring gear, said first carrier being fixed to said engine, and said first sun gear being fixed to said first electric motor, while said first ring gear being fixed to said power transmitting member, said power distributing mechanism further including a switching clutch operable to connect said first carrier and said first sun gear to each other, and/or a switching brake operable to fix said first sun gear to a stationary member; and said step-variable automatic transmission includes a second planetary gear set of double-pinion type and a third planetary gear set of single-pinion type, said second planetary gear set having a second sun gear, a second carrier and a second ring gear, and said third planetary gear set having a third sun gear, a third carrier and a third ring gear, said third sun gear being selectively connected through a second clutch to said power transmitting member and selectively connected through a fourth clutch to said engine, said second carrier and said third carrier being selectively connected through a third clutch to said engine and selectively fixed through a second brake to the stationary member, while said second ring gear and said third ring gear being fixed to an output rotary element of said step-variable automatic transmission, said second sun gear being selectively connected through a first clutch to said power transmitting member and selectively fixed through a first brake to the stationary member.

15. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a first planetary gear set having three elements consisting of a sun gear, a carrier and a ring gear in which said three elements are arranged as a second element, a third element and a first element, respectively, said first element being fixed to said engine, said second element being fixed to said first electric motor, while said third element being fixed to said power transmitting member, said power distributing mechanism further including a switching clutch operable to connect said second element to said first element, and/or a switching brake operable to fix said second element to a stationary member, said power distributing mechanism being placed in a differential state by releasing said switching clutch and/or said switching brake, and in a fixed-speed-ratio shifting state in which said power distributing mechanism has a fixed speed ratio, by engaging said switching clutch and/or said switching brake; and said step-variable automatic transmission includes a second planetary gear set and a third planetary gear set, and has four rotary elements each of which is constituted by at least one of sun gears, carriers and ring gears of said second and third planetary gear sets, in which said four rotary elements are arranged as a fourth element, a fifth element, a sixth element and a seventh element, respectively, said fourth element being selectively connected through a third clutch to said power transmitting member and selectively fixed through a first brake to the stationary member, and said fifth element being selectively connected through a second clutch to said engine and selectively fixed through a second brake to the stationary member, while said sixth element being fixed to an output rotary member of said step-variable automatic transmission, said seventh element being selectively connected through a first clutch to said power transmitting member, said step-variable automatic transmission having a plurality of operating positions that are established by engaging actions of respective combinations of said first clutch, second clutch, third clutch, first brake and second brake.

16. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a first planetary gear set of double-pinion type having a first sun gear, a first carrier and a first ring gear, said first carrier being fixed to said engine, and said first sun gear being fixed to said first electric motor, while said first ring gear being fixed to said power transmitting member, said power distributing mechanism further including a switching clutch operable to connect said first carrier and said first sun gear to each other, and/or a switching brake operable to fix said first sun gear to a stationary member; and said step-variable automatic transmission includes a second planetary gear set of single-pinion type and a third planetary gear set of double-pinion type, said second planetary gear set having a second sun gear, a second carrier and a second ring gear, and said third planetary gear set having a third sun gear, a third carrier and a third ring gear, said second sun gear being selectively connected through a third clutch to said power transmitting member and selectively fixed through a first brake to the stationary member, said second carrier and said third carrier being selectively connected through a second clutch to said engine and selectively fixed through a second brake to the stationary member, while said second ring gear and said third ring gear being fixed to an output rotary element of said step-variable automatic transmission, said third sun gear being selectively connected through a first clutch to said power transmitting member.

17. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a first planetary gear set having three elements consisting of a sun gear, a carrier and a ring gear in which said three elements are arranged as a second element, a first element and a third element, respectively, said first element being fixed to said engine, said second element being fixed to said first electric motor, while said third element being fixed to said power transmitting member, said power distributing mechanism further including a switching clutch operable to connect said second element to said first element, and/or a switching brake operable to fix said second element to a stationary member, said power distributing mechanism being placed in a differential state by releasing said switching clutch and/or said switching brake, and in a fixed-speed-ratio shifting state in which said power distributing mechanism has a fixed speed ratio, by engaging said switching clutch and/or said switching brake; and said step-variable automatic transmission includes a second planetary gear set, a third planetary gear set and a fourth planetary gear set, and has five rotary elements each of which is constituted by at least one of sun gears, carriers and ring gears of said second, third and fourth planetary gear sets, in which said five rotary elements are arranged as a fourth element, a fifth element, a sixth element, a seventh element and an eighth element, respectively, said fourth element being selectively connected through a second clutch to said power transmitting member and selectively fixed through a first brake to the stationary member, and said fifth element being selectively fixed through a second brake to the stationary member, while said sixth element being selectively fixed through a third brake to the stationary member, said seventh element being fixed to an output rotary member of said step-variable automatic transmission, said eighth element being fixed to said power transmitting member, said step-variable automatic transmission having a plurality of operating positions that are established by engaging actions of respective combinations of said second clutch, first brake, second brake and third brake.

18. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a first planetary gear set of single-pinion type having a first sun gear, a first carrier and a first ring gear, said first carrier being fixed to said engine, and said first sun gear being fixed to said first electric motor, while said first ring gear being fixed to said power transmitting member, said power distributing mechanism further including a switching clutch operable to connect said first carrier and said first sun gear to each other, and/or a switching brake operable to fix said first sun gear to a stationary member; and said step-variable automatic transmission includes a second planetary gear set of single-pinion type, a third planetary gear set of single-pinion type and a fourth planetary gear set of single-pinion type, said second planetary gear set having a second sun gear, a second carrier and a second ring gear, and said third planetary gear set having a third sun gear, a third carrier and a third ring gear, while said fourth planetary gear set having a fourth sun gear, a fourth carrier and a fourth ring gear, said second sun gear and said third sun gear being selectively connected through a second clutch to said power transmitting member and selectively fixed through a first brake to the stationary member, and said second carrier being selectively fixed through a second brake to the stationary member, while said fourth ring gear being selectively fixed through a third brake to the stationary member, and wherein said second ring gear, said third carrier and said fourth carrier are fixed to an output rotary member of said step-variable automatic transmission, and said third ring gear and said fourth sun gear are fixed to said power transmitting member.

19. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a first planetary gear set having three elements consisting of a sun gear, a carrier and a ring gear in which said three elements are arranged as a second element, a first element and a third element, respectively, said first element being fixed to said engine, said second element being fixed to said first electric motor, while said third element being fixed to said power transmitting member, said power distributing mechanism further including a switching clutch operable to connect said second element to said first element, and/or a switching brake operable to fix said second element to a stationary member, said power distributing mechanism being placed in a differential state by releasing said switching clutch and/or said switching brake, and in a fixed-speed-ratio shifting state in which said power distributing mechanism has a fixed speed ratio, by engaging said switching clutch and/or said switching brake; and said step-variable automatic transmission includes a second planetary gear set and a third planetary gear set, and has four rotary elements each of which is constituted by at least one of sun gears, carriers and ring gears of said second and third planetary gear sets, in which said four rotary elements are arranged as a fourth element, a fifth element, a sixth element and a seventh element, respectively, said fourth element being selectively connected through a second clutch to said power transmitting member and selectively fixed through a first brake to the stationary member, and said fifth element being selectively fixed through a second brake to the stationary member, while said sixth element being fixed to an output rotary member of said step-variable automatic transmission, said seventh element being fixed to said power transmitting member, said step-variable automatic transmission having a plurality of operating positions that are established by engaging actions of respective combinations of said second clutch, first brake and second brake.

20. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that: said power distributing mechanism includes a first planetary gear set of single-pinion type having a first sun gear, a first carrier and a first ring gear, said first carrier being fixed to said engine, and said first sun gear being fixed to said first electric motor, while said first ring gear being fixed to said power transmitting member, said power distributing mechanism further including a switching clutch operable to connect said first carrier and said first sun gear to each other, and/or a switching brake operable to fix said first sun gear to a stationary member; and said step-variable automatic transmission includes a second planetary gear set of single-pinion type and a third planetary gear set of single-pinion type, and said second planetary gear set having a second sun gear, a second carrier and a second ring gear, said third planetary gear set having a third sun gear, a third carrier and a third ring gear, said second sun gear and said third sun gear being selectively connected through a second clutch to said power transmitting member and selectively fixed through a first brake to the stationary member, said third carrier being selectively fixed through a second brake to the stationary member, while said second carrier and said third ring gear being fixed to an output rotary element of said step-variable automatic transmission, said second ring gear being fixed to said power transmitting member.

21. A vehicular drive system including a power distributing mechanism operable to distribute an output of an engine to a first electric motor and a power transmitting member, and a second electric motor disposed between the power transmitting member and a drive wheel of a vehicle, characterized by comprising:

a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission, and an automatic transmission disposed between said power transmitting member and said drive wheel, wherein a speed ratio of said drive system is determined by a speed ratio of said automatic transmission, and wherein said power distributing mechanism is disposed on a first axis, and said automatic transmission is disposed on a second axis parallel to said first axis, said power transmitting member being constituted by a pair of members which are disposed on said fist and second axes, respectively, said power distributing mechanism and said automatic transmission being connected to each other through said power transmitting member, so as to transit a drive force therebetween.

22. A vehicular drive system according to claim 21, wherein said second electric motor is disposed on said first axis.

23. A vehicular drive system according to claim 21, wherein said second electric motor is disposed on said second axis.

24. A vehicular drive system according to claim 21, wherein said power transmitting member is located on one side of said power distributing mechanism which is remote from said engine.

25. A vehicular drive system according to claim 21, wherein said automatic transmission includes a differential drive gear as an output rotary member thereof, said differential drive gear being located at one end of said automatic transmission which is remote from said power transmitting member.

26. A vehicular drive system according to claim 17, wherein a direction of an output rotary motion of said power distributing mechanism transmitted to said automatic transmission is reversed with respect to that of an input rotary motion of said power distributing mechanism, said drive system having a rear-drive position established by engaging said third brake.

27. A vehicular drive system according to claim 19, wherein a direction of an output rotary motion of said power distributing mechanism to be transmitted to said automatic transmission is reversed with respect to that of an input rotary motion of said power distributing mechanism, said drive system having a rear-drive position established by engaging said second brake.

28. A vehicular drive system according to claim 17, wherein a direction of an output rotary motion of said power distributing mechanism to be transmitted to said automatic transmission is reversed with respect to that of an input rotary motion of said power distributing mechanism, said drive system having a rear-drive position established by engaging said second clutch.

29. A vehicular drive system including a power distributing mechanism operable to distribute an output of an engine to a first electric motor and a power transmitting member, a step-variable automatic transmission disposed between said power transmitting member and a drive wheel, and a second electric motor disposed between said power transmitting member and said drive wheel, characterized in that:

said power distributing mechanism includes a first planetary gear set having three elements consisting of a sun gear, a carrier and a ring gear in which said three elements are arranged as a second element, a first element and a third element, respectively, said first element being fixed to said engine, said second element being fixed to said first electric motor, while said third element being fixed to said power transmitting member, said power distributing mechanism further including a switching clutch operable to connect said second element to said first element, and/or a switching brake operable to fix said second element to a stationary member, said power distributing mechanism being placed in a differential state by releasing said switching clutch and/or said switching brake, and in a fixed-speed-ratio shifting state in which said power distributing mechanism has a fixed speed ratio, by engaging said switching clutch and/or said switching brake; and a direction of a rotary motion of said power transmitting member to be transmitted to said automatic transmission in a rear-drive position of the drive system is reversed by said power distributing mechanism, with respect to that in forward-drive positions of the drive system.

30. A vehicular drive system according to claim 29, wherein said step-variable automatic transmission includes a planetary gear set having a sun gear, a carrier and a ring gear which mesh with each other and constitute at least three rotary elements in which said at least three rotary elements are arranged as a fourth element, a fifth element and a sixth element, respectively, in the order of description, said fourth element being fixed to said power transmitting member such that a drive force can be transmitted to the power transmitting member, and said fifth element being fixed to an output rotary element of said automatic transmission such that the drive force can be transmitted to the output rotary element, while said sixth element is selectively fixed through a brake to a stationary member, and wherein a rear-drive position of the drive system is established by engaging said brake.

31. A vehicular drive system according to claim 29, wherein said step-variable automatic transmission includes a planetary gear set having a sun gear, a carrier and a ring gear which mesh with each other and constitute at least three rotary elements, said fourth element being fixed to said power transmitting member such that a drive force can be transmitted to the power transmitting member, and said fifth element being fixed to an output rotary element of said automatic transmission such that the drive force can be transmitted to the output rotary element, and wherein said automatic transmission further includes a clutch operable to rotate the rotary elements as a unit, and a rear-drive position of the drive system is established by engaging said clutch.

32. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a first planetary gear device having as three elements a sun gear, a carrier and a ring gear, said three elements consisting of a first element, a second element and a third element, said first element being fixed to said engine, said second element being fixed to said first electric motor, and said third element being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a second planetary gear set and a third planetary gear set, said second and third planetary gear sets having sun gears, carriers and ring gears selected ones of which are fixed to each other to constitute four elements consisting of a fourth element, a fifth element, a sixth element and a seventh element said fourth element being selectively connected to said power transmitting member through a second clutch and selectively fixed to a stationary member through a first brake, said fifth element being selectively connected to said power transmitting member through a third clutch and selectively fixed to said stationary member through a second brake, said sixth element being fixed to an output rotary member of said automatic transmission, and said seventh element being selectively connected to said power transmitting member through a first clutch, said automatic transmission having a plurality of gear positions which are established by engaging respective combinations of said first, second and third clutches and said first and second brakes.

33. A vehicular drive system according to claim 32, wherein said differential-state switching device includes a switching clutch operable to connect said second element to said first element, and/or a switching brake operable to fix said second element to said stationary member, said first planetary gear set being placed in said differential state by releasing said switching clutch and/or said switching brake, and in said locked state by engaging said switching clutch and/or said switching brake.

34. A vehicular drive system according to claim 33, wherein said plurality of gear positions includes:

a first-gear position which has a highest speed ratio and which is established by engaging said switching clutch, said first clutch and said second brake;

a second-gear position which has a speed ratio lower than that of said first-gear position and which is established by engaging said switching clutch, said first clutch and said first brake;

a third-gear position which has a speed ratio lower than that of said second-gear position and which is established by engaging said switching clutch, said first clutch and said third clutch;

a fourth-gear position which has a speed ratio lower than that of said third-gear position and which is established by engaging said switching clutch, said third clutch and said first brake; and a fifth-gear position which has a speed ratio lower than that of said fourth-gear position and which is established by engaging said third clutch, said switching brake and said first brake.

35. A vehicular drive system according to claim 32, wherein said automatic transmission includes a single-pinion type second planetary gear set having a second sun gear, a second carrier and a second ring gear, and a double-pinion type third planetary gear set having a third sun gear, a third carrier and a third ring gear, said second sun gear functioning as said fourth element, said second carrier and said third carrier functioning as said fifth element, said second ring gear and said third ring gear functioning as said sixth element, and said third sun gear functioning as said seventh element.

36. A vehicular drive system according to claim 32, wherein said automatic transmission includes a double-pinion type second planetary gear set having a second sun gear, a second carrier and a second ring gear, and a single-pinion type third planetary gear set having a third sun gear, a third carrier and a third ring gear, said second carrier and said third sun gear functioning as said fourth element, said second ring gear and said third carrier functioning as said fifth element, said third ring gear functioning as said sixth element, and said third ring gear functioning as said seventh element.

37. A vehicular drive system according to claim 32, wherein said automatic transmission includes a double-pinion type second planetary gear set having a second sun gear, a second carrier and a second ring gear, and a single-pinion type third planetary gear set having a third sun gear, a third carrier and a third ring gear, said second sun gear and said third sun gear functioning as said fourth element, said second ring gear functioning as said fifth element, said third carrier functioning as said sixth element, and said second carrier and said third ring gear functioning as said seventh element.

38. A vehicular drive system according to claim 32, wherein said automatic transmission includes a double-pinion type second planetary gear set having a second sun gear, a second carrier and a second ring gear, and a single-pinion type third planetary gear set having a third sun gear, a third carrier and a third ring gear, said second sun gear functioning as said fourth element, said second ring gear and said third ring gear functioning as said fifth element, said third carrier functioning as said sixth element, and said second carrier and said third sun gear functioning as said seventh element.

39. A vehicular drive system according to claim 32, wherein said automatic transmission includes a single-pinion type second planetary gear set having a second sun gear, a second carrier and a second ring gear, and a double-pinion type third planetary gear set having a third sun gear, a third carrier and a third ring gear, said third sun gear functioning as said fourth element, said second ring gear functioning as said fifth element, said second carrier and said third ring gear functioning as said sixth element, and said second sun gear and said third carrier functioning as said seventh element.

40. A vehicular drive system according to claim 32, wherein said automatic transmission includes a single-pinion type second planetary gear set having a second sun gear, a second carrier and a second ring gear, and a single-pinion type third planetary gear set having a third sun gear, a third carrier and a third ring gear, said second sun gear functioning as said fourth element, said second carrier and third ring gear functioning as said fifth element, said second ring gear and said third carrier functioning as said sixth element, and said third sun gear functioning as said seventh element.

41. A vehicular drive system according to claim 32, wherein said automatic transmission includes a single-pinion type second planetary gear set having a second sun gear, a second carrier and a second ring gear, and a single-pinion type third planetary gear set having a third sun gear, a third carrier and a third ring gear, said third sun gear functioning as said fourth element, said second ring gear functioning as said fifth element, said second carrier and said third carrier functioning as said sixth element, and said second sun gear and said third ring gear functioning as said seventh element.

42. A vehicular drive system according to claim 32, wherein said automatic transmission includes a single-pinion type second planetary gear set having a second sun gear, a second carrier and a second ring gear, and a single-pinion type third planetary gear set having a third sun gear, a third carrier and a third ring gear, said second sun gear and said third sun gear functioning as said fourth element, said third carrier functioning as said fifth element, said second carrier and said third ring gear functioning as said sixth element, and said second ring gear functioning as said seventh element.

43. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary gear set having a second sun gear, a second carrier and a second ring gear, and a double-pinion type third planetary gear set having a third sun gear, a third carrier and a third ring gear, said second sun gear being selectively connected to said power transmitting member through a second clutch and selectively fixed to a stationary member through a first brake, said second carrier and said third carrier being selectively connected to said power transmitting member through a third clutch and selectively fixed to said stationary member through a second brake, said second ring gear and said third ring gear being fixed to an output rotary member of said automatic transmission, and said third sun gear being selectively connected to said power transmitting member through a first clutch.

44. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear being selectively connected to said power transmitting member through a first clutch, said second carrier and said third sun gear being selectively connected to said power transmitting member through a second clutch and selectively fixed to a stationary member through a first brake, said second ring gear and said third carrier being selectively connected to said power transmitting member through a third clutch and selectively fixed to said stationary member through a second brake, and said third ring gear being fixed an output rotary member of said automatic transmission.

45. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear and said third sun gear being selectively connected to said power transmitting member through a second clutch and selectively fixed to a stationary member through a first brake, said second carrier and said third ring gear being selectively connected to said power transmitting member through a first clutch, said second ring gear being selectively connected to said power transmitting member through a third clutch and selectively fixed to said stationary member through a second brake, and said third carrier being fixed to an output rotary member of said automatic transmission.

46. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear being selectively connected to said power transmitting member through a second clutch and selectively fixed to a stationary member through a first brake, said second carrier and said third sun gear being selectively connected to said power transmitting member through a first clutch, said second ring gear and said third ring gear being selectively connected to said power transmitting member through a third clutch and selectively fixed to said stationary member through a second brake, and said third carrier being fixed to an output rotary member of said automatic transmission.

47. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary gear set having a second sun gear, a second carrier and a second ring gear, and a double-pinion type third planetary gear set having a third sun gear, a third carrier and a third ring gear, said second sun gear and said third carrier being selectively connected to said power transmitting member through a second clutch, said second carrier and said third ring gear being integrally fixed to each other for rotation as a unit and fixed to an output rotary member of said automatic transmission, said second ring gear being selectively connected to said power transmitting member through a third clutch and selectively fixed to a stationary member through a second brake, and said third sun gear being selectively connected to said power transmitting member through a second clutch and selectively fixed to said stationary member through a first brake.

48. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary gear set having a second sun gear, a second carrier and a second ring gear, and a single-pinion type third planetary gear set having a third sun gear, a third carrier and a third ring gear, said second sun gear being selectively connected to said power transmitting member through a second clutch and selectively fixed to a stationary member through a first brake, said second carrier and said third ring gear being selectively connected to said power transmitting member through a third clutch and selectively fixed to a stationary member through a second brake, said second ring gear and said third carrier being fixed to an output rotary member of said automatic transmission, and said third sun gear being selectively connected to said power transmitting member through a first clutch.

49. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary gear set having a second sun gear, a second carrier and a second ring gear, and a single-pinion type third planetary gear set having a third sun gear, a third carrier and a third ring gear, said second sun gear and said third ring gear being selectively connected to said power transmitting member through a second clutch, said second carrier and said third carrier being fixed to an output rotary member of said automatic transmission, said second ring gear being selectively connected to said power transmitting member through a third clutch and selectively fixed to a stationary member through a second brake, and said third sun gear being selectively connected to said power transmitting member through a second clutch and selectively fixed to said stationary member through a first brake.

50. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary gear set having a second sun gear, a second carrier and a second ring gear, and a single-pinion type third planetary gear set having a third sun gear, a third carrier and a third ring gear, said second sun gear and said third sun gear being selectively fixed to a stationary member through a first brake, said second carrier and said third ring gear being fixed to an output rotary member of said automatic transmission, said second ring gear being selectively connected to said power transmitting member through a first clutch, and said third carrier being selectively connected to said power transmitting member through a third clutch and selectively fixed to said stationary member through a second brake.

51. A vehicular drive system according to claim 43, wherein said shifting-state switching device includes a switching clutch operable to connect said first carrier and said first sun gear to each other, and/or a switching brake operable fix said first sun gear to said stationary member.

52. A vehicular drive system according to claim 32, said automatic transmission includes a plurality of input clutches selectively connected to an output shaft of said power distributing mechanism; and said automatic transmission has a plurality of gear positions which are established by selectively engaging and releasing said plurality of input clutches.

53. A vehicular drive system including a power distributing mechanism operable to distribute an output of an engine to a first electric motor and a power transmitting member, an automatic transmission disposed between said power transmitting member and a drive wheel of a vehicle, and a second electric motor disposed between said power transmitting member and said drive wheel, characterized in that:

said automatic transmission includes a plurality of input clutches selectively connected to an output shaft of said power distributing mechanism; and said automatic transmission has a plurality of gear positions which are established by selectively engaging and releasing said plurality of input clutches, wherein said power distributing mechanism includes a first planetary gear set having as three elements a sun gear, a carrier and a ring gear, said three elements consisting of a first element, a second element and a third element in a direction from one of opposite ends of a collinear chart toward the other end, said collinear chart having straight lines indicating rotating speeds of said three elements, said first element being fixed to said engine, said second element being fixed to said first electric motor, and said third element being fixed to said power transmitting member, and wherein said power distributing mechanism further includes a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission.

54. A vehicular drive system including a power distributing mechanism operable to distribute an output of an engine to a first electric motor and a power transmitting member, an automatic transmission disposed between said power transmitting member and a drive wheel of a vehicle, and a second electric motor disposed between said power transmitting member and said drive wheel, characterized in that:

said automatic transmission includes a plurality of input clutches selectively connected to an output shaft of said power distributing mechanism; and said automatic transmission has a plurality of gear positions which are established by selectively engaging and releasing said plurality of input clutches, wherein said power distributing mechanism includes a first planetary gear set having as three elements a sun gear, a carrier and a ring gear, said three elements consisting of a first element, a second element and a third element in a direction from one of opposite ends of a collinear chart toward the other end, said collinear chart having straight lines indicating rotating speeds of said three elements, said first element being fixed to said engine, said second element being fixed to said first electric motor, and said third element being fixed to said power transmitting member.

55. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a first planetary gear device having as three elements a sun gear, a carrier and a ring gear, said three elements consisting of a first element, a second element and a third element said first element being fixed to said engine, said second element being fixed to said first electric motor, and said third element being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a second planetary gear set and a third planetary gear set, said second and third planetary gear sets having sun gears, carriers and ring gears selected ones of which are fixed to each other to constitute four elements consisting of a fourth element, a fifth element, a sixth element and a seventh element, said fourth element being selectively connected to said power transmitting member through a first clutch and selectively fixed to a stationary member through a second brake, said fifth element being selectively connected to said power transmitting member through a second clutch and selectively fixed to said stationary member through a third brake, said sixth element being fixed to an output rotary member of said automatic transmission, and said seventh element being selectively fixed to said stationary member through a first brake, said automatic transmission having a plurality of gear positions which are established by engaging respective combinations of said first and second clutches and said first, second and third brakes.

56. A vehicular drive system according to claim 55, wherein said differential-state switching device includes a switching clutch operable to connect said second element to said first element, and/or a switching brake operable to fix said second element to said stationary member, said first planetary gear set being placed in said differential state by releasing said switching clutch and/or said switching brake, and in said locked state by engaging said switching clutch and/or said switching brake.

57. A vehicular drive system according to claim 56, wherein said plurality of gear positions includes:

a first-gear position which has a highest speed ratio and which is established by engaging said switching clutch, said first clutch and said first brake;

a second-gear position which has a speed ratio lower than that of said first-gear position and which is established by engaging said switching clutch, said second clutch and said first brake;

a third-gear position which has a speed ratio lower than that of said second-gear position and which is established by engaging said switching clutch, said first clutch and said second clutch;

a fourth-gear position which has a speed ratio lower than that of said third-gear position and which is established by engaging said switching clutch, said second clutch and said second brake; and a fifth-gear position which has a speed ratio lower than that of said fourth-gear position and which is established by engaging said second clutch, said switching brake and said second brake.

58. A vehicular drive system according to claim 55, wherein said automatic transmission includes a single-pinion type second planetary gear set having a second sun gear, a second carrier and a second ring gear, and a double-pinion type third planetary gear set having a third sun gear, a third carrier and a third ring gear, said second carrier and said third sun gear functioning as said fourth element, said second ring gear functioning as said fifth element, said third carrier functioning as said sixth element, and said second sun gear and said third ring gear functioning as said seventh element.

59. A vehicular drive system according to claim 55, wherein said automatic transmission includes a double-pinion type second planetary gear set having a second sun gear, a second carrier and a second ring gear, and a single-pinion type third planetary gear set having a third sun gear, a third carrier and a third ring gear, said second carrier and said third sun gear functioning as said fourth element, said second ring gear and said third carrier functioning as said fifth element, said third ring gear functioning as said sixth element, and said second sun gear functioning as said seventh element.

60. A vehicular drive system according to claim 55, wherein said automatic transmission includes a double-pinion type second planetary gear set having a second sun gear, a second carrier and a second ring gear, and a single-pinion type third planetary gear set having a third sun gear, a third carrier and a third ring gear, said second sun gear and said third sun gear functioning as said fourth element, said second ring gear and said third carrier functioning as said fifth element, said third ring gear functioning as said sixth element, and said second carrier functioning as said seventh element.

61. A vehicular drive system according to claim 55, wherein said automatic transmission includes a double-pinion type second planetary gear set having a second sun gear, a second carrier and a second ring gear, and a single-pinion type third planetary gear set having a third sun gear, a third carrier and a third ring gear, said second sun gear and said third sun gear functioning as said fourth element, said second ring gear functioning as said fifth element, said third carrier functioning as said sixth element, and said second carrier and said third ring gear functioning as said seventh element.

62. A vehicular drive system according to claim 55, wherein said automatic transmission includes a single-pinion type second planetary gear set having a second sun gear, a second carrier and a second ring gear, and a double-pinion type third planetary gear set having a third sun gear, a third carrier and a third ring gear, said third sun gear functioning as said fourth element, said second carrier functioning as said fifth element, said second ring gear and said third carrier functioning as said sixth element, and said second sun gear and said third ring gear functioning as said seventh element.

63. A vehicular drive system according to claim 55, wherein said automatic transmission includes a single-pinion type second planetary gear set having a second sun gear, a second carrier and a second ring gear, and a double-pinion type third planetary gear set having a third sun gear, a third carrier and a third ring gear, said second sun gear and said third sun gear functioning as said fourth element, said second carrier functioning as said fifth element, said second ring gear and said third ring gear functioning as said sixth element, and said third carrier functioning as said seventh element.

64. A vehicular drive system according to claim 55, wherein said automatic transmission includes a single-pinion type second planetary gear set having a second sun gear, a second carrier and a second ring gear, and a double-pinion type third planetary gear set having a third sun gear, a third carrier and a third ring gear, said second sun gear functioning as said fourth element, said second carrier and said third carrier functioning as said fifth element, said second ring gear and said third ring gear functioning as said sixth element, and said third sun gear functioning as said seventh element.

65. A vehicular drive system according to claim 55, wherein said automatic transmission includes a double-pinion type second planetary gear set having a second sun gear, a second carrier and a second ring gear, and a single-pinion type third planetary gear set having a third sun gear, a third carrier and a third ring gear, said second sun gear functioning as said fourth element, said second ring gear and said third ring gear functioning as said fifth element, said third carrier functioning as said sixth element, and said second carrier and said third sun gear functioning as said seventh element.

66. A vehicular drive system according to claim 55, wherein said automatic transmission includes a double-pinion type second planetary gear set having a second sun gear, a second carrier and a second ring gear, and a single-pinion type third planetary gear set having a third sun gear, a third carrier and a third ring gear, said second carrier functioning as said fourth element, said second ring gear and said third ring gear functioning as said fifth element, said third carrier functioning as said sixth element, and said second sun gear and said third sun gear functioning as said seventh element.

67. A vehicular drive system according to claim 55, wherein said automatic transmission includes a double-pinion type second planetary gear set having a second sun gear, a second carrier and a second ring gear, and a single-pinion type third planetary gear set having a third sun gear, a third carrier and a third ring gear, said second sun gear functioning as said fourth element, said third ring gear and said third ring gear functioning as said fifth element, said second ring gear and said third carrier functioning as said sixth element, and said second carrier and said third sun gear functioning as said seventh element.

68. A vehicular drive system according to claim 55, wherein said automatic transmission includes a single-pinion type second planetary gear set having a second sun gear, a second carrier and a second ring gear, and a single-pinion type third planetary gear set having a third sun gear, a third carrier and a third ring gear, said second sun gear and said third sun gear functioning as said fourth element, said second carrier functioning as said fifth element, said second ring gear and said third carrier functioning as said sixth element, and said third ring gear functioning as said seventh element.

69. A vehicular drive system according to claim 55, wherein said automatic transmission includes a single-pinion type second planetary gear set having a second sun gear, a second carrier and a second ring gear, and a single-pinion type third planetary gear set having a third sun gear, a third carrier and a third ring gear, said second sun gear functioning as said fourth element, said second carrier and said third ring gear functioning as said fifth element, said second ring gear and said third carrier functioning as said sixth element, and said third sun gear functioning as said seventh element.

70. A vehicular drive system according to claim 55, wherein said automatic transmission includes a single-pinion type second planetary gear set having a second sun gear, a second carrier and a second ring gear, and a single-pinion type third planetary gear set having a third sun gear, a third carrier and a third ring gear, said third sun gear functioning as said fourth element, said second ring gear functioning as said fifth element, said second carrier and said third carrier functioning as said sixth element, and said second sun gear and said third ring gear functioning as said seventh element.

71. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear and said third ring gear being selectively fixed to a stationary member through a first brake, said second carrier and said third sun gear being selectively connected to said power transmitting member through a first clutch and selectively fixed to said stationary member through a second brake, said second ring gear being selectively connected to said power transmitting member through a second clutch and selectively fixed to said stationary member through a third brake, said third carrier being fixed to an output rotary member of said automatic transmission.

72. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear being selectively connected to said power transmitting member through a first clutch, said second carrier and said third sun gear being selectively connected to said power transmitting member through a second clutch and selectively fixed to a stationary member through a first brake, said second sun gear being selectively fixed to a stationary member through a first brake, said second carrier and said third sun gear being selectively connected to said power transmitting member through a first clutch and selectively fixed to said stationary member through a second brake, said second ring gear and said third carrier being selectively connected to said power transmitting member through a second clutch and selectively fixed to said stationary member through a third brake, and said third ring gear being fixed an output rotary member of said automatic transmission.

73. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear and said third sun gear being selectively connected to said power transmitting member through a second clutch and selectively fixed to a stationary member through a first brake, said second sun gear and said third sun gear being selectively connected to said power transmitting member through a first clutch and selectively fixed to a stationary member through a second brake, said second carrier being selectively fixed to said stationary member through a first brake, said second ring gear and said third carrier being selectively connected to said power transmitting member through a second clutch and selectively fixed to said stationary member through a third brake, and said third ring gear being fixed to an output rotary member of said automatic transmission.

74. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear and said third sun gear being selectively connected to said power transmitting member through a first clutch and selectively fixed to a stationary member through a second brake, said second carrier being selectively connected to said power transmitting member through a second clutch and selectively fixed to said stationary member through a third brake, said second ring gear and said third ring gear being fixed to an output rotary member of said automatic transmission, and said third carrier being selectively fixed to said stationary member through a first brake.

75. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear and said third ring gear being selectively fixed to a stationary member through a first brake, said second carrier being selectively connected to said power transmitting member through a second clutch and selectively fixed to said stationary member through a third brake, said second ring gear and said third carrier being fixed to an output rotary member of said automatic transmission, said third sun gear being selectively connected to said power transmitting member through a first clutch and selectively fixed to said stationary member through a second brake.

76. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary.gear set having a second sun gear, a second carrier and a second ring gear, and a double-pinion type third planetary gear set having a third sun gear, a third carrier and a third ring gear, said second sun gear and said third sun gear being selectively connected to said power transmitting member through a first clutch and selectively fixed to a stationary member through a second brake, said second carrier being selectively connected to said power transmitting member through a second clutch and selectively fixed to said stationary member through a third brake, said second ring gear and said third ring gear being fixed to an output rotary member of said automatic transmission, and said. third carrier selectively fixed to said stationary member through a first brake.

77. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary gear set having a second sun gear, a second carrier and a second ring gear, and a double-pinion type third planetary gear set having a third sun gear, a third carrier and a third ring gear, said second sun gear being selectively connected to said power transmitting member through a first clutch and selectively fixed to a stationary member through a second brake, said second carrier and said third carrier being selectively connected to said power transmitting member through a second clutch and selectively fixed to said stationary member through a third brake, said second ring gear and said third ring gear being fixed to an output rotary member of said automatic transmission, said third sun gear being selectively fixed to said stationary member through a first brake.

78. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear being selectively connected to said power transmitting member through a first clutch and selectively fixed to a stationary member through a second brake, said second carrier and said third sun gear being selectively fixed to said stationary member through a first brake, said second ring gear and said third ring gear being selectively connected to said power transmitting member through a second clutch and selectively fixed to said stationary member through a third brake, said third carrier being fixed an output rotary member of said automatic transmission.

79. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear and said third sun gear being selectively fixed to a stationary member through a first brake, said second carrier being selectively connected to said power transmitting member through a first clutch and selectively fixed to said stationary member through a second brake, said second ring gear and said third ring being selectively connected to said power transmitting member through a second clutch and selectively fixed to said stationary member through a third brake, said third carrier being fixed an output rotary member of said automatic transmission.

80. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a double-pinion type second planetary gear set having a second sun gear, a second carrier and a second ring gear, and a single-pinion type third planetary gear set having a third sun gear, a third carrier and a third ring gear, said second sun gear being selectively connected to said power transmitting member through a first clutch and selectively fixed to a stationary member through a second brake, said second carrier and said third sun gear being selectively fixed to said stationary member through a first brake, said second ring gear and said third carrier being fixed to an output rotary member of said automatic transmission, and said third ring gear being selectively connected to said power transmitting member through a second clutch and selectively fixed to said stationary member through a third brake.

81. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary gear set having a second sun gear, a second carrier and a second ring gear, and a single-pinion type third planetary gear set having a third sun gear, a third carrier and a third ring gear, said second sun gear and said third sun gear being selectively connected to said power transmitting member through a first clutch and selectively fixed to a stationary member through a second brake, said second carrier being selectively connected to said power transmitting member through a second clutch and selectively fixed to said stationary member through a third brake, said second ring gear and said third carrier being fixed to an output rotary member of said automatic transmission, and said third ring gear being selectively fixed to said stationary member through a first brake.

82. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary gear set having a second sun gear, a second carrier and a second ring gear, and a single-pinion type third planetary gear set having a third sun gear, a third carrier and a third ring gear, said second sun gear being selectively connected to said power transmitting member through a first clutch and selectively fixed to a stationary member through a second brake, said second carrier and said third ring gear being selectively connected to said power transmitting member through a second clutch and selectively fixed to said stationary member through a third brake, said second ring gear and said third carrier being fixed to an output rotary member of said automatic transmission, and said third sun gear being selectively fixed to said stationary member through a first brake.

83. A vehicular drive system including a power distributing mechanism operable to distribute an output of an engine to a first electric motor and a power transmitting member, a step-variable automatic transmission disposed between said power transmitting member and a drive wheel of a vehicle, and a second electric motor disposed between said power transmitting member and said drive wheel, characterized in that:

said power distributing mechanism includes a single-pinion type first planetary gear device having a first sun gear, a first carrier and a first ring gear, said first carrier being fixed to said engine, said first sun being fixed to said first electric motor, and said first ring gear being fixed to said power transmitting member, said power distributing mechanism further including a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission; and said automatic transmission includes a single-pinion type second planetary gear set having a second sun gear, a second carrier and a second ring gear, and a single-pinion type third planetary gear set having a third sun gear, a third carrier and a third ring gear, said second sun gear and said third ring gear being selectively fixed to a stationary member through a first brake, said second carrier and said third carrier being fixed to an output rotary member of said automatic transmission, and said second ring gear being selectively connected to said power transmitting member through a second clutch and selectively fixed to said stationary member through a third brake, and said third sun gear being selectively connected to said power transmitting member through a first clutch and selectively fixed to said stationary member through a second brake.

84. A vehicular drive system according to claim 71, wherein said shifting-state switching device includes a switching clutch operable to connect said first carrier and said first sun gear to each other, and/or a switching brake operable fix said first sun gear to said stationary member.

85. A vehicular drive system including a power distributing mechanism operable to distribute an output of an engine to a first electric motor and a power transmitting member, an automatic transmission disposed between said power transmitting member and a drive wheel of a vehicle, and a second electric motor disposed between said power transmitting member and said drive wheel, characterized in that:

said power distributing mechanism includes a planetary gear device having as three elements a sun gear, a carrier and a ring gear, said three elements consisting of a first element, a second element and a third element which are arranged in the order of said second element, said first element and said third element, said first element being fixed to said engine, said second element being fixed to said first electric motor, and said third element being fixed to said power transmitting member; and said automatic transmission is arranged to increase a rotating speed of said power transmitting member wherein said power distributing mechanism further includes a differential-state switching device operable to place said power distributing mechanism selectively in a differential state in which the power distributing mechanism is operable as an electrically controlled continuously variable transmission, and a locked state in which the power distributing mechanism is not operable as the electrically controlled continuously variable transmission.

86. A vehicular drive system according to claim 54, wherein said automatic transmission is a step-variable automatic transmission.

* * * * *